US012302035B2

(12) United States Patent
Cranfill et al.

(10) Patent No.: US 12,302,035 B2
(45) Date of Patent: May 13, 2025

(54) ESTABLISHING A VIDEO CONFERENCE DURING A PHONE CALL

(71) Applicant: Apple Inc., Cupertino, CA (US)

(72) Inventors: Elizabeth C. Cranfill, San Francisco, CA (US); Stephen O. Lemay, Palo Alto, CA (US); Joe S. Abuan, Cupertino, CA (US); Hsi-Jung Wu, San Jose, CA (US); Xiaosong Zhou, Campbell, CA (US); Roberto Garcia, Jr., Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/140,449

(22) Filed: Apr. 27, 2023

(65) Prior Publication Data

US 2023/0262196 A1  Aug. 17, 2023

Related U.S. Application Data

(63) Continuation of application No. 17/332,829, filed on May 27, 2021, now abandoned, which is a
(Continued)

(51) Int. Cl.
*H04N 7/14* (2006.01)
*G06F 3/04812* (2022.01)
(Continued)

(52) U.S. Cl.
CPC ......... *H04N 7/141* (2013.01); *G06F 3/04812* (2013.01); *G06F 3/04817* (2013.01);
(Continued)

(58) Field of Classification Search
CPC .. G06F 9/451; G06F 3/04812; G06F 3/04817; G06F 3/0482; G06F 3/04842;
(Continued)

(56) References Cited

U.S. PATENT DOCUMENTS 102,663 A     5/1870  Lamp
4,761,642 A   8/1988  Huntzinger et al.
(Continued)

FOREIGN PATENT DOCUMENTS

AU    2015100713 A4   6/2015
CA       2876587 A1   2/2014
(Continued)

OTHER PUBLICATIONS

Notice of Allowance received for U.S. Appl. No. 18/138,348, mailed on Mar. 12, 2025, 10 pages.
(Continued)

*Primary Examiner* — Maria El-Zoobi
(74) *Attorney, Agent, or Firm* — DLA Piper LLP (US)

(57) ABSTRACT

Some embodiments provide a method for initiating a video conference using a first mobile device. The method presents, during an audio call through a wireless communication network with a second device, a selectable user-interface (UI) item on the first mobile device for switching from the audio call to the video conference. The method receives a selection of the selectable UI item. The method initiates the video conference without terminating the audio call. The method terminates the audio call before allowing the first and second devices to present audio and video data exchanged through the video conference.

36 Claims, 90 Drawing Sheets

Related U.S. Application Data continuation of application No. 16/666,073, filed on Oct. 28, 2019, now Pat. No. 11,025,861, which is a continuation of application No. 15/725,868, filed on Oct. 5, 2017, now Pat. No. 10,462,420, which is a continuation of application No. 14/263,889, filed on Apr. 28, 2014, now Pat. No. 9,787,938, which is a continuation of application No. 12/794,766, filed on Jun. 6, 2010, now Pat. No. 8,744,420.

(60) Provisional application No. 61/321,871, filed on Apr. 7, 2010.

(51) Int. Cl.
| | |
|---|---|
| *G06F 3/04817* | (2022.01) |
| *G06F 3/0482* | (2013.01) |
| *G06F 3/04842* | (2022.01) |
| *G06F 3/0486* | (2013.01) |
| *G06F 3/0488* | (2022.01) |
| *G06F 3/04886* | (2022.01) |
| *G06F 9/451* | (2018.01) |
| *G09G 5/14* | (2006.01) |
| *H04M 1/72469* | (2021.01) |
| *H04N 5/262* | (2006.01) |
| *H04N 5/272* | (2006.01) |
| *H04N 7/15* | (2006.01) |
| *H04N 23/45* | (2023.01) |

(52) U.S. Cl.
CPC ........ *G06F 3/0482* (2013.01); *G06F 3/04842* (2013.01); *G06F 3/0486* (2013.01); *G06F 3/0488* (2013.01); *G06F 3/04886* (2013.01); *G06F 9/451* (2018.02); *G09G 5/14* (2013.01); *H04M 1/72469* (2021.01); *H04N 5/2624* (2013.01); *H04N 5/272* (2013.01); *H04N 7/147* (2013.01); *H04N 7/15* (2013.01); *H04N 23/45* (2023.01)

(58) Field of Classification Search
CPC .. G06F 3/0486; G06F 3/0488; G06F 3/04886; H04M 1/72469; H04N 23/45; H04N 5/2624; H04N 5/272; H04N 7/147; H04N 7/15; G09G 5/14
USPC ............................................ 348/14.02–14.09
See application file for complete search history.

(56) References Cited

U.S. PATENT DOCUMENTS

| | | |
|---|---|---|
| 4,885,704 A | 12/1989 | Takagi et al. |
| 4,896,291 A | 1/1990 | Gest et al. |
| 5,140,678 A | 8/1992 | Torres |
| 5,146,556 A | 9/1992 | Hullot et al. |
| 5,202,961 A | 4/1993 | Mills et al. |
| 5,227,771 A | 7/1993 | Kerr et al. |
| 5,229,852 A | 7/1993 | Maietta et al. |
| 5,237,653 A | 8/1993 | Noguchi et al. |
| 5,287,447 A | 2/1994 | Miller et al. |
| 5,333,256 A | 7/1994 | Green et al. |
| 5,347,295 A | 9/1994 | Agulnick et al. |
| 5,384,911 A | 1/1995 | Bloomfield |
| 5,412,776 A | 5/1995 | Bloomfield et al. |
| 5,416,895 A | 5/1995 | Anderson et al. |
| 5,428,730 A | 6/1995 | Baker et al. |
| 5,463,725 A | 10/1995 | Henckel et al. |
| 5,487,143 A | 1/1996 | Southgate |
| 5,499,334 A | 3/1996 | Staab |
| 5,500,936 A | 3/1996 | Allen et al. |
| 5,557,724 A | 9/1996 | Sampat et al. |
| 5,560,022 A | 9/1996 | Dunstan et al. |
| 5,561,811 A | 10/1996 | Bier |
| 5,581,670 A | 12/1996 | Bier et al. |
| 5,617,526 A | 4/1997 | Oran et al. |
| 5,659,693 A | 8/1997 | Hansen et al. |
| 5,721,850 A | 2/1998 | Farry |
| 5,793,365 A | 8/1998 | Tang et al. |
| 5,825,357 A | 10/1998 | Malamud et al. |
| 5,910,882 A | 6/1999 | Burrell |
| 6,025,871 A | 2/2000 | Kantor et al. |
| 6,166,736 A | 12/2000 | Hugh |
| 6,215,490 B1 | 4/2001 | Kaply |
| 6,219,047 B1 | 4/2001 | Bell |
| 6,230,170 B1 | 5/2001 | Zellweger et al. |
| 6,300,951 B1 | 10/2001 | Filetto et al. |
| 6,346,962 B1 | 2/2002 | Goodridge |
| 6,486,895 B1 | 11/2002 | Robertson et al. |
| 6,493,002 B1 | 12/2002 | Christensen |
| 6,661,437 B1 | 12/2003 | Miller et al. |
| 6,726,094 B1 | 4/2004 | Rantze et al. |
| 6,728,784 B1 | 4/2004 | Mattaway |
| 6,731,308 B1 | 5/2004 | Tang et al. |
| 6,768,497 B2 | 7/2004 | Baar et al. |
| 6,917,632 B2 | 7/2005 | Koller et al. |
| 7,007,241 B2 | 2/2006 | Boeuf |
| 7,102,663 B2 | 9/2006 | Crook |
| 7,128,626 B2 | 10/2006 | Dudra et al. |
| 7,148,911 B1 | 12/2006 | Mitsui et al. |
| 7,185,054 B1 | 2/2007 | Ludwig et al. |
| 7,444,645 B1 | 10/2008 | St-Michel et al. |
| 7,458,014 B1 | 11/2008 | Rubin et al. |
| 7,469,381 B2 | 12/2008 | Ording |
| 7,506,260 B2 | 3/2009 | Wada et al. |
| 7,571,014 B1 | 8/2009 | Lambourne et al. |
| 7,676,767 B2 | 3/2010 | Hofmeister et al. |
| 7,707,514 B2 | 4/2010 | Forstall et al. |
| 7,739,622 B2 | 6/2010 | Deline et al. |
| 7,801,971 B1 | 9/2010 | Amidon et al. |
| 7,814,112 B2 | 10/2010 | Gupta et al. |
| 7,840,907 B2 | 11/2010 | Kikuchi et al. |
| 7,876,996 B1 | 1/2011 | Herz |
| 7,903,171 B2 | 3/2011 | Takabatake et al. |
| 7,954,056 B2 | 5/2011 | Graham |
| 7,982,762 B2 | 7/2011 | Chatting et al. |
| 8,077,157 B2 | 12/2011 | Sengupta et al. |
| 8,169,463 B2 | 5/2012 | Enstad et al. |
| 8,171,137 B1 | 5/2012 | Parks et al. |
| 8,181,119 B1 | 5/2012 | Ording |
| RE43,462 E | 6/2012 | Washino et al. |
| 8,196,061 B1 | 6/2012 | Bhojan |
| 8,224,894 B1 | 7/2012 | Parks et al. |
| 8,250,071 B1 | 8/2012 | Killalea et al. |
| 8,259,153 B1 | 9/2012 | Campbell et al. |
| 8,260,879 B2 | 9/2012 | Chan |
| 8,269,739 B2 | 9/2012 | Hillis et al. |
| 8,274,544 B2 | 9/2012 | Kurtz et al. |
| 8,290,777 B1 | 10/2012 | Nguyen et al. |
| 8,291,341 B2 | 10/2012 | Tseng et al. |
| 8,294,105 B2 | 10/2012 | Alameh et al. |
| 8,330,621 B2 | 12/2012 | Hayashi |
| 8,370,448 B2 | 2/2013 | Galchev |
| 8,427,303 B1 | 4/2013 | Brady et al. |
| 8,438,504 B2 | 5/2013 | Cranfill et al. |
| 8,443,280 B2 | 5/2013 | Noyes |
| 8,462,961 B1 | 6/2013 | Bywaters et al. |
| 8,478,363 B2 | 7/2013 | Levien et al. |
| 8,478,816 B2 | 7/2013 | Parks et al. |
| 8,499,236 B1 | 7/2013 | Keljo |
| 8,542,265 B1 | 9/2013 | Dodd et al. |
| 8,566,700 B2 | 10/2013 | Ueda |
| 8,576,173 B2 | 11/2013 | Verhaegh |
| 8,613,070 B1 | 12/2013 | Borzycki et al. |
| 8,624,952 B2 | 1/2014 | Currivan et al. |
| 8,656,040 B1 | 2/2014 | Bajaj et al. |
| 8,698,845 B2 | 4/2014 | Lemay et al. |
| 8,718,556 B2 | 5/2014 | Lee et al. |
| 8,725,880 B2 | 5/2014 | Santamaria et al. |
| 8,762,844 B2 | 6/2014 | Kim et al. |
| 8,782,513 B2 | 7/2014 | Migos et al. |
| 8,806,369 B2 | 8/2014 | Khoe et al. |
| 8,839,122 B2 | 9/2014 | Anzures et al. |

(56) References Cited

U.S. PATENT DOCUMENTS

| | | |
|---|---|---|
| 8,856,105 B2 | 10/2014 | Gargi |
| 8,914,752 B1 | 12/2014 | Spiegel |
| 8,949,250 B1 | 2/2015 | Garg et al. |
| 9,080,736 B1 | 7/2015 | Salzinger et al. |
| 9,095,779 B2 | 8/2015 | Chan et al. |
| 9,185,062 B1 | 11/2015 | Yang et al. |
| 9,253,531 B2 | 2/2016 | Relyea et al. |
| 9,253,631 B1 | 2/2016 | White et al. |
| 9,380,264 B1 | 6/2016 | Vakalapudi |
| 9,417,781 B2 | 8/2016 | Lee et al. |
| 9,442,516 B2 | 9/2016 | Migos et al. |
| 9,445,048 B1 | 9/2016 | Nariyawala et al. |
| 9,462,017 B1 | 10/2016 | Siracusano, Jr. |
| 9,483,175 B2 | 11/2016 | Wagner |
| 9,552,015 B2 | 1/2017 | Capela et al. |
| 9,635,314 B2 | 4/2017 | Barkley et al. |
| 9,639,252 B2 | 5/2017 | Jin et al. |
| 9,781,540 B2 | 10/2017 | Jagannathan et al. |
| 9,787,938 B2 | 10/2017 | Cranfill et al. |
| 9,800,951 B1 | 10/2017 | Carlson et al. |
| 9,819,877 B1 | 11/2017 | Faulkner et al. |
| 9,830,056 B1 | 11/2017 | Keely et al. |
| 9,992,450 B1 | 6/2018 | Yuan et al. |
| 10,025,496 B2 | 7/2018 | Park et al. |
| 10,157,040 B2 | 12/2018 | Ballinger et al. |
| 10,194,189 B1 | 1/2019 | Goetz et al. |
| 10,198,144 B2 | 2/2019 | Munoz et al. |
| 10,270,983 B1 | 4/2019 | Van Os et al. |
| 10,284,812 B1 | 5/2019 | Van Os et al. |
| 10,300,394 B1 | 5/2019 | Evans et al. |
| 10,339,769 B2 | 7/2019 | Mixter et al. |
| 10,353,532 B1 | 7/2019 | Holz et al. |
| 10,362,272 B1 | 7/2019 | Van Os et al. |
| 10,386,994 B2 | 8/2019 | Singal et al. |
| 10,389,977 B1 | 8/2019 | Van Os et al. |
| 10,410,426 B2 | 9/2019 | Kamini et al. |
| 10,523,625 B1 | 12/2019 | Allen et al. |
| 10,523,976 B2 | 12/2019 | Hemmati et al. |
| 10,534,535 B2 | 1/2020 | Lee et al. |
| 10,645,294 B1 | 5/2020 | Manzari et al. |
| 10,757,366 B1 | 8/2020 | Kwatra et al. |
| 10,771,740 B1 | 9/2020 | Reynolds et al. |
| 10,771,741 B1 | 9/2020 | Reynolds et al. |
| 10,783,883 B2 | 9/2020 | Mixter et al. |
| 10,909,586 B2 | 2/2021 | Avedissian et al. |
| 10,924,446 B1 | 2/2021 | Paul |
| 10,929,099 B2 | 2/2021 | Querze et al. |
| 10,963,145 B1 | 3/2021 | Voss et al. |
| 10,972,655 B1 | 4/2021 | Ostap et al. |
| 11,012,575 B1 | 5/2021 | Leblang et al. |
| 11,024,303 B1 | 6/2021 | Devaraj et al. |
| 11,064,256 B1 | 7/2021 | Voss et al. |
| 11,079,913 B1 | 8/2021 | Kim et al. |
| 11,144,885 B2 | 10/2021 | Rosenberg |
| 11,164,113 B2 | 11/2021 | Howard |
| 11,164,580 B2 | 11/2021 | Kraker |
| 11,176,940 B1 | 11/2021 | Zhong et al. |
| 11,212,449 B1 | 12/2021 | Manzari et al. |
| 11,258,619 B2 | 2/2022 | Libin |
| 11,283,916 B2 | 3/2022 | Coffman et al. |
| 11,290,687 B1 | 3/2022 | Becchetti |
| 11,316,709 B2 | 4/2022 | Brown et al. |
| 11,343,613 B2 | 5/2022 | Gordon et al. |
| 11,360,634 B1 | 6/2022 | Chang et al. |
| 11,449,188 B1 | 9/2022 | Chang et al. |
| 11,523,166 B1 | 12/2022 | Tu et al. |
| 11,621,979 B1 | 4/2023 | Slotznick |
| 11,726,647 B2 | 8/2023 | Kim |
| 11,770,600 B2 | 9/2023 | O'Leary et al. |
| 11,955,025 B2 | 4/2024 | Aoki et al. |
| 12,014,118 B2 | 6/2024 | Gruber et al. |
| 12,085,421 B2 | 9/2024 | Yedid et al. |
| 2001/0030597 A1 | 10/2001 | Inoue et al. |
| 2001/0041007 A1 | 11/2001 | Aoki |
| 2002/0010707 A1 | 1/2002 | Chang et al. |
| 2002/0075334 A1 | 6/2002 | Yfantis |
| 2002/0083101 A1 | 6/2002 | Card et al. |
| 2002/0093531 A1 | 7/2002 | Barile |
| 2002/0101446 A1 | 8/2002 | Tang et al. |
| 2002/0105537 A1 | 8/2002 | Orbanes et al. |
| 2002/0113802 A1 | 8/2002 | Card et al. |
| 2002/0118230 A1 | 8/2002 | Card et al. |
| 2002/0120651 A1 | 8/2002 | Pustejovsky et al. |
| 2003/0013493 A1 | 1/2003 | Irimajiri et al. |
| 2003/0030673 A1 | 2/2003 | Ho |
| 2003/0055977 A1 | 3/2003 | Miller |
| 2003/0076352 A1 | 4/2003 | Uhlig et al. |
| 2003/0098884 A1 | 5/2003 | Christensen |
| 2003/0112938 A1 | 6/2003 | Kanakubo et al. |
| 2003/0158886 A1 | 8/2003 | Walls et al. |
| 2003/0160861 A1 | 8/2003 | Barlow et al. |
| 2003/0184598 A1 | 10/2003 | Graham |
| 2003/0218619 A1 | 11/2003 | Ben-Tovim |
| 2003/0225836 A1 | 12/2003 | Lee et al. |
| 2004/0003040 A1 | 1/2004 | Beavers et al. |
| 2004/0017404 A1 | 1/2004 | Schileru-Key |
| 2004/0048601 A1 | 3/2004 | Lee et al. |
| 2004/0048612 A1 | 3/2004 | Virtanen et al. |
| 2004/0080531 A1 | 4/2004 | Berstis |
| 2004/0102225 A1 | 5/2004 | Furuta et al. |
| 2004/0125081 A1 | 7/2004 | Hayakawa |
| 2004/0141016 A1 | 7/2004 | Fukatsu et al. |
| 2004/0174398 A1 | 9/2004 | Luke et al. |
| 2004/0205514 A1 | 10/2004 | Sommerer et al. |
| 2004/0218035 A1 | 11/2004 | Crook |
| 2004/0239763 A1 | 12/2004 | Notea et al. |
| 2005/0015286 A1 | 1/2005 | Rudnik et al. |
| 2005/0099492 A1 | 5/2005 | Orr |
| 2005/0124365 A1 | 6/2005 | Balasuriya et al. |
| 2005/0132281 A1 | 6/2005 | Pan et al. |
| 2005/0144247 A1 | 6/2005 | Christensen et al. |
| 2005/0177798 A1 | 8/2005 | Thomson et al. |
| 2005/0183035 A1 | 8/2005 | Ringel et al. |
| 2005/0223068 A1 | 10/2005 | Shohfi et al. |
| 2005/0233780 A1 | 10/2005 | Jani et al. |
| 2005/0239512 A1 | 10/2005 | Hasegawa et al. |
| 2005/0289482 A1 | 12/2005 | Anthony et al. |
| 2006/0002315 A1 | 1/2006 | Theurer et al. |
| 2006/0002523 A1 | 1/2006 | Bettis et al. |
| 2006/0031776 A1 | 2/2006 | Glein et al. |
| 2006/0033724 A1 | 2/2006 | Chaudhri et al. |
| 2006/0055789 A1 | 3/2006 | Jin et al. |
| 2006/0056837 A1 | 3/2006 | Vapaakoski |
| 2006/0071947 A1 | 4/2006 | Ubillos et al. |
| 2006/0098085 A1 | 5/2006 | Nichols et al. |
| 2006/0098634 A1 | 5/2006 | Umemoto et al. |
| 2006/0101122 A1 | 5/2006 | Ishii |
| 2006/0107226 A1 | 5/2006 | Matthews et al. |
| 2006/0130463 A1 | 6/2006 | Miura |
| 2006/0149399 A1 | 7/2006 | Norhammar et al. |
| 2006/0150215 A1 | 7/2006 | Wroblewski et al. |
| 2006/0158730 A1 | 7/2006 | Kira |
| 2006/0184894 A1 | 8/2006 | Daniels et al. |
| 2006/0185005 A1 | 8/2006 | Graves et al. |
| 2006/0230346 A1 | 10/2006 | Bhogal et al. |
| 2006/0256188 A1 | 11/2006 | Mock et al. |
| 2007/0004389 A1 | 1/2007 | Wallace et al. |
| 2007/0004451 A1 | 1/2007 | C. Anderson |
| 2007/0015519 A1 | 1/2007 | Casey |
| 2007/0040898 A1 | 2/2007 | Lee et al. |
| 2007/0064112 A1 | 3/2007 | Chatting et al. |
| 2007/0083828 A1 | 4/2007 | Toriyama et al. |
| 2007/0115349 A1* | 5/2007 | Currivan ............... H04N 7/141 |
| | | 348/E7.078 |
| 2007/0115933 A1 | 5/2007 | Muhamed et al. |
| 2007/0124783 A1 | 5/2007 | Ahiska et al. |
| 2007/0160345 A1 | 7/2007 | Sakai et al. |
| 2007/0174761 A1 | 7/2007 | Lin et al. |
| 2007/0177025 A1 | 8/2007 | Kopet et al. |
| 2007/0177804 A1 | 8/2007 | Elias et al. |
| 2007/0211141 A1 | 9/2007 | Christiansen |
| 2007/0226327 A1 | 9/2007 | Redpath |
| 2007/0233736 A1 | 10/2007 | Xiong et al. |
| 2007/0236476 A1 | 10/2007 | Suzuki |

(56) References Cited

U.S. PATENT DOCUMENTS

| | | |
|---|---|---|
| 2007/0239831 A1 | 10/2007 | Basu |
| 2007/0245249 A1 | 10/2007 | Weisberg et al. |
| 2007/0264977 A1 | 11/2007 | Zinn et al. |
| 2007/0277121 A1 | 11/2007 | Beckman |
| 2007/0279482 A1 | 12/2007 | Oswald et al. |
| 2007/0291736 A1 | 12/2007 | Furlong et al. |
| 2008/0032704 A1 | 2/2008 | Oneil et al. |
| 2008/0034098 A1 | 2/2008 | Shima |
| 2008/0034307 A1 | 2/2008 | Cisler et al. |
| 2008/0036849 A1 | 2/2008 | Oh et al. |
| 2008/0063389 A1 | 3/2008 | Fang et al. |
| 2008/0068447 A1 | 3/2008 | Mattila et al. |
| 2008/0074049 A1 | 3/2008 | Kitai et al. |
| 2008/0074550 A1 | 3/2008 | Park |
| 2008/0084482 A1 | 4/2008 | Hansson et al. |
| 2008/0094368 A1 | 4/2008 | Ording et al. |
| 2008/0094370 A1 | 4/2008 | Ording et al. |
| 2008/0117876 A1 | 5/2008 | Hidaka et al. |
| 2008/0122796 A1 | 5/2008 | Jobs et al. |
| 2008/0129816 A1 | 6/2008 | Mattila et al. |
| 2008/0129844 A1 | 6/2008 | Cusack et al. |
| 2008/0134033 A1 | 6/2008 | Burns et al. |
| 2008/0141182 A1 | 6/2008 | Barsness et al. |
| 2008/0160974 A1 | 7/2008 | Vartiainen et al. |
| 2008/0165144 A1 | 7/2008 | Forstall et al. |
| 2008/0165388 A1 | 7/2008 | Serlet |
| 2008/0168073 A1 | 7/2008 | Siegel et al. |
| 2008/0174570 A1 | 7/2008 | Jobs et al. |
| 2008/0218535 A1 | 9/2008 | Forstall et al. |
| 2008/0246778 A1 | 10/2008 | Ham et al. |
| 2008/0282202 A1 | 11/2008 | Sunday |
| 2008/0307345 A1 | 12/2008 | Hart et al. |
| 2008/0313257 A1 | 12/2008 | Allen et al. |
| 2008/0313278 A1 | 12/2008 | Hochberg |
| 2008/0316295 A1 | 12/2008 | King et al. |
| 2008/0319856 A1 | 12/2008 | Zito et al. |
| 2008/0319944 A1 | 12/2008 | Venolia et al. |
| 2009/0005011 A1 | 1/2009 | Christie et al. |
| 2009/0007017 A1 | 1/2009 | Anzures et al. |
| 2009/0046075 A1* | 2/2009 | Kim .................. H04M 1/72403 345/173 |
| 2009/0049446 A1 | 2/2009 | Merten et al. |
| 2009/0089712 A1 | 4/2009 | Sato |
| 2009/0100383 A1 | 4/2009 | Sunday et al. |
| 2009/0103780 A1 | 4/2009 | Nishihara et al. |
| 2009/0106687 A1 | 4/2009 | De et al. |
| 2009/0109276 A1 | 4/2009 | Kim |
| 2009/0113347 A1 | 4/2009 | Hess et al. |
| 2009/0117936 A1 | 5/2009 | Maeng |
| 2009/0140960 A1 | 6/2009 | Mahowald et al. |
| 2009/0158217 A1 | 6/2009 | Stuart |
| 2009/0164322 A1 | 6/2009 | Khan et al. |
| 2009/0164587 A1 | 6/2009 | Gavita et al. |
| 2009/0174763 A1 | 7/2009 | Bengtsson et al. |
| 2009/0179867 A1 | 7/2009 | Shim et al. |
| 2009/0187825 A1 | 7/2009 | Sandquist et al. |
| 2009/0213086 A1 | 8/2009 | Chae et al. |
| 2009/0228126 A1 | 9/2009 | Spielberg et al. |
| 2009/0228820 A1 | 9/2009 | Kim et al. |
| 2009/0228825 A1 | 9/2009 | Van Os et al. |
| 2009/0228938 A1 | 9/2009 | White et al. |
| 2009/0232129 A1 | 9/2009 | Wong et al. |
| 2009/0235155 A1 | 9/2009 | Ueda |
| 2009/0235162 A1 | 9/2009 | Nuccio et al. |
| 2009/0241054 A1 | 9/2009 | Hendricks |
| 2009/0249244 A1 | 10/2009 | Robinson et al. |
| 2009/0254867 A1 | 10/2009 | Farouki et al. |
| 2009/0256780 A1 | 10/2009 | Small et al. |
| 2009/0259939 A1 | 10/2009 | Lockett et al. |
| 2009/0262200 A1 | 10/2009 | Takabatake et al. |
| 2009/0262206 A1 | 10/2009 | Park |
| 2009/0271381 A1 | 10/2009 | Beezer et al. |
| 2009/0287790 A1 | 11/2009 | Upton et al. |
| 2009/0305679 A1 | 12/2009 | Kim |
| 2009/0309897 A1 | 12/2009 | Morita et al. |
| 2009/0315841 A1 | 12/2009 | Cheng et al. |
| 2009/0319888 A1 | 12/2009 | Oygard |
| 2010/0009719 A1 | 1/2010 | Oh et al. |
| 2010/0011065 A1 | 1/2010 | Scherpa et al. |
| 2010/0023878 A1 | 1/2010 | Douris et al. |
| 2010/0023883 A1 | 1/2010 | Khazaka et al. |
| 2010/0029255 A1 | 2/2010 | Kim et al. |
| 2010/0039498 A1 | 2/2010 | Liu et al. |
| 2010/0040292 A1 | 2/2010 | Clarkson |
| 2010/0044121 A1 | 2/2010 | Simon et al. |
| 2010/0045616 A1 | 2/2010 | Li et al. |
| 2010/0053212 A1 | 3/2010 | Kang et al. |
| 2010/0066763 A1 | 3/2010 | Macdougall et al. |
| 2010/0073454 A1 | 3/2010 | Lovhaugen et al. |
| 2010/0073455 A1 | 3/2010 | Iwabuchi et al. |
| 2010/0085416 A1 | 4/2010 | Hegde et al. |
| 2010/0087230 A1 | 4/2010 | Peh et al. |
| 2010/0095240 A1 | 4/2010 | Shiplacoff et al. |
| 2010/0097438 A1 | 4/2010 | Ujii |
| 2010/0107078 A1 | 4/2010 | Hayashi |
| 2010/0109864 A1 | 5/2010 | Haartsen et al. |
| 2010/0115388 A1 | 5/2010 | Nguyen |
| 2010/0121636 A1 | 5/2010 | Burke et al. |
| 2010/0125807 A1 | 5/2010 | Easterday et al. |
| 2010/0125816 A1 | 5/2010 | Bezos |
| 2010/0159995 A1 | 6/2010 | Stallings et al. |
| 2010/0162108 A1 | 6/2010 | Stallings et al. |
| 2010/0162171 A1 | 6/2010 | Felt et al. |
| 2010/0169435 A1 | 7/2010 | Osullivan et al. |
| 2010/0174606 A1 | 7/2010 | Hoyle |
| 2010/0175018 A1 | 7/2010 | Petschnigg et al. |
| 2010/0177156 A1 | 7/2010 | Kim et al. |
| 2010/0185989 A1 | 7/2010 | Shiplacoff et al. |
| 2010/0189096 A1 | 7/2010 | Flynn et al. |
| 2010/0205563 A1 | 8/2010 | Haapsaari et al. |
| 2010/0211872 A1 | 8/2010 | Rolston et al. |
| 2010/0241699 A1 | 9/2010 | Muthukumarasamy et al. |
| 2010/0242066 A1 | 9/2010 | Tseng et al. |
| 2010/0246571 A1 | 9/2010 | Geppert et al. |
| 2010/0247077 A1 | 9/2010 | Yamamoto et al. |
| 2010/0251119 A1 | 9/2010 | Geppert et al. |
| 2010/0251158 A1 | 9/2010 | Geppert et al. |
| 2010/0262714 A1 | 10/2010 | Hiie |
| 2010/0269039 A1 | 10/2010 | Pahlavan et al. |
| 2010/0269069 A1 | 10/2010 | Paila et al. |
| 2010/0281399 A1 | 11/2010 | Banker |
| 2010/0295789 A1 | 11/2010 | Shin et al. |
| 2010/0309284 A1 | 12/2010 | Samadani et al. |
| 2010/0311336 A1 | 12/2010 | Huotari et al. |
| 2010/0318928 A1 | 12/2010 | Neuman et al. |
| 2010/0318939 A1 | 12/2010 | Moon |
| 2010/0333045 A1 | 12/2010 | Guéziec et al. |
| 2011/0007029 A1 | 1/2011 | Ben-David |
| 2011/0010667 A1 | 1/2011 | Sakai et al. |
| 2011/0016417 A1 | 1/2011 | Shiplacoff et al. |
| 2011/0029864 A1 | 2/2011 | Stewart et al. |
| 2011/0029891 A1 | 2/2011 | Kim et al. |
| 2011/0030324 A1 | 2/2011 | Higgins |
| 2011/0032324 A1 | 2/2011 | George et al. |
| 2011/0035662 A1 | 2/2011 | King et al. |
| 2011/0041056 A1 | 2/2011 | Griffin et al. |
| 2011/0041096 A1 | 2/2011 | Larco et al. |
| 2011/0041102 A1 | 2/2011 | Kim |
| 2011/0043652 A1 | 2/2011 | King et al. |
| 2011/0065384 A1 | 3/2011 | Cader et al. |
| 2011/0074824 A1 | 3/2011 | Srinivasan et al. |
| 2011/0085017 A1 | 4/2011 | Robinson et al. |
| 2011/0087431 A1 | 4/2011 | Gupta et al. |
| 2011/0087955 A1 | 4/2011 | Ho et al. |
| 2011/0088086 A1 | 4/2011 | Swink et al. |
| 2011/0091182 A1 | 4/2011 | Look et al. |
| 2011/0096174 A1 | 4/2011 | King et al. |
| 2011/0107216 A1 | 5/2011 | Bi |
| 2011/0107241 A1 | 5/2011 | Moore |
| 2011/0115875 A1 | 5/2011 | Sadwick et al. |
| 2011/0115876 A1 | 5/2011 | Khot et al. |
| 2011/0117898 A1 | 5/2011 | Pereira et al. |
| 2011/0126148 A1 | 5/2011 | Krishnaraj et al. |
| 2011/0138295 A1 | 6/2011 | Momchilov et al. |

(56) References Cited

U.S. PATENT DOCUMENTS

| | | |
|---|---|---|
| 2011/0145068 A1 | 6/2011 | King et al. |
| 2011/0145691 A1 | 6/2011 | Noyes |
| 2011/0145692 A1 | 6/2011 | Noyes et al. |
| 2011/0161836 A1 | 6/2011 | Mu et al. |
| 2011/0164032 A1 | 7/2011 | Shadmi |
| 2011/0164042 A1 | 7/2011 | Chaudhri |
| 2011/0164058 A1 | 7/2011 | Lemay |
| 2011/0167058 A1 | 7/2011 | Van Os |
| 2011/0167339 A1 | 7/2011 | Lemay |
| 2011/0167382 A1 | 7/2011 | Van Os |
| 2011/0178811 A1 | 7/2011 | Sheridan |
| 2011/0179386 A1 | 7/2011 | Shaffer et al. |
| 2011/0191710 A1 | 8/2011 | Jang et al. |
| 2011/0193995 A1 | 8/2011 | Goh et al. |
| 2011/0205333 A1 | 8/2011 | Wu et al. |
| 2011/0209099 A1 | 8/2011 | Hinckley et al. |
| 2011/0209104 A1 | 8/2011 | Hinckley et al. |
| 2011/0227810 A1 | 9/2011 | Mckinney et al. |
| 2011/0234746 A1 | 9/2011 | Saleh et al. |
| 2011/0235549 A1 | 9/2011 | Ahlers et al. |
| 2011/0242356 A1 | 10/2011 | Aleksic et al. |
| 2011/0246944 A1 | 10/2011 | Byrne et al. |
| 2011/0249073 A1 | 10/2011 | Cranfill et al. |
| 2011/0249074 A1 | 10/2011 | Cranfill et al. |
| 2011/0249086 A1 | 10/2011 | Guo et al. |
| 2011/0252062 A1 | 10/2011 | Hanatani et al. |
| 2011/0252146 A1 | 10/2011 | Santamaria et al. |
| 2011/0252364 A1 | 10/2011 | Anzures et al. |
| 2011/0252368 A1 | 10/2011 | Anzures et al. |
| 2011/0252376 A1 | 10/2011 | Chaudhri et al. |
| 2011/0252377 A1 | 10/2011 | Anzures et al. |
| 2011/0252381 A1 | 10/2011 | Chaudhri |
| 2011/0261030 A1 | 10/2011 | Bullock |
| 2011/0273526 A1 | 11/2011 | Mehin et al. |
| 2011/0275358 A1 | 11/2011 | Faenger |
| 2011/0281568 A1 | 11/2011 | Le |
| 2011/0291945 A1 | 12/2011 | Ewing et al. |
| 2011/0295879 A1 | 12/2011 | Logis et al. |
| 2011/0296163 A1 | 12/2011 | Abernethy et al. |
| 2011/0296333 A1 | 12/2011 | Bateman et al. |
| 2011/0296344 A1 | 12/2011 | Habib et al. |
| 2011/0296351 A1 | 12/2011 | Ewing et al. |
| 2011/0314398 A1 | 12/2011 | Yano et al. |
| 2012/0002001 A1 | 1/2012 | Prentice |
| 2012/0019610 A1 | 1/2012 | Hornyak et al. |
| 2012/0023438 A1 | 1/2012 | Xia et al. |
| 2012/0023462 A1 | 1/2012 | Rosing et al. |
| 2012/0033028 A1 | 2/2012 | Murphy et al. |
| 2012/0054278 A1 | 3/2012 | Taleb et al. |
| 2012/0062784 A1 | 3/2012 | Van et al. |
| 2012/0084644 A1 | 4/2012 | Robert et al. |
| 2012/0092436 A1 | 4/2012 | Pahud et al. |
| 2012/0096069 A1 | 4/2012 | Chan |
| 2012/0096076 A1 | 4/2012 | Chan et al. |
| 2012/0096344 A1 | 4/2012 | Ho et al. |
| 2012/0096386 A1 | 4/2012 | Baumann et al. |
| 2012/0102387 A1 | 4/2012 | Badoiu et al. |
| 2012/0105225 A1 | 5/2012 | Valtonen |
| 2012/0114108 A1 | 5/2012 | Katis et al. |
| 2012/0121185 A1 | 5/2012 | Zavesky |
| 2012/0129496 A1 | 5/2012 | Park et al. |
| 2012/0131470 A1 | 5/2012 | Wessling et al. |
| 2012/0136998 A1 | 5/2012 | Hough et al. |
| 2012/0143694 A1 | 6/2012 | Zargahi et al. |
| 2012/0159364 A1 | 6/2012 | Hyun |
| 2012/0159373 A1 | 6/2012 | Archer et al. |
| 2012/0159380 A1 | 6/2012 | Kocienda et al. |
| 2012/0166950 A1 | 6/2012 | Frumar et al. |
| 2012/0173383 A1 | 7/2012 | Badawiyeh et al. |
| 2012/0179970 A1 | 7/2012 | Hayes |
| 2012/0182381 A1 | 7/2012 | Abate et al. |
| 2012/0185355 A1 | 7/2012 | Kilroy |
| 2012/0185467 A1 | 7/2012 | Prager et al. |
| 2012/0188394 A1 | 7/2012 | Park et al. |
| 2012/0192068 A1 | 7/2012 | Migos et al. |
| 2012/0192102 A1 | 7/2012 | Migos et al. |
| 2012/0192118 A1 | 7/2012 | Migos et al. |
| 2012/0201479 A1 | 8/2012 | Zhang et al. |
| 2012/0214552 A1 | 8/2012 | Sirpal et al. |
| 2012/0216139 A1 | 8/2012 | Ording et al. |
| 2012/0218304 A1 | 8/2012 | Anzures et al. |
| 2012/0223890 A1 | 9/2012 | Borovsky et al. |
| 2012/0229591 A1 | 9/2012 | Lee |
| 2012/0240085 A1 | 9/2012 | Sim et al. |
| 2012/0266098 A1 | 10/2012 | Webber |
| 2012/0274550 A1 | 11/2012 | Campbell et al. |
| 2012/0284256 A1 | 11/2012 | Mahajan et al. |
| 2012/0284673 A1 | 11/2012 | Lamb et al. |
| 2012/0289217 A1 | 11/2012 | Riemer et al. |
| 2012/0290657 A1 | 11/2012 | Parks et al. |
| 2012/0290943 A1 | 11/2012 | Toney et al. |
| 2012/0293605 A1 | 11/2012 | Seferian et al. |
| 2012/0296972 A1 | 11/2012 | Backer |
| 2012/0304079 A1 | 11/2012 | Rideout et al. |
| 2012/0304111 A1 | 11/2012 | Queru et al. |
| 2012/0320141 A1 | 12/2012 | Bowen et al. |
| 2013/0005487 A1 | 1/2013 | Frazzini et al. |
| 2013/0014040 A1 | 1/2013 | Jagannathan et al. |
| 2013/0019182 A1 | 1/2013 | Gil et al. |
| 2013/0041790 A1 | 2/2013 | Murugesan et al. |
| 2013/0046893 A1 | 2/2013 | Hauser et al. |
| 2013/0050263 A1 | 2/2013 | Khoe et al. |
| 2013/0054697 A1 | 2/2013 | Cha et al. |
| 2013/0055113 A1 | 2/2013 | Chazin et al. |
| 2013/0061155 A1 | 3/2013 | Hon |
| 2013/0061175 A1 | 3/2013 | Matas et al. |
| 2013/0070046 A1 | 3/2013 | Wolf et al. |
| 2013/0080525 A1 | 3/2013 | Aoki et al. |
| 2013/0080923 A1 | 3/2013 | Anzures et al. |
| 2013/0088413 A1 | 4/2013 | Raffle et al. |
| 2013/0102281 A1 | 4/2013 | Kanda et al. |
| 2013/0111342 A1 | 5/2013 | Alameh et al. |
| 2013/0111603 A1 | 5/2013 | Sakai et al. |
| 2013/0120254 A1 | 5/2013 | Mun et al. |
| 2013/0122961 A1 | 5/2013 | Choi et al. |
| 2013/0124207 A1 | 5/2013 | Sarin et al. |
| 2013/0132865 A1 | 5/2013 | Li |
| 2013/0145303 A1 | 6/2013 | Prakash et al. |
| 2013/0151623 A1 | 6/2013 | Weiser et al. |
| 2013/0151959 A1 | 6/2013 | Flynn et al. |
| 2013/0162781 A1 | 6/2013 | Hubner et al. |
| 2013/0166580 A1 | 6/2013 | Maharajh et al. |
| 2013/0169742 A1 | 7/2013 | Wu et al. |
| 2013/0173699 A1 | 7/2013 | Parks et al. |
| 2013/0185642 A1 | 7/2013 | Gammons |
| 2013/0187753 A1 | 7/2013 | Chiriyankandath |
| 2013/0191911 A1 | 7/2013 | Dellinger et al. |
| 2013/0212212 A1 | 8/2013 | Addepalli et al. |
| 2013/0216206 A1 | 8/2013 | Dubin et al. |
| 2013/0219276 A1 | 8/2013 | Shan |
| 2013/0225140 A1 | 8/2013 | Greisson |
| 2013/0282180 A1 | 10/2013 | Layton |
| 2013/0283199 A1 | 10/2013 | Selig et al. |
| 2013/0283283 A1 | 10/2013 | Wang et al. |
| 2013/0293777 A1 | 11/2013 | Huber et al. |
| 2013/0298024 A1 | 11/2013 | Rhee et al. |
| 2013/0318158 A1 | 11/2013 | Teng et al. |
| 2013/0318249 A1 | 11/2013 | Mcdonough et al. |
| 2013/0321340 A1 | 12/2013 | Seo et al. |
| 2013/0325949 A1 | 12/2013 | Virani et al. |
| 2013/0325967 A1 | 12/2013 | Parks et al. |
| 2013/0328770 A1 | 12/2013 | Parham |
| 2013/0332856 A1 | 12/2013 | Sanders et al. |
| 2013/0332886 A1 | 12/2013 | Cranfill et al. |
| 2014/0013271 A1 | 1/2014 | Moore et al. |
| 2014/0018053 A1 | 1/2014 | Cho et al. |
| 2014/0024340 A1 | 1/2014 | Raleigh |
| 2014/0026074 A1 | 1/2014 | Cortes et al. |
| 2014/0032706 A1 | 1/2014 | Kuscher et al. |
| 2014/0043424 A1 | 2/2014 | Gava et al. |
| 2014/0047020 A1 | 2/2014 | Matus et al. |
| 2014/0047382 A1 | 2/2014 | Kim et al. |
| 2014/0058941 A1 | 2/2014 | Moon et al. |
| 2014/0063176 A1 | 3/2014 | Modai et al. |

(56) References Cited

U.S. PATENT DOCUMENTS

| | | |
|---|---|---|
| 2014/0068477 A1 | 3/2014 | Roh |
| 2014/0082136 A1 | 3/2014 | Garcia Puga et al. |
| 2014/0099004 A1 | 4/2014 | Dibona et al. |
| 2014/0101597 A1 | 4/2014 | Bamford et al. |
| 2014/0105372 A1 | 4/2014 | Nowack et al. |
| 2014/0108084 A1 | 4/2014 | Bargetzi et al. |
| 2014/0108568 A1 | 4/2014 | Lee |
| 2014/0119531 A1 | 5/2014 | Tuchman et al. |
| 2014/0122730 A1 | 5/2014 | Burch et al. |
| 2014/0136481 A1 | 5/2014 | Quan et al. |
| 2014/0149884 A1 | 5/2014 | Flynn et al. |
| 2014/0165012 A1 | 6/2014 | Shen et al. |
| 2014/0168696 A1 | 6/2014 | Matsuhara et al. |
| 2014/0171064 A1 | 6/2014 | Das |
| 2014/0173447 A1 | 6/2014 | Das et al. |
| 2014/0201126 A1 | 7/2014 | Zadeh et al. |
| 2014/0201632 A1 | 7/2014 | Kunigita et al. |
| 2014/0215356 A1 | 7/2014 | Brander et al. |
| 2014/0215404 A1 | 7/2014 | Kong et al. |
| 2014/0218371 A1 | 8/2014 | Du et al. |
| 2014/0218461 A1 | 8/2014 | Deland |
| 2014/0229835 A1 | 8/2014 | Ravine |
| 2014/0247368 A1 | 9/2014 | Chinn |
| 2014/0280812 A1 | 9/2014 | Bealkowski et al. |
| 2014/0282103 A1 | 9/2014 | Jerry |
| 2014/0282110 A1 | 9/2014 | Chaudhri |
| 2014/0282208 A1 | 9/2014 | Chaudhri |
| 2014/0282240 A1 | 9/2014 | Flynn et al. |
| 2014/0298253 A1 | 10/2014 | Jin et al. |
| 2014/0317532 A1 | 10/2014 | Ma et al. |
| 2014/0320387 A1 | 10/2014 | Eriksson et al. |
| 2014/0320425 A1 | 10/2014 | Jeong et al. |
| 2014/0325447 A1 | 10/2014 | Jin et al. |
| 2014/0331149 A1 | 11/2014 | Labey |
| 2014/0337791 A1 | 11/2014 | Agnetta et al. |
| 2014/0340332 A1 | 11/2014 | Lemay et al. |
| 2014/0349754 A1 | 11/2014 | Kaneoka et al. |
| 2014/0351722 A1 | 11/2014 | Frederickson et al. |
| 2014/0354759 A1 | 12/2014 | Cranfill et al. |
| 2014/0359637 A1 | 12/2014 | Yan |
| 2014/0365929 A1 | 12/2014 | Ding |
| 2014/0368547 A1 | 12/2014 | Elings |
| 2014/0368600 A1 | 12/2014 | Do et al. |
| 2014/0368719 A1 | 12/2014 | Kaneko et al. |
| 2014/0373081 A1 | 12/2014 | Dodson et al. |
| 2014/0375577 A1 | 12/2014 | Yeh et al. |
| 2014/0375747 A1 | 12/2014 | Martinez et al. |
| 2014/0380187 A1 | 12/2014 | Gardenfors et al. |
| 2015/0033149 A1 | 1/2015 | Kuchoor |
| 2015/0040012 A1 | 2/2015 | Faaborg et al. |
| 2015/0049591 A1 | 2/2015 | Adams et al. |
| 2015/0058413 A1 | 2/2015 | Ge |
| 2015/0062158 A1 | 3/2015 | Hildreth et al. |
| 2015/0067541 A1 | 3/2015 | Owens et al. |
| 2015/0070272 A1 | 3/2015 | Kim et al. |
| 2015/0078680 A1 | 3/2015 | Shakib et al. |
| 2015/0085057 A1 | 3/2015 | Ouyang et al. |
| 2015/0095804 A1 | 4/2015 | Grossman et al. |
| 2015/0098309 A1 | 4/2015 | Adams et al. |
| 2015/0106720 A1 | 4/2015 | Backer |
| 2015/0116353 A1 | 4/2015 | Miura et al. |
| 2015/0116363 A1 | 4/2015 | Monte et al. |
| 2015/0128042 A1 | 5/2015 | Churchill et al. |
| 2015/0130892 A1 | 5/2015 | Whynot et al. |
| 2015/0135098 A1 | 5/2015 | Geppert et al. |
| 2015/0163188 A1 | 6/2015 | Faaborg et al. |
| 2015/0169146 A1 | 6/2015 | Lalwani |
| 2015/0169182 A1 | 6/2015 | Khoe et al. |
| 2015/0172552 A1 | 6/2015 | Kim |
| 2015/0177914 A1 | 6/2015 | Coyner et al. |
| 2015/0193069 A1 | 7/2015 | Di Censo et al. |
| 2015/0193196 A1 | 7/2015 | Lin et al. |
| 2015/0193392 A1 | 7/2015 | Greenblatt et al. |
| 2015/0199082 A1 | 7/2015 | Scholler et al. |
| 2015/0205488 A1 | 7/2015 | et al. |
| 2015/0206529 A1 | 7/2015 | Kwon et al. |
| 2015/0248167 A1 | 9/2015 | Turbell et al. |
| 2015/0256796 A1 | 9/2015 | Ma |
| 2015/0264304 A1 | 9/2015 | Chastney et al. |
| 2015/0288868 A1 | 10/2015 | Slavin et al. |
| 2015/0296077 A1 | 10/2015 | Wakeyama et al. |
| 2015/0301338 A1 | 10/2015 | Van Heugten |
| 2015/0304366 A1 | 10/2015 | Bader-Natal et al. |
| 2015/0304413 A1 | 10/2015 | Park |
| 2015/0309689 A1 | 10/2015 | Jin et al. |
| 2015/0319006 A1 | 11/2015 | Plummer et al. |
| 2015/0319144 A1 | 11/2015 | Barton et al. |
| 2015/0324067 A1 | 11/2015 | Cabral |
| 2015/0332031 A1 | 11/2015 | Mistry et al. |
| 2015/0334140 A1 | 11/2015 | Singh et al. |
| 2015/0334313 A1 | 11/2015 | Chougle et al. |
| 2015/0339007 A1 | 11/2015 | Yoshizawa et al. |
| 2015/0339466 A1 | 11/2015 | Gao et al. |
| 2015/0347010 A1 | 12/2015 | Yang et al. |
| 2015/0350143 A1 | 12/2015 | Lemay et al. |
| 2015/0350296 A1 | 12/2015 | Yang et al. |
| 2015/0350297 A1 | 12/2015 | Yang et al. |
| 2015/0350533 A1 | 12/2015 | Harris et al. |
| 2015/0358484 A1 | 12/2015 | Permude |
| 2015/0358584 A1 | 12/2015 | Mattson |
| 2015/0365306 A1 | 12/2015 | Chaudhri et al. |
| 2015/0370426 A1 | 12/2015 | Carrigan et al. |
| 2015/0370529 A1 | 12/2015 | Zambetti et al. |
| 2015/0373065 A1 | 12/2015 | Holmquist et al. |
| 2015/0373178 A1 | 12/2015 | Felt et al. |
| 2016/0014059 A1 | 1/2016 | Rathod |
| 2016/0014477 A1 | 1/2016 | Siders |
| 2016/0021155 A1 | 1/2016 | Sawato |
| 2016/0029004 A1 | 1/2016 | Campbell et al. |
| 2016/0048296 A1 | 2/2016 | Gan et al. |
| 2016/0057173 A1 | 2/2016 | Singman et al. |
| 2016/0059864 A1 | 3/2016 | Feit et al. |
| 2016/0062567 A1 | 3/2016 | Yang et al. |
| 2016/0062589 A1 | 3/2016 | Wan et al. |
| 2016/0065708 A1 | 3/2016 | Yang et al. |
| 2016/0065832 A1 | 3/2016 | Kim et al. |
| 2016/0072861 A1 | 3/2016 | Woolsey et al. |
| 2016/0073185 A1 | 3/2016 | Kannappan et al. |
| 2016/0099901 A1 | 4/2016 | Allen et al. |
| 2016/0099987 A1 | 4/2016 | Shamma |
| 2016/0127636 A1 | 5/2016 | Ito et al. |
| 2016/0139785 A1 | 5/2016 | Griffin et al. |
| 2016/0142450 A1 | 5/2016 | Paul et al. |
| 2016/0170608 A1 | 6/2016 | Zambetti et al. |
| 2016/0180259 A1 | 6/2016 | Marianko et al. |
| 2016/0210602 A1 | 7/2016 | Siddique et al. |
| 2016/0212374 A1 | 7/2016 | Usbergo et al. |
| 2016/0227095 A1 | 8/2016 | Yoshizawa et al. |
| 2016/0231902 A1 | 8/2016 | Sirpal et al. |
| 2016/0259528 A1 | 9/2016 | Foss et al. |
| 2016/0261653 A1 | 9/2016 | Kim |
| 2016/0277708 A1 | 9/2016 | Rintel et al. |
| 2016/0277903 A1 | 9/2016 | Poosala et al. |
| 2016/0291824 A1 | 10/2016 | Grossman et al. |
| 2016/0299679 A1 | 10/2016 | Park et al. |
| 2016/0306328 A1 | 10/2016 | Ko et al. |
| 2016/0306422 A1 | 10/2016 | Parham et al. |
| 2016/0306504 A1 | 10/2016 | Brunsch et al. |
| 2016/0308920 A1 | 10/2016 | Brunsch et al. |
| 2016/0316038 A1 | 10/2016 | Jolfaei |
| 2016/0320849 A1 | 11/2016 | Koo |
| 2016/0327911 A1 | 11/2016 | Eim et al. |
| 2016/0335041 A1 | 11/2016 | Wachter et al. |
| 2016/0352661 A1 | 12/2016 | Yang et al. |
| 2016/0364106 A1 | 12/2016 | Koum et al. |
| 2016/0380780 A1 | 12/2016 | Stephenson et al. |
| 2017/0006162 A1 | 1/2017 | Bargetzi et al. |
| 2017/0024100 A1 | 1/2017 | Pieper et al. |
| 2017/0024226 A1 | 1/2017 | Yan |
| 2017/0031557 A1 | 2/2017 | Xiangli et al. |
| 2017/0034583 A1 | 2/2017 | Long et al. |
| 2017/0048817 A1 | 2/2017 | Yang et al. |
| 2017/0064184 A1 | 3/2017 | Tsai |
| 2017/0083189 A1 | 3/2017 | Yang et al. |

(56) References Cited

U.S. PATENT DOCUMENTS

| | | |
|---|---|---|
| 2017/0094019 A1 | 3/2017 | Ahmed et al. |
| 2017/0097621 A1 | 4/2017 | Ackmann et al. |
| 2017/0111587 A1 | 4/2017 | Herbst et al. |
| 2017/0111595 A1 | 4/2017 | Soni et al. |
| 2017/0126592 A1 | 5/2017 | El |
| 2017/0150904 A1 | 6/2017 | Park et al. |
| 2017/0206779 A1 | 7/2017 | Lee et al. |
| 2017/0212667 A1 | 7/2017 | Miyazaki |
| 2017/0220212 A1 | 8/2017 | Yang et al. |
| 2017/0230585 A1 | 8/2017 | Nash et al. |
| 2017/0230705 A1 | 8/2017 | Pardue et al. |
| 2017/0244932 A1 | 8/2017 | Pistilli et al. |
| 2017/0280098 A1 | 9/2017 | Sethuraman et al. |
| 2017/0280494 A1 | 9/2017 | Jung et al. |
| 2017/0309174 A1 | 10/2017 | Gonzales et al. |
| 2017/0324784 A1 | 11/2017 | Taine et al. |
| 2017/0336960 A1 | 11/2017 | Chaudhri et al. |
| 2017/0344253 A1 | 11/2017 | Zhang |
| 2017/0353508 A1 | 12/2017 | Yoakum |
| 2017/0357382 A1 | 12/2017 | Miura et al. |
| 2017/0357425 A1 | 12/2017 | Smith et al. |
| 2017/0357434 A1 | 12/2017 | Coffman et al. |
| 2017/0357917 A1 | 12/2017 | Holmes et al. |
| 2017/0359191 A1 | 12/2017 | Smith et al. |
| 2017/0359285 A1 | 12/2017 | Weinig et al. |
| 2017/0359461 A1 | 12/2017 | De Vries et al. |
| 2017/0367484 A1 | 12/2017 | Salvoni et al. |
| 2017/0371496 A1 | 12/2017 | Denoue et al. |
| 2017/0373868 A1 | 12/2017 | Deets, Jr. |
| 2018/0013799 A1 | 1/2018 | Davies |
| 2018/0020530 A1 | 1/2018 | Scordato et al. |
| 2018/0047200 A1 | 2/2018 | O'Hara et al. |
| 2018/0048820 A1 | 2/2018 | Hinkel et al. |
| 2018/0061158 A1 | 3/2018 | Greene |
| 2018/0070144 A1 | 3/2018 | Tang et al. |
| 2018/0081522 A1 | 3/2018 | Greenberg et al. |
| 2018/0081538 A1 | 3/2018 | Kim |
| 2018/0091732 A1 | 3/2018 | Wilson et al. |
| 2018/0095616 A1 | 4/2018 | Valdivia et al. |
| 2018/0101297 A1 | 4/2018 | Yang et al. |
| 2018/0103074 A1 | 4/2018 | Rosenberg |
| 2018/0121074 A1 | 5/2018 | Peron et al. |
| 2018/0122378 A1 | 5/2018 | Mixter et al. |
| 2018/0123986 A1 | 5/2018 | Faulkner et al. |
| 2018/0124128 A1 | 5/2018 | Faulkner et al. |
| 2018/0124359 A1 | 5/2018 | Faulkner |
| 2018/0131732 A1 | 5/2018 | Aronoff et al. |
| 2018/0131907 A1 | 5/2018 | Schmirler et al. |
| 2018/0139374 A1 | 5/2018 | Yu |
| 2018/0150433 A1 | 5/2018 | Sowden et al. |
| 2018/0157455 A1 | 6/2018 | Troy et al. |
| 2018/0160072 A1 | 6/2018 | Cranfill et al. |
| 2018/0191965 A1 | 7/2018 | Faulkner et al. |
| 2018/0199164 A1 | 7/2018 | Bargetzi et al. |
| 2018/0203577 A1 | 7/2018 | Astavans et al. |
| 2018/0204111 A1 | 7/2018 | Zadeh et al. |
| 2018/0205797 A1 | 7/2018 | Faulkner |
| 2018/0213144 A1 | 7/2018 | Kim et al. |
| 2018/0213396 A1 | 7/2018 | Segal et al. |
| 2018/0227341 A1 | 8/2018 | Rizzi |
| 2018/0228003 A1 | 8/2018 | O'Driscoll et al. |
| 2018/0228006 A1 | 8/2018 | Baker et al. |
| 2018/0249047 A1 | 8/2018 | Marlatt |
| 2018/0253152 A1 | 9/2018 | Forsblom et al. |
| 2018/0267774 A1 | 9/2018 | Williams et al. |
| 2018/0286395 A1 | 10/2018 | Li et al. |
| 2018/0288104 A1 | 10/2018 | Padilla et al. |
| 2018/0293959 A1 | 10/2018 | Monga et al. |
| 2018/0295079 A1 | 10/2018 | Longo |
| 2018/0308480 A1 | 10/2018 | Jang et al. |
| 2018/0309801 A1 | 10/2018 | Rathod |
| 2018/0321842 A1 | 11/2018 | Lee et al. |
| 2018/0329586 A1 | 11/2018 | Sundstrom et al. |
| 2018/0332559 A1 | 11/2018 | Gudivada et al. |
| 2018/0338038 A1 | 11/2018 | Ly et al. |
| 2018/0341448 A1 | 11/2018 | Behzadi et al. |
| 2018/0348764 A1 | 12/2018 | Zhang et al. |
| 2018/0359293 A1 | 12/2018 | Faulkner et al. |
| 2018/0364665 A1 | 12/2018 | Clymer et al. |
| 2018/0367483 A1 | 12/2018 | Rodriguez et al. |
| 2018/0367484 A1 | 12/2018 | Rodriguez et al. |
| 2018/0375676 A1 | 12/2018 | Bader-Natal et al. |
| 2019/0005419 A1 | 1/2019 | Howard |
| 2019/0025943 A1 | 1/2019 | Jobs et al. |
| 2019/0028419 A1 | 1/2019 | Sullivan |
| 2019/0034849 A1 | 1/2019 | Romaine et al. |
| 2019/0037173 A1 | 1/2019 | Lee et al. |
| 2019/0065027 A1 | 2/2019 | Hauenstein et al. |
| 2019/0068670 A1 | 2/2019 | Adam et al. |
| 2019/0102049 A1 | 4/2019 | Anzures et al. |
| 2019/0102145 A1 | 4/2019 | Wilberding et al. |
| 2019/0110087 A1 | 4/2019 | Parasseeri et al. |
| 2019/0124021 A1 | 4/2019 | Demattei |
| 2019/0138951 A1 | 5/2019 | Brownhill et al. |
| 2019/0149768 A1 | 5/2019 | Mcardle |
| 2019/0149887 A1 | 5/2019 | Williams et al. |
| 2019/0173939 A1 | 6/2019 | Lewis et al. |
| 2019/0199963 A1 | 6/2019 | Ahn et al. |
| 2019/0199993 A1 | 6/2019 | Babu J D et al. |
| 2019/0205861 A1 | 7/2019 | Bace |
| 2019/0208028 A1 | 7/2019 | Larabie-Belanger |
| 2019/0222775 A1 | 7/2019 | Ahn |
| 2019/0228495 A1 | 7/2019 | Tremblay et al. |
| 2019/0236142 A1 | 8/2019 | Balakrishnan et al. |
| 2019/0279634 A1 | 9/2019 | Tak et al. |
| 2019/0297039 A1 | 9/2019 | Rodriguez et al. |
| 2019/0303861 A1 | 10/2019 | Mathias et al. |
| 2019/0332400 A1 | 10/2019 | Spoor et al. |
| 2019/0339769 A1 | 11/2019 | Cox et al. |
| 2019/0339825 A1 | 11/2019 | Anzures et al. |
| 2019/0342507 A1 | 11/2019 | Dye et al. |
| 2019/0342519 A1 | 11/2019 | Van Os et al. |
| 2019/0342621 A1 | 11/2019 | Carrigan et al. |
| 2019/0347181 A1 | 11/2019 | Cranfill et al. |
| 2019/0354252 A1 | 11/2019 | Badr |
| 2019/0361575 A1 | 11/2019 | Ni et al. |
| 2019/0361694 A1 | 11/2019 | Gordon et al. |
| 2019/0362555 A1 | 11/2019 | Chen et al. |
| 2019/0369862 A1 | 12/2019 | De Vries |
| 2019/0370805 A1 | 12/2019 | Van Os et al. |
| 2020/0005539 A1 | 1/2020 | Hwang et al. |
| 2020/0034033 A1 | 1/2020 | Chaudhri et al. |
| 2020/0050502 A1 | 2/2020 | Ghafourifar et al. |
| 2020/0055515 A1 | 2/2020 | Herman et al. |
| 2020/0059628 A1 | 2/2020 | Cranfill et al. |
| 2020/0106952 A1 | 4/2020 | Missig et al. |
| 2020/0106965 A1 | 4/2020 | Malia et al. |
| 2020/0112690 A1 | 4/2020 | Harrison et al. |
| 2020/0127988 A1 | 4/2020 | Bradley et al. |
| 2020/0135191 A1 | 4/2020 | Nourbakhsh |
| 2020/0142667 A1 | 5/2020 | Querze et al. |
| 2020/0143593 A1 | 5/2020 | Rudman et al. |
| 2020/0152186 A1 | 5/2020 | Koh et al. |
| 2020/0183548 A1 | 6/2020 | Anzures et al. |
| 2020/0186378 A1 | 6/2020 | Six et al. |
| 2020/0186576 A1 | 6/2020 | Gopal et al. |
| 2020/0195887 A1 | 6/2020 | Van Os et al. |
| 2020/0213530 A1 | 7/2020 | Ahn |
| 2020/0226896 A1 | 7/2020 | Robertson et al. |
| 2020/0242788 A1 | 7/2020 | Jacobs et al. |
| 2020/0274726 A1 | 8/2020 | Setteboun et al. |
| 2020/0279279 A1 | 9/2020 | Chaudhuri |
| 2020/0296329 A1 | 9/2020 | Tang et al. |
| 2020/0302913 A1 | 9/2020 | Marcinkiewicz |
| 2020/0312318 A1 | 10/2020 | Olson et al. |
| 2020/0322479 A1 | 10/2020 | De Vries et al. |
| 2020/0335187 A1 | 10/2020 | Lefkofsky et al. |
| 2020/0356063 A1 | 11/2020 | Guzman et al. |
| 2020/0383157 A1 | 12/2020 | Lee et al. |
| 2020/0385116 A1 | 12/2020 | Sabripour et al. |
| 2020/0395012 A1 | 12/2020 | Kim et al. |
| 2020/0400957 A1 | 12/2020 | Van Heugten |
| 2021/0043189 A1 | 2/2021 | Pyun |
| 2021/0064317 A1 | 3/2021 | Juenger et al. |

(56) References Cited

U.S. PATENT DOCUMENTS

| | | |
|---|---|---|
| 2021/0065134 A1 | 3/2021 | Chhabra et al. |
| 2021/0096703 A1 | 4/2021 | Anzures et al. |
| 2021/0097768 A1 | 4/2021 | Malia et al. |
| 2021/0099829 A1 | 4/2021 | Soto et al. |
| 2021/0136129 A1 | 5/2021 | Ponnusamy et al. |
| 2021/0144336 A1 | 5/2021 | Van Os et al. |
| 2021/0152503 A1 | 5/2021 | Rodriguez et al. |
| 2021/0158622 A1 | 5/2021 | Leelaphattarakij et al. |
| 2021/0158830 A1 | 5/2021 | Boehlke |
| 2021/0176204 A1 | 6/2021 | Geppert et al. |
| 2021/0182169 A1 | 6/2021 | Mardente et al. |
| 2021/0195084 A1 | 6/2021 | Olajos et al. |
| 2021/0203878 A1 | 7/2021 | Lee et al. |
| 2021/0217106 A1 | 7/2021 | Hauser et al. |
| 2021/0265032 A1 | 8/2021 | Burgess et al. |
| 2021/0266274 A1 | 8/2021 | Liu et al. |
| 2021/0306288 A1 | 9/2021 | Boyd et al. |
| 2021/0321197 A1 | 10/2021 | Annamraju |
| 2021/0323406 A1 | 10/2021 | So et al. |
| 2021/0333864 A1 | 10/2021 | Harvey et al. |
| 2021/0349680 A1 | 11/2021 | Kim et al. |
| 2021/0352172 A1 | 11/2021 | Kim et al. |
| 2021/0360192 A1 | 11/2021 | Cranfill et al. |
| 2021/0360199 A1 | 11/2021 | Oz et al. |
| 2021/0373672 A1 | 12/2021 | Schwarz et al. |
| 2021/0409359 A1 | 12/2021 | Eirinberg et al. |
| 2022/0004356 A1 | 1/2022 | Kim et al. |
| 2022/0006946 A1 | 1/2022 | Missig et al. |
| 2022/0021680 A1 | 1/2022 | Roedel et al. |
| 2022/0046186 A1 | 2/2022 | Fayad et al. |
| 2022/0046222 A1 | 2/2022 | Meier |
| 2022/0050578 A1 | 2/2022 | Waldman et al. |
| 2022/0053142 A1 | 2/2022 | Manzari et al. |
| 2022/0100362 A1 | 3/2022 | Kim |
| 2022/0100812 A1 | 3/2022 | Anvaripour et al. |
| 2022/0103784 A1 | 3/2022 | Pollefeys |
| 2022/0122089 A1 | 4/2022 | Bonilla Kuhlmann et al. |
| 2022/0163996 A1 | 5/2022 | Yang et al. |
| 2022/0180862 A1 | 6/2022 | Sharifi et al. |
| 2022/0207840 A1 | 6/2022 | Cansizoglu et al. |
| 2022/0244836 A1 | 8/2022 | O'Leary et al. |
| 2022/0247587 A1 | 8/2022 | Rolin et al. |
| 2022/0247918 A1 | 8/2022 | O'Leary et al. |
| 2022/0247919 A1 | 8/2022 | O'Leary et al. |
| 2022/0253136 A1 | 8/2022 | Holder et al. |
| 2022/0254074 A1 | 8/2022 | Berliner et al. |
| 2022/0263940 A1 | 8/2022 | De Vries et al. |
| 2022/0269882 A1 | 8/2022 | Proschowsky et al. |
| 2022/0278992 A1 | 9/2022 | Baker et al. |
| 2022/0286314 A1 | 9/2022 | Meyer et al. |
| 2022/0303150 A1 | 9/2022 | Jensen et al. |
| 2022/0343569 A1 | 10/2022 | Karri et al. |
| 2022/0365643 A1 | 11/2022 | Triverio et al. |
| 2022/0365739 A1 | 11/2022 | Chang et al. |
| 2022/0365740 A1 | 11/2022 | Chang et al. |
| 2022/0368548 A1 | 11/2022 | Chang et al. |
| 2022/0368659 A1 | 11/2022 | Chang et al. |
| 2022/0368742 A1 | 11/2022 | Chang et al. |
| 2022/0374136 A1 | 11/2022 | Chang et al. |
| 2022/0375358 A1 | 11/2022 | Shimomura et al. |
| 2023/0004264 A1 | 1/2023 | Anzures et al. |
| 2023/0041125 A1 | 2/2023 | Kim et al. |
| 2023/0094453 A1 | 3/2023 | O'Leary et al. |
| 2023/0098395 A1 | 3/2023 | O'Leary et al. |
| 2023/0109787 A1 | 4/2023 | O'Leary et al. |
| 2023/0143275 A1 | 5/2023 | Opara et al. |
| 2023/0188674 A1 | 6/2023 | Van Os et al. |
| 2023/0213764 A1 | 7/2023 | Arngren et al. |
| 2023/0246857 A1 | 8/2023 | Boucheron et al. |
| 2023/0262317 A1 | 8/2023 | O'Leary et al. |
| 2023/0319413 A1 | 10/2023 | Manzari et al. |
| 2023/0370507 A1 | 11/2023 | Chang et al. |
| 2023/0393616 A1 | 12/2023 | Chao et al. |
| 2024/0036804 A1 | 2/2024 | Chang et al. |
| 2024/0064270 A1 | 2/2024 | Van Os et al. |
| 2024/0064395 A1 | 2/2024 | O'Leary et al. |
| 2024/0103677 A1 | 3/2024 | Mckenzie et al. |
| 2024/0103678 A1 | 3/2024 | Dryer et al. |
| 2024/0104819 A1 | 3/2024 | Chand et al. |
| 2024/0111333 A1 | 4/2024 | Yang et al. |
| 2024/0118793 A1 | 4/2024 | Triverio et al. |
| 2024/0163365 A1 | 5/2024 | De Vries et al. |
| 2024/0259669 A1 | 8/2024 | Missig et al. |
| 2024/0377922 A1 | 11/2024 | Rajam et al. |
| 2025/0039011 A1 | 1/2025 | Meyer et al. |

FOREIGN PATENT DOCUMENTS

| | | |
|---|---|---|
| CA | 2845537 A1 | 9/2014 |
| CM | 103748610 A | 4/2014 |
| CN | 1473430 A | 2/2004 |
| CN | 1525723 A | 9/2004 |
| CN | 1658150 A | 8/2005 |
| CN | 1689327 A | 10/2005 |
| CN | 1801926 A | 7/2006 |
| CN | 1890996 A | 1/2007 |
| CN | 1918533 A | 2/2007 |
| CN | 1985319 A | 6/2007 |
| CN | 101075173 A | 11/2007 |
| CN | 101226444 A | 7/2008 |
| CN | 101296356 A | 10/2008 |
| CN | 101356493 A | 1/2009 |
| CN | 101409743 A | 4/2009 |
| CN | 101431564 A | 5/2009 |
| CN | 101535938 A | 9/2009 |
| CN | 101566866 A | 10/2009 |
| CN | 101682622 A | 3/2010 |
| CN | 101828166 A | 9/2010 |
| CN | 101853132 A | 10/2010 |
| CN | 101854247 A | 10/2010 |
| CN | 101854261 A | 10/2010 |
| CN | 101917529 A | 12/2010 |
| CN | 102215217 A | 10/2011 |
| CN | 102262506 A | 11/2011 |
| CN | 102388355 A | 3/2012 |
| CN | 102439558 A | 5/2012 |
| CN | 102572369 A | 7/2012 |
| CN | 102651731 A | 8/2012 |
| CN | 102707994 A | 10/2012 |
| CN | 102750086 A | 10/2012 |
| CN | 103039064 A | 4/2013 |
| CN | 103222247 A | 7/2013 |
| CN | 103237191 A | 8/2013 |
| CN | 103250138 A | 8/2013 |
| CN | 103336651 A | 10/2013 |
| CN | 103384235 A | 11/2013 |
| CN | 103442774 A | 12/2013 |
| CN | 103458215 A | 12/2013 |
| CN | 103582873 A | 2/2014 |
| CN | 103649985 A | 3/2014 |
| CN | 103718152 A | 4/2014 |
| CN | 103765385 A | 4/2014 |
| CN | 104010158 A | 8/2014 |
| CN | 104081335 A | 10/2014 |
| CN | 104182123 A | 12/2014 |
| CN | 104270597 A | 1/2015 |
| CN | 104427288 A | 3/2015 |
| CN | 104469143 A | 3/2015 |
| CN | 104602133 A | 5/2015 |
| CN | 104834439 A | 8/2015 |
| CN | 104869046 A | 8/2015 |
| CN | 104980578 A | 10/2015 |
| CN | 105094551 A | 11/2015 |
| CN | 105094957 A | 11/2015 |
| CN | 105141498 A | 12/2015 |
| CN | 105204846 A | 12/2015 |
| CN | 105264473 A | 1/2016 |
| CN | 105308634 A | 2/2016 |
| CN | 105389173 A | 3/2016 |
| CN | 105391778 A | 3/2016 |
| CN | 105554429 A | 5/2016 |
| CN | 105578111 A | 5/2016 |
| CN | 105637451 A | 6/2016 |
| CN | 105900376 A | 8/2016 |

(56) References Cited

FOREIGN PATENT DOCUMENTS

| | | |
|---|---|---|
| CN | 106210855 A | 12/2016 |
| CN | 106303648 A | 1/2017 |
| CN | 106471793 A | 3/2017 |
| CN | 106664389 A | 5/2017 |
| CN | 106713946 A | 5/2017 |
| CN | 106843626 A | 6/2017 |
| CN | 107066523 A | 8/2017 |
| CN | 107122049 A | 9/2017 |
| CN | 107491257 A | 12/2017 |
| CN | 107533417 A | 1/2018 |
| CN | 107534656 A | 1/2018 |
| CN | 107704177 A | 2/2018 |
| CN | 107728876 A | 2/2018 |
| CN | 104025538 A | 4/2018 |
| CN | 107992248 A | 5/2018 |
| CN | 108933965 A | 12/2018 |
| CN | 109196825 A | 1/2019 |
| CN | 110456971 A | 11/2019 |
| CN | 111095165 A | 5/2020 |
| CN | 111108740 A | 5/2020 |
| CN | 111601065 A | 8/2020 |
| CN | 111913630 A | 11/2020 |
| CN | 112088530 A | 12/2020 |
| CN | 112214275 A | 1/2021 |
| CN | 112261338 A | 1/2021 |
| CN | 112416223 A | 2/2021 |
| EP | 0483777 A2 | 5/1992 |
| EP | 0584392 A1 | 3/1994 |
| EP | 1215575 A2 | 6/2002 |
| EP | 1517228 A2 | 3/2005 |
| EP | 1562105 A2 | 8/2005 |
| EP | 1568966 A2 | 8/2005 |
| EP | 1760584 A1 | 3/2007 |
| EP | 1903791 A2 | 3/2008 |
| EP | 1986431 A2 | 10/2008 |
| EP | 2056568 A1 | 5/2009 |
| EP | 2151745 A2 | 2/2010 |
| EP | 2237536 A1 | 10/2010 |
| EP | 2600584 A1 | 6/2013 |
| EP | 2682850 A1 | 1/2014 |
| EP | 2703974 A1 | 3/2014 |
| EP | 2725473 A1 | 4/2014 |
| EP | 2770708 A1 | 8/2014 |
| EP | 2446619 A1 | 10/2015 |
| EP | 3038427 A1 | 6/2016 |
| EP | 3091421 A2 | 11/2016 |
| EP | 2761582 B1 | 3/2017 |
| EP | 2258103 B1 | 5/2018 |
| EP | 3163866 B1 | 5/2020 |
| EP | 4109891 A1 | 12/2022 |
| IN | 10388MUM2005 A | 6/2007 |
| JP | 6-110881 A | 4/1994 |
| JP | 6-113297 A | 4/1994 |
| JP | 6-276335 A | 9/1994 |
| JP | 6-276515 A | 9/1994 |
| JP | 7-135594 A | 5/1995 |
| JP | 7-325700 A | 12/1995 |
| JP | 8-76926 A | 3/1996 |
| JP | 8-279998 A | 10/1996 |
| JP | 9-182046 A | 7/1997 |
| JP | 9-233384 A | 9/1997 |
| JP | 9-247655 A | 9/1997 |
| JP | 9-265457 A | 10/1997 |
| JP | 10-240488 A | 9/1998 |
| JP | 2000-40158 A | 2/2000 |
| JP | 2000-200092 A | 7/2000 |
| JP | 2000-242390 A | 9/2000 |
| JP | 2000-283772 A | 10/2000 |
| JP | 2001-67099 A | 3/2001 |
| JP | 2001-101202 A | 4/2001 |
| JP | 2001-169166 A | 6/2001 |
| JP | 2002-251365 A | 9/2002 |
| JP | 2002-251366 A | 9/2002 |
| JP | 2002-288125 A | 10/2002 |
| JP | 2002-320140 A | 10/2002 |
| JP | 2002-351802 A | 12/2002 |
| JP | 2003-101981 A | 4/2003 |
| JP | 2003-134382 A | 5/2003 |
| JP | 2003-189168 A | 7/2003 |
| JP | 2003-195998 A | 7/2003 |
| JP | 2003-274376 A | 9/2003 |
| JP | 2003-526820 A | 9/2003 |
| JP | 2003-299050 A | 10/2003 |
| JP | 2003-348444 A | 12/2003 |
| JP | 2004-187273 A | 7/2004 |
| JP | 2004-193860 A | 7/2004 |
| JP | 2004-221738 A | 8/2004 |
| JP | 2005-45744 A | 2/2005 |
| JP | 2005-94696 A | 4/2005 |
| JP | 2005-159567 A | 6/2005 |
| JP | 2005-222553 A | 8/2005 |
| JP | 2005-260289 A | 9/2005 |
| JP | 2005-286445 A | 10/2005 |
| JP | 2005-303736 A | 10/2005 |
| JP | 2005-332368 A | 12/2005 |
| JP | 2006-135495 A | 5/2006 |
| JP | 2006-166414 A | 6/2006 |
| JP | 2006-222822 A | 8/2006 |
| JP | 2006-245732 A | 9/2006 |
| JP | 2006-246019 A | 9/2006 |
| JP | 2006-254350 A | 9/2006 |
| JP | 2006-319742 A | 11/2006 |
| JP | 2007-88630 A | 4/2007 |
| JP | 2007-140060 A | 6/2007 |
| JP | 2007-150877 A | 6/2007 |
| JP | 2007-150921 A | 6/2007 |
| JP | 2007-517462 A | 6/2007 |
| JP | 2007-200329 A | 8/2007 |
| JP | 2007-201727 A | 8/2007 |
| JP | 2007-274034 A | 10/2007 |
| JP | 2007-282263 A | 10/2007 |
| JP | 2007-300452 A | 11/2007 |
| JP | 2008-17373 A | 1/2008 |
| JP | 2008-28586 A | 2/2008 |
| JP | 2008-76818 A | 4/2008 |
| JP | 2008-76853 A | 4/2008 |
| JP | 2008-99330 A | 4/2008 |
| JP | 2008-125105 A | 5/2008 |
| JP | 2008-136119 A | 6/2008 |
| JP | 2008-533838 A | 8/2008 |
| JP | 2008-276801 A | 11/2008 |
| JP | 2008-289014 A | 11/2008 |
| JP | 2009-502048 A | 1/2009 |
| JP | 2009-80710 A | 4/2009 |
| JP | 2009-159253 A | 7/2009 |
| JP | 2009-188975 A | 8/2009 |
| JP | 2009-217815 A | 9/2009 |
| JP | 2009-232290 A | 10/2009 |
| JP | 2009-265692 A | 11/2009 |
| JP | 2009-296577 A | 12/2009 |
| JP | 2009-296583 A | 12/2009 |
| JP | 2010-15239 A | 1/2010 |
| JP | 2010-97353 A | 4/2010 |
| JP | 2010-511939 A | 4/2010 |
| JP | 2010-109789 A | 5/2010 |
| JP | 2010-522935 A | 7/2010 |
| JP | 2010-206745 A | 9/2010 |
| JP | 2010-245940 A | 10/2010 |
| JP | 2010-541398 A | 12/2010 |
| JP | 2011-118662 A | 6/2011 |
| JP | 2012-168966 A | 9/2012 |
| JP | 2012-215938 A | 11/2012 |
| JP | 2012-244340 A | 12/2012 |
| JP | 2013-25357 A | 2/2013 |
| JP | 2013-74499 A | 4/2013 |
| JP | 2013-93699 A | 5/2013 |
| JP | 2013-105468 A | 5/2013 |
| JP | 2013-524683 A | 6/2013 |
| JP | 2013-530433 A | 7/2013 |
| JP | 2013-191065 A | 9/2013 |
| JP | 2014-503861 A | 2/2014 |
| JP | 2014-44724 A | 3/2014 |
| JP | 2014-71835 A | 4/2014 |
| JP | 2014-87126 A | 5/2014 |

(56) References Cited

FOREIGN PATENT DOCUMENTS

| | | |
|---|---|---|
| JP | 2014-512044 A | 5/2014 |
| JP | 2014-170982 A | 9/2014 |
| JP | 2015-11507 A | 1/2015 |
| JP | 2015-520456 A | 7/2015 |
| JP | 2015-170234 A | 9/2015 |
| JP | 2015-201087 A | 11/2015 |
| JP | 2016-1446 A | 1/2016 |
| JP | 2016-24557 A | 2/2016 |
| JP | 2016-38615 A | 3/2016 |
| JP | 2016-53929 A | 4/2016 |
| JP | 2016-157292 A | 9/2016 |
| JP | 2016-167806 A | 9/2016 |
| JP | 2016-174282 A | 9/2016 |
| JP | 2017-532645 A | 11/2017 |
| JP | 2017-228843 A | 12/2017 |
| JP | 2017-229060 A | 12/2017 |
| JP | 2018-7158 A | 1/2018 |
| JP | 2018-56719 A | 4/2018 |
| JP | 2018-136828 A | 8/2018 |
| JP | 2018-200624 A | 12/2018 |
| JP | 2019-114282 A | 7/2019 |
| JP | 2020-510929 A | 4/2020 |
| JP | 2021-40300 A | 3/2021 |
| KR | 1997-0031883 A | 6/1997 |
| KR | 1999-0044201 A | 6/1999 |
| KR | 10-2004-0016688 A | 2/2004 |
| KR | 10-2004-0045338 A | 6/2004 |
| KR | 10-2005-0054684 A | 6/2005 |
| KR | 10-2006-0031959 A | 4/2006 |
| KR | 10-2006-0064326 A | 6/2006 |
| KR | 10-2006-0116902 A | 11/2006 |
| KR | 10-2007-0111270 A | 11/2007 |
| KR | 10-2008-0057326 A | 6/2008 |
| KR | 10-2008-0096042 A | 10/2008 |
| KR | 10-2009-0002641 A | 1/2009 |
| KR | 10-2009-0004176 A | 1/2009 |
| KR | 10-2009-0017901 A | 2/2009 |
| KR | 10-2009-0017906 A | 2/2009 |
| KR | 10-2009-0036226 A | 4/2009 |
| KR | 10-2009-0042499 A | 4/2009 |
| KR | 10-0891449 B1 | 4/2009 |
| KR | 10-2009-0122805 A | 12/2009 |
| KR | 10-2009-0126516 A | 12/2009 |
| KR | 10-2012-0003323 A | 1/2012 |
| KR | 10-2012-0088746 A | 8/2012 |
| KR | 10-2012-0100433 A | 9/2012 |
| KR | 10-2013-0063019 A | 6/2013 |
| KR | 10-2013-0075783 A | 7/2013 |
| KR | 10-2013-0082190 A | 7/2013 |
| KR | 10-2013-0141688 A | 12/2013 |
| KR | 10-2014-0016244 A | 2/2014 |
| KR | 10-2014-0026263 A | 3/2014 |
| KR | 10-2014-0043370 A | 4/2014 |
| KR | 10-2016-0092820 A | 8/2016 |
| KR | 10-2017-0128498 A | 11/2017 |
| KR | 10-2018-0085931 A | 7/2018 |
| KR | 10-2019-0033082 A | 3/2019 |
| KR | 10-1989433 B1 | 6/2019 |
| KR | 10-2020-0039030 A | 4/2020 |
| TW | 200743365 A | 11/2007 |
| TW | I321955 B | 3/2010 |
| TW | 201415345 A | 4/2014 |
| TW | 201416959 A | 5/2014 |
| WO | 01/18665 A1 | 3/2001 |
| WO | 02/37848 A1 | 5/2002 |
| WO | 2003/077553 A1 | 9/2003 |
| WO | 2004/032507 A1 | 4/2004 |
| WO | 2005/060501 A2 | 7/2005 |
| WO | 2005/086159 A2 | 9/2005 |
| WO | 2005/109829 A1 | 11/2005 |
| WO | 2006/048028 A1 | 5/2006 |
| WO | 2006/063343 A2 | 6/2006 |
| WO | 2006/073020 A1 | 7/2006 |
| WO | 2007/002621 A2 | 1/2007 |
| WO | 2007/008321 A2 | 1/2007 |
| WO | 2007/063922 A1 | 6/2007 |
| WO | 2007/102110 A2 | 9/2007 |
| WO | 2008/030779 A2 | 3/2008 |
| WO | 2008/030879 A2 | 3/2008 |
| WO | 2008/040566 A1 | 4/2008 |
| WO | 2008/067498 A2 | 6/2008 |
| WO | 2008/090902 A1 | 7/2008 |
| WO | 2009/005914 A1 | 1/2009 |
| WO | 2009/042579 A1 | 4/2009 |
| WO | 2009/143076 A2 | 11/2009 |
| WO | 2009/148781 A1 | 12/2009 |
| WO | 2010/001672 A1 | 1/2010 |
| WO | 2010/134729 A2 | 11/2010 |
| WO | 2010/137513 A1 | 12/2010 |
| WO | 2011/126502 A1 | 10/2011 |
| WO | 2011/126505 A1 | 10/2011 |
| WO | 2011/146605 A1 | 11/2011 |
| WO | 2011/146839 A1 | 11/2011 |
| WO | 2011/161145 A1 | 12/2011 |
| WO | 2012/028773 A1 | 3/2012 |
| WO | 2012/037170 A1 | 3/2012 |
| WO | 2012/051052 A1 | 4/2012 |
| WO | 2012/079530 A1 | 6/2012 |
| WO | 2012/087939 A1 | 6/2012 |
| WO | 2012/103117 A1 | 8/2012 |
| WO | 2012/126078 A1 | 9/2012 |
| WO | 2012/154748 A1 | 11/2012 |
| WO | 2012/170118 A1 | 12/2012 |
| WO | 2012/170446 A2 | 12/2012 |
| WO | 2013/097896 A1 | 7/2013 |
| WO | 2013/114821 A1 | 8/2013 |
| WO | 2013/132144 A1 | 9/2013 |
| WO | 2013/173838 A2 | 11/2013 |
| WO | 2014/052871 A1 | 4/2014 |
| WO | 2014/058937 A1 | 4/2014 |
| WO | 2014/077987 A1 | 5/2014 |
| WO | 2014/168616 A1 | 10/2014 |
| WO | 2014/197279 A1 | 12/2014 |
| WO | 2014/200730 A1 | 12/2014 |
| WO | 2015/192085 A2 | 12/2015 |
| WO | 2016/022204 A1 | 2/2016 |
| WO | 2016/046589 A1 | 3/2016 |
| WO | 2016/168154 A1 | 10/2016 |
| WO | 2017/038261 A1 | 3/2017 |
| WO | 2017/218143 A1 | 12/2017 |
| WO | 2017/218153 A1 | 12/2017 |
| WO | 2018/057272 A1 | 3/2018 |
| WO | 2018/213401 A1 | 11/2018 |
| WO | 2018/213415 A1 | 11/2018 |
| WO | 2018/213844 A1 | 11/2018 |
| WO | 2018/232333 A1 | 12/2018 |
| WO | 2019/067131 A1 | 4/2019 |
| WO | 2019/217009 A1 | 11/2019 |
| WO | 2019/217477 A1 | 11/2019 |
| WO | 2021/112983 A1 | 6/2021 |
| WO | 02/11022 A2 | 2/2022 |

OTHER PUBLICATIONS

Office Action received for Chinese Patent Application No. 202311185909.4, mailed on Feb. 13, 2025, 16 pages (10 pages of English Translation and 6 pages of Official Copy).
Office Action received for Chinese Patent Application No. 202410924550.6, mailed on Mar. 1, 2025, 12 pages (5 pages of English Translation and 7 pages of Official Copy).
Office Action received for Chinese Patent Application No. 202410924556.3, mailed on Feb. 28, 2025, 11 pages (5 pages of English Translation and 6 pages of Official Copy).
Office Action received for European Patent Application No. 22729921.1, mailed on Mar. 13, 2025, 8 pages.
"6. Voice chat with friends through QQ", online available at: https://v.qq.com/x/page/a0166p7xrt0.html, Sep. 22, 2015, 1 page (Official Copy Only). {See Communication Under Rule 37 CFR § 1.98(a)(3)}.
Abdulezer et al., "Skype for Dummies", Available Online at: https://ixn.es/Skype%20For%20Dummies.pdf, Dec. 31, 2007, 361 pages.

(56) References Cited

OTHER PUBLICATIONS

Advisory Action received for U.S. Appl. No. 10/179,775, mailed on Oct. 13, 2015, 4 pages.
Advisory Action received for U.S. Appl. No. 10/179,775, mailed on Oct. 14, 2010, 2 pages.
Advisory Action received for U.S. Appl. No. 10/179,775, mailed on Sep. 15, 2009, 2 pages.
Advisory Action received for U.S. Appl. No. 12/890,499, mailed on Jan. 11, 2016, 3 pages.
Advisory Action received for U.S. Appl. No. 13/077,850, mailed on Apr. 24, 2014, 3 pages.
Advisory Action received for U.S. Appl. No. 13/077,855, mailed on Jun. 15, 2016, 4 pages.
Advisory Action received for U.S. Appl. No. 13/077,862, mailed on Apr. 7, 2016, 3 pages.
Advisory Action received for U.S. Appl. No. 13/077,874, mailed on Aug. 19, 2016, 3 pages.
Advisory Action received for U.S. Appl. No. 14/263,889, mailed on May 26, 2016, 4 pages.
Advisory Action received for U.S. Appl. No. 15/725,868, mailed on Dec. 10, 2018, 5 pages.
Advisory Action received for U.S. Appl. No. 16/666,073, mailed on Jul. 7, 2020, 5 pages.
Advisory Action received for U.S. Appl. No. 17/950,868, mailed on Sep. 24, 2024, 3 pages.
Advisory Action received for U.S. Appl. No. 17/970,417, mailed on Dec. 12, 2024, 7 pages.
Advisory Action received for U.S. Appl. No. 17/483,679, mailed on Sep. 20, 2022, 8 pages.
Androidcentral, "How do I respond to group messages from notification bar?", Available online at: https://forums.androidcentral.com/ask-question/952030-how-do-i-respond-group-messages-notification-bar.html, Mar. 25, 2019, 3 pages.
Anonymous, "Chapter 13: Menus", Apple Human Interface Guidelines, available at <https://developer.apple.com/library/mac/documentation/UserExperience/Conceptual/OSX HIGuidelines/index.html>, retrieved on Aug. 20, 2009, pp. 165-190.
Anonymous, "HuddleCamHD SimplTrack2 Auto Tracking Camera Installation & Operation Manual", Available Online at: https://huddlecamhd.com/wp-content/uploads/2021/01/SimplTrack2-User-Manual-v1_2-6-20.pdf, Jun. 30, 2020, 41 pages.
Anonymous, "Split Your Screen with IPEVO Visualizer Software", On IPEVO, Available online at: https://medium.com/ipevo/split-your-screen-with-ipevo-visualizer-software-e9641024d24f, Feb. 24, 2020, 10 pages.
Appeal Decision received for U.S. Appl. No. 13/077,862, mailed on Mar. 22, 2019, 10 pages.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.
Applicant Initiated Interview Summary received for U.S. Appl. No. 14/641,304, mailed on Dec. 2, 2019, 5 pages.
Applicant Initiated Interview Summary received for U.S. Appl. No. 14/641,304, mailed on Jul. 28, 2020, 5 pages.
Applicant Initiated Interview Summary received for U.S. Appl. No. 15/784,806, mailed on Aug. 2, 2021, 5 pages.
Applicant Initiated Interview Summary received for U.S. Appl. No. 16/790,619, mailed on Jul. 28, 2020, 3 pages.
Applicant Initiated Interview Summary received for U.S. Appl. No. 16/859,101, mailed on Nov. 30, 2021, 2 pages.
Applicant Initiated Interview Summary received for U.S. Appl. No. 17/666,971, mailed on Jun. 9, 2023, 2 pages.
Applicant-Initiated Interview Summary received for U.S. Appl. No. 14/263,889, mailed on Apr. 15, 2016, 3 pages.
Applicant-Initiated Interview Summary received for U.S. Appl. No. 15/725,868, mailed on Jul. 25, 2018, 3 pages.
Applicant-Initiated Interview Summary received for U.S. Appl. No. 15/725,868, mailed on May 13, 2019, 3 pages.
Applicant-Initiated Interview Summary received for U.S. Appl. No. 15/725,868, mailed on Nov. 20, 2018, 3 pages.
Applicant-Initiated Interview Summary received for U.S. Appl. No. 15/784,806, mailed on Dec. 21, 2020, 5 pages.
Applicant-Initiated Interview Summary received for U.S. Appl. No. 15/784,806, mailed on Jan. 24, 2022, 3 pages.
Applicant-Initiated Interview Summary received for U.S. Appl. No. 15/784,806, mailed on Jun. 2, 2020, 5 pages.
Applicant-Initiated Interview Summary received for U.S. Appl. No. 15/784,806, mailed on Nov. 3, 2022, 5 pages.
Applicant-Initiated Interview Summary received for U.S. Appl. No. 16/528,941, mailed on Jun. 19, 2020, 3 pages.
Applicant-Initiated Interview Summary received for U.S. Appl. No. 16/528,941, mailed on Nov. 10, 2020, 2 pages.
Applicant-Initiated Interview Summary received for U.S. Appl. No. 16/799,481, mailed on Jul. 24, 2020, 3 pages.
Applicant-Initiated Interview Summary received for U.S. Appl. No. 17/026,818, mailed on Dec. 15, 2020, 7 pages.
Applicant-Initiated Interview Summary received for U.S. Appl. No. 17/026,818, mailed on Mar. 8, 2021, 4 pages.
Applicant-Initiated Interview Summary received for U.S. Appl. No. 17/121,610, mailed on Oct. 29, 2021, 2 pages.
Applicant-Initiated Interview Summary received for U.S. Appl. No. 17/223,794, mailed on Sep. 7, 2021, 3 pages.
Applicant-Initiated Interview Summary received for U.S. Appl. No. 17/476,404, mailed on Dec. 20, 2022, 2 pages.
Applicant-Initiated Interview Summary received for U.S. Appl. No. 17/476,404, mailed on Jul. 27, 2022, 6 pages.
Applicant-Initiated Interview Summary received for U.S. Appl. No. 17/476,404, mailed on Jun. 2, 2023, 2 pages.
Applicant-Initiated Interview Summary received for U.S. Appl. No. 17/476,404, mailed on Mar. 18, 2022, 2 pages.
Applicant-Initiated Interview Summary received for U.S. Appl. No. 17/476,404, mailed on Oct. 31, 2023, 4 pages.
Applicant-Initiated Interview Summary received for U.S. Appl. No. 17/479,897, mailed on Jun. 12, 2023, 2 pages.
Applicant-Initiated Interview Summary received for U.S. Appl. No. 17/479,897, mailed on Oct. 31, 2022, 3 pages.
Applicant-Initiated Interview Summary received for U.S. Appl. No. 17/482,977, mailed on Dec. 5, 2022, 2 pages.
Applicant-Initiated Interview Summary received for U.S. Appl. No. 17/482,987, mailed on Apr. 11, 2022, 4 pages.
Applicant-Initiated Interview Summary received for U.S. Appl. No. 17/483,542, mailed on May 22, 2023, 3 pages.
Applicant-Initiated Interview Summary received for U.S. Appl. No. 17/483,542, mailed on Nov. 23, 2022, 4 pages.
Applicant-Initiated Interview Summary received for U.S. Appl. No. 17/483,564, mailed on Apr. 21, 2023, 5 pages.
Applicant-Initiated Interview Summary received for U.S. Appl. No. 17/483,564, mailed on Jul. 21, 2022, 5 pages.
Applicant-Initiated Interview Summary received for U.S. Appl. No. 17/483,564, mailed on Jun. 21, 2023, 54 pages.
Applicant-Initiated Interview Summary received for U.S. Appl. No. 17/483,564, mailed on Mar. 14, 2022, 2 pages.
Applicant-Initiated Interview Summary received for U.S. Appl. No. 17/483,679, mailed on Apr. 29, 2022, 2 pages.
Applicant-Initiated Interview Summary received for U.S. Appl. No. 17/483,679, mailed on Aug. 18, 2023, 2 pages.
Applicant-Initiated Interview Summary received for U.S. Appl. No. 17/483,679, mailed on Aug. 23, 2022, 3 pages.
Applicant-Initiated Interview Summary received for U.S. Appl. No. 17/483,679, mailed on Dec. 18, 2023, 2 pages.
Applicant-Initiated Interview Summary received for U.S. Appl. No. 17/483,679, mailed on May 19, 2023, 3 pages.
Applicant-Initiated Interview Summary received for U.S. Appl. No. 17/484,899, mailed on Apr. 27, 2022, 5 pages.
Applicant-Initiated Interview Summary received for U.S. Appl. No. 17/484,899, mailed on Feb. 14, 2024, 8 pages.
Applicant-Initiated Interview Summary received for U.S. Appl. No. 17/484,899, mailed on Jun. 24, 2023, 4 pages.
Applicant-Initiated Interview Summary received for U.S. Appl. No. 17/484,899, mailed on Sep. 1, 2022, 5 pages.
Applicant-Initiated Interview Summary received for U.S. Appl. No. 17/484,899, mailed on Sep. 12, 2023, 6 pages.

(56) References Cited

OTHER PUBLICATIONS

Applicant-Initiated Interview Summary received for U.S. Appl. No. 17/484,907, mailed on Jan. 10, 2022, 2 pages.
Applicant-Initiated Interview Summary received for U.S. Appl. No. 17/684,843, mailed on Oct. 5, 2023, 4 pages.
Applicant-Initiated Interview Summary received for U.S. Appl. No. 17/732,355, mailed on Sep. 20, 2023, 2 pages.
Applicant-Initiated Interview Summary received for U.S. Appl. No. 17/872,736, mailed on Jul. 25, 2023, 2 pages.
Applicant-Initiated Interview Summary received for U.S. Appl. No. 17/950,868, mailed on Jul. 19, 2024, 2 pages.
Applicant-Initiated Interview Summary received for U.S. Appl. No. 17/950,868, mailed on Sep. 10, 2024, 3 pages.
Applicant-Initiated Interview Summary received for U.S. Appl. No. 17/950,900, mailed on Jan. 26, 2023, 5 pages.
Applicant-Initiated Interview Summary received for U.S. Appl. No. 17/970,417, mailed on Jun. 26, 2024, 2 pages.
Applicant-Initiated Interview Summary received for U.S. Appl. No. 17/970,417, mailed on Nov. 4, 2024, 2 pages.
Applicant-Initiated Interview Summary received for U.S. Appl. No. 18/067,350, mailed on Jul. 29, 2024, 3 pages.
Applicant-Initiated Interview Summary received for U.S. Appl. No. 18/067,350, mailed on Mar. 13, 2024, 4 pages.
Applicant-Initiated Interview Summary received for U.S. Appl. No. 18067,350, mailed on Nov. 26, 2024, 3 pages.
Applicant-Initiated Interview Summary received for U.S. Appl. No. 18/067,350, mailed on Sep. 11, 2023, 4 pages.
Applicant-Initiated Interview Summary received for U.S. Appl. No. 18/165,144, mailed on Dec. 23, 2024, 4 pages.
Applicant-Initiated Interview Summary received for U.S. Appl. No. 18/165,144, mailed on Feb. 27, 2024, 3 pages.
Applicant-Initiated Interview Summary received for U.S. Appl. No. 18/165,144, mailed on Jul. 15, 2024, 4 pages.
Applicant-Initiated Interview Summary received for U.S. Appl. No. 18/389,655, mailed on Sep. 20, 2024, 6 pages.
Applicant-Initiated Interview Summary received for U.S. Appl. No. 18/422,571, mailed on Jan. 2, 2025, 2 pages.
Applicant-Initiated Interview Summary received for U.S. Appl. No. 18/499,848, mailed on Feb. 12, 2025, 2 pages.
Sharf et al., "SnapPaste:an interactive technique for easy mesh composition", The Visual Computer; International Journal of Computer Graphics, Springer, Berlin, De, vol. 22, No. 9-11. Available Online at <http://dx.doi.org/10.1007/s00371-006-0068-5>, Aug. 25, 2006, pp. 835-844.
Avery et al., "Kinect", Wikipedia, retrieved from: URL: https://en.wikipedia.org/w/index.php?title=Special:Book&bookcmd=download&collection_id=dc5d1 adb86059356b9c5620502a7ea1 fab1 0ada0 &writer=rdf2latex&return to=Kinect, Feb. 26, 2015, 14 pages.
Baig Ed, "Palm Pre: The Missing Manual", Safari Books Online, Available at <http://my.safaribooksonline.com/book/operating-systems/0596528264>, Aug. 27, 2009, 16 pages.
Baudisch et al., "Back-of-device interaction allows creating very small touch devices", Chi 2009—Digital Life, New World: Conference Proceedings and Extended Abstracts; The 27th Annual Chi Conference on Human Factors in Computing Systems, Available online at <http://dx.doi.org/10.1145/1518701.1518995>, Apr. 9, 2009, pp. 1923-1932.
Benge et al., "Designing Custom Controls", IBM OS/2 Developer, The Magazine for Advanced Software Development, vol. 5, No. 2, 1993, pp. 72-85.
Board Decision received for Chinese Patent Application No. 201510288981.9, mailed on May 6, 2021, 31 pages (3 pages of English Translation and 28 pages of Official Copy).
Board Opinion received for Chinese Patent Application No. 201510288981.9, mailed on Jan. 4, 2021, 21 pages (9 pages of English Translation and 12 pages of Official Copy).
Brief Communication Regarding Oral Proceedings received for European Patent Application No. 20205496.1, mailed on Apr. 19, 2023, 1 page.
Certificate of Examination received for Australian Patent Application No. 2019100499, mailed on Aug. 15, 2019, 2 pages.
Certificate of Examination received for Australian Patent Application No. 2019101062, mailed on Jun. 2, 2020, 2 pages.
Certificate of Examination received for Australian Patent Application No. 2020101324, mailed on Sep. 7, 2020, 2 pages.
Chan Christine, "Handoff Your Browser to Your iPhone or iPad! Plus, A Chance to Win a Copy!", Apr. 12, 2011, 2 pages.
Corrected Notice of Allowance received for U.S. Appl. No. 13/077,874, mailed on Dec. 9, 2016, 2 pages.
Corrected Notice of Allowance received for U.S. Appl. No. 14/641,298, mailed on Dec. 9, 2021, 5 pages.
Corrected Notice of Allowance received for U.S. Appl. No. 15/725,868, mailed on Aug. 23, 2019, 2 pages.
Corrected Notice of Allowance received for U.S. Appl. No. 15/725,868, mailed on Sep. 30, 2019, 3 pages.
Corrected Notice of Allowance received for U.S. Appl. No. 15/784,806, mailed on Jan. 17, 2025, 2 pages.
Corrected Notice of Allowance received for U.S. Appl. No. 16/109,552, mailed on Jun. 13, 2019, 2 pages.
Corrected Notice of Allowance received for U.S. Appl. No. 16/144,572, mailed on Mar. 21, 2019, 3 pages.
Corrected Notice of Allowance received for U.S. Appl. No. 16/147,432, mailed on Jan. 18, 2019, 3 pages.
Corrected Notice of Allowance received for U.S. Appl. No. 16/147,432, mailed on Jul. 16, 2019, 3 pages.
Corrected Notice of Allowance received for U.S. Appl. No. 16/511,578, mailed on Feb. 13, 2020, 3 pages.
Corrected Notice of Allowance received for U.S. Appl. No. 16/666,073, mailed on Apr. 6, 2021, 3 pages.
Corrected Notice of Allowance received for U.S. Appl. No. 16/666,073, mailed on Apr. 26, 2021, 4 pages.
Corrected Notice of Allowance received for U.S. Appl. No. 16/666,073, mailed on Feb. 22, 2021, 3 pages.
Corrected Notice of Allowance received for U.S. Appl. No. 16/666,073, mailed on Mar. 11, 2021, 3 pages.
Corrected Notice of Allowance received for U.S. Appl. No. 16/790,619, mailed on Oct. 13, 2020, 3 pages.
Corrected Notice of Allowance received for U.S. Appl. No. 16/799,481, mailed on Oct. 27, 2020, 3 pages.
Corrected Notice of Allowance received for U.S. Appl. No. 16/859,101, mailed on Mar. 25, 2022, 2 pages.
Corrected Notice of Allowance received for U.S. Appl. No. 17/027,373, mailed on Jul. 12, 2022, 2 pages.
Corrected Notice of Allowance received for U.S. Appl. No. 17/027,373, mailed on Oct. 26, 2022, 2 pages.
Corrected Notice of Allowance received for U.S. Appl. No. 17/121,610, mailed on Jun. 7, 2022, 4 pages.
Corrected Notice of Allowance received for U.S. Appl. No. 17/121,610, mailed on Mar. 31, 2022, 3 pages.
Corrected Notice of Allowance received for U.S. Appl. No. 17/121,610, mailed on May 20, 2022, 4 pages.
Corrected Notice of Allowance received for U.S. Appl. No. 17/157,166, mailed on Apr. 13, 2022, 4 pages.
Corrected Notice of Allowance received for U.S. Appl. No. 17/157,166, mailed on Apr. 25, 2022, 4 pages.
Corrected Notice of Allowance received for U.S. Appl. No. 17/157,166, mailed on Dec. 9, 2021, 4 pages.
Corrected Notice of Allowance received for U.S. Appl. No. 17/157,166, mailed on Dec. 15, 2021, 4 pages.
Corrected Notice of Allowance received for U.S. Appl. No. 17/157,166, mailed on Jan. 5, 2022, 4 pages.
Corrected Notice of Allowance received for U.S. Appl. No. 17/157,166, mailed on Jun. 29, 2022, 4 pages.
Corrected Notice of Allowance received for U.S. Appl. No. 17/479,897, mailed on Aug. 17, 2023, 2 pages.
Corrected Notice of Allowance received for U.S. Appl. No. 17/482,977, mailed on Apr. 24, 2023, 3 pages.
Corrected Notice of Allowance received for U.S. Appl. No. 17/483,542, mailed on Aug. 25, 2023, 3 pages.
Corrected Notice of Allowance received for U.S. Appl. No. 17/483,542, mailed on Feb. 5, 2024, 3 pages.

(56) References Cited

OTHER PUBLICATIONS

Corrected Notice of Allowance received for U.S. Appl. No. 17/483,549, mailed on Aug. 24, 2022, 3 pages.
Corrected Notice of Allowance received for U.S. Appl. No. 17/483,582, mailed on Feb. 15, 2022, 2 pages.
Corrected Notice of Allowance received for U.S. Appl. No. 17/484,907, mailed on Aug. 26, 2022, 2 pages.
Corrected Notice of Allowance received for U.S. Appl. No. 17/484,907, mailed on Jun. 15, 2022, 2 pages.
Corrected Notice of Allowance received for U.S. Appl. No. 17/484,907, mailed on Mar. 18, 2022, 2 pages.
Corrected Notice of Allowance received for U.S. Appl. No. 17/666,971, mailed on Jan. 16, 2024, 2 pages.
Corrected Notice of Allowance received for U.S. Appl. No. 17/666,971, mailed on Sep. 29, 2023, 2 pages.
Corrected Notice of Allowance received for U.S. Appl. No. 17/684,843, mailed on Mar. 4, 2024, 2 pages.
Corrected Notice of Allowance received for U.S. Appl. No. 17/684,843, mailed on Oct. 7, 2024, 2 pages.
Corrected Notice of Allowance received for U.S. Appl. No. 17/970,417, mailed on Feb. 20, 2025, 2 pages.
Corrected Notice of Allowance received for U.S. Appl. No. 17/732,204, mailed on Dec. 4, 2023, 5 pages.
Corrected Notice of Allowance received for U.S. Appl. No. 18/389,655, mailed on Feb. 24, 2025, 2 pages.
Corrected Notice of Allowance received for U.S. Appl. No. 17/732,204, mailed on Jan. 18, 2024, 5 pages.
Corrected Notice of Allowance received for U.S. Appl. No. 17/732,204, mailed on Nov. 16, 2023, 6 pages.
Corrected Notice of Allowance received for U.S. Patent Application No. 17/740, 104, mailed on Jan. 2, 2024, 2 pages.
Corrected Notice of Allowance received for U.S. Appl. No. 17/745,680, mailed on Nov. 20, 2024, 2 pages.
Corrected Notice of Allowance received for U.S. Appl. No. 17/872,736, mailed on Oct. 13, 2023, 4 pages.
Corrected Notice of Allowance received for U.S. Appl. No. 17/903,946, mailed on Apr. 22, 2024, 2 pages.
Corrected Notice of Allowance received for U.S. Appl. No. 17/903,946, mailed on Sep. 3, 2024, 2 pages.
Corrected Notice of Allowance received for U.S. Appl. No. 17/950,868, mailed on Nov. 27, 2024, 3 pages.
Corrected Notice of Allowance received for U.S. Appl. No. 17/950,900, mailed on Apr. 14, 2023, 2 pages.
Corrected Notice of Allowance received for U.S. Appl. No. 17/950,900, mailed on Jun. 30, 2023, 2 pages.
Corrected Notice of Allowance received for U.S. Appl. No. 17/950,922, mailed on Apr. 14, 2023, 2 pages.
Corrected Notice of Allowance received for U.S. Appl. No. 17/950,922, mailed on Oct. 2, 2023, 3 pages.
Corrected Notice of Allowance received for U.S. Appl. No. 18/138,348, mailed on Nov. 27, 2024, 2 pages.
Corrected Search Report and Opinion received for Danish Patent Application No. PA201870364, mailed on Sep. 5, 2018, 13 pages.
Cosmic Mook, "Line laboratory, new function Exhaustive Coverage! LINE 120% Application Guide, Inc.", Jan. 24, 2018, 7 pages (Official Copy Only). {See Communication Under Rule 37 CFR § 1.98(a)(3)}.
Cuyamaca LRC Computer Labs, "Topics in Common Space Application", Available at <http://www.cuyamaca.net/librarylab/Technical%20Help/cmspace.asp>, Retrieved on May 19, 2014, 16 pages.
Decision on Appeal received for Korean Patent Application No. 10-2020-7034959, mailed on Jul. 25, 2022, 28 pages (5 pages of English Translation and 23 pages of Official Copy).
Decision on Appeal received for U.S. Appl. No. 14/641,298, mailed on Nov. 1, 2021, 9 pages.
Decision on Appeal received for U.S. Appl. No. 15/784,806, mailed on Sep. 4, 2024, 15 pages.
Decision on Opposition received for Australian Patent Application No. 2018271366, mailed on Mar. 3, 2023, 3 pages.
Decision to Grant received for Japanese Patent Application No. 2024-173274, mailed on Feb. 10, 2025, 3 pages (1 page of English Translation and 2 pages of Official Copy).
Decision to Grant received for Danish Patent Application No. PA201870362, mailed on May 15, 2020, 2 pages.
Decision to Grant received for European Patent Application No. 10763539.3, mailed on Jul. 19, 2018, 3 pages.
Decision to Grant received for European Patent Application No. 10799259.6, mailed on Aug. 31, 2017, 2 pages.
Decision to Grant received for European Patent Application No. 11150223.3, mailed on Aug. 1, 2013, Aug. 1, 2013, 2 pages.
Decision to Grant received for European Patent Application No. 12704175.4, mailed on Jul. 19, 2018, 2 pages.
Decision to Grant received for European Patent Application No. 13175232.1, mailed on Feb. 18, 2016, 2 pages.
Decision to Grant received for European Patent Application No. 15713062.6, mailed on Apr. 11, 2019, 2 pages.
Decision to Grant received for European Patent Application No. 15714698.6, mailed on Apr. 5, 2024, 2 pages.
Decision to Grant received for European Patent Application No. 17810737.1, mailed on Nov. 11, 2021, 2 pages.
Decision to Grant received for European Patent Application No. 18188433.9, mailed on Aug. 13, 2020, 3 pages.
Decision to Grant received for European Patent Application No. 19729395.4, mailed on Dec. 9, 2021, 2 pages.
Decision to Grant received for European Patent Application No. 21728781.2, mailed on Feb. 8, 2024, 3 pages.
Decision to Grant received for European Patent Application No. 22734711.9, mailed on Jan. 7, 2025, 2 pages.
Decision to Grant received for German Patent Application No. 102015208532.5, mailed on Sep. 22, 2020, 10 pages (1 page of English Translation and 9 pages of Official Copy).
Decision to Grant received for Japanese Patent Application No. 2013-262976, mailed on Nov. 16, 2015, 6 pages (3 pages of English Translation and 3 pages of Official Copy).
Decision to Grant received for Japanese Patent Application No. 2019-124728, mailed on Apr. 2, 2021, 4 pages (1 page of English Translation and 3 pages of Official Copy).
Decision to Grant received for Japanese Patent Application No. 2023-571312, mailed on Aug. 29, 2024, 3 pages (1 page of English Translation and 2 pages of Official Copy).
Decision to Grant received for Japanese Patent Application No. 2024-003876, mailed on Sep. 2, 2024, 3 pages (1 page of English Translation and 2 pages of Official Copy).
Decision to Refuse received for European Patent Application No. 20205496.1, mailed on May 12, 2023, 16 pages.
Decision to Refuse received for Japanese Patent Application No. 2013-503731, mailed on Jun. 23, 2014, 4 pages (2 pages of English Translation and 2 pages of Official Copy).
Decision to Refuse received for Japanese Patent Application No. 2022-116534, mailed on Jan. 29, 2024, 5 pages (2 pages of English Translation and 3 pages of Official Copy).
Dolan Tim, "How to Make a Laptop Webcam into a Document Camera - IPEVO Mirror- Cam Review", Retrieved from the internet: URL: https://www.youtube.com/watch?v =- K8jyZ1hbbg, Aug. 29, 2020, 1 page.
Esther, "Instructions for Kobo Books: How to change to scrolling mode and do table of contents navigation - Google Groups", XP055513050, retrieved from the Internet: URL: https://groups.google.com/forum/print/msg/viphone/- dkqODh_31N8acJK2dGPe8J?ctz=4607561_48_52_123900_ 48_ 436380 [retrieved on 2018-10-05]., Aug. 28, 2010, 3 Pages.
Evaluation Report for Utility Model Patent received for Chinese Patent Application No. 201620051290.7, completed on Sep. 19, 2016, 11 pages (6 pages of English translation and 5 pages of Official Copy).
Ex-Parte Quayle Action received for U. S. U.S. Appl. No. 17/121,610, mailed on Dec. 9, 2021, 7 pages.
Examiner Initiated-Interview Summary received for U.S. Appl. No. 16/528,941, mailed on Dec. 1, 2020, 2 pages.
Examiner Interview Summary received for U.S. Appl. No. 17/903,946, mailed on Jun. 28, 2023, 2 pages.

(56) References Cited

OTHER PUBLICATIONS

Examiner-Initiated Interview Summary received for U.S. Appl. No. 17/950,868, mailed on Jul. 5, 2024, 2 pages.
Examiner-Initiated Interview Summary received for U.S. Patent Application No. 16/859, 101, mailed on Dec. 1, 2021, 2 pages.
Examiner-Initiated Interview Summary received for U.S. Appl. No. 17/027,373, mailed on Mar. 31, 2022, 4 pages.
Examiner's Answer to Appeal Brief received for U.S. Appl. No. 14/641,298, mailed on Mar. 22, 2021, 19 pages.
Examiner's Answer to Appeal Brief received for U.S. Appl. No. 15/784,806, mailed on Dec. 22, 2023, 27 pages.
Examiner's Initiated Interview Summary received for U.S. Appl. No. 14/641,298, mailed on Mar. 10, 2020, 4 pages.
Examiner-Initiated Interview Summary received for U.S. Appl. No. 18/499,848, mailed on Feb. 14, 2025, 3 pages.
Examiner's Pre-Review Report received for Japanese Patent Application No. 2014- 212867, mailed on Nov. 4, 2016, 5 pages (2 pages of English Translation and 3 pages of Official Copy).
Ex-Parte Quayle Action received for U.S. Appl. No. 17/903,946, mailed on Aug. 4, 2023, 4 pages.
Extended European Search Report (includes Partial European Search Report and European Search Opinion) received for European Patent Application No. 11150223.3, mailed on May 16, 2011, 7 pages.
Extended European Search Report (includes Partial European Search Report and European Search Opinion) received for European Patent Application No. 13175232.1 mailed on Oct. 21, 2013, 7 pages.
Extended European Search Report received for European Patent Application No. 17810737.1, mailed on Oct. 28, 2019, 11 pages.
Extended European Search Report received for European Patent Application No. 18185408.4, mailed on Oct. 17, 2018, 10 Pages.
Extended European Search Report received for European Patent Application No. 18188433.9, mailed on Oct. 29, 2018, 8 pages.
Extended European Search Report received for European Patent Application No. 20166552.8, mailed on Jun. 12, 2020, 9 pages.
Extended European Search Report received for European Patent Application No. 20205496.1, mailed on Mar. 11, 2021, 11 pages.
Extended European Search Report received for European Patent Application No. 21206800.1, mailed on Jan. 24, 2022, 8 pages.
Extended European Search Report received for European Patent Application No. 23172038.4, mailed on Oct. 11, 2023, 10 pages.
Extended European Search Report received for European Patent Application No. 23203414.0, mailed on Jan. 26, 2024, 10 pages.
Extended European Search Report received for European Patent Application No. 24159026.4, mailed on Jul. 10, 2024, 9 pages.
Extended European Search Report received for European Patent Application No. 24160234.1, mailed on May 28, 2024, 6 pages.
Extended European Search Report received for European Patent Application No. 24164409.5, mailed on Jun. 14, 2024, 5 pages.
Extended European Search Report received for European Patent Application No. 24215184.3, mailed on Jan. 24, 2025, 11 pages.
Fahey M., "The iPad Blows Up iPhone Apps Real Good", Available at <www.kotaku.com.au/2010/01/the-ipad-blows-up-iphone-apps-real-good/>, Jan. 28, 2010, 3 pages.
Fehily C., "Visual QuickStart Guide: Microsoft Windows 7", Peachpit Press, Sep. 8, 2009, pp. x,34-37, 40, 71, 76, and 267.
Final Office Action received for U.S. Appl. No. 10/179,775, mailed on Apr. 5, 2006, 14 Pages.
Final Office Action received for U.S. Appl. No. 10/179,775, mailed on Aug. 16, 2013, 12 pages.
Final Office Action received for U.S. Appl. No. 10/179,775, mailed on Jul. 8, 2009, 11 pages.
Final Office Action received for U.S. Appl. No. 10/179,775, mailed on Jun. 22, 2010, 13 Pages.
Final Office Action received for U.S. Appl. No. 10/179,775, mailed on May 22, 2015, 15 pages.
Final Office Action received for U.S. Appl. No. 10/179,775, mailed on Oct. 8, 2008, 12 pages.
Final Office Action received for U.S. Appl. No. 12/789,426, mailed on Oct. 10, 2013, Oct. 10, 2013, 9 pages.

Final Office Action received for U.S. Appl. No. 12/794,766, mailed on Nov. 26, 2012, 23 pages.
Final Office Action Received for U.S. Appl. No. 12/843,814, mailed on Apr. 23, 2015, 28 pages.
Final Office Action Received for U.S. Appl. No. 12/843,814, mailed on Jan. 31, 2014, 20 pages.
Final Office Action received for U.S. Appl. No. 12/843,814, mailed on Nov. 14, 2012, Nov. 14, 2012, 13 pages.
Final Office Action Received for U.S. Appl. No. 12/890,472, mailed on Feb. 6, 2013, Feb. 6, 2013, 10 pages.
Final Office Action Received for U.S. Appl. No. 12/890,482, mailed on Sep. 12, 2013, Sep. 27, 2012, 10 pages.
Final Office Action Received for U.S. Appl. No. 12/890,489, mailed on Aug. 14, 2013, Aug. 14, 2013, 9 pages.
Final Office Action Received for U.S. Appl. No. 12/890,499, mailed on Jul. 8, 2013, Jul. 8, 2013, 17 pages.
Final Office Action received for U.S. Appl. No. 12/890,499, mailed on May 22, 2017, 17 pages.
Final Office Action received for U.S. Appl. No. 12/890,499, mailed on Oct. 19, 2015, 14 pages.
Final Office Action Received for U.S. Appl. No. 13/077,850, mailed on Nov. 7, 2013, Nov. 7, 2013, 14 pages.
Final Office Action Received for U.S. Appl. No. 13/077,855, mailed on Mar. 17, 2014, 11 pages.
Final Office Action Received for U.S. Appl. No. 13/077,855, mailed on Nov. 7, 2013, Nov. 7, 2013, 14 pages.
Final Office Action Received for U.S. Appl. No. 13/077,862, mailed on Nov. 8, 2013, Nov. 8, 2013, 15 pages.
Final Office Action received for U.S. Appl. No. 13/077,862, mailed on Oct. 22, 2015, 16 pages.
Final Office Action Received for U.S. Appl. No. 13/077,867, mailed on May 23, 2013, May 23, 2013, 10 pages.
Final Office Action received for U.S. Appl. No. 13/077,874, mailed on Dec. 3, 2014, 23 pages.
Final Office Action received for U.S. Appl. No. 13/077,874, mailed on May 5, 2016, 26 pages.
Final Office Action received for U.S. Appl. No. 13/333,909, mailed on Dec. 5, 2013, Dec. 5, 2013, 24 pages.
Final Office Action received for U.S. Appl. No. 14/263,889, mailed on Jan. 4, 2016, 9 pages.
Final Office Action received for U.S. Appl. No. 14/641,289, mailed on Jul. 1, 2016, 32 pages.
Final Office Action received for U.S. Appl. No. 14/641,298, mailed on Jun. 26, 2020, 50 pages.
Final Office Action received for U.S. Appl. No. 14/641,298, mailed on May 16, 2019, 50 pages.
Final Office Action received for U.S. Appl. No. 14/641,298, mailed on Oct. 4, 2017, 30 pages.
Final Office Action received for U.S. Appl. No. 14/641,304, mailed on Jul. 24, 2018, 19 pages.
Final Office Action received for U.S. Appl. No. 14/641,304, mailed on Oct. 15, 2019, 21 pages.
Final Office Action received for U.S. Appl. No. 15/725,868, mailed on Sep. 27, 2018, 25 pages.
Final Office Action received for U.S. Appl. No. 15/784,806, mailed on Aug. 3, 2020, 33 pages.
Final Office Action received for U.S. Appl. No. 15/784,806, mailed on May 22, 2019, 38 pages.
Final Office Action received for U.S. Appl. No. 15/784,806, mailed on Nov. 9, 2021, 42 pages.
Final Office Action received for U.S. Appl. No. 15/784,806, mailed on Nov. 25, 2022, 52 pages.
Final Office Action received for U.S. Appl. No. 16/528,941, mailed on Jul. 13, 2020, 15 pages.
Final Office Action received for U.S. Appl. No. 16/666,073, mailed on Apr. 17, 2020, 18 pages.
Final Office Action received for U.S. Appl. No. 17/026,818, mailed on Jan. 29, 2021, 21 pages.
Final Office Action received for U.S. Appl. No. 17/332,829, mailed on Feb. 6, 2023, 19 pages.
Final Office Action received for U.S. Appl. No. 17/476,404, mailed on May 5, 2022, 30 pages.

(56) References Cited

OTHER PUBLICATIONS

Final Office Action received for U.S. Appl. No. 17/476,404, mailed on Sep. 12, 2023, 30 pages.
Final Office Action received for U.S. Appl. No. 17/479,897, mailed on Jan. 10, 2023, 15 pages.
Final Office Action received for U.S. Appl. No. 17/483,564, mailed on Apr. 18, 2022, 23 pages.
Final Office Action received for U.S. Appl. No. 17/483,564, mailed on May 25, 2023, 26 pages.
Final Office Action received for U.S. Appl. No. 17/483,679, mailed on Feb. 6, 2024, 45 pages.
Final Office Action received for U.S. Appl. No. 17/483,679, mailed on Jun. 13, 2023, 33 pages.
Final Office Action received for U.S. Appl. No. 17/483,679, mailed on May 24, 2022, 21 pages.
Final Office Action received for U.S. Appl. No. 17/484,899, mailed on May 12, 2022, 29 pages.
Final Office Action received for U.S. Appl. No. 17/484,899, mailed on Nov. 6, 2023, 39 pages.
Final Office Action received for U.S. Appl. No. 17/666,971, mailed on May 12, 2023, 29 pages.
Final Office Action received for U.S. Appl. No. 17/732,355, mailed on Nov. 3, 2023, 21 pages.
Final Office Action received for U.S. Appl. No. 17/950,868, mailed on Aug. 29, 2024, 13 pages.
Final Office Action received for U.S. Appl. No. 17/950,900, mailed on Jan. 23, 2023, 14 pages.
Final Office Action received for U.S. Appl. No. 17/970,417, mailed on Sep. 18, 2024, 24 pages.
Final Office Action received for U.S. Appl. No. 18/067,350, mailed on Dec. 13, 2023, 44 pages.
Final Office Action received for U.S. Appl. No. 18/067,350, mailed on Oct. 31, 2024, 44 pages.
Final Office Action received for U.S. Appl. No. 18/138,348, mailed on Oct. 18, 2024, 10 pages.
Final Office Action received for U.S. Appl. No. 18/165,144, mailed on Jun. 11, 2024, 32 pages.
Final Office Action received for U.S. Patent Application No. 18/380,116, mailed on Jan. 30, 2025, 17 pages.
Final Office Action received for U.S. Appl. No. 18/165,144, mailed on Feb. 27, 2025, 37 pages.
Final Office Action received for U.S. Appl. No. 18/535,820, mailed on Feb. 27, 2025, 35 pages.
Final Office Action received for U.S. Appl. No. 13/077,855, mailed on Mar. 24, 2016, 19 pages.
Final Office Action Received for U.S. Appl. No. 15/608,866, mailed on Mar. 8, 2019, 36 pages.
G Pad, LG's latest Uls that shine even more on the G-Pad, online available at: http://bungq.com/1014., Nov. 19, 2013, 49 pages (30 pages of English Translation and 19 pages of Official Copy).
Garrison Dr., "An Analysis and Evaluation of Audio Teleconferencing to Facilitate Education at a Distance", Online Available at: https://doi.org/10.1080/08923649009526713, American journal of distance education, Jol. 4, No. 3, Sep. 24, 2009, 14 pages.
Harris et al., "Inside WordPerfect 6 for Windows", New Riders Publishing, 1994, pp. 1104-1108.
Intention to Grant received for Danish Patent Application No. PA201870362, mailed on Feb. 14, 2020, 2 pages.
Intention to Grant received for Danish Patent Application No. PA202070617, mailed on Nov. 15, 2021, 2 pages.
Intention to Grant received for European Patent Application No. 10763539.3, mailed on Mar. 15, 2018, 6 pages.
Intention to Grant received for European Patent Application No. 10799259.6, mailed on Apr. 20, 2017., 8 Pages.
Intention to Grant received for European Patent Application No. 12704175.4, mailed on Mar. 22, 2018, 8 pages.
Intention to Grant received for European Patent Application No. 13175232.1, mailed on Sep. 8, 2015, 7 pages.
Intention to Grant received for European Patent Application No. 15713062.6, mailed on Mar. 25, 2019, 7 pages.
Intention to Grant received for European Patent Application No. 15713062.6, mailed on Oct. 8, 2018, 8 pages.
Intention to Grant received for European Patent Application No. 15714698.6, mailed on Dec. 8, 2023, 9 pages.
Intention to Grant received for European Patent Application No. 17810737.1, mailed on Jul. 5, 2021, 8 pages.
Intention to Grant received for European Patent Application No. 18188433.9, mailed on Apr. 6, 2020, 9 pages.
Intention to Grant received for European Patent Application No. 19729395.4, mailed on Jul. 23, 2021, 10 pages.
Intention to Grant received for European Patent Application No. 20166552.8, mailed on Jun. 29, 2023, 8 pages.
Intention to Grant received for European Patent Application No. 21206800.1, mailed on Jan. 7, 2025, 9 pages.
Intention to Grant received for European Patent Application No. 21728781.2, mailed on Dec. 12, 2023, 9 pages.
Intention to Grant received for European Patent Application No. 21728781.2, mailed on Jul. 28, 2023, 9 pages.
Intention to Grant received for European Patent Application No. 22734711.9, mailed on Sep. 13, 2024, 7 pages.
Intention to Grant received for European Patent Application No. 24160234.1, mailed on Nov. 4, 2024, 9 pages.
Intention to Grant received for European Patent Application No. 24164409.5, mailed on Jan. 14, 2025, 8 pages.
Intention to Grant received for European Patent Application No. 22792995.7, mailed on Feb. 17, 2025, 9 pages.
International Preliminary Report on Patentability received for PCT Patent Application No. PCT/US2018/032396, mailed on Nov. 28, 2019, 9 pages.
International Preliminary Report on Patentability received for PCT Patent Application No. PCT/US2010/050311, mailed on Oct. 18, 2012, 11 pages.
International Preliminary Report on Patentability received for PCT Patent Application No. PCT/US2010/062306, mailed on Jul. 19, 2012, 13 pages.
International Preliminary Report on Patentability received for PCT Patent Application No. PCT/US2010/062314, issued on Jul. 10, 2012, 14 pages.
International Preliminary Report on Patentability received for PCT Patent Application No. PCT/US2012/022401, mailed on Aug. 8, 2013, Jul. 30, 2013, 12 pages.
International Preliminary Report on Patentability Received for PCT Patent Application No. PCT/US2015/019306, mailed on Dec. 15, 2016, 10 pages.
International Preliminary Report on Patentability Received for PCT Patent Application No. PCT/US2015/019309, mailed on Dec. 15, 2016, 10 pages.
International Preliminary Report on Patentability received for PCT Patent Application No. PCT/US2017/035326, mailed on Dec. 20, 2018, 19 pages.
International Preliminary Report on Patentability received for PCT Patent Application No. PCT/US2018/048151, mailed on Apr. 9, 2020, 14 pages.
International Preliminary Report on Patentability received for PCT Patent Application No. PCT/US2019/031202, mailed on Nov. 19, 2020, 13 pages.
International Preliminary Report on Patentability received for PCT Patent Application No. PCT/US2021/031760, mailed on Nov. 24, 2022, 11 pages.
International Preliminary Report on Patentability received for PCT Patent Application No. PCT/US2022/014271, mailed on Aug. 10, 2023, 17 pages.
International Preliminary Report on Patentability received for PCT Patent Application No. PCT/US2022/029261, mailed on Nov. 30, 2023, 12 pages.
International Preliminary Report on Patentability received for PCT Patent Application No. PCT/US2022/029273, mailed on Nov. 30, 2023, 14 pages.
International Preliminary Report on Patentability received for PCT Patent Application No. PCT/US2022/029580, mailed on Nov. 30, 2023, 14 pages.

(56) References Cited

OTHER PUBLICATIONS

International Preliminary Report on Patentability received for PCT Patent Application No. PCT/US2022/044592, mailed on Apr. 4, 2024, 21 pages.
International Preliminary Report on Patentability received for PCT Patent Application No. PCT/US2023/017280, mailed on Oct. 17, 2024, 15 pages.
International Preliminary Report on Patentability received for PCT Patent Application No. PCT/US2023/020569, mailed on Nov. 21, 2024, 16 pages.
International Search Report and Written Opinion received for PCT Application No. PCT/US2015/019309, mailed on Jun. 25, 2015, 15 pages.
International Search Report and Written Opinion received for PCT Patent Application No. PCT/US2010/050311, mailed on Aug. 24, 2011, 15 pages.
International Search Report and Written Opinion received for PCT Patent Application No. PCT/US2010/062306, mailed on May 17, 2011, 18 pages.
International Search Report and Written Opinion received for PCT Patent Application No. PCT/US2010/062314, mailed on Jun. 22, 2011, Jun. 22, 2011, 17 pages.
International Search Report and Written Opinion received for PCT Patent Application No. PCT/US2012/022401, Jul. 6, 2012, 16 pages.
International Search Report and Written Opinion received for PCT Patent Application No. PCT/US2015/019306, mailed on Jun. 17, 2015, 15 pages.
International Search Report and Written Opinion received for PCT Patent Application No. PCT/US2017/035326, mailed on Oct. 5, 2017, 22 pages.
International Search Report and Written Opinion received for PCT Patent Application No. PCT/US2018/032396, mailed on Jul. 30, 2018, 13 pages.
International Search Report and Written Opinion received for PCT Patent Application No. PCT/US2018/048151, mailed on Jan. 10, 2019, 23 pages.
International Search Report and Written Opinion received for PCT Patent Application No. PCT/US2019/031202, mailed on Oct. 4, 2019, 19 pages.
International Search Report and Written Opinion received for PCT Patent Application No. PCT/US2021/031760, mailed on Sep. 16, 2021, 18 pages.
International Search Report and Written Opinion received for PCT Patent Application No. PCT/US2022/014271, mailed on Jul. 4, 2022, 23 pages.
International Search Report and Written Opinion received for PCT Patent Application No. PCT/US2022/029261, mailed on Oct. 20, 2022, 18 pages.
International Search Report and Written Opinion received for PCT Patent Application No. PCT/US2022/029273, mailed on Oct. 27, 2022, 19 pages.
International Search Report and Written Opinion received for PCT Patent Application No. PCT/US2022/029580, mailed on Nov. 7, 2022, 20 pages.
International Search Report and Written Opinion received for PCT Patent Application No. PCT/US2022/044592, mailed on Mar. 14, 2023, 22 pages.
International Search Report and Written Opinion received for PCT Patent Application No. PCT/US2023/017280, mailed on Jun. 26, 2023, 20 pages.
International Search Report and Written Opinion received for PCT Patent Application No. PCT/US2023/020569, mailed on Nov. 13, 2023, 23 pages.
International Search Report and Written Opinion received for PCT Patent Application No. PCT/US2023/032792, mailed on Jan. 19, 2024, 15 pages.
International Search Report and Written Opinion received for PCT Patent Application No. PCT/US2023/032911, mailed on Jan. 4, 2024, 18 pages.
International Search Report and Written Opinion received for PCT Patent Application No. PCT/US2023/033372, mailed on Jan. 12, 2024, 21 pages.
International Search Report and Written Opinion received for PCT Patent Application No. PCT/US2024/017017, mailed on Aug. 2, 2024, 27 pages.
International Search Report and Written Opinion received for PCT Patent Application No. PCT/US2024/023231, mailed on Oct. 23, 2024, 24 pages.
International Search Report received for PCT Patent Application No. PCT/US95/11025, mailed on Jan. 3, 1996, 3 pages.
Invitation to Pay Additional Fee received for PCT Patent Application No. PCT/US2017/035326, mailed on Aug. 7, 2017, 2 pages.
Invitation to Pay Additional Fees and Partial International Search Report received for PCT Patent Application No. PCT/US2010/050311, mailed on Dec. 21, 2010, 6 pages.
Invitation to Pay Additional Fees and Partial International Search Report received for PCT Patent Application No. PCT/US2022/014271, mailed on May 12, 2022, 20 pages.
Invitation to Pay Additional Fees and Partial International Search Report received for PCT Patent Application No. PCT/US2022/029261, mailed on Aug. 29, 2022, 16 pages.
Invitation to Pay Additional Fees and Partial International Search Report received for PCT Patent Application No. PCT/US2022/029580, mailed on Sep. 5, 2022, 13 pages.
Invitation to Pay Additional Fees and Partial International Search Report received for PCT Patent Application No. PCT/US2023/020569, mailed on Sep. 21, 2023, 14 pages.
Invitation to Pay Additional Fees and Partial International Search Report received for PCT Patent Application No. PCT/US2023/033372, mailed on Nov. 22, 2023, 13 pages.
Invitation to Pay Additional Fees and Partial International Search Report received for PCT Patent Application No. PCT/US2024/023231, mailed on Aug. 29, 2024, 17 pages.
Invitation to Pay Additional Fees received for PCT Patent Application No. PCT/US2012/022401, May 4, 2012, 8 pages.
Invitation to Pay Additional Fees received for PCT Patent Application No. PCT/US2018/048151, mailed on Nov. 6, 2018, 18 pages.
Invitation to Pay Additional Fees received for PCT Patent Application No. PCT/US2019/031202, mailed on Aug. 8, 2019, 12 pages.
Invitation to Pay Additional Fees received for PCT Patent Application No. PCT/US2022/029273, mailed on Sep. 2, 2022, 13 pages.
Invitation to Pay Additional Fees received for PCT Patent Application No. PCT/US2022/044592, mailed on Jan. 16, 2023, 21 pages.
Invitation to Pay Additional Fees received for PCT Patent Application No. PCT/US2024/017017, mailed on May 15, 2024, 3 pages.
Invitation to Pay Search Fees received for European Patent Application No. 15714698.6, mailed on Dec. 16, 2022, 4 pages.
Invitation to Pay Search Fees received for European Patent Application No. 21728781.2, mailed on Dec. 2, 2022, 3 pages.
Jiutian Technology, "Windows 8 Chinese version from entry to proficiency", Jan. 1, 2014, 5 pages (Official Copy Only). {See Communication Under Rule 37 CFR § 1.98(a)(3)}.
Kimura Ryoji, "Keynote presentation practice guide for iPad & iPhone", K.K. Rutles, first edition, Feb. 29, 2012, 4 pages (Official Copy Only). {See Communication Under Rule 37 CFR § 1.98(a)(3)}.
King Adrian, "Inside Windows 95", Microsoft Press., Aug. 1994, pp. 176-182.
Koyama Kaori, "Mac Fan Macintosh Master Book Mac Os X v10.4 "Tiger" & iLife", '06 version, Mainichi Communications Inc. Nobuyuki NAKAGAWA, Jul. 9, 2007, 4 pages (Official Copy Only). {See Communication Under Rule 37 CFR § 1.98(a)(3)}.
Larson Tom, "How to Turn your Webcam into a Document Camera", Retrieved from the Internet: URL: https://www.youtube.com/watchv=UlaW22FxRZM, Nov. 7, 2020, 1 page.
"Lg G Pad 8.3 Tablet Q Remote User", Available at: <https://mushroomprincess.tistory.com/1320>, Dec. 26, 2013, 37 pages (20 pages of English Translation and 17 pages of Official Copy).
"Microsoft Windows 3.1", available at: http://www.guidebookgallery.org/screenshots/win31, 1992, pp. 1-31.
Minutes of Oral Hearing received for German Patent Application No. 102015208532.5, mailed on Dec. 13, 2019, 21 pages (3 pages of English Translation and 18 pages of Official Copy).

(56) References Cited

OTHER PUBLICATIONS

Minutes of the Oral Proceedings received for European Patent Application No. 19729395.4, mailed on Jul. 21, 2021, 6 pages.
Minutes of the Oral Proceedings received for European Patent Application No. 20205496.1, mailed on May 9, 2023, 7 pages.
Moth D., "Share Code - Write Code Once for Both Mobile and Desktop Apps", MSDN Magazine, http://msdn.microsoft.com/en-US/magazine/cc163387.aspx, retrieved on Apr. 20, 2011, Jul. 2007, 11 pages.
Mr Analytical, "Samsung Gear S3 App Launcher Widget - App Review", Available Online at <https://www.youtube.com/watch?v=HEfTv17peik>, Dec. 26, 2016, 5 pages.
Myoko Mori, "Line Perfect Guidebook [Revised Version]", Sotec Co. Ltd., Dec. 31, 2013, 5 pages (Official Copy Only). {See Communication Under Rule 37 CFR § 1.98(a)(3)}.
Non-Final Office Action received for U.S. Appl. No. 16/035,422, mailed on Nov. 30, 2018, 13 Pages.
Non-Final Office Action received for U.S Patent Application No. 17/157, 166, mailed on Jul. 9, 2021, 12 pages.
Non-Final Office Action received for U.S. Appl. No. 10/179,775, mailed on Aug. 14, 2014, 13 Pages.
Non-Final Office Action received for U.S. Appl. No. 10/179,775, mailed on Dec. 23, 2009, 13 Pages.
Office Action received for U.S. Appl. No. 10/179,775, mailed on Dec. 23, 2015, 14 Pages.
Office Action received for U.S. Appl. No. 10/179,775, mailed on Jan. 22, 2009, 11 pages.
Office Action received for U.S. Appl. No. 10/179,775, mailed on Jul. 2, 2007, 12 pages.
Office Action received for U.S. Appl. No. 10/179,775, mailed on Mar. 14, 2008, 11 pages.
Office Action received for U.S. Appl. No. 10/179,775, mailed on Mar. 28, 2013, 11 pages.
Office Action received for U.S. Appl. No. 10/179,775, mailed on Oct. 12, 2005, 16 Pages.
Office Action received for U.S. Appl. No. 14/456,852, mailed on Jul. 1, 2015, 19 pages.
Office Action received for U.S. Appl. No. 14/641,289, mailed on Jul. 16, 2015, 31 pages.
Office Action received for U.S. Appl. No. 14/641,289, mailed on Mar. 11, 2016, 26 pages.
Office Action received for U.S. Appl. No. 12/789,426, mailed on Apr. 4, 2013, Apr. 4, 2013, 8 pages.
Office Action received for U.S. Appl. No. 12/789,436, mailed on Jun. 25, 2012, Jun. 25, 2012, 23 pages.
Non-Final Office Action received for U.S. Appl. No. 12/794,766, mailed on Aug. 5, 2013, 9 pages.
Non-Final Office Action received for U.S. Appl. No. 12/794,766, mailed on Jun. 25, 2012, 18 pages.
Non-Final Office Action received for U.S. Appl. No. 12/794,768, mailed on Oct. 10, 2012, 14 pages.
Non-Final Office Action received for U.S. Appl. No. 12/843,814, mailed on Apr. 27, 2012, Apr. 27, 2012, 26 pages.
Non-Final Office Action received for U.S. Appl. No. 12/843,814, mailed on May 28, 2013, May 28, 2013, 17 pages.
Non-Final Office Action received for U.S. Appl. No. 12/843,814, mailed on Oct. 8, 2014, 14 pages.
Non-Final Office Action received for U.S. Appl. No. 12/890,472, mailed on Jul. 5, 2012, Jul. 5, 2012, 9 pages.
Non-Final Office Action received for U.S. Appl. No. 12/890,482, mailed on Sep. 27, 2012, Sep. 12, 2013, 11 pages.
Non-Final Office Action received for U.S. Appl. No. 12/890,489, mailed on Nov. 6, 2014, 22 pages.
Non-Final Office Action received for U.S. Appl. No. 12/890,489, mailed on Nov. 30, 2012, Nov. 30, 2012, 8 pages.
Non-Final Office Action received for U.S. Appl. No. 12/890,499, mailed on Apr. 6, 2015, 14 pages.
Non-Final Office Action received for U.S. Appl. No. 12/890,499, mailed on Nov. 1, 2016, 16 pages.
Non-Final Office Action received for U.S. Appl. No. 12/890,499, mailed on Nov. 26, 2012, Nov. 26, 2012, 12 pages.
Non-Final Office Action received for U.S. Appl. No. 12/890,499, mailed on Sep. 11, 2014, 11 pages.
Non-Final Office Action received for U.S. Appl. No. 13/077,850, mailed on Mar. 28, 2013, Mar. 28, 2013, 15 pages.
Non-Final Office Action received for U.S. Appl. No. 13/077,850, mailed on Sep. 10, 2015, 14 pages.
Non-Final Office Action received for U.S. Appl. No. 13/077,855, mailed on Aug. 13, 2015, 13 pages.
Non-Final Office Action received for U.S. Appl. No. 13/077,855, mailed on Mar. 28, 2013, Mar. 28, 2013, 15 pages.
Non-Final Office Action received for U.S. Appl. No. 13/077,862, mailed on Dec. 29, 2014, 11 pages.
Non-Final Office Action received for U.S. Appl. No. 13/077,862, mailed on Jul. 17, 2020, 20 pages.
Non-Final Office Action received for U.S. Appl. No. 13/077,862, mailed on Mar. 15, 2013, Mar. 15, 2013, 10 pages.
Non-Final Office Action received for U.S. Appl. No. 13/077,862, mailed on Nov. 21, 2019, 18 pages.
Office Action received for U.S. Appl. No. 13/077,867, mailed on Dec. 21, 2012, Dec. 21, 2012, 9 pages.
Office Action received for U.S. Appl. No. 13/077,867, mailed on Jul. 20, 2012, Jul. 20, 2012, 10 pages.
Office Action received for U.S. Appl. No. 13/077,874, mailed on Jun. 19, 2014, 15 pages.
Office Action received for U.S. Appl. No. 13/333,909, mailed on Mar. 19, 2013, Mar. 19, 2013, 18 pages.
Office Action received for U.S. Appl. No. 14/263,889, mailed on Jul. 2, 2015, 9 pages.
Office Action received for U.S. Appl. No. 14/263,889, mailed on Jul. 26, 2016, 11 pages.
Office Action received for U.S. Appl. No. 14/641,298, mailed on Mar. 6, 2017, 26 pages.
Office Action received for U.S. Appl. No. 14/641,298, mailed on Nov. 29, 2019, 47 pages.
Office Action received for U.S. Appl. No. 14/641,298, mailed on Sep. 19, 2018, 41 pages.
Office Action received for U.S. Appl. No. 14/641,304, mailed on Feb. 27, 2019, 18 pages.
Office Action received for U.S. Appl. No. 14/641,304, mailed on Mar. 4, 2020, 21 pages.
Office Action received for U.S. Appl. No. 14/641,304, mailed on Sep. 11, 2017, 18 pages.
Office Action received for U.S. Appl. No. 15/608,866, mailed on Nov. 2, 2018, 46 pages.
Received for U.S. Appl. No. 15/725,868, mailed on Apr. 27, 2018, 17 pages.
Non-Final Office Action received for U.S. Appl. No. 15/725,868, mailed on Feb. 12, 2019, 26 pages.
Non-Final Office Action received for U.S. Appl. No. 15/784,806, mailed on Apr. 30, 2021, 42 pages.
Non-Final Office Action received for U.S. Appl. No. 15/784,806, mailed on Jan. 4, 2019, 27 pages.
Non-Final Office Action received for U.S. Appl. No. 15/784,806, mailed on Mar. 13, 2020, 36 pages.
Non-Final Office Action received for U.S. Appl. No. 15/784,806, mailed on Oct. 5, 2022, 41 pages.
Non-Final Office Action received for U.S. Appl. No. 16/109,552, mailed on Oct. 17, 2018, 16 pages.
Non-Final Office Action received for U.S. Appl. No. 16/144,572, mailed on Nov. 30, 2018, 8 pages.
Non-Final Office Action received for U.S. Appl. No. 16/383,403, mailed on Aug. 23, 2019, 10 pages.
Non-Final Office Action received for U.S. Appl. No. 16/528,941, mailed on Dec. 7, 2020, 15 pages.
Non-Final Office Action received for U.S. Appl. No. 16/528,941, mailed on Jan. 30, 2020, 14 pages.
Non-Final Office Action received for U.S. Appl. No. 16/666,073, mailed on Dec. 10, 2019, 16 pages.
Non-Final Office Action received for U.S. Appl. No. 16/790,619, mailed on May 4, 2020, 13 pages.

(56) References Cited

OTHER PUBLICATIONS

Non-Final Office Action received for U.S. Appl. No. 16/799,481, mailed on May 1, 2020, 13 pages.
Non-Final Office Action received for U.S. Patent Application No. 16/859, 101, mailed on Aug. 5, 2021, 19 pages.
Non-Final Office Action received for U.S. Appl. No. 17/026,818, mailed on Nov. 25, 2020, 20 pages.
Non-Final Office Action received for U.S. Appl. No. 17/027,373, mailed on Feb. 2, 2022, 17 pages.
Non-Final Office Action received for U.S. Appl. No. 17/121,610, mailed on May 13, 2021, 17 pages.
Non-Final Office Action received for U.S. Appl. No. 17/223,794, mailed on Jun. 16, 2021, 32 pages.
Non-Final Office Action received for U.S. Appl. No. 17/332,829, mailed on Aug. 1, 2022, 17 pages.
Non-Final Office Action received for U.S. Appl. No. 17/476,404, mailed on Feb. 8, 2022, 26 pages.
Non-Final Office Action received for U.S. Appl. No. 17/476,404, mailed on Mar. 30, 2023, 29 pages.
Non-Final Office Action received for U.S. Appl. No. 17/476,404, mailed on Sep. 14, 2022, 31 pages.
Non-Final Office Action received for U.S. Appl. No. 17/479,897, mailed on Apr. 25, 2023, 14 pages.
Non-Final Office Action received for U.S. Appl. No. 17/479,897, mailed on Aug. 30, 2022, 10 pages.
Non-Final Office Action received for U.S. Appl. No. 17/482,977, mailed on Oct. 13, 2022, 20 pages.
Non-Final Office Action received for U.S. Appl. No. 17/482,987, mailed on Jan. 18, 2022, 25 pages.
Non-Final Office Action received for U.S. Appl. No. 17/483,542, mailed on Jan. 31, 2023, 14 pages.
Non-Final Office Action received for U.S. Appl. No. 17/483,542, mailed on Sep. 22, 2022, 18 pages.
Non-Final Office Action received for U.S. Appl. No. 17/483,549, mailed on Jan. 11, 2022, 5 pages.
Non-Final Office Action received for U.S. Appl. No. 17/483,564, mailed on Jan. 6, 2022, 23 pages.
Non-Final Office Action received for U.S. Appl. No. 17/483,564, mailed on Nov. 28, 2022, 24 pages.
Non-Final Office Action received for U.S. Appl. No. 17/483,679, mailed on Dec. 9, 2022, 31 pages.
Non-Final Office Action received for U.S. Appl. No. 17/483,679, mailed on Feb. 1, 2022, 19 pages.
Non-Final Office Action received for U.S. Appl. No. 17/483,679, mailed on Sep. 13, 2023, 32 pages.
Non-Final Office Action received for U.S. Appl. No. 17/484,899, mailed on Jan. 24, 2022, 24 pages.
Non-Final Office Action received for U.S. Appl. No. 17/484,899, mailed on Jun. 14, 2023, 41 pages.
Non-Final Office Action received for U.S. Appl. No. 17/484,899, mailed on Mar. 21, 2024, 42 pages.
Non-Final Office Action received for U.S. Appl. No. 17/484,907, mailed on Nov. 19, 2021, 24 pages.
Non-Final Office Action received for U.S. Appl. No. 17/666,971, mailed on Dec. 8, 2022, 26 pages.
Non-Final Office Action received for U.S. Appl. No. 17/684,843, mailed on Aug. 11, 2023, 23 pages.
Non-Final Office Action received for U.S. Appl. No. 17/732,204, mailed on Aug. 4, 2023, 18 pages.
Non-Final Office Action received for U.S. Appl. No. 17/732,355, mailed on Aug. 4, 2023, 19 pages.
Non-Final Office Action received for U.S. Patent Application No. 17/740, 104, mailed on Aug. 2, 2023, 15 pages.
Non-Final Office Action received for U.S. Appl. No. 17/872,736, mailed on May 11, 2023, 17 pages.
Non-Final Office Action received for U.S. Appl. No. 17/903,946, mailed on Apr. 14, 2023, 17 pages.
Non-Final Office Action received for U.S. Appl. No. 17/950,868, mailed on Apr. 24, 2024, 16 pages.
Non-Final Office Action received for U.S. Appl. No. 17/950,900, mailed on Dec. 1, 2022, 14 pages.
Non-Final Office Action received for U.S. Appl. No. 17/970,417, mailed on Apr. 10, 2024, 16 pages.
Non-Final Office Action received for U.S. Appl. No. 18/067,350, mailed on Aug. 3, 2023, 41 pages.
Non-Final Office Action received for U.S. Appl. No. 18/067,350, mailed on May 28, 2024, 43 pages.
Non-Final Office Action received for U.S. Appl. No. 18/138,348, mailed on Apr. 30, 2024, 16 pages.
Non-Final Office Action received for U.S. Patent Application No. 18/165, 144, mailed on Dec. 27, 2023, 20 pages.
Non-Final Office Action received for U.S. Patent Application No. 18/165, 144, mailed on Sep. 11, 2024, 25 pages.
Non-Final Office Action received for U.S. Patent Application No. 18/380, 116, mailed on Jul. 18, 2024, 16 pages.
Non-Final Office Action received for U.S. Appl. No. 18/389,655, mailed on Aug. 23, 2024, 23 pages.
Non-Final Office Action received for U.S. Appl. No. 18/422,571, mailed on Sep. 26, 2024, 19 pages.
Non-Final Office Action received for U.S. Appl. No. 18/499,848, mailed on Jan. 27, 2025, 18 pages.
Non-Final Office Action received for U.S. Appl. No. 17/745,680, mailed on Feb. 20, 2025, 28 pages.
Non-Final Office Action received for U.S. Appl. No. 18/535,820, mailed on Sep. 25, 2024, 27 pages.
Non-Final Office Action received for U.S. Appl. No. 13/077,874, mailed on Dec. 3, 2015, 23 pages.
Non-Final Office Action received for U.S. Appl. No. 14/253,494, mailed on Dec. 30, 2015, 14 pages.
Notice of Acceptance received for Australian Patent Application No. 2010339636, mailed on Jul. 3, 2014, 2 pages.
Notice of Acceptance Received for Australian Patent Application No. 2010339698, mailed on Dec. 8, 2014, 2 pages.
Notice of Acceptance received for Australian Patent Application No. 2010350749, mailed on Jan. 13, 2015, 3 pages.
Notice of Acceptance received for Australian Patent Application No. 2012209199, mailed on Jan. 27, 2016, 3 pages.
Notice of Acceptance received for Australian Patent Application No. 2015201127, mailed on Feb. 14, 2017, 3 pages.
Notice of Acceptance received for Australian Patent Application No. 2015201884, mailed on Oct. 4, 2016, 3 pages.
Notice of Acceptance received for Australian Patent Application No. 2018271366, mailed on Mar. 31, 2023, 3 pages.
Notice of Acceptance received for Australian Patent Application No. 2019266225, mailed on Dec. 23, 2020, 3 pages.
Notice of Acceptance received for Australian Patent Application No. 2020239711, mailed on Dec. 16, 2021, 3 pages.
Notice of Acceptance received for Australian Patent Application No. 2021200789, mailed on Feb. 26, 2021, 3 pages.
Notice of Acceptance received for Australian Patent Application No. 2021201243, mailed on Feb. 23, 2023, 3 pages.
Notice of Acceptance received for Australian Patent Application No. 2021203903, mailed on May 25, 2022, 3 pages.
Notice of Acceptance received for Australian Patent Application No. 2022201532, mailed on May 22, 2023, 3 pages.
Notice of Acceptance received for Australian Patent Application No. 2023204396, mailed on Apr. 15, 2024, 3 pages.
Notice of Acceptance received for Australian Patent Application No. 2023248185, mailed on Jan. 23, 2024, 3 pages.
Notice of Acceptance received for Australian Patent Application No. 2024202768, mailed on Jun. 4, 2024, 3 pages.
Notice of Allowance received for Australian Patent Application No. 2016202837, mailed on Apr. 21, 2017, 3 Pages.
Notice of Allowance received for Australian Patent Application No. 2022228207, mailed on Jul. 3, 2023, 3 pages.
Notice of Allowance received for Brazilian Patent Application No. BR112012025746-3, mailed on Jul. 6, 2021, 3 pages (1 page of English Translation and 2 pages of Official Copy).
Notice of Allowance received for Chinese Patent Application No. 201910400179.2, mailed on Oct. 9, 2022, 4 pages (1 page of English Translation and 3 pages of Official Copy).

(56) References Cited

OTHER PUBLICATIONS

Notice of Allowance received for Chinese Patent Application No. 201010602653.9, mailed on Nov. 15, 2014, 2 pages (1 page of English Translation and 1 page of Official Copy).
Notice of Allowance received for Chinese Patent Application No. 2010106600623.4, mailed on Aug. 11, 2014, 4 pages (1 page of English Translation and 3 pages of Official Copy).
Notice of Allowance received for Chinese Patent Application No. 201080063864.8, mailed on Jan. 15, 2016, 4 pages (2 pages of English Translation and 2 pages of Official Copy).
Notice of Allowance received for Chinese Patent Application No. 201080064125.0, mailed on Sep. 8, 2015, 3 pages (1 page of English Translation and 2 pages of Official Copy).
Notice Of Allowance received for Chinese Patent Application No. 201280006317.5, mailed on Feb. 17, 2017, 2 pages (1 page of English Translation and 1 page of Official Copy).
Notice of Allowance received for Chinese Patent Application No. 201410575145.4, mailed on May 10, 2018, 3 pages (1 page of English Translation and 2 pages of Official Copy).
Notice of Allowance received for Chinese Patent Application No. 201620051290.7, mailed on Jun. 22, 2016, 2 Pages (Official Copy only). {See Communication Under Rule 37 CFR § 1.98(a)(3)}.
Notice of Allowance received for Chinese Patent Application No. 201710240907.9, mailed on Nov. 25, 2019, 2 pages (1 page of English Translation and 1 page of Official Copy).
Notice of Allowance received for Chinese Patent Application No. 201780033771.2, mailed on Feb. 3, 2021, 2 pages (1 page of English Translation and 1 page of Official Copy).
Notice of Allowance received for Chinese Patent Application No. 201880056514.5, mailed on Jan. 11, 2021, 2 pages (1 page of English Translation and 1 page of Official Copy).
Notice of Allowance received for Chinese Patent Application No. 201910055588.3, mailed on Mar. 2, 2022, 2 pages (1 page of English Translation and 1 page of Official Copy).
Notice of Allowance received for Chinese Patent Application No. 201910400180.5, mailed on Nov. 5, 2020, 2 pages (1 page of English Translation and 1 page of Official Copy).
Notice of Allowance received for Chinese Patent Application No. 201910704856.X, mailed on Sep. 30, 2024, 4 pages (1 page of English Translation and 3 pages of Official Copy).
Notice of Allowance received for Chinese Patent Application No. 202011243876.0, mailed on Sep. 8, 2021, 4 pages (1 page of English Translation and 3 pages of Official Copy).
Notice of Allowance received for Chinese Patent Application No. 202110328601.5, mailed on Jul. 5, 2023, 5 pages (1 page of English Translation and 4 pages of Official Copy).
Notice of Allowance received for Chinese Patent Application No. 202110409273.1, mailed on Aug. 2, 2022, 4 pages (1 page of English Translation and 3 pages of Official Copy).
Notice of Allowance received for Chinese Patent Application No. 202311042451.7, mailed on May 15, 2024, 4 pages (1 page of English Translation and 3 pages of Official Copy).
Notice of Allowance received for Chinese Patent Application No. 202311831154.0, mailed on Jan. 17, 2025, 4 pages (1 page of English Translation and 3 pages of Official Copy).
Notice of Allowance received for Chinese Patent Application No. 201520364847.8, mailed on Nov. 5, 2015, 9 pages (7 page of English Translation and 2 pages of Official Copy).
Notice of Allowance received for Japanese Patent Application No. 2014-212867, mailed on Mar. 30, 2018, 3 pages (1 page of English Translation and 2 pages of Official Copy).
Notice of Allowance received for Japanese Patent Application No. 2015-095183, mailed on Apr. 21, 2017., 3 pages. (Official Copy Only). {See Communication Under Rule 37 CFR § 1.98(a)(3)}.
Notice of Allowance received for Japanese Patent Application No. 2016-130565, mailed on Aug. 28, 2017., 3 pages (Official Copy Only). {See Communication Under Rule 37 CFR § 1.98(a)(3)}.
Notice of Allowance received for Japanese Patent Application No. 2016-151497, mailed on Jun. 4, 2018, 4 pages (1 page of English Translation and 3 pages of Official Copy).
Notice of Allowance received for Japanese Patent Application No. 2017-101107, mailed on Jun. 3, 2019, 5 pages (1 page of English Translation and 4 pages of Official Copy).
Notice of Allowance received for Japanese Patent Application No. 2018-183504, mailed on Sep. 27, 2019, 4 pages (1 page of English Translation and 3 pages of Official Copy).
Notice of Allowance received for Japanese Patent Application No. 2019-182484, mailed on Aug. 30, 2021, 4 pages (1 page of English Translation and 3 pages of Official Copy).
Notice of Allowance received for Japanese Patent Application No. 2019-194597, mailed on Nov. 19, 2021, 4 pages (1 page of English Translation and 3 pages of Official Copy).
Notice of Allowance received for Japanese Patent Application No. 2020-159840, mailed on Jul. 8, 2022, 4 pages (1 page of English Translation and 3 pages of Official Copy).
Notice of Allowance received for Japanese Patent Application No. 2021-074395, mailed on Jun. 27, 2022, 4 pages (1 page of English Translation and 3 pages of Official Copy).
Notice of Allowance received for Japanese Patent Application No. 2021-154573, mailed on Nov. 11, 2022, 4 pages (1 page of English Translation and 3 pages of Official Copy).
Notice of Allowance received for Japanese Patent Application No. 2021-206121, mailed on May 15, 2023, 4 pages (1 page of English Translation and 3 pages of Official Copy).
Notice of Allowance received for Japanese Patent Application No. 2022-116534, mailed on Jun. 24, 2024, 4 pages (1 page of English Translation and 3 pages of Official Copy).
Notice of Allowance received for Japanese Patent Application No. 2022-125792, mailed on Jan. 27, 2023, 4 pages (1 page of English Translation and 3 pages of Official Copy).
Notice of Allowance received for Japanese Patent Application No. 2022-197327, mailed on May 31, 2024, 4 pages (1 page of English Translation and 3 pages of Official Copy).
Notice of Allowance received for Japanese Patent Application No. 2023-028786, mailed on Dec. 2, 2024, 4 pages (1 page of English Translation and 3 pages of Official Copy).
Notice of Allowance received for Japanese Patent Application No. 2023-097196, mailed on Jul. 29, 2024, 4 pages (1 page of English Translation and 3 pages of Official Copy).
Notice of Allowance received for Japanese Patent Application No. 2023-571161, mailed on Jul. 30, 2024, 3 pages (1 page of English Translation and 2 pages of Official Copy).
Notice of Allowance received for Korean Patent Application No. 10-2012-7028535, mailed on Jul. 16, 2014, 5 pages (1 page of English Translation and 4 pages of Official Copy).
Notice of Allowance received for Korean Patent Application No. 10-2013-7022057, mailed on Apr. 27, 2015, 2 pages (Official Copy only). {See Communication Under Rule 37 CFR § 1.98(a)(3)}.
Notice of Allowance received for Korean Patent Application No. 10-2014-7005164, mailed on Dec. 21, 2014, 4 pages (1 page of English Translation and 3 pages of Official Copy).
Notice of Allowance received for Korean Patent Application No. 10-2014-7029838, mailed on Jul. 28, 2015, 4 pages (1 page of English Translation and 3 pages of Official Copy).
Notice of Allowance received for Korean Patent Application No. 10-2014-7033660, issued on Sep. 25, 2015, 3 pages (1 page of English Translation and 2 pages of Official Copy).
Notice of Allowance received for Korean Patent Application No. 10-2015-0072162, mailed on Dec. 27, 2017, 4 pages (2 pages of English Translation and 2 pages of Official copy).
Notice of Allowance received for Korean Patent Application No. 10-2015-7007050, mailed on Feb. 26, 2016, 4 pages (1 page of English Translation and 3 pages of Official Copy).
Notice of Allowance received for Korean Patent Application No. 10-2015-7013849, mailed on Mar. 28, 2016, 3 pages (1 page of English Translation and 2 pages of Official Copy).
Notice of Allowance received for Korean Patent Application No. 10-2016-7014580, mailed on Dec. 17, 2019, 6 pages (2 pages of English Translation and 4 pages of Official Copy).
Notice of Allowance received for Korean Patent Application No. 10-2016-7017508, issued on Apr. 27, 2017, 3 pages (1 page of English translation and 2 pages of Official Copy).

(56) References Cited

OTHER PUBLICATIONS

Notice of Allowance received for Korean Patent Application No. 10-2018-0035949, mailed on Nov. 28, 2019, 3 pages (1 page of English Translation and 2 pages of Official Copy).
Notice of Allowance received for Korean Patent Application No. 10-2018-7036975, mailed on Sep. 18, 2019, 6 pages (2 pages of English Translation and 4 pages of Official Copy).
Notice of Allowance received for Korean Patent Application No. 10-2020-0024632, mailed on Jul. 26, 2021, 3 pages (1 page of English Translation and 2 pages of Official Copy).
Notice of Allowance received for Korean Patent Application No. 10-2020-0123805, mailed on Jun. 19, 2022, 5 pages (2 pages of English Translation and 3 pages of Official Copy).
Notice of Allowance received for Korean Patent Application No. 10-2020-7002845, mailed on Sep. 24, 2020, 5 pages (1 page of English Translation and 4 pages of Official Copy).
Notice of Allowance received for Korean Patent Application No. 10-2020-7032110, mailed on Mar. 8, 2021, 4 pages (1 page of English Translation and 3 pages of Official Copy).
Notice of Allowance received for Korean Patent Application No. 10-2021-0143923, mailed on Jan. 27, 2022, 4 pages (1 page of English Translation and 3 pages of Official Copy).
Notice of Allowance received for Korean Patent Application No. 10-2021-7017731, mailed on Feb. 28, 2023, 5 pages (2 pages of English Translation and 3 pages of Official Copy).
Notice of Allowance received for Korean Patent Application No. 10-2022-0053111, mailed on Jun. 25, 2024, 7 pages (2 pages of English Translation and 5 pages of Official Copy).
Notice of Allowance received for Korean Patent Application No. 10-2022-0091730, mailed on Oct. 4, 2022, 5 pages (2 pages of English Translation and 3 pages of Official Copy).
Notice of Allowance received for Korean Patent Application No. 10-2023-0001668, mailed on May 22, 2024, 6 pages (2 pages of English Translation and 4 pages of Official Copy).
Notice of Allowance received for Korean Patent Application No. 10-2023-7005442, mailed on Jan. 22, 2024, 8 pages (2 pages of English Translation and 6 pages of Official Copy).
Notice of Allowance received for Korean Patent Application No. 10-2023-7018775, mailed on Sep. 30, 2024, 7 pages (2 pages of English Translation and 5 pages of Official Copy).
Notice of Allowance received for Korean Patent Application No. 10-2023-7024157, mailed on Sep. 19, 2023, 7 pages (2 pages of English Translation and 5 pages of Official Copy).
Notice of Allowance received for Korean Patent Application No. 10-2023-7039382, mailed on Feb. 13, 2024, 6 pages (2 pages of English Translation and 4 pages of Official Copy).
Notice of Allowance received for Korean Patent Application No. 10-2023-7040599, mailed on Jun. 26, 2024, 7 pages (2 pages of English Translation and 5 pages of Official Copy).
Notice of Allowance received for Korean Patent Application No. 10-2023-7040599, mailed on Oct. 18, 2024, 7 pages (2 pages of English Translation and 5 pages of Official Copy).
Notice of Allowance received for Korean Patent Application No. 10-2023-7044044, mailed on Mar. 14, 2024, 7 pages (2 pages of English Translation and 5 pages of Official Copy).
Notice of Allowance received for Korean Patent Application No. 10-2024-0112016, mailed on Dec. 2, 2024, 6 pages (2 pages of English Translation and 4 pages of Official Copy).
Notice of Allowance received for Korean Patent Application No. 10-2024-7000870, mailed on Feb. 13, 2024, 5 pages (2 pages of English Translation and 3 pages of Official Copy).
Notice of Allowance received for Mexican Patent Application No. MX/a/2012/011623, mailed on Jan. 16, 2014, 2 pages (1 page of English Translation and 1 page of Official Copy).
Notice of Allowance received for Mexican Patent Application No. MX/a/2014/004295, mailed on May 21, 2015, 2 pages (1 page of English Translation and 1 page of Official Copy).
Notice of Allowance received for Mexican Patent Application No. MX/a/2015/010523, mailed on May 25, 2016, 2 pages (1 page of English Translation and 1 page of Official Copy).
Notice of Allowance received for Mexican Patent Application No. MX/a/2016/012174, mailed on Jan. 17, 2020, 3 pages (1 page of English Translation and 2 pages of Official Copy).
Notice of Allowance received for Mexican Patent Application No. MX/a/2020/003290, mailed on Feb. 9, 2023, 4 pages (1 page of English Translation and 3 pages of Official Copy).
Notice of Allowance received for Taiwanese Patent Application No. 099132253, mailed on Apr. 27, 2016, 3 pages (1 page of English Translation and 2 pages of Official Copy).
Notice of Allowance received for Taiwanese Patent Application No. 099132254, mailed on Feb. 18, 2014, 3 pages (1 page of English Translation and 2 pages of Official Copy).
Notice of Allowance Received for Taiwanese Patent Application No. 104117041, mailed on Feb. 24, 2017, 3 pages. (Official Copy Only). {See Communication Under Rule 37 CFR § 1.98(a)(3)}.
Notice of Allowance received for Taiwanese Patent Application No. 106144804, mailed on Jun. 27, 2018, 6 pages (2 pages of English Translation and 4 pages of Official copy).
Notice of Allowance received for Taiwanese Patent Application No. 104117042, mailed on Nov. 17, 2017, 5 pages (2 Pages of English Translation and 3 Pages of Official Copy).
Notice of Allowance received for U.S. Appl. No. 16/035,422, mailed on Apr. 10, 2019, 6 pages.
Notice of Allowance received for U.S. Appl. No. 16/528,941, mailed on Aug. 10, 2021, 5 pages.
Notice of Allowance received for U.S. Appl. No. 16/528,941, mailed on May 19, 2021, 5 pages.
Notice of Allowance received for U.S Patent Application No. 17/157, 166, mailed on Nov. 16, 2021, 6 pages.
Notice of Allowance received for U.S. Appl. No. 10/179,775, mailed on Aug. 24, 2017, 3 Pages.
Notice of Allowance received for U.S. Appl. No. 10/179,775, mailed on Jul. 13, 2017, 11 pages.
Notice of Allowance received for U.S. Appl. No. 12/789,426, mailed on Feb. 20, 2014, 7 pages.
Notice of Allowance received for U.S. Appl. No. 12/789,436, mailed on Jan. 7, 2013, Jan. 7, 2013, 9 pages.
Notice of Allowance received for U.S. Appl. No. 12/794,766, mailed on Jan. 17, 2014, 6 pages.
Notice of Allowance received for U.S. Appl. No. 12/794,768, mailed on Mar. 22, 2013, 6 pages.
Notice of Allowance received for U.S. Appl. No. 12/843,814, mailed on Jun. 22, 2016, 13 pages.
Notice of Allowance received for U.S. Appl. No. 12/890,482, mailed on May 8, 2014, 5 pages.
Notice of Allowance received for U.S. Appl. No. 12/890,489, mailed on Jul. 27, 2015, 8 pages.
Notice of Allowance received for U.S. Appl. No. 13/077,850, mailed on May 5, 2016, 15 pages.
Notice of Allowance received for U.S. Appl. No. 13/077,855, mailed on Jan. 30, 2017, 7 pages.
Notice of Allowance received for U.S. Appl. No. 13/077,862, mailed on Jun. 20, 2019, 9 pages.
Notice of Allowance received for U.S. Appl. No. 13/077,862, mailed on Sep. 20, 2019, 2 pages.
Notice of Allowance received for U.S. Appl. No. 13/077,867, mailed on Mar. 12, 2014, 7 pages.
Notice of Allowance received for U.S. Appl. No. 13/077,867, mailed on Sep. 18, 2013, Sep. 18, 2013, 8 pages.
Notice of Allowance received for U.S. Appl. No. 13/077,874, mailed on Nov. 22, 2016, 13 pages.
Notice of Allowance received for U.S. Appl. No. 13/333,909, mailed on Mar. 31, 2014, 20 pages.
Notice of Allowance received for U.S. Appl. No. 14/253,494, mailed on Jan. 18, 2017, 4 pages.
Notice of Allowance received for U.S. Appl. No. 14/253,494, mailed on Oct. 4, 2016, 12 pages.
Notice of Allowance received for U.S. Appl. No. 14/263,889, mailed on Feb. 1, 2017, 10 pages.
Notice of Allowance received for U.S. Appl. No. 14/263,889, mailed on Jun. 16, 2017, 6 pages.
Notice of Allowance received for U.S. Appl. No. 14/456,852, mailed on Jul. 31, 2015, 8 pages.

(56) References Cited

OTHER PUBLICATIONS

Notice of Allowance received for U.S. Appl. No. 14/641,289, mailed on Aug. 24, 2017, 6 Pages.
Notice of Allowance received for U.S. Appl. No. 14/641,289, mailed on Dec. 12, 2017, 5 pages.
Notice of Allowance received for U.S. Appl. No. 14/641,298, mailed on Nov. 29, 2021, 8 pages.
Notice of Allowance received for U.S. Appl. No. 14/641,304, mailed on Sep. 9, 2020, 15 pages.
Notice of Allowance received for U.S. Appl. No. 15/608,866, mailed on Feb. 28, 2020, 2 pages.
Notice of Allowance received for U.S. Appl. No. 15/725,868, mailed on Jun. 12, 2019, 9 pages.
Notice of Allowance received for U.S. Appl. No. 15/784,806, mailed on Jan. 2, 2025, 5 pages.
Notice of Allowance received for U.S. Appl. No. 15/784,806, mailed on Oct. 23, 2024, 5 pages.
Notice of Allowance received for U.S. Appl. No. 16/109,552, mailed on Mar. 13, 2019, 25 pages.
Notice of Allowance received for U.S. Appl. No. 16/109,552, mailed on May 13, 2019, 2 pages.
Notice of Allowance received for U.S. Appl. No. 16/144,572, mailed on Feb. 28, 2019, 7 pages.
Notice of Allowance received for U.S. Appl. No. 16/147,432, mailed on Dec. 18, 2018, 13 pages.
Notice of Allowance received for U.S. Appl. No. 16/147,432, mailed on May 20, 2019, 6 pages.
Notice of Allowance received for U.S. Appl. No. 16/383,403, mailed on Jan. 10, 2020, 11 pages.
Notice of Allowance received for U.S. Appl. No. 16/511,578, mailed on Nov. 18, 2019, 12 pages.
Notice of Allowance received for U.S. Appl. No. 16/666,073, mailed on Jan. 21, 2021, 11 pages.
Notice of Allowance received for U.S. Appl. No. 16/790,619, mailed on Sep. 8, 2020, 6 pages.
Notice of Allowance received for U.S. Appl. No. 16/799,481, mailed on Sep. 8, 2020, 6 pages.
Notice of Allowance received for U.S. Patent Application No. 16/859, 101, mailed on Jan. 18, 2022, 10 pages.
Notice of Allowance received for U.S. Appl. No. 17/026,818, mailed on May 13, 2021, 10 pages.
Notice of Allowance received for U.S. Appl. No. 17/027,373, mailed on Aug. 2, 2022, 2 pages.
Notice of Allowance received for U.S. Appl. No. 17/027,373, mailed on Jun. 3, 2022, 8 pages.
Notice of Allowance received for U.S. Appl. No. 17/027,373, mailed on Oct. 3, 2022, 5 pages.
Notice of Allowance received for U.S. Appl. No. 17/121,610, mailed on Jul. 7, 2022, 5 pages.
Notice of Allowance received for U.S. Appl. No. 17/121,610, mailed on Jul. 13, 2022, 4 pages.
Notice of Allowance received for U.S. Appl. No. 17/121,610, mailed on Mar. 11, 2022, 5 pages.
Notice of Allowance received for U.S. Patent Application No. 17/157, 166, mailed on Mar. 30, 2022, 6 pages.
Notice of Allowance received for U.S. Appl. No. 17/479,897, mailed on Jul. 26, 2023, 7 pages.
Notice of Allowance received for U.S. Appl. No. 17/479,897, mailed on Oct. 3, 2023, 5 pages.
Notice of Allowance received for U.S. Appl. No. 17/482,977, mailed on Jan. 24, 2023, 10 pages.
Notice of Allowance received for U.S. Appl. No. 17/482,987, mailed on Jun. 23, 2022, 9 pages.
Notice of Allowance received for U.S. Appl. No. 17/482,987, mailed on May 11, 2022, 10 pages.
Notice of Allowance received for U.S. Appl. No. 17/483,542, mailed on Aug. 11, 2023, 9 pages.
Notice of Allowance received for U.S. Appl. No. 17/483,542, mailed on Dec. 20, 2023, 6 pages.
Notice of Allowance received for U.S. Appl. No. 17/483,549, mailed on Apr. 15, 2022, 10 pages.
Notice of Allowance received for U.S. Appl. No. 17/483,564, mailed on Jul. 17, 2023, 46 pages.
Notice of Allowance received for U.S. Appl. No. 17/483,582, mailed on Apr. 19, 2022, 5 pages.
Notice of Allowance received for U.S. Appl. No. 17/483,582, mailed on Jan. 20, 2022, 10 pages.
Notice of Allowance received for U.S. Appl. No. 17/483,679, mailed on Jan. 29, 2025, 5 pages.
Notice of Allowance received for U.S. Appl. No. 17/483,679, mailed on Nov. 21, 2024, 8 pages.
Notice of Allowance received for U.S. Appl. No. 17/484,899, mailed on Aug. 26, 2024, 21 pages.
Notice of Allowance received for U.S. Appl. No. 17/484,899, mailed on Jan. 16, 2025, 16 pages.
Notice of Allowance received for U.S. Appl. No. 17/484,907, mailed on Jul. 25, 2022, 10 pages.
Notice of Allowance received for U.S. Appl. No. 17/484,907, mailed on Mar. 2, 2022, 13 pages.
Notice of Allowance received for U.S. Appl. No. 17/484,907, mailed on May 20, 2022, 13 pages.
Notice of Allowance received for U.S. Appl. No. 17/666,971, mailed on Aug. 16, 2023, 8 pages.
Notice of Allowance received for U.S. Appl. No. 17/666,971, mailed on Dec. 15, 2023, 8 pages.
Notice of Allowance received for U.S. Appl. No. 17/684,843, mailed on Feb. 14, 2024, 8 pages.
Notice of Allowance received for U.S. Appl. No. 17/684,843, mailed on Jun. 5, 2024, 5 pages.
Notice of Allowance received for U.S. Appl. No. 17/684,843, mailed on Sep. 17, 2024, 5 pages.
Notice of Allowance received for U.S. Appl. No. 17/732,204, mailed on Oct. 12, 2023, 8 pages.
Notice of Allowance received for U.S. Patent Application No. 17/740, 104, mailed on Oct. 4, 2023, 5 pages.
Notice of Allowance received for U.S. Appl. No. 17/745,680, mailed on Dec. 12, 2024, 2 pages.
Notice of Allowance received for U.S. Appl. No. 17/745,680, mailed on Nov. 12, 2024, 8 pages.
Notice of Allowance received for U.S. Appl. No. 17/872,736, mailed on Aug. 21, 2023, 6 pages.
Notice of Allowance received for U.S. Appl. No. 17/872,736, mailed on Aug. 30, 2023, 4 pages.
Notice of Allowance received for U.S. Appl. No. 17/903,946, mailed on Apr. 10, 2024, 7 pages.
Notice of Allowance received for U.S. Appl. No. 17/903,946, mailed on Aug. 27, 2024, 5 pages.
Notice of Allowance received for U.S. Appl. No. 17/950,868, mailed on Feb. 12, 2025, 6 pages.
Notice of Allowance received for U.S. Appl. No. 17/950,868, mailed on Oct. 23, 2024, 10 pages.
Notice of Allowance received for U.S. Appl. No. 17/950,900, mailed on Jun. 16, 2023, 6 pages.
Notice of Allowance received for U.S. Appl. No. 17/950,900, mailed on Mar. 7, 2023, 10 pages.
Notice of Allowance received for U.S. Appl. No. 17/950,922, mailed on Apr. 5, 2023, 10 pages.
Notice of Allowance received for U.S. Appl. No. 17/950,922, mailed on Sep. 20, 2023, 6 pages.
Notice of Allowance received for U.S. Appl. No. 17/970,417, mailed on Feb. 5, 2025, 6 pages.
Notice of Allowance received for U.S. Appl. No. 18/138,348, mailed on Nov. 13, 2024, 10 pages.
Notice of Allowance received for U.S. Appl. No. 18/389,655, mailed on Nov. 27, 2024, 8 pages.
Notice of Allowance received for U.S. Appl. No. 15/608,866, mailed on Dec. 18, 2019, 9 pages.
Notice of Hearing received for Indian Patent Application No. 201814036860, mailed on Sep. 8, 2023, 2 pages.
Notice of Hearing received for Indian Patent Application No. 202015013360, mailed on Dec. 26, 2024, 2 pages.

(56) References Cited

OTHER PUBLICATIONS

Octoba, "Enjoy free calls with LINE! Part 2", retrieved from: https://web.archive.org/web/20170923013859/https://octoba.net/archives/line-call2.html, Sep. 23, 2017, 13 pages (Official Copy Only). {See Communication Under Rule 37 CFR § 1.98(a)(3)}.
Office Action received for Australian Patent Application No. 2015201884, mailed on Oct. 12, 2015, 4 pages.
Office Action received for Australian Patent Application No. 2010339636, issued on Jun. 19, 2013, 3 pages.
Office Action Received for Australian Patent Application No. 2010339698, issued on Aug. 8, 2014, 3 pages.
Office Action Received for Australian Patent Application No. 2010339698, mailed on Jun. 14, 2013, Jun. 14, 2013, 3 pages.
Office Action received for Australian Patent Application No. 2010350749, mailed on Oct. 16, 2013, 3 pages.
Office Action received for Australian Patent Application No. 2012209199, issued on Jan. 15, 2015, 3 pages.
Office Action received for Australian Patent Application No. 2015100490, issued on Jun. 9, 2015, 6 pages.
Office Action received for Australian Patent Application No. 2015100490, mailed on Dec. 15, 2016, 2 pages.
Office Action received for Australian Patent Application No. 2015201127, mailed on Mar. 21, 2016, 3 pages.
Office Action received for Australian Patent Application No. 2016202837, mailed on Jan. 10, 2017, 2 pages.
Office Action received for Australian Patent Application No. 2016266010, mailed on Aug. 23, 2018, 4 pages.
Office Action received for Australian Patent Application No. 2016266010, mailed on May 4, 2018, 4 pages.
Office Action received for Australian Patent Application No. 2016266010, mailed on Nov. 28, 2018, 5 pages.
Office Action received for Australian Patent Application No. 2016266010, mailed on Nov. 30, 2017, 5 pages.
Office Action received for Australian Patent Application No. 2018271366, mailed on Feb. 25, 2020, 5 pages.
Office Action received for Australian Patent Application No. 2018271366, mailed on Jan. 19, 2021, 5 pages.
Office Action received for Australian Patent Application No. 2018271366, mailed on May 17, 2021, 5 pages.
Office Action received for Australian Patent Application No. 2018271366, mailed on Oct. 26, 2020, 5 pages.
Office Action received for Australian Patent Application No. 2019100499, mailed on Jun. 28, 2019, 4 pages.
Office Action received for Australian Patent Application No. 2019101062, mailed on Apr. 22, 2020, 2 pages.
Office Action received for Australian Patent Application No. 2019101062, mailed on Dec. 5, 2019, 3 pages.
Office Action received for Australian Patent Application No. 2019266225, mailed on Nov. 23, 2020, 4 pages.
Office Action received for Australian Patent Application No. 2020239711, mailed on Sep. 13, 2021, 5 pages.
Office Action received for Australian Patent Application No. 2021201243, mailed on Dec. 12, 2022, 3 pages.
Office Action received for Australian Patent Application No. 2021201243, mailed on Feb. 17, 2022, 4 pages.
Office Action received for Australian Patent Application No. 2021201243, mailed on Jun. 1, 2022, 5 pages.
Office Action received for Australian Patent Application No. 2021203903, mailed on Feb. 24, 2022, 3 pages.
Office Action received for Australian Patent Application No. 2022201532, mailed on Dec. 19, 2022, 5 pages.
Office Action received for Australian Patent Application No. 2022228207, mailed on Apr. 28, 2023, 3 pages.
Office Action received for Australian Patent Application No. 2023201057, mailed on Dec. 19, 2024, 4 pages.
Office Action received for Australian Patent Application No. 2023201057, mailed on Jan. 25, 2024, 6 pages.
Office Action received for Australian Patent Application No. 2023201057, mailed on Jan. 28, 2025, 3 pages.
Office Action received for Australian Patent Application No. 2023201057, mailed on Jun. 19, 2024, 5 pages.
Office Action received for Australian Patent Application No. 2023201057, mailed on Oct. 24, 2024, 3 pages.
Office Action received for Australian Patent Application No. 2023204396, mailed on Jan. 8, 2024, 5 pages.
Office Action received for Australian Patent Application No. 2023248185, mailed on Nov. 22, 2023, 2 pages.
Office Action received for Australian Patent Application No. 2023248185, mailed on Oct. 20, 2023, 3 pages.
Office Action received for Brazilian Patent Application No. BR112012025746-3, mailed on Jun. 2, 2020, 7 pages (4 pages of English Translation and 3 pages of Official Copy).
Office Action received for Chinese Patent Application No. 201010602653.9, mailed on Apr. 1, 2013, 21 pages (13 pages of English Translation and 8 pages of Official Copy).
Office Action received for Chinese Patent Application No. 201010602653.9, mailed on Dec. 9, 2013, 10 pages (6 pages of English Translation and 4 pages of Official Copy).
Office Action received for Chinese Patent Application No. 201010602653.9, mailed on May 15, 2014, 6 pages (3 pages of English Translation and 3 pages of Official Copy).
Office Action received for Chinese Patent Application No. 2010106600623.4, mailed on Apr. 28, 2014, 7 pages (4 pages of English Translation and 3 pages of Official Copy).
Office Action received for Chinese Patent Application No. 2010106600623.4, mailed on Jan. 24, 2014, 7 pages (4 pages of English Translation and 3 pages of Official Copy).
Office Action received for Chinese Patent Application No. 2010106600623.4, mailed on May 2, 2013, 27 pages (15 pages of English Translation and 12 pages of Official Copy).
Office Action received for Chinese Patent Application No. 201080063864.8, mailed on Jul. 14, 2015, 8 pages (4 pages of English Translation & 4 pages of Official Copy).
Office Action received for Chinese Patent Application No. 201080063864.8, mailed on Sep. 2, 2014, 31 pages (17 pages of English Translation and 14 pages of Official copy).
Office Action received for Chinese Patent Application No. 201080064125.0, mailed on Jun. 10, 2014, 8 pages (Official Copy only). {See Communication Under Rule 37 CFR § 1.98(a)(3)}.
Office Action received for Chinese Patent Application No. 201080064125.0, mailed on Mar. 11, 2015, 7 pages (2 pages of English Translation and 5 pages of Official Copy).
Office Action Received for Chinese Patent Application No. 201280006317.5, mailed on Jan. 11, 2016, 10 pages (5 pages of English Translation and 5 pages of official Copy).
Office Action received for Chinese Patent Application No. 201280006317.5, mailed on Jul. 11, 2016, 6 pages (1 page of English Translation and 5 pages of Official Copy).
Office Action received for Chinese Patent Application No. 201410575145.4, mailed on Feb. 13, 2017, 18 pages (11 pages of English Translation and 7 pages of Official Copy).
Office Action received for Chinese Patent Application No. 201410575145.4, mailed on Nov. 30, 2017, 17 pages (11 pages of English Translation and 6 pages of Official Copy).
Office Action received for Chinese Patent Application No. 201510288981.9, mailed on Jul. 1, 2019, 16 pages (8 pages of English Translation and 8 pages of Official Copy).
Office Action received for Chinese Patent Application No. 201510288981.9, mailed on Jul. 3, 2018, 19 pages (8 pages of English Translation and 11 pages of official copy).
Office Action received for Chinese Patent Application No. 201510288981.9, mailed on Mar. 6, 2019, 20 pages (10 pages of English Translation and 10 pages of Official Copy).
Office Action received for Chinese Patent Application No. 201710240907.9, mailed on Jun. 5, 2019, 10 pages (5 pages of English Translation and 5 pages of Official Copy).
Office Action received for Chinese Patent Application No. 201780033771.2, mailed on Jul. 15, 2020, 18 pages (9 pages of English Translation and 9 pages of Official Copy).
Office Action received for Chinese Patent Application No. 201880056514.5, mailed on Sep. 2, 2020, 7 pages (1 page of English Translation and 6 pages of Official Copy).

(56) References Cited

OTHER PUBLICATIONS

Office Action received for Chinese Patent Application No. 201910055588.3, mailed on Nov. 24, 2021, 24 pages (14 pages of English Translation and 10 pages of Official Copy).
Office Action received for Chinese Patent Application No. 201910400179.2, mailed on Dec. 27, 2021, 32 pages (13 pages of English Translation and 19 pages of Official Copy).
Office Action received for Chinese Patent Application No. 201910400180.5, mailed on Jun. 1, 2020, 11 pages (5 pages of English Translation and 6 pages of Official Copy).
Office Action received for Chinese Patent Application No. 201910704856.X, mailed on Apr. 6, 2021, 13 pages (7 pages of English Translation and 6 pages of Official Copy).
Office Action received for Chinese Patent Application No. 201910704856.X, mailed on Dec. 9, 2020, 23 pages (13 pages of English Translation and 10 pages of Official Copy).
Office Action received for Chinese Patent Application No. 201910704856.X, mailed on Jun. 11, 2024, 33 pages (1 page of English Translation and 32 pages of Official Copy).
Office Action received for Chinese Patent Application No. 201910704856.X, mailed on Jun. 23, 2024, 12 pages (6 pages of English Translation and 6 pages of Official Copy).
Office Action received for Chinese Patent Application No. 201910704856.X, mailed on Mar. 8, 2024, 13 pages (7 pages of English Translation and 6 pages of Official Copy).
Office Action received for Chinese Patent Application No. 201910704856.X, mailed on May 27, 2020, 26 pages (14 pages of English Translation and 12 pages of Official Copy).
Office Action received for Chinese Patent Application No. 202010126661.4, mailed on Feb. 3, 2021, 16 pages (9 pages of English Translation and 7 pages of Official Copy).
Office Action received for Chinese Patent Application No. 202010126661.4, mailed on Jun. 2, 2022, 11 pages (7 pages of English Translation and 4 pages of Official Copy).
Office Action received for Chinese Patent Application No. 202010126661.4, mailed on Mar. 4, 2022, 13 pages (8 pages of English Translation and 5 pages of Official Copy).
Office Action received for Chinese Patent Application No. 202011243876.0, mailed on Apr. 6, 2021, 11 pages (5 pages of English Translation and 6 pages of Official Copy).
Office Action received for Chinese Patent Application No. 202110327012.5, mailed on Apr. 29, 2022, 17 pages (10 pages of English Translation and 7 pages of Official Copy).
Office Action received for Chinese Patent Application No. 202110327012.5, mailed on Mar. 16, 2023, 12 pages (7 pages of English Translation and 5 pages of Official Copy).
Office Action received for Chinese Patent Application No. 202110327012.5, mailed on Nov. 28, 2022, 16 pages (10 pages of English Translation and 6 pages of Official Copy).
Office Action received for Chinese Patent Application No. 202110328597.2, mailed on Apr. 15, 2022, 18 pages (9 pages of English Translation and 9 pages of Official Copy).
Office Action received for Chinese Patent Application No. 202110328597.2, mailed on Jul. 18, 2023, 21 pages (6 pages of English Translation and 15 pages of Official Copy).
Office Action received for Chinese Patent Application No. 202110328597.2, mailed on May 15, 2023, 13 pages (6 pages of English Translation and 7 pages of Official Copy).
Office Action received for Chinese Patent Application No. 202110328597.2, mailed on Oct. 10, 2022, 13 pages (7 pages of English Translation and 6 pages of Official Copy).
Office Action received for Chinese Patent Application No. 202110328601.5, mailed on Apr. 27, 2022, 25 pages (14 pages of English Translation and 11 pages of Official Copy).
Office Action received for Chinese Patent Application No. 202110328601.5, mailed on Mar. 24, 2023, 25 pages (15 pages of English Translation and 10 pages of Official Copy).
Office Action received for Chinese Patent Application No. 202110328601.5, mailed on Nov. 2, 2022, 29 pages (19 pages of English Translation and 10 pages of Official Copy).
Office Action received for Chinese Patent Application No. 202110328602.X, mailed on Dec. 1, 2022, 28 pages (17 pages of English Translation 11 pages of Official Copy).
Office Action received for Chinese Patent Application No. 202110328602.X, mailed on Jun. 29, 2023, 27 pages (18 pages of English Translation and 9 pages of Official Copy).
Office Action received for Chinese Patent Application No. 202110328602.X, mailed on Mar. 24, 2022, 6 pages (3 pages of English Translation and 3 pages of Official Copy).
Office Action received for Chinese Patent Application No. 202110409273.1, mailed on Jan. 11, 2022, 11 pages (6 pages of English Translation and 5 pages of Official Copy).
Office Action received for Chinese Patent Application No. 202110894284.3, mailed on Jan. 10, 2025, 9 pages (4 pages of English Translation and 5 pages of Official Copy).
Office Action received for Chinese Patent Application No. 202110894284.3, mailed on Jun. 27, 2024, 10 pages (5 pages of English Translation and 5 pages of Official Copy).
Office Action received for Chinese Patent Application No. 202111652452.4, mailed on Aug. 29, 2022, 23 pages (12 pages of English Translation and 11 pages of Official Copy).
Office Action received for Chinese Patent Application No. 202111652452.4, mailed on Feb. 11, 2023, 28 pages (13 pages of English Translation and 15 pages of Official Copy).
Office Action received for Chinese Patent Application No. 202111652452.4, mailed on May 19, 2023, 15 pages (8 pages of English Translation and 7 pages of Official Copy).
Office Action received for Chinese Patent Application No. 202311185909.4, mailed on Jun. 12, 2024, 18 pages (10 pages of English Translation and 8 pages of Official Copy).
Office Action received for Chinese Patent Application No. 202311753064.4, mailed on Aug. 23, 2024, 18 pages (11 pages of English Translation and 7 pages of Official Copy).
Office Action received for Chinese Patent Application No. 202311831154.0, mailed on Aug. 30, 2024, 13 pages (7 pages of English Translation and 6 pages of Official Copy).
Office Action received for Chinese Patent Application No. 202311835200.4, mailed on Aug. 29, 2024, 16 pages (7 pages of English Translation and 9 pages of Official Copy).
Office Action received for Chinese Patent Application No. 202311835200.4, mailed on Dec. 26, 2024, 11 pages (6 pages of English Translation and 5 pages of Official Copy).
Office Action received for Chinese Patent Application No. 202410030102.1, mailed on Jul. 23, 2024, 18 pages (9 pages of English Translation and 9 pages of Official Copy).
Office Action received for Chinese Patent Application No. 202410030102.1, mailed on Jan. 22, 2025, 14 pages (8 pages of English Translation and 6 pages of Official Copy).
Office Action received for Chinese Patent Application No. 202110327012.5, mailed on Feb. 10, 2025, 22 pages (13 pages of English Translation and 9 pages of Official Copy).
Office Action received for Danish Patent Application No. PA201570256, mailed on Jul. 7, 2015, 2 pages.
Office Action received for Danish Patent Application No. PA201570256, mailed on Mar. 17, 2016, 5 pages.
Office Action received for Danish Patent Application No. PA201570256, mailed on May 23, 2017, 3 pages.
Office Action received for Danish Patent Application No. PA201570256, mailed on Oct. 10, 2016, 3 pages.
Office Action received for Danish Patent Application No. PA201870362, mailed on Aug. 22, 2019, 4 pages.
Office Action received for Danish Patent Application No. PA201870362, mailed on Dec. 18, 2018, 2 pages.
Office Action received for Danish Patent Application No. PA201870363, mailed on Mar. 26, 2019, 3 pages.
Office Action received for Danish Patent Application No. PA201870364, mailed on Jan. 28, 2019, 8 pages.
Office Action received for Danish Patent Application No. PA201870364, mailed on Jun. 11, 2019, 11 pages.
Office Action received for Danish Patent Application No. PA202070617, mailed on Sep. 24, 2021, 4 pages.
Office Action received for European Patent Application No. 10763539.3, mailed on Jun. 13, 2016, 5 pages.

(56) References Cited

OTHER PUBLICATIONS

Office Action received for European Patent Application No. 10799259.6, mailed on Jun. 1, 2015, 9 pages.
Office Action Received for European Patent Application No. 11150223.3, mailed on Mar. 29, 2012, 3 pages.
Office Action received for European Patent Application No. 13175232.1, mailed on Nov. 21, 2014, 5 pages.
Office Action received for European Patent Application No. 15713062.6, mailed on Dec. 6, 2017, 7 pages.
Office Action received for European Patent Application No. 15714698.6, mailed on Apr. 18, 2023, 14 pages.
Office Action received for European Patent Application No. 15714698.6, mailed on Oct. 13, 2021, 2 pages.
Office Action received for European Patent Application No. 17810737.1, mailed on Jan. 20, 2021, 6 pages.
Office Action received for European Patent Application No. 18779093.6, mailed on Dec. 11, 2020, 4 pages.
Office Action received for European Patent Application No. 18779093.6, mailed on Jun. 28, 2023, 4 pages.
Office Action received for European Patent Application No. 18779093.6, mailed on Mar. 17, 2022, 4 pages.
Office Action received for European Patent Application No. 19729395.4, mailed on Jul. 15, 2020, 4 pages.
Office Action received for European Patent Application No. 19729395.4, mailed on Sep. 29, 2020, 10 pages.
Office Action received for European Patent Application No. 20166552.8, mailed on Mar. 24, 2021, 8 pages.
Office Action received for European Patent Application No. 20166552.8, mailed on Nov. 3, 2023, 3 pages.
Office Action received for European Patent Application No. 20205496.1, mailed on Nov. 10, 2021, 5 pages.
Office Action received for European Patent Application No. 21206800.1, mailed on Jun. 30, 2023, 6 pages.
Office Action received for European Patent Application No. 21728781.2, mailed on Mar. 1, 2023, 13 pages.
Office Action received for European Patent Application No. 22705232.1, mailed on May 27, 2024, 7 pages.
Office Action received for European Patent Application No. 22705232.1, mailed on Sep. 26, 2024, 8 pages.
Office Action received for European Patent Application No. 22733778.9, mailed on Oct. 22, 2024, 6 pages.
Office Action received for European Patent Application No. 22792995.7, mailed on Jun. 24, 2024, 6 pages.
Office Action received for European Patent Application No. 22792995.7, mailed on Oct. 15, 2024, 8 pages.
Office Action received for European Patent Application No. 22733778.9, mailed on Feb. 20, 2025, 4 pages.
Office Action received for European Patent Application No. 22705232.1, mailed on Feb. 4, 2025, 10 pages.
Office Action received for European Patent Application No. 24160234.1, mailed on Feb. 20, 2025, 3 pages.
Office Action received for German Patent Application No. 102015208532.5, mailed on Apr. 1, 2019, 20 pages (10 pages of English Translation and 10 pages of Official Copy).
Office Action received for German Patent Application No. 102015208532.5, mailed on Apr. 21, 2020, 3 pages (1 page of English Translation and 2 pages of Official Copy).
Office Action received for German Patent Application No. 102015208532.5, mailed on Aug. 21, 2019, 15 pages (5 pages of English Translation and 10 pages of Official Copy).
Office Action received for Hong Kong Patent Application No. 151051633, mailed on Jun. 5, 2015, 11 pages (Official Copy Only). {See Communication Under Rule 37 CFR § 1.98(a)(3)}.
Office Action received for Indian Patent Application No. 201814036860, mailed on Jul. 29, 2021, 8 pages.
Office Action received for Indian Patent Application No. 202014041529, mailed on Dec. 6, 2021, 6 pages.
Office Action received for Indian Patent Application No. 202015013360, mailed on Mar. 17, 2023, 7 pages.
Office Action received for Indian Patent Application No. 202215025360, mailed on Mar. 29, 2023, 6 pages.
Office Action received for Indian Patent Application No. 202215025361, mailed on Mar. 29, 2023, 6 pages.
Office Action received for Indian Patent Application No. 202215025363, mailed on Mar. 29, 2023, 6 pages.
Office Action received for Indian Patent Application No. 202215025364, mailed on Mar. 29, 2023, 6 pages.
Office Action received for Japanese Patent Application No. 2013-550664, mailed on Jun. 10, 2016, 3 pages (Official Copy only). {See Communication Under Rule 37 CFR § 1.98(a)(3)}.
Office Action received for Japanese Patent Application No. 2013-262976, mailed on Feb. 20, 2015, 2 pages (Official Copy only). {See Communication Under Rule 37 CFR § 1.98(a)(3)}.
Office Action received for Japanese Patent Application No. 2013-503731, mailed on Mar. 3, 2014, 8 pages (2 pages of English Translation and 6 pages of Official Copy).
Office Action received for Japanese Patent Application No. 2013-503731, mailed on Sep. 24, 2013, 3 pages (1 page of English Translation and 2 pages of Official Copy).
Office Action received for Japanese Patent Application No. 2013-550664, mailed on Aug. 24, 2015, 9 pages (4 pages of English Translation and 5 pages of Official Copy).
Office Action received for Japanese Patent Application No. 2013-550664, mailed on Sep. 12, 2014, 10 pages (6 pages of English Translation and 4 pages of Official Copy).
Office Action received for Japanese Patent Application No. 2014-212867, mailed on Aug. 18, 2017, 4 pages (1 page of English Translation and 3 pages of Official Copy).
Office Action received for Japanese Patent Application No. 2014-212867, mailed on Jun. 29, 2015, 8 pages (4 pages of English Translation and 4 pages of Official Copy).
Office Action received for Japanese Patent Application No. 2015-095183, mailed on Jun. 3, 2016, 13 pages (6 pages of English Translation and 7 pages of Official copy).
Office Action received for Japanese Patent Application No. 2016-151497, mailed on Sep. 25, 2017, 7 pages (2 pages of English Translation and 5 pages of Official Copy).
Office Action received for Japanese Patent Application No. 2017-101107, mailed on Sep. 7, 2018, 14 pages (7 pages of English Translation and 7 pages of Official Copy).
Office Action received for Japanese Patent Application No. 2018-127760, mailed on Feb. 22, 2019, 10 pages (5 pages of English Translation and 5 pages of Official Copy).
Office Action received for Japanese Patent Application No. 2018-127760, mailed on Jul. 5, 2019, 4 pages (1 page of English Translation and 3 pages of Official Copy).
Office Action received for Japanese Patent Application No. 2019-124728, mailed on Dec. 14, 2020, 4 pages (2 pages of English Translation and 2 pages of Official Copy).
Office Action received for Japanese Patent Application No. 2019-124728, mailed on Sep. 18, 2020, 6 pages (3 pages of English Translation and 3 pages of Official Copy).
Office Action received for Japanese Patent Application No. 2019-182484, mailed on Dec. 4, 2020, 6 pages (1 page of English Translation and 5 pages of Official Copy).
Office Action received for Japanese Patent Application No. 2019-194597, mailed on Jan. 18, 2021, 10 pages (5 pages of English Translation and 5 pages of Official Copy).
Office Action received for Japanese Patent Application No. 2020-159840, mailed on Dec. 10, 2021, 13 pages (7 pages of English Translation and 6 pages of Official Copy).
Office Action received for Japanese Patent Application No. 2020-159840, mailed on Mar. 28, 2022, 6 pages (3 pages of English Translation and 3 pages of Official Copy).
Office Action received for Japanese Patent Application No. 2021-206121, mailed on Feb. 20, 2023, 7 pages (3 pages of English Translation and 4 pages of Official Copy).
Office Action received for Japanese Patent Application No. 2022-116534, mailed on Aug. 28, 2023, 10 pages (5 pages of English Translation and 5 pages of Official Copy).

(56) References Cited

OTHER PUBLICATIONS

Office Action received for Japanese Patent Application No. 2022-197327, mailed on Mar. 1, 2024, 14 pages (7 pages of English Translation and 7 pages of Official Copy).
Office Action received for Japanese Patent Application No. 2023-028786, mailed on Aug. 23, 2024, 10 pages (5 pages of English Translation and 5 pages of Official Copy).
Office Action received for Japanese Patent Application No. 2023-028786, mailed on Mar. 22, 2024, 10 pages (5 pages of English Translation and 5 pages of Official Copy).
Office Action received for Japanese Patent Application No. 2023-097196, mailed on Jun. 7, 2024, 7 pages (3 pages of English Translation and 4 pages of Official Copy).
Office Action received for Japanese Patent Application No. 2023-571161, mailed on May 28, 2024, 4 pages (2 pages of English Translation and 2 pages of Official Copy).
Office Action received for Japanese Patent Application No. 2023-571312, mailed on Jul. 16, 2024, 4 pages (2 pages of English Translation and 2 pages of Official Copy).
Office Action received for Japanese Patent Application No. 2023-572748, mailed on Jul. 29, 2024, 4 pages (2 pages of English Translation and 2 pages of Official Copy).
Office Action received for Japanese Patent Application No. 2023-572748, mailed on Nov. 21, 2024, 31 pages (28 pages of English Translation and 3 pages of Official Copy).
Office Action received for Japanese Patent Application No. 2024-003876, mailed on Jul. 2, 2024, 3 pages (1 page of English Translation and 2 pages of Official Copy).
Office Action received for Japanese Patent Application No. 2024-146741, mailed on Nov. 25, 2024, 12 pages (6 pages of English Translation and 6 pages of Official Copy).
Office Action received for Japanese Patent Application No. 2024-173274, mailed on Jan. 6, 2025, 3 pages (2 pages of English Translation and 1 page of Official Copy).
Office Action received for Korean Patent Application No. 10-2012-7020548, mailed on Oct. 10, 2013, 5 pages (Official Copy only). {See Communication Under Rule 37 CFR § 1.98(a)(3)}.
Office Action received for Korean Patent Application No. 10-2012-7028535, mailed on Nov. 26, 2013, 10 pages (4 pages of English Translation and 6 pages of Official Copy).
Office Action received for Korean Patent Application No. 10-2013-7022057, mailed on May 28, 2014, 7 pages (3 pages of English Translation and 4 pages of Official Copy).
Office Action received for Korean Patent Application No. 10-2014-7005164, mailed on May 23, 2014, 15 pages (6 pages of English Translation and 9 pages of Official Copy).
Office Action received for Korean Patent Application No. 10-2014-7029838, mailed on Dec. 20, 2014, 13 pages (5 pages of English Translation and 8 pages of Official Copy).
Office Action received for Korean Patent Application No. 10-2014-7033660, mailed on Feb. 23, 2015, 3 pages (Official Copy only). { See Communication Undr Rule 37 CFR § 1.98(a)(3)}.
Office Action received for Korean Patent Application No. 10-2015-0072162, mailed on Apr. 20, 2016, 11 pages (6 pages of English Translation and 5 pages of Official Copy).
Office Action received for Korean Patent Application No. 10-2015-0072162, mailed on Feb. 27, 2017, 12 pages (6 pages of English Translation and 6 pages of Official Copy).
Office Action received for Korean Patent Application No. 10-2015-7007050, mailed on Apr. 16, 2015, 14 pages (6 pages of English Translation and 8 pages of Official Copy).
Office Action received for Korean Patent Application No. 10-2015-7007050, mailed on Oct. 23, 2015, 7 pages (3 pages of English Translation and 4 pages of Official Copy).
Office Action received for Korean Patent Application No. 10-2015-7013849, mailed on Aug. 20, 2015, 5 pages (2 pages of English Translation and 3 pages of Official Copy).
Office Action received for Korean Patent Application No. 10-2016-7014580, mailed on Jan. 30, 2018, 10 pages (4 pages of English Translation and 6 pages of Official Copy).
Office Action received for Korean Patent Application No. 10-2016-7014580, mailed on Jul. 30, 2018, 7 pages (3 pages of English Translation and 4 pages of Official Copy).
Office Action received for Korean Patent Application No. 10-2016-7014580, mailed on Jun. 29, 2017, 7 pages (1 page of English Translation and 6 pages of Official Copy).
Office Action received for Korean Patent Application No. 10-2016-7014580, mailed on Sep. 19, 2018, 7 pages (3 pages of English Translation and 4 pages of Official Copy).
Office Action received for Korean Patent Application No. 10-2016-7014580, mailed on Sep. 27, 2016, 9 pages (4 pages of English Translation and 5 pages of Official Copy).
Office Action received for Korean Patent Application No. 10-2016-7017508, mailed on Oct. 20, 2016, 5 pages (2 pages of English Translation and 3 pages of Official Copy).
Office Action received for Korean Patent Application No. 10-2017-7002774, mailed on Apr. 18, 2017, 10 pages (4 pages of English Translation and 6 pages of Official Copy).
Office Action received for Korean Patent Application No. 10-2017-7002774, mailed on Jul. 30, 2018, 6 pages (3 pages of English Translation and 3 pages of Official Copy).
Office Action received for Korean Patent Application No. 10-2017-7002774, mailed on Sep. 20, 2018, 12 pages (6 pages of English Translation and 6 pages of Official Copy).
Office Action received for Korean Patent Application No. 10-2018-0035949, mailed on Apr. 24, 2019, 9 pages (4 pages of English Translation and 5 pages of Official Copy).
Office Action received for Korean Patent Application No. 10-2018-0035949, mailed on Dec. 24, 2018, 7 pages (3 pages of English Translation and 4 pages of Official Copy).
Office Action received for Korean Patent Application No. 10-2018-0035949, mailed on Jun. 20, 2018, 9 pages (4 pages of English Translation and 5 pages of Official Copy).
Office Action received for Korean Patent Application No. 10-2018-7036975, mailed on Mar. 22, 2019, 11 pages (5 pages of English Translation and 6 pages of Official Copy).
Office Action received for Korean Patent Application No. 10-2020-0024632, mailed on Dec. 29, 2020, 11 pages (5 pages of English Translation and 6 pages of Official Copy).
Office Action received for Korean Patent Application No. 10-2020-0024632, mailed on May 18, 2020, 11 pages (5 pages of English Translation and 6 pages of Official Copy).
Office Action received for Korean Patent Application No. 10-2020-7002845, mailed on Feb. 17, 2020, 14 pages (6 pages of English Translation and 8 pages of Official Copy).
Office Action received for Korean Patent Application No. 10-2020-7032110, mailed on Dec. 15, 2020, 6 pages (2 pages of English Translation and 4 pages of official Copy).
Office Action received for Korean Patent Application No. 10-2020-7034959, mailed on Jan. 27, 2022, 7 pages (3 pages of English Translation and 4 pages of Official Copy).
Office Action received for Korean Patent Application No. 10-2020-7034959, mailed on Mar. 2, 2021, 12 pages (5 pages of English Translation and 7 pages of Official Copy).
Office Action received for Korean Patent Application No. 10-2020-7034959, mailed on Oct. 27, 2021, 8 pages (4 pages of English Translation and 4 pages of Official Copy).
Office Action received for Korean Patent Application No. 10-2021-7017731, mailed on May 30, 2022, 5 pages (2 pages of English Translation and 3 pages of Official Copy).
Office Action received for Korean Patent Application No. 10-2022-0053111, mailed on Dec. 12, 2022, 9 pages (4 pages of English Translation and 5 pages of Official Copy).
Office Action received for Korean Patent Application No. 10-2022-0053111, mailed on Jun. 29, 2023, 7 pages (3 pages of English Translation and 4 pages of Official Copy).
Office Action received for Korean Patent Application No. 10-2022-0053111, mailed on Oct. 23, 2023, 10 pages (5 pages of English Translation and 5 pages of Official Copy).
Office Action received for Korean Patent Application No. 10-2022-7006973, mailed on May 19, 2022, 10 pages (4 pages of English Translation and 6 pages of Official Copy).

(56) References Cited

OTHER PUBLICATIONS

Office Action received for Korean Patent Application No. 10-2022-7006973, mailed on Nov. 24, 2022, 6 pages (3 pages of English Translation and 3 pages of Official Copy).
Office Action received for Korean Patent Application No. 10-2023-0001668, mailed on Nov. 3, 2023, 5 pages (2 pages of English Translation and 3 pages of Official Copy).
Office Action received for Korean Patent Application No. 10-2023-7005442, mailed on Jul. 25, 2023, 10 pages (4 pages of English Translation and 6 pages of Official Copy).
Office Action received for Korean Patent Application No. 10-2023-7018775, mailed on Feb. 28, 2024, 8 pages (3 pages of English Translation and 5 pages of Official Copy).
Office Action received for Korean Patent Application No. 10-2023-7040599, mailed on Mar. 12, 2024, 6 pages (2 pages of English Translation and 4 pages of Official Copy).
Office Action received for Korean Patent Application No. 10-2024-7019962, mailed on Jul. 16, 2024, 6 pages (2 pages of English Translation and 4 pages of Official Copy).
Office Action received for Korean Patent Application No. 10-2024-7019962, mailed on Sep. 25, 2024, 7 pages (2 pages of English Translation and 5 pages of Official Copy).
Office Action received for Mexican Patent Application No. MX/a/2014/004295, mailed on Aug. 21, 2014, 4 pages (2 pages of English Translation and 2 pages of Official Copy).
Office Action received for Mexican Patent Application No. MX/a/2014/004295, mailed on Jan. 20, 2015, 4 pages (1 page of English Translation and 3 pages of Official Copy).
Office Action received for Mexican Patent Application No. MX/a/2015/010523, mailed on Jan. 26, 2016, 4 pages (2 pages of English Translation and 2 pages of Official Copy).
Office Action received for Mexican Patent Application No. MX/a/2016/012174, mailed on Apr. 10, 2019, 7 pages (4 pages of English Translation and 3 pages of Official Copy).
Office Action received for Mexican Patent Application No. MX/a/2016/012174, mailed on Aug. 8, 2019, 7 pages (2 pages of English Translation and 5 pages of Official Copy).
Office Action received for Mexican Patent Application No. MX/a/2020/003290, mailed on Nov. 11, 2022, 7 pages (2 pages of English Translation and 5 pages of Official Copy).
Office Action received for Mexican Patent Application No. MX/a/2020/003290, mailed on Oct. 26, 2022, 8 pages (3 pages of English Translation and 5 pages of Official Copy).
Office Action received for Mexican Patent Application No. MX/a/2023/005388, mailed on Dec. 15, 2023, 18 pages (9 pages of English Translation and 9 pages of Official Copy).
Office Action received for Mexican Patent Application No. MX/a/2023/005388, mailed on Jun. 2, 2023, 24 pages (12 pages of English Translation and 12 pages of Official Copy).
Office Action received for Taiwanese Patent Application No. 099132253, mailed on Jun. 24, 2013, 16 pages (8 pages of English Translation and 8 pages of Official Copy).
Office Action received for Taiwanese Patent Application No. 099132253, mailed on Mar. 27, 2014, 10 pages (4 pages of English Translation and 6 pages of Official Copy).
Office Action received for Taiwanese Patent Application No. 099132254, mailed on May 27, 2013, 24 pages (12 pages of English Translation and 12 pages of Official Copy).
Office Action Received for Taiwanese Patent Application No. 104117041, mailed on Aug. 22, 2016, 6 pages (3 pages of English Translation and 3 pages of Official Copy).
Office Action received for Taiwanese Patent Application No. 104117042, mailed on Apr. 20, 2017, 18 pages (7 pages of English Translation and 11 pages of Official Copy).
Office Action Report received for Australian Patent Application No. 2012209199, mailed on Dec. 17, 2015, 3 pages.
Pogue David, "Windows Vista for Starters: The Missing Manual", available at <http://academic.safaribooksonline.com/book/operating-systems/0596528264>, Jan. 25, 2007, 18 pages.

"Q Pair, When I connected to Lg G Pad 8.3 Q pair G Flex. - G Pad 8.3 review, Posting of a blog", Online Available at: < http://www.leaderyou.co.kr/2595>, Dec. 7, 2013, 28 pages (15 page of English Translation and 13 pages of Official Copy).
"QPair", online available at: http://mongri.net/entry/G-Pad-83-Qpair, Retrieved on Mar. 6, 2017, Dec. 20, 2013, 22 pages (10 pages of English translation and 12 pages of Official Copy).
Qq, "Method of QQ voice chat", Online Available at: https://www.taodocs.com/p. 47909082.html, May 25, 2016, 3 p. (Official Copy only). {See Communication Under Rule 37 CFR § 1.98(a)(3)}.
Record of Oral Hearing received for U.S. Appl. No. 14/641,298, mailed on Oct. 8, 2021, 17 pages.
Record of Oral Hearing received for U.S. Appl. No. 15/784,806, mailed on Aug. 28, 2024, 16 pages.
Result of Consultation received for European Patent Application No. 19729395.4, mailed on Jun. 22, 2021, 3 pages.
Result of Consultation received for European Patent Application No. 19729395.4, mailed on Jun. 23, 2021, 3 pages.
Result of Consultation received for European Patent Application No. 20205496.1, mailed on Apr. 18, 2023, 3 pages.
Rossignol Joe, "iOS 10 Concept Simplifies Lock Screen With Collapsed Notifications", Available online at: https://www.macrumors.com/2016/06/16/ios-10-collapsed-notifications- concept/, Jun. 16, 2016, 10 pages.
Search Report and Opinion received for Danish Patent Application No. PA201870362, mailed on Sep. 7, 2018, 9 pages.
Search Report and Opinion received for Danish Patent Application No. PA201870363, mailed on Sep. 11, 2018, 12 pages.
Search Report and Opinion received for Danish Patent Application No. PA201870364, mailed on Sep. 4, 2018, 12 pages.
Search Report and Opinion received for Danish Patent Application No. PA202070617, mailed on Dec. 23, 2020, 8 pages.
Search Report received For Netherlands Patent Application No. 2014737, mailed on Oct. 29, 2015, 9 pages.
Senicar et al., "User-Centered Design and Development of an Intelligent Light Switch for Sensor Systems", Technical Gazette, vol. 26, No. 2, available online at: https://hrcak.srce.hr/file/320403, 2019, pp. 339-345.
Shangmeng Li, "The Design and Implementation of Mobile Terminal System of Multimedia Conference Based on Symbian Operating System", China Academic Journal Electronic Publishing House, online available at: http://www.cnki.net, 2011, 66 pages (Official Copy only). {See Communication Under Rule 37 CFR § 1.98(a)(3)}.
Sharf et al., "SnapPaste:an interactive technique for easy mesh composition", The Visual Computer; International Journal of Computer Graphics, Springer, Berlin, De, vol. 22, No. 9-11.
Song Jianhua, "Guidelines for Network", Feb. 29, 2008, 11 pages (Official Copy Only). {See Communication Under Rule 37 CFR § 1.98(a)(3)}.
Summons to Attend oral proceedings received for European Application No. 10799259.6, mailed on Aug. 2, 2016, 16 pages.
Summons to Attend Oral Proceedings received for European Patent Application No. 19729395.4, mailed on Mar. 11, 2021, 7 pages.
Summons to Attend Oral Proceedings received for European Patent Application No. 19729395.4, mailed on Mar. 19, 2021, 9 pages.
Summons to Attend Oral Proceedings received for European Patent Application No. 20205496.1, mailed on Sep. 8, 2022, 9 pages.
Supplemental Notice of Allowance received for U.S. Appl. No. 15/608,866, mailed on Feb. 20, 2020, 2 pages.
Supplemental Notice of Allowance received for U.S. Patent Application No. 16/859, 101, mailed on Feb. 7, 2022, 2 pages.
Supplemental Notice of Allowance received for U.S. Patent Application No. 16/859, 101, mailed on Feb. 25, 2022, 2 pages.
Supplemental Notice of Allowance received for U.S. Appl. No. 17/484,899, mailed on Feb. 3, 2025, 5 pages.
Supplemental Notice of Allowance received for U.S. Appl. No. 17/484,899, mailed on Oct. 29, 2024, 5 pages.
Supplemental Notice of Allowance received for U.S. Appl. No. 17/484,899, mailed on Sep. 30, 2024, 5 pages.
That Guy who Loves Metv and Ssbb Mods, "Kinect Party Gameplay", Available online at: https://youtu.be/bkbOlzfyLzc?si=QAAKh_V4aqY0iegL, Oct. 20, 2021, 2 pages.

(56) References Cited

OTHER PUBLICATIONS

Trish's World, "Samsung Gear S3 Apps Launcher", Available Online at <https://www.youtube.com/watch?v=zlamYA-4XSQ>, Feb. 5, 2017, 1 page.

Wolfe Joanna, "Annotation Technologies: A Software and Research Review", Computers and Composition, vol. 19, No. 4, 2002, pp. 471-497.

Written Opinion received for PCT Patent Application No. PCT/US95/11025, mailed on Oct. 4, 1996, 6 pages.

Xbox, "Kinect Tips, Part 3: Gesture Controls", Available online at: https://youtu.be/VXhhE-196qQ?si=gLmHbp9jOm-wOfNW, May 7, 2014, 3 pages.

* cited by examiner

ESTABLISHING A VIDEO CONFERENCE DURING A PHONE CALL

This application is a continuation of U.S. patent application Ser. No. 17/332,829, filed May 27, 2021, and entitled "ESTABLISHING A VIDEO CONFERENCE DURING A PHONE CALL," which is a continuation of U.S. patent application Ser. No. 16/666,073 (now U.S. Pat. No. 11,025,861), filed Oct. 28, 2019, and entitled "ESTABLISHING A VIDEO CONFERENCE DURING A PHONE CALL," which is a continuation of U.S. patent application Ser. No. 15/725,868 (now U.S. Pat. No. 10,462,420), filed Oct. 5, 2017, and entitled "ESTABLISHING A VIDEO CONFERENCE DURING A PHONE CALL," which is a continuation of U.S. patent application Ser. No. 14/263,889 (now U.S. Pat. No. 9,787,938), filed Apr. 28, 2014, and entitled "ESTABLISHING A VIDEO CONFERENCE DURING A PHONE CALL," which is a continuation of U.S. patent application Ser. No. 12/794,766 (now U.S. Pat. No. 8,744,420), filed Jun. 6, 2010, and entitled "ESTABLISHING A VIDEO CONFERENCE DURING A PHONE CALL," which claims the benefit of U.S. Provisional Application No. 61/321,871, filed Apr. 7, 2010, and entitled "ESTABLISHING A VIDEO CONFERENCE DURING A PHONE CALL," the entire disclosures of which are hereby incorporated by reference for all purposes.

BACKGROUND

Many of today's portable devices, such as smartphones, provide video capture functionality. A user of the portable device can capture both still images and video through a camera on the phone. However, to transmit captured video to another party, the user must generally either send the video directly to the other party or upload the video to another location (e.g., an Internet video hosting site) after the video is done being captured. Unfortunately, this does not allow the other party to view the live video stream as it is captured by the portable device.

In addition, standard portable devices are only equipped with one camera, and processing information from this one camera is difficult enough. An ideal device would have multiple cameras and could send out live video that is a composition of video from at least two cameras. This is an especially difficult problem in light of the limited resources available for portable devices, both in terms of the device processing multiple captured video streams and a network to which the device is connected handling the transmission of the live video streams.

BRIEF SUMMARY

Some embodiments of the invention provide a mobile device with two cameras that can take pictures and videos. The mobile device of some embodiments has a display screen for displaying the captured picture images and video images. It also includes a storage for storing the captured images for later transmission to another device. The device further has a network interface that allows the device to transmit the captured images to one or more devices during a real-time communication session between the users of the devices. The device also includes an encoder that it can use to encode the captured images for local storage or for transmission to another device. The mobile device further includes a decoder that allows the device to decode images captured by another device during a real-time communication session or to decode images stored locally.

One example of a real-time communication session that involves the transmission of the captured video images is a video conference. In some embodiments, the mobile device can only transmit one camera's captured video images at any given time during a video conference. In other embodiments, however, the mobile device can transmit captured video images from both of its cameras simultaneously during a video conference or other real-time communication session.

During a video conference with another device, the mobile device of some embodiments can transmit other types of content along with the video captured by one or both of its cameras. One example of such other content includes low or high resolution picture images that are captured by one of the device's cameras, while the device's other camera is capturing a video that is used in the video conference. Other examples of such other content include (1) files and other content stored on the device, (2) the screen display of the device (i.e., the content that is displayed on the device's screen), (3) content received from another device during a video conference or other real-time communication session, etc.

The mobile devices of some embodiments employ novel in-conference adjustment techniques for making adjustments during a video conference. For instance, while transmitting only one camera's captured video during a video conference, the mobile device of some embodiments can dynamically switch to transmitting a video captured by its other camera. In such situations, the mobile device of some embodiments notifies any other device participating in the video conference of this switch so that this other device can provide a smooth transition on its end between the videos captured by the two cameras.

In some embodiments, the request to switch cameras not only can originate on the "local" device that switches between its cameras during the video conference, but also can originate from the other "remote" device that is receiving the video captured by the local device. Moreover, allowing one device to direct another device to switch cameras is just one example of a remote control capability of the devices of some embodiments. Examples of other operations that can be directed to a device remotely in some embodiments include exposure adjustment operations (e.g., auto-exposure), focus adjustment operations (e.g., auto-focus), etc. Another example of a novel in-conference adjustment that can be specified locally or remotely is the identification of a region of interest (ROI) in a captured video, and the use of this ROI identification to modify the behavior of the capturing camera, to modify the image processing operation of the device with the capturing camera, or to modify the encoding operation of the device with the capturing camera.

Yet another example of a novel in-conference adjustment of some embodiments involves real-time modifications of composite video displays that are generated by the devices. Specifically, in some embodiments, the mobile devices generate composite displays that simultaneously display multiple videos captured by multiple cameras of one or more devices. In some cases, the composite displays place the videos in adjacent display areas (e.g., in adjacent windows). In other cases, the composite display is a picture-in-picture (PIP) display that includes at least two display areas that show two different videos where one of the display areas is a background main display area and the other is a foreground inset display area that overlaps the background main display area.

The real-time modifications of the composite video displays in some embodiments involve moving one or more of the display areas within a composite display in response to a user's selection and movement of the display areas. Some embodiments also rotate the composite display during a video conference, when the screen of the device that provides this composite display rotates. Also, the mobile device of some embodiments allows the user of the device to swap the videos in a PIP display (i.e., to make the video in the foreground inset display appear in the background main display while making the video in the background main display appear in the foreground inset display).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a mobile device with two cameras that can take pictures and videos. Examples of mobile devices include mobile phones, smartphones, personal digital assistants (PDAs), laptops, tablet personal computers, or any other type of mobile computing device. As used in this document, pictures refer to still picture images that are taken by the camera one at a time in a single-picture mode, or several at a time in a fast-action mode. Video, on the other hand, refers to a sequence of video images that are captured by a camera at a particular rate, which is often referred to as a frame rate. Typical frame rates for capturing video are 25 frames per second (fps), 30 fps, and 60 fps. The cameras of the mobile device of some embodiments can capture video images (i.e., video frames) at these and other frame rates.

The mobile device of some embodiments (1) can display the captured picture images and video images, (2) can store the captured images for later transmission to another device, (3) can transmit the captured images to one or more devices during a real-time communication session between the users of the devices, and (4) can encode the captured images for local storage or for transmission to another device.

One example of a real-time communication session that involves the transmission of the captured video images is a video conference. In some embodiments, the mobile device can only transmit one camera's captured video images at any given time during a video conference. In other embodiments, however, the mobile device can transmit captured video images from both of its cameras simultaneously during a video conference or other real-time communication session.

Figure 1:
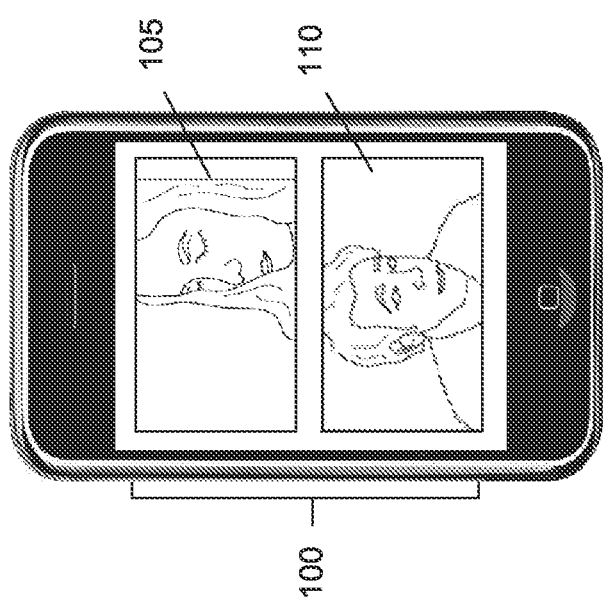
FIG. 1 illustrates a composite display of some embodiments.

The mobile devices of some embodiments generate composite displays that include simultaneous display of multiple videos captured by multiple cameras of one or more devices. In some cases, the composite displays place the videos in adjacent display areas (e.g., in adjacent windows). FIG. 1 illustrates one such example of a composite display 100 that includes two adjacent display areas 105 and 110 that simultaneously display two videos captured by two cameras of one device or captured by two cameras of two different devices that are in a video conference.

Figure 2:
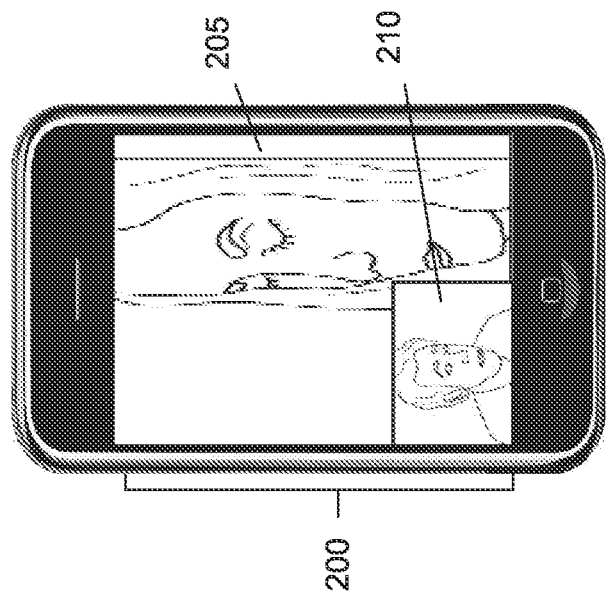
FIG. 2 illustrates another composite display of some embodiments.

In other cases, the composite display is a PIP display that includes at least two display areas that show two different videos, where one of the display areas is a background main display area and the other is a foreground inset display area that overlaps the background main display area. FIG. 2 illustrates one such example of a composite PIP display 200. This composite PIP display 200 includes a background main display area 205 and a foreground inset display area 210 that overlaps the background main display area. The two display areas 205 and 210 simultaneously display two videos captured by two cameras of one device, or captured by two cameras of two different devices that are in a video conference. While the example composite PIP displays illustrated and discussed in this document are similar to the composite PIP display 200, which shows the entire foreground inset display area 210 within the background main display area 205, other composite PIP displays that have the foreground inset display area 210 overlapping, but not entirely inside, the background main display area 205 are possible.

In addition to transmitting video content during a video conference with another device, the mobile device of some embodiments can transmit other types of content along with the conference's video content. One example of such other content includes low or high resolution picture images that are captured by one of the device's cameras, while the device's other camera is capturing a video that is used in the video conference. Other examples of such other content include (1) files and other content stored on the device, (2) the screen display of the device (i.e., the content that is displayed on the device's screen), (3) content received from another device during a video conference or other real-time communication session, etc.

The mobile devices of some embodiments employ novel in-conference adjustment techniques for making adjustments during a video conference. For instance, while transmitting only one camera's captured video during a video conference, the mobile device of some embodiments can dynamically switch to transmitting the video captured by its other camera. In such situations, the mobile device of some embodiments notifies any other device participating in the video conference of this switch so that this other device can provide a smooth transition on its end between the videos captured by the two cameras.

In some embodiments, the request to switch cameras not only can originate on the "local" device that switches between its cameras during the video conference, but also can originate from the other "remote" device that is receiving the video captured by the local device. Moreover, allowing one device to direct another device to switch cameras is just one example of a remote control capability of the devices of some embodiments. Examples of other operations that can be directed to a device remotely in some embodiments include exposure adjustment operations (e.g., auto-exposure), focus adjustment operations (e.g., auto-focus), etc. Another example of a novel in-conference adjustment that can be specified locally or remotely is the identification of a region of interest (ROI) in a captured video, and the use of this ROI identification to modify the behavior of the capturing camera, to modify the image processing operation of the device with the capturing camera, or to modify the encoding operation of the device with the capturing camera.

Yet another example of a novel in-conference adjustment of some embodiments involves real-time modifications of composite video displays that are generated by the devices. Specifically, in some embodiments, the real-time modifications of the composite video displays involve moving one or more of the display areas within a composite display in response to a user's selection and movement of the display areas. Some embodiments also rotate the composite display during a video conference, when the screen of the device that provides this composite display rotates. Also, the mobile device of some embodiments allow the user of the device to flip the order of videos in a PIP display (i.e., to make the video in the foreground inset display appear in the background main display, while making the video in the background main display appear in the foreground inset display).

Several more detailed embodiments are described below. Section I provides a description of the video processing architecture of some embodiments. Section II then describes the captured image processing unit of some embodiments. In some embodiments, this unit is the component of the device that is responsible for processing raw images captured by the cameras of the device.

Next, Section III describes the video conferencing architecture of some embodiments. This section also describes the video conference module of some embodiments, as well as several manners for setting up a single camera video conference. Section IV then describes in-conference adjustment and control operations of some embodiments. Section V then describes video conference features of embodiments that transmit and display multiple videos from individual devices during a video conference. Section VI next describes transmission of real-time video along with non real-time content during a video conference. Lastly, Section VII describes the hardware architecture of the dual camera device of some embodiments.

I. Video Capture and Processing

Figure 3:
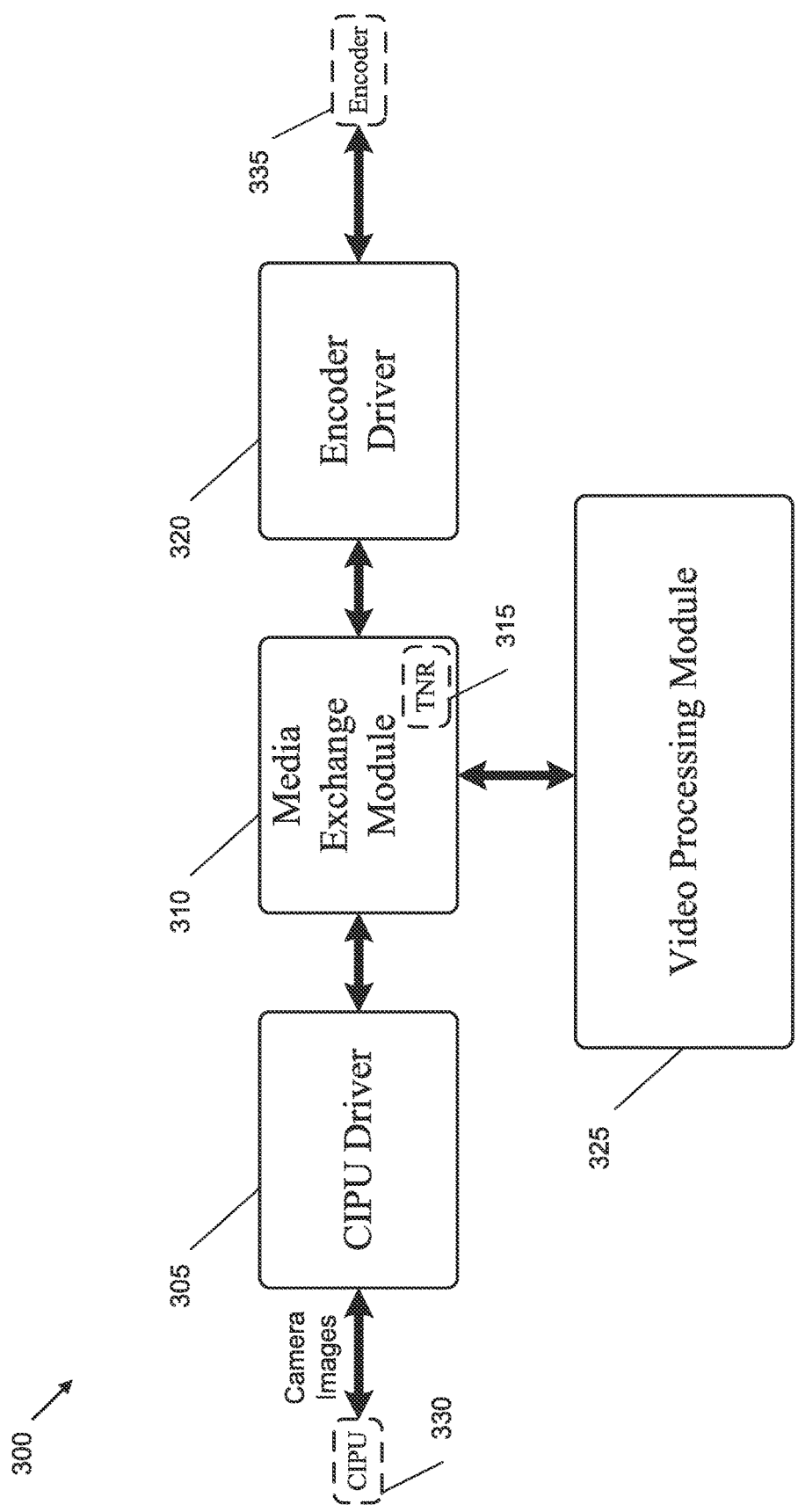
FIG. 3 conceptually illustrates a software architecture for a video processing and encoding module of a dual camera mobile device of some embodiments.

FIG. 3 conceptually illustrates a video processing and encoding module 300 of a dual camera mobile device of some embodiments. In some embodiments, the module 300 processes images and encodes videos that are captured by the cameras of the dual camera mobile device. As shown in FIG. 3, this module 300 includes a captured image processing unit (CIPU) driver 305, a media exchange module 310, an encoder driver 320, and a video processing module 325.

In some embodiments, the media exchange module 310 allows programs on the device that are consumers and producers of media content to exchange media content and instructions regarding the processing of the media content. In the video processing and encoding module 300, the media exchange module 310 of some embodiments routes instructions and media content between the video processing module 325 and the CIPU driver 305, and between the video processing module 325 and the encoder driver 320. To facilitate the routing of such instructions and media content, the media exchange module 310 of some embodiments provides a set of application programming interfaces (APIs) for the consumers and producers of media content to use. In some of such embodiments, the media exchange module 310 is a set of one or more frameworks that is part of an operating system running on the dual camera mobile device. One example of such a media exchange module 310 is the Core Media framework provided by Apple Inc.

The video processing module 325 performs image processing on the images and/or the videos captured by the cameras of the device. Examples of such operations include exposure adjustment operations, focus adjustment operations, perspective correction, dynamic range adjustment, image resizing, image compositing, etc. In some embodiments, some image processing operations can also be performed by the media exchange module 310. For instance, as shown in FIG. 3, the media exchange module 310 of some embodiments performs a temporal noise reduction (TNR) operation (e.g., by TNR 315) that reduces noise in video images captured by the cameras of the device. Further examples of such image processing operations of the video processing module 325 and the media exchange module 310 will be provided below.

Through the media exchange module 310, the video processing module 325 interfaces with the CIPU driver 305 and the encoder driver 320, as mentioned above. The CIPU driver 305 serves as a communication interface between a captured image processing unit (CIPU) 330 and the media exchange module 310. As further described below, the CIPU 330 is the component of the dual camera device that is responsible for processing images captured during image capture or video capture operations of the device's cameras. From the video processing module 325 through the media exchange module 310, the CIPU driver 305 receives requests for images and/or videos from one or both of the device's cameras. The CIPU driver 305 relays such requests to the CIPU 330, and in response receives the requested images and/or videos from the CIPU 330, which the CIPU driver 305 then sends to the video processing module 325 through the media exchange module 310. Through the CIPU driver 305 and the media exchange module 310, the video processing module 325 of some embodiments also sends instructions to the CIPU 330 in order to modify some of its operations (e.g., to modify a camera's frame rate, exposure adjustment operation, focus adjustment operation, etc.).

The encoder driver 320 serves as a communication interface between the media exchange module 310 and an encoder hardware 335 (e.g., an encoder chip, an encoding component on a system on chip, etc.). In some embodiments, the encoder driver 320 receives images and requests to encode the images from the video processing module 325 through the media exchange module 310. The encoder driver 320 sends the images to be encoded to the encoder 335, which then performs picture encoding or video encoding on the images. When the encoder driver 320 receives encoded images from the encoder 335, the encoder driver 320 sends the encoded images back to the video processing module 325 through the media exchange module 310.

In some embodiments, the video processing module 325 can perform different operations on the encoded images that it receives from the encoder. Examples of such operations include storing the encoded images in a storage of the device, transmitting the encoded images in a video conference through a network interface of the device, etc.

In some embodiments, some or all of the modules of the video processing and encoding module 300 are implemented as part of an operating system. For example, some embodiments implement all four components 305, 310, 320, and 325 of this module 300 as part of the operating system of the device. Other embodiments implement the media exchange module 310, the CIPU driver 305, and the encoder driver 320 as part of the operating system of the device, while having the video processing module 325 as an application that runs on the operating system. Still, other implementations of the module 300 are possible.

The operation of the video processing and encoding module 300 during a video capture session will now be described. To start a video capture session, the video processing module 325 initializes several components that are needed for the video capture session. In some embodiments, these components include (1) the CIPU 330, (2) a scaling and compositing module (not shown) of the video processing module 325, (3) an image processing module (not shown) of the video processing module 325, and (4) the encoder 335. Also, the video processing module 325 of some embodiments initializes a network manager (not shown) when it is participating in a video conference.

Through the media exchange module 310 and the CIPU driver 305, the video processing module sends its initialization request to the CIPU 330, in order to have one or both of the cameras of the device start video capturing. In some embodiments, this request specifies a particular frame rate, exposure level, and scaling size for each camera that needs to capture a video. In response to this request, the CIPU 330 starts to return video images from the requested cameras at the specified rate(s), exposure level(s), and scaling size(s). These video images are returned to the video processing module 325 through the CIPU driver 305 and the media exchange module 310, which, as mentioned above, performs TNR operations on the video images before supplying them to the video processing module 325. At the video processing module 325, the video images are stored in a buffer (not shown) for additional image processing.

The image processing module of the video processing module 325 retrieves the video images stored in the buffer for additional video processing. The scaling and compositing module then retrieves the processed video images in order to scale them if necessary for real time display on the display screen of the device. In some embodiments, this module creates composite images from the images captured by two cameras of the device or from images captured by the camera(s) of the device along with the camera(s) of another device during a video conference in order to provide a real-time display of the captured video images on the device or to create a composite video image for encoding.

The processed and/or composited video images are supplied to the encoder 335 through the encoder driver 320 and the media exchange module 310. The encoder 335 then encodes the video images. The encoded images are then returned to the video processing module 325 (again through the encoder driver 320 and the media exchange module 310) for storage on the device or for transmission during a video conference. When the device is participating in a video conference, the network manager (that was initialized by the video processing module 325) then retrieves these encoded images, packetizes them and transmits them to one or more other devices through a network interface (not shown) of the device.

II. Captured Image Processing

A. Single Pipeline

The images captured by cameras of the dual camera mobile device of some embodiments are raw, unprocessed images. These images require conversion to a particular color space before the images can be used for other operations such as transmitting the images to another device (e.g., during a video conference), storing the images, or displaying the images. In addition, the images captured by the cameras may need to be processed to correct errors and/or distortions and to adjust the images' color, size, etc. Accordingly, some embodiments perform several processing operations on the images before storing, transmitting, and displaying such images. Part of the processing of such images is performed by the CIPU 330.

Figure 4:
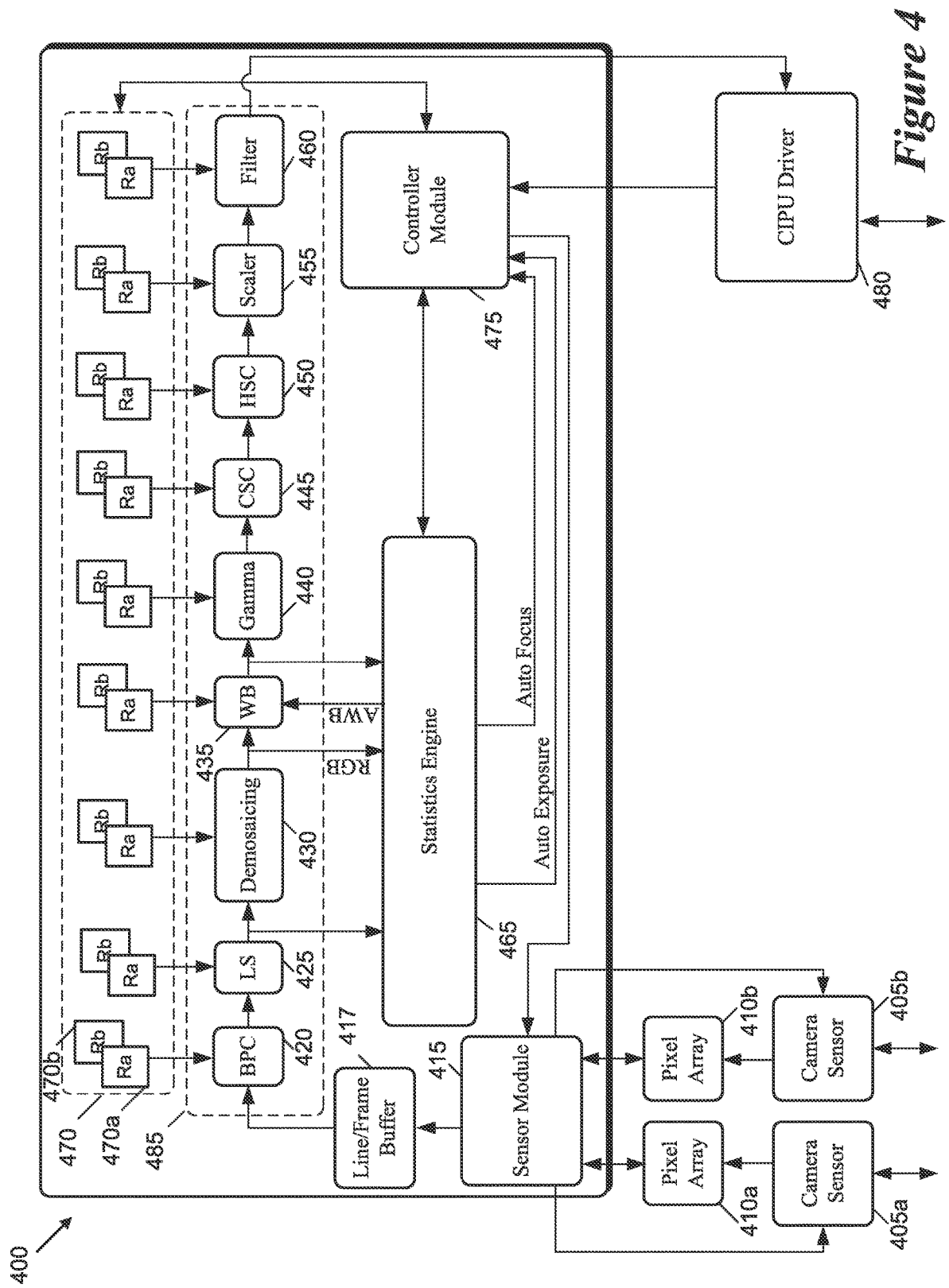
FIG. 4 conceptually illustrates a captured image processing unit of some embodiments.

One example of such a CIPU is illustrated in FIG. 4. Specifically, this figure conceptually illustrates a captured image processing unit (CIPU) 400 of some embodiments. This CIPU 400 includes a single processing pipeline 485 that either processes images from only one of the device's cameras at a time, or processes images from both of the device's cameras simultaneously in a time-division multiplex fashion (i.e., in a time interleaved manner). The CIPU 400's processing pipeline 485 can be configured differently to address differing characteristics and/or operational settings of the different cameras. Examples of different camera characteristics in some embodiments include different resolutions, noise sensors, lens types (fixed or zoom lens), etc. Also, examples of different operational settings under which the device can operate the cameras in some embodiments include image resolution size, frame rate, zoom level, exposure level, etc.

As shown in FIG. 4, the CIPU 400 includes a sensor module 415, a line/frame buffer 417, a bad pixel correction (BPC) module 420, a lens shading (LS) module 425, a demosaicing module 430, a white balance (WB) module 435, a gamma module 440, a color space conversion (CSC) module 445, a hue, saturation, and contrast (HSC) module 450, a scaler module 455, a filter module 460, a statistics engine 465, two sets of registers 470, and a controller module 475. In some embodiments, all of the modules of the CIPU 400 are implemented in hardware (e.g., an ASIC, FPGA, a SOC with a microcontroller, etc.), while in other embodiments, some or all of the modules of the CIPU 400 are implemented in software.

As shown in FIG. 4, the sensor module 415 communicatively couples to two pixel arrays 410a and 410b and two sets of sensors 405a and 405b of two cameras of the device. In some embodiments, this communicative coupling is facilitated through each camera sensor's mobile industry processor interface (MIPI).

Through this communicative coupling, the sensor module 415 can forward instructions to the cameras to control various aspects of each camera's operations such as its power level, zoom level, focus, exposure level, etc. In some embodiments, each camera has four operational power modes. In the first operational power mode, the camera is powered off. For the second operational power mode, the camera is powered on, but it is not yet configured. In the third operational power mode, the camera is powered on, the camera's sensor is configured, and the camera sensor's pixels are collecting photons and converting the collected photons to digital values. However, the camera sensor is not yet sending images to the sensor module 415. Finally, in the fourth operational power mode, the camera is in the same operational power mode as the third power mode except the camera is now sending images to the sensor module 415.

During the operation of the device, the cameras may switch from one operational power mode to another any number of times. When switching operational power modes, some embodiments require the cameras to switch operational power modes in the order described above. Therefore, in those embodiments, a camera in the first operational power mode can only switch to the second operational power mode. When the camera is in the second operational power mode, it can switch to the first operational power mode or to the third operational power mode. Similarly, the camera can switch from the third operational power mode to the second operational power mode or the fourth operation power mode. When the camera is in the fourth operational power mode, it can only switch back to the third operational power mode.

Moreover, switching from one operational power mode to the next or the previous operational power mode takes a particular amount of time. Thus, switching between two or three operational power modes is slower than switching between one operational power mode. The different operational power modes also consume different amounts of power. For instance, the fourth operational power mode consumes the most amount of power, the third operational power mode consumes more power than the first and second, and the second operational power mode consumes more than the first. In some embodiments, the first operational power mode does not consume any power.

When a camera is not in the fourth operational power mode capturing images, the camera may be left in one of the other operational power modes. Determining the operational mode in which to leave the unused camera depends on how much power the camera is allowed to consume and how fast the camera may need to respond to a request to start capturing images. For example, a camera configured to operate in the third operational power mode (e.g., standby mode) consumes more power than a camera configured to be in the first operational power mode (i.e., powered off). However, when the camera is instructed to capture images, the camera operating in the third operational power mode can switch to the fourth operational power mode faster than the camera operating in the first operational power mode. As such, the cameras can be configured to operate in the different operational power modes when not capturing images based on different requirements (e.g., response time to a request to capture images, power consumption).

Through its communicative coupling with each camera, the sensor module 415 can direct one or both sets of camera sensors to start capturing images when the video processing module 325 requests one or both cameras to start capturing images and the sensor module 415 receives this request through the controller module 475, as further described below. Bayer filters are superimposed over each of the camera sensors and thus each camera sensor outputs Bayer pattern images, which are stored in the pixel array associated with each camera sensor. A Bayer pattern image is an image where each pixel only stores one color value: red, blue, or green.

Through its coupling with the pixel arrays 410a and 410b, the sensor module 415 retrieves raw Bayer pattern images stored in the camera pixel arrays 410a and 410b. By controlling the rate at which the sensor module 415 retrieves images from a camera's pixel array, the sensor module 415 can control the frame rate of the video images that are being captured by a particular camera. By controlling the rate of its image retrieval, the sensor module 415 can also interleave the fetching of images captured by the different cameras in order to interleave the CIPU processing pipeline 485's image processing of the captured images from the different cameras. The sensor module 415's control of its image retrieval is further described below in sub-sections II.A.1 and II.A.2.

The sensor module 415 stores image lines (i.e., rows of pixels of an image) in the line/frame buffer 417, which the sensor module 415 retrieves from the pixel arrays 410a and 410b. Each image line in the line/frame buffer 417 is processed through the CIPU processing pipeline 485. As shown in FIG. 4, the CIPU processing pipeline 485 is formed by the BPC module 420, the LS module 425, the demosaicing module 430, the WB module 435, the gamma module 440, the CSC module 445, the HSC module 450, the scaler module 455, and the filter module 460. In some embodiments, the CIPU processing pipeline 485 processes images from the line/frame buffer 417 on a line-by-line (i.e., row-by-row) basis while in other embodiments the CIPU processing pipeline 485 processes entire images from the line/frame buffer 417 on a frame-by-frame basis.

In the exemplary pipeline illustrated in FIG. 4, the BPC module 420 is the module that retrieves the images from the line/frame buffer 417. This module performs a bad-pixel removal operation that attempts to correct bad pixels in the retrieved images that might have resulted from one or more of the camera sensors being defective (e.g., the defective photo sensors do not sense light at all, sense light incorrectly, etc.). In some embodiments, the BPC module 420 detects bad pixels by comparing a particular pixel in an image with one or more neighboring pixels in the image. If the difference between the value of the particular pixel and the values of the neighboring pixels is greater than a threshold amount, the particular pixel's value is replaced by the average of several neighboring pixels' values that are of the same color (i.e., red, green, and blue) as the particular pixel.

The operation of the BPC module 420 is in part controlled by the values stored for this module in the two sets of registers 470 of the CIPU 400. Specifically, to process the images captured by the two different cameras of the device, some embodiments configure the CIPU processing pipeline 485 differently for each camera, as mentioned above. The CIPU processing pipeline 485 is configured for the two different cameras by storing two different sets of values in the two different sets of registers 470a (Ra) and 470b (Rb) of the CIPU 400. Each set of registers 470 includes one register (Ra or Rb) for each of the modules 420-460 within the CIPU processing pipeline 485. Each register in each register set stores a set of values that defines one processing pipeline module's operation. Accordingly, as shown in FIG. 4, the register set 470a is for indicating the mode of operation of each processing pipeline module for one camera (camera A) of the dual camera mobile device, while the register set 470b is for indicating the mode of operation of each module for the other camera (camera B) of the dual camera mobile device.

One example of configuring the CIPU processing pipeline 485 differently for each camera is to configure the modules of the CIPU processing pipeline 485 to process different sized images. For instance, if the camera sensor 405a is 640×480 pixels and the camera sensor 405b is 2048×1536 pixels, the set of registers 470a is configured to store values that instruct the modules of the CIPU processing pipeline 485 to process 640×480 pixel images and the set of registers 470b is configured to store values that instruct the modules of the CIPU processing pipeline 485 to process 2048×1536 pixel images.

In some embodiments, different processing pipeline configurations (i.e., register values) are stored in different profile settings. In some of such embodiments, a user of the mobile device is allowed to select one of the profile settings (e.g., through a user interface displayed on the mobile device) to set the operation of a camera(s). For example, the user may select a profile setting for configuring a camera to capture high resolution video, a profile setting for configuring the same camera to capture low resolution video, or a profile setting for configuring both cameras to capture high resolution still images. Different configurations are possible, which can be stored in many different profile settings. In other of such embodiments, instead of allowing the user to select a profile setting, a profile setting is automatically selected based on which application or activity the user selects. For instance, if the user selects a video conferencing application, a profile that configures both cameras to capture video is automatically selected, if the user selects a photo application, a profile that configures one of the cameras to capture still images is automatically selected, etc.

After the BPC module 420, the LS module 425 receives the bad-pixel-corrected images. The LS module 425 performs a lens shading correction operation to correct for image defects that are caused by camera lenses that produce light falloff effects (i.e., light is reduced towards the edges of the camera sensor). Such effects cause images to be unevenly illuminated (e.g., darker at corners and/or edges). To correct these image defects, the LS module 425 of some embodiments estimates a mathematical model of a lens' illumination fall-off. The estimated model is then used to compensate the lens fall-off of the image to evenly illuminate unevenly illuminated portions of the image. For example, if a corner of the image is half the brightness of the center of the image, the LS module 425 of some embodiments multiplies the corner pixels value by two in order to produce an even image.

The demosaicing module 430 performs a demosaicing operation to generate full color images from images of sampled colors. As noted above, the camera sensors output Bayer pattern images, which are incomplete because each pixel of a Bayer pattern image stores only one color value. The demosaicing module 430 reconstructs a red, green, blue (RGB) image from a Bayer pattern image by interpolating the color values for each set of colors in the Bayer pattern image.

The WB module 435 performs a white balance operation on the RGB images received from the demosaicing module 430 so that the colors of the content of the images are similar to the colors of such content perceived by the human eye in real life. The WB module 435 adjusts the white balance by adjusting colors of the images to render neutral colors (e.g., gray, white, etc.) correctly. For example, an image of a piece of white paper under an incandescent light may appear yellow whereas the human eye perceives the piece of paper as white. To account for the difference between the color of the images that the sensor captures and what the human eye perceives, the WB module 435 adjusts the color values of the image so that the captured image properly reflects the colors perceived by the human eye.

The statistics engine 465 collects image data at various stages of the CIPU processing pipeline 485. For example, FIG. 4 shows that the statistics engine 465 collects image data after the LS module 425, the demosaicing module 430, and the WB module 435. Different embodiments collect data from any number of different stages of the CIPU processing pipeline 485. The statistics engine 465 processes the collected data, and, based on the processed data, adjusts the operations of the camera sensors 405a and 405b through the controller module 475 and the sensor module 415. Examples of such operations include exposure and focus. Although FIG. 4 shows the statistics engine 465 controlling the camera sensors 405a and 405b through the controller module 475, other embodiments of the statistics engine 465 control the camera sensors through just the sensor module 415.

The processed data can also be used to adjust the operations of various modules of the CIPU 400. For instance, the statistics engine 465 of some embodiments adjusts the operations of the WB module 435 based on data collected after the WB module 435. In some of such embodiments, the statistics engine 465 provides an automatic white balance (AWB) function by using the processed data to adjust the white balancing operation of the WB module 435. Other embodiments can use processed data collected from any number of stages of the CIPU processing pipeline 485 to adjust the operations of any number of modules within the CIPU processing pipeline 485. Further, the statistics engine 465 can also receive instructions from the controller module 475 to adjust the operations of one or more modules of the CIPU processing pipeline 485.

After receiving the images from the WB module 435, the gamma module 440 performs a gamma correction operation on the image to code and decode luminance or tristimulus values of the camera system. The gamma module 440 of some embodiments corrects gamma by converting a 10-12 bit linear signal into an 8 bit non-linear encoding in order to correct the gamma of the image. Some embodiments correct gamma by using a lookup table.

The CSC module 445 converts the image received from the gamma module 440 from one color space to another color space. Specifically, the CSC module 445 converts the image from an RGB color space to a luminance and chrominance (YUV) color space. However, other embodiments of the CSC module 445 can convert images from and to any number of color spaces.

The HSC module 450 may adjust the hue, saturation, contrast, or any combination thereof of the images received from the CSC module 445. The HSC module 450 may adjust these properties to reduce the noise or enhance the images, for example. For instance, the saturation of images captured by a low-noise camera sensor can be increased to make the images appear more vivid. In contrast, the saturation of images captured by a high-noise camera sensor can be decreased to reduce the color noise of such images.

After the HSC module 450, the scaler module 455 may resize images to adjust the pixel resolution of the image or to adjust the data size of the image. The scaler module 455 may also reduce the size of the image in order to fit a smaller display, for example. The scaler module 455 can scale the image a number of different ways. For example, the scaler module 455 can scale images up (i.e., enlarge) and down (i.e., shrink). The scaler module 455 can also scale images proportionally or scale images anamorphically.

The filter module 460 applies one or more filter operations to images received from the scaler module 455 to change one or more attributes of some or all pixels of an image. Examples of filters include a low-pass filter, a high-pass filter, a band-pass filter, a bilateral filter, a Gaussian filter, among other examples. As such, the filter module 460 can apply any number of different filters to the images.

The controller module 475 of some embodiments is a microcontroller that controls the operation of the CIPU 400. In some embodiments, the controller module 475 controls (1) the operation of the camera sensors (e.g., exposure level) through the sensor module 415, (2) the operation of the CIPU processing pipeline 485, (3) the timing of the CIPU processing pipeline 485 (e.g., when to switch camera sensors, when to switch registers, etc.), and (4) a flash/strobe (not shown), which is part of the dual camera mobile device of some embodiments.

Some embodiments of the controller module 475 process instructions received from the statistics engine 465 and the CIPU driver 480. In some embodiments, the instructions received from the CIPU driver 480 are instructions from the dual camera mobile device (i.e., received from the local device) while in other embodiments the instructions received from the CIPU driver 480 are instructions from another device (e.g., remote control during a video conference). Based on the processed instructions, the controller module 475 can adjust the operation of the CIPU 400 by programming the values of the registers 470. Moreover, the controller module 475 can dynamically reprogram the values of the registers 470 during the operation of the CIPU 400.

As shown in FIG. 4, the CIPU 400 includes a number of modules in the CIPU processing pipeline 485. However, one of ordinary skill will realize that the CIPU 400 can be implemented with just a few of the illustrated modules or with additional and different modules. In addition, the processing performed by the different modules can be applied to images in sequences different from the sequence illustrated in FIG. 4.

An example operation of the CIPU 400 will now be described by reference to FIG. 4. For purposes of explanation, the set of registers Ra is used for processing images captured by camera sensor 405a of the dual camera mobile device and the set of registers Rb is used for processing images captured by camera sensor 405b of the dual camera mobile device. The controller module 475 receives instructions from the CIPU driver 480 to produce images captured by one of the cameras of the dual camera mobile device.

The controller module 475 then initializes various modules of the CIPU processing pipeline 485 to process images captured by one of the cameras of the dual camera mobile device. In some embodiments, this includes the controller module 475 checking that the correct set of registers of the registers 470 are used. For example, if the CIPU driver 480 instructs the controller module 475 to produce images captured by the camera sensor 405a, the controller module 475 checks that the set of registers Ra is the set of registers from which the modules of the CIPU 400 read. If not, the controller module 475 switches between the sets of registers so that the set of registers Ra is the set that is read by the modules of the CIPU 400.

For each module in the CIPU processing pipeline 485, the mode of operation is indicated by the values stored in the set of registers Ra. As previously mentioned, the values in the set of registers 470 can be dynamically reprogrammed during the operation of the CIPU 400. Thus, the processing of one image can differ from the processing of the next image. While the discussion of this example operation of the CIPU 400 describes each module in the CIPU 400 reading values stored in registers to indicate the mode of operation of the modules, in some software-implemented embodiments, parameters are instead passed to the various modules of the CIPU 400.

In some embodiments, the controller module 475 initializes the sensor module 415 by instructing the sensor module 415 to delay a particular amount of time after retrieving an image from the pixel array 410a. In other words, the controller module 475 instructs the sensor module 415 to retrieve the images from the pixel array 410a at a particular rate.

Next, the controller module 475 instructs the camera sensor 405a through the sensor module 415 to capture images. In some embodiments, the controller module 475 also provides exposure and other camera operation parameters to the camera sensor 405a. In other embodiments, the camera sensor 405a uses default values for the camera sensor operation parameters. Based on the parameters, the camera sensor 405a captures a raw image, which is stored in the pixel array 410a. The sensor module 415 retrieves the raw image from the pixel array 410a and sends the image to the line/frame buffer 417 for storage before the CIPU processing pipeline 485 processing the image.

Under certain circumstances, images may be dropped by the line/frame buffer 417. When the camera sensors 405a and/or 405b are capturing images at a high rate, the sensor module 415 may receive and store images in the line/frame buffer 417 faster than the BPC module 420 can retrieve the images from the line/frame buffer 417 (e.g., capturing high frame-rate video), and the line/frame buffer 417 will become full. When this happens, the line/frame buffer 417 of some embodiments drops images (i.e., frames) based on a first in, first out basis. That is, when the line/frame buffer 417 drops an image, the line/frame buffer 417 drops the image that was received before all the other images in the line/frame buffer 417.

The processing of the image by the CIPU processing pipeline 485 starts by the BPC module 420 retrieving the image from the line/frame buffer 417 to correct any bad pixels in the image. The BPC module 420 then sends the image to the LS module 425 to correct for any uneven illumination in the image. After the illumination of the image is corrected, the LS module 425 sends the image to the demosaicing module 430 where it processes the raw image to generate an RGB image from the raw image. Next, the WB module 435 receives the RGB image from the demosaicing module 430 and adjusts the white balance of the RGB image.

As noted above, the statistics engine 465 may have collected some data at various points of the CIPU processing pipeline 485. For example, the statistics engine 465 collects data after the LS module 425, the demosaicing module 430, and the WB module 435 as illustrated in FIG. 4. Based on the collected data, the statistics engine 465 may adjust the operation of the camera sensor 405a, the operation of one or more modules in the CIPU processing pipeline 485, or both, in order to adjust the capturing of subsequent images from the camera sensor 405a. For instance, based on the collected data, the statistics engine 465 may determine that the exposure level of the current image is too low and thus instruct the camera sensor 405a through the sensor module 415 to increase the exposure level for subsequently captured images. Thus, the statistics engine 465 of some embodiments operates as a feedback loop for some processing operations.

After the WB module 435 adjusts the white balance of the image, it sends the image to the gamma module 440 for gamma correction (e.g., adjusting the gamma curve of the image). The CSC module 445 receives the gamma-corrected image from the gamma module 440 and performs color space conversion. In this example, the CSC module 445 converts the RGB image to a YUV image. In other words, the CSC module 445 converts an image that is represented in an RGB color space to an image that is represented in a YUV color space. The HSC module 450 receives the YUV image from the CSC module 445 and adjusts the hue, saturation, and contrast attributes of various pixels in the image. After the HSC module 450, the scaler module 455 resizes the image (e.g., enlarging or shrinking the image). The filter module 460 applies one or more filters on the image after receiving the image from the scaler module 455. Finally, the filter module 460 sends the processed image to the CIPU driver 480.

In this example of the operation of the CIPU 400 described above, each module in the CIPU processing pipeline 485 processed the image in some manner. However, other images processed by the CIPU 400 may not require processing by all the modules of the CIPU processing pipeline 485. For example, an image may not require white balance adjustment, gamma correction, scaling, or filtering. As such, the CIPU 400 can process images any number of ways based on a variety of received input such as instructions from the CIPU driver 480 or data collected by the statistic engine 465, for example.

Different embodiments control the rate at which images are processed (i.e., frame rate) differently. One manner of controlling the frame rate is through manipulation of vertical blanking intervals (VBI). For some embodiments that retrieve image lines for processing images on a line-by-line basis, a VBI is the time difference between retrieving the last line of an image of a video captured by a camera of the dual camera mobile device from a pixel array and retrieving the first line of the next image of the video from the pixel array. In other embodiments, a VBI is the time difference between retrieving one image of a video captured by a camera of the dual camera mobile device from a pixel array and retrieving the next image of the video the pixel array.

One example where VBI can be used is between the sensor module 415 and the pixel arrays 410a and 410b. For example, some embodiments of the sensor module 415 retrieve images from the pixel arrays 410a and 410b on a line-by-line basis and other embodiments of the sensor module 415 retrieve images from the pixel arrays 410a and 410b on an image-by-image basis. Thus, the frame rate can be controlled by adjusting the VBI of the sensor module 415: increasing the VBI reduces the frame rate and decreasing the VBI increases the frame rate.

1. Use of VBI for Single Camera: Frame Rate Control

Figure 5:
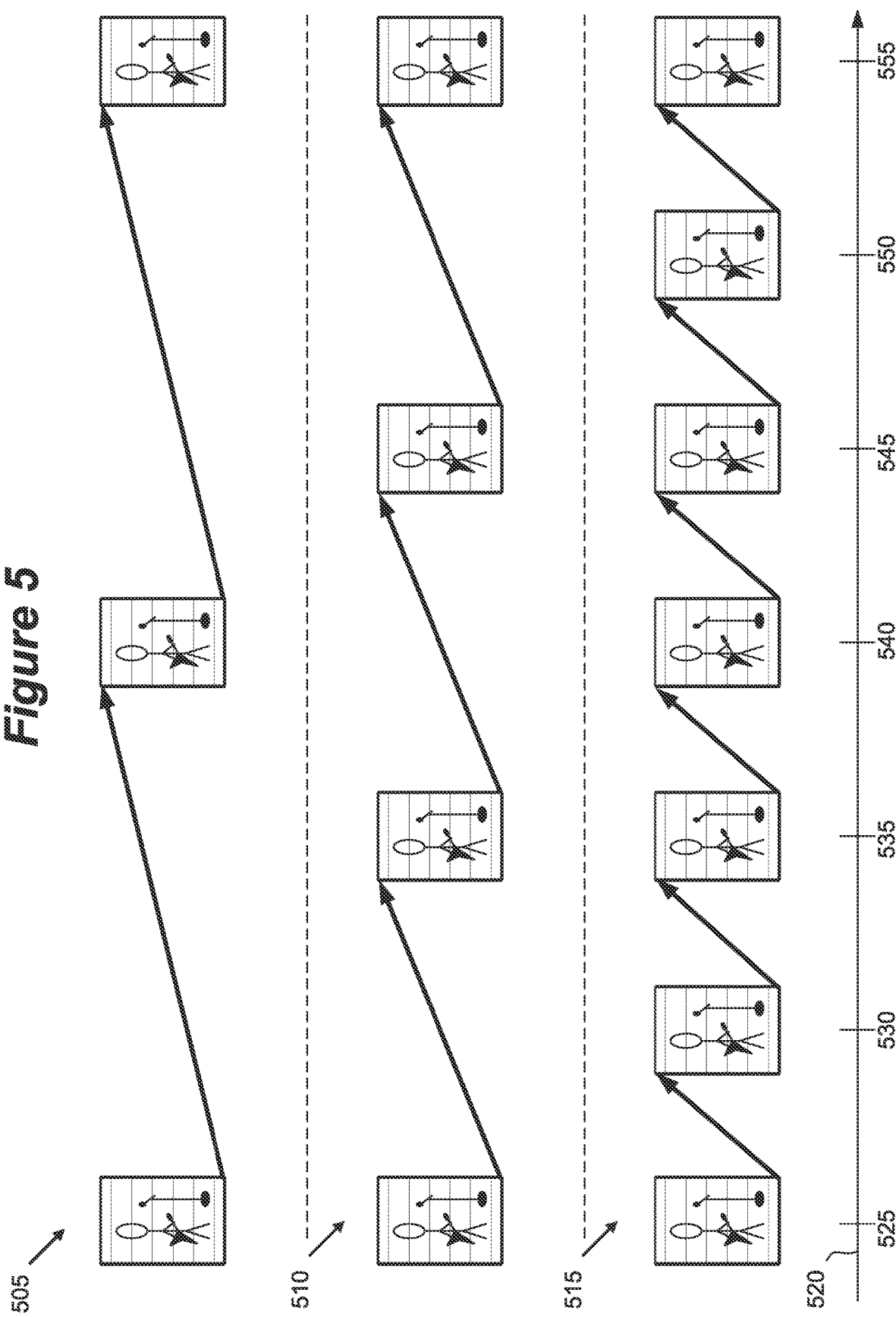
FIG. 5 conceptually illustrates examples of different frame rates based on different vertical blanking intervals (VBIs).

FIG. 5 conceptually illustrates examples of different frame rates 505, 510, and 515 based on different VBIs. Each sequence shows an image, which is captured by one of the cameras of the dual camera mobile device, of a person holding a guitar at various time instances 525-555 along timeline 520. In addition, the time between each time instance 525-555 is the same and will be referred to as one time unit. For purposes of explanation, FIG. 5 will now be described by reference to the sensor module 415 and the pixel array 410a of FIG. 4. As such, each image represents a time instance along the timeline 520 at which the sensor module 415 retrieves an image from the pixel array 410a.

In the example frame rate 505, the VBI of the sensor module 415 for the pixel array 410a is set to three time units (e.g., by the controller module 475). That is, the sensor module 415 retrieves an image from the pixel array 410a every third time instance along the timeline 520. As shown in the example frame rate 505, the sensor module 415 retrieves an image at the time instances 525, 540, and 555. Thus, the example frame rate 505 has a frame rate of one image per three time units.

The example frame rate 510 is similar to the example frame rate 505 except the VBI is set to two time units. Thus, the sensor module 415 retrieves an image from the pixel array 410*a* every second time instance along the timeline 520. The example frame rate 510 shows the sensor module 415 retrieving an image from the pixel array 410*a* at the time instances 525, 535, 545, and 555. Since the VBI of the example frame rate 510 is less than the VBI of the example frame rate 505, the frame rate of the example frame rate 510 is higher than the frame rate of the example frame rate 505.

The example frame rate 515 is also similar to the example frame rate 505 except the VBI of the sensor module 415 for the pixel array 410*a* is set to one time unit. Therefore, the sensor module 415 is instructed to retrieve an image from the pixel array 410*a* every time instance along the timeline 520. As illustrated, the sensor module 415 retrieves an image from the pixel array 410*a* at the time instances 525-555. The VBI of the example frame rate 515 is less than the VBIs of the example frame rates 505 and 510. Therefore, the frame rate of the example frame rate 515 is higher than the example frame rates 505 and 510.

2. Use of VBI for Two Cameras

Some embodiments may wish to operate both cameras of the dual camera mobile device at the same time (e.g., transmit videos from both cameras during a video conference). Different embodiments of the dual camera mobile device that include a single processing pipeline provide different mechanisms for simultaneously operating both cameras of the dual camera mobile device.

One such mechanism is interleaving the processing of images captured by both cameras by controlling each camera's VBI. That is, one or more images captured by one camera are captured and processed during the VBI of the other camera and vice versa. Since the CIPU 400 described above has a single processing pipeline 485, this mechanism can be implemented in the CIPU 400 of some embodiments. In such embodiments, the sensor module 415 retrieves an image from one of the pixel arrays 410*a* and 410*b* and the retrieved image is processed by the CIPU 400 during the sensor module 415's VBI for the other pixel array.

The sensor module 415's VBI for each pixel array can be set to a particular value. However, in some embodiments, the VBI is not set to a value that is less than the time it takes for the CIPU 400 to retrieve and process one image. Some embodiments set the sensor module 415's VBI for each pixel array to the same value. For example, when the sensor module 415's VBI for each pixel array is set to the same value, the sensor module 415 alternately retrieves images from the pixel arrays 410*a* and 410*b*. Other embodiments set the sensor module 415's VBI for each pixel array to different values. In some of such embodiments, the sensor module 415's VBI for one pixel array is set to a multiple of the sensor module 415's VBI for the other pixel array. For instance, the sensor module 415's VBI for one pixel array is set to 2 units of time, and the sensor module 415's VBI for the other pixel array is set to 4 units of time. In this example, the sensor module 415 retrieves two images from the one pixel array for every one image the sensor module 415 retrieves from the other pixel array.

Figure 6:
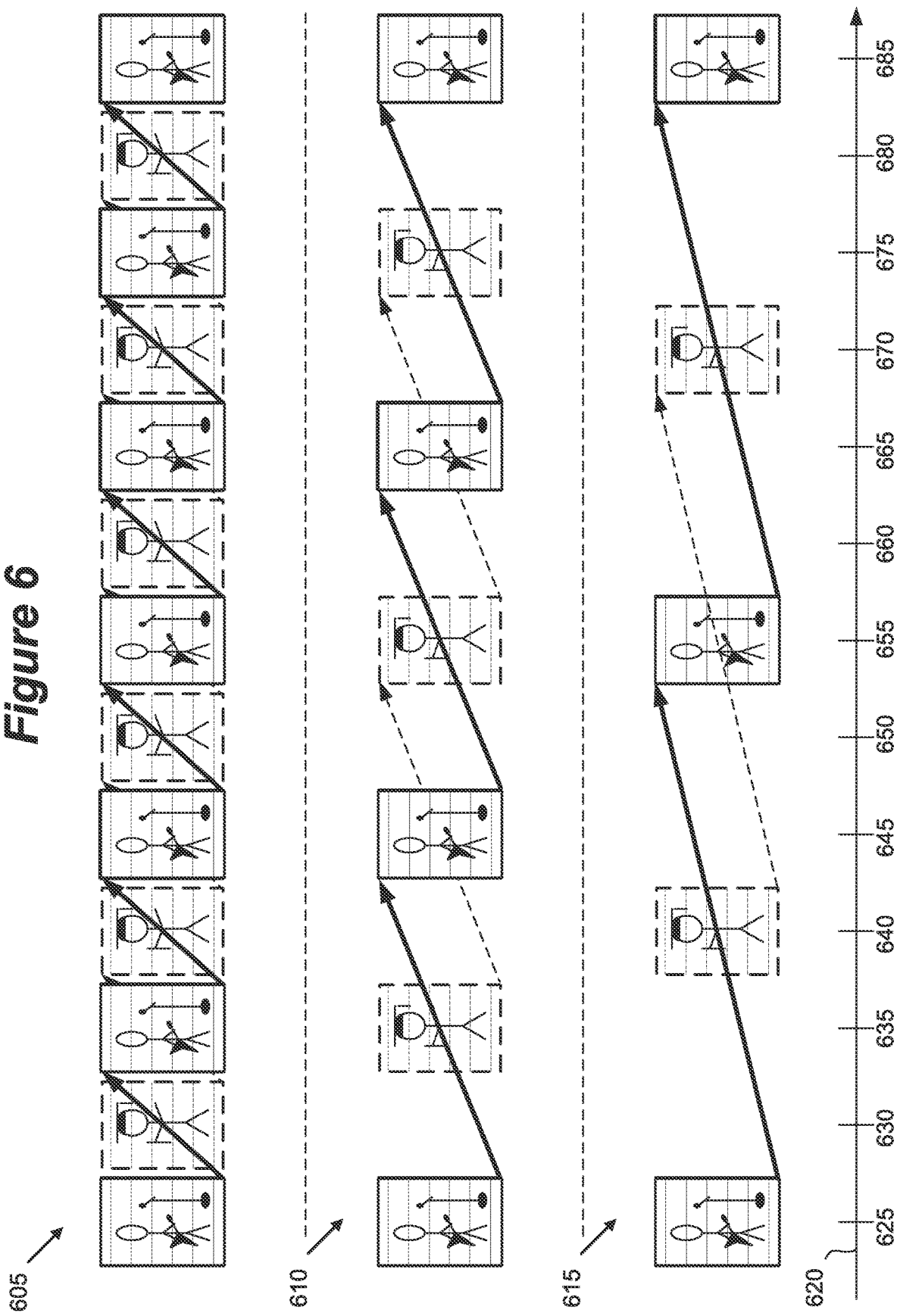
FIG. 6 conceptually illustrates examples of different interleaving frame rates based on different VBIs.

FIG. 6 conceptually illustrates examples of different interleaving frame rates 605, 610, and 615 based on different VBIs. FIG. 6 is similar to FIG. 5 except FIG. 6 includes thirteen time instances 625-685 along timeline 620. In addition, the image of a person holding the guitar represents a time instance along the timeline 620 at which the image is retrieved from one pixel array while the image of the person wearing an academic cap (i.e., a mortarboard) represents a time instance along the timeline 620 at which the image is retrieved from the other pixel array.

For purposes of explanation, the image of the person holding the guitar is assumed to have been captured by the camera sensor 405*a* of the dual camera mobile device, and the image of the person wearing the academic cap is assumed to have been captured by the camera sensor 405*b* of the dual camera mobile device. Moreover, FIG. 6 will now be described by reference to the sensor module 415 and the pixel arrays 410*a* and 410*b* of FIG. 4.

In the example interleaving frame rate 605, the sensor module 415's VBI for both the pixel array 410*a* and the pixel array 410*b* is set to two time units. As illustrated in the example interleaving frame rate 605, the sensor module 415 retrieves an image from the pixel array 410*a* at the time instances 625, 635, 645, 655, 665, 675, and 685 along the timeline 620, and the sensor module 415 retrieves an image from the pixel array 410*b* at the time instances 630, 640, 650, 660, 670, and 680 along the timeline 620. That is, the sensor module 415 alternately retrieves an image from a pixel array every time unit.

The example interleaving frame rate 610 is similar to the example interleaving frame rate 605 except the sensor module 415's VBI for both the pixel array 410*a* and the pixel array 410*b* is set to four time units. The example interleaving frame rate 610 shows the sensor module 415 retrieving an image from the pixel array 410*a* at the time instances 625, 645, 665, and 685 along the timeline 620, and the sensor module 415 retrieves an image from the pixel array 410*b* at the time instances 635, 655, and 675 along the timeline 620. Because the VBI of the example interleaving frame rate 610 is greater than the VBI of the example interleaving frame rate 605, the frame rate of the example interleaving frame rate 610 is lower than the frame rate of the example interleaving frame rate 605.

The example interleaving frame rate 615 is also similar to the example interleaving frame rate 605 except the sensor module 415's VBI for both the pixel array 410*a* and the pixel array 410*b* is set to six time units. As shown in FIG. 6, the sensor module 415 retrieves an image from the pixel array 410*a* at the time instances 625, 655, and 685 along the timeline 620, and the sensor module 415 retrieves an image from the pixel array 410*b* at the time instances 640 and 670 along the timeline 620. The VBI of the example interleaving frame rate 615 is greater than the VBIs of the example interleaving frame rates 605 and 610. Thus, the frame rate of the example interleaving frame rate 615 is lower than the example interleaving frame rates 605 and 610.

B. Multiple Pipelines

Figure 7:
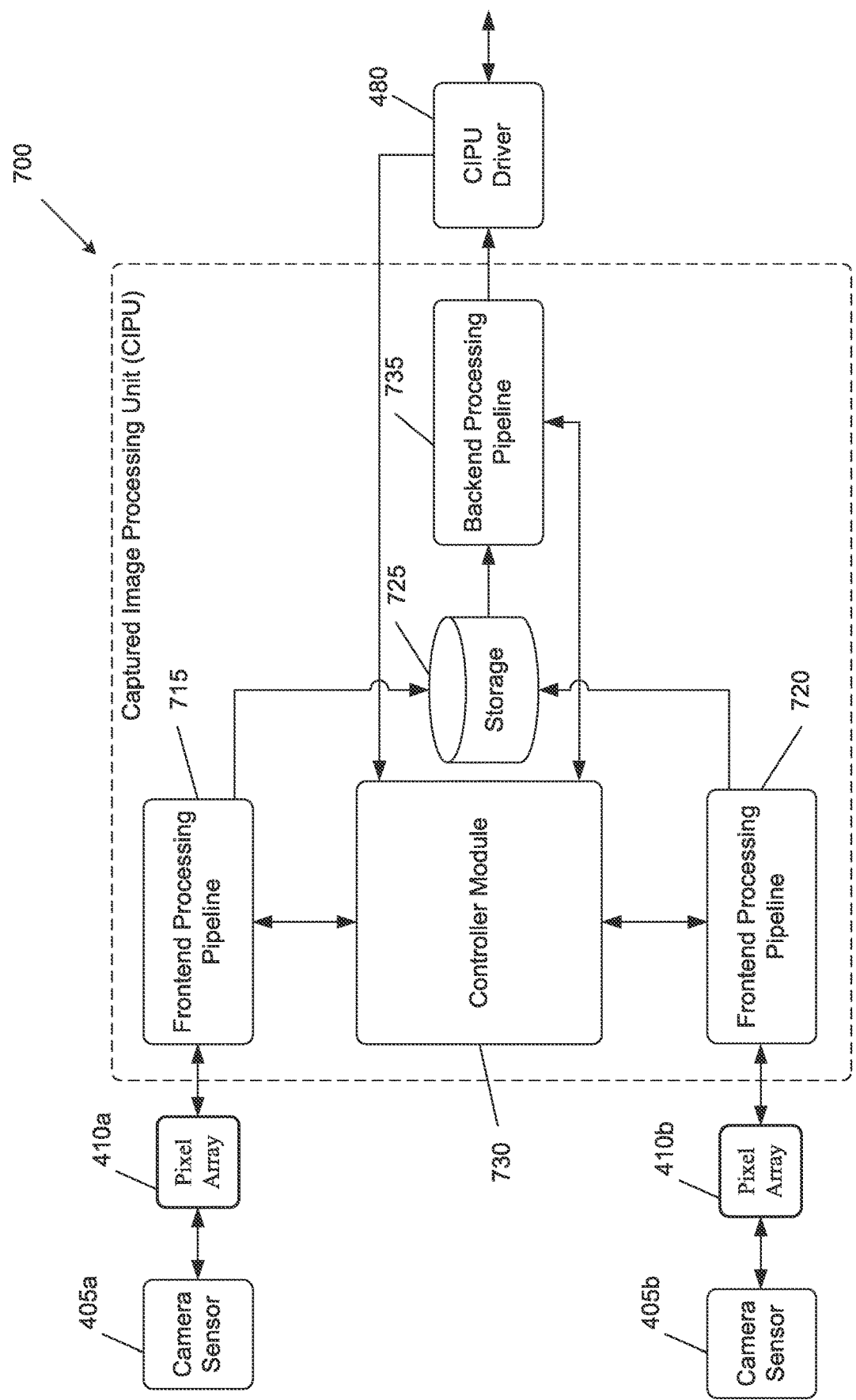
FIG. 7 conceptually illustrates another captured image processing unit of some embodiments.

FIG. 7 conceptually illustrates another captured image processing unit (CIPU) 700 of some embodiments. The CIPU 700 performs the same functions as the CIPU 400 described above except the CIPU 700 is implemented by two frontend processing pipelines, a storage, and a backend processing pipeline instead of a single processing pipeline. As such, the description of the functions of the CIPU 700 will be described by reference to the modules of the CIPU 400.

As shown, the CIPU 700 includes a frontend processing pipeline 715 for the camera sensor 405*a* and the pixel array 410*a*, a frontend processing pipeline 720 for the camera sensor 405*b* and the pixel array 410*b*, a storage 725, a controller module 730, and a backend processing pipeline 735. The camera sensors 405*a* and 405*b* of some embodiments are sensors of the cameras of the dual camera mobile device.

The frontend processing pipelines 715 and 720 of some embodiments perform a portion of the CIPU 400's image processing. As such, different embodiments can include a different number of modules of the CIPU 400. For example, each of the frontend processing pipelines 715 and 720 of some embodiments includes the sensor module 415, the BPC module 420, the LS module 425, the demosaicing module 430, the WB module 435, and the statistics engine 465 of the CIPU 400.

Although the frontend processing pipelines 715 and 720 perform the same type of image processing by virtue of having the same modules, each module of each of the frontend processing pipelines 715 and 720 can be configured differently through different register values as described above for the CIPU 400. Moreover, since each of the camera sensors 405*a* and 405*b* has its own frontend processing pipeline, the frontend processing pipelines 715 and 720 can process images independently of each other. For instance, the frontend processing pipelines 715 and 720 can process images in parallel (i.e., at the same time), at different times, and at different rates.

In some embodiments, each of the front end processing pipelines 715 and 720 can retrieve images from its corresponding camera sensor and pixel array. For instance, the frontend processing pipeline 715 retrieves images captured by the camera sensor 405*a* from the pixel array 410*a* and the frontend processing pipeline 720 receives images captured by the camera sensor 405*b* from the pixel array 410*b*. When one of the frontend processing pipelines 715 and 720 retrieves an image from its corresponding camera sensor and pixel array, that frontend processing pipeline processes the image and sends the processed image to the storage 725. Also, each of the frontend processing pipelines 715 and 720 communicates with the controller module 730 as described above (e.g., through the statistics engine of each frontend processing pipeline).

The storage 725 of some embodiments stores partially processed images for the backend processing pipeline 735 to finish processing. In these embodiments, the storage 725 receives partially processed images from the frontend processing pipelines 715 and 720 and sends the partially processed images to the backend processing pipeline 735. Some embodiments implement the storage 725 as volatile storage (e.g., random access memory (RAM)) while other embodiments implement the storage 725 as non-volatile storage (e.g. flash memory, hard disk, optical disk, etc.). Furthermore, the storage 725 of some embodiments is internal storage (e.g., RAM) while the storage 725 of other embodiments is external storage (e.g., a compact flash (CF) card, a secure digital (SD) card, etc.).

Some embodiments of the backend processing pipeline 735 perform a portion of the CIPU 700's image processing. In some embodiments, the backend processing pipeline 735 includes the modules of the CIPU 400 that the frontend processing pipelines 715 and 720 do not include. For instance, referring to the above example, the backend processing pipeline 735 would include the CSC module 445, the gamma module 440, the HSC module 450, the scaler module 455, and the filter module 460 of the CIPU 400. As such, the backend processing pipeline 735 of such embodiments performs the remaining image processing of the CIPU 400 that the frontend processing pipelines 715 and 720 do not perform. Accordingly, the backend processing pipeline 735 retrieves partially processed images from the storage 725 and performs the remaining image processing on the partially processed images. After processing the images, the backend processing pipeline 735 sends the processed images to the CIPU driver 480.

The controller module 730 performs the same functions described above by reference to FIG. 4. As shown in FIG. 7, the controller module 730 interacts with the frontend processing pipelines 715 and 720 and the backend processing pipeline 735. In some embodiments, the controller module 730 is included in the backend processing pipeline 735 while in other embodiments the controller module 730 is included in one of the frontend processing pipelines 715 and 720.

The operation of the CIPU 700 will now be described by reference to the camera sensors 405*a* and 405*b*, the pixel arrays 410*a* and 410*b*, the frontend processing pipelines 715 and 720, the storage 725, and the backend processing pipeline 735 that are illustrated in FIG. 7. When one of the frontend processing pipelines 715 and 720 retrieves an image from its corresponding camera sensor and pixel array, the frontend processing pipeline processes the image and sends the partially processed image to the storage 725. For instance, the frontend processing pipeline 715 may retrieve an image captured by the camera sensor 405*a* from the pixel array 410*a* or the frontend processing pipeline 720 may retrieve an image captured by the camera sensor 405*b* from the pixel array 410*b*. As noted above, each frontend processing pipeline 715 and 720 can process images in parallel.

The backend processing pipeline 735 retrieves the partially processed image from the storage 725 and processes the partially processed image to complete the image processing of the image. In some embodiments, the backend processing pipeline 735 retrieves and processes images stored in the storage 725 on a first in, first out basis. In other words, a particular image in the storage 725 is processed after all images that were received and stored in the storage 725 before the particular image, but the particular image is processed before images that were received and stored in the storage 725 after the particular image. After the backend processing pipeline 735 processes the image, it sends the processed image to the CIPU driver 480.

Figure 8:
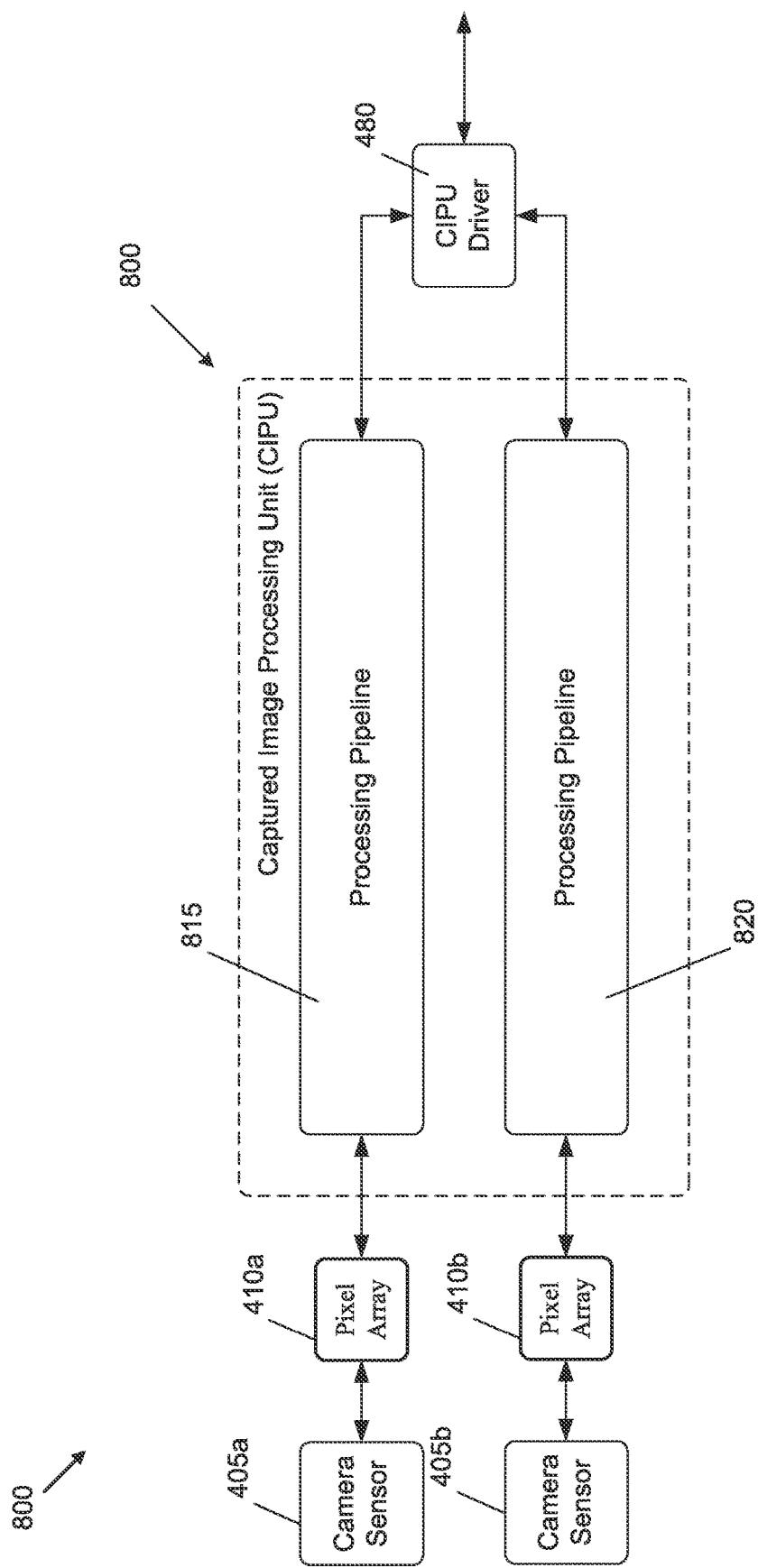
FIG. 8 conceptually illustrates another captured image processing unit of some embodiments.

FIG. 8 conceptually illustrates another captured image processing unit (CIPU) 800 of some embodiments. The CIPU 800 performs the same functions as the CIPU 400 described above except the CIPU 800 is implemented by two separate processing pipelines with each camera sensor having its own separate processing pipeline. As such, the description of the functions of the CIPU 800 will be described by reference to the modules of the CIPU 400.

As shown, the CIPU 800 includes a processing pipeline 815 for the camera sensor 405*a* and the pixel array 410*a* and a processing pipeline 820 for the camera sensor 405*b* and the pixel array 410*b*. Each of the processing pipelines 815 and 820 of some embodiments includes all the modules included in the CIPU 400. Therefore, the operation of each of the processing pipelines 815 and 820 of these embodiments is the same as the operation of the CIPU 400.

Since each of the camera sensors 405*a* and 405*b* has its own processing pipeline, the processing pipelines 815 and 820 can process images independently of each other. For example, the processing pipelines 815 and 820 can process images in parallel (i.e., at the same time), at different times, and at different rates. In addition, each of the processing pipelines 815 and 820 of some embodiments can be configured differently through different register values as described above by reference to the CIPU 400.

In some embodiments, a number of modules of the CIPU 400 include one or more line/frame buffers for performing some or all of the module's operations. For example, a filtering module 460 of some embodiments is implemented to perform a 3×3 low-pass filtering. In such embodiments, the 3×3 low-pass filter processes three consecutive lines in the image in order to apply the 3×3 low-pass filter on the middle line of the three consecutive lines. Thus, the filtering module 460 of such embodiments requires at least three line/frame buffers in order perform the 3×3 low-pass filtering. Other modules in the CIPU 400 also include one or more line/frame buffers like the BPC module 420 and the LS module 425, for example.

The processing pipelines of the CIPU 800 can each have different line/frame buffer sizes in order to customize the image processing to characteristics of its corresponding camera. For instance, if one camera of the dual camera mobile device has a 2048×1500 pixel sensor, the processing pipeline of the 2048×1500 pixel sensor can include line/frame buffers that are 2048 pixels wide. Similarly, if the other camera of the dual camera mobile device has a 640×480 pixel sensor, the processing pipeline of the 640×480 pixel sensor can include line/frame buffers that are 640 pixels wide. That is, the size of the line/frame buffers included in the modules of one processing pipeline can be different from the size of the line/frame buffers included in the modules of another processing pipeline.

III. Video Conferencing

A. Video Conference Architecture

Figure 9:
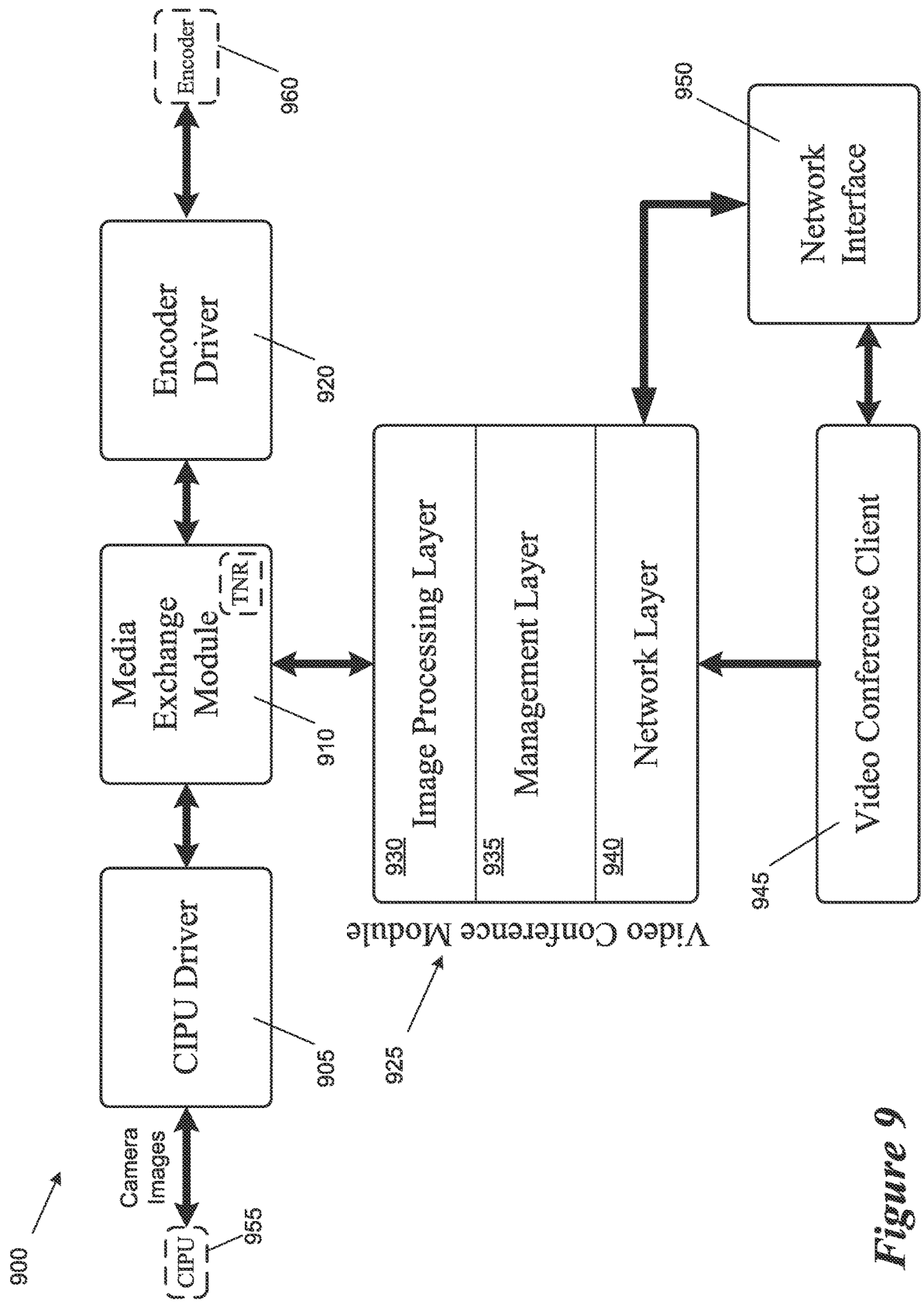
FIG. 9 conceptually illustrates a software architecture for a video conferencing and processing module of a dual camera mobile device of some embodiments.

FIG. 9 conceptually illustrates a software architecture for a video conferencing and processing module 900 of a dual camera mobile device of some embodiments. The video conferencing and processing module 900 includes a CIPU driver 905, a media exchange module 910, and an encoder driver 920 that are similar to the corresponding modules and drivers 305, 310, and 320 described above by reference to FIG. 3. The video conferencing and processing module 900 also includes a video conference module 925, a video conference client 945, and a network interface 950 for performing a variety of video conferencing functions. Like the video processing and encoding module 300, the video conferencing and processing module 900 processes and encodes images that are captured from cameras of the dual camera mobile device.

As described above by reference to FIG. 3, the media exchange module 910 allows consumers and producers of media content in the device to exchange media content and instructions regarding the processing of the media content, the CIPU driver 905 serves as a communication interface with the captured image processing unit (CIPU) 955, and the encoder driver 920 serves as a communication interface with the encoder hardware 960 (e.g., an encoder chip, an encoding component on a system on chip, etc.).

The video conference module 925 of some embodiments handles various video conferencing functions such as image processing, video conference management, and networking. As shown, the video conference module 925 interacts with the media exchange module 910, the video conference client 945, and the network interface 950. In some embodiments, the video conference module 925 receives instructions from and sends instructions to the video conference client 945. The video conference module 925 of some embodiments also sends data to and receives data from networks (e.g., a local area network (LAN), a wireless local area network (WLAN), a wide area network (WAN), a network of networks, a code division multiple access (CDMA) network, a GSM network, etc.) through the network interface 950.

The video conference module 925 includes an image processing layer 930, a management layer 935, and a network layer 940. In some embodiments, the image processing layer 930 performs image processing operations on images for video conferencing. For example, the image processing layer 930 of some embodiments performs exposure adjustment, image resizing, perspective correction, and dynamic range adjustment as described in further detail below. The image processing layer 930 of some embodiments sends requests through the media exchange module 910 for images from the CIPU 955.

The management layer 935 of some embodiments controls the operation of the video conference module 925. For instance, in some embodiments, the management layer 935 initializes a camera/cameras of the dual camera mobile device, processes images and audio to transmit to a remote device, and processes images and audio received from the remote device. In some embodiments, the management layer 935 generates composite (e.g., PIP) displays for the device. Moreover, the management layer 935 may change the operation of the video conference module 925 based on networking reports received from the network layer 940.

In some embodiments, the network layer 940 performs some or all of the networking functionalities for video conferencing. For instance, the network layer 940 of some embodiments establishes a network connection (not shown) between the dual camera mobile device and a remote device of a video conference, transmits images to the remote device, and receives images from the remote device, among other functionalities, as described below. In addition, the network layer 940 receives networking data such as packet loss, one-way latency, and roundtrip delay time, among other types of data, processes such data, and reports the data to the management layer 935.

The video conference client 945 of some embodiments is an application that may use the video conferencing functions of the video conference module 925 such as a video conferencing application, a voice-over-IP (VOIP) application (e.g., Skype), or an instant messaging application. In some embodiments, the video conference client 945 is a stand-alone application while in other embodiments the video conference client 945 is integrated into another application.

In some embodiments, the network interface 950 is a communication interface that allows the video conference module 925 and the video conference client 945 to send data and receive data over a network (e.g., a cellular network, a local area network, a wireless network, a network of networks, the Internet, etc.) through the network interface 950. For instance, if the video conference module 925 wants to send data (e.g., images captured by cameras of the dual camera mobile device) to another device on the Internet, the video conference module 925 sends the images to the other device through the network interface 950.

B. Video Conference Set Up

Figure 10:
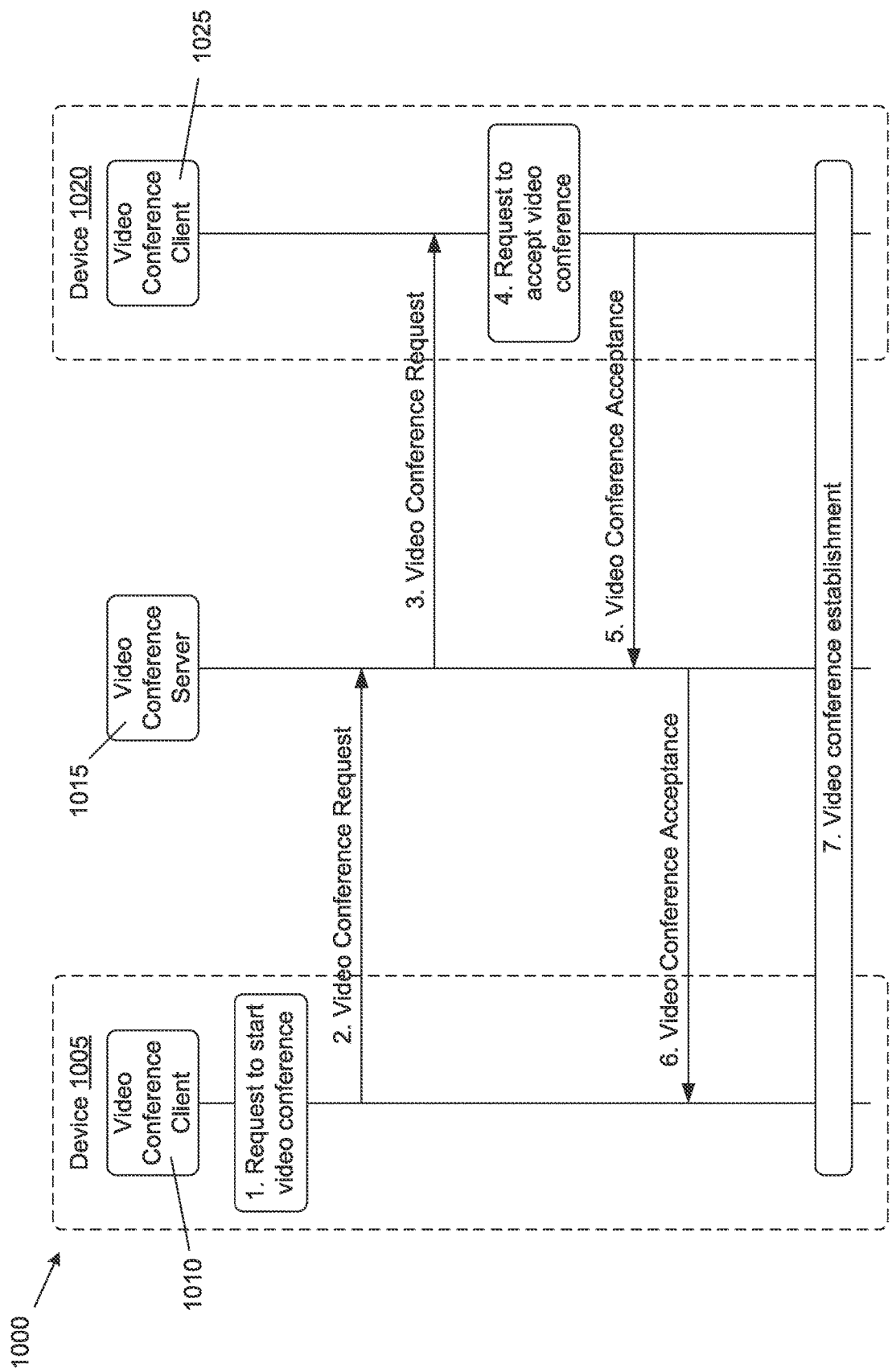
FIG. 10 conceptually illustrates an example video conference request messaging sequence of some embodiments.

FIG. 10 conceptually illustrates an example video conference request messaging sequence 1000 of some embodiments. This figure shows the video conference request messaging sequence 1000 among a video conference client 1010 running on a device 1005, a video conference server 1015, and a video conference client 1025 running on a device 1020. In some embodiments, the video conference clients 1010 and 1025 are the same as the video conference client 945 shown in FIG. 9. As shown in FIG. 10, one device (i.e., the device 1005) requests a video conference and another device (i.e., the device 1020) responds to such request. The dual camera mobile device described in the present application can perform both operations (i.e., make a request and respond to a request).

The video conference server 1015 of some embodiments routes messages among video conference clients. While some embodiments implement the video conference server 1015 on one computing device, other embodiments implement the video conference server 1015 on multiple computing devices. In some embodiments, the video conference server is a publicly accessible server that can handle and route messages for numerous conferences at once. Each of the video conference clients 1010 and 1025 of some embodiments communicates with the video conference server 1015 over a network (e.g., a cellular network, a local area network, a wireless network, a network of networks, the Internet etc.) through a network interface such as the network interface 950 described above.

Figure 11:
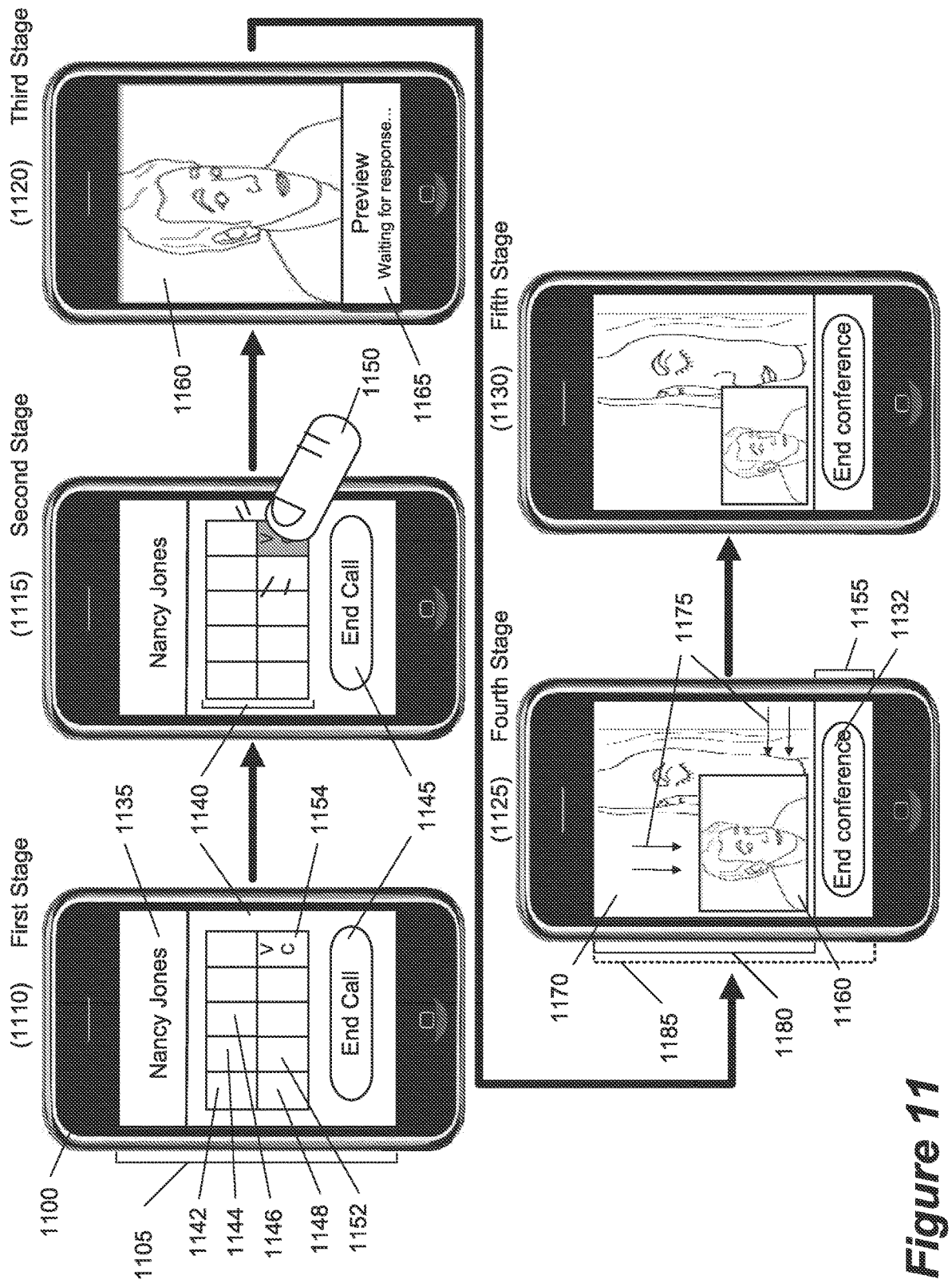
FIG. 11 illustrates a user interface of some embodiments for a video conference setup operation.
Figure 14:
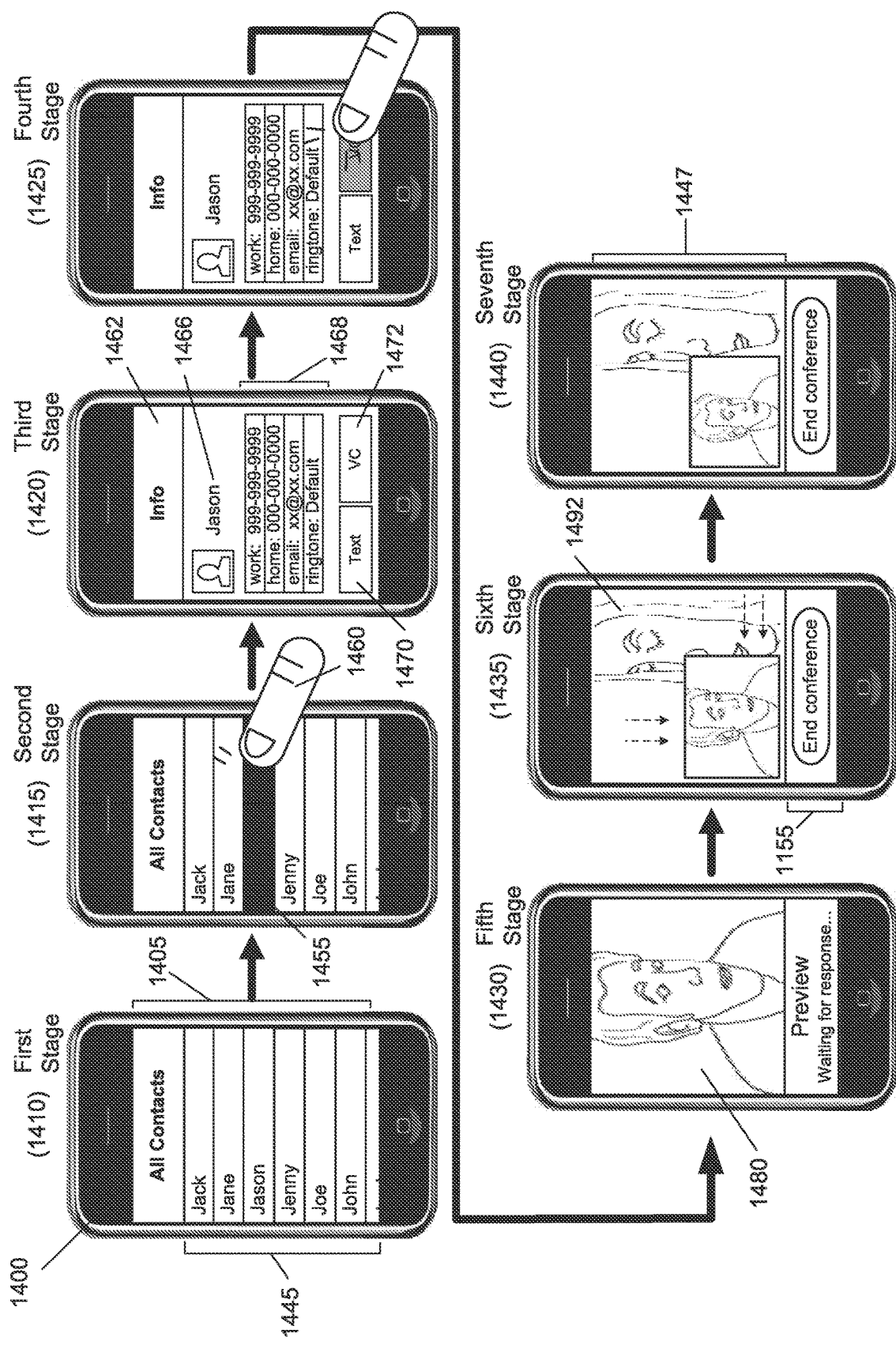
FIG. 14 illustrates another user interface of some embodiments for a video conference setup operation.

The video conference request messaging sequence 1000 of some embodiments starts when the video conference client 1010 receives (at operation 1) a request from a user of the device 1005 to start a video conference with the device 1020. The video conference client 1010 of some embodiments receives the request to start the video conference when the user of the device 1005 selects a user interface (UI) item of a user interface displayed on the device 1005. Examples of such user interfaces are illustrated in FIG. 11 and FIG. 14, which are described below.

After the video conference client 1010 receives the request, the video conference client 1010 sends (at operation 2) a video conference request, which indicates the device 1020 as the recipient based on input from the user, to the video conference server 1015. The video conference server 1015 forwards (at operation 3) the video conference request to the video conference client 1025 of the device 1020. In some embodiments, the video conference server 1015 forwards the video conference request to the video conference client 1025 using push technology. That is, the video conference server 1015 initiates the transmission of the video conference request to the video conference client 1025 upon receipt from the video conference client 1010, rather than waiting for the client 1025 to send a request for any messages.

Figure 12:
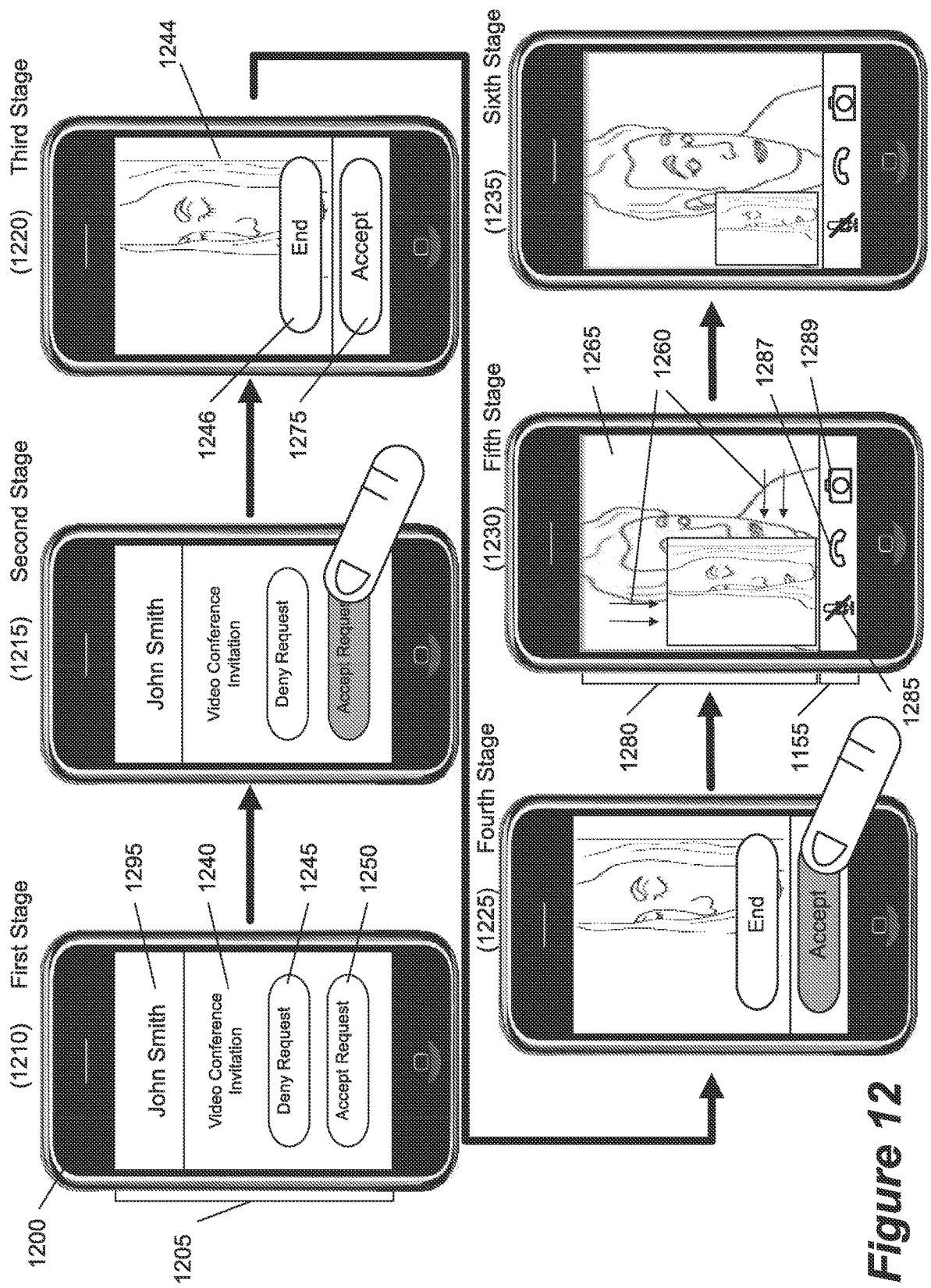
FIG. 12 illustrates a user interface of some embodiments for accepting an invitation to a video conference.

When the video conference client 1025 of some embodiments receives the video conference request, a user interface is displayed on the device 1020 to indicate to the user of the device 1020 that the user of the device 1005 sent a request to start a video conference and to prompt the user of the device 1020 to accept or reject the video conference request. An example of such a user interface is illustrated in FIG. 12, which is described below. In some embodiments, when the video conference client 1025 receives (at operation 4) a request to accept the video conference request from the user of the device 1005, the video conference client 1025 sends (at operation 5) a video conference acceptance to the video conference server 1015. The video conference client 1025 of some embodiments receives the request to accept the video conference request when the user of the device 1020 selects a user interface item of a user interface as illustrated in FIG. 12, for example.

After the video conference server 1015 receives the video conference acceptance from the video conference client 1025, the video conference server 1015 forwards (at operation 6) the video conference acceptance to the video conference client 1010. Some embodiments of the video conference server 1015 forward the video conference acceptance to the video conference client 1010 using the push technology described above.

Upon receiving the video conference acceptance, some embodiments establish (at operation 7) a video conference between the device 1005 and the device 1020. Different embodiments establish the video conference differently. For example, the video conference establishment of some embodiments includes negotiating a connection between the device 1005 and the device 1020, determining a bit rate at which to encode video, and exchanging video between the device 1005 and the device 1020.

In the above example, the user of the device 1020 accepts the video conference request. In some embodiments, the device 1020 can be configured (e.g., through the preference settings of the device) to automatically accept incoming video conference requests without displaying a UI. Moreover, the user of the device 1020 can also reject (at operation 4) the video conference request (e.g., by selecting a user interface item of a user interface displayed on the device 1020). Instead of sending a video conference acceptance, the video conference client 1025 sends a video conference rejection to the video conference server 1015, which forwards the video conference rejection to the video conference client 1010. The video conference is then never established.

1. Video Conference Setup User Interface

In some embodiments, a video conference is initiated based on an ongoing phone call. That is, while the user of a mobile device is engaged in a phone call with a second user, the user can turn the phone call into a video conference with the permission of the other party. For some embodiments of the invention, FIG. 11 illustrates the start of such a video conference by a dual camera handheld mobile device 1100. This figure illustrates the start of the video conference in terms of five operational stages 1110, 1115, 1120, 1125, and 1130 of a user interface ("UI") 1105 of the device 1100.

As shown in FIG. 11, the UI 1105 includes a name field 1135, a selection menu 1140, and a selectable UI item 1145. The name field 1135 displays the name of the person on the other end of the phone call, with whom a user would like to request a video conference. In this example, the selectable UI item 1145 (which can be implemented as a selectable button) provides a selectable End Call option for the user to end the phone call. The selection menu 1140 displays a menu of selectable UI items, such as a Speakerphone item 1142, a Mute item 1144, a Keypad item 1146, a Phonebook item 1148, a Hold item 1152, a Video Conference item 1154, etc. Different embodiments display the selection menu differently. For the embodiments illustrated by FIG. 11, the selection menu 1140 includes several equally sized icons, each of which represents a different operation. Other embodiments provide a scrollable menu, or give priority to particular items (e.g., by making the items larger).

The operation of the UI 1105 will now be described by reference to the state of this UI during the five stages, 1110, 1115, 1120, 1125, and 1130 that are illustrated in FIG. 11. In the first stage 1110, a phone call has been established between the handheld mobile device user and Nancy Jones. The second stage 1115 displays the UI 1105 after the user selects the selectable Video Conference option 1154 (e.g., through a single finger tap by finger 1150) to activate a video conference tool. In this example, the Video Conference option 1154 (which can be implemented as a selectable icon) allows the user to start a video conference during the phone call. In the second stage, the Video Conference option 1154 is highlighted to indicate that the video conference tool has been activated. Different embodiments may indicate such a selection in different ways (e.g., by highlighting the border or the text of the item).

The third stage 1120 displays the UI 1105 after the device 1100 has started the video conference process with the selection of the Video Conference option 1154. The third stage is a transitional hold stage while the device waits for the video conference to be established (e.g., while the device waits for the device on the other end of the call to accept or reject the video conference). In the third stage 1120, the user of the device 1100 can still talk to the user of the other device (i.e., Nancy Jones) while the video conference connection is being established. In addition, some embodiments allow the user of the device 1100 to cancel the video conference request in the third stage 1120 by selecting a selectable UI item displayed on the UI 1105 (not shown) for canceling the video conference request. During this hold stage, different embodiments use different displays in the UI 1105 to indicate the wait state.

As shown in FIG. 11, in some embodiments the wait state of the third stage is illustrated in terms of a full screen display of a video being captured by the device 1100 along with a "Preview" notation at the bottom of this video. Specifically, in FIG. 11, the third stage 1120 illustrates the start of the video conference process by displaying in a display area 1160 of the UI 1105 a full screen presentation of the video being captured by the device's camera. In some embodiments, the front camera is the default camera selected by the device at the start of a video conference. Often, this front camera points to the user of the device at the start of the video conference. Accordingly, in the example illustrated in FIG. 11, the third stage 1120 illustrates the device 1100 as presenting a full screen video of the user of the device 1100. The wait state of the device is further highlighted by the "Preview" designation 1165 below the video appearing in the display area 1160 during the third stage 1120.

The transitional third hold stage 1120 can be represented differently in some embodiments. For instance, some embodiments allow the user of the device 1100 to select the back camera as the camera for starting the video conference. To allow for this selection, some embodiments allow the user to specify (e.g., through a menu preference setting) the back camera as the default camera for the start of a video conference, and/or allow the user to select the back camera from a menu that displays the back and front cameras after the user selects the Video Conference option 1154. In either of these situations, the UI 1105 (e.g., display area 1160) displays a video captured by the back camera during the third hold stage 1120.

Also, other embodiments might indicate the activation of the video conference tool by displaying the smaller version of the video captured by the device 1100, by displaying a still image that is stored on the device 1100, by providing a message to highlight the wait state of the device (e.g., by showing "Conference Being Established"), by not displaying the "Preview" designation, etc. Also, in the third stage 1120, the UI 1105 of some embodiments provides an End button (not shown) to allow the user to cancel entering the video conference and revert back to the phone call if he decides not to enter the video conference at this stage (e.g., while the user is waiting for the remote user to respond to his request).

The fourth stage 1125 illustrates the UI 1105 in a transitional state after the remote user has accepted the video conference request and a video conference connection has been established. In this transitional state, the display area 1160 that displays the video of the local user (that is being captured by the front camera in this example) gradually decreases in size (i.e., gradually shrinks), as indicated by the arrows 1175. The display area 1160 (i.e., the local user's video) shrinks so that the UI 1105 can display a display area 1170 (e.g., a display window 1170) that contains the video from a camera of the remote device behind the display area 1160. In other words, the shrinking of the local user's video 1160 creates a PIP display 1180 that has a foreground inset display 1160 of the local user's video and a background main display 1170 of the remote user. In this example, the background main display 1170 presents a video of a lady whose video is being captured by the remote device's front camera (e.g., Nancy Jones, the user of the remote device) or a lady whose video is being captured by the remote device's back camera (e.g., a lady whose video is being captured by Nancy Jones). One of ordinary skill will realize that the transitional fourth stage shown in FIG. 11 is simply one exemplary approach used by some embodiments, and that other embodiments might animate the transitional fourth stage differently.

The fourth stage 1125 also illustrates a selectable UI item 1132 in a lower display area 1155. The selectable UI item 1132 (which can be implemented as a selectable button) provides a selectable End Conference option 1132 below the PIP display 1180. The user may select this End Conference option 1132 to end the video conference (e.g., through a single finger tap). Different embodiments may allow the user to end the conference in different ways, such as by toggling a switch on the mobile device, by giving voice commands, etc. Moreover, different embodiments may allow the End Conference option 1132 to fade away during the video conference, thereby allowing the PIP display 1180) to take up the entire display area 1185. The End Conference option 1132 may then reappear at a single finger tap at the bottom of the display area 1185, giving the user access to the End Conference option 1132. In some embodiments, the layout of the display area 1155 is same as the display area 1155 described in further detail below.

The fifth stage 1130 illustrates the UI 1105 after the animation of the fourth transitional state 1125 has ended. Specifically, the fifth stage 1130 illustrates a PIP display 1180 that is presented by the UI 1105 during the video conference. As mentioned above, this PIP display 1180 includes two video displays: a larger background display 1170 from the remote camera and a smaller foreground inset display 1160 from the local camera.

This PIP display 1180 is only one manner of presenting a composite view of the videos being captured by the remote and local devices. In addition to this composite view, the devices of some embodiments provide other composite views. For example, instead of having a larger background display 1170 of the remote user, the larger background display 1170 can be of the local user and the smaller foreground inset display 1160 of the remote user. As further described below, some embodiments allow a user to switch during a video conference between the local cameras and/or remote cameras as the cameras for the inset and main views in the PIP display 1180.

Also, some embodiments allow the local and remote videos to appear in the UI 1105 in two side-by-side display areas (e.g., left and right display windows, or top and bottom display windows) or two diagonally aligned display areas. The manner of the PIP display or a default display mode may be specified by the user in some embodiments through the preference settings of the device or through controls that the user can select during a video conference, as further described below.

When the user of the device 1100 of FIG. 11 invites the remote user to a video conference, the remote user may accept or reject the invitation. FIG. 12 illustrates a UI 1205 of the remote user's device 1200 at six different stages 1210, 1215, 1220, 1225, 1230, and 1235 that show the sequence of operations for presenting and accepting a video conference invitation at the remote user's device. The description of the UI 1205 below refers to the user of the device 1200 (i.e., the device that receives the video conference request) as the invite recipient, and the user of the device 1100 (i.e., the device that sends the video conference request) as the invite requestor. Also, in this example, it is assumed that the invite recipient's device 1200 is a dual camera device, like that of the invite requestor. However, in other examples, one or both of these devices are single camera devices.

The first stage 1210 illustrates the UI 1205 when the invite recipient receives an invitation to a video conference from the invite requestor, John Smith. As shown in FIG. 12, the UI 1205 in this stage includes a name field 1235, a message field 1240, and two selectable UI items 1245 and 1250. The name field 1235 displays the name of a person who is requesting a video conference. In some embodiments, the name field 1235 displays a phone number of the person who is requesting a video conference instead of the name of the person. The message field 1240 displays an invite from the invite requestor to the invite recipient. In this example, the "Video Conference Invitation" in the field 1240 indicates that the invite requestor is requesting a video conference with the invite recipient. The selectable UI items 1245 and 1250 (which can be implemented as selectable buttons) provide selectable Deny Request and Accept Request options 1245 and 1250 for the invite recipient to use to reject or accept the invitation. Different embodiments may display these options differently and/or display other options.

Upon seeing the "Video Conference Invitation" notation displayed in the message field 1240, the invite recipient may deny or accept the request by selecting the Deny Request option 1245 or Accept Request option 1250 in the UI, respectively. The second stage 1215 illustrates that in the example shown in FIG. 12, the user selects the Accept Request option 1250. In this example, this selection is made by the user's finger tapping on the Accept Request option 1250, and this selection is indicated through the highlighting of this option 1250. Other techniques are provided in some embodiments to select the Accept or Deny Request options 1245 and 1250 (e.g., double-tapping, etc.) to indicate the selection (e.g., highlighting the border or text of the UI item).

The third stage 1220 displays the UI 1205 after the invite recipient has agreed to join the video conference. In this stage, the UI 1205 enters into a preview mode that shows a full screen presentation of the video from the remote device's front camera in a display area 1244. The front camera in this case is pointed to the user of the remote device (i.e., Nancy Jones in this example). Accordingly, her image is shown in this preview mode. This preview mode allows the invite recipient to make sure that her video is displayed properly and that she is happy with her appearance before the video conference begins (e.g., before actual transmission of the video begins). In some embodiments, a notation, such as a "Preview" notation, may be displayed below the display area 1244 to indicate that the invite recipient is in the preview mode.

Some embodiments allow the invite recipient to select the back camera as the default camera for the start of the video conference, or to select the front or back camera at the beginning of the video conference, as further described below. Also, other embodiments display the preview display of the invite recipient differently (e.g., in a smaller image placed in the corner of the display area 1244). Yet other embodiments do not include this preview mode, but rather start the video conference immediately after the invite recipient accepts the request.

In the third stage, the UI 1205 shows two selectable UI items 1275 and 1246, one of which overlaps the display area 1244 while the other is below this display area 1244. The selectable UI item 1275 is an Accept button 1275 that the user may select to start video conferencing. The selectable UI item 1246 is an End button 1246 that the invite recipient can select if she decides not to join the video conference at this stage.

The fourth stage 1225 displays the UI 1205 after the invite recipient selects the Accept button 1275. In this example, the Accept button 1275 is highlighted to indicate that the invite recipient is ready to start the video conference. Such a selection may be indicated in different ways in other embodiments.

The fifth stage 1230 illustrates the UI 1205 in a transitional state after the invite recipient has accepted the video conference request. In this transitional stage, the display area 1244 that displays the video of the invite recipient (that is being captured by the front camera in this example) gradually decreases in size (i.e., gradually shrinks), as indicated by the arrows 1260. The invite recipient's video shrinks so that the UI 1205 can display a display area 1265 (e.g., a display window 1265) that contains the video from a camera of the invite requestor behind the display area 1244. In other words, the shrinking of the invite recipient's video creates a PIP display 1280 that has a foreground inset display area 1244 of the invite recipient's video and a background main display 1265 of the invite requestor.

In this example, the background main display 1265 presents a video of a man whose video is being captured by the local device's front camera (i.e., John Smith, the user of the local device 1100). In another example, this video could have been that of a man whose video is being captured by the local device's back camera (e.g., a man whose video is being captured by John Smith). Different embodiments may animate this transitional fifth stage differently.

The UI at the fifth stage 1230 also displays a display area 1155 (e.g., a tool bar or a menu bar) that includes selectable UI item 1285 (e.g., mute button 1285) for muting the audio of the other user during the video conference, selectable UI item 1287 (e.g., end conference button 1287) for ending the video conference, and selectable UI item 1289 (e.g., switch camera button 1289) for switching cameras, which is described in further detail below. As such, the invite recipient may select any of the selectable UI items 1285-1289 (e.g., through a single finger tap) to perform the desired operation during the video conference. Different embodiments may allow the invite recipient to perform any of the operations in different ways, e.g., by toggling a switch on the mobile device, by giving voice commands, etc.

Although FIG. 12 shows an example layout for the display area 1155, some embodiments provide different layouts of the display area 1155 such as the layout of display area 1155 of FIG. 11, which includes just a selectable End Conference UI item 1132 for ending the video conference. Other layouts of display area 1155 can include any number of different selectable UI items for performing different functions. Moreover, the fifth stage 1230 shows the display area 1155 displayed at the bottom of the UI 1205. Different embodiments of the display area 1155 can be displayed at different locations within the UI 1205 and/or defined as different shapes.

FIG. 12 shows the display area 1155 as a static display area (i.e., the display area 1155 is always displayed). However, in some embodiments the display area 1155 is a dynamic display area. In some such embodiments, the display area 1155 is not ordinarily displayed. Rather, the display area 1155 is displayed when a triggering event is received (e.g., a user selection such tapping the display area 1280 once, a voice command, etc.). The display area 1155 disappears after a user selection is received (e.g., selecting the selectable mute UI item 1285) or a defined amount of time (e.g., 3 seconds), which can be specified by the user through the preference settings of the mobile device or the video conference application. In some such embodiments, the display area 1155 is automatically displayed after the video conference starts and disappears in the same manner mentioned above.

The sixth stage 1235 illustrates the UI 1205 after the animation of the fifth transitional stage has ended. Specifically, the sixth stage illustrates a PIP display 1280 that is presented by the UI 1205 during the video conference. As mentioned above, this PIP display 1280 includes two video displays: a larger background display 1265 from the local camera and a smaller foreground inset display 1244 from the remote camera. This PIP display 1280 is only one manner of presenting a composite view of the videos being captured by the remote and local devices. In addition to this composite view, the devices of some embodiments provide other composite views. For example, instead of having a larger background display of the invite recipient, the larger background display can be of the invite requestor and the smaller foreground inset display of the invite recipient. As further described below, some embodiments allow a user to control the inset and main views in a PIP display to switchably display the local and remote cameras. Also, some embodiments allow the local and remote videos to appear in the UI 1205 in two side-by-side display areas (e.g., left and right display windows, or top and bottom display windows) or two diagonally aligned display areas. The manner of PIP display or a default display mode may be specified by the user in some embodiments through the preference settings of the device or through controls that the user can select during a video conference, as further described below.

Although FIG. 12 shows the sequence of operations for presenting and accepting a video conference invitation in terms of six different operational stages, some embodiments may implement the operation in less stages. For instance, some of such embodiments may omit presenting the third and fourth stages 1220 and 1225 and go from the second stage 1215 to the fifth stage 1230 after the user selects the Accept Request option 1250. Other embodiments that implement that operation (i.e., presenting and accepting a video conference invitation) in less stages may omit the first and second stages 1210 and 1215 and present the user with the third stage 1220 when the invite recipient receives an invitation to a video conference from the invite requestor.

Figure 13:
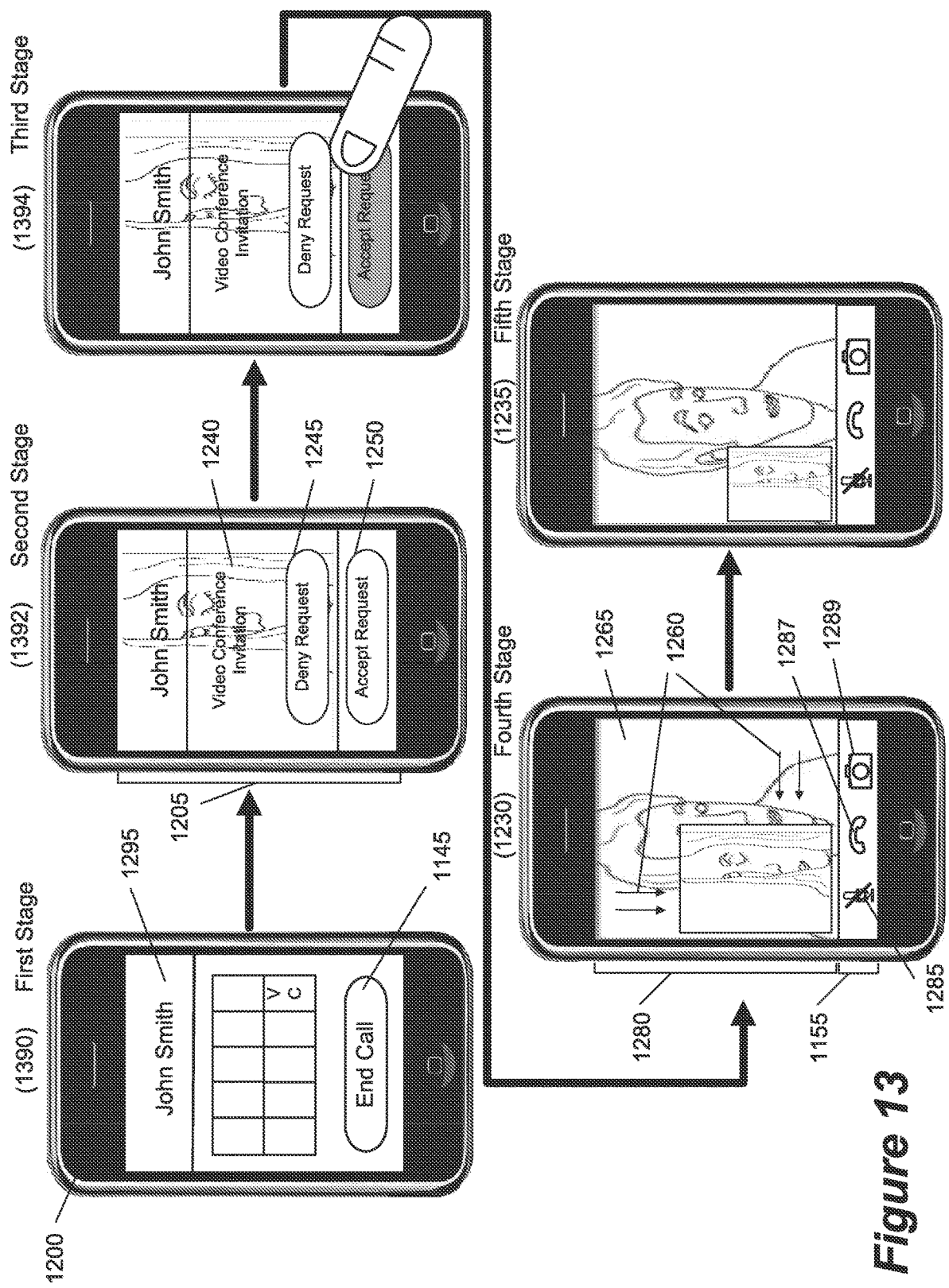
FIG. 13 illustrates another user interface of some embodiments for accepting an invitation to a video conference.

FIG. 13 illustrates an example of performing the operation illustrated in FIG. 12 in less stages by combining the first and third stages into one stage and the second and fourth stage into one stage. In particular, this figure illustrates a UI 1205 of the remote user's device 1200 at five different stages 1390, 1392, 1394, 1230, and 1235. The first stage 1390 is similar to the stage 1110 except the name field 1235 displays the name "John Smith" to indicate the name of the person on the other end of the telephone call. That is, a phone call has been established between the user of the remote mobile device and the user of the local device (i.e., John Smith in this example). The second and third stages 1392 and 1394 are similar to the first and second stages 1210 and 1215 of FIG. 12 except the second and third stage 1392 and 1394 also show a preview of the user of the remote mobile device (i.e., Nancy Jones in this example). The fourth and fifth stages 1230 and 1235 are the same as the fifth and sixth stages 1230 and 1235 of FIG. 12.

In addition to activating the video conference tool through a selectable option during a phone call, some embodiments allow a user of a dual camera device to initiate a video conference directly without having to make a phone call first. FIG. 14 illustrates another such alternative method to initiate a video conference. This figure illustrates the UI 1405 at seven different stages 1410, 1415, 1420, 1425, 1430, 1435, and 1440 that show an alternative sequence of operations for starting a video conference.

In the first stage 1410, a user is looking through a contacts list on this mobile device for the person with whom he wants to engage in a video conference, similar to how he would find a contact to call. In the second stage 1415, the user selects the person 1455 with whom he would like to have a video conference (e.g., through a single finger tap 1460 on the person's name 1455). This selection triggers the UI 1405 to display the contact's information and various user selectable options. In this example, Jason's name 1455 is highlighted to indicate that this is the person with whom the user would like to have a video conference. Different embodiments may indicate such a selection in different ways. While the second stage 1415 allows the user of the device 1400 to select a person with whom the user would like to have a video conference through a contact list, some embodiments allow the user to select the person through a "Recents" call history that lists a particular number or name of a person with whom the user of the device 1400 recently had a video conference or a phone call.

In the third stage 1420, the UI 1405 displays the selected person's information 1462 and various selectable UI items 1468, 1472, and 1470 after the person's name 1455 has been selected. In this example, one of the various selectable UI items 1472 (which can be implemented as a selectable icon or button) provides a video conference tool. The Video Conference option 1472 allows the user to invite the person identified by the contact 1466 to a video conference. Different embodiments display the information 1462 and selectable UI items 1468, 1472, and 1470 differently (e.g., in a different arrangement).

The fourth stage 1425 shows the user selecting the Video Conference option 1472 (e.g., through a single finger tap). In this example, the Video Conference option 1472 is highlighted to indicate that the video conference tool 1472 has been activated. Such selections may be indicated differently in different embodiments (e.g., by highlighting the text or border of the selected icon).

The fifth, sixth and seventh stages 1430, 1435, and 1440 are similar to the third, fourth and fifth stages 1120, 1125, and 1130 illustrated in FIG. 11 and may be understood by reference to the discussion of those stages. In brief, the fifth stage 1430 illustrates a transitional holding stage that waits for the remote user to respond to the invitation to a video conference. The sixth stage 1435 illustrates that after the remote user has accepted the video conference request, the display area 1480 (that displays the video of the local user) gradually decreases in size so the UI 1405 can show a display area 1492 that contains the video from a camera of the remote user behind the display area 1480. In the seventh stage 1440, the PIP display 1447 is presented by the UI 1405 during the video conference. In some embodiments, the layout of display area 1155 in the sixth stage 1435 and the seventh stage 1440 is like the layout of the display area 1155 of FIG. 12, described above.

FIGS. 10, 11, 12, 13, and 14 show several ways of establishing a video conference. In some embodiments, during a telephone call, audio data (e.g., voice) is transmitted through one communication channel (over a communication network like a circuit-switched communication network or a packet-switched communication network) and, during a video conference, audio data is transmitted through another communication channel. Thus, in such embodiments, audio data (e.g., voice) is transmitted through a communication channel before the video conference is established, and once the video conference is established, audio is transmitted through a different communication channel (instead of the communication channel used during the telephone call).

In order to provide a seamless transition (e.g., handoff) of audio data from the telephone call to the video conference, some embodiments do not terminate the telephone call before establishing the video conference. For instance, some embodiments establish a peer-to-peer video conference connection (e.g., after completing the message sequence illustrated in FIG. 10) before terminating the phone call and starting to transmit audio/video data through the peer-to-peer communication session. Alternatively, other embodiments establish a peer-to-peer video conference connection (e.g., after completing the message sequence illustrated in FIG. 10) and start transmitting audio/video data through the peer-to-peer communication session, before terminating the phone call and starting to present the received audio/video data.

A peer-to-peer video conference connection of some embodiments allows the mobile devices in the video conference to directly communicate with each other (instead of communicating through a central server, for example). Some embodiments of a peer-to-peer video conference allow the mobile devices in the video conferences to share resources with each other. For instance, through a control communication channel of a video conference, one mobile device can remotely control operations of another mobile device in the video conference by sending instructions from the one mobile device to the other mobile device to direct the other mobile device to process images differently (i.e., share its image processing resource) such as an exposure adjustment operation, a focus adjustment operation, and/or a switch camera operation, described in further detail below.

2. Dynamic Bit Rate Setup

Typically, mobile devices in a video conference communicate data (e.g., audio and video images) to each other through communication channels of different types of communication networks such as different private and public wireless communication networks (e.g., cellular networks like GSM, UMTS, etc.). Examples of such wireless communication networks will be explained by reference to FIGS. 91 and 92, below.

A communication network's available bandwidth for conducting a video conference differ at different times due to the varying number of mobile devices accessing the communication network at a given time. The available bandwidth can even change during the video conference. In addition, flooding the communication network with high bit rates during the video conference or large amounts of signaling in an attempt to figure out an optimal video conference bit rate is undesirable.

Because of these reasons, some embodiments employ a novel method for specifying the initial optimal bit rate for the video conference. To identify the initial optimal bit rate for the video conference, this method starts a video conference at a particular bit rate and incrementally increases the bit rate at particular intervals if these embodiments do not detect network conditions that would degrade the video conference quality.

Figure 15:
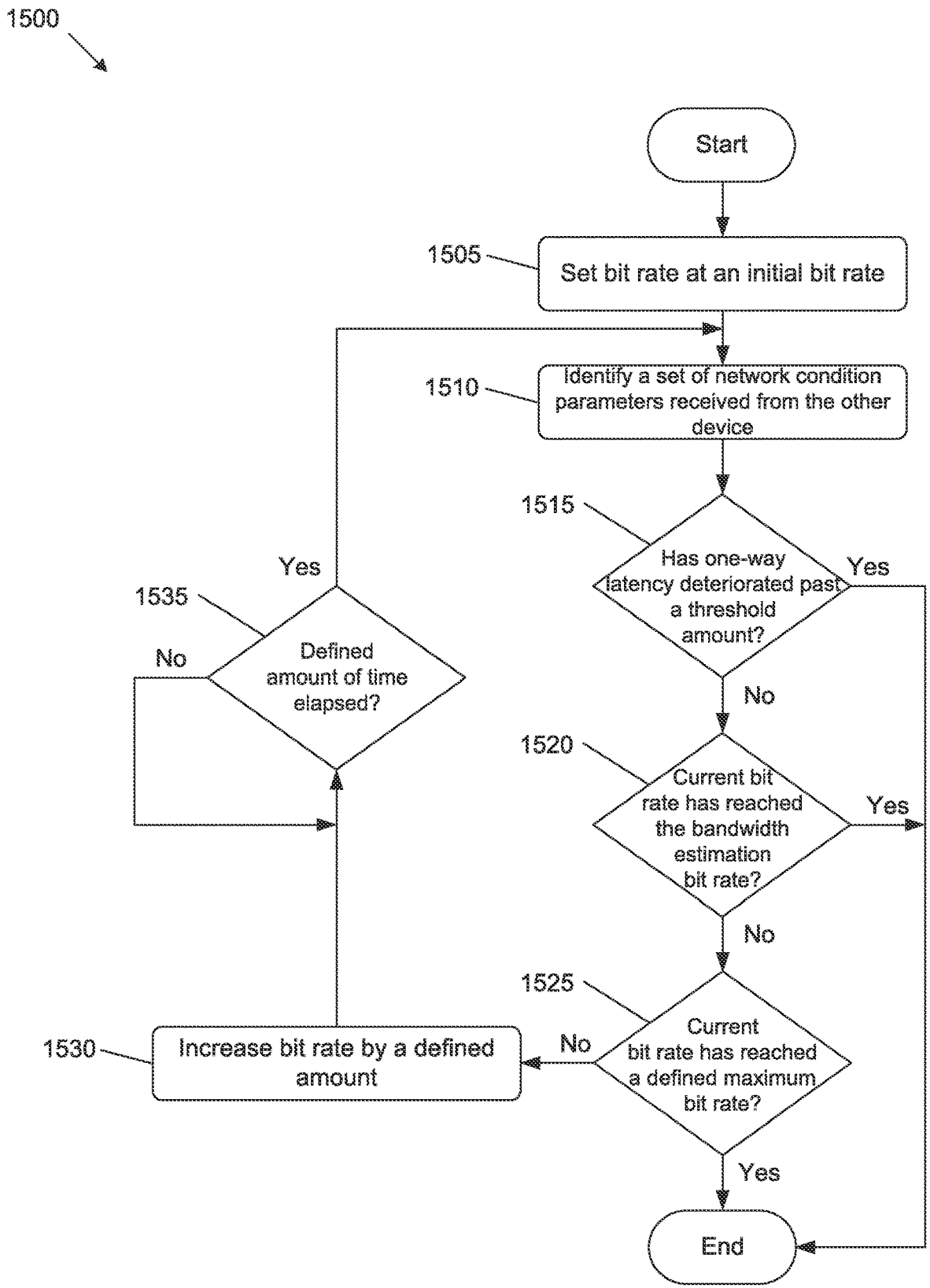
FIG. 15 conceptually illustrates a process of some embodiments for setting a bit rate for a video conference.

One example of such embodiments is illustrated in FIG. 15. This figure conceptually illustrates a process 1500 of some embodiments of the invention for setting the bit rate for a video conference. The process 1500 is performed as part of a video conference setup (e.g., as part of the video conference establishment illustrated in FIG. 10) to dynamically determine a bit rate for transmitting data (e.g., audio and video images) based on various network conditions. In some embodiments, the process 1500 is performed by the management layer 935 of the video conference module 925 described above by reference to FIG. 9. A more detailed version of this video conference module will be described below by reference to FIG. 16.

As shown in FIG. 15, the process 1500 starts by setting (at 1505) a bit rate at an initial bit rate. In some embodiments, the initial bit rate is a default baseline rate for the device. Some embodiments, though, allow a user to specify the initial bit rate. At 1505, the process 1500 also starts the video conference transmitting data (e.g., audio and video images) through one or more communication channels at the initial bit rate to a remote device.

Next, the process 1500 identifies (at 1510) a set of network condition parameters received from the remote device in the video conference. In some embodiments, the local device receives the set of network condition parameters from the remote device through a real-time transport protocol (RTP) communication session established at the start of the video conference. For instance, some embodiments provide the network condition parameters through the extension feature of RTP. Moreover, the RTP extension feature of some embodiments can be used to transmit any type of information (such as the set of network condition parameters) by indicating the presence of an extension header in an RTP packet header and defining an extension header for the additional information.

In different embodiments, devices in the video conference relay different sets of network condition/congestion parameters. In the embodiments described below, the set of network condition parameters include one-way latency and a bandwidth estimation bit rate. In other embodiments, the set of network condition parameters includes packet loss data and roundtrip time (RTT) delay data. As such, different embodiments can include any number of different network condition parameters in the set of network condition parameters.

In some embodiments, the set of network condition parameters received from the remote device of the video conference is based on data (e.g., audio and video) transmitted from the local mobile device (i.e., the mobile device performing the process 1500) to the remote device during the video conference at the initial bit rate set at operation 1505. For example, in some embodiments, the remote device can determine one-way latency by calculating the time it takes for audio packets to propagate through the network connection from the local mobile device to the remote device by using timestamps of the audio packets. Specifically, in some embodiments, each audio packet is time stamped. In the absence of packet delay, the remote devices should receive the audio packets at set intervals that are equal to the difference in the time stamps. However, when there is one-way latency delay, the remote device receives the audio packets at intervals greater than the difference in the time stamps.

Also, in some embodiments, the remote device determines a bandwidth estimation bit rate by examining the time a video packet is received, the time a consecutive video packet is received, and the size of the consecutive video packet. That is, the difference in time between the receipt of the two consecutive video packets and the size of the second video packet is used to estimate the available bandwidth of the network connection. Some embodiments determine a bandwidth estimation bit rate by examining multiple pairs of consecutive video packets. The above examples use specific types of data (i.e., audio data for determining one-way latency and video data for determining a bandwidth estimation bit rate). However, other types of data communicated through the network connection between the local mobile device and the remote device can be used as well in some embodiments.

After identifying (at 1510) the set of network conditions, the process 1500 then determines (at 1515) whether the one-way latency has deteriorated past a defined threshold amount. In some embodiments, the threshold amount is defined as a particular latency amount and the one-way latency is determined to deteriorate past the threshold amount when the difference between the current one-way latency and a previous one-way latency exceeds the particular latency amount. In other embodiments, the threshold amount is defined as a particular rate of change of one-way latencies. As such, the one-way latency is determined to deteriorate past the threshold amount when the rate of change of a set of one-way latencies (e.g., the current one-way latency and previous one-way latencies) exceeds the particular rate of change.

When the one-way latency is determined to deteriorate past the threshold amount, the process 1500 ends. Otherwise, the process 1500 determines (at 1520) whether the current bit rate has reached the bandwidth estimation bit rate. In some embodiments, the bandwidth estimation bit rate indicates an amount of available bandwidth (e.g., 15 kilobits/sec (kbps)) for the network connection. When the process 1500 determines that the current bit rate exceeds the bandwidth estimation bit rate, the process 1500 ends. When the process 1500 determines that the current bit rate does not exceed the bandwidth estimation bit rate, the process 1500 proceeds to operation 1525.

At 1525, the process 1500 determines whether the current bit rate has reached a defined maximum bit rate. When the process 1500 determines that the current bit rate exceeds the defined maximum bit rate, the process 1500 ends. Otherwise, the process 1500 proceeds to operation 1530 to increase the current bit rate by a defined amount. Different embodiments define the amount to increase the bit rate differently. Examples of a defined amount to increase the current bit rate include 32 kbps, 64 kbps, among any number of other amounts to increase the bit rate.

Next, the process determines (at 1535) whether a defined amount of time has elapsed. The defined amount of time can be 1 second, 2 seconds, 5 seconds, or any other possible amounts of time since different embodiments define the amount of time differently. The process 1500 waits for the defined amount of time to elapse in order for the remote device to receive data (e.g., audio and video images) transmitted from the local mobile device at the newly increased bit rate (at operation 1530) and determine network condition parameters based on the newly increased bit rate. If the process 1500 determines that the defined amount of time has not elapsed, the process 1500 returns to operation 1535 until the defined amount of time has elapsed. When the process 1500 determines that the defined amount of time has elapsed, the process 1500 returns to operation 1510. The operation of the process 1500 from 1510 onwards proceeds as described above until the process 1500 ends.

When the process 1500 ends (i.e., after operation 1515, 1520, or 1525), the setup of a bit rate for the video conference is complete and an optimal bit rate has been determined. Since the available bandwidth for the video conference can change during the video conference, some embodiments continue to adjust the bit rate based on the set of network condition parameters (i.e., the one-way latency and the bandwidth estimation bit rate) that are received from the remote device. The bit rate can be adjusted during the video conference by increasing the bit rate. For instance, if the process 1500 ended because the one-way latency deteriorated past the defined threshold amount and, during the video conference, the one-way latency improves, some embodiments increase the bit rate. Similarly, if the process 1500 ended because the bit rate exceeded the bandwidth estimation bit rate and, during the video conference, the bandwidth estimation bit rate increases, some embodiments increase the bit rate.

In contrast, the bit rate can be adjusted during the video conference by decreasing the bit rate. For example, if the one-way latency continues to deteriorate past the defined threshold amount during the video conference, some embodiments decrease the bit rate. Also, if the bit rate continues to exceed the bandwidth estimation bit rate (e.g., the bandwidth estimation bit rate continues to decrease) during the video conference, some embodiments decrease the bit rate.

Moreover, the description of the process 1500 uses one-way latency and a bandwidth estimation bit rate to determine whether to increase the bit rate. However, one of ordinary skill will realize that any number of network condition parameters can be used to determine whether to increase the bit rate in different embodiments. For instance, determining whether to increase the bit rate can be based on solely RTT delay data or packet loss data.

C. Video Conference Architecture

As mentioned above, FIG. 16 conceptually illustrates a software architecture for a video conferencing and processing module 1600 of a dual camera mobile device of some embodiments. As shown, the video conferencing and processing module 1600 includes a client application 1665, a video conference module 1602, a media exchange module 1620, a buffer 1625, a captured image processing unit (CIPU) driver 1630, an encoder driver 1635, and a decoder driver 1640. In some embodiments, the buffer 1625 is a frame buffer that stores images of a video for display on a display 1645 of the dual camera mobile device.

In some embodiments, the client application 1665 is the same as the video conference client 945 of FIG. 9. As mentioned above, the client application 1665 may be integrated into another application or implemented as a stand-alone application. The client application 1665 may be an application that uses the video conferencing functions of the video conference module 1602, such as a video conferencing application, a voice-over-IP (VOIP) application (e.g., Skype), or an instant messaging application.

The client application 1665 of some embodiments sends instructions to the video conference module 1602 such as instructions to start a conference and end a conference, receives instructions from the video conference module 1602, routes instructions from a user of the dual camera mobile device to the video conference module 1602, and generates user interfaces that are displayed on the dual camera mobile device and allow a user to interact with the application.

D. Video Conference Manager

Figure 16:
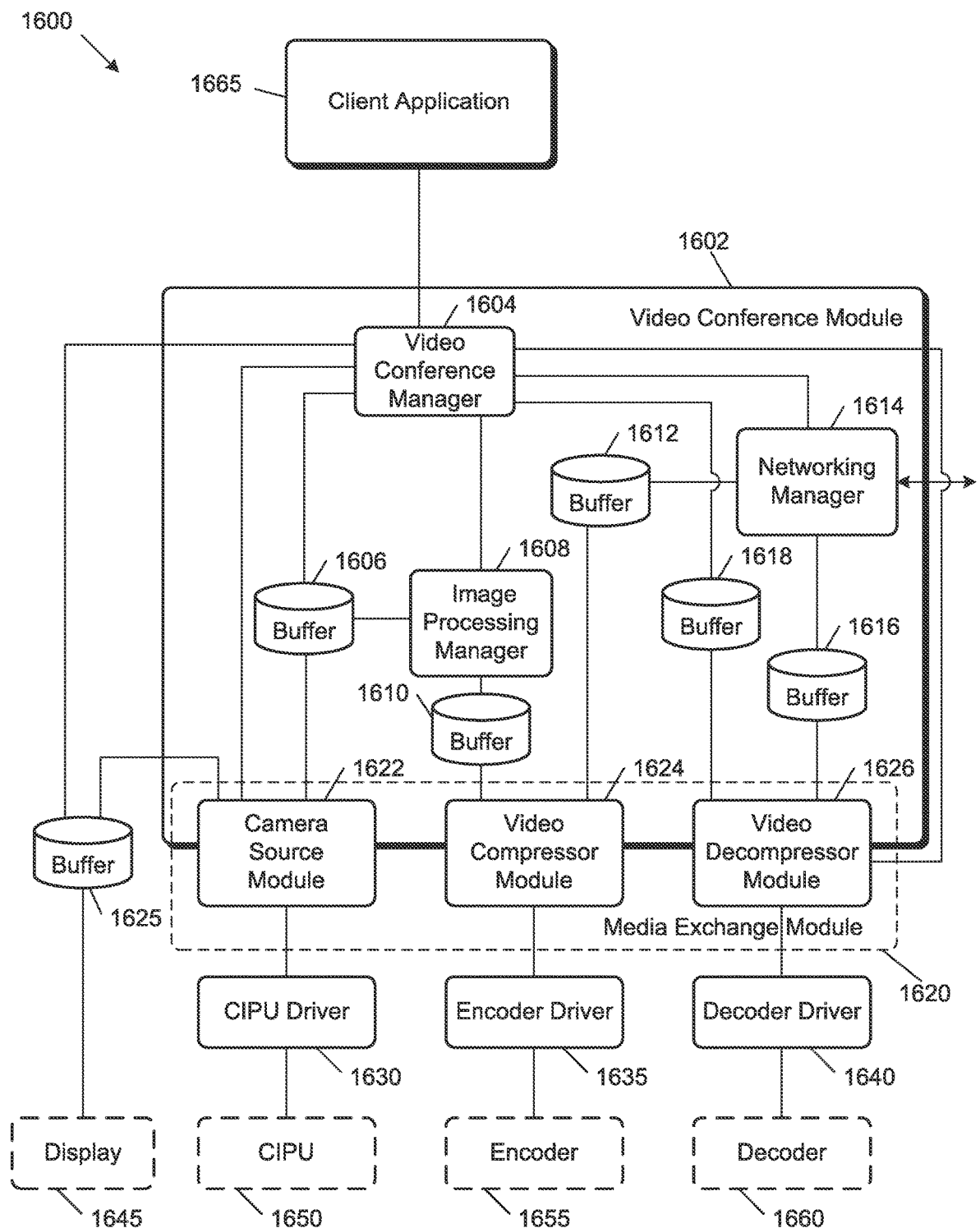
FIG. 16 conceptually illustrates another software architecture for a video conferencing and processing module of a dual camera mobile device of some embodiments.

As shown in FIG. 16, the video conference module 1602 includes a video conference manager 1604, an image processing manager 1608, a networking manager 1614, and buffers 1606, 1610, 1612, 1616, and 1618. In some embodiments, the video conference module 1602 is the same as the video conference module 925 illustrated in FIG. 9 and thus performs some or all of the same functions described above for the video conference module 925.

In some embodiments, the video conference manager 1604 is responsible for initializing some or all of the other modules of the video conference module 1602 (e.g., the image processing manager 1608 and the networking manager 1614) when a video conference is starting, controlling the operation of the video conference module 1602 during the video conference, and ceasing the operation of some or all of the other modules of the video conference module 1602 when the video conference is ending.

The video conference manager 1604 of some embodiments also processes images received from one or more devices in the video conference and images captured by one of both cameras of the dual camera mobile device for display on the dual camera mobile device. For instance, the video conference manager 1604 of some embodiments retrieves decoded images, that were received from another device participating in the video conference, from the buffer 1618 and retrieves images processed by CIPU 1650 (i.e., images captured by the dual camera mobile device) from the buffer 1606. In some embodiments, the video conference manager 1604 also scales and composites the images before displaying the images on the dual camera mobile device. That is, the video conference manager 1604 generates the PIP or other composite views to display on the mobile device in some embodiments. Some embodiments scale the images retrieved from the buffers 1606 and 1618 while other embodiments just scale images retrieved from one of the buffers 1606 and 1618.

Although FIG. 16 illustrates the video conference manager 1604 as part of the video conference module 1602, some embodiments of the video conference manager 1604 are implemented as a component separate from the video conference module 1602. As such, a single video conference manager 1604 can be used to manage and control several video conference modules 1602. For instance, some embodiments will run a separate video conference module on the local device to interact with each party in a multi-party conference, and each of these video conference modules on the local device are managed and controlled by the one video conference manager.

The image processing manager 1608 of some embodiments processes images captured by the cameras of the dual camera mobile device before the images are encoded by the encoder 1655. For example, some embodiments of the image processing manager 1608 perform one or more of exposure adjustment, focus adjustment, perspective correction, dynamic range adjustment, and image resizing on images processed by the CIPU 1650. In some embodiments, the image processing manager 1608 controls the frame rate of encoded images that are transmitted to the other device in the video conference.

Some embodiments of the networking manager 1614 manage one or more connections between the dual camera mobile device and the other device participating in the video conference. For example, the networking manager 1614 of some embodiments establishes the connections between the dual camera mobile device and the other device of the video conference at the start of the video conference and tears down these connections at the end of the video conference.

During the video conference, the networking manager 1614 transmits images encoded by the encoder 1655 to the other device of the video conference and routes images received from the other device of the video conference to decoder 1660 for decoding. In some embodiments, the networking manager 1614, rather than the image processing manager 1608, controls the frame rate of the images that are transmitted to the other device of the video conference. For example, some such embodiments of the networking manager 1614 control the frame rate by dropping (i.e., not transmitting) some of the encoded frames that are supposed to be transmitted to the other device of the video conference.

As shown, the media exchange module 1620 of some embodiments includes a camera source module 1622, a video compressor module 1624, and a video decompressor module 1626. The media exchange module 1620 is the same as the media exchange module 310 shown in FIG. 3, with more detail provided. The camera source module 1622 routes messages and media content between the video conference module 1602 and the CIPU 1650 through the CIPU driver 1630, the video compressor module 1624 routes message and media content between the video conference module 1602 and the encoder 1655 through the encoder driver 1635, and the video decompressor module 1626 routes messages and media content between the video conference module 1602 and the decoder 1660 through the decoder driver 1640. Some embodiments implement the TNR module 315 included in the media exchange module 310 (not shown in FIG. 16) as part of the camera source module 1622 while other embodiments implement the TNR module 315 as part of the video compressor module 1624.

In some embodiments, the CIPU driver 1630 and the encoder driver 1635 are the same as the CIPU driver 305 and the encoder driver 320 illustrated in FIG. 3. The decoder driver 1640 of some embodiments acts as a communication interface between the video decompressor module 1626 and decoder 1660. In such embodiments, the decoder 1660 decodes images received from the other device of the video conference through the networking manager 1614 and routed through the video decompressor module 1626. After the images are decoded, they are sent back to the video conference module 1602 through the decoder driver 1640 and the video decompressor module 1626.

Figure 17:
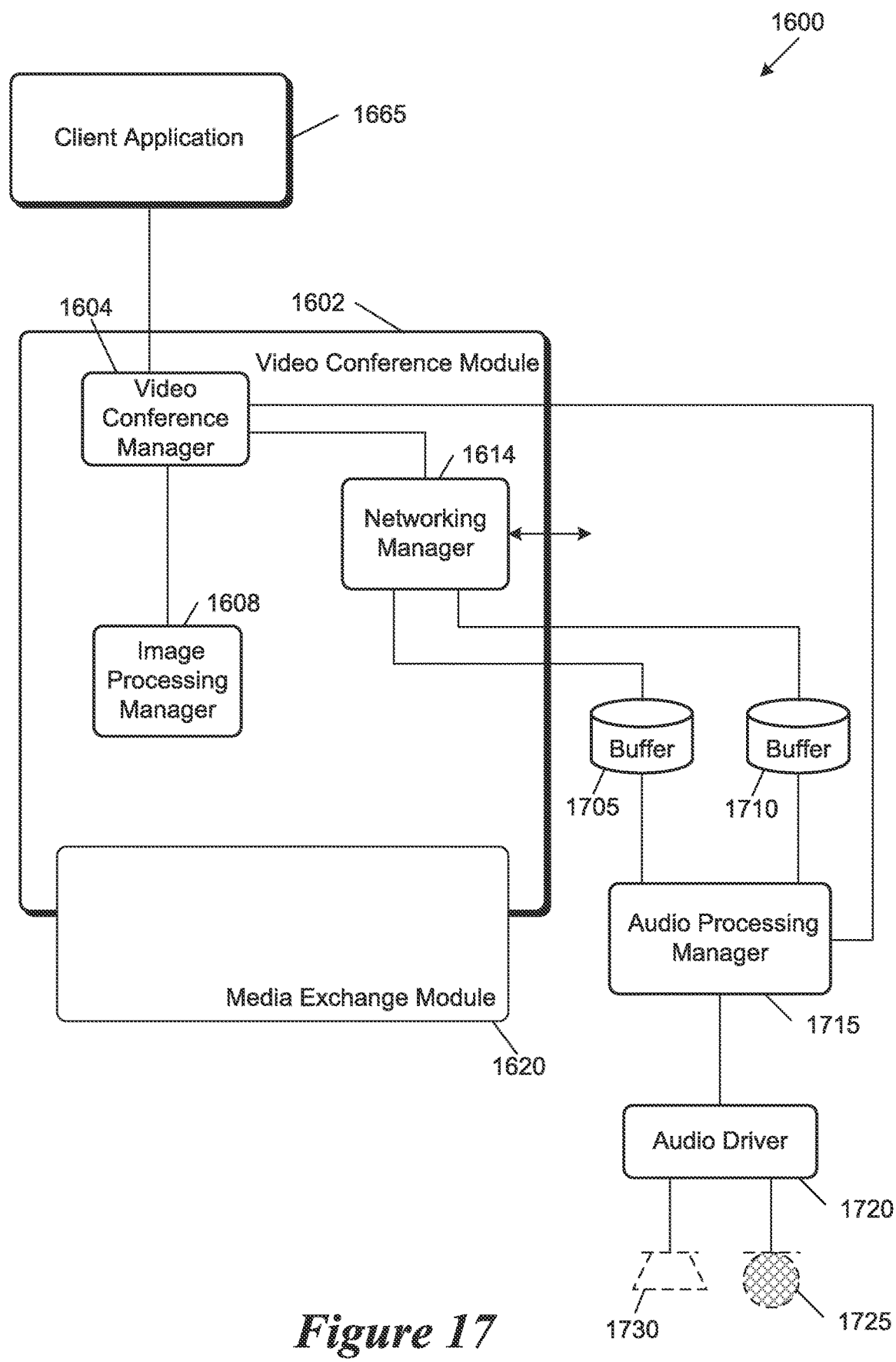
FIG. 17 conceptually illustrates another software architecture for a dual camera mobile device of some embodiments.

In addition to performing video processing during a video conference, the video conferencing and processing module 1600 for the dual camera mobile device of some embodiments also performs audio processing operations during the video conference. FIG. 17 illustrates such a software architecture. As shown, the video conferencing and processing module 1600 includes the video conference module 1602 (which includes the video conference manager 1604, the image processing manager 1608, and the networking manager 1614), the media exchange module 1620, and the client application 1665. Other components and modules of the video conferencing and processing module 1600 shown in FIG. 16 are omitted in FIG. 17 to simplify the description. The video conferencing and processing module 1600 also includes frame buffers 1705 and 1710, audio processing manager 1715, and audio driver 1720. In some embodiments, the audio processing manager 1715 is implemented as a separate software module while in other embodiments the audio processing manager 1715 is implemented as part of the media exchange module 1620.

The audio processing manager 1715 processes audio data captured by the dual camera mobile device for transmission to the other device in the video conference. For example, the audio processing manager 1715 receives audio data through the audio driver 1720, which is captured by microphone 1725, and encodes the audio data before storing the encoded audio data in the buffer 1705 for transmission to the other device. The audio processing manager 1715 also processes audio data captured by and received from the other device in the video conference. For instance, the audio processing manager 1715 retrieves audio data from the buffer 1710 and decodes the audio data, which is then output through the audio driver 1720 to the speaker 1730.

In some embodiments, the video conference module 1602 along with the audio processing manager 1715 and its associated buffers are part of a larger conference module. When a multi-participant audio conference is conducted between several devices without exchange of video content, this video conferencing and processing module 1600 only uses the networking manager 1614 and the audio processing manager 1715 to facilitate the exchange of audio over an Internet Protocol (IP) layer.

Figure 18:
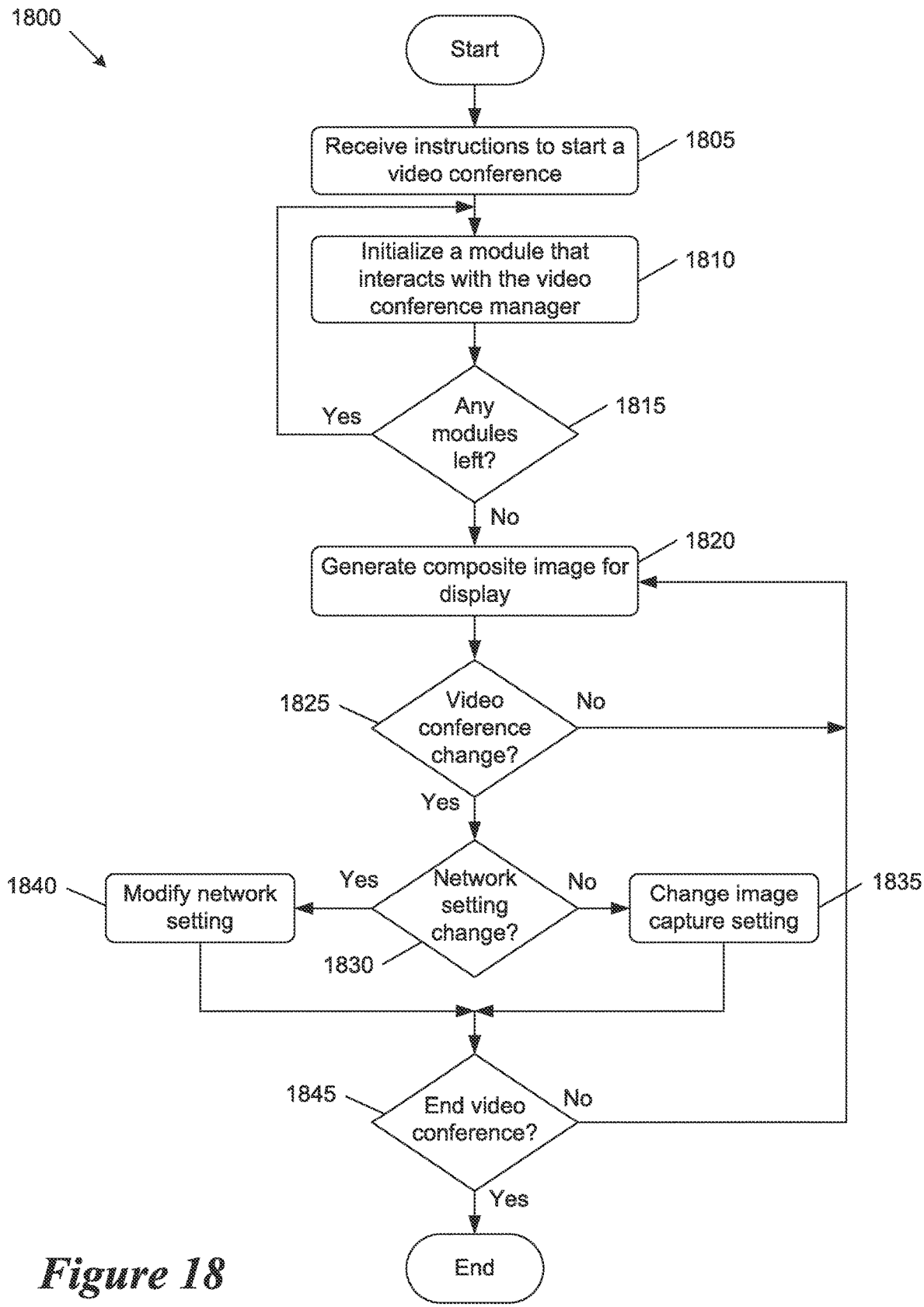
FIG. 18 conceptually illustrates a process performed by a video conference manager of some embodiments such as that illustrated in FIG. 16.

The operation of the video conference manager 1604 of some embodiments will now be described by reference to FIG. 18. FIG. 18 conceptually illustrates a process 1800 performed by a video conference manager of some embodiments such as video conference manager 1604 illustrated in FIG. 16. This can be equivalent to being performed by the management layer 935 of FIG. 9. In some embodiments, the video conference manager 1604 performs process 1800 when a user of the dual camera mobile device accepts (e.g., through a user interface displayed on the dual camera mobile device) a video conference request or when a user of another device accepts a request sent by the user of the dual camera mobile device.

The process 1800 begins by receiving (at 1805) instructions to start a video conference. In some embodiments, the instructions are received from the client application 1665 or are received from a user through a user interface displayed on the dual camera mobile device and forwarded to the video conference manager 1604 by the client application 1665. For example, in some embodiments, when a user of the dual camera mobile device accepts a video conference request, the instructions are received through the user interface and forwarded by the client application. On the other hand, when a user of the other device accepts a request sent from the local device, some embodiments receive the instructions from the client application without user interface interaction (although there may have been previous user interface interaction to send out the initial request).

Next, the process 1800 initializes (at 1810) a first module that interacts with the video conference manager 1604. The modules of some embodiments that interact with the video conference manager 1604 include the CIPU 1650, the image processing manager 1608, the audio processing manager 1715, and the networking manager 1614.

In some embodiments, initializing the CIPU 1650 includes instructing the CIPU 1650 to start processing images captured by one or both cameras of the dual camera mobile device. Some embodiments initialize the image processing manager 1608 by instructing the image processing manager 1608 to start retrieving images from the buffer 1610 and processing and encoding the retrieved images. To initialize the audio processing manager 1715, some embodiments instruct the audio processing manager 1715 to begin encoding audio data captured by the microphone 1725 and decoding audio data stored in the buffer 1710 (which was received from the other device) in order to output to the speaker 1730. The initializing of the networking manager 1614 of some embodiments includes instructing the networking manager 1614 to establish a network connection with the other device in the video conference.

The process 1800 then determines (at 1815) whether there are any modules left to initialize. When there are modules left to initialize, the process 1800 returns to operation 1810 to initialize another of the modules. When all of the required modules have been initialized, the process 1800 generates (at 1820) composite images for displaying on the dual camera mobile device (i.e., local display). These composite images may include those shown in FIG. 65, described below (i.e., PIP or other composite displays), and can include various combinations of images from the cameras of the local dual camera mobile device and images from cameras of the other device participating in the video conference.

Next, the process 1800 determines (at 1825) whether a change has been made to the video conference. Some embodiments receive changes to the video conference through user interactions with a user interface displayed on the dual camera mobile device while other embodiments receive changes to the video conference from the other device through the networking manager 1614 (i.e., remote control). The changes to video conference settings may also be received from the client application 1665 or other modules in the video conference module 1602 in some embodiments. The video conference settings may also change due to changes in the network conditions.

When a change has been made, the process 1800 determines (at 1830) whether the change to the video conference is a change to a network setting. In some embodiments, the changes are either network setting changes or image capture setting changes. When the change to the video conference is a change to a network setting, the process modifies (at 1840) the network setting and then proceeds to operation 1845. Network setting changes of some embodiments include changing the bit rate at which images are encoded or the frame rate at which the images are transmitted to the other device.

When the change to the video conference is not a change to a network setting, the process 1800 determines that the change is a change to an image capture setting and then proceeds to operation 1835. The process 1800 then performs (at 1835) the change to the image capture setting. In some embodiments, change to the image capture settings may include switching cameras (i.e., switching which camera on the dual camera mobile device will capture video), focus adjustment, exposure adjustment, displaying or not displaying images from one or both cameras of the dual camera mobile device, and zooming in or out of images displayed on the dual camera mobile device, among other setting changes.

At operation 1845, the process 1800 determines whether to end the video conference. When the process 1800 determines to not end the video conference, the process 1800 returns to operation 1820. When the process 1800 determines that the video conference will end, the process 1800 ends. Some embodiments of the process 1800 determine to end the video conference when the process 1800 receives instructions from the client application 1665 to end the video conference (i.e., due to instructions received through the user interface of the local dual camera mobile device or received from the other device participating in the video conference).

In some embodiments, the video conference manager 1604 performs various operations when the video conference ends that are not shown in process 1800. Some embodiments instruct the CIPU 1650 to stop producing images, the networking manager 1614 to tear down the network connection with the other device in the video conference, and the image processing manager 1608 to stop processing and encoding images.

E. Temporal Noise Reduction

Some embodiments include a specific temporal noise reduction module for processing video images to reduce noise in the video. The temporal noise reduction module of some embodiments compares subsequent images in a video sequence to identify and eliminate unwanted noise from the video.

Figure 19:
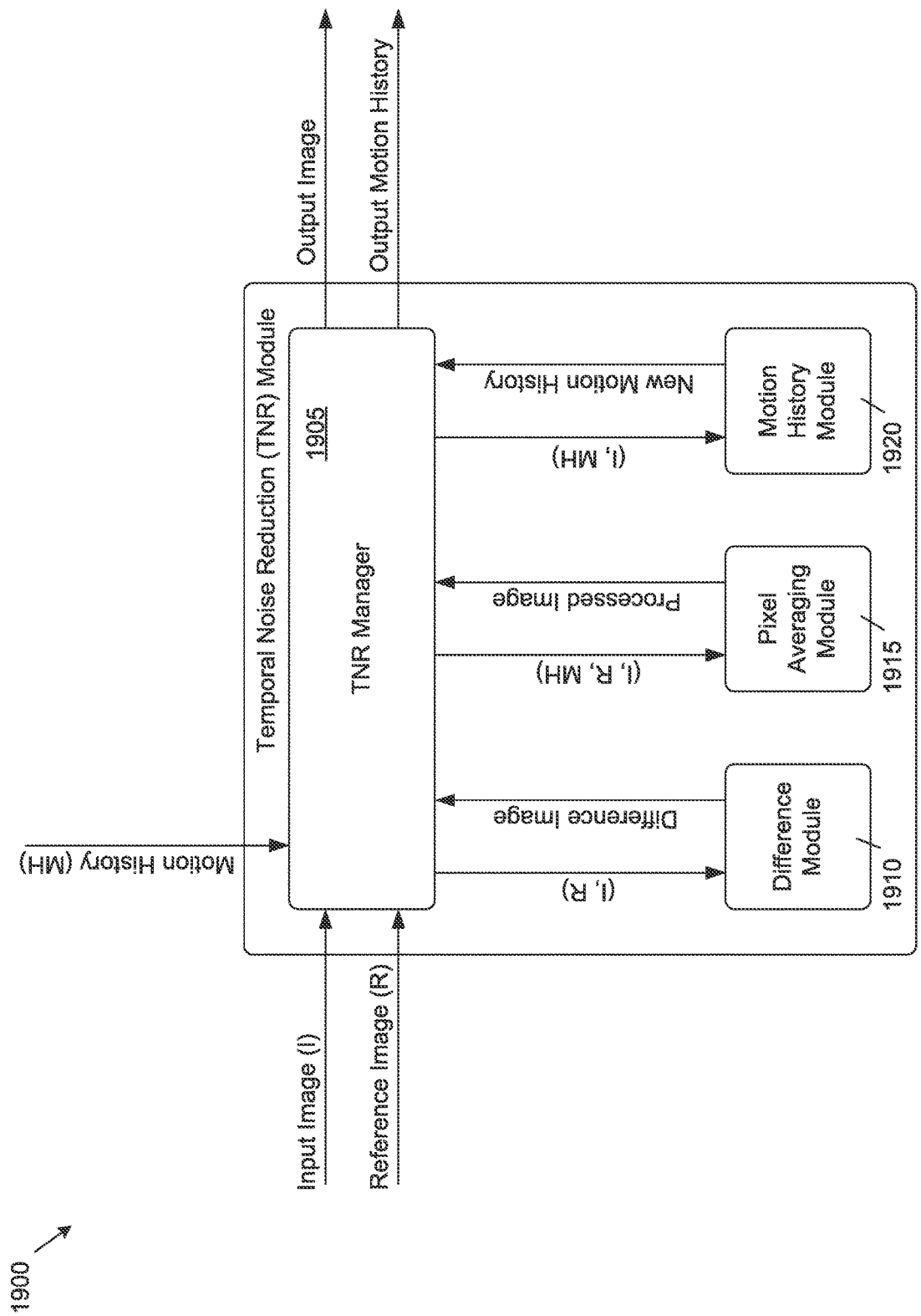
FIG. 19 conceptually illustrates a software architecture for a temporal noise reduction module of some embodiments.

FIG. 19 conceptually illustrates a software architecture for such a temporal noise reduction (TNR) module 1900 of some embodiments. Some embodiments implement the TNR module 1900 as part of an application (e.g., as part of the media exchange module as shown in FIG. 3) while other embodiments implement the TNR module 1900 as a stand-alone application that is used by other applications. Yet other embodiments implement the TNR module 1900 as part of an operating system running on the dual camera mobile device. In some embodiments, the TNR module 1900 is implemented by a set of APIs that provide some or all of the functionalities of the TNR module 1900 to other applications.

As shown in FIG. 19, the TNR module 1900 includes a TNR manager 1905, a difference module 1910, a pixel averaging module 1915, and a motion history module 1920. While FIG. 19 shows the three modules 1910, 1915, and 1920 as separate modules, some embodiments implement the functionalities of these modules, described below, in a single module. The TNR module 1900 of some embodiments receives as input an input image, a reference image, and a motion history. In some embodiments, the input image is the image presently being processed while the reference image is the previous image in the video sequence to which the input image is compared. The TNR module 1900 outputs an output image (a version of the input image with reduced noise) and an output motion history.

The TNR manager 1905 of some embodiments directs the flow of data through the TNR module 1900. As shown, the TNR manager 1905 receives the input image, the reference image, and the motion history. The TNR manager 1905 also outputs the output image and the output motion history. The TNR manager 1905 sends the input image and the reference image to the difference module 1910 and receives a difference image from the difference module 1910.

In some embodiments, the difference module 1910 processes the data received from the TNR manager 1905 and sends the processed data to the TNR manager 1905. As shown, the difference module 1910 receives the input image and the reference image from the TNR manager 1905. The difference module 1910 of some embodiments generates a difference image by subtracting the pixel values of one image from the pixel values of the other image. The difference image is sent to the TNR manager 1905. The difference image of some embodiments indicates the difference between the two images in order to identify sections of the input image that have changed and sections of the input image that have stayed the same as compared to the previous image.

The TNR manager 1905 also sends the input image and reference image to the pixel averaging module 1915. As shown, some embodiments also send the motion history to the pixel averaging module 1915 as well. Other embodiments, however, might send only the input image and the reference image without the motion history. In either embodiments, the TNR manager 1905 receives a processed image from the pixel averaging module 1915.

The pixel averaging module 1915 of some embodiments uses the motion history to determine whether to take an average of the pixels from the input and reference images for a particular location in the image. In some embodiments, the motion history includes a probability value for each pixel in the input image. A particular probability value represents the probability that the corresponding pixel in the input image has changed (i.e., a dynamic pixel) with respect to the corresponding pixel in the reference image. For instance, if the probability value of a particular pixel in the input image is 20, that indicates a probability of 20% that the particular pixel in the input image has changed with respect to the corresponding pixel in the reference image. As another example, if the probability value of a particular pixel in the input image is 0, that indicates that the particular pixel in the input image has not changed (i.e., a static pixel) with respect to the corresponding pixel in the reference image.

Different embodiments store the probability values of the input image differently. Some embodiments might store the probability values of each pixel of the input image in one array of data. Other embodiments might store the probability values in a matrix (e.g., an array of arrays) with the same dimensions as the resolution of the images of the video. For example, if the resolution of the images of the video is 320×240, then the matrix is also 320×240.

When the pixel averaging module 1915 receives the motion history in addition to the input image and reference image from the TNR manager 1905, the pixel averaging module 1915 reads the probability values of each pixel in the input image. If the probability value for a particular pixel in the input image is below a defined threshold (e.g., 5%, 20%), the pixel averaging module 1915 averages the particular pixel value with the corresponding pixel value in the reference image based on the premise that there is not likely to be motion at the particular pixel, and thus differences between the images at that pixel may be attributable to noise.

If the probability for the particular pixel in the input image is not below the defined threshold, the pixel averaging module 1915 does not modify the particular pixel of the input image (i.e., the pixel value at that pixel stays the same as in the input image). This is because motion is more likely at the particular pixel, so differences between the images are more likely to not be the result of noise. In some embodiments, when the motion history is not sent to the pixel averaging module 1915, the pixel averaging module 1915 averages each pixel in the input image with the corresponding pixel in the reference image. The processed image that is output by the pixel averaging module 1915 and sent to the TNR manager 1905 includes the input image pixel values for any pixels that were not averaged and the averaged pixel values for any pixels that were averaged by the pixel averaging module 1915.

In some embodiments, the motion history module 1920 processes data received from the TNR manager 1905 and sends the result data back to the TNR manager 1905. The motion history module 1920 of some embodiments receives the input image and the motion history from the TNR manager 1905. Some embodiments input this data into a Bayes estimator in order to generate a new motion history (i.e., a set of probability values) that can be used in the pixel averaging for the next input image. Other embodiments use other estimators to generate the new motion history.

Figure 20:
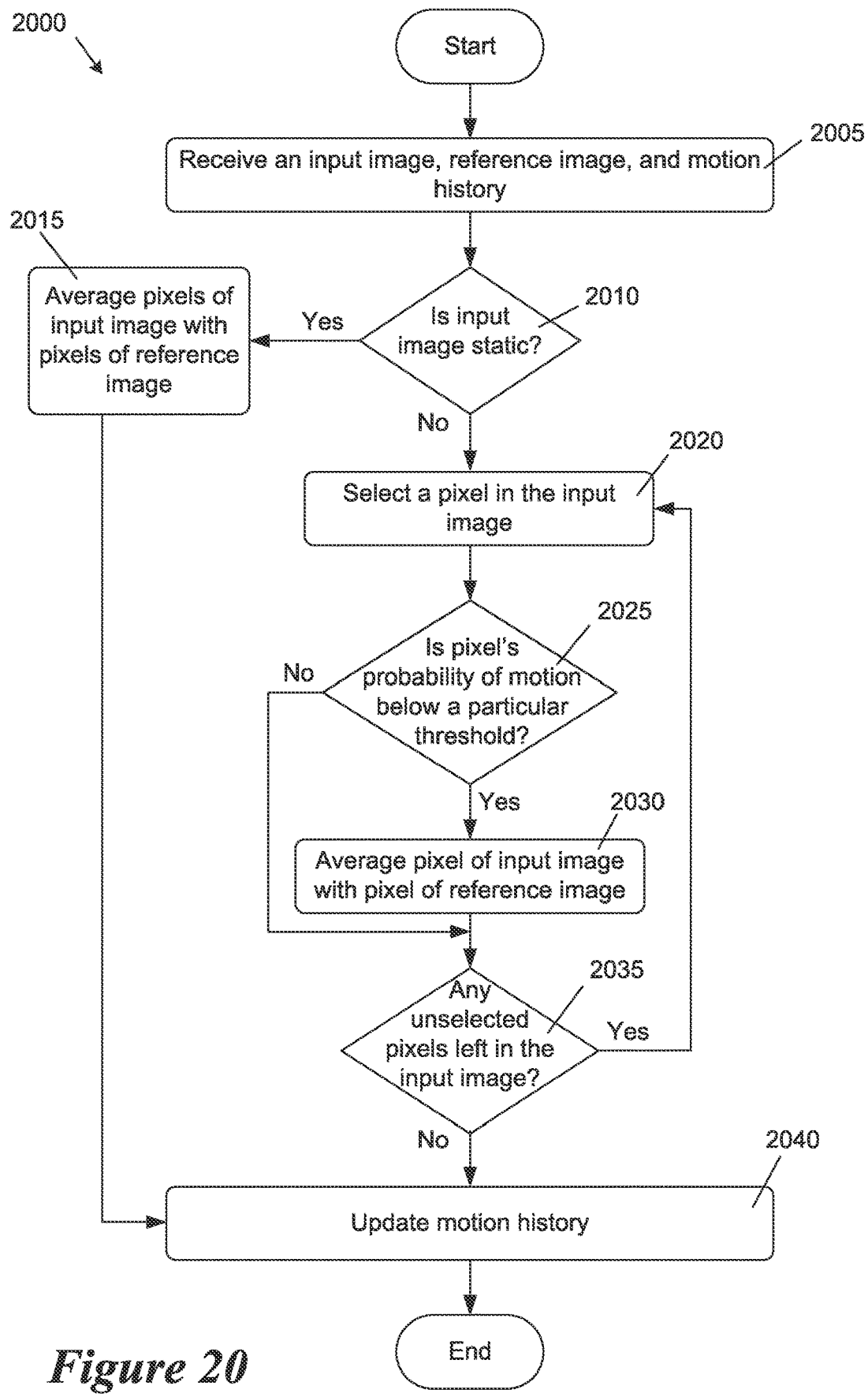
FIG. 20 conceptually illustrates a process of some embodiments for reducing temporal noise of images of a video.

The operation of the TNR module 1900 will now be described by reference to FIG. 20. This figure conceptually illustrates a process 2000 of some embodiments for reducing temporal noise of images of a video. The process 2000 starts by the TNR manager 1905 receiving (at 2005) an input image, a reference image, and a motion history. The input image is the image presently being processed for noise reduction. In some embodiments, the reference image is the previous image of a sequence of images of the video as received from the CIPU. In other embodiments, however, the reference image is the output image generated from the processing of the previous input image (i.e., the output of TNR module 1900). The motion history is the output motion history generated from the processing of the previous input image.

When the input image is a first image of the video, the TNR module 1900 of some embodiments does not process (i.e., apply TNR to) the first image. In other words, the TNR manager 1905 receives the first image and just outputs the first image. In other embodiments, when the input image is the first image of the video, the first image is used as the input image and the reference image and the TNR module 1900 processes the image as described below. Further, when the input image is the first image of the video, the motion history is empty (e.g., null, full of zeros, etc.) and the TNR manager 1905 just outputs an empty motion history as the output motion history.

The TNR manager 1905 then determines (at 2010) whether the input image is static. In order to make this determination, some embodiments send the input image and the reference image to the difference module 1910 and receive a difference image from the difference module 1910. When the difference between the two images is below a defined threshold (e.g., 5% difference, 10% difference, etc.), some embodiments classify the input image as static.

When the input image is a static image, the TNR manager 1905 sends the input image and the reference image to the pixel averaging module 1915 to average (at 2015) the pixels of the input image with the pixels of the reference image in order to reduce any noise from the static image. The process then proceeds to 2040, which is described below.

When the input image is not a static image, the TNR manager sends the input image, reference image, and motion history to the pixel averaging module 1915 for processing. The pixel averaging module 1915 selects (at 2020) a pixel in the input image. Using the motion history, the pixel averaging module 1915 determines (at 2025) whether the pixels' probability of motion is below a particular threshold, as described above.

If the selected pixel's probability is below the particular threshold, the pixel averaging module 1915 averages (at 2030) the pixel of the input image with the corresponding pixel in the reference image. Otherwise, the pixel is not averaged and the output image will be the same as the input image at that particular pixel. The pixel averaging module 1915 then determines (at 2035) whether there are any unselected pixels left in the input image. If any pixels have not yet been processed, the process returns to operation 2020 to select the next pixel. The pixel averaging module 1915 performs the operations 2020-2030 until all pixels have been evaluated.

The process then updates (at 2040) the motion history. As shown in FIG. 19 and described above, the motion history module 1920 updates the motion history based on the input image. The new motion history is output by the TNR manager along with the processed image from the pixel averaging module.

F. Image Processing Manager & Encoder

In addition to temporal noise reduction and image processing operations performed by the CIPU and/or CIPU driver, some embodiments perform a variety of image processing operations at the image processing layer 930 of the video conference module 925. These image processing operations may include exposure adjustment, focus adjustment, perspective correction, adjustment of dynamic range, and image resizing, among others.

Figure 21:
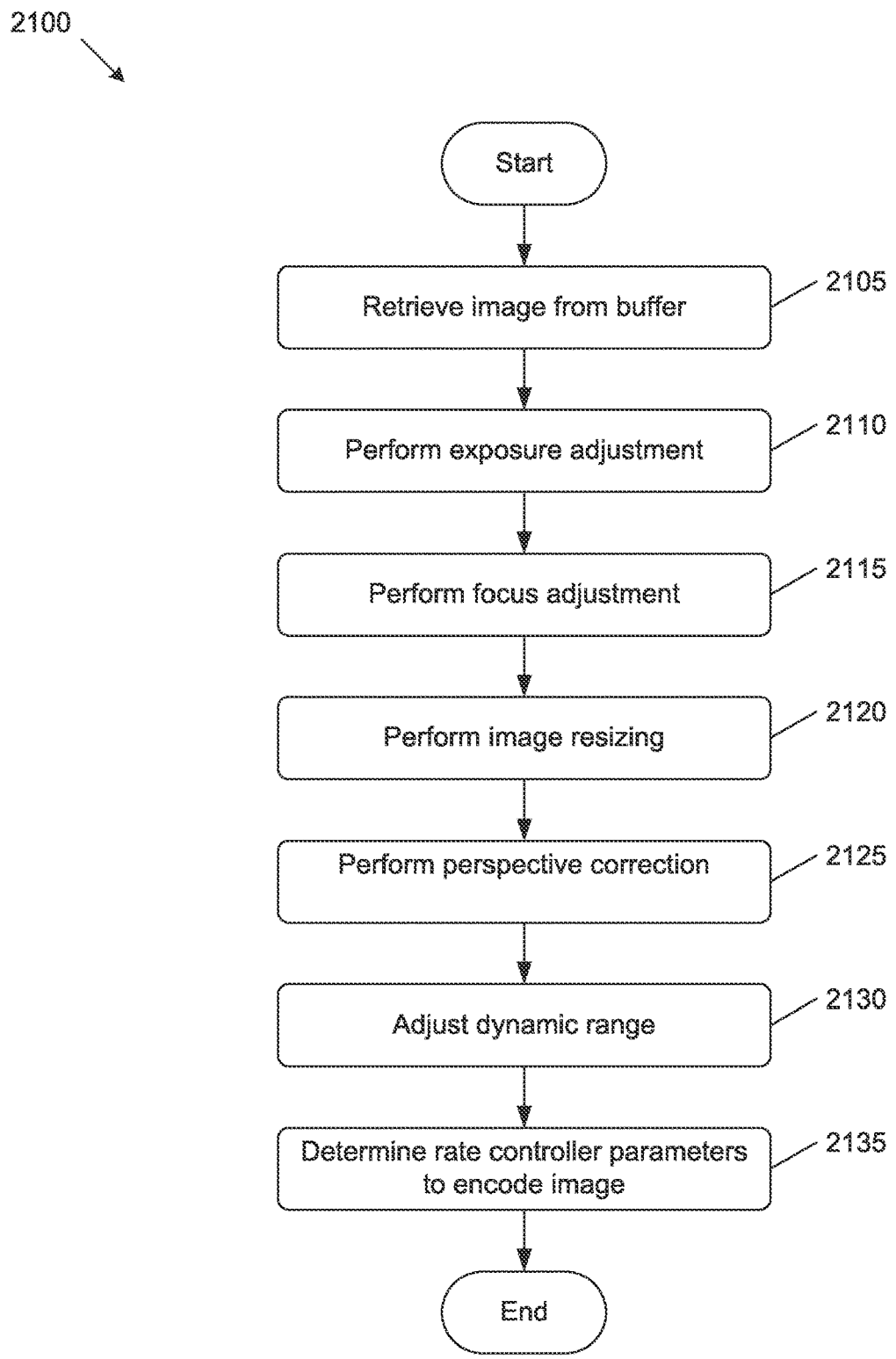
FIG. 21 conceptually illustrates a process performed by an image processing manager of some embodiments such as that illustrated in FIG. 9.

FIG. 21 conceptually illustrates a process 2100 for performing such image processing operations. In some embodiments, some or all of the operations of the process 2100 are performed by a combination of the image processing manager 1608 and the encoder driver 1635 of FIG. 16. In some of such embodiments, the image processing manager 1608 performs the pixel-based processing (e.g., resizing, dynamic range adjustment, perspective correction, etc.). Some embodiments perform process 2100 during a video conference on images that are to be transmitted to another device participating in the video conference.

The process 2100 will now be described by reference to FIG. 16. The process starts by retrieving (at 2105) an image from the buffer 1606. In some embodiments, the retrieved image is an image of a video (i.e., an image in a sequence of images). This video may have been captured by a camera of a device on which the process 2100 is performed.

Figure 22:
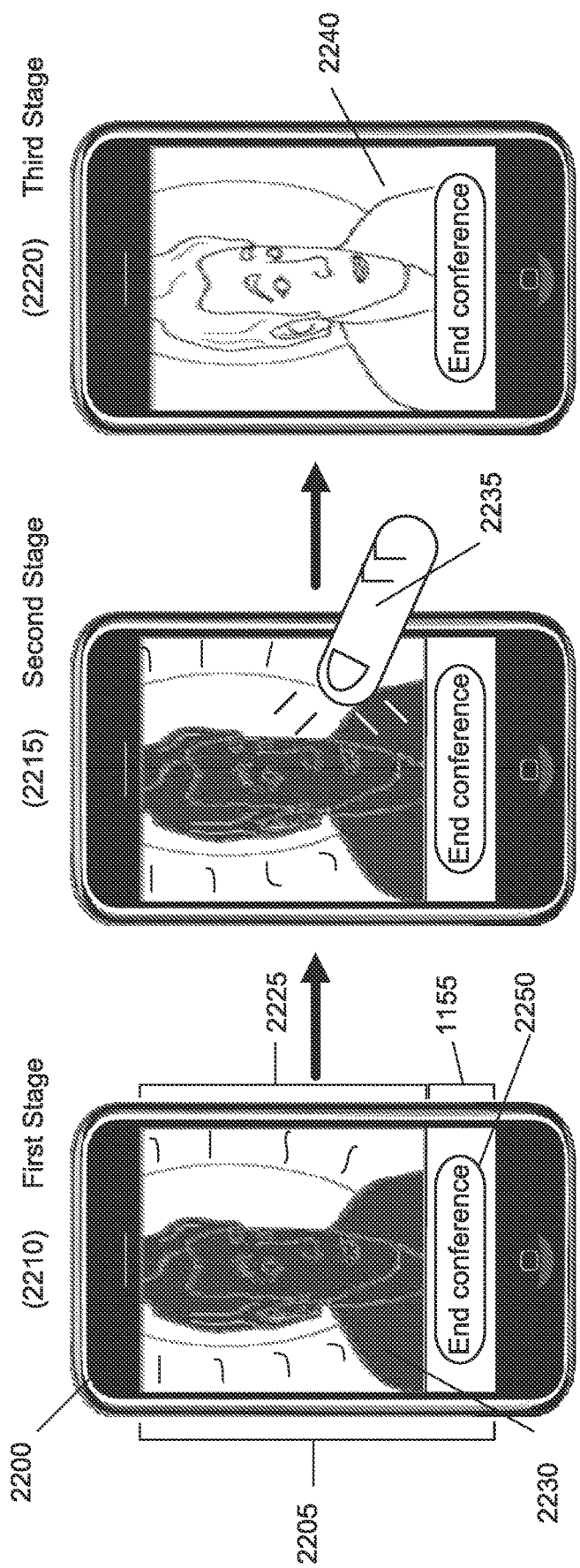
FIG. 22 illustrates a user interface of some embodiments for an exposure adjustment operation.

Next, the process 2100 performs (at 2110) exposure adjustment on the retrieved image. Some embodiments perform exposure adjustments through a user interface that is displayed on the dual camera mobile device. FIG. 22 illustrates an example exposure adjustment operation of such embodiments.

This figure illustrates the exposure adjustment operation by reference to three stages 2210, 2215, and 2220 of a UI 2205 of a device 2200. The first stage 2210 illustrates the UI 2205, which includes a display area 2225 and a display area 1155. As shown, the display area 2225 displays an image 2230 of a sun and a man with a dark face and body. The dark face and body indicates that the man is not properly exposed. The image 2230 could be a video image captured by a camera of the device 2200. As shown, the display area 1155 includes a selectable UI item 2250 for ending the video conference. In some embodiments, the layout of the display area 1155 is the same as the layout of the display area 1155 of FIG. 12, described above.

The second stage 2215 illustrates a user of the device 2200 initiating an exposure adjustment operation by selecting an area of the display area 2225. In this example, a selection is made by placing a finger 2235 anywhere within the display area 2225. In some embodiments, a user selects exposure adjustment from a menu of possible image setting adjustments.

The third stage 2220 shows an image 2240 of the man after the exposure adjustment operation is completed. As shown, the image 2240 is similar to the image 2230, but the man in the image 2240 is properly exposed. In some embodiments, the properly exposed image is an image that is captured after the improperly exposed image. The exposure adjustment operation initiated in the second stage 2215 adjusts the exposure of subsequent images captured by the camera of the device 2200.

Figure 23:
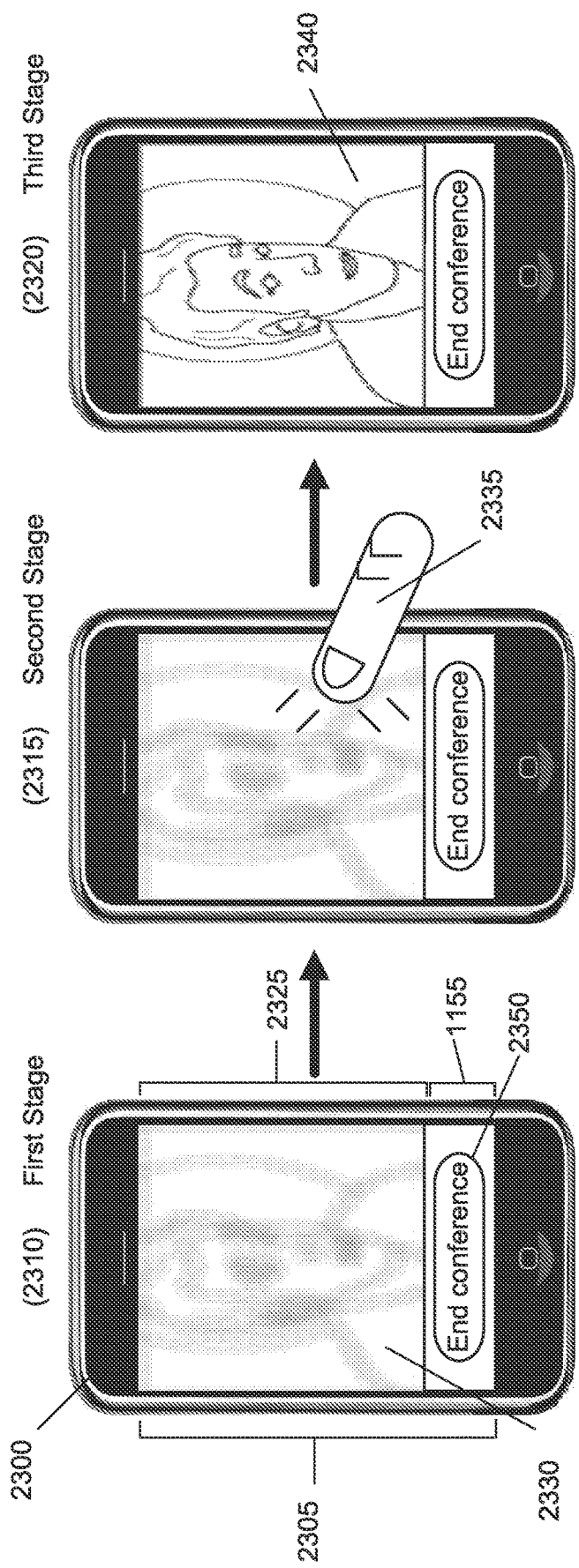
FIG. 23 illustrates a user interface of some embodiments for a focus adjustment operation.

Returning to FIG. 21, the process 2100 next performs (at 2115) focus adjustment on the image. Some embodiments perform focus adjustment through a user interface that is displayed on the dual camera mobile device. FIG. 23 conceptually illustrates an example of such focus adjustment operations.

FIG. 23 illustrates a focus adjustment operation by reference to three different stages 2310, 2315, and 2320 of a UI 2305 of a device 2300. The first stage 2310 illustrates the UI 2305 including a display area 2325 and a display area 1155. The display area 2325 presents a blurry image 2330 of a man captured by a camera of the device 2300. The blurriness indicates that the image 2330 of the man is out of focus. That is, the lens of the camera was not focused on the man when the image 2330 of the man was captured by the camera. Also, the image 2330 could be a video image captured by a camera of the device 2300. As shown, the display area 1155 includes a selectable UI item 2350 for ending the video conference. In some embodiments, the layout of the display area 1155 is the same as the layout of the display area 1155 of FIG. 12, described above.

The second stage 2315 illustrates a user of the device 2300 initiating a focus adjustment operation by selecting an area of the display area 2325. In this example, a selection is made by placing a finger 2335 anywhere within the display area 2325. In some embodiments, a user selects focus adjustment from a menu of possible image setting adjustments.

The third stage 2320 shows an image 2340 of the man after the focus adjustment operation is completed. As shown, the image 2340 is the same as the image 2330, but the man in the image 2340 appears sharper. This indicates that the lens of the camera is properly focused on the man. In some embodiments, the properly focused image is an image that is captured after the improperly focused image. The focus adjustment operation initiated in the second stage 2315 adjusts the focus of subsequent images captured by the camera of the device 2300.

Back to FIG. 21, the process 2100 performs (at 2120) image resizing on the image. Some embodiments perform image resizing on the image to reduce the number of bits used to encode the image (i.e., lower the bit rate). In some embodiments, the process 2100 performs image resizing as described below by reference to FIG. 26.

The process 2100 next performs (at 2125) perspective correction on the image. In some embodiments, the process 2100 performs perspective correction as described in FIG. 24 below. Such perspective correction involves using data taken by one or more accelerometer and/or gyroscope sensors that identifies orientation and movement of the dual camera mobile device. This data is then used to modify the image to correct for the perspective being off.

After perspective correction is performed on the image, the process 2100 adjusts (at 2130) the dynamic range of the image. In some embodiments, the dynamic range of an image is the range of possible values that each pixel in the image can have. For example, an image with a dynamic range of 0-255 can be adjusted to a range of 0-128 or any other range of values. Adjusting the dynamic range of an image can reduce the amount of bits that will be used to encode the image (i.e., lower the bit rate) and thereby smooth out the image.

Adjusting the dynamic range of an image can also be used for various other purposes. One purpose is to reduce image noise (e.g., the image was captured by a noisy camera sensor). To reduce noise, the dynamic range of the image can be adjusted so that the black levels are redefined to include lighter blacks (i.e., crush blacks). In this manner, the noise of the image is reduced. Another purpose of dynamic range adjustment is to adjust one or more colors or range of colors in order to enhance the image. For instance, some embodiments may assume that the image captured by the front camera is an image of a person's face. Accordingly, the dynamic range of the image can be adjusted to increase the red and pink colors to make the person's cheeks appear rosy/rosier. The dynamic range adjustment operation can be used for other purposes as well.

Finally, the process 2100 determines (at 2135) one or more rate controller parameters that are used to encode the image. Such rate controller parameters may include a quantization parameter and a frame type (e.g., predictive, bi-directional, intra-coded) in some embodiments. The process then ends.

While the various operations of process 2100 are illustrated as being performed in a specific order, one of ordinary skill will recognize that many of these operations (exposure adjustment, focus adjustment, perspective correction, etc.) can be performed in any order and are not dependent on one another. That is, the process of some embodiments could perform focus adjustment before exposure adjustment, or similar modifications to the process illustrated in FIG. 21.

1. Perspective Correction

As mentioned above, some embodiments perform perspective correction on an image before displaying or transmitting the image. In some cases, one or more of the cameras on a dual camera mobile device will not be oriented properly with its subject and the subject will appear distorted in an uncorrected image. Perspective correction may be used to process the images so that the images will closely reflect how the objects in the images appear in person.

Figure 24:
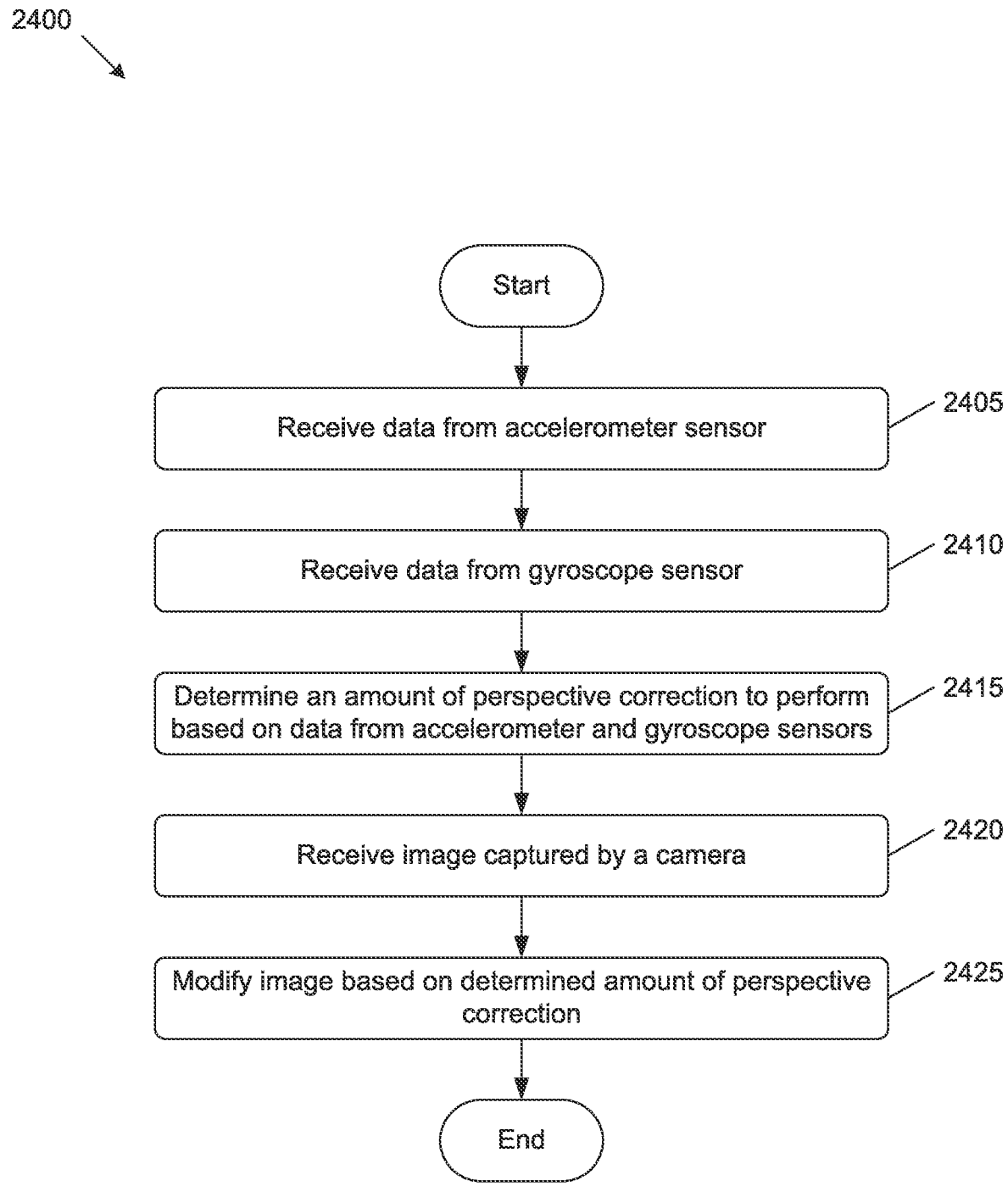
FIG. 24 conceptually illustrates a perspective correction process performed by an image processing manager of some embodiments such as that illustrated in FIG. 16.

FIG. 24 conceptually illustrates a perspective correction process 2400 performed by an image processing manager of some embodiments such as that illustrated in FIG. 16. The process 2400 of some embodiments is performed by the image processing layer 930 shown in FIG. 9 (which may contain an image processing manager 1608). Some embodiments perform the process 2400 at operation 2125 of process 2100, in order to correct the perspective of recently captured video images before displaying or transmitting the images.

The process 2400 starts by receiving (at 2405) data from an accelerometer sensor, which is a part of the dual camera mobile device in some embodiments. The accelerometer sensor of some embodiments measures the rate of change of the velocity of the device (i.e., the device's acceleration) along one or more axes. The process also receives (at 2410) data from a gyroscope sensor, which may also be a part of the dual camera mobile device in some embodiments. The gyroscope and accelerometer sensors of some embodiments can be used individually or in combination to identify the orientation of the dual camera mobile device.

Next, the process 2400 determines (at 2415) the amount of perspective correction to perform based on the data obtained from the accelerometer and gyroscope sensors. Generally, when the orientation is further off axis, more perspective correction will be required to produce an optimal image. Some embodiments calculate a warp parameter to represent the amount of perspective correction based on the orientation of the device.

After determining the amount of perspective correction to perform, the process 2400 receives (at 2420) an image captured by a camera of the dual camera mobile device. This process may be performed for each image in the video sequence captured by the camera. Some embodiments may perform separate calculations for images coming from each of the two cameras on the dual camera mobile device.

The process then modifies (at 2425) the image based on the determined amount of perspective correction. Some embodiments also use a baseline image or other information (e.g., a user-entered point about which the correction should be performed) in addition to the warp parameter or other representation of the amount of perspective correction. After modifying the image, process 2400 ends.

Figure 25:
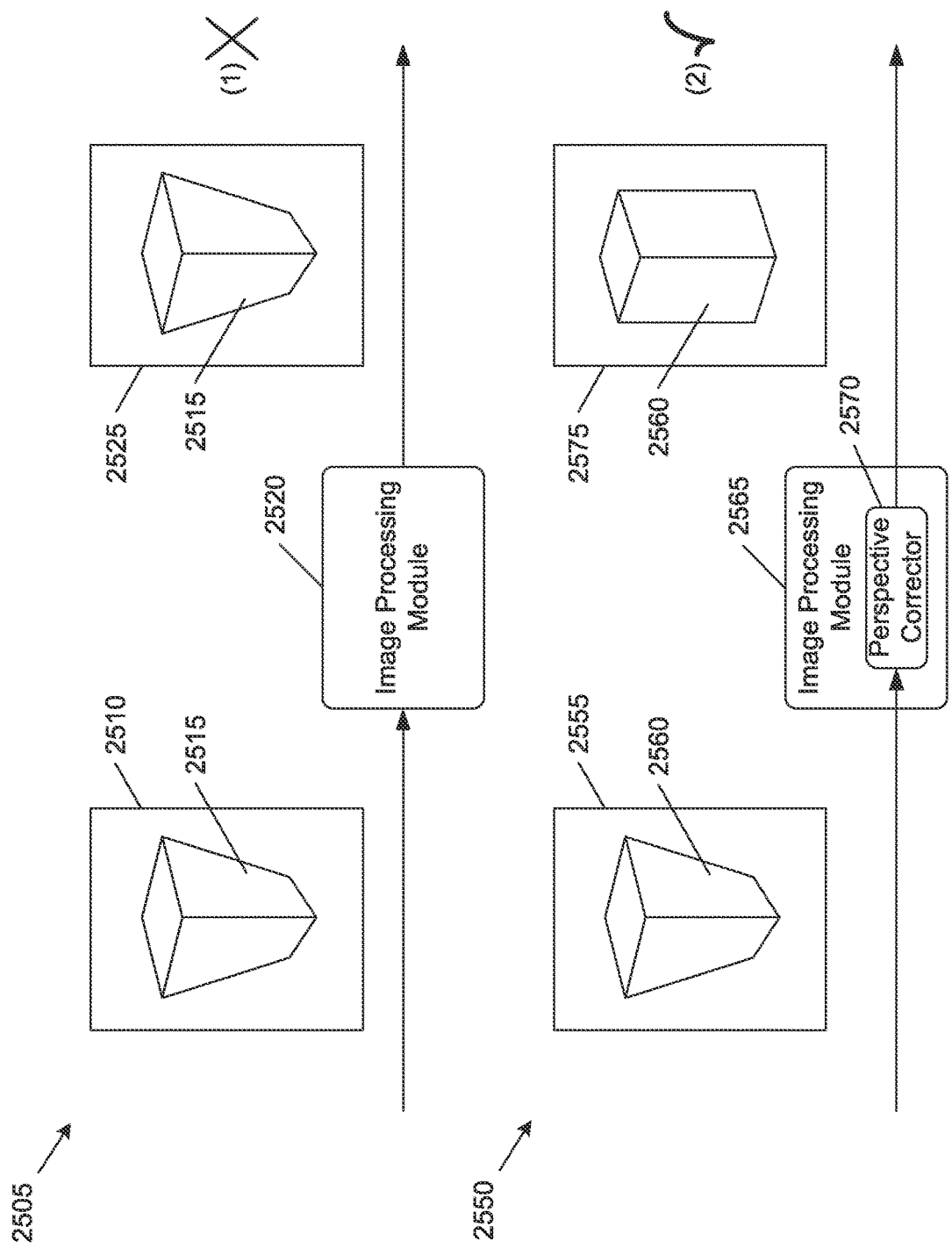
FIG. 25 conceptually illustrates example perspective correction operations of some embodiments.

FIG. 25 conceptually illustrates example image processing operations of some embodiments. This figure illustrates a first image processing operation 2505 performed by a first image processing module 2520 that does not use perspective correction and a second image processing operation 2550 performed by a second image processing module 2565 that uses perspective correction.

As shown, the first image processing operation 2505 is performed on a first image 2510 of a block 2515 from an aerial perspective looking downwards at an angle towards the block. From that perspective, the top of the block 2515 is closer than the bottom of the block. As such, the block 2515 appears to be leaning towards the camera that captured the first image 2510. FIG. 25 also shows the processed first image 2525 after processing by the first image processing module 2520. As shown, the block 2515 in the processed first image 2525 appears the same post-processing, as the first image processing module 2520 did not perform any perspective correction.

The second image processing operation 2550 is performed on a second image 2555 of a block 2560. The block 2560 is the same as the block 2515 in the first image 2510. FIG. 25 also shows a processed second image 2575 after processing of the second image 2555 by the perspective corrector 2570 of the second image processing module 2565. The perspective corrector 2570 may use process 2400 in order to correct the perspective of the second image 2555. Based on data from an accelerometer and gyroscope indicating that the camera that captured the second image 2555 is tilting at a downward angle (and possibly based on other data), the perspective corrector 2570 is able to correct the second image so that the block appears to be viewed straight-on in the processed second image 2575.

2. Resizing and Bit Stream Manipulation

Among the functions described above by reference to FIG. 21 that are performed by the image processing layer 930 of some embodiments are image resizing and bitstream manipulation. Image resizing (performed at operation 2130) involves scaling up or down an image in some embodiments (i.e., modifying the number of pixels used to represent the image). In some embodiments, the bitstream manipulation involves inserting data into the bitstream that indicates the size of the image after resizing. This resizing and bitstream manipulation is performed by an encoder driver (e.g., driver 1635) in some embodiments.

Figure 26:
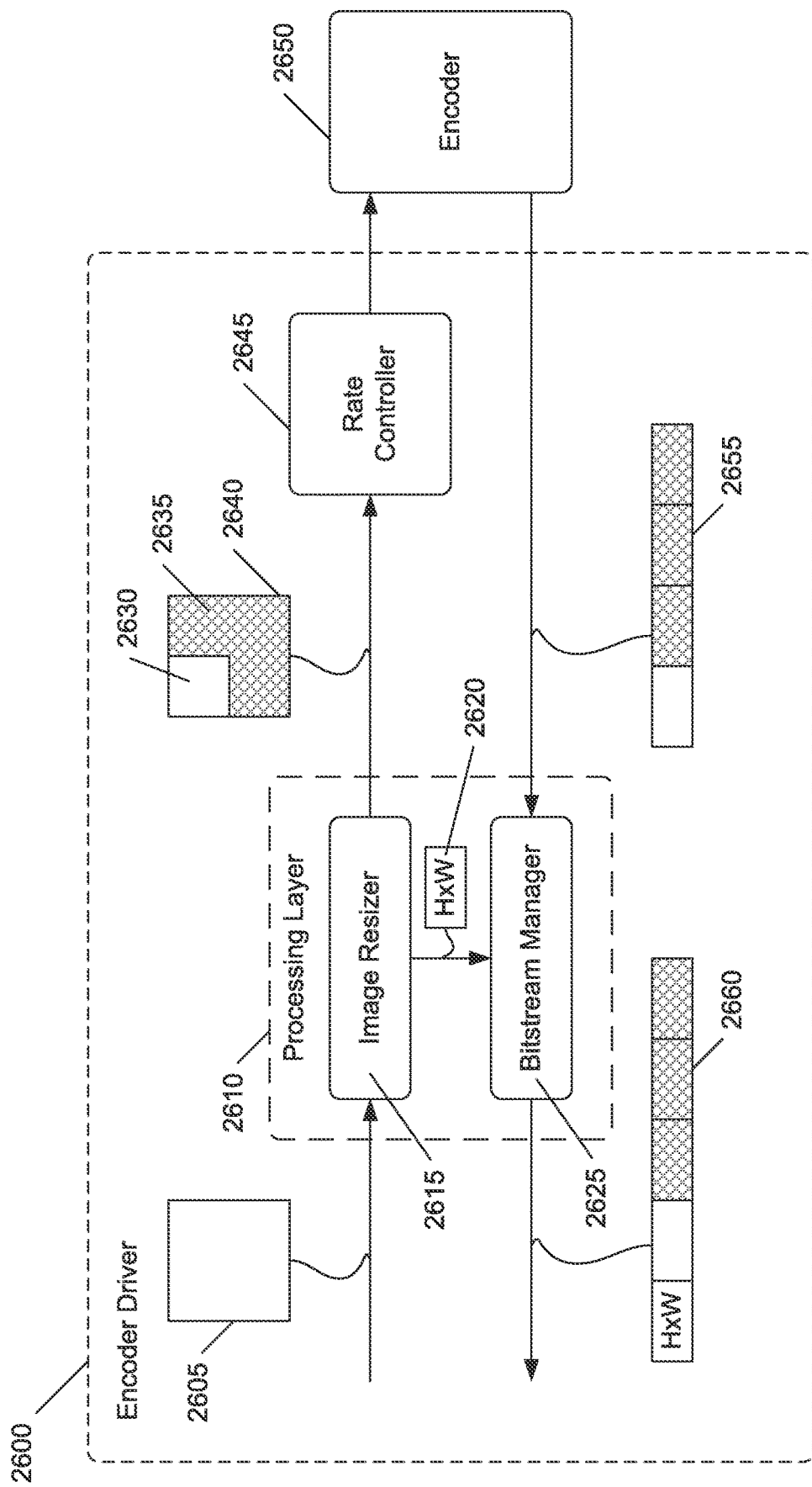
FIG. 26 conceptually illustrates a software architecture for an encoder driver of some embodiments such as that illustrated in FIG. 16.

FIG. 26 conceptually illustrates a software architecture for such an encoder driver 2600 of some embodiments and shows an example resizing and bitstream manipulation operations performed by the encoder driver 2600 on an example image 2605. In some embodiments, the image 2605 is an image of a video captured by a camera of the dual camera mobile device for transmission to another device(s) in a video conference. Referring to FIG. 16, in some embodiments the video image will have traveled from the CIPU 1650 through the CIPU driver 1630 and camera source module 1622 to buffer 1606, from which it is retrieved by image processing manager 1608. After undergoing image processing (e.g., focus adjustment, exposure adjustment, perspective correction) in the image processing manager 1608, the image is sent through buffer 1610 and video compressor module 1624 to the encoder driver 1635.

Figure 30:
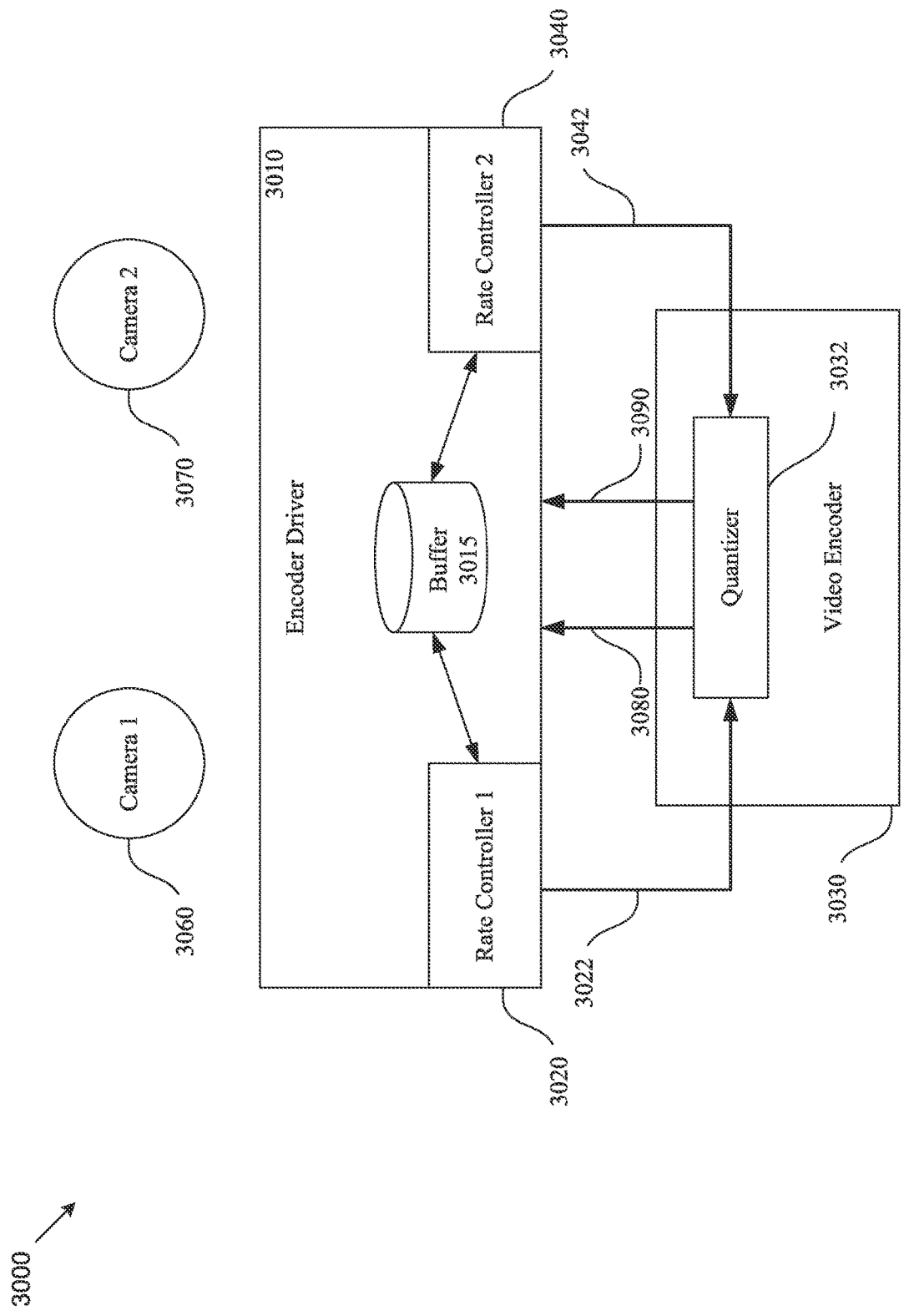
FIG. 30 illustrates an encoder driver of some embodiments that includes two rate controllers.

As shown, the encoder driver 2600 includes a processing layer 2610 and a rate controller 2645. Examples of the rate controller of some embodiments are illustrated in FIG. 30, described below. The processing layer 2610 includes an image resizer 2615 and a bitstream manager 2625. In some embodiments, these modules perform various operations on images both before and after the images are encoded. While in this example the image resizer is shown as part of the processing layer 2610 of the encoder driver 2600, some embodiments implement the image resizer as part of the image processing manager 1608 rather than the encoder driver 2600 (i.e., the image resizing is done before sending the image and the size data to the encoder driver).

As shown, the image resizer 2615 resizes the images before the images are sent to the encoder 2650 through the rate controller 2645. The image 2605 is sent through resizer 2615 and scaled down into image 2630. In addition to scaling down an image, some embodiments can also scale up an image.

As shown in FIG. 26, some embodiments scale down the incoming image (e.g., image 2605) and then superimpose the scaled down image (e.g., image 2630) onto a spatially redundant image (e.g., image 2635) that is the same size (in pixels) as the incoming image (i.e., the number of rows and columns of pixels of the image 2605 are the same as the number of rows and columns of pixels of the spatially redundant image 2635). Some embodiments superimpose the scaled down image 2630 into the upper left corner of the spatially redundant image (as shown, to produce composite image 2640), while other embodiments superimpose the scaled down image into a different section of the spatially redundant image (e.g., the center, upper right, upper center, lower center, lower right, etc.).

In some embodiments, a spatially redundant image is an image that is substantially all one color (e.g., black, blue, red, white, etc.) or has a repetitive pattern (e.g., checkers, stripes, etc.). For instance, the spatially redundant image 2635 shown in FIG. 26 has a repetitive crisscross pattern. The spatially redundant portion of the composite image 2640 can be easily compressed by the encoder into a small amount of data due to the repetitive nature. Furthermore, if a sequence of images are all scaled down and the spatially redundant image used is the same for each image in the sequence, then temporal compression can be used to even further reduce the amount of data needed to represent the encoded image.

Some embodiments of the image resizer 2615 also generate size data 2620 that indicates the size of the resized image (e.g., the size of the scaled down image 2630) and send this generated size data 2620 to the bitstream manager 2625. The size data 2620 of some embodiments indicates the size of the resized image 2630 in terms of the number of rows of pixels and the number of columns of pixels (i.e., height and width) of the resized image 2630. In some embodiments, the size data 2620 also indicates the location of the resized image 2630 in the composite image 2640.

After the image is resized, the composite image 2640 is sent through the rate controller 2645 to the encoder 2650. The rate controller 2645, as described in further detail below, controls the bit rate (i.e., the data size) of the images output by the encoder 2650 in some embodiments. The encoder 2650 of some embodiments compresses and encodes the image. The encoder 2650 may use H.264 encoding or another encoding method.

The bitstream manager 2625 of some embodiments receives a bitstream of one or more encoded images from the encoder 2650 and inserts size data into the bitstream. For instance, in some embodiments, the bitstream manager 2625 receives the size data 2620 from the image resizer 2615 and inserts the size data 2620 into a bitstream 2655 of the encoded composite image 2640 that is received from the encoder 2650. The output of the bitstream manager 2625 in this case is a modified bitstream 2660 that includes the size data 2620. Different embodiments insert the size data 2620 in different positions of the bitstream 2655. For example, the bitstream 2660 shows the size data 2620 inserted at the beginning of the bitstream 2660. However, other embodiments insert the size data 2620 at the end of the bitstream 2655, in the middle of the bitstream 2655, or any other position within the bitstream 2655.

In some embodiments, the bitstream 2655 is a bitstream of a sequence of one or more encoded images that includes the composite image 2640. In some of such embodiments, the images in the sequence are all resized to the same size and the size data 2620 indicates the size of those resized images. After the images are transmitted to a device on the other end of the video conference, the receiving device can extract the size information from the bitstream and use the size information to properly decode the received images.

Figure 27:
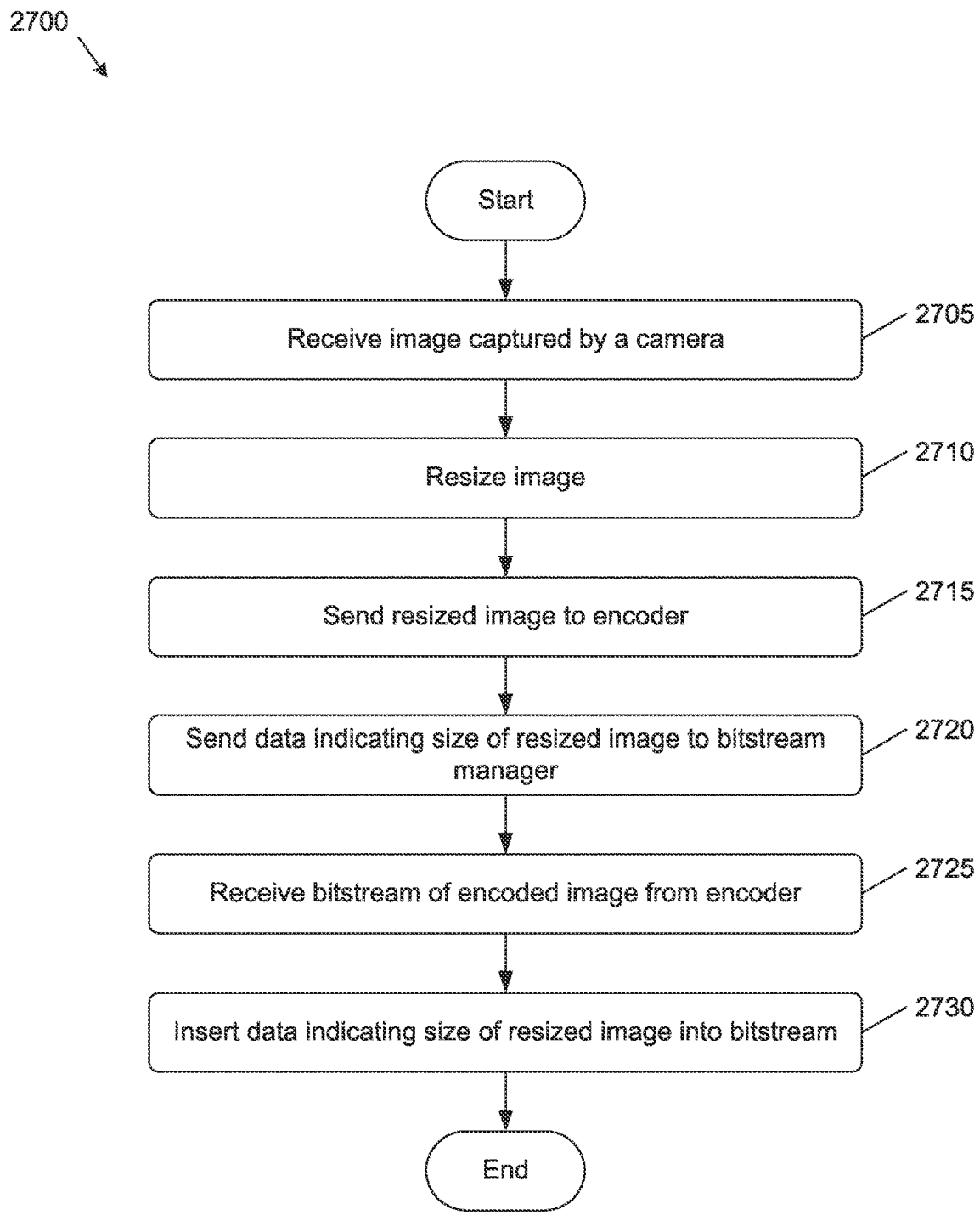
FIG. 27 conceptually illustrates an image resizing process performed by an encoder driver of some embodiments such as that illustrated in FIG. 26.

FIG. 27 conceptually illustrates an image resizing process 2700 performed by an encoder driver of a dual camera mobile device, such as driver 2600. The process 2700 begins by receiving (at 2705) an image (e.g., image 2605) captured by a camera of the dual camera mobile device. When the dual camera device is capturing images with both cameras, some embodiments perform process 2700 on images from both cameras.

Next, the process 2700 resizes (at 2710) the received image. As noted above, different embodiments resize the image 2605 differently. For instance, the image 2605 in FIG. 26 is scaled down and superimposed onto the spatially redundant image 2635 to produce the composite image 2640.

The process 2700 then sends (at 2715) the resized image (e.g., the composite image 2640, which includes the resized image 2630) to the encoder 2650 for encoding. Some embodiments of the process 2700 send the resized image 2630 (included in the composite image 2640) to the encoder 2650 through a rate controller that determines a bit rate for the encoder to encode the image. The encoder 2650 of some embodiments compresses and encodes the image (e.g., using discrete cosine transform, quantization, entropy encoding, etc.) and returns a bitstream with the encoded image to the encoder driver 2600.

Next, the process 2700 sends (at 2720) the data indicating the size of the resized image (e.g., the size data 2620) to a bitstream manager. As shown in FIG. 26, this operation is performed within the encoder driver 2600 in some embodiments (i.e., one module in the encoder driver 2600 sends the size data to another module in the encoder driver 2600).

After the resized image is encoded by the encoder 2650, the process 2700 receives (at 2725) the bitstream from the encoder. As shown, some embodiments receive the bitstream at the bitstream manager, which also has received size data. The received bitstream includes the encoded composite image and may also include one or more additional images in a video sequence.

The process 2700 then inserts (at 2730) the data indicating the size of the resized image (e.g., the size data 2620) into the bitstream, and ends. As shown in FIG. 26, this operation is also performed by the bitstream manager in some embodiments. As mentioned above, different embodiments insert the size data into different parts of the bitstream. In the illustrated example, the size data 2620 is inserted at the beginning of the bitstream 2655 as shown in the resulting bitstream 2660. This bitstream can now be transmitted to another device that is participating in the video conference, where it can be decoded and viewed.

Figure 28:
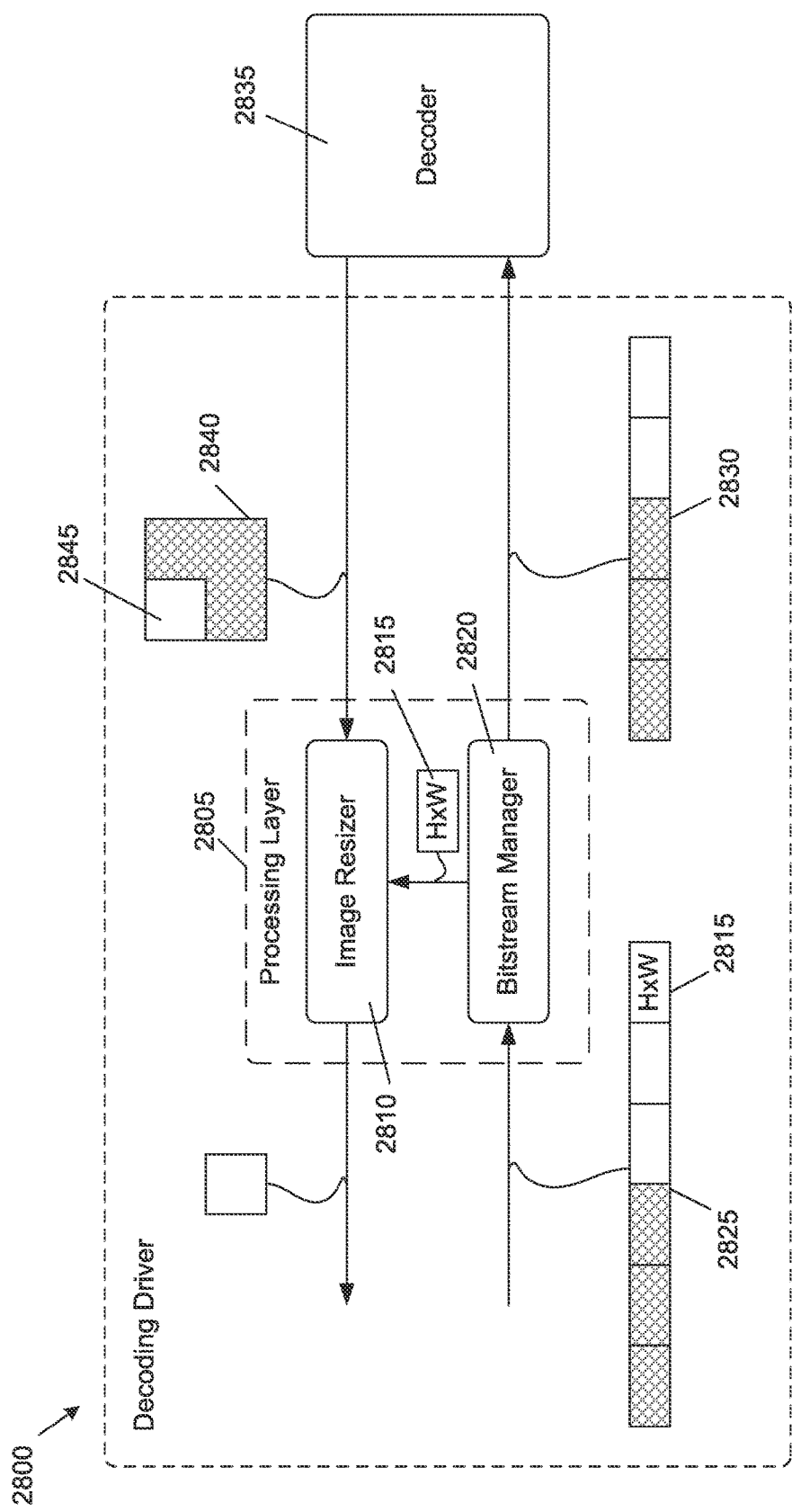
FIG. 28 conceptually illustrates a software architecture for a decoder driver of some embodiments such as that illustrated in FIG. 16.

In some embodiments, the decoder driver (e.g., driver 1640) performs the opposite functions of the encoder driver. That is, the decoder driver extracts size data from a received bitstream, passes the bitstream to a decoder, and resizes a decoded image using the size data. FIG. 28 conceptually illustrates a software architecture for such a decoder driver 2800 of some embodiments and shows example bitstream manipulation and resizing operations performed by the decoder driver 2800 on an example bitstream 2825.

In some embodiments, the bitstream 2825 is a bitstream that includes an encoded image of a video captured by a camera of a device in a video conference (e.g., a bitstream from an encoder driver such as driver 2600) and transmitted to the device on which the decoder driver 2800 operates. Referring to FIG. 16, in some embodiments the bitstream will have been received by the networking manager 1614 and sent to buffer 1616, from which it is retrieved by the video decompressor module 1626 and sent to the decoder driver 1640.

As shown, the decoder driver 2800 includes a processing layer 2805. The processing layer 2805 includes an image resizer 2810 and a bitstream manager 2820. In some embodiments, these modules 2810 and 2820 perform various operations on received images both before and after the images are decoded. While in this example the image resizer 2810 is shown as part of the processing layer 2805 of the decoder driver 2800, some embodiments implement the image resizer as part of the image processing manager 1608 rather than the decoder driver (i.e., the image resizing is done after sending the image from the decoder driver 2800).

As shown, the bitstream manager 2820 of some embodiments receives a bitstream of one or more encoded images (i.e., images in a video sequence) and extracts size data from the bitstream before sending the bitstream to the decoder 2835 for decoding. For example, as illustrated in FIG. 28, the bitstream manager 2820 receives a bitstream 2825 of an encoded image, extracts a size data 2815 from the bitstream 2825, and sends the resulting bitstream 2830 (without the size data 2815) to the decoder 2835 for decoding. As shown, the bitstream manager 2820 sends the extracted size data 2815 to the image resizer 2810 in some embodiments.

The size data 2815 of some embodiments is the same as the size data 2620 inserted into the bitstream by the encoder driver 2600. As described above in the description of FIG. 26, the size data 2815 of some embodiments indicates the size of a sub-image 2845 in terms of the number of rows of pixels and the number of columns of pixels of the sub-image 2845. The size data 2815 may also indicate the location of the sub-image 2845 within the larger spatially redundant image 2840. In this example, the bitstream 2825 shows the size data 2815 inserted at the beginning of the bitstream 2825. However, as noted above, different embodiments insert the size data 2815 in different positions of the bitstream 2825.

The image resizer 2810 of some embodiments extracts sub-images from images using size data received from the bitstream manager 2820. For instance, FIG. 28 illustrates the image resizer 2810 receiving an image 2840 that includes a sub-image 2845 from the decoder 2835. As shown, the image resizer 2810 of some embodiments extracts the sub-image 2845 from the image 2840. This extracted image can then be displayed on the dual camera mobile device.

Figure 29:
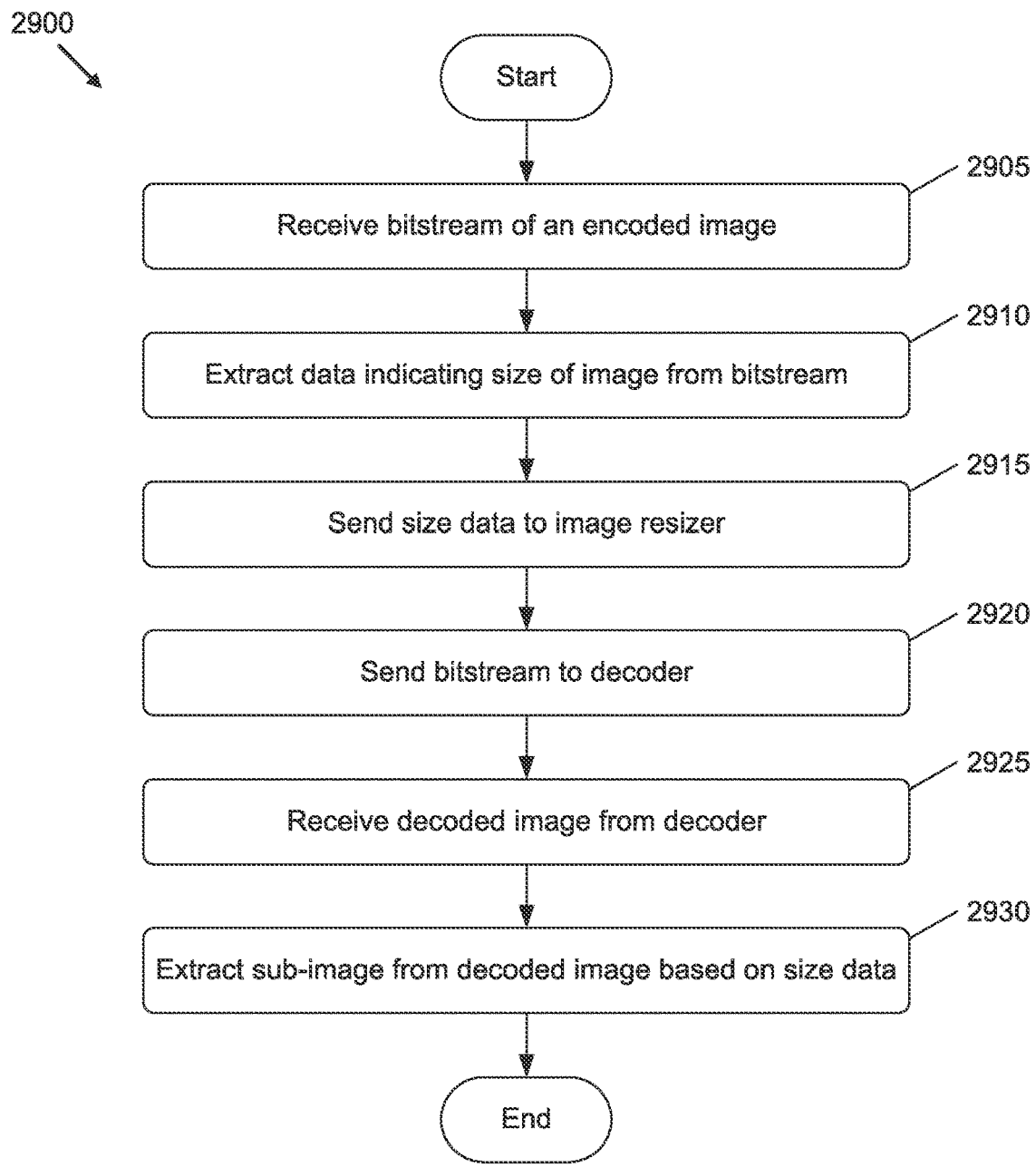
FIG. 29 conceptually illustrates an image extraction process performed by a decoder driver of some embodiments such as that illustrated in FIG. 28.

FIG. 29 conceptually illustrates an image extraction process 2900 of some embodiments performed by a decoder driver of a device participating in a video conference, such as driver 2800. The process begins by receiving (at 2905) a bitstream (e.g., bitstream 2825) of an encoded image. The bitstream may be sent from a device participating in a video conference with the device on which the decoder driver is operating or may be stored in a storage of the device. When the device is receiving images from multiple sources, some embodiments perform process 2900 on images from each source.

Next, the process 2900 extracts (at 2910) size data from the bitstream. As noted above, this size data may be found in different locations in the bitstream. Some embodiments know where to look for the size data, while other embodiments look for a particular signature that indicates where in the received bitstream the size data is located. In some embodiments, the size data indicates the size (e.g., the number of pixels in each row and number of pixels in each column) and the location of a sub-image in the encoded image.

The process 2900 then sends (at 2915) the extracted size data to an image resizer. As shown in FIG. 28, this operation is performed within the decoder driver in some embodiments (i.e., one module in the decoder driver sends the size data to another module in the decoder driver).

The process 2900 also sends (at 2920) the bitstream to the decoder for decoding. The decoder, in some embodiments decompresses and decodes the bitstream (e.g., using inverse discrete cosine transform, inverse quantization, etc.) and returns a reconstructed image to the decoder driver.

After the bitstream is decoded by the decoder, the process 2900 receives (at 2925) the decoded image from the decoder. As shown, some embodiments receive the image at the image resizer, which also has received size data from the bitstream manager. The process then extracts (at 2930) a sub-image from the decoded image using the received size data. As shown, the sub-image 2845 is extracted from the upper left of decoded image 2840, as indicated in size data 2815. This extracted sub-image can now be displayed on a display device (e.g., a screen of the dual camera mobile device).

3. Rate Controllers

In some embodiments, the two cameras of the device have different sets of characteristics. For example, in some embodiments, the front camera is a lower resolution camera optimized for the capture of motion video images while the back camera is a higher resolution camera optimized for the capture of still images. For reasons such as cost, functionality, and/or geometry of the device, other embodiments may use different combinations of cameras of different characteristics.

Cameras with different characteristics can introduce different artifacts. For example, higher resolution cameras may reveal more noise than lower resolution cameras. Images captured by higher resolution cameras may exhibit higher levels of spatial or temporal complexities than images captured by lower resolution cameras. Also, different cameras with different optical properties may introduce different gamma values to the captured images. Different light sensing mechanisms used by different cameras to capture images may also introduce different artifacts.

Some of these camera-specific artifacts conceal artifacts generated from other sources. For example, in an image captured by a high resolution camera with a high level of noise, artifacts that are the byproduct of the video encoding process become less visible. When encoding noise (such as quantization distortion) to hide behind camera-specific artifacts, the video encoding process can use larger quantization step sizes to achieve lower bit rates. On the other hand, when a camera introduces less artifacts (such as in the case of a lower resolution camera), the video encoding process can use finer quantization step sizes in order to avoid unacceptable levels of visual distortion due to quantization. Thus, a video encoding process that is optimized to take advantage of or to compensate for these camera-specific characteristics can accomplish better rate-distortion trade-off than the video encoding process that is oblivious to these camera-specific characteristics.

In order to utilize these camera-specific characteristics for performing rate-distortion trade-offs, some embodiments implement two video encoding processes, each process optimized to each of the two cameras. FIG. 30 illustrates an example of a system with two video encoding processes for two cameras 3060 and 3070. As shown in FIG. 30, the system 3000 includes encoder driver 3010, rate controllers 3020 and 3040, and a video encoder 3030. The encoder 3030 encodes video images captured from video cameras 3060 and 3070 into bitstreams 3080 and 3090.

In some embodiments, the video encoder driver 3010 is a software module running on one or more processing units. It provides an interface between the video encoder 3030 and other components of the system, such as video cameras, image processing modules, network management modules and storage buffers. The encoder driver 3010 controls the flow of captured video image from the cameras and the image processing modules to the video encoder 3030, and it also provides the conduit for the encoded bitstreams 3080 and 3090 to storage buffers and network management modules.

As shown in FIG. 30, the encoder driver 3010 includes two different instances 3020 and 3040 of rate controllers. These multiple instances can be two different rate controllers for the two different cameras, or one rate controller that is configured in two different manners for two different cameras. Specifically, in some embodiments, the two rate controllers 3020 and 3040 represent two separate rate controllers. Alternatively, in other embodiments, the two rate controllers 3020 and 3040 are two different configurations of a single rate controller.

FIG. 30 also shows the encoder driver 3010 to include a state buffer 3015 that stores encoding state information for the rate controlling operations to use during a video conference. Specifically, in some embodiments, the two different rate controllers, or the two different configurations of the same rate controller, share during a video conference the same encoding state information that is stored in the state buffer 3015. Such sharing of state information allows uniform rate controller operations in dual video capture video conferences. This sharing also allows optimal video encoding during a switch camera operation in a single video capture video conference (i.e., allows the rate controlling operation for the encoding of video captured by the current camera to use encoding state information that was maintained by the rate controlling operation for the encoding of the video captured by the previous camera). FIG. 30 shows the state buffer 3015 as being part of the encoder driver 3010, but other embodiments implement the state buffer 3015 outside the encoder driver 3010.

In the state buffer 3015, different embodiments store different types of data (e.g., different types of encoding parameters) to represent the encoding state information. One example of such encoding state information is the current target bit rate for the video conference. One manner for identifying the target bit rate is described above in Section III.B. Other examples of such encoding state information include buffer fullness, maximum buffer fullness, bit rates of one or more recently encoded frames, among other encoding state information.

A rate controller can then use the target bit rate (or another encoding state parameter stored in the state buffer) to calculate one or more parameters used in its rate controlling operation. For instance, as further described below, a rate controller of some embodiments uses the current target bit to calculate a quantization parameter QP for a macroblock or a frame. By way of example, some embodiments use the current target bit rate to compute a quantization adjustment parameter from which they derive the quantization parameter QP for the macroblock and/or the frame. Accordingly, during a camera switch operation in a video conference, sharing the target bit rate between the two rate controlling operations (of two rate controllers or of two different configurations of one rate controller) allows the rate controlling operation for encoding the video captured by the current camera to get the benefit of the encoding state data from the previous rate controlling operation for encoding the video captured by the previous camera.

FIG. 30 illustrates the encoder driver 3010 to include the two different rate-controller instances 3020 and 3040. However, in other embodiments, these rate controller instances 3020 and 3040 are built into video encoder 3030. The video encoder 3030 encodes video images captured by the cameras 3060 and 3070 into digital bitstreams 3080 and 3090. In some embodiments, the video encoder produces bitstreams that are compliant with conventional video coding standards (e.g., H.264 MPEG-4). In some of these embodiments, the video encoder performs encoding operations that include motion estimation, discrete cosine transform ("DCT"), quantization, and entropy encoding. The video encoder also performs decoding operations that are the inverse functions of the encoding operations.

In some embodiments, the encoder 3030 includes a quantizer module 3032 for performing quantization. The quantizer module is controlled by a quantization parameter 3022 or 3042 from a rate controller 3020 or 3040. In some embodiments, each quantization parameter is set by a corresponding rate controller and is a function of one or more attributes of the camera associated with the rate controller, as further described below. The rate controller can reduce the number of bits used for encoding by setting coarser quantization step sizes or increase the number of bits used by setting finer quantization step sizes. By controlling the quantization step size, the rate controller also determines how much distortion is introduced into the encoded video image. Thus the rate controller can perform trade-offs between bit rate and image quality. In performing the rate-distortion trade off, the rate controller monitors bit rate in order not to overflow memory buffers, underflow memory buffers, or exceed the transmission channel capacity. The rate controller must also control bit rate in order to provide the best possible image quality and to avoid unacceptable distortion of image quality due to quantization. In some embodiments, each rate controller stores the monitored data in terms of a set of state data values in the state buffer 3015. In some embodiments, the rate controllers 3020 and 3040 uses camera-specific attributes to optimize rate-distortion trade off.

In some embodiments, each rate controller optimizes rate-distortion trade off by directly applying a modification factor to its quantization parameter. In some of these embodiments, the modification factors are pre-determined and built into the device along with the camera; the device does not need to dynamically compute these modification factors. In other embodiments, the system uses the incoming image captured by the camera to dynamically determine the appropriate modification factor specific to the camera. In some of these embodiments, the system analyzes a sequence of incoming video images captured by the camera in multiple encoding passes in order to collect certain statistics about the camera. The system then uses these statistics to derive modification factors to the quantization parameter that is optimized for the camera.

In some embodiments, these camera-specific modification factors are applied to the quantization parameter via visual masking attributes of the video images. Visual masking attribute of an image or a portion of the image is an indication of how much coding artifacts can be tolerated in the image or image portion. Some embodiments compute a visual masking attribute that quantifies the brightness energy of the image or the image portion while other embodiments compute a visual masking attribute that quantifies the activity energy or complexity of the image or the image portion. Regardless of how a visual masking attribute is calculated, some embodiments use visual masking attributes to calculate a modified or masked quantization parameter for a video frame. Some of these embodiments calculate the masked quantization parameter as a function of a frame level visual masking attribute $\varphi_{frame}$ and a reference visual masking attribute $\varphi_R$. In some embodiments, the quantization parameter modified by visual masking attributes $\varphi_{frame}$ and $\varphi_R$ is expressed as:

$$MQP_{frame}=QP_{nom}+\beta_{frame}*(\varphi_{frame}-\varphi_R)/\varphi_R \quad (1)$$

where $MQP_{frame}$ is masked or modified quantization parameter for the frame, $QP_{nom}$ is an initial or nominal quantization value, and $\beta_{frame}$ is a constant adapted to local statistics. In some embodiments, the reference visual masking attribute $\varphi_R$ and nominal quantization parameter $QP_{nom}$ are pre-determined from an initial or periodic assessment of network conditions.

In some embodiments, the visual masking attribute $\varphi_{frame}$ in equation (1) is calculated as $$\varphi_{frame}=C\cdot(E\cdot\text{avgFrameLuma})^\beta\cdot(D\cdot\text{avgFrameSAD})^\alpha \quad (2)$$

where avgFrameLuma is the average luminance value of the frame and avgFrameSAD is the average sum of absolute difference of the frame. Constants $\alpha$, $\beta$, C, D, and E are adapted to local statistics. These constants are adapted to camera specific characteristics in some embodiments.

Some embodiments also calculate a masked quantization parameter for a portion of a video image such as a macroblock. In those instances, the masked quantization parameter is calculated as a function of the macroblock visual masking attribute $\varphi_{MB}$:

$$MQP_{MB}=MQP_{frame}+\beta_{MB}*(\varphi_{MB}-\varphi_{frame})/\varphi_{frame} \quad (3)$$

where $\beta_{MB}$ is a constant adapted to local statistics, and $MQP_{frame}$ is calculated using equations (1) and (2) in some embodiments. In some embodiments, the visual masking attribute $\varphi_{MB}$ in equation (3) is calculated as $$\varphi_{MB}=A\cdot(C\cdot\text{avgMBLuma})^\beta\cdot(B\cdot\text{MBSAD})^\alpha \quad (4)$$

where avgMBLuma is the average luminance value of the macroblock and avgMBSAD is the average sum of absolute difference of the macroblock. Constants $\alpha$, $\beta$, A, B and C are adapted to local statistics. These constants are adapted to camera specific characteristics in some embodiments.

Rather than using multiple camera-specific constants to compute the modified quantization parameters as discussed above, some embodiments perform camera-specific rate control by computing quantization parameters using only a single camera-specific coefficient. For example, given visual masking attributes $\varphi_{frame}$ and $\varphi_{MB}$ and quantization parameter $QP_{frame}$, some embodiments use a single camera-specific coefficient $\mu$ to calculate the quantization parameter of a macroblock as:

$$QP_{MB}=\mu \cdot (\varphi_{frame}-\varphi_{MB})+QP_{frame} \qquad (5)$$

To compute equation (5), some embodiments use complexity measures of the frame and of the macroblock as visual masking attributes $\varphi_{frame}$ and $\varphi_{MB}$, respectively.

Some embodiments apply a different camera specific coefficient in the calculation of $QP_{MB}$. For example, in some embodiments, $QP_{MB}$ is calculated as $$QP_{MB}=\rho \cdot (1-\varphi_{MB}/\varphi_{frame}) \cdot QP_{frame}+QP_{frame} \qquad (6)$$

where $\rho$ is a coefficient tuned to camera-specific characteristics.

As mentioned above, the state buffer 3015 stores encoding state information that the two different rate controller instances 3020 and 3040 can share during a video conference in order to obtain better encoding results from their rate controlling operations. Target bit rate $R_T$ is one example of such shared state information in some embodiments. This rate is a desired bit rate for encoding a sequence of frames. Typically, this bit rate is expressed in units of bits/second, and is determined based on processes like those described above in Section III.B.

As described above, a rate controller of some embodiments uses the target bit rate to calculate the frame and/or macroblock quantization parameter(s) QP that it outputs to the video encoder 3030. For example, some embodiments use the current target bit rate to compute a quantization adjustment parameter from which they derive the quantization parameter QP for the macroblock and/or the frame. In some embodiments, the quantization adjustment parameter is expressed in terms of a fraction that is computed by dividing either the previous frame's bit rate or a running average of the previous frames' bit rate, with the current target bit rate. In other embodiments, this adjustment parameter is not exactly computed in this manner, but rather is more generally (1) proportional to either the previous frame's bit rate or a running average of the previous frames' bit rate, and (2) inversely proportional to the current target bit rate.

After computing such a quantization adjustment parameter, the rate controller of some embodiments uses this parameter to adjust the macroblock and/or frame quantization parameter(s) that it computes. One manner of making such an adjustment is to multiply the computed macroblock and/or frame quantization parameter(s) by the quantization adjustment parameter. Another manner of making this adjustment is to compute an offset quantization parameter value from the quantization adjustment parameter and then apply (e.g., subtract) this offset parameter to the computed macroblock and/or frame quantization parameter(s). The rate controller of these embodiments then outputs the adjusted macroblock and/or frame quantization parameter(s) to the video encoder 3030.

In other embodiments, the rate controller uses the target bit rate to calculate other parameters that are used in its rate controlling operation. For instance, in some embodiments, the rate controller uses this bit rate to modify the visual masking strength for a macroblock or a frame.

G. Networking Manager

Figure 31:
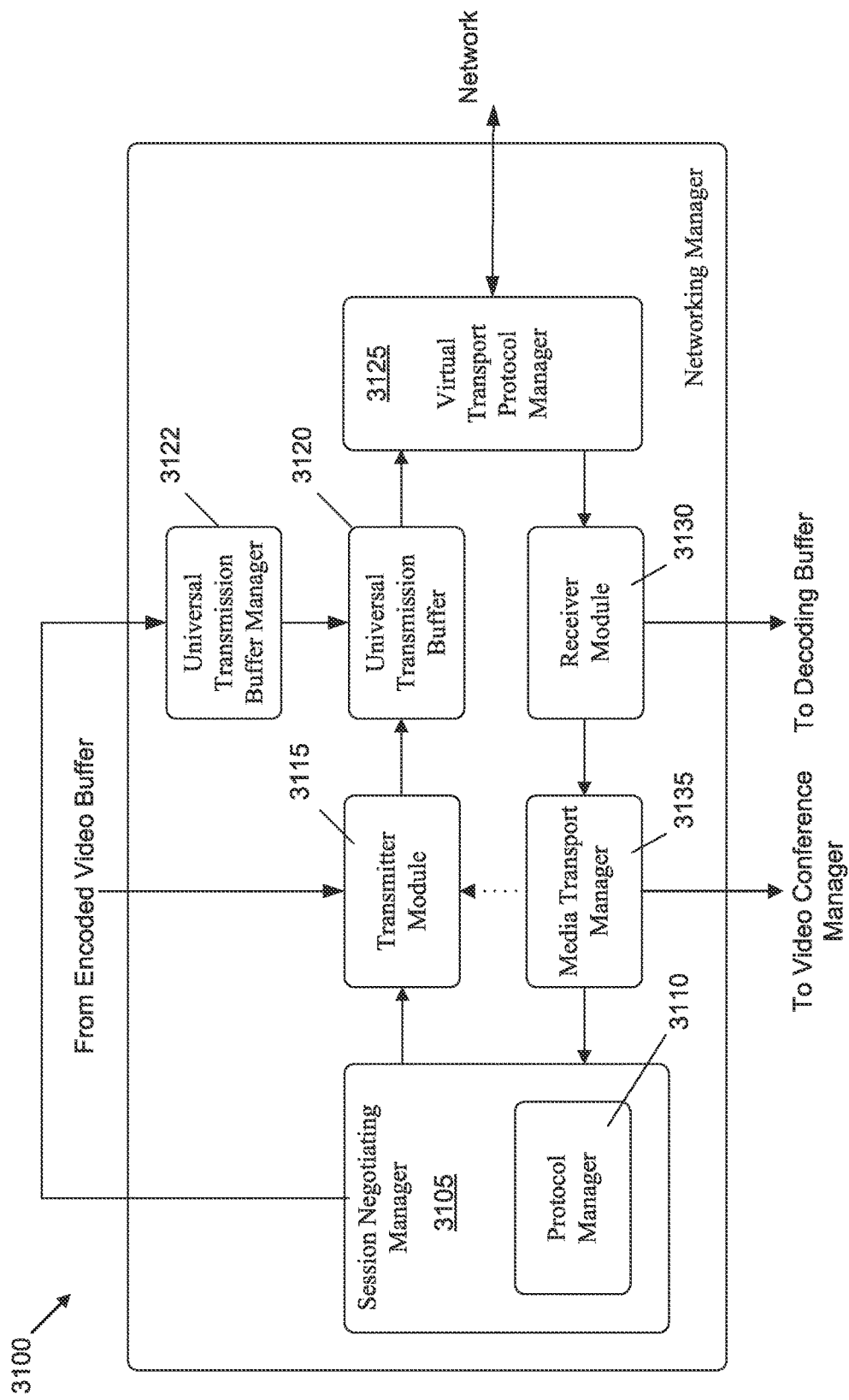
FIG. 31 conceptually illustrates a software architecture for a networking manager of some embodiments such as that illustrated in FIG. 16.

FIG. 31 conceptually illustrates the software architecture of a networking manager 3100 of some embodiments such as the networking manager 1614 illustrated in FIG. 16. As described above, the networking manager 3100 manages network connections (e.g., connection establishment, connection monitoring, connection adjustments, connection tear down, etc.) between a dual camera mobile device on which it operates and a remote device in a video conference. During the video conference, the networking manager 3100 of some embodiments also processes data for transmission to the remote device and processes data received from the remote device.

As shown in FIG. 31, the networking manager 3100 includes a session negotiating manager 3105, a transmitter module 3115, a universal transmission buffer 3120, a universal transmission buffer manager 3122, a virtual transport protocol (VTP) manager 3125, a receiver module 3130, and a media transport manager 3135.

The session negotiating manager 3105 includes a protocol manager 3110. The protocol manager 3110 ensures that the transmitter module 3115 uses a correct communication protocol to transmit data to a remote device during the video conference and enforces rules of the communication protocol that is used. Some embodiments of the protocol manager 3110 support a number of communication protocols, such as a real-time transport protocol (RTP), a transmission control protocol (TCP), a user datagram protocol (UDP), and a hypertext transfer protocol (HTTP), among others.

The session negotiating manager 3105 is responsible for establishing connections between the dual camera mobile device and one or more remote devices participating in the video conference, as well as tearing down these connections after the conference. In some embodiments, the session negotiating manager 3105 is also responsible for establishing multimedia communication sessions (e.g., to transmit and receive video and/or audio streams) between the dual camera mobile device and the remote devices in the video conference (e.g., using a session initiation protocol (SIP)).

The session negotiating manager 3105 also receives feedback data from the media transport manager 3135 and, based on the feedback data, determines the operation of the universal transmission buffer 3120 (e.g., whether to transmit or drop packets/frames) through the universal transmission buffer manager 3122. This feedback, in some embodiments, may include one-way latency and a bandwidth estimation bit rate. In other embodiments, the feedback includes packet loss information and roundtrip delay time (e.g., determined based on packets sent to the remote device in the video conference and the receipt of acknowledgements from that device). Based on the information from the media transport manager 3135, the session negotiating manager 3105 can determine whether too many packets are being sent and instruct the universal transmission buffer manager 3122 to have the universal transmission buffer 3120 transmit fewer packets (i.e., to adjust the bit rate as described in FIG. 15).

The transmitter module 3115 retrieves encoded images (e.g., as a bitstream) from a video buffer (e.g., the buffer 1612 of FIG. 16) and packetizes the images for transmission to a remote device in the video conference through the universal transmission buffer 3120 and the virtual transport protocol manager 3125. The manner in which the encoded images are created and sent to the transmitter module 3115 can be based on instructions or data received from the media transport manager 3135 and/or the session negotiating manager 3105. In some embodiments, packetizing the images involves breaking the received bitstream into a group of packets each having a particular size (i.e., a size specified by the session negotiating manager 3105 according to a particular protocol), and adding any required headers (e.g., address headers, protocol specification headers, etc.).

The universal transmission buffer manager 3122 controls the operation of the universal transmission buffer 3120 based on data and/or instructions received from the session negotiating manager 3105. For example, the universal transmission buffer manager 3122 may be instructed to direct the universal transmission buffer 3120 to transmit data, stop transmitting data, drop data, etc. As described above, in some embodiments when a remote device participating in the conference appears to be dropping packets, this will be recognized based on acknowledgements received from the remote device. To reduce the packet dropping, the universal transmission buffer manager 3122 may be instructed to transmit packets at a slower rate to the remote device.

The universal transmission buffer 3120 stores data received from the transmitter module 3115 and transmits the data to the remote device through the VTP manager 3125. As noted above, the universal transmission buffer 3120 may drop data (e.g., images of the video) based on instructions received from the universal transmission buffer manager 3122.

In some embodiments, RTP is used to communicate data packets (e.g., audio packets and video packets) over UDP during a video conference. Other embodiments use RTP to communicate data packets over TCP during the video conference. Other transport layer protocols can be used as well in different embodiments.

Some embodiments define a particular communication channel between two mobile devices by a pair of port numbers (i.e., source port number and destination port number). For instance, one communication channel between the mobile devices can be defined by one pair of port numbers (e.g., source port 50 and destination port 100) and another different communication channel between the mobile devices can be defined by another different pair of port numbers (e.g., source port 75 and destination port 150). Some embodiments also use a pair of Internet protocol (IP) addresses in defining communication channels. Different communication channels are used to transmit different types of data packets in some embodiments. For example, video data packets, audio data packets, and control signaling data packets can be transmitted in separate communication channels. As such, a video communication channel transports video data packets and an audio communication channel transports audio data packets.

In some embodiments, a control communication channel is for messaging between the local mobile device and a remote device during a video conference. Examples of such messaging include sending and receiving requests, notifications, and acknowledgements to such requests and notifications. Another example of messaging includes sending remote control instruction messages from one device to another. For instance, the remote control operations described below (e.g., instructing a device to only send images from one particular camera or to only capture images with a particular camera) can be performed by sending instructions from a local device to a remote device through the control communication channel for the local device to remotely control operations of the remote device. Different embodiments implement the control communication using different protocols like a real-time transport control protocol (RTCP), an RTP extension, SIP, etc. For instance, some embodiments use RTP extension to relay one set of control messages between two mobile devices in a video conference and use SIP packets to relay another set of control messages between the mobile devices during the video conference.

The VTP manager 3125 of some embodiments allows different types of data packets that are specified to be transmitted through different communication channels (e.g., using different pairs of port numbers) to be transmitted through a single communication channel (e.g., using the same pair of port numbers). One technique for doing this involves identifying the data packet types, identifying the communication channel through which data packets are specified to be transmitted by extracting the specified pair of port numbers of the data packets, and specifying the data packets to be transmitted through the single communication channel by modifying the pair of port numbers of the data packets to be the pair of port numbers of the single communication channel (i.e., all the data packets are transmitted through the same pair of port numbers).

To keep track of the original pair of port numbers for each type of data packet, some embodiments store a mapping of the original pair of port numbers for the data packet type. Some of these embodiments than use the packet type field of the protocol to differentiate the different packets that are being multiplexed into one communication channel. For instance, some embodiments that have the VTP manager multiplex audio, video and control packets into one RTP stream, use the RTP packet type field to differentiate between the audio, video and control packets that are transmitted in the one RTP channel to the other device in the video conference. In some of these embodiments, the VTP manger also routes control messaging in SIP packets to the other device.

Some embodiments identify examine the data packet signatures (i.e., packet header formats) to distinguish between different packets that are communicated using different protocols (e.g., to differentiate between packets transported using RTP and packets transported using SIP). In such embodiments, after the data packets of the different protocols are determined, the fields of the data packets that use the same protocol (e.g., audio data and video data using RTP) are examined as described above to identify the different data types. In this manner, the VTP manager 3125 transmits different data packets, which are intended to be transmitted through different communication channels, through a single communication channel.

Although one way of combining different types of data through a single communication channel is described above, other embodiments utilize other techniques to multiplex different packet types into one communication stream. For example, one technique of some embodiments involves keeping track of the original pair of port numbers of the data packets and storing the original pair of port numbers in the data packet itself to be later extracted. Still other ways exist for combining different types of data between two video conference participants into one port pair channel.

When the VTP manager 3125 receives data packets from the remote device through a virtualized communication channel, the VTP manager 3125 examines the signatures of the data packets to identify the different packets that are sent using the different protocols. Such signatures can be used to differentiate SIP packets from RTP packets. The VTP manager of some embodiments also uses the packet type field of some or all of the packets to demultiplex the various different types of packets (e.g., audio, video and control packets) that were multiplexed into a single virtualized channel. After identifying these different types of packets, the VTP manager associates each different type of packet with its corresponding port pair numbers based on a mapping of port pair numbers and packet types that it keeps. The VTP manager 3125 then modifies the pair of port numbers of the data packets with the identified pair of port numbers and forwards the data packets to be depacketized. In other embodiments that use different techniques for multiplexing different packet types into the single channel, the VTP manager uses different techniques for parsing out the packets.

By using such techniques for multiplexing and de-multiplexing the different packets, the VTP manager 3125 creates a single virtualized communication channel (e.g., a single pair of port numbers), transmits the video data, audio data, and control signaling data through the single virtualized communication channel, and receives audio, video, and control packets from the remote device through the single virtualized communication channel. Thus, from the perspective of the network, data is transmitted through this single virtualized communication channel, while, from the perspective of the session negotiating manager 3105 and the protocol manager 3110, the video data, audio data, and control signaling data are transmitted through different communication channels.

Similar to the images that are transmitted to the remote device in the video conference, images transmitted from the remote device in the video conference are received in packet format. The receiver module 3130 receives the packets and depacketizes them in order to reconstruct the images before storing the images in a video buffer (e.g., the buffer 1616 of FIG. 16) to be decoded. In some embodiments, depacketizing the images involves removing any headers and reconstructing a bitstream that only has image data (and potentially size data) from the packets.

The media transport manager 3135 processes feedback data (e.g., one-way latency, bandwidth estimation bit rate, packet loss data, roundtrip delay time data, etc.) received from the network to dynamically and adaptively adjust the rate of data transmission (i.e., bit rate). The media transport manager 3135 also controls error resilience based on the processed feedback data in some other embodiments, and may also send the feedback data to the video conference manager 1604 in order to adjust other operations of the video conference module 1602 such as scaling, resizing, and encoding. In addition to having the universal transmission buffer drop packets when a remote device in the conference is not able to process all of the packets, the video conference module and encoder can use a lower bit rate for encoding the images so that fewer packets will be sent for each image.

In some embodiments, the media transport manager 3135 may also monitor other variables of the device such as power consumption and thermal levels that may affect how the operational power modes of the cameras are configured, as discussed above. This data may also be used as additional inputs into the feedback data (e.g., if the device is getting too hot, the media transport manager 3135 may try to have the processing slowed down).

Several example operations of the networking manager 3100 will now be described by reference to FIG. 16. The transmission of images captured by a camera of the dual camera mobile device to a remote device in the video conference will be described first, followed by the description of receiving images from the remote device. The transmitter module 3115 retrieves encoded images from the buffer 1612, which are to be transmitted to the remote device in the video conference.

The protocol manager 3110 determines the appropriate protocol to use (e.g., RTP to transmit audio and video) and the session negotiating manager 3105 informs the transmitter module 3115 of such protocol. Next, the transmitter module 3115 packetizes the images and sends the packetized images to the universal transmission buffer 3120. The universal transmission buffer manager 3122 receives instructions from the session negotiating manager 3105 to direct the universal transmission buffer 3120 to transmit or drop the images. The VTP manager 3125 receives the packets from the universal transmission buffer 3120 and processes the packets in order to transmit the packets through a single communication channel to the remote device.

When receiving images from the remote device, the VTP manager 3125 receives packetized images from the remote device through the virtualized single communication channel and processes the packets in order to direct the images to the receiver module 3130 through a communication channel that is assigned to receive the images (e.g., a video communication channel).

The receiver module 3130 depacketizes the packets to reconstruct the images and sends the images to the buffer 1616 for decoding by the decoder 1660. The receiver module 3130 also forwards control signaling messages to the media transport manager 3135 (e.g., acknowledgements of received packets from the remote device in the video conference).

Several example operations of the networking manager 3100 were described above. These are only illustrative examples, as various other embodiments will perform these or different operations using different modules or with functionalities spread differently between the modules. Furthermore, additional operations such as dynamic bit rate adjustment may be performed by the modules of networking manager 3100 or other modules.

Figure 32:
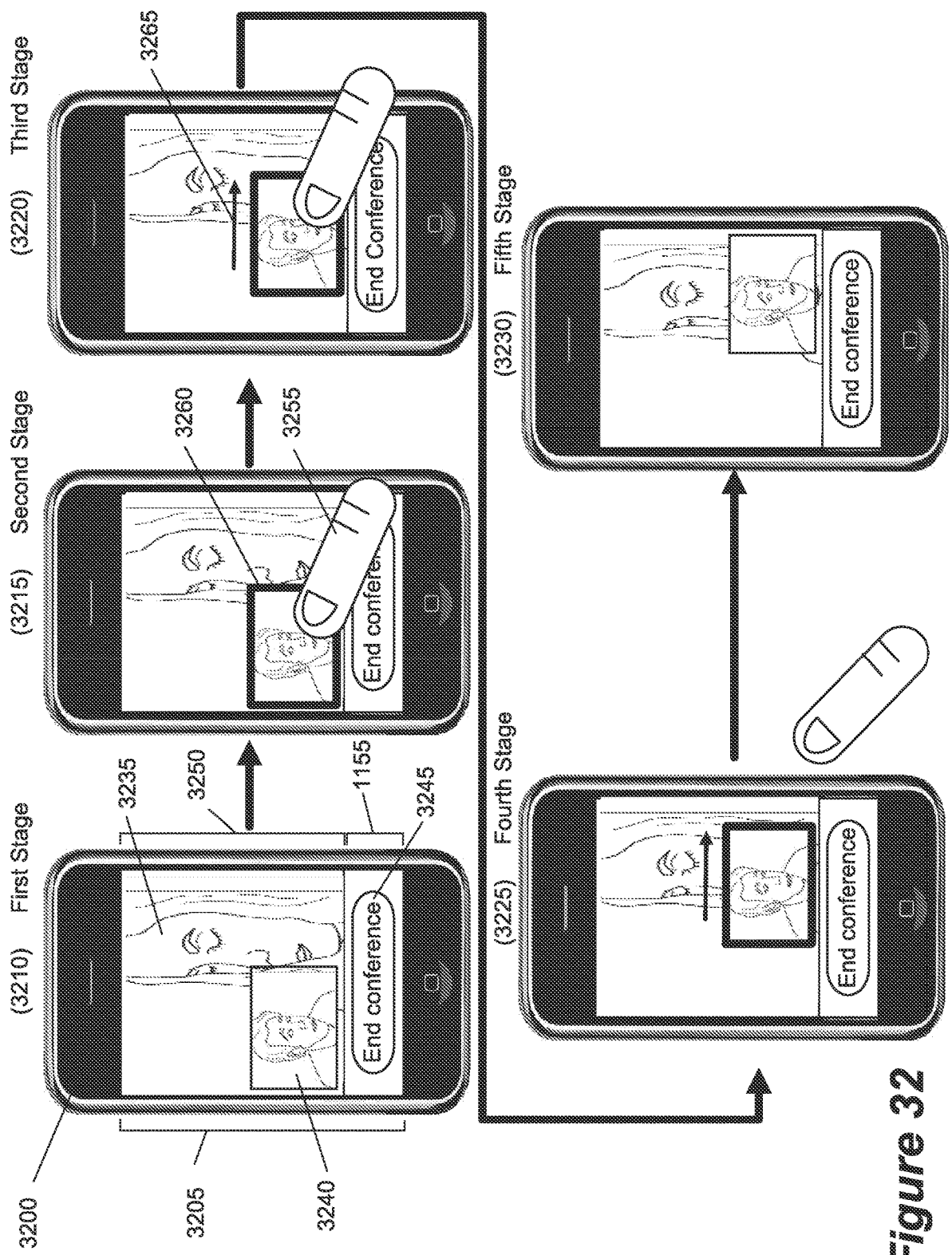
FIG. 32 illustrates a user interface of some embodiments for a snap-to-corner operation.

IV. In-Conference Adjustment and Control Operations
A. Picture-In-Picture Modifications
1. Snap-To-Corner Some embodiments of the invention allow a user of a dual camera mobile device to modify a composite display displayed on the device by moving around one or more display areas that form the composite display. One such example is moving around an inset display area of a PIP display. FIG. 32 illustrates such an example that is performed during a video conference. In a video conference, the user may want to move a foreground inset display area for a variety of reasons, such as when this area is blocking an area of interest of the background display area.

FIG. 32 illustrates the moving of an inset display area 3240 in a UI 3205 of a device, by reference to five different stages 3210, 3215, 3220, 3225, and 3230 of this UI. The first stage 3210 illustrates the UI 3205 during a video conference between the local user of the device and a remote user of a remote device. The UI 3205 in FIG. 32 shows a PIP display that is the same PIP display shown in the fifth stage of FIG. 11 after the video conference has started. In this example, the video captured by the local user's device is displayed in the inset display area 3240 and the video captured by the remote user's device is displayed in the background display area 3235. As shown, the display area 1155 includes a selectable UI item 3245 for ending the video conference. In some embodiments, the layout of the display area 1155 is the same as the layout of the display area 1155 of FIG. 12, described above.

The second stage 3215 illustrates the user starting a snap-to-corner operation by selecting the inset display area 3240. In this example, a selection is made by placing a finger 3255 anywhere within the inset display area 3240. As shown, this selection is displayed in terms of a thick border 3260 for the inset display area 3240. Different embodiments may indicate such a selection in different ways, such as by highlighting the display area 3240, by causing the display area 3240 to vibrate, etc.

The third stage 3220 illustrates the UI 3205 after the user begins to move the inset display area 3240 of the PIP display 3250 from one area in the PIP display 3250 to another area in this display. In this example, the inset display area 3240 has started to move from the lower left corner of the PIP display 3250 to the lower right corner of this display, as indicated by the arrow 3265. In this example, the inset display area 3240 is moved by the user dragging his finger 3255 towards the lower right corner of the PIP display 3250 after selecting the inset display in the second stage 3215. Some embodiments provide other techniques for moving the inset display area 3240 around in the PIP display 3250.

The fourth stage 3225 illustrates the UI 3205 in a state after the user has removed his finger 3255 from the screen of the device 3200. In this state, the inset display area 3240 is still moving towards the lower right corner of the PIP display 3250 that was identified based on the user's finger movement in the third stage 3220. In other words, after the finger 3255 starts the movement of the inset display area 3240 towards the lower right corner of the PIP display 3250, the UI 3205 maintains this movement even after the finger 3255 is removed. To maintain this movement, the UI 3205 of some embodiments requires the user's drag operation to be larger than a particular threshold amount (e.g., longer than a particular distance or longer than a particular length of time) before the user removes his finger 3255; otherwise, these embodiments keep the inset display area 3240 in its original left corner position after moving this display area 3240 slightly or not moving it at all.

However, while some embodiments allow the inset display area to move even after the user stops his drag operation before the inset display area has reached its new location, other embodiments require the user to maintain his drag operation until the inset display area reaches its new location. Some embodiments provide still other techniques for moving the inset display area. For example, some embodiments may require the user to specify where to direct the inset display area 3240 before the inset display area 3240 actually starts to move, etc. Some embodiments may also allow display areas to slide and snap-to-corners by simply tilting the mobile device at different angles.

The fifth stage 3230 illustrates the UI 3205 after the inset display area 3240 has reached its new location at the bottom right corner of the PIP display 3250. The removal of the thick border 3260 in the fifth stage 3230 indicates that the snap-to-corner operation is completed.

To facilitate the movement illustrated in the above-described third, fourth and fifth stages 3220, 3225 and 3230, the UI 3205 of some embodiments employ snapping rules that allow the inset display area to quickly snap to a corner of the PIP display 3250 once the user causes the inset display area to move towards that corner. For instance, when the user drags the inset display area 3240 by more than a threshold amount towards a particular corner, the UI 3205 of some embodiments identifies the direction of motion of the inset display area 3240, determines that the motion has exceeded a threshold amount, and then subsequently moves the inset display area 3240 automatically without further user input to the next grid point in the UI 3205 to which the inset display area 3240 can be snapped. In some embodiments, the only grid points that are provided for snapping the inset display area 3240 are grid points at the four corners of the PIP display 3250. Other embodiments provide other grid points in the UI 3205 (e.g., in the PIP display 3250) to which the inset display area 3240 can snap (i.e., to which the sides or vertices of the area 3240 can be placed on or aligned with).

Still other embodiments may not employ grid points so that the inset display area can be positioned at any point in the PIP display 3250. Yet other embodiments provide a feature that allows the user to turn on or off the snap to grid point feature of the UI. Moreover, in addition to the video captured from the devices, different embodiments may allow the user to perform the snap-to-corner operation with various items, such as icons, etc.

Figure 33:
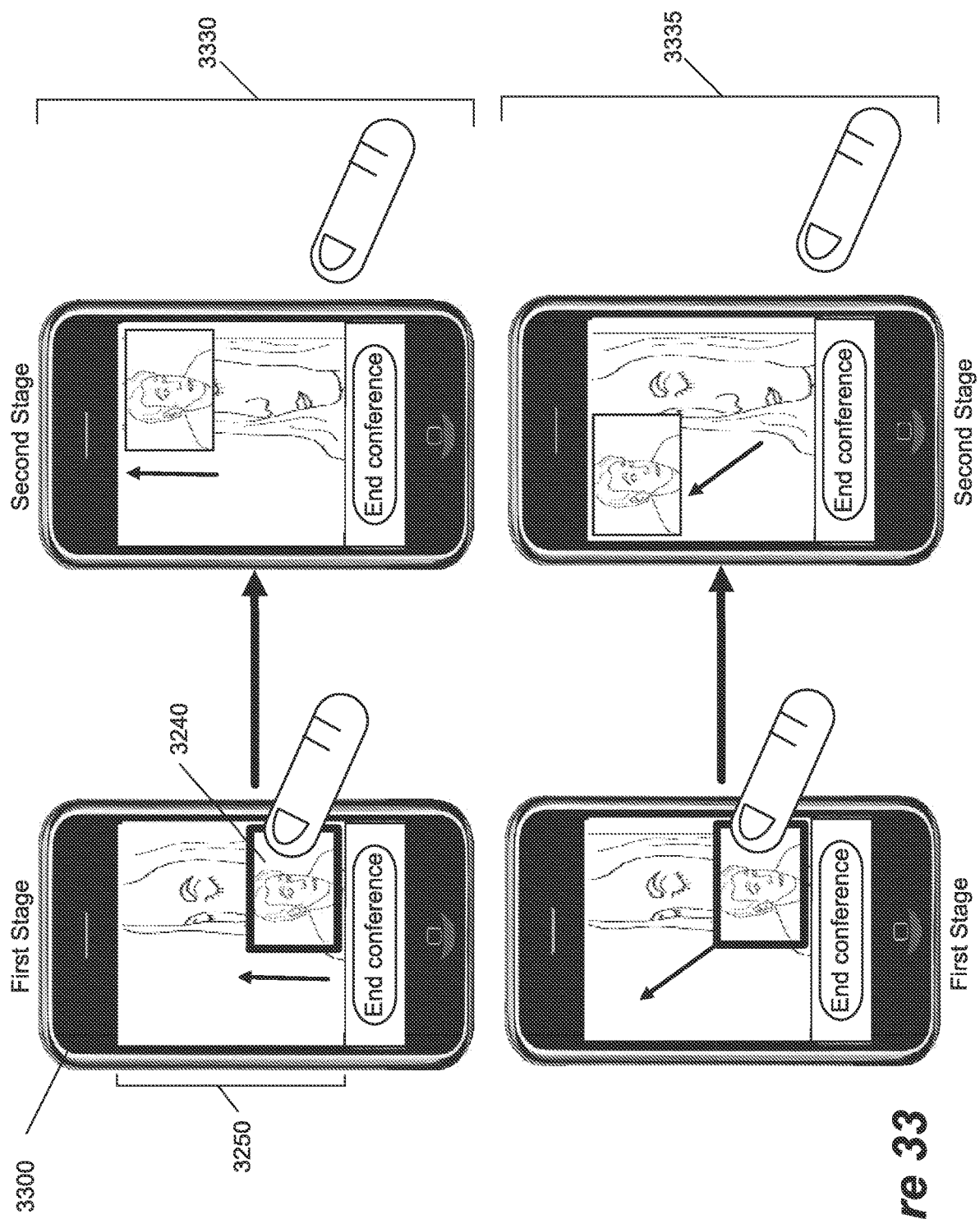
FIG. 33 illustrates another user interface of some embodiments for a snap-to-corner operation.

FIG. 33 illustrates two other examples 3330 and 3335 of a snap-to-corner operation in the UI 3205. These other snap-to-corner operations show the inset display area 3240 being moved vertically or diagonally in the PIP display 3250, based on vertical or diagonal dragging operations of the user.

Even though FIGS. 32 and 33 illustrate the movement of the inset display area within a PIP display, one of ordinary skill will realize that other embodiments utilize similar techniques to move display areas in other types of PIP displays or other types of composite displays. For instance, as further described below, the PIP display of some embodiments has two or more foreground inset displays and these inset displays can be moved in the PIP display using techniques similar to those described above by reference to FIGS. 32 and 33. Also, some embodiments use similar techniques to move around display areas in composite displays (e.g., to move one display area from a left side of the screen to the right side of the screen through a user drag movement). Furthermore, the moving of a display area(s) of a composite display can cause changes to the image processing operations of the dual camera mobile device such as causing the video conference manager 1604 to re-composite the display area in the composite display in response to the user's input. As further described below, some embodiments employ snap and push techniques that push a first display area from a first location when a second display area is moved to the first location from a third location.

2. Rotate

Figure 34:
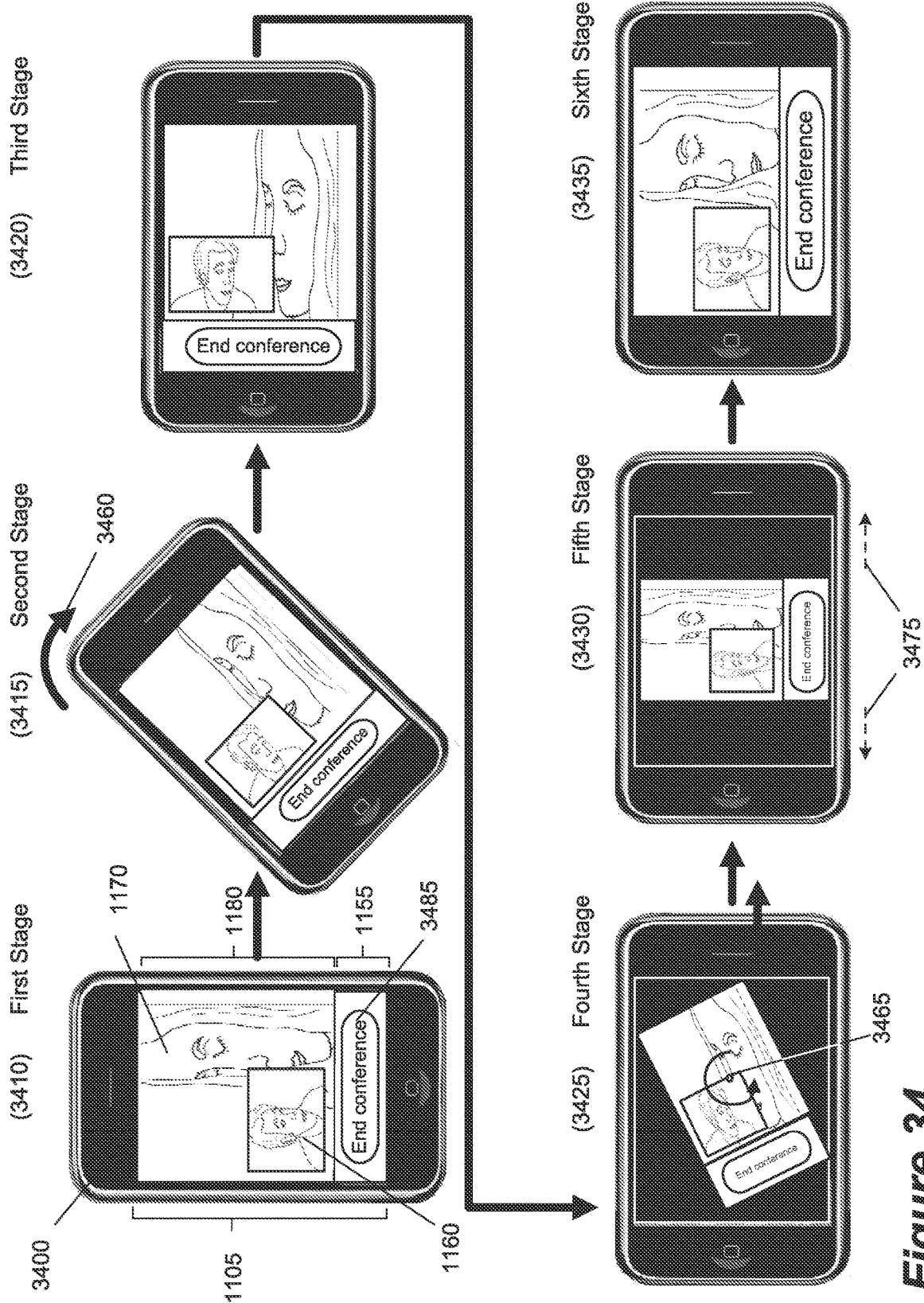
FIG. 34 illustrates a user interface of some embodiments for a PIP display rotation operation.

Some embodiments rotate the PIP display that is presented during a video conference when a user of the mobile device used for the video conference rotates the device during the conference. FIG. 34 illustrates the rotation of a UI 1105 of a device 3400 when the device is rotated from a vertical position to a horizontal position. The device 3400 is held vertically when the long side of the screen is vertical whereas the device 3400 is held horizontally when the long side of the screen is horizontal. In the example illustrated in FIG. 34, the UI 1105 rotates from a portrait view that is optimized for a vertical holding of the device to a landscape view that is optimized for horizontal holding of the device 3400. This rotation functionality allows the user to view the UI 1105 displayed in an upright position when the mobile device 3400 is held either vertically or horizontally.

FIG. 34 illustrates the rotation of the UI 1105 in terms of six different operational stages 3410, 3415, 3420, 3425, 3430 and 3435. The first stage 3410 illustrates the UI 1105 during a video conference between the local user of the device and a remote user of a remote device. The UI 1105 in FIG. 34 shows a PIP display 1180 that is the same PIP display shown in the fifth stage of FIG. 11 after the video conference has been established. In this example, the video captured by the local user's device is displayed in the inset display area 1160 and the video captured by the remote user's device is displayed in the background display area 1170. In the display area 1155 below the PIP display 1180 includes a selectable UI item 3485 (e.g., an End Conference button 3485), which the user may select to end the video conference (e.g., through a single finger tap).

The second stage 3415 illustrates the UI 1105 after the user begins to tilt the device 3400 sideways. In this example, the user has started to tilt the device 3400 from being held vertically to being held horizontally, as indicated by the arrow 3460. The appearance of the UI 1105 has not changed. In other situations, the user may want to tilt the device 3400 from being held horizontally to being held vertically instead, and, in these situations, the UI 1105 switches from a horizontally optimized view to a vertically optimized view.

The third stage 3420 illustrates the UI 1105 in a state after the device 3400 has been tilted from being held vertically to being held horizontally. In this state, the appearance of the UI 1105 still has not changed. In some embodiments, the rotation operation is triggered after the device 3400 is tilted past a threshold amount and is kept past this point for a duration of time. In the example illustrated in FIG. 34, it is assumed that the threshold amount and the speed of the rotation do not cause the UI 1105 to rotate until a short time interval after the device has been placed in the horizontal position. Different embodiments have different threshold amounts and waiting periods for triggering the rotation operation. For example, some embodiments may have such a low threshold to triggering the rotation operation as to make the UI 1105 appear as if it were always displayed in an upright position, notwithstanding the orientation of the device 3400. In other embodiments, the user of the device 3400 may specify when the rotation operation may be triggered (e.g., through a menu preference setting). Also, some embodiments may not delay the rotation after the device is tilted past the threshold amount. Moreover, different embodiments may allow the rotation operation to be triggered in different ways, such as by toggling a switch on the mobile device, by giving voice commands, upon selection through a menu, etc.

The fourth stage 3425 illustrates the UI 1105 after the rotation operation has started. Some embodiments animate the rotation display areas to provide feedback to the user regarding the rotation operation. FIG. 34 illustrates an example of one such animation. Specifically, it shows in its fourth stage 3425 the start of the rotation of the display areas 1180 and 1155 together. The display areas 1180 and 1155 rotate around an axis 3465 going through the center of the UI 1105 (i.e., the z-axis). The display areas 1180 and 1155 are rotated the same amount but in the opposite direction of the rotation of the device 3400 (e.g., through the tilting of the device 3400). In this example, since the device 3400 has rotated ninety degrees in a clockwise direction (by going from being held vertically to being held horizontally) the rotation operation would cause the display areas 1180 and 1155 to rotate ninety degrees in a counter clockwise direction. As the display areas 1180 and 1155 rotate, the display areas 1180 and 1155 shrink proportionally to fit the UI 1105 so that the display areas 1180 and 1155 may still appear entirely on the UI 1105. Some embodiments may provide a message to indicate the state of this device 3400 (e.g., by displaying the word "Rotating").

The fifth stage 3430 illustrates the UI 1105 after the display areas 1180 and 1155 have rotated ninety degrees counter clockwise from portrait view to landscape view. In this stage, the display areas 1180 and 1155 have been rotated but have not yet expanded across the full width of the UI 1105. The arrows 3475 indicate that at the end of the fifth stage, the display areas 1180 and 1155 will start to laterally expand to fit the full width of the UI 1105. Different embodiments may not include this stage since the expansion could be performed simultaneously with the rotation in the fourth stage 3425.

The sixth stage 3435 illustrates the UI 1105 after the display areas 1180 and 1155 have been expanded to occupy the full display of the UI 1105. As mentioned above, other embodiments may implement this rotation differently. For some embodiments, simply rotating the screen of a device past a threshold amount may trigger the rotation operation, notwithstanding the orientation of the device 3400.

Figure 35:
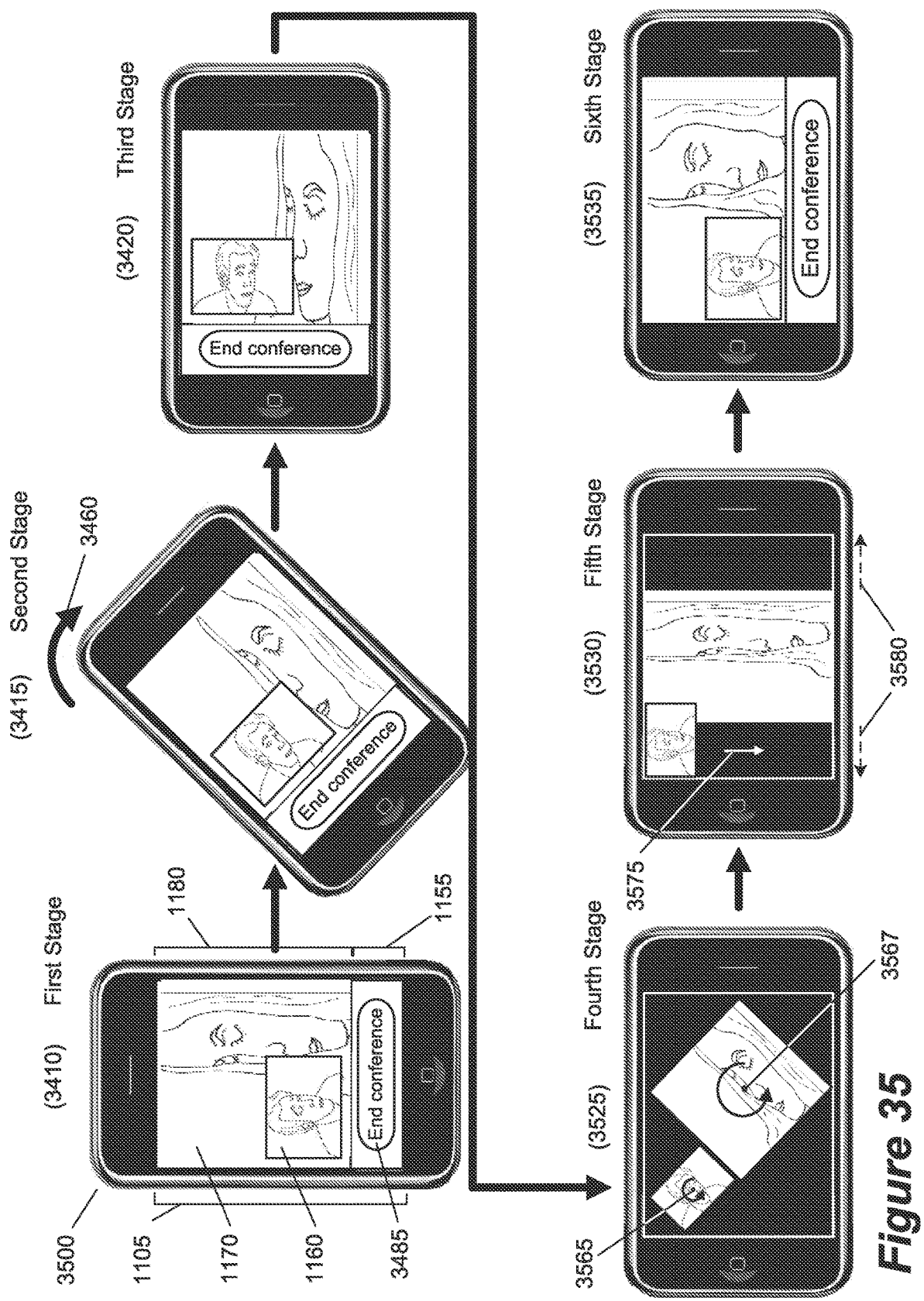
FIG. 35 illustrates another user interface of some embodiments for a PIP display rotation operation.

Also, other embodiments might provide a different animation for indicating the rotation operation. The rotation operation performed in FIG. 34 involves the display areas 1180 and 1155 rotating about the center of the UI 1105. Alternatively, the display areas may be individually rotated about the center axis of their individual display areas. One such approach is shown in FIG. 35. FIG. 35 shows an alternative method to animating the rotation of the display areas 1170 and 1160 of PIP display 1180 of a UI 1105. The PIP display 1180 illustrated in FIG. 35 is the same PIP display 1180 illustrated in FIG. 11.

FIG. 35 illustrates the rotation of the PIP display 1180 in terms of six different operational stages 3410, 3415, 3420, 3525, 3530, and 3535. The first three stages of operation of the UI 1105 are identical to the first three stages of operation as described in the UI 1105 in FIG. 34. At the third stage for both FIGS. 34 and 35, the device 3500 has gone from being held vertically to being held horizontally and the rotation of the UI 1105 has not yet begun.

The fourth stage 3525 illustrates the alternative method to animating the rotation. In this stage, the rotation operation has started. Specifically, the fourth stage shows 3525 the start of the rotation of the display areas 1170 and 1160. The display areas 1170 and 1160 each rotate around axes 3567 and 3565, respectively, going through the center of each of the display areas (i.e., the z-axis). The display areas 1170 and 1160 are rotated the same amount but in the opposite direction of the rotation of the device 3500 (e.g., through the tilting of the device 3500). Similar to that illustrated in the fourth stage 3425 of FIG. 34 above, since the device 3500 has rotated ninety degrees in a clockwise direction (by going from being held vertically to being held horizontally) the rotation operation would cause the display areas 1170 and 1160 to rotate ninety degrees in a counter clockwise direction. As the display areas 1170 and 1160 rotate, the display areas 1170 and 1160 shrink proportionally to fit the UI 1105 so that the display areas 1170 and 1160 may still appear entirely on the UI 1105.

The fifth stage 3530 illustrates the UI 1105 after each of the display areas 1170 and 1160 have rotated ninety degrees counter clockwise from portrait view to landscape view. In this stage, the display areas 1170 and 1160 have been rotated but have not yet expanded across the full width of the UI 1105. Moreover, the display area 1160 has not moved into its final position. The final position of the inset display area 1160 in the PIP display 1180 is determined by the position of the inset display area 1160 in the PIP display 1180 as shown in the first stage 3410 (e.g., the inset display area 1160 in the lower left corner of the PIP display 1180). In this stage, the inset display area 1160 is still in the upper left corner of the UI 1105.

The arrows 3580 indicate that at the end of the fifth stage 3530, the display areas 1170 and 1160 will start to laterally expand until the main display area 1170 fits the full width of the UI 1105 for a device that is held horizontally. Moreover, the arrow 3575 indicates that the inset display area 1160 will slide to the lower left corner of the PIP display 1180.

Different embodiments may implement this differently. In some embodiments, the moving of the inset display area 1160 may occur simultaneously as the expansion of the main display area 1170 or sequentially. Moreover, some embodiments may resize the inset display areas 1160 before, during or after the expansion of the main display area 1170 to create the new PIP display 1180. In this example, the display area 1155 disappears while the display areas 1160 and 1170 are rotating. However, the display area 1155 may remain on the UI 1105 during the rotation and rotate along with the display areas 1160 and 1170 in some embodiments.

The sixth stage 3535 illustrates the UI 1105 after the inset display area 1160 has reached its new location and the display areas 1160 and 1170 have been properly expanded to fit the full width of the UI 1105. In this example, the inset display area 1160 is now in the lower left corner of the PIP display 1180, overlapping the main display area 1170. The PIP display 1180 now has the same display arrangement as the PIP display 1180 from the first stage 3410. The appearance of the display area 1155 below the PIP display 1180 in the sixth stage indicates that the rotation operation is completed. As noted above, simply rotating the screen of a device past a threshold amount may trigger the rotation operation, notwithstanding the orientation of the device 3500.

Figure 36:
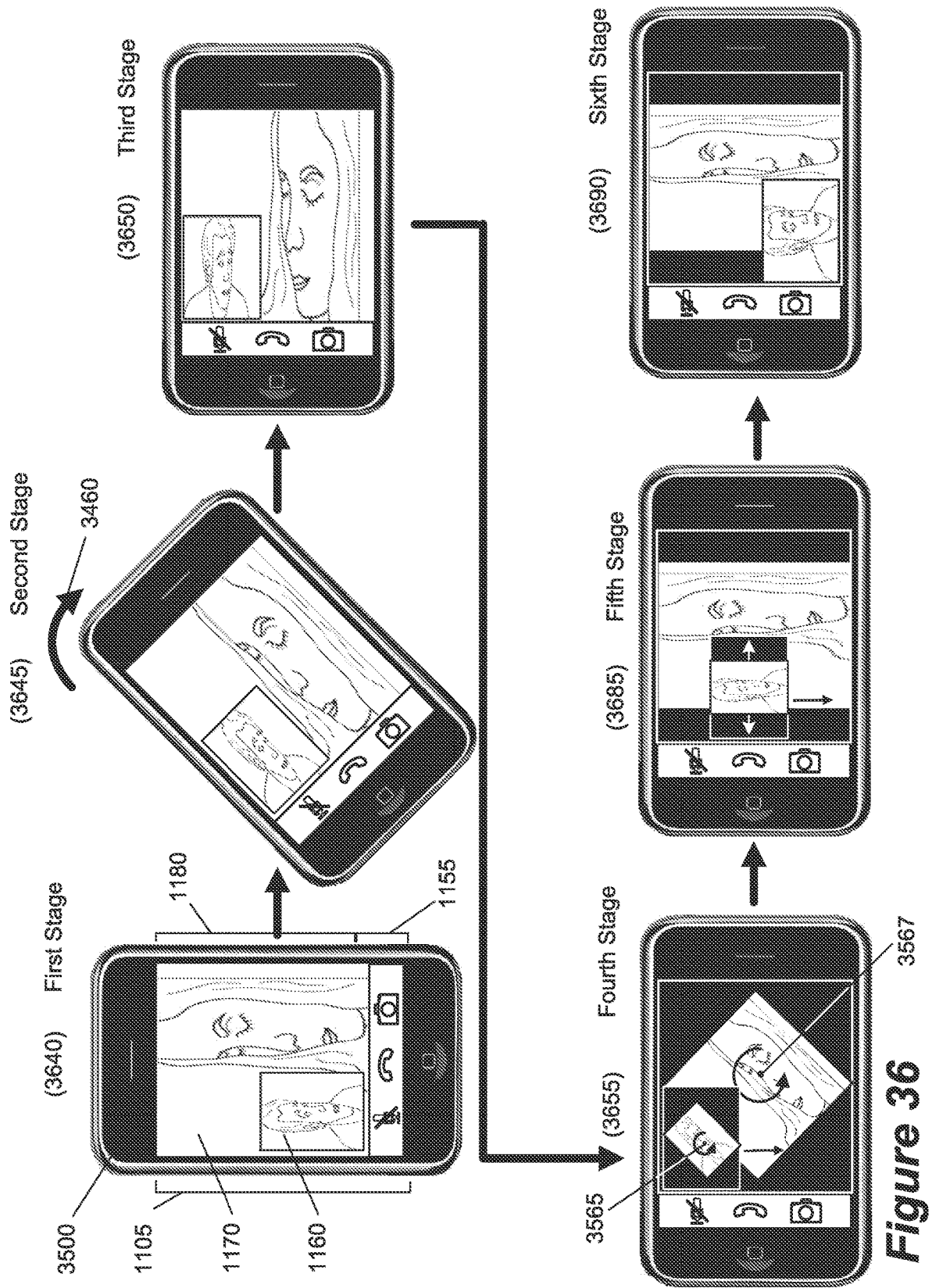
FIG. 36 illustrates another user interface of some embodiments for a PIP display rotation operation.

In the examples described above by reference to FIGS. 34 and 35, the orientation of the display area 1170 also changes (i.e., from portrait to landscape). That is, after the display area 1170 is rotated in the third stage 3420, the orientation of the display area 1170 changes from portrait to landscape by horizontally expanding the PIP display 1180 so that it fills the entire UI 1105. In some embodiments, when the device 3500 is rotated, video captured by the remote device rotates but the orientation of the display area that displays the video captured by the remote device remains unchanged. One such example is illustrated in FIG. 36. This figure is similar to FIG. 35 except that video displayed in the display area 1170 rotates but the display area 1170 remains displayed in portrait orientation.

FIG. 36 also illustrates an example of a rotation operation in which the display area 1155 remains in the same position (instead of rotating and expanding horizontally to fill the PIP display 1180 as shown in FIG. 35). Moreover, this figure includes a layout of the display area 1155 that is the same as the layout of the display area 1155, described above in FIG. 12. As shown, the display area 1155 remains in the same position as the device 3500 rotates in the stages 3640, 3645, 3650, 3655, 3685, and 3690.

Some embodiments provide a rotation operation in which the orientation of the display area that displays video captured by the local device changes (instead of remaining in the same orientation as shown in FIG. 35) to reflect the orientation of the local device after the rotation operation is performed on the local device. FIG. 36 illustrates an example of such a rotation operation of a UI 1105 by reference to six different stages 3640, 3645, 3650, 3655, 3685, and 3690. In this figure, the first stage 3640 shows the inset display area 1160, which displays video captured by a camera of the device 3500, in a portrait orientation. The second and third stages 3645 and 3650 are similar to the second and third stages 3415 and 3420 of FIG. 35 as they show the tilting of the device 3500 at various stages of the rotation operation. At this point, the camera of the device 3500 is capturing images in a landscape orientation. To indicate this transition, some embodiments provide an animation as shown in fourth and fifth stages 3655 and 3685 while other embodiments do not provide any animation at all.

In the fourth stage 3655, the image displayed in the inset display area 1160 is rotated, but not the inset display area 1160 itself since the tilting of the device 3500 in the second and third stages 3445 and 3650 has rotated the inset display area 1160 to a landscape orientation. In the fifth stage 3685, the rotated image in the inset display area 1160 is horizontally expanded to fill the inset display area 1160 and the inset display area 1160 starts to move towards the lower left area of the PIP display 1180 to position the inset display area 1160 in the same relative position as the inset display area 1160 in the PIP display of the first stage 3640.

Figure 37:
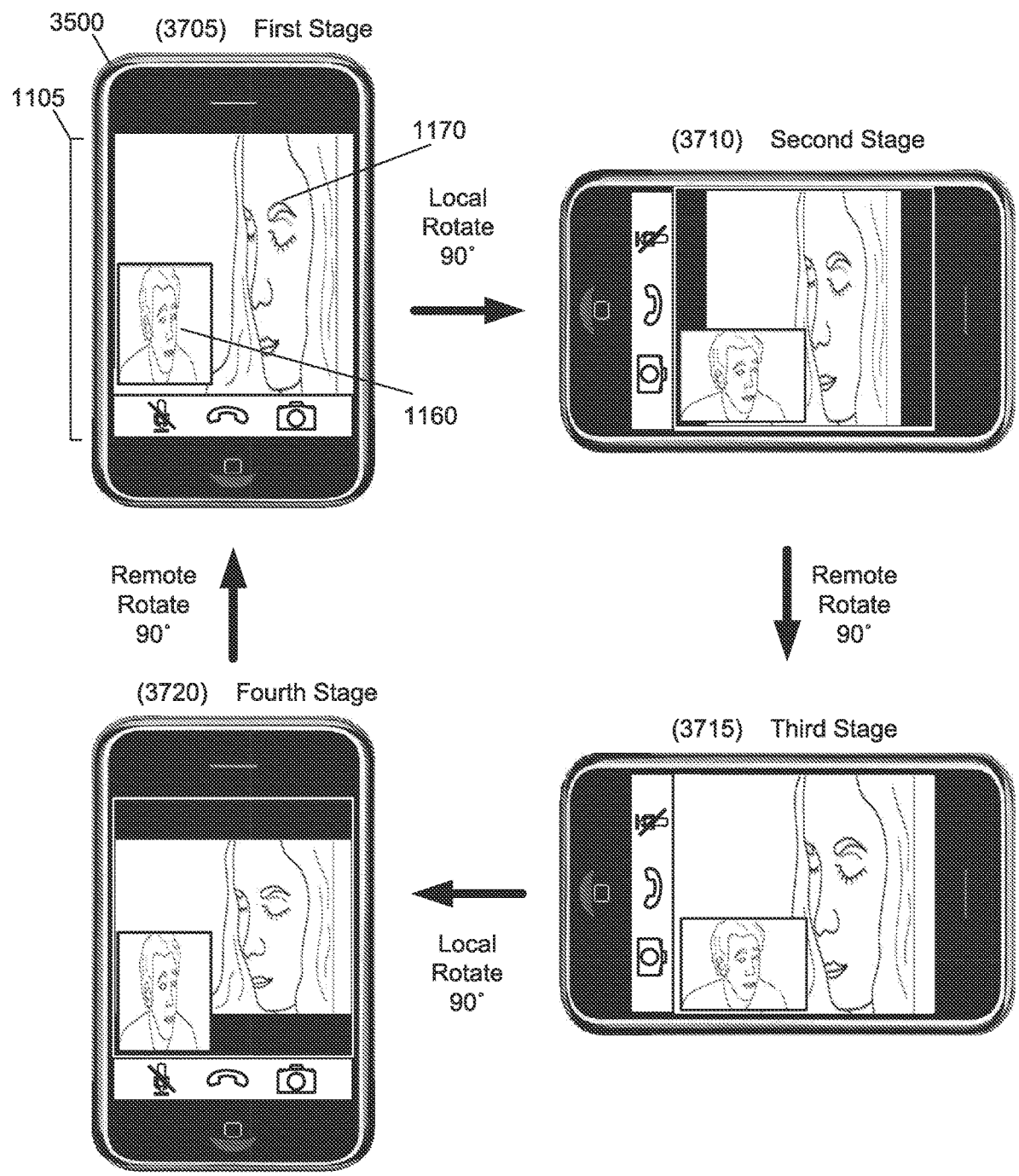
FIG. 37 illustrates another user interface of some embodiments for a PIP display rotation operation.

In some embodiments, the orientation of the display area that displays the video captured by the remote device also changes to reflect the orientation of the remote device after a rotation operation is performed on the remote device. FIG. 37 illustrates four different stages of a UI 1105 of the device 3500 in which (1) the orientation of the display area that displays the video captured by the local device (display area 1160 in this example) changes to reflect the orientation of the local device after a rotation operation is performed on the local device and (2) the orientation of the display area that displays video captured by the remote device (display area 1170 in this example) changes to reflect the orientation of the remote device after a rotation operation is performed on the remote device.

In the first stage 3705, the UI 1105 is the same as the UI 1105 in FIG. 36. Specifically, the first stage 3705 shows the display areas 1160 and 1170 in a portrait orientation because the device 3500 is shown in a portrait orientation and the remote device is in a portrait orientation (not shown). From the first stage 3705 to the second stage 3710, a rotation operation is performed on the local device by rotating the device 3500 ninety degrees from an upright position to a sideways position. The second stage 3710 shows the UI 1105 after the rotation operation of the device 3500 is completed. In this stage, the videos displayed in the display areas 1170 and 1160 have rotated to an upright position. However, only the display area 1160 of the locally captured video has rotated from a portrait orientation to a landscape orientation since the rotation operation is only performed on the local device (i.e., the device 3500). The display area 1170 remains in the portrait orientation.

From the second stage 3710 to the third stage 3715, a rotation operation is performed on the remote device by rotating the remote device from an upright position to a sideways position (not shown). The third stage 3715 shows the UI 1105 after the rotation operation of the remote device is completed. In this stage, the video displayed in the display area 1170 and the display area 1170 of the remotely captured video have rotated from a portrait orientation to a landscape orientation since the rotation operation is only performed on the remote device. Thus, this stage of the UI 1105 displays the display areas 1170 and 1160 of the locally and remotely captured videos both in landscape orientation.

From the third stage 3715 to the fourth stage 3720, a rotation operation is performed on the local device by rotating the device 3500 ninety degrees from a sideways position to an upright position. The fourth stage 3720 shows the UI 1105 after the completion of this rotation operation. In this fourth stage 3720, the videos displayed in the display areas 1160 and 1170 have rotated to an upright position. However, only the display area 1160 of the locally captured video has rotated from a landscape orientation to a portrait orientation since the rotation operation is only performed on the local device (i.e., the device 3500). The display area 1170 remains in the landscape orientation.

From the fourth stage 3720 to the first stage 3705, a rotation operation is performed on the remote device by rotating the remote device ninety degrees from a sideways position to an upright position (not shown). In this case, the first stage 3705 shows the display area 1170 after the completion of this rotation operation. Therefore, the UI 1105 of this stage shows the display areas 1160 and 1170 in a portrait orientation. Although FIG. 37 illustrates a sequence of different rotation operations, other embodiments can perform any number of rotation operations in any number of different sequences.

FIGS. 34, 35, 36, and 37 describe rotate operations performed on local and remote devices during a video conference. When a rotate operation is performed on the local mobile device, some embodiments notify the remote device of the rotate operation in order for the remote device to perform any modifications to the local device's video (such as rotating the display area that is displaying the local device's video). Similarly, when a rotate operation is performed on the remote device, the remote device notifies the local device of this operation to allow the local device to perform any modifications the remote device's video. Some embodiments provide a control communication channel for communicating the notification of rotate operations between the local and remote devices during the video conference.

Even though FIGS. 34, 35, 36, and 37 illustrate different manners in which the animation of a rotation can be performed, one of ordinary skill will realize that other embodiments may display the animation of the rotation in other different ways. In addition, the animation of the rotation operation can cause changes to the image processing operations of the local mobile device such as causing the video conference manager 1604 to re-composite the display area(s) at different angles in the UI 1105 and scale the images displayed in the display area(s).

3. Window Size Adjustment

Figure 38:
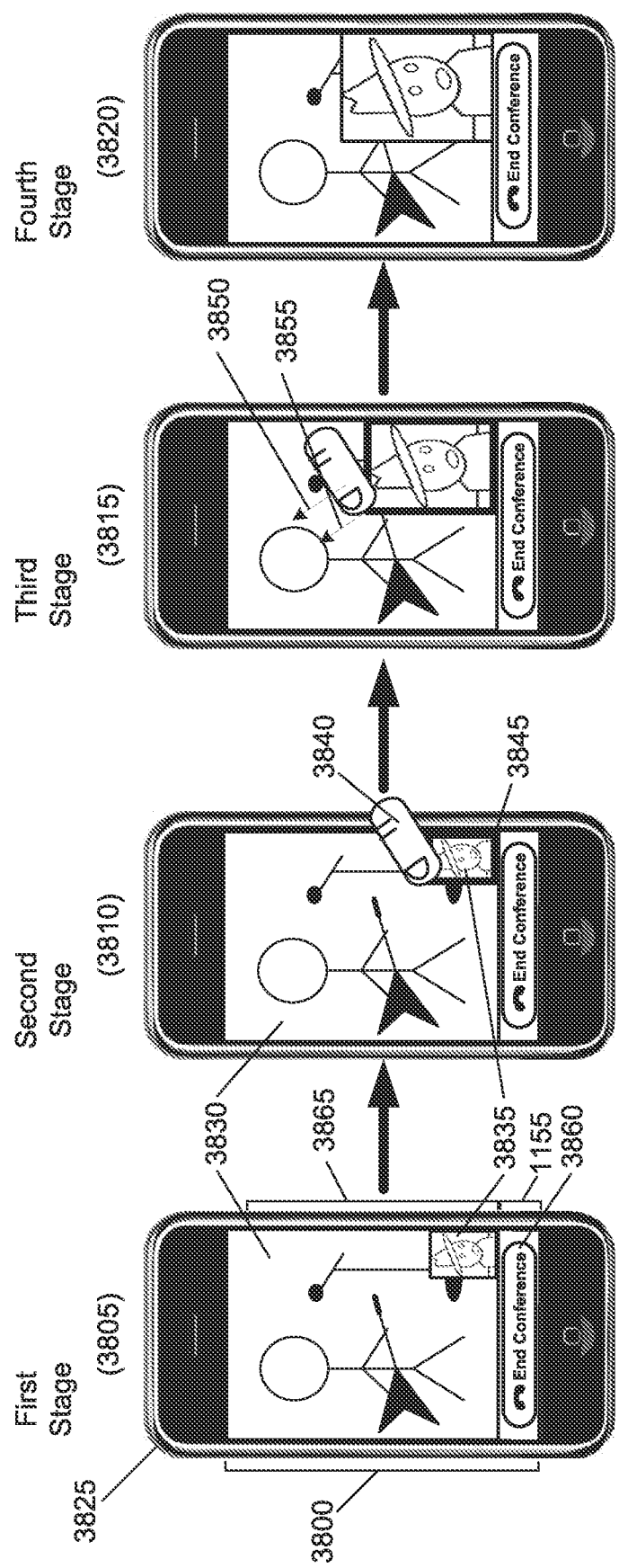
FIG. 38 illustrates a user interface of some embodiments for resizing a foreground inset display area in a PIP display.

Some embodiments allow a user of a mobile device to adjust the size of an inset display area of a PIP display presented during a video conference. Different embodiments provide different techniques for resizing an inset display area. FIG. 38 illustrates one approach for resizing the inset display area. In this approach, the user of the mobile device adjusts the size of the inset display area by selecting a corner of the inset display area and then expanding or shrinking the inset display area.

In FIG. 38, a UI 3800 of a mobile device 3825 presents a PIP display 3865 during a video conference with a remote user of another mobile device. This PIP display 3865 includes two video displays: a background main display area 3830 and a foreground inset display area 3835. The background main display area 3830 takes up a majority of the PIP display 3865 while the foreground inset display area 3835 is smaller and overlaps the background main display area 3830. In this example, the background main display area 3830 presents a video of a person holding a guitar, which is assumed to be a person whose video is being captured by the remote device's front camera or a person whose video is being captured by the remote device's back camera. The foreground inset display area 3835 presents a video of a person with a hat, which, in this example, is assumed to be a person whose video is being captured by the local device's front camera or a person whose video is being captured by the local device's back camera. Below the PIP display 3865 is a display area 1155 that includes a selectable UI item 3860 labeled "End Conference" (e.g. a button 3860) that allows the user to end the video conference by selecting the item.

This PIP display 3865 is only one manner of presenting a composite view of the videos being captured by the remote and local devices. Some embodiments may provide other composite views. For instance, instead of having a larger background display for the video from the remote device, the larger background display can be of the video from the local device and the smaller foreground inset display can be of the video from the remote device. Also, some embodiments allow the local and remote videos to appear in the UI 3800 in two side-by-side display areas (e.g. left and right display windows, or top and bottom display windows) or two diagonally aligned display areas. The manner of the PIP display or a default display mode may be specified by the user in some embodiments. In other embodiments, the PIP display may also contain a larger background display and two smaller foreground inset displays.

FIG. 38 illustrates the resize operation in terms of four operational stages of the UI 3800. In the first stage 3805, the foreground inset display 3835 is substantially smaller than the background main display area 3830. Also in this example, the foreground inset display area 3835 is located at the lower right corner of the PIP display 3865. In other examples, the foreground inset display area 3835 may be a different size or located in a different area in the PIP display 3865.

In the second stage 3810, the resizing operation is initiated. In this example, the operation is initiated by selecting a corner of the inset display area 3835 that the user wants to resize (e.g., by holding a finger 3840 down on the upper left corner of the inset display area 3835). The second stage 3810 of the UI 3800 indicates this selection in terms of a thick border 3845 for the inset display area 3835. At this stage, the user can expand or shrink the inset display area 3835 (e.g., by dragging his finger 3840 on the PIP display 3865 away from the inset display area 3835 or toward the inset display area 3835).

The third stage 3815 illustrates the UI 3800 after the user has started to expand the inset display area 3835 by moving his finger 3840 away from the inset display area 3835 (i.e., by moving his finger diagonally towards the upper left corner of the UI 3800 in this example), as indicated by an arrow 3850. Also as indicated by arrow 3855, the movement of the finger 3840 has expanded the inset display area 3835 proportionally in both height and width. In other examples, the user can shrink the inset display area 3835 using the same technique (i.e., by dragging the finger toward the inset display area 3835).

The fourth stage 3820 displays the UI 3800 after the resizing of the inset display area 3835 has been completed. In this example, the user completes the resize of the inset display area 3835 by stopping the dragging of his finger 3840 and removing his finger from the PIP display 3865 once the inset display area 3835 has reached the desired size. As a result of this procedure, the resized inset display area 3835 is larger than its original size in the first stage 3805. The removal of the thick border 3845 indicates that the inset display area resize operation is now completed.

Figure 39:
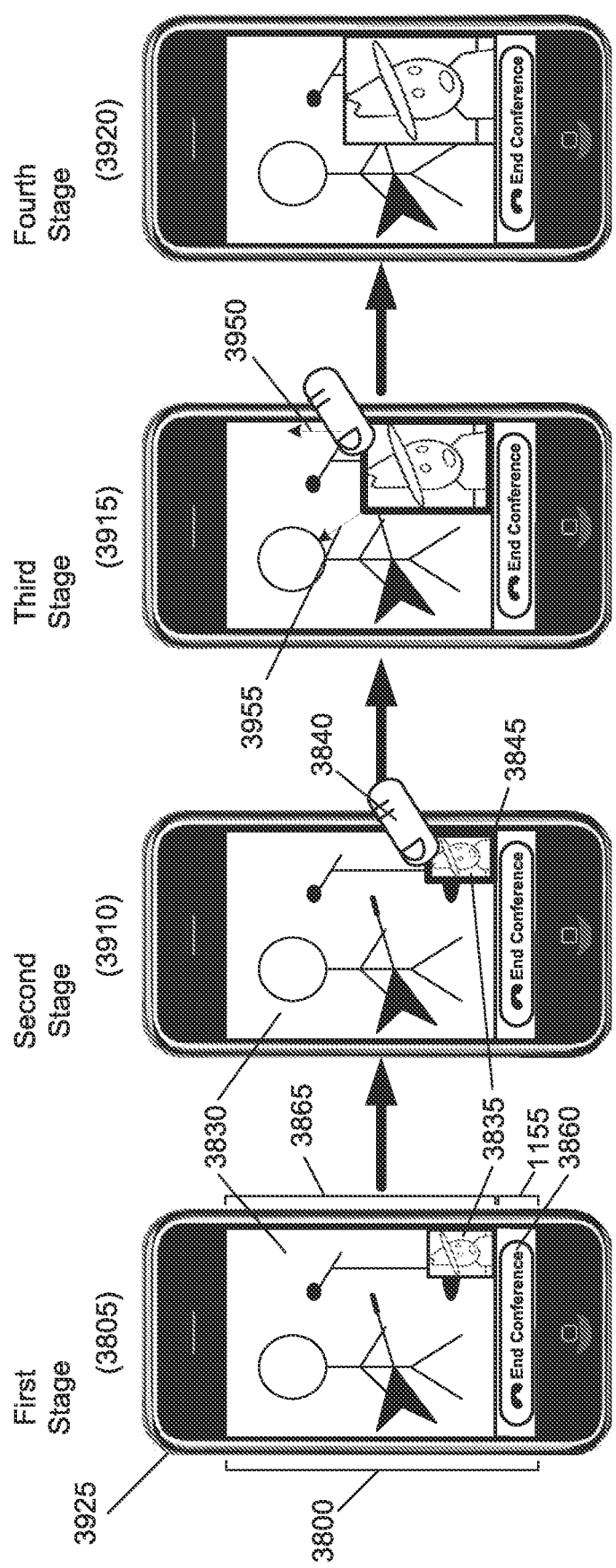
FIG. 39 illustrates another user interface of some embodiments for resizing an inset display area in a PIP display.

Some embodiments provide other techniques for allowing a user to resize an inset display area 3835 in a PIP display 3865 during a video conference. FIG. 39 illustrates one such other technique. This figure illustrates a technique for resizing the inset display area 3835 by selecting an edge of the inset display area 3835 (i.e., on one of the sides of this display area 3835) and then expanding or shrinking inset display area 3835.

FIG. 39 illustrates this resizing operation in terms of four operational stages of the UI 3800 of FIG. 38. The first stage 3805 in FIG. 39 is the same as the first stage 3805 in FIG. 38. Specifically, in this stage, the UI 3800 of device 3925 illustrates the PIP display 3865 with a larger background main display area 3830 and a smaller foreground inset display area 3835 at the bottom right corner of the PIP display 3865. Even though FIGS. 38 and 39 illustrate two different techniques for resizing an inset display area 3835 in the same UI 3800, one of ordinary skill will realize that some embodiments will not offer both these techniques in the same UI.

The second stage 3910 illustrates the start of a resizing operation. In this example, the user initiates the operation by selecting a side of the inset display area 3835 that the user wants to resize (e.g., by placing a finger 3840 down on the top edge or the side edge of the inset display area 3835). In this example, a user places his finger 3840 on the top edge of the inset display area 3835 in order to make this selection. The second stage 3910 indicates this selection in terms of a thick border 3845 for the inset display area 3835.

The third stage 3915 illustrates the UI 3800 after the user has started to expand the inset display area 3835 by moving his finger 3840 away from the inset display area 3835 (i.e., vertically toward the top of the PIP display 3865), as indicated by an arrow 3950. Also as indicated by arrow 3955, the movement of the finger 3840 has expanded the inset display area 3835 proportionally in both height and width. In other examples, the user can shrink the display area 3835 using the same technique (e.g., by dragging the finger 3840 toward the inset display area 3835).

The fourth stage 3920 displays the UI 3800 after the resizing of the inset display area 3835 has been completed. In this example, the user completes the resize of the inset display area 3835 by stopping the dragging of his finger 3840 and removing his finger 3840 from the device's display screen once the inset display area 3835 has reached the desired size. As a result of this procedure, the resized inset display area 3835 is larger than its original size in the first stage 3805. The removal of the thick border 3845 indicates that the inset display area resize operation is now completed.

Figure 40:
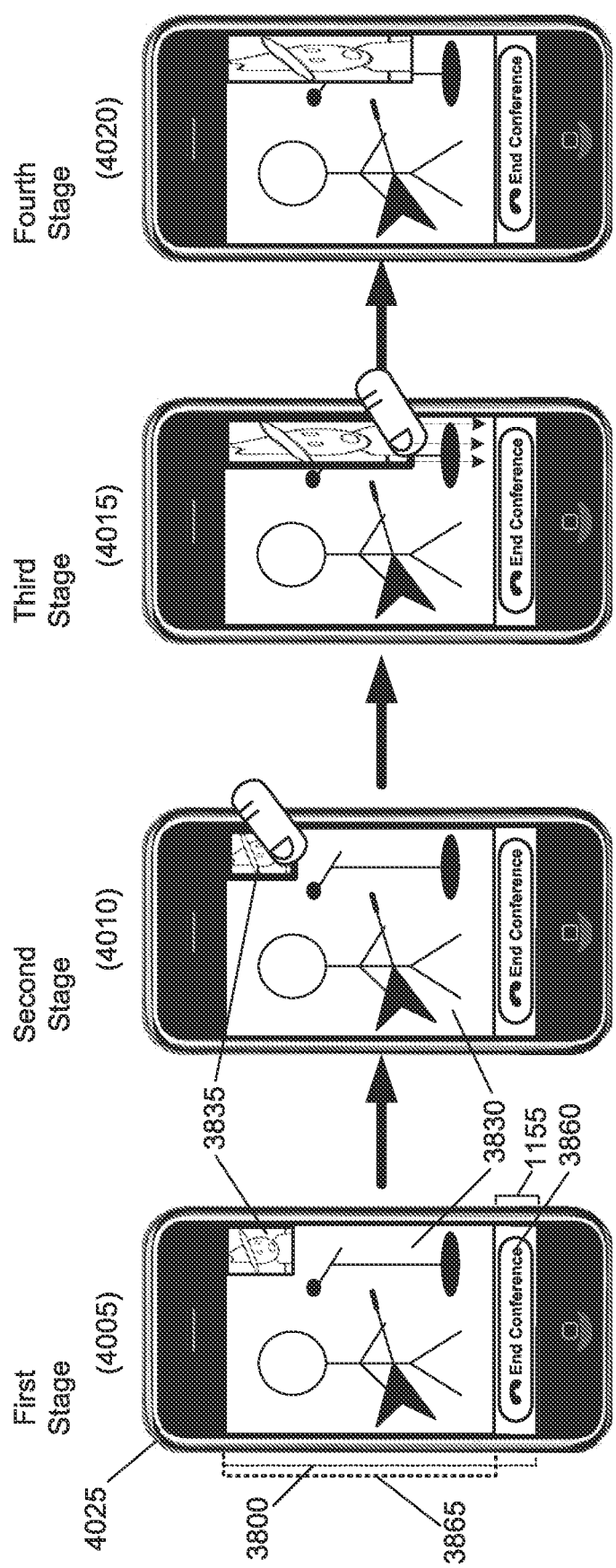
FIG. 40 illustrates another user interface of some embodiments for resizing an inset display area in a PIP display.

In response to a drag operation, some embodiments adjust the size of the inset display area 3835 proportionally in height and width, as illustrated by FIGS. 38 and 39. Other embodiments may allow the user to adjust the height and/or width of an inset display area 3835 without affecting the other attribute. FIG. 40 illustrates an example of one such resizing approach.

Specifically, FIG. 40 illustrates a UI 3800 of a mobile device 4025 that is similar to the UI 3800 of FIG. 38 except the UI 3800 of FIG. 40 allows the inset display area 3835 to be expanded in the horizontal direction and/or vertical direction when one of the edges of the inset display area 3835 is selected and moved horizontally or vertically. To simplify the description of the UI 3800, FIG. 40 illustrates a PIP display 3865 in the UI 3800 that is similar to the PIP display 3865 of FIG. 38 except now the inset display area 3835 is in the upper right corner of the PIP display 3865. The PIP display 3865 includes two video displays: a background main display area 3830 and a foreground inset display area 3835. In this example, the background main display area 3830 presents a video that is being captured by the remote device's front camera or back camera. The foreground inset display area 3835 presents a video that is being captured by the local device's front camera or back camera.

Like FIG. 38, FIG. 40 illustrates the resizing operation in terms of four operational stages of the UI 3800. The first stage 4005 is similar to the first stage 3805 of FIG. 38 except now the inset display area 3835 is in the upper right corner. The other three stages 4010, 4015 and 4020 are similar to the three stages 3910, 3915 and 3920 except that the selection and movement of the bottom edge of the inset display area 3835 has caused the inset display area 3835 to only expand in the vertical direction without affecting the width of the inset display area 3835.

Figure 41:
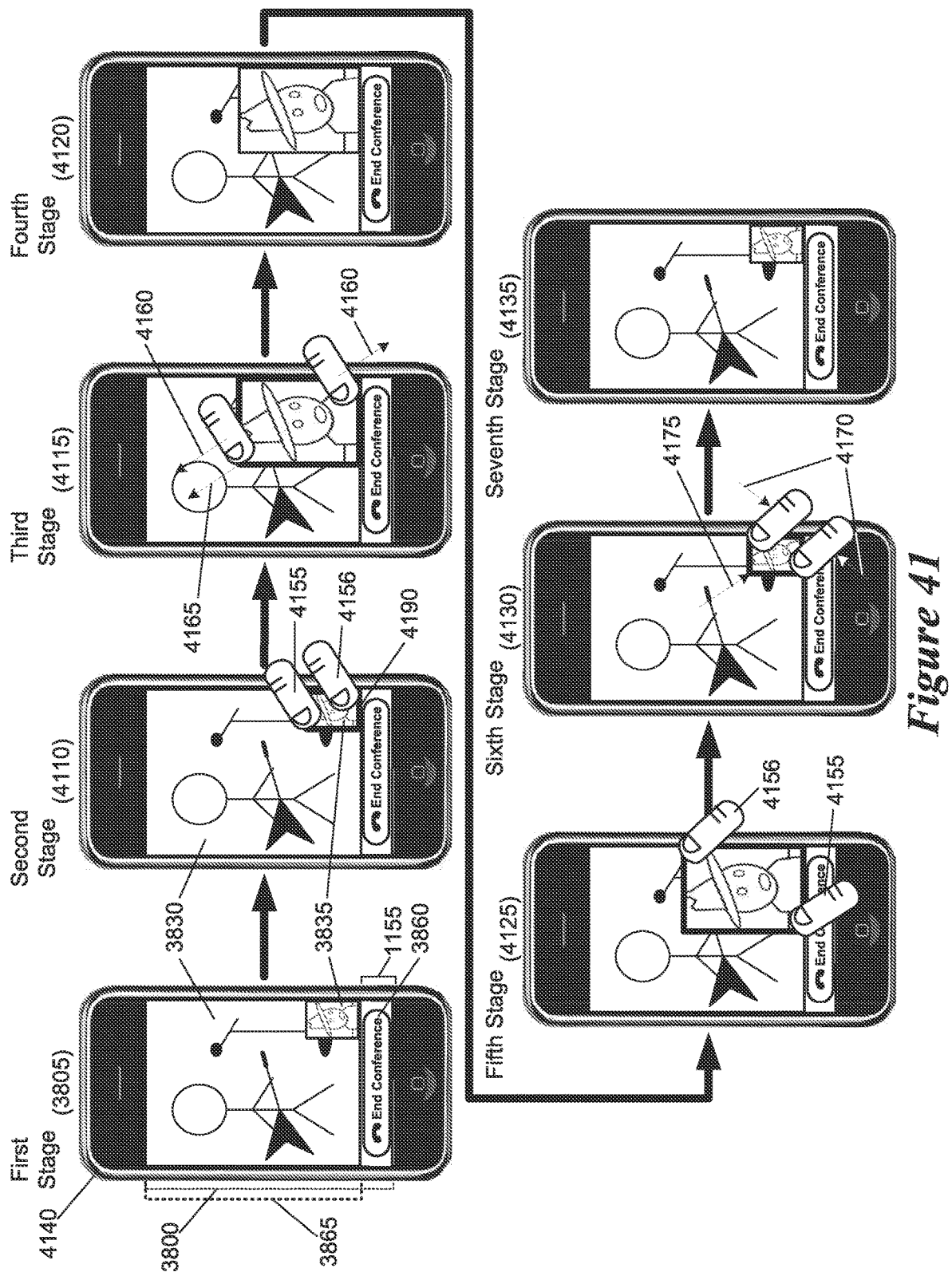
FIG. 41 illustrates another user interface of some embodiments for resizing an inset display area in a PIP display.

FIGS. 38, 39, and 40 provide examples embodiments that allow the user to resize an inset display area 3835 of a PIP display 3865 by selecting a corner or a side of the inset display area 3835. Some embodiments provide other techniques for resizing an inset window 3835. For instance, FIG. 41 illustrates that some embodiments allow the inset display area 3835 to be resized by selecting the interior of the inset display area 3835. In this approach, the user adjusts the size of the inset display area 3835 by placing two fingers 4155 and 4156 on the screen and dragging the fingers either away from or toward each other.

In FIG. 41, a UI 3800 of a mobile device 4140 provides a PIP display 3865 during a video conference with a remote user of another mobile device. To simplify the description of the UI 3800, FIG. 41 illustrates a PIP display 3865 in this UI 3800 that is similar to the PIP display 3865 of FIG. 38.

FIG. 41 illustrates the resizing operation in terms of seven operational stages of the UI 3800. The first four stages 3805, 4110, 4115, and 4120 show the expansion of an inset display area 3835 while the last three stages show the shrinking of the inset display area 3835. The first stage 3805 in FIG. 41 is the same as the first stage 3805 in FIG. 38. Specifically, in this stage, the UI 3800 illustrates the PIP display 3865 with a larger background main display area 3830 and a smaller foreground inset display area 3835. In this example, the background main display area 3830 presents a video that is being captured by the remote device's front camera or back camera. The foreground inset display area 3835 presents a video that is being captured by the local device's front camera or back camera.

The second stage 4110 illustrates the UI 3800 after the resizing operation is initiated. In this example, the user initiates the operation by selecting the inset display area 3835 that the user wants to resize (e.g., by placing two fingers 4155 and 4156 down within the inset display area 3835). The second stage 4110 of the UI 3800 indicates this selection in terms of a thick border 4190 for the inset display area 3835.

The third stage 4115 illustrates the UI 3800 after the user has started to expand the inset display area 3835 by moving his fingers 4155 and 4156 away from each other (i.e., moving finger 4155 toward the upper left corner of the PIP display 3865 and moving finger 4156 toward the lower right corner of the PIP display 3865), as indicated by arrows 4160. As indicated by an arrow 4165, the movement of the fingers 4155 and 4156 has expanded the inset display area 3835 proportionally in both height and width.

The fourth stage 4120 displays the UI 3800 after the resizing of the inset display area 3835 has been completed. In this example, the user completes the resize of the inset display area 3835 by stopping the dragging of his fingers 4155 and 4156 and removing his fingers 4155 and 4156 from the device's display screen. As a result of this procedure, the resized inset display area 3835 is larger than its original size in the first stage 3805. The removal of the thick border 4190 indicates that the inset display area resize operation is now completed.

In the fifth stage 4125, the user re-selects the inset display area 3835 by placing down two fingers 4155 and 4156 on the inset display area 3835. The sixth stage 4130 illustrates the UI 3800 after the user has started to shrink the inset display area 3835 by moving his fingers 4155 and 4156 closer together, as indicated by arrows 4170. As indicated by an arrow 4175, the movement of the fingers 4155 and 4156 has shrunk the inset display 3835 proportionally in both height and width.

The seventh stage 4135 is similar to the fourth stage 4120 in FIG. 41, except that the inset display area 3835 has shrunk in size as a result of the operation. The removal of the thick border 4190 indicates that the inset display area resize operation is now completed.

The above description of FIGS. 38-41 illustrates several example user interfaces that allow a user to resize an inset display area of a PIP display. In some embodiments, the resizing of an inset display area causes changes to the image processing operations of the dual camera mobile device such causing the video conference manager 1604 to change the scaling and compositing of the inset display area in the PIP display in response to the user's input. In addition, in some embodiments the layout of the display area 1155 in FIGS. 38-41 is the same as the layout of the display area 1155 of FIG. 12, described above.

4. Identifying Regions of Interest

Figure 42:
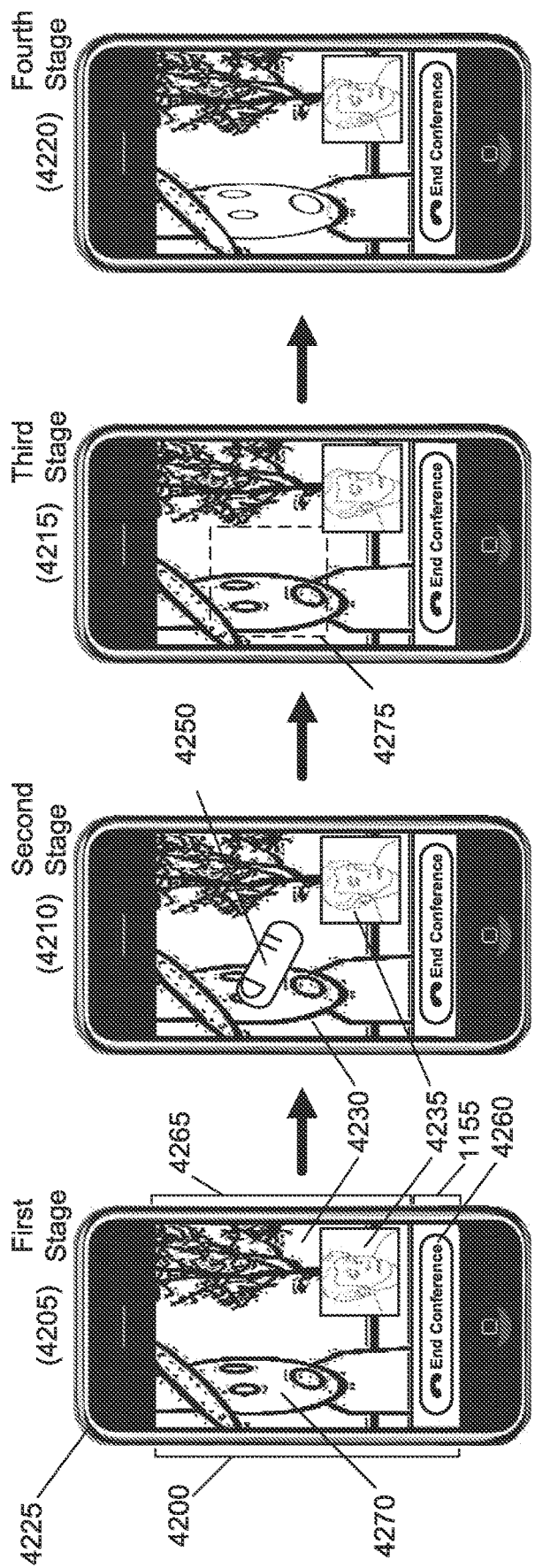
FIG. 42 illustrates a user interface of some embodiments for identifying a region of interest in a display.

Some embodiments allow a user to identify a region of interest (ROI) in a displayed video during a video conference in order to modify the image processing (e.g., the image processing manager 1608 in FIG. 16), the encoding (e.g., the encoder 1655 in FIG. 16), the behavior of the mobile devices and their cameras during the video conference, or a combination thereof. Different embodiments provide different techniques for identifying such a region of interest in a video. FIG. 42 illustrates a user interface of some embodiments for identifying a region of interest in a video in order to improve the image quality of the video.

In FIG. 42, a UI 4200 of a mobile device 4225 presents a PIP display 4265 during a video conference with a remote user of another mobile device. The PIP display in FIG. 42 is substantially similar to the one in FIG. 41. Specifically, the PIP display in FIG. 42 includes two video displays: a background main display 4230 and a foreground inset display 4235. In this example, the background main display 4230 presents a video of a tree and a person with a hat, which are assumed to be a tree and a person whose video is being captured by the remote device's front camera or a tree and a person whose video is being captured by the remote device's back camera. The foreground inset display 4235 presents a video of a man, which in this example is assumed to be a man whose video is being captured by the local device's front camera or a person whose video is being captured by the local device's back camera. Below the PIP display is a display area 1155 that includes a selectable UI item 4260 labeled "End Conference" (e.g. a button 4260) that allows the user to end the video conference by selecting the item.

This PIP display is only one manner of presenting a composite view of the videos being captured by the remote and local devices. Some embodiments may provide other composite views. For instance, instead of having a larger background display for the video from the remote device, the larger background display can be of the video from the local device and the smaller foreground inset display can be of the video from the remote device. Also, some embodiments allow the local and remote videos to appear in the UI in two side-by-side display areas (e.g. left and right display windows, or top and bottom display windows) or two diagonally aligned display areas. In other embodiments, the PIP display may also contain a larger background display and two smaller foreground inset displays. The manner of the PIP display or a default display mode may be specified by the user in some embodiments.

FIG. 42 illustrates the ROI identification operation in terms of four operational stages of the UI 4200. As shown in the first stage 4205, the video presented in the background display 4230 has very low quality (i.e., the video images are fuzzy). In this example, a user of a mobile device 4225 would like to identify the area in the background display 4230 where the person's face 4270 appears as the region of interest.

In the second stage 4210, the operation of identifying a region of interest is initiated. In this example, the operation is initiated by selecting an area in the video presented in the background display 4230 that the user wants to identify as the region of interest (e.g., by tapping a finger 4250 on the device's screen at a location about the displayed person's face 4270 in the background display 4230).

As shown in the third stage 4215, the user's selection of the area causes the UI 4200 to draw an enclosure 4275 (e.g., a dotted square 4275) surrounding the area of the user's selection. The fourth stage 4220 displays the UI 4200 after the identification of the region of interest has been completed. As a result of this process, the quality of the video within the region of interest has been substantially improved from that in the first stage 4205. The removal of the enclosure 4275 indicates that the ROI selection operation is now completed. In some embodiments, the ROI identification process also causes the same changes to the same video displayed on the remote device as it does to the local device 4225. In this example for instance, the picture quality within the region of interest of the same video displayed on the remote device is also substantially improved.

In some embodiments, the user may enlarge or shrink the enclosure 4275 in the third stage 4215 (e.g., by holding the finger 4250 down on the display and moving the finger 4250 toward the upper right corner of the screen to enlarge the enclosure 4275 or moving the finger 4250 toward the lower left corner of the screen to shrink the enclosure 4275). Some embodiments also allow the user to relocate the enclosure 4275 in the third stage 4215 (e.g., by holding the finger 4250 down on the display and moving the finger 4250 horizontally or vertically on the display). In some other embodiments, the selection of the area may not cause the UI 4200 to draw the enclosure 4275 at all in the third stage 4215.

Figure 43:
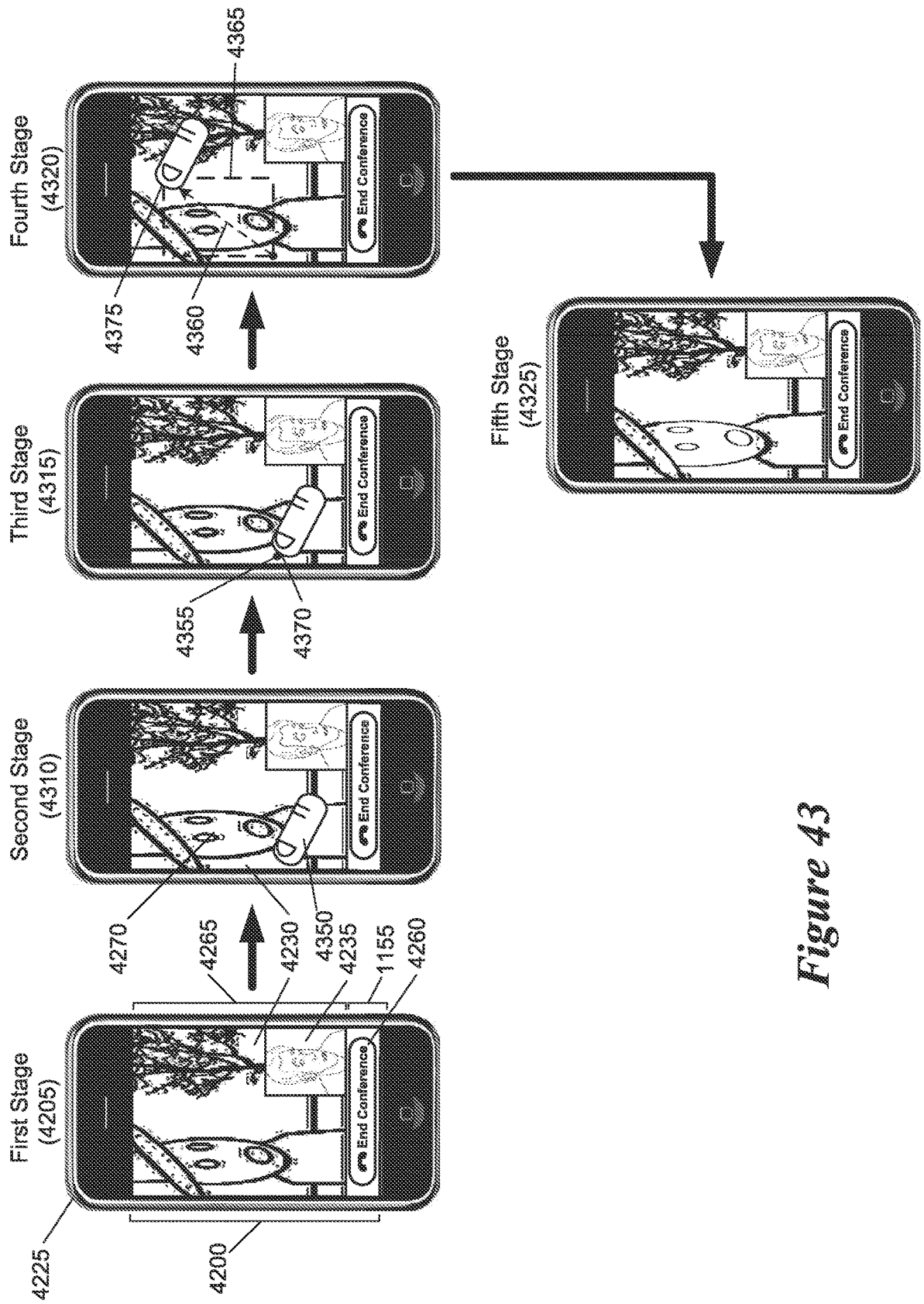
FIG. 43 illustrates another user interface of some embodiments for identifying a region of interest in a display.

Other embodiments provide different techniques for allowing a user to identify a region of interest in a video. FIG. 43 illustrates one such other technique. In FIG. 43, the user identifies a region of interest by drawing a shape that bounds the region. The shape in this example is a rectangle, but it can be other shapes (e.g., any other polygon, a circle, an ellipse, etc.). Some embodiments provide this alternative technique of FIG. 43 in a device UI that also provides the technique illustrated in FIG. 42. Other embodiments, however, do not provide both these techniques in the same UI.

FIG. 43 illustrates this ROI identification operation in terms of five operational stages of a UI 4200. The first stage 4205 in FIG. 43 is identical to the first stage 4205 in FIG. 42. Specifically, in this first stage 4205, the UI 4200 illustrates a PIP display 4265 with a larger background main display 4230 and a smaller foreground inset display 4235 at the bottom left corner of the PIP display 4265.

In the second stage 4310, the operation of identifying a region of interest is initiated. In this example, the operation is initiated by selecting for a duration of time a first position for defining the region of interest in a video presented in the background display area 4230 (e.g., by holding a finger 4350 down on the device's screen at a location about the displayed person's face 4270 in the background display 4230 for a duration of time). In the third stage 4315, the UI 4200 indicates that the first position 4370 has been selected in terms of a dot 4355 next to the selected first position on the background display area 4230.

The fourth stage 4320 illustrates the UI 4200 after the user has selected a second position 4375 for defining the region of interest. In this example, the user selects this second position 4375 by dragging the finger 4350 across the device's screen from the first location after the dot 4355 appears and stopping at a location between the displayed hat and the displayed tree in the background display area 4230, as indicated by an arrow 4360. As shown in the fourth stage, this dragging caused the UI 4200 to draw a rectangular border 4365 for the region of interest area that has the first and second positions 4370 and 4375 at its opposing vertices.

The fifth stage 4325 illustrates the UI 4200 after identification of the region of interest has been completed. In this example, the user completes identification of the region of interest by stopping the dragging of the finger 4350 and removing the finger 4350 from the device's display screen once the desired region of interest area has been identified. The fifth stage 4325 illustrates that as a result of the drawing process, the quality of the video within the region of interest has been substantially improved from that in the first stage 4205. In some embodiments, the drawing process also causes the same changes to the display on the remote device as it does to the local device 4225. In this example for instance, the picture quality within the region of interest of the same video displayed on the remote device will be substantially improved.

The description of FIGS. 42 and 43, above, illustrates different manners of identifying a region of interest in a video in order to improve the picture quality of the identified region. In some embodiments, improving the picture quality of the identified region of interest causes changes to the encoding operations of the dual camera mobile device such as allocating more bits to the identified region when encoding the video.

Figure 44:
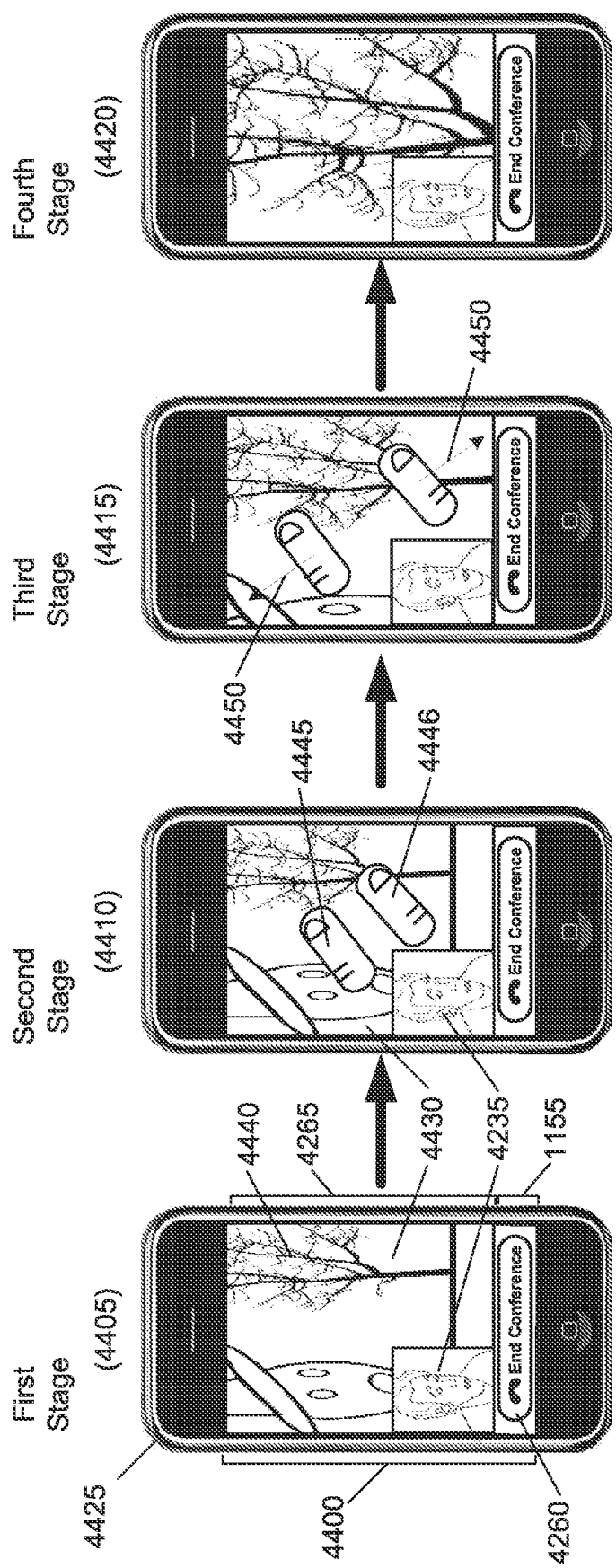
FIG. 44 illustrates another user interface of some embodiments for identifying a region of interest in a display.

Some embodiments allow the user to identify a region of interest in a video to make different changes to the mobile devices or their cameras. For instance, FIG. 44 illustrates an example of identifying a region of interest in a video to expand or shrink the region of interest area on the display. In this approach, the user identifies a region of interest in a video by selecting an area on the display as the center of the region of interest and then expanding or shrinking the region of interest area.

In FIG. 44, a UI 4400 of a mobile device 4425 presents a PIP display 4265 during a video conference with a remote user of another mobile device. The PIP display 4265 in FIG. 44 is substantially similar to the PIP display 4265 of FIG. 42, but the foreground inset display 4235 of FIG. 44 is located in the lower left corner of the PIP display 4265.

FIG. 44 illustrates the ROI selection operation in terms of four operational stages of the UI 4400. As shown in the first stage 4405, the background display 4430 presents a video with a man on the left and a tree 4440 on the right of the display 4430. Moreover, the tree 4440 is relatively small and occupies only the right side of the background display area 4430. In this example, a user of a mobile device 4425 would like to identify the area where the tree 4440 appears on the display 4430 as the region of interest.

In the second stage 4410, the operation of identifying a region of interest is initiated. In this example, the operation is initiated by selecting an area 4440 in the video presented in the background display 4430 that the user wants to identify as the region of interest (e.g., by holding two fingers 4445 and 4446 down on the background display area 4430 where the tree 4440 is displayed). At this stage 4410, the user can make the region of interest area 4440 expand and take a larger portion of the background display area 4430 by dragging his fingers 4445 and 4446 farther away from each other. The user can also make the region of interest 4440 shrink to take a smaller portion of the background display area 4430 by dragging his fingers 4445 and 4446 closer together.

The third stage 4415 illustrates the UI 4400 after the user has started to make the region of interest 4440 expand to take up a larger portion of the background display area 4430 by moving his fingers 4445 and 4446 farther away from each other (i.e., the finger 4445 moves toward the upper left corner of the background display area 4430 and the finger 4446 moves toward the lower right corner of the display 4430), as indicated by arrows 4450. In some embodiments, the finger movement also causes the same changes to the display of the remote device as it does to the local device. In this example for instance, the region of interest of the same video will expand and take up a larger portion of the background display area 4430 of the remote device. In some embodiments, the expansion of the region of interest in the local display and/or remote display causes one or both of the mobile devices or their cameras to modify one or more of their other operations, as further described below.

The fourth stage 4420 displays the UI 4400 after the identification of the region of interest has been completed. In this example, the user completes the identification of the region of interest by stopping the dragging of his fingers 4445 and 4446 and removing the fingers 4445 and 4446 from the device's display screen once the region of interest has reached the desired proportion in the background display area 4430. As a result of this process, the region of interest has taken up a majority of the background display 4430. The identification of the region of interest operation is now completed.

Some of the examples above illustrate how a user may identify a region of interest in a video for improving the image quality within the selected region of interest in the video (e.g., by increasing the bit rate for encoding the region of interest portion of the video). In some embodiments, identifying a region of interest in the video causes changes to the image processing operations of the mobile device such as exposure, scaling, focus, etc. For example, identifying a region of interest in the video can cause the video conferencing manager 1604 to scale and composite the images of the video differently (e.g., identifying a region of interest to which to zoom).

In other embodiments, identifying a region of interest in the video causes changes to the operation of the mobile device's camera(s) (e.g., frame rate, zoom, exposure, scaling, focus, etc.). In yet other embodiments, identifying a region of interest in the video causes changes to the encoding operations of the mobile device like allocating more bits to the identified region, scaling, etc. In addition, while the example ROI identification operations described above may cause only one of the above-described modifications to the mobile device or its cameras, in some other embodiments the ROI identification operation may cause more than one of the modifications to the operation of the mobile device or its cameras. In addition, in some embodiments, the layout of the display area 1155 in FIGS. 42-44 is the same as the layout of the display area 1155 of FIG. 12, described above.

B. Switch Camera

Some embodiments provide procedures to switch cameras (i.e., change the camera by which images are captured) during a video conference. Different embodiments provide different procedures for performing the switch camera operation. Some embodiments provide procedures performed by a dual camera mobile device for switching cameras of the device (i.e., local switch) while other embodiments provide procedures for the dual camera mobile device to instruct another dual camera mobile device in the video conference to switch cameras of the other device (i.e., remote switch). Yet other embodiments provide procedures for both. Section IV.B.1 will describe a process for performing a local switch camera operation on a dual camera mobile device. Section IV.B.2 will describe a process for performing a remote switch camera operation on the dual camera mobile device.

1. Local Switch Camera

Figure 45:
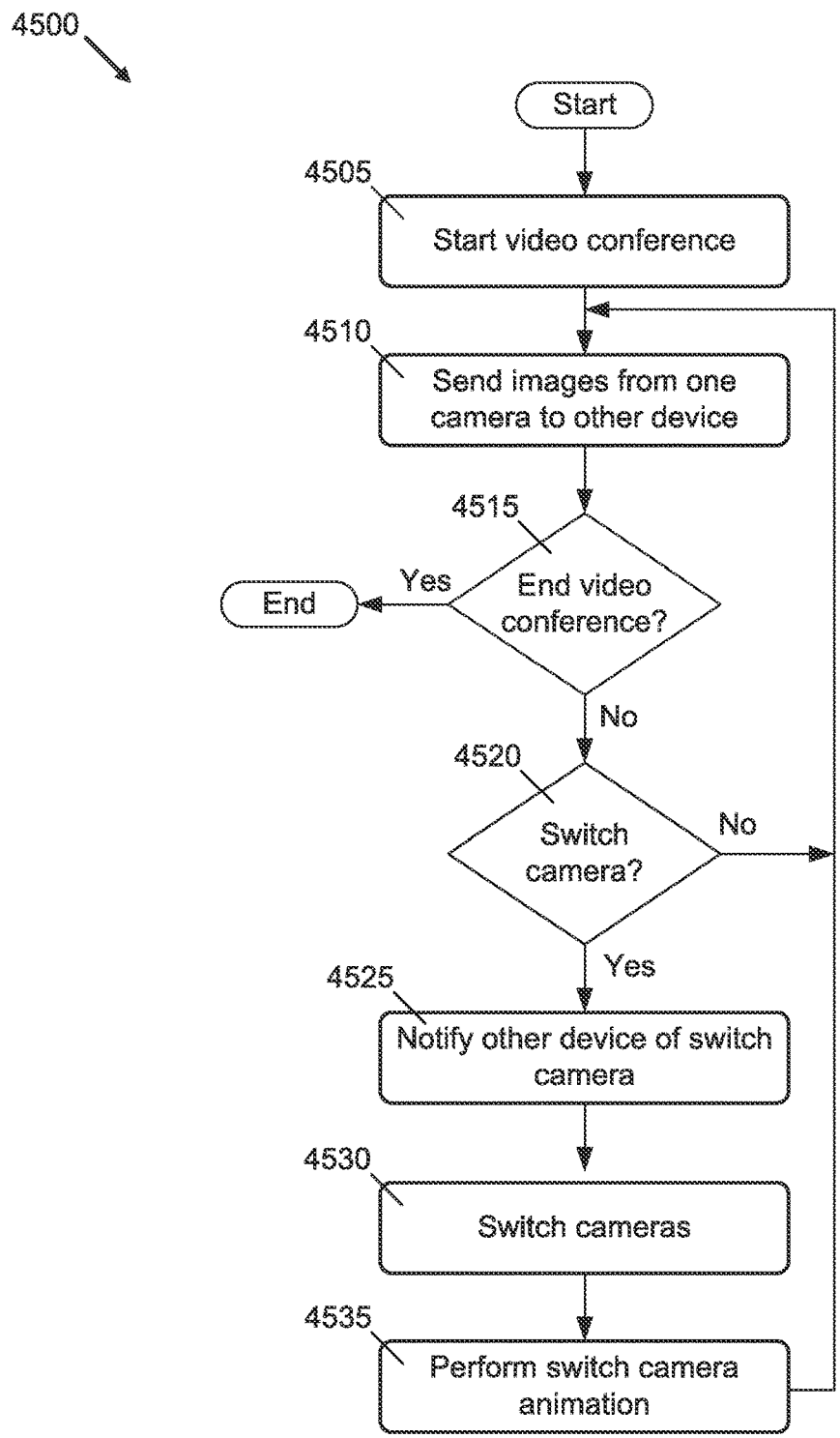
FIG. 45 illustrates a process of some embodiments for performing a local switch camera operation on a dual camera mobile device.

FIG. 45 illustrates a process 4500 that some embodiments perform on a local dual camera mobile device to switch between the two cameras of the device during a video conference with a remote mobile device that includes at least one camera. In some embodiments, the process 4500 is performed by the video conference manager 1604 shown in FIG. 16. For purposes of explanation, the discussion will refer to one camera of the local dual camera mobile device as camera 1 and the other camera of the local dual camera mobile device as camera 2.

The process 4500 begins by starting (at 4505) a video conference between the local dual camera mobile device and the remote mobile device. Next, the process 4500 sends (at 4510) a video image from the currently selected camera (e.g., the camera 1) of the local dual camera mobile device to the remote mobile device for display on the remote mobile device. At 4510, the process also generates and displays a composite display based on this video image and the video image that it receives from the remote mobile device.

The process 4500 then determines (at 4515) whether a request to end the video conference is received. As described above, a video conference can end in some embodiments at the request of a user of the local dual camera mobile device (e.g., through a user interface of the local dual camera mobile device) or a user of the remote mobile device (e.g., through a user interface of the remote mobile device). When the process 4500 receives a request to end the video conference, the process 4500 ends.

When the process 4500 does not receive a request to end the video conference, the process 4500 then determines (at 4520) whether the user of the local dual camera mobile device has directed the device to switch cameras for the video conference. The process 4500 returns to operation 4510 when the process 4500 determines (at 4520) that it has not been directed to switch cameras. However, when the process 4500 determines (at 4520) that it has been so directed, the process 4500 transitions to 4525.

At 4525, the process 4500 sends a notification to the remote mobile device to indicate that the local dual camera mobile device is switching cameras. In some embodiments, the process 4500 sends the notification through the video conference control channel that is multiplexed with the audio and video channels by the VTP Manager 3125 as described above.

After sending its notification, the process 4500 performs (at 4530) a switch camera operation. In some embodiments, performing (at 4530) the switch camera operation includes instructing the CIPU to stop capturing video images with the camera 1 and to start capturing video images with the camera 2. These instructions can simply direct the CIPU to switch capturing images from the pixel array associated with the camera 2 and to start processing these images. Alternatively, in some embodiments, the instructions to the CIPU are accompanied by a set of initialization parameters that direct the CIPU (1) to operate the camera 2 based on a particular set of settings, (2) to capture video generated by the camera 2 at a particular frame rate, and/or (3) to process video images from the camera 2 based on a particular set of settings (e.g., resolution, etc.).

In some embodiments, the switch camera instruction (at 4530) also includes instructions for switching the unused camera to the fourth operational power mode as described above. In this example, the switch camera instructions include instructions for the camera 2 to switch to its fourth operational power mode. In addition, the switch camera instructions also include instructions for the camera 1 to switch from its fourth operational power mode to another operational power mode such as the first operational power mode to conserve power or to the third operational power mode so it can quickly switch to the fourth operational power mode and start capturing images when requested to do so. The switch camera operation 4530 also involves compositing images captured by the camera 2 of the local dual camera mobile device (instead of images captured by the camera 1) with images received from the remote mobile device for display on the local dual camera mobile device.

After directing the switch camera at 4530, the process 4500 performs (at 4535) a switch camera animation on the local dual camera mobile device to display a transition between the display of images from the camera 1 and the display of images from the camera 2. Following the switch camera animation on the local dual camera mobile device, the process 4500 loops back through operations 4510-4520 until an end video conference request or a new switch camera request is received.

Figure 46:
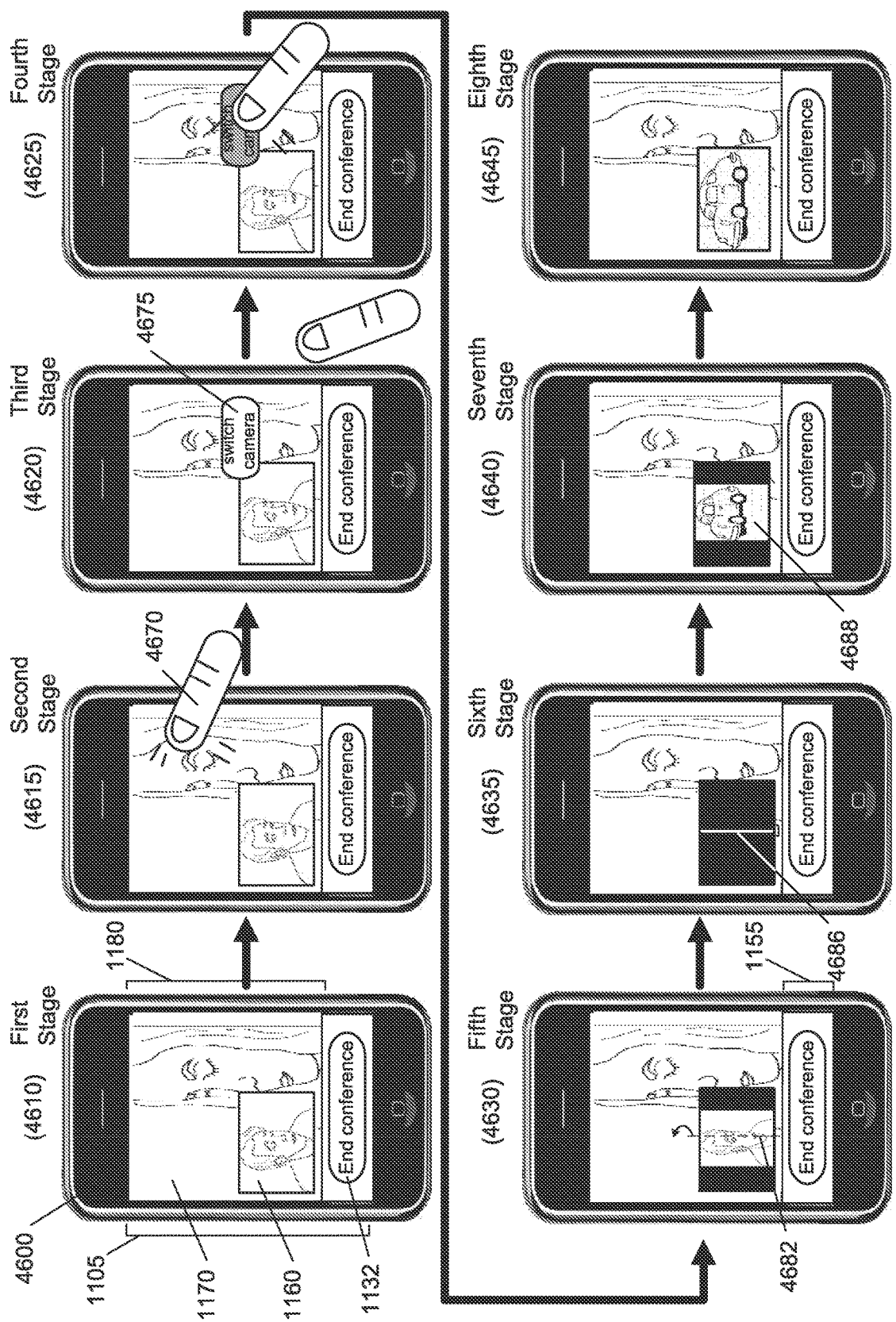
FIG. 46 illustrates a user interface of some embodiments for a switch camera operation.

FIG. 46 illustrates one example of how some embodiments allow a switch camera operation to be requested through a UI 1105 of a dual camera device and how these embodiments animate the switch camera operation. This figure illustrates the switch camera operation in terms of eight different operational stages 4610, 4615, 4620, 4625, 4630, 4635, 4640, and 4645 of the UI 1105 of the device. The first four stages 4610, 4615, 4620, and 4625 of the UI 1105 illustrate an example of receiving a user's request to switch cameras. The user of the device has other mechanisms to make such a request in some embodiments of the invention.

The first stage 4610 is the same as the fifth stage 1130 of the UI 1105 of FIG. 11, which shows the UI 1105 after a video conference is set up. At this stage, the UI 1105 displays a PIP display that includes two video displays: a larger background display from the remote camera and a smaller foreground inset display from the local camera. In this example, the background main display area 1170 presents a video of a lady, which in this example is assumed to be a lady whose video is being captured by the remote device, while the foreground inset display area 1160 presents a video of a man, which in this example is assumed to be a man whose video is being captured by the local device's front camera.

The second stage 4615 then shows the initiation of the switch camera operation through the selection of the PIP display area 1180 of the UI 1105. As shown, a selection is made by placing the user's finger 4670 on the PIP display 1180. The third stage 4620 shows the UI 1105 that includes a selectable UI item 4675 (e.g., switch camera button 4675) for requesting a switch between the cameras of the local device 4600 during the video conference. The fourth stage 4625 illustrates the UI 1105 after the user of the local device 4600 selects (e.g., through a single finger tap) the selectable UI item 4675, and after this selection is indicated through the highlighting of the selectable UI item 4675. By selecting this selectable UI item 4675, the user is directing the device 4600 to switch from the front camera of the device 4600 to the back camera of the device 4600 during the video conference. In other examples where the back camera of the device 4600 is capturing video, the user's selection of the selectable UI item 4675 directs the device 4600 to switch from the back camera of the device 4600 to the front camera of the device 4600. After the fourth stage, the video conference manager sends instructions to the CIPU and the remote device to start the switch camera operation.

The last four stages 4630, 4635, 4640, and 4645 of the UI 1105 illustrate an example of a switch camera animation on the local device. This animation is intended to provide an impression that the video captured from the front and the back cameras of the local device are being concurrently displayed on two opposing sides of a viewing pane that can have only one of its sides viewed by the user at any given time. When a switch camera is requested in the middle of a video conference, this viewing pane is made to appear to rotate around the vertical axis such that the presentation of one camera's video on one side of the viewing pane that was previously showing one camera's video to the user rotates away from the user until it is replaced by the other side of the viewing pane, which shows the video of the other camera. This animation and appearance of the perceived viewing pane's rotation is achieved by (1) gradually shrinking and applying perspective correction operations on the video image from one camera in the display area for that camera, followed by (2) a gradual expansion and reduction in perspective correction operation to the video image from the other camera in the display area.

Accordingly, the fifth stage 4630 illustrates the start of the "rotation of the viewing pane" about the vertical axis 4682. To give an appearance of the rotation of the viewing pane, the UI 1105 has reduced the size of the front camera's video image in the video display area 1160, and has applied perspective operations to make it appear that the right side of the video image is farther from the user than the left side of the video image.

The sixth stage 4635 illustrates that the viewing pane has rotated by 90 degrees such that the user can only view the edge of this pane, as represented by the thin line 4686 displayed in the middle of the display area 1160. The seventh stage 4640 illustrates that the viewing pane has continued to rotate such that the backside of the viewing pane 4688 is now gradually appearing to the user in order to show the video captured from the user's back camera. Again, this representation of the rotation animation is achieved in some embodiments by reducing the size of the back camera's video image in the video display area 4688, and applying perspective operations to make it appear that the left side of the video image is farther from the user than the right side of the video image.

The eighth stage 4645 illustrates the completion of the animation that shows the switch camera operation. Specifically, this stage displays in the display area 1160 the video image of a car that is being captured by the back camera of the device 4600.

Figure 47:
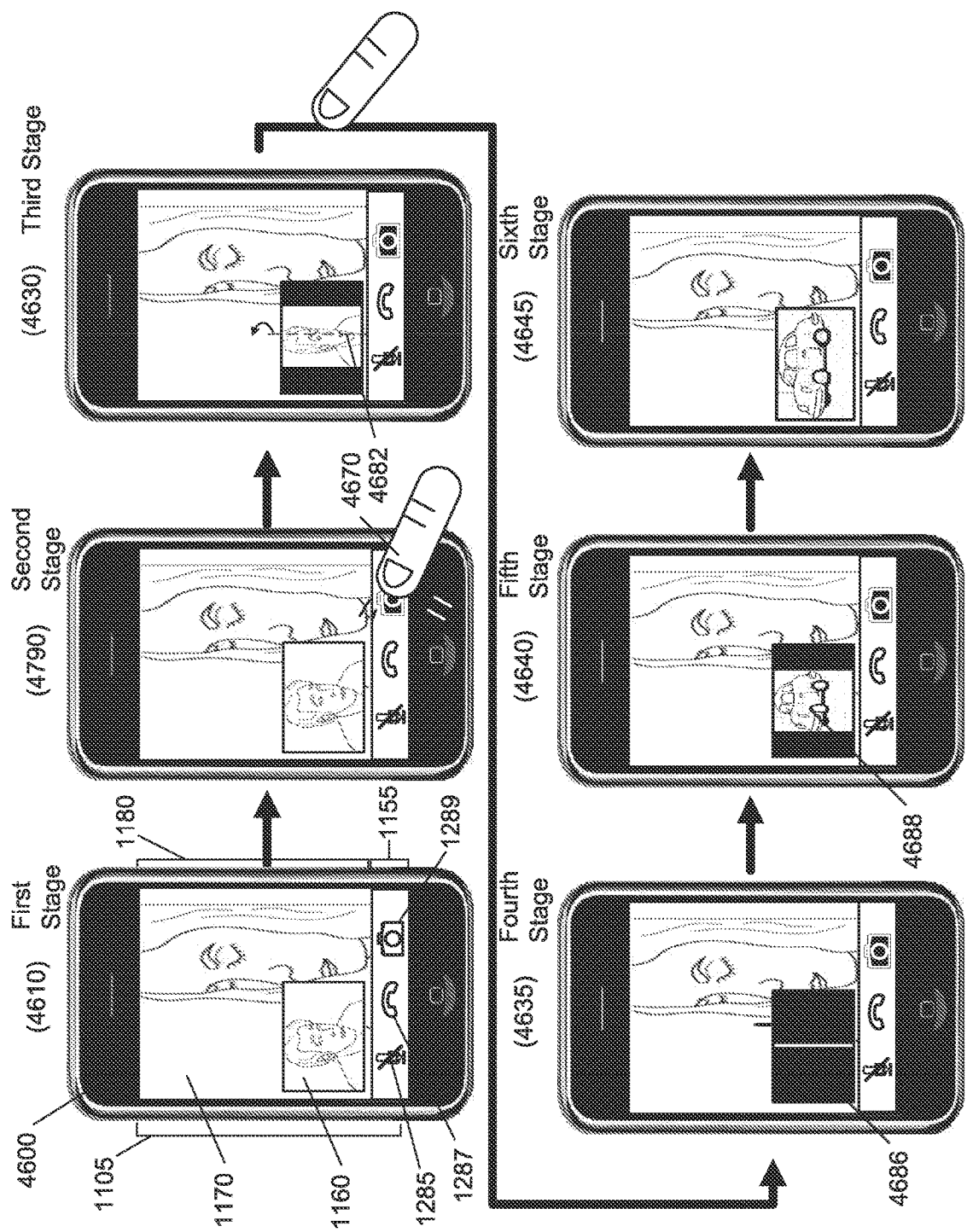
FIG. 47 illustrates another user interface of some embodiments for a switch camera operation.

The example described above by reference to FIG. 46 invokes a switch camera operation through a switch camera user interface. Other embodiments invoke a switch camera operation differently. For example, some embodiments invoke the switch camera operation by having a switch camera selectable UI item permanently displayed on a UI during a video conference such the UI 1105 of FIG. 47. In FIG. 47, a switch camera button 1289 is shown in a display area 1155 along with a mute button 1285 and an end conference button 1287. The layout of the display area 1155 is the same layout of the display area 1155, described above by reference to FIG. 12.

FIG. 47 illustrates the switch camera operation of a UI 1105 in terms of six stages: 4610, 4790, 4630, 4635, 4640, and 4645. The first stage 4610 of FIG. 47 is similar to the first stage 4610 of FIG. 46 except that the layout of the display area 1155 shows a mute button 1285, an end conference button 1287, and a switch camera button 1289 instead of a single end conference button. The second stage 4790 illustrates the UI 1105 after the user of the local device 4600 selects (e.g., through a single finger tap using a finger 4670) the switch camera selectable UI item 1289. In this example, by selecting this selectable UI item 1289, the user directs the device 4600 to switch from the front camera of the device 4600 to the back camera of the device 4600 during the video conference. The last four stages of FIG. 47 are similar to the last four stages of FIG. 46 except the layout of the display area 1155 is the same as the layout described above in the first stage 4610 and therefore will not be further described in order to not obscure the description of the invention with unnecessary detail.

Figure 48:
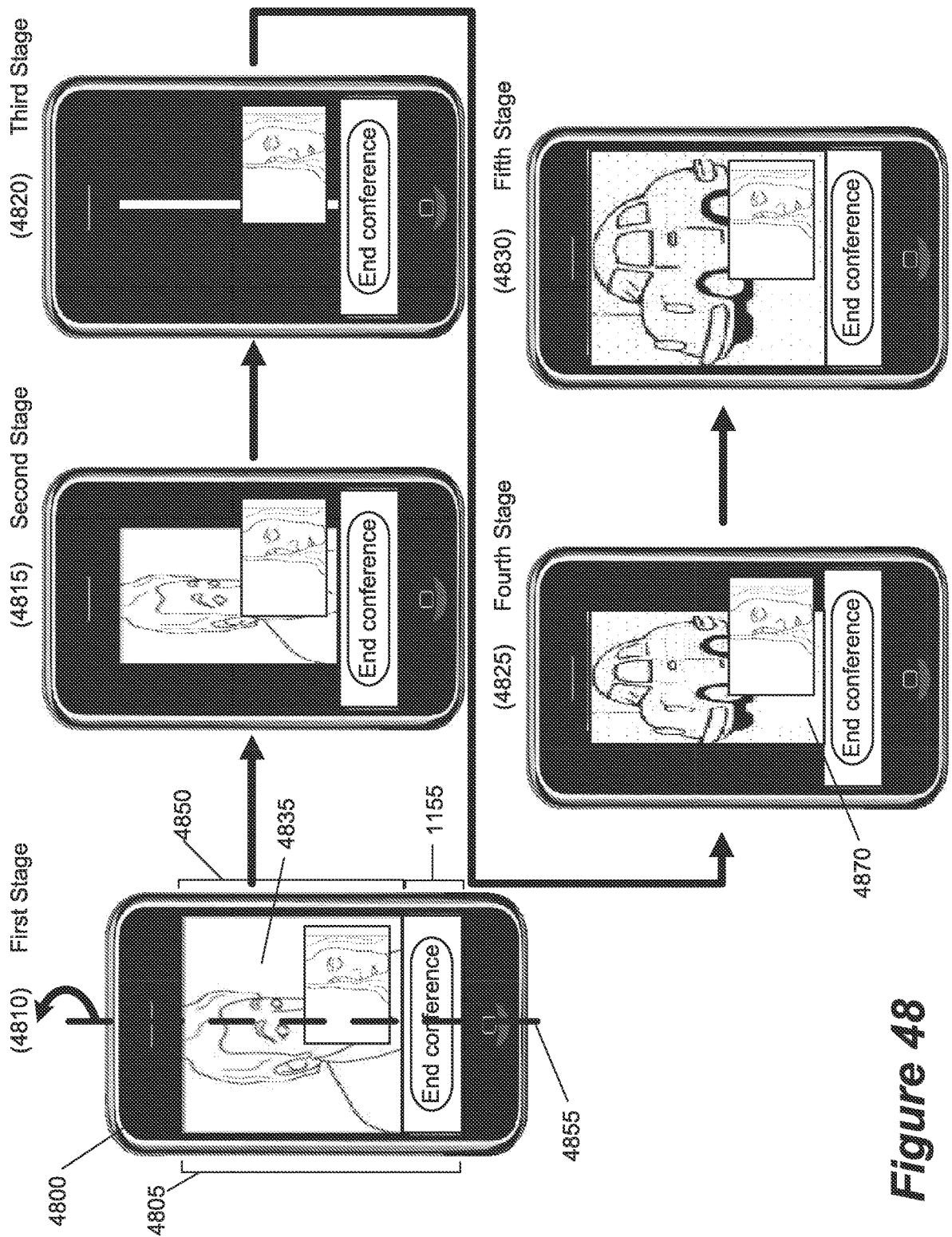
FIG. 48 illustrates another user interface of some embodiments for a switch camera operation.

In some embodiments, when the remote mobile device receives images from a different camera of the local dual camera mobile device (i.e., the local dual camera mobile device switched cameras), the remote mobile device also performs a switch camera animation to display a transition between the display of image from one camera of the local dual camera mobile device and the display of images from the other camera of the local dual camera mobile device. FIG. 48 illustrates an example of one of such switch camera animation in terms of five operational stages 4810, 4815, 4820, 4825, and 4830 of a UI 4805. This figure shows an example switch camera animation on the remote mobile device 4800. The operational stages are the same as the example animation of FIG. 46 except the animation is performed on images displayed in the display area 4835, which is where images from the local dual camera mobile device are displayed on the remote mobile device 4800. As such, the image of the man displayed in the display area 4835 is animated to appear to rotate 180 degrees on a vertical axis 4855 located in the middle of the display area 4850 to show the transition between the display of the image of the man in the display area 4835 and the display of the image of a car 4870. The implementation of the switch camera animation of some embodiments is the same as the implementation of the animation described above.

Figure 49:
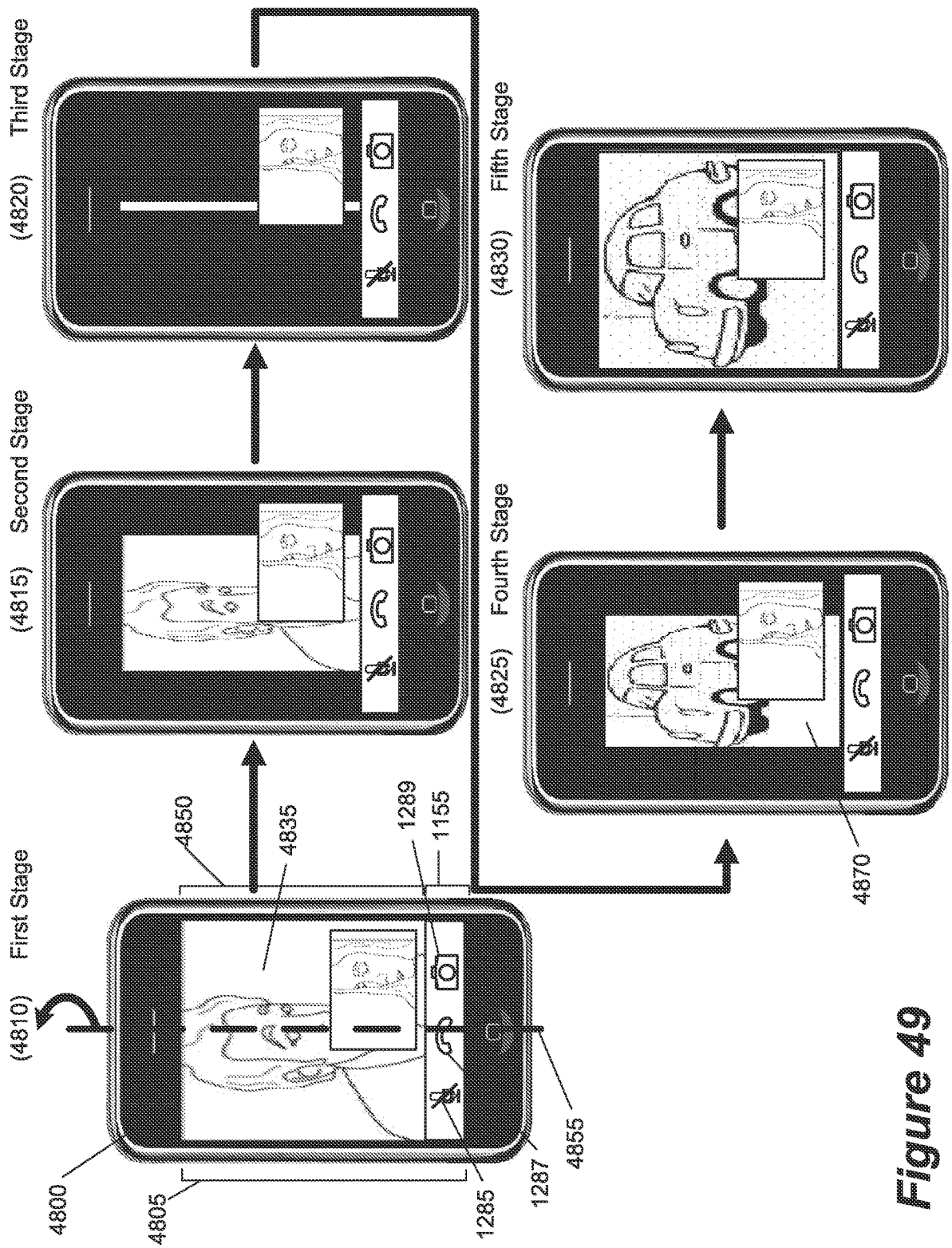
FIG. 49 illustrates another user interface of some embodiments for a switch camera operation.

The above example illustrates a switch camera animation on a remote device with a particular user interface layout. Other embodiments might perform this switch camera animation on a remote device with a different user interface layout. For instance, FIG. 49 illustrates one such example of a remote device 4800 that has a different user interface layout 4805. In particular, UI 4805 of FIG. 49 has a mute button 1285, an end conference button 1287, and a switch camera button 1289 included in a display area 1155, which is permanently displayed on one side of the composite display 4850 during a video conference. The layout of the three buttons is described above by reference to FIG. 48. Other than the different user interface layout, the five stages 4810, 4815, 4820, 4825, and 4830 of FIG. 49 are identical to the five stages 4810, 4815, 4820, 4825, and 4830 of FIG. 48.

2. Remote Switch Camera

Figure 50:
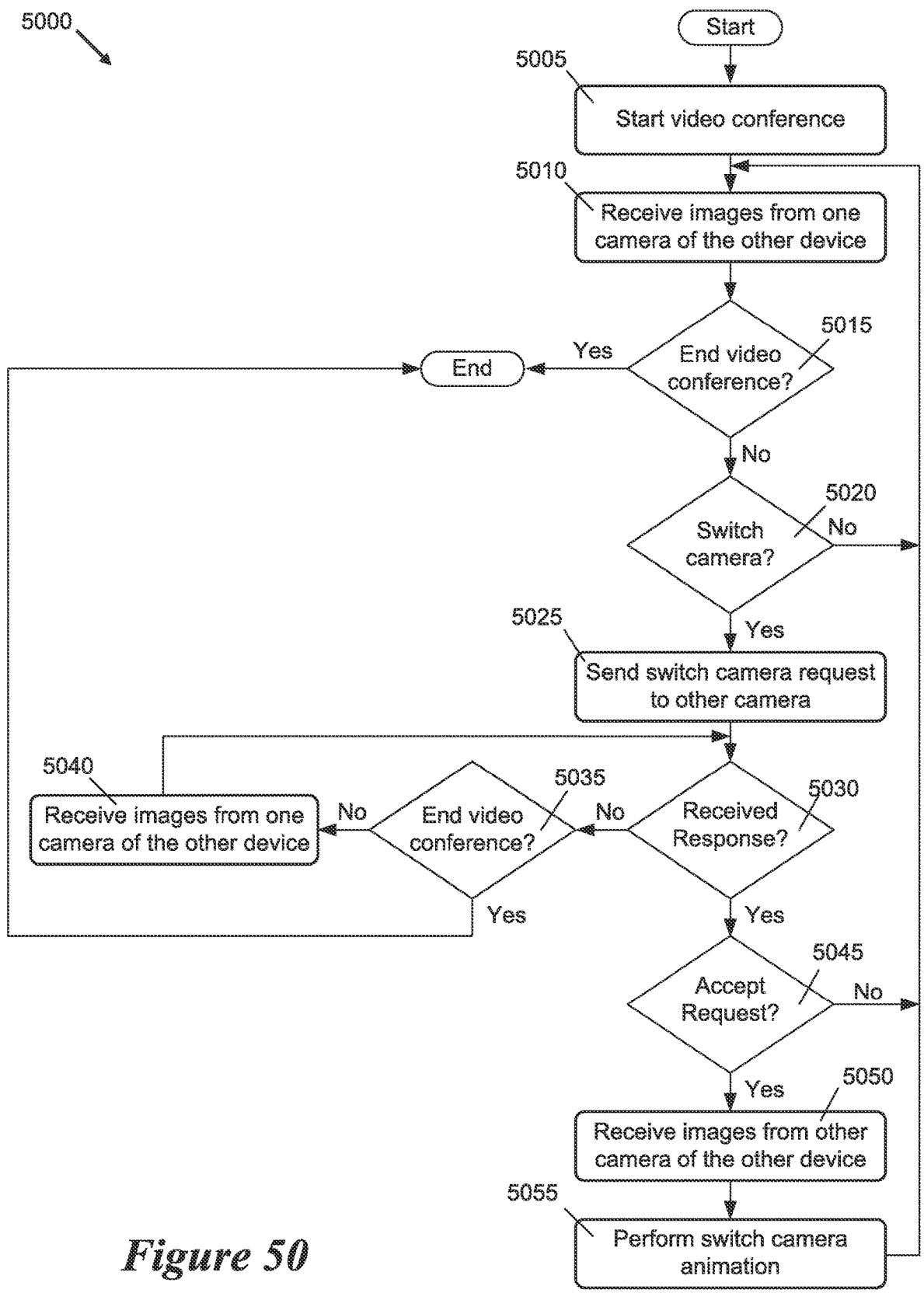
FIG. 50 illustrates a process of some embodiments for performing a remote switch camera operation on a dual camera mobile device.

FIG. 50 illustrates a process 5000 for switching between two cameras of a remote dual camera device during a video conference. This process 5000 is performed by a video conference manager of a device that includes at least one camera. In the following discussion, the device through which a user directs a remote switch camera is referred to as the local device while the device that switches between its two cameras is referred to as the remote device. Also, in the discussion below, the remote device is said to switch between its front camera (or camera 1) and its back camera (or camera 2).

Figure 51:
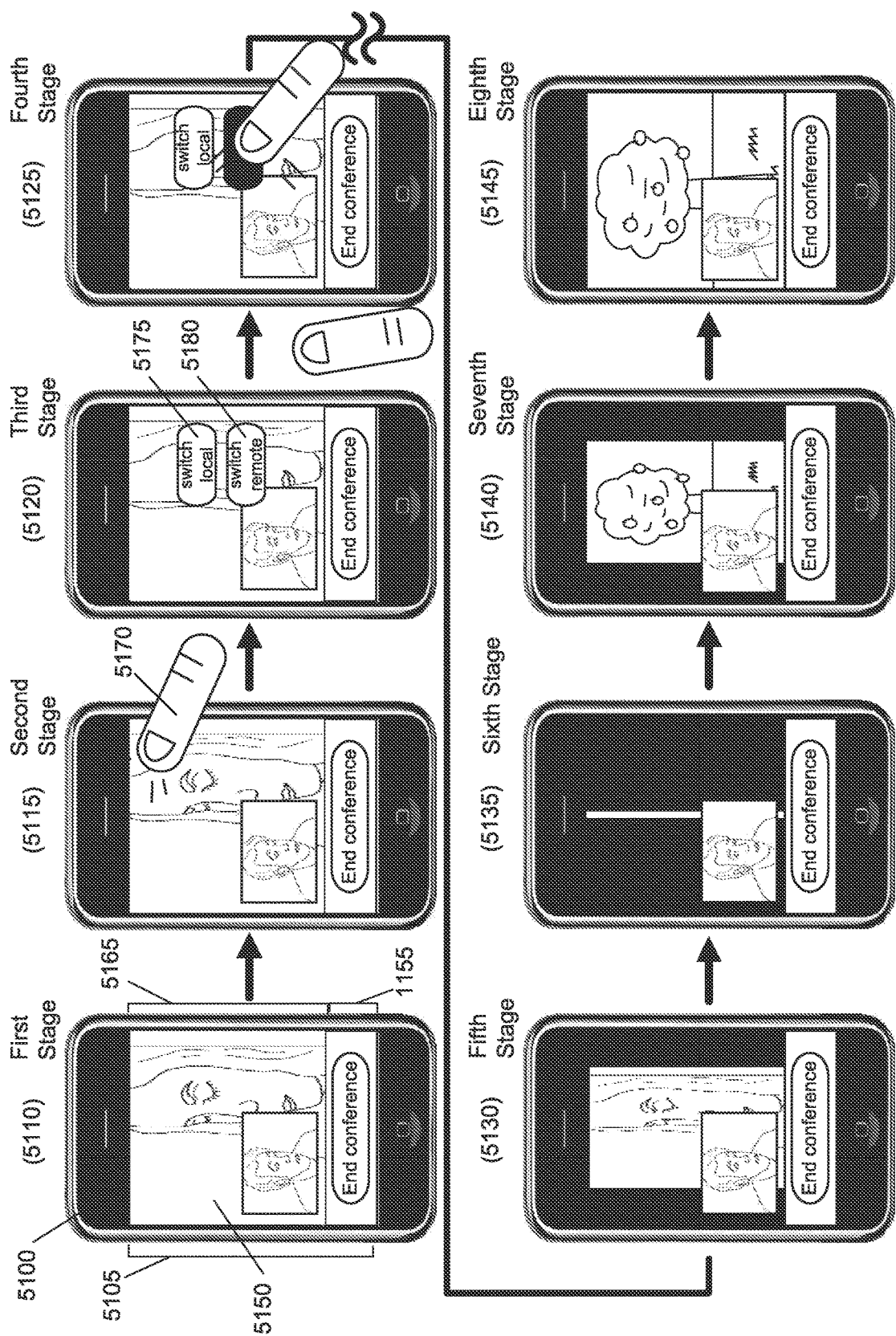
FIG. 51 illustrates a user interface of some embodiments for a remote control switch camera operation.
Figure 52:
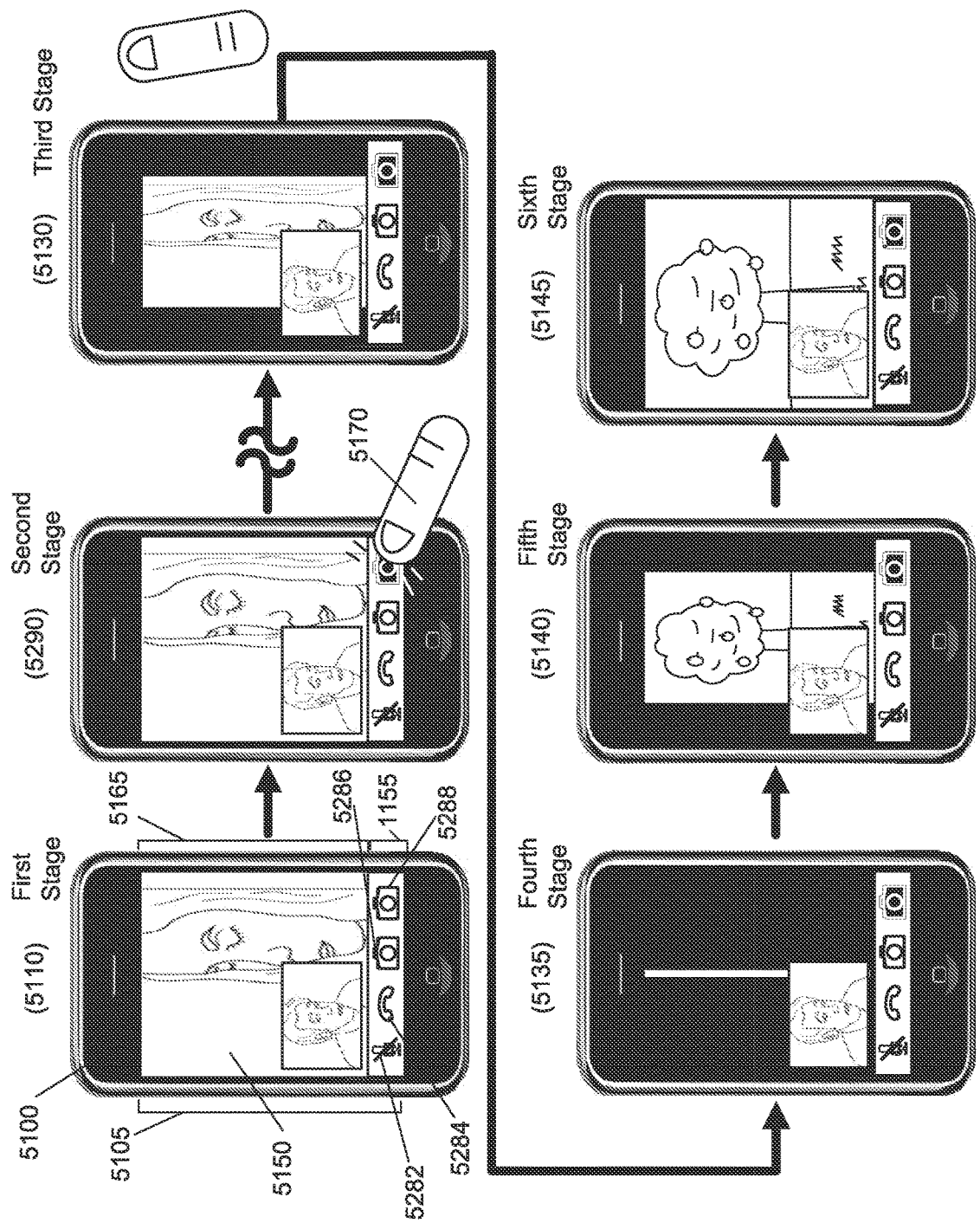
FIG. 52 illustrates another user interface of some embodiments for a remote control switch camera operation.
Figure 53:
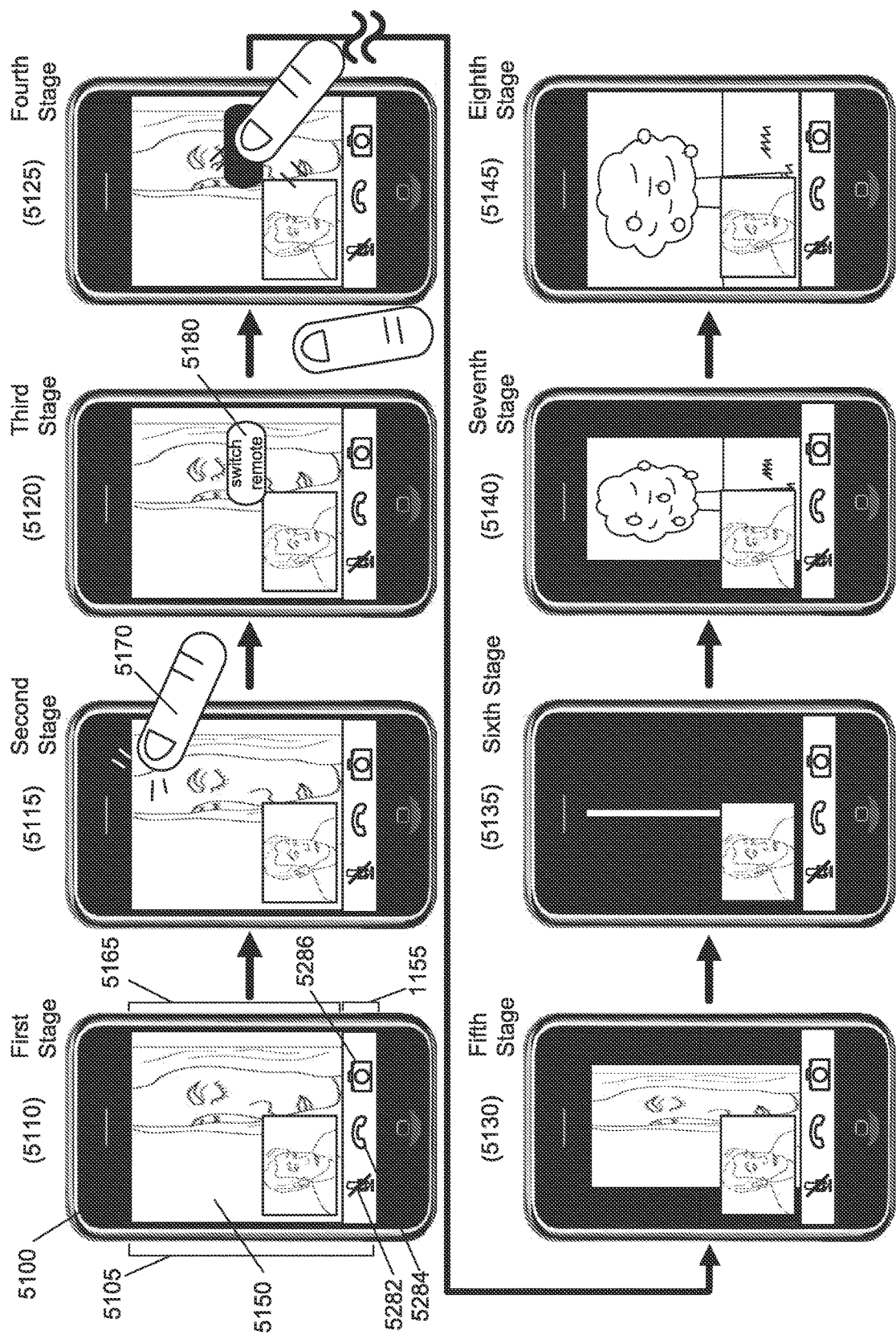
FIG. 53 illustrates another user interface of some embodiments for a remote control switch camera operation.
Figure 54:
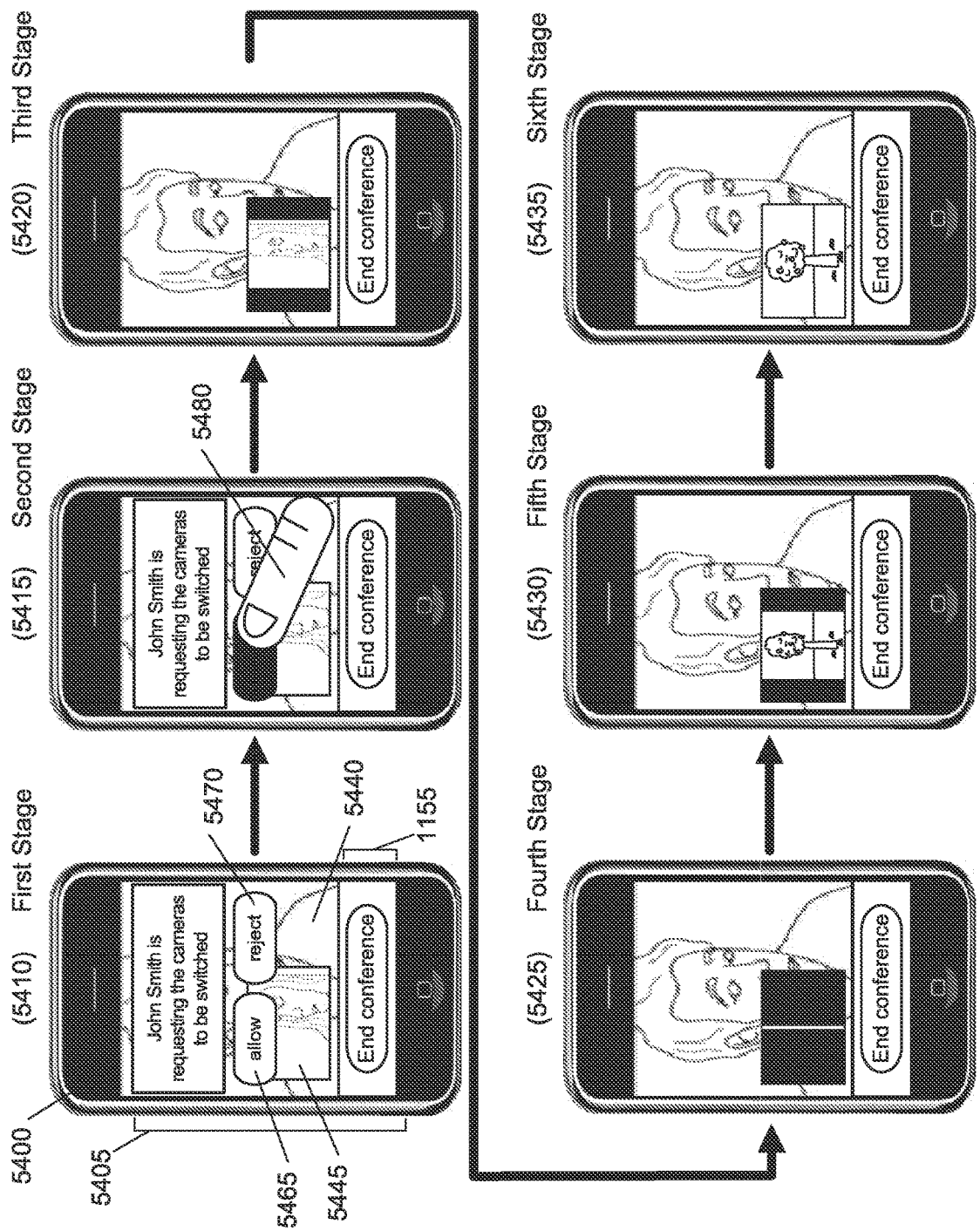
FIG. 54 illustrates another user interface of some embodiments for a remote control switch camera operation.

The process 5000 of FIG. 50 will be described by reference to FIGS. 51, 52, 53, and 54. FIG. 51 illustrates a UI 5105 of a local device 5100 through which a user requests that a remote device switch between its two cameras during a video conference. This figure illustrates eight different operational stages 5110, 5115, 5120, 5125, 5130, 5135, 5140, and 5145 of this UI 5105. FIG. 54 illustrates a UI 5405 of a remote device 5400 that receives the switch camera request from the local device 5100. FIG. 54 illustrates six different operational stages 5410, 5415, 5420, 5425, 5430, and 5435 of the UI 5405.

As shown in FIG. 50, the process 5000 begins by starting (at 5005) a video conference between the local and remote devices. The process 5000 then (at 5010) receives images from one camera of each device (e.g., from the front camera of each device) and generates a composite view for the video conference based on these images. At 5010, the process 5000 also sends a video image from the local device to the remote device.

Next, the process 5000 determines (at 5015) whether a request to end the video conference has been received. As described above, a video conference can end in some embodiments at the request of a user of the local or remote device. When the process 5000 receives a request to end the video conference, the process 5000 ends.

When the process 5000 does not receive a request to end the video conference, the process 5000 then determines (at 5020) whether the user of the device on which the process 5000 is executing (i.e., the user of the local device) has directed the device to request that the remote device switch between its cameras for the video conference. The process 5000 returns to operation 5010 when the process 5000 determines (at 5020) that it has not been directed to initiate a remote switch camera. When the process 5000 determines (at 5020) that it has been so directed, the process 5000 transitions to 5025, which will be described further below.

The first four stages 5110, 5115, 5120, and 5125 of the UI 5105 of FIG. 51 illustrate an example of receiving a user's request to switch cameras of the remote device. The first and second stages 5110 and 5115 are the same as the first and second stages 4610 and 4615 of FIG. 46. The third stage 5120 is the same as the third stage 4620 except the third stage 5120 includes a selectable UI item 5180 for a request to the remote device 5100 to switch cameras in addition to the selectable UI item 5175 for requesting the local device 5100 to switch cameras. The fourth stage 5125 illustrates the user of the local device 5100 selecting the UI item 5180 (e.g., through a single finger tap 5170 of the selectable UI item 5180) for requesting the remote device to switch cameras. The selection is indicated by the highlighting of the selectable UI item 5180. FIG. 51 shows one example of performing this operation, but other embodiments may differently perform the operation for requesting the remote device to switch cameras.

The example described above by reference to FIG. 51 invokes a remote switch camera operation through a remote switch camera user interface. Other embodiments invoke a remote switch camera operation differently. For instance, some embodiments invoke the switch camera operation by having a switch camera selectable UI item permanently displayed on a UI during a video conference such as the UI 5105 of FIG. 52. In FIG. 52, a remote switch camera button 5288 is shown in a display area 1155 along with a mute button 5282, an end conference button 5284, and a local switch camera button 5286.

FIG. 52 illustrates the remote switch camera operation of the UI 5105 of the device 5100 in terms of six different stages 5110, 5290, 5130, 5135, 5140, and 5145. The first stage 5110 of FIG. 52 is similar to the first stage 5110 of FIG. 51 except that the layout of the display area 1155 shows a mute button 5282, a local switch camera button 5286, a remote switch camera button 5288, and an end conference button 5284. The second stage 5290 illustrates the UI 1105 after the user of the local device 5100 selects (e.g., through a single finger tap 5170) the remote switch camera selectable UI item 5288. The last four stages of FIG. 52 are similar to the last four stages of FIG. 51 except the layout of the display area 1155 is the same as the layout described above in the first stage 5110 and therefore will not be further described in order to not obscure the description of the invention with unnecessary detail.

Some embodiments provide a similar layout as the one illustrated in FIG. 52 except the remote switch camera selectable UI item is displayed in PIP display 5165 instead of the display area 1155. FIG. 53 illustrates such a layout 5105. In particular, the figure shows the PIP display with the remote switch camera selectable UI item 5180 and the display area 1155 with only a mute button 5282, a local switch camera button 5286, and an end conference button 5284.

As mentioned above, the process 5000 transitions to 5025 when the user requests a remote switch camera. At 5025, the process 5000 sends the request to switch cameras to the remote device. In some embodiments, this request is sent through the video conference control channel that is multiplexed with the audio and video channels by the VTP Manager 3125 as described above.

After the request to switch cameras is received, the process 5000 determines (at 5030) whether the remote device has responded to the request to switch cameras. In some embodiments, the remote device automatically sends an accept response (i.e., sends an acknowledgement) to the local device through the video-conference control channel. In other embodiments, however, the user of the remote device has to accept this request through the user interface of the remote device.

The first two stages 5410 and 5415 of the UI 5405 of FIG. 54 illustrate an example of the remote user accepting a request to switch cameras of the remote device 5400. The first stage 5410 shows (1) a display area 5440 for displaying text that notifies the remote user of the request, (2) a selectable UI item 5465 (e.g., allow button 5465) for accepting the request to switch cameras of the remote device, and (3) a selectable UI item 5470 (e.g., reject button 5470) for rejecting the request to switch cameras of the remote device. The second stage 5415 then illustrates the UI 5405 after the user of the remote device has selected (e.g., through a single finger tap 5480) the UI item 5465 for accepting the request to switch cameras, as indicated by the highlighting of the selectable UI item 5465.

When the process 5000 determines (at 5030) that it has not yet received a response from the remote device, the process 5000 determines (at 5035) whether a request to end the video conference has been received. If so, the process 5000 ends. Otherwise, the process receives (at 5040) images from the currently used cameras of the remote and local devices, generates a composite view for the video conference based on these images, transmit the local device's video image to the remote device, and then transitions back to 5030.

When the process 5000 determines (at 5030) that it has received a response from the remote device, it determines (at 5045) whether the remote device accepted the request to switch cameras. If not, the process 5000 returns to operation 5010 to continue to receive images from the camera of the other device. Otherwise, the process receives (at 5050) images from the other camera of the remote device and then performs (at 5055) a switch camera animation on the local device to display a transition between the video of the previously utilized remote camera and the video of the currently utilized remote camera (i.e., the received images at operation 5050). After 5055, the process transitions back to 5010, which was described above.

The last four operational stages 5130, 5135, 5140, and 5145 that are illustrated for the UI 5105 in FIG. 51 illustrate one example of such a remote switch camera animation on the local device 5100. The example animation is similar to the example animation illustrated in the stages 4815, 4820, 4825, and 4830 of FIG. 48 except FIG. 51 shows in the display area 5150 an animation that replaces the video of a woman that is captured by the front camera of the remote device with the video of a tree that is captured by the back camera of the remote device. The last four stages of FIG. 52 and FIG. 53 illustrate the same animation as the one in FIG. 51 except the display area 1155 of FIGS. 52 and 53 contains different selectable UI items than the display area 1155 in FIG. 51.

In some embodiments, when the remote device switches cameras, the UI of the remote device also performs a switch camera animation to display a transition between the two cameras. The last four operational stages 5420, 5425, 5430, and 5435 that are illustrated for the UI 5405 in FIG. 54 illustrate an example of a switch camera animation that is displayed on the remote device 5400 when the remote device 5400 switches between cameras. This animation is similar to the animation illustrated in the stages 4630, 4635, 4640, and 4645 of FIG. 46 except that the animation in the display area 5445 replaces the video of a woman that is captured by the front camera of the remote device 5400 with the video of a tree that is captured by the back camera of the remote device 5400.

As noted above, FIGS. 46, 47, 48, 49, 51, 52, 53, and 54 show various examples of switch camera animations performed on a user interface. In some embodiments, the switch camera animation causes changes to the image processing operations of the respective dual camera mobile device such as scaling, compositing, and perspective distortion, which can be performed by the video conference manager 1604 and the image processing manager 1608, for example.

C. Exposure Adjustment

During a video conference between a dual camera mobile device and another mobile device, different embodiments provide different techniques for adjusting the exposure of images captured by cameras of either mobile device. Some embodiments provide techniques for a user of the dual camera mobile device to adjust the exposure of images captured by a camera of the other device while other embodiments provide techniques for the user to adjust the exposure of images captured by a camera of the dual camera mobile device. Several example techniques will be described in detail below.

Figure 55:
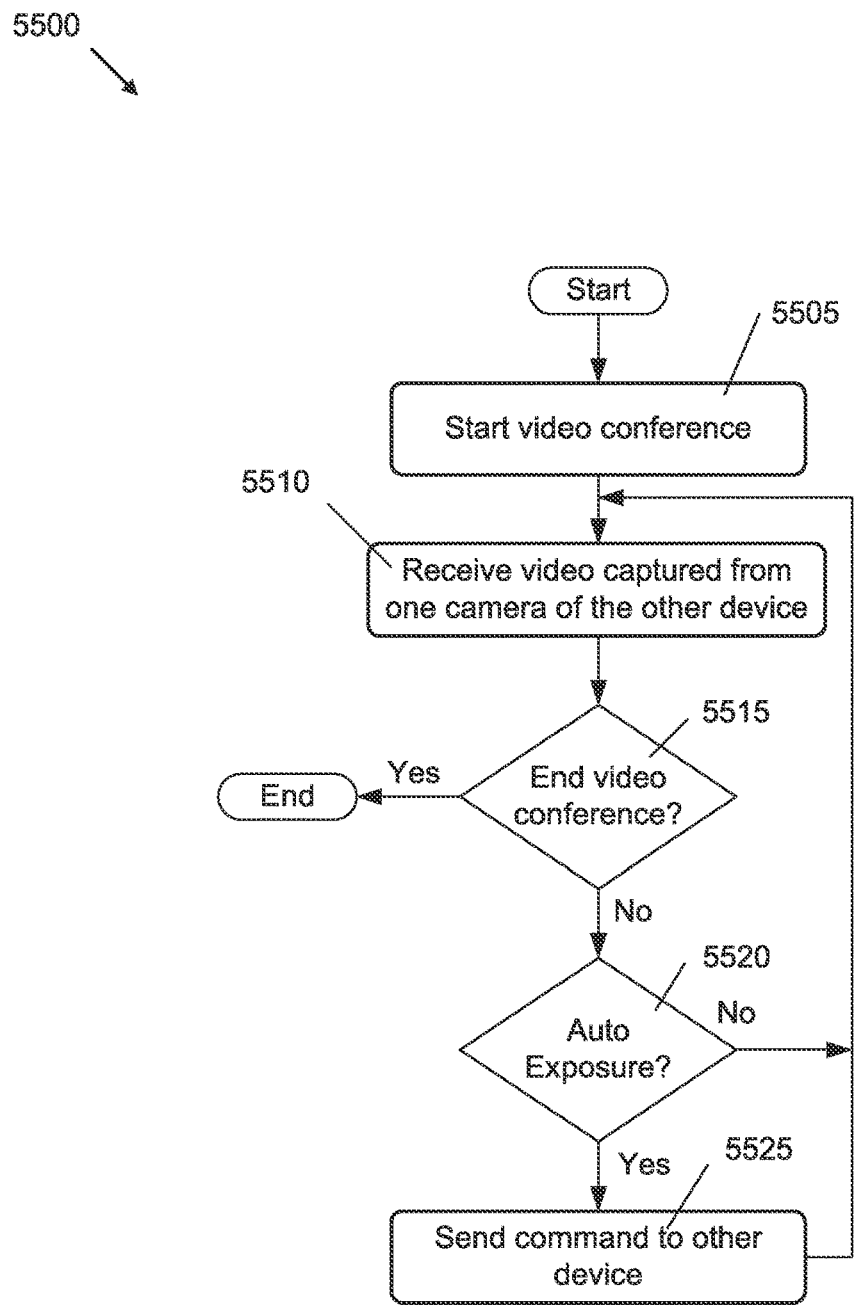
FIG. 55 conceptually illustrates a process of some embodiments for performing an exposure adjustment operation.

FIG. 55 illustrates a process 5500 for performing a remote exposure adjustment operation on a dual camera mobile device of some embodiments during a video conference. In the following discussion, the device through which a user directs a remote device to adjust its exposure level is referred to as the local device. In some embodiments, the process 5500 is performed by the video conference manager of the local device. In addition, the process 5500 will be described by reference to FIGS. 56, 57, and 58, which illustrate various ways for the user of the local device to request the remote device to perform an exposure adjustment operation.

As shown in FIG. 55, the process 5500 begins by starting (at 5505) a video conference between the local and remote devices. The process 5500 then receives (at 5510) a video from the remote device for display on the display screen of the local device. Next, the process 5500 determines (at 5515) whether a request to end the video conference has been received. As described above, some embodiments can receive a request to end the video conference from a user of the local or remote device. When the process 5500 receives a request to end the video conference, the process 5500 ends.

Figure 56:
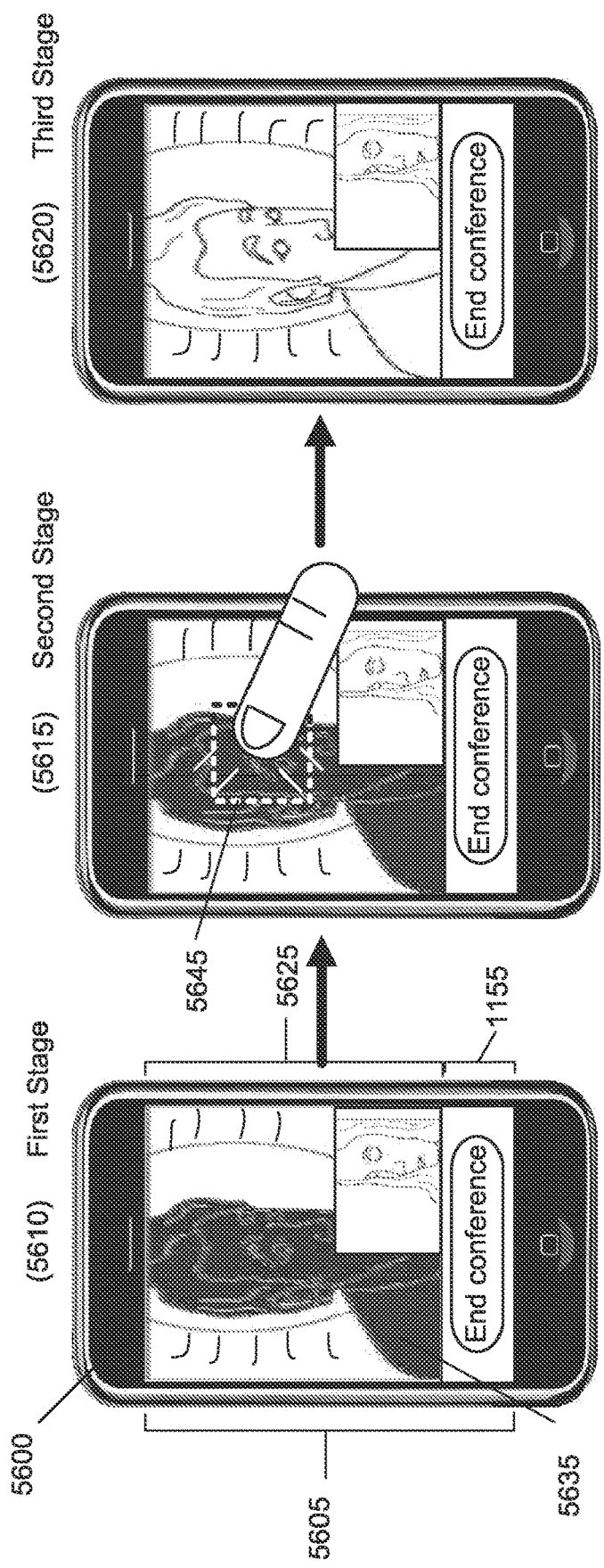
FIG. 56 illustrates a user interface of some embodiments for an exposure adjustment operation.
Figure 57:
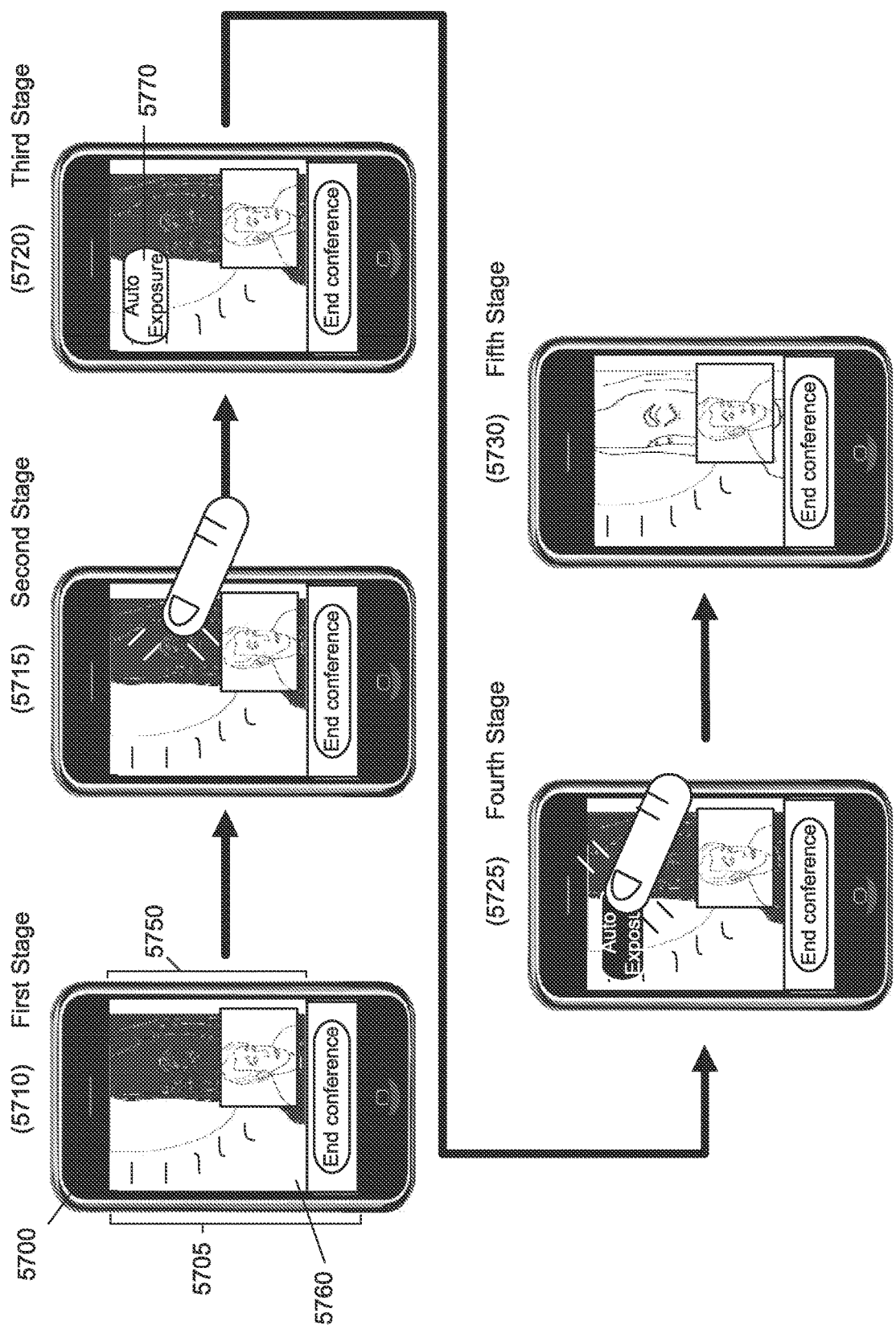
FIG. 57 illustrates another user interface of some embodiments for an exposure adjustment operation.
Figure 58:
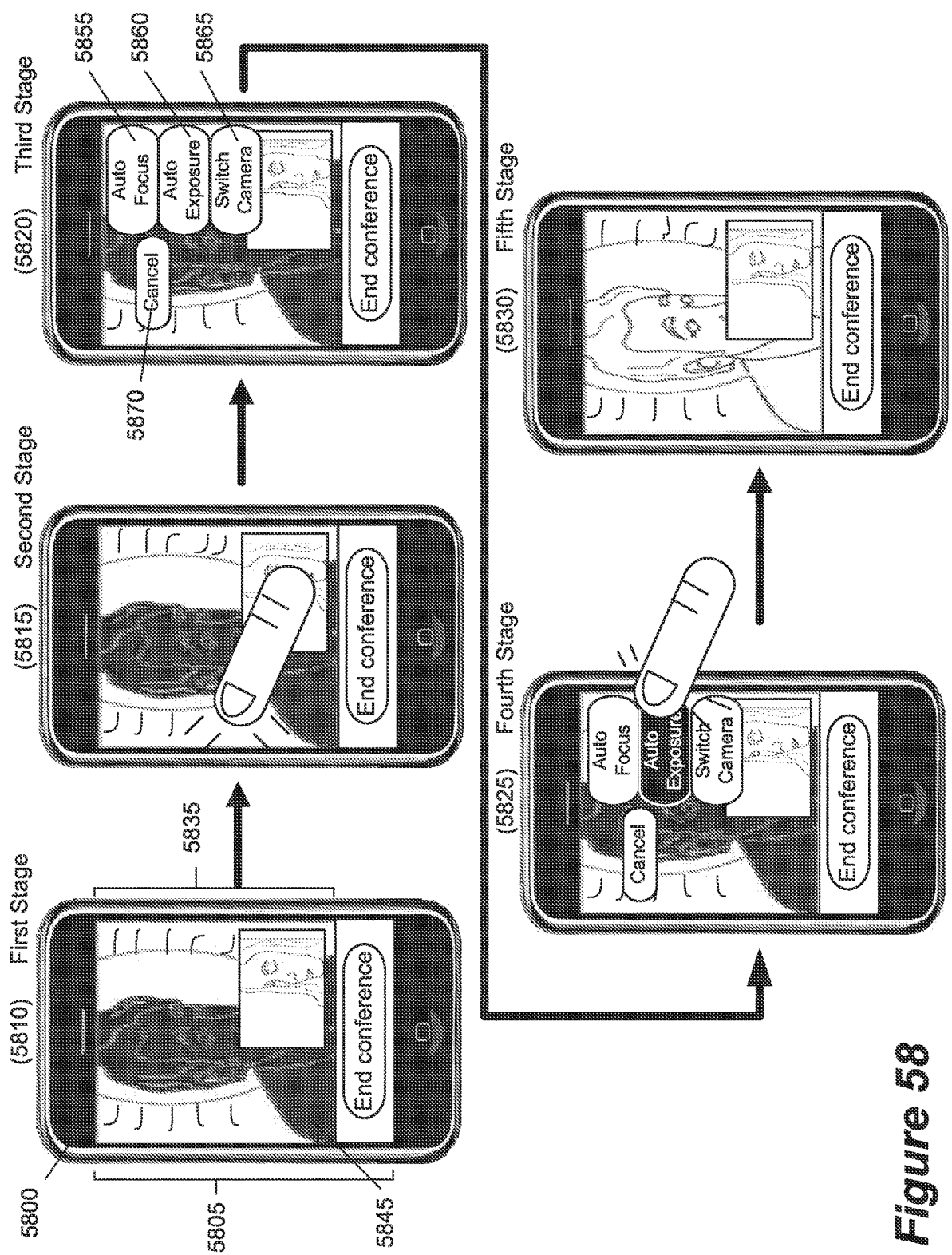
FIG. 58 illustrates another user interface of some embodiments for an exposure adjustment operation.

However, when the process 5500 does not receive a request to end the video conference, the process 5500 then determines (at 5520) whether a request for adjusting the exposure of the remote device's camera has been received. When the process 5500 determines that a request for adjusting the exposure of the remote device's camera has not been received, the process 5500 returns back to operation 5510 to receive additional video captured from the remote device. FIGS. 56, 57, and 58 illustrate three different examples of providing a way for a user to make such a request. In FIGS. 56, 57, and 58, the first stages 5610, 5710, and 5810 all show PIP displays 5625, 5750, and 5835 of the local devices 5600, 5700, and 5800 that display two videos: one captured by a camera of the local device and the other captured by a camera of the remote device. In first stages 5610, 5710, and 5810 the man in the background display 5635, 5760, and 5845 is dark, indicating that the man is not properly exposed.

The second stage 5615 of FIG. 56 illustrates one way for the user of the local device 5600 to request the remote device to perform an exposure adjustment by selecting the remote device's video (e.g., through a single tap on the background display 5635). In this way, the UI 5605 automatically associates the user's selection of a region of interest defined by a box 5645 with the user's desire to direct the remote device to perform an exposure adjustment on the region of interest and thus directs the video conference manager of the local device to contact the remote device to perform an exposure adjustment operation. The defined region of interest is used by the remote device in the calculation of the exposure adjustment.

Like the second stage 5615 of FIG. 56, the second stage 5715 of FIG. 57 shows the local user's selection of the remote device's video except this selection directs the UI 5705 to display a selectable UI item 5770 as shown in the third stage 5720. The fourth stage 5725 illustrates the user of the local device selecting the selectable UI item 5770 to direct the remote device to perform an exposure adjustment operation as described above.

The second stage 5815 of FIG. 58 is similar to the second stage 5715 of FIG. 57, but instead of the user's selection of the remote device's video directing the UI to display a single selectable UI item, the user's selection directs the UI 5805 to display a menu of selectable UI items 5855, 5860, 5865, and 5870, as shown in the third stage 5820. The selectable UI items include an Auto Focus item 5855, an Auto Exposure item 5860, a Switch Camera item 5865, and a Cancel item 5870. In some embodiments, the Switch Camera selectable UI item 5865 is used to request a local switch camera operation while in other embodiments the Switch Camera selectable UI item 5865 is used to request a remote switch camera operation. The fourth stage 5825 illustrates the user selecting the Auto Exposure item 5860 to direct the remote device to perform an exposure adjustment operation as described above.

When the process 5500 determines (at 5520) that the local user directed the local device to request an exposure adjustment operation, the process 5500 sends (at 5525) a command to the remote device through the video conference control channel to adjust the exposure of the video captured by the camera that is currently capturing and transmitting video to the local device. After operation 5525, the process 5500 transitions back to operation 5510, which is described above.

In some embodiments, the user of the remote device is required to provide permission before the remote device performs an exposure adjustment operation, while in other embodiments the remote device performs the exposure adjustment operation automatically upon receiving the request from the local device. Moreover, in some embodiments, some of the video conference functionalities are implemented by the video conference manager 1604. In some of these embodiments, the video conference manager 1604 performs the exposure adjustment operation by instructing the CIPU 1650 to adjust the exposure setting of the sensor of the remote device camera being used.

The last stages 5620, 5730, and 5830 of FIGS. 56, 57, and 58 show the remote device's video lighter, which indicates that the man is properly exposed. Although FIGS. 56, 57, and 58 provide examples of receiving an exposure adjustment request to correct the exposure of a remote device, some embodiments provide ways for user of the local device to request that the local device adjust the exposure of a camera of the local device. Such a request can be made similar to the ways illustrated in FIGS. 56, 57, and 58 for requesting a remote device to adjust its camera's exposure.

FIGS. 56-58 described above show several user interfaces for performing exposure adjustment operations. In some embodiments, the exposure adjustment operation can cause changes to the image processing operations of the dual camera mobile device such as invoking the exposure adjustment process 5900, which is described in further detail below. The exposure adjustment operation can also cause changes to the operation of the camera of the dual camera mobile device that is capturing the video like changing the exposure level setting of the camera, for example.

1. Exposure Adjustment Methodology

Figure 59:
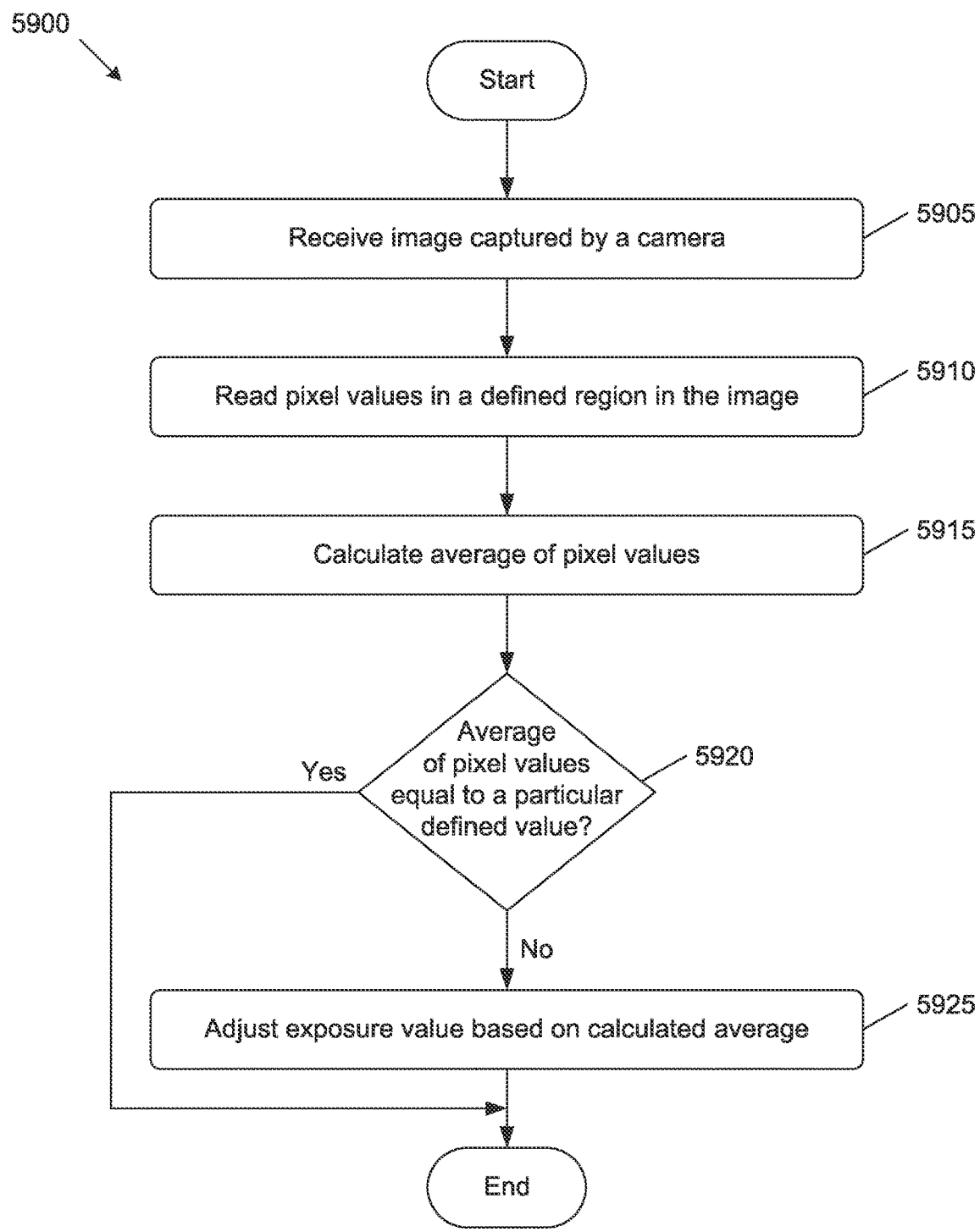
FIG. 59 conceptually illustrates an exposure adjustment process performed by an image processing manager of some embodiments such as that illustrated in FIG. 16.

FIG. 59 conceptually illustrates an exposure adjustment process 5900 performed by an image processing manager of some embodiments such as that illustrated in FIG. 16. In some embodiments, the process 5900 is part of the exposure adjustment operations described above by reference to FIGS. 55, 56, 57, and 58. In some of such embodiments, the image processing manager 1608 performs the process 5900 and adjusts a camera's exposure setting by sending instructions to the video conference manager 1604, which instructs the CIPU 1650 to adjust the camera sensor 405*a* or 405*b*, as mentioned above.

In some embodiments, the process 5900 is performed by the image processing layer 930 shown in FIG. 9 while in other embodiments the process 5900 is performed by the statistics engine 465 shown in FIG. 4. Some embodiments perform the process 5900 on images captured by cameras of (local or remote) devices in a video conference while other embodiments perform the process 5900 as part of the process 2100 (e.g., operation 2110) illustrated in FIG. 21. Some embodiments perform an exposure adjustment operation to expose images captured by the cameras of the dual camera mobile device that are not too light and not too dark. In other words, the process 5900 is performed to capture images in a manner that maximizes the amount of detail as possible.

The process 5900 begins by receiving (at 5905) an image captured by a camera of the dual camera mobile device. In some embodiments, when the received image is a first image captured by a camera of a device in a video conference, the process 5900 is not performed on the first image (i.e., there was no image before the first image from which to determine an exposure value). The process 5900 then reads (at 5910) pixel values of a defined region in the received image. Different embodiments define regions differently. Some of such embodiments define differently shaped regions such as a square, a rectangle, a triangle, a circle, etc. while other of such embodiments define regions in different locations in the image such as center, upper center, lower center, etc.

Next, the process 5900 calculates (at 5915) an average of the pixel values in the defined region of the image. The process 5900 determines (at 5920) whether the calculated average of the pixel values is equal to a particular defined value. Different embodiments define different particular values. For example, some embodiments define the particular value as the median pixel value of the image's dynamic range. In some embodiments, a range of values is defined instead of a single value. In such embodiments, the process 5900 determines (at 5920) whether the calculated average of the pixel values is within the define range of values.

When the calculated average of the pixel values is not equal to the particular defined value, the process 5900 adjusts (at 5925) the exposure value based on the calculated average. When the calculated average of the pixel values is equal to the particular defined value, the process 5900 ends. In some embodiments, an exposure value represents an amount of time that a camera sensor is exposed to light. In some embodiments, the adjusted exposure value is used to expose the next image to be captured by the camera that captured the received image. After the exposure value is adjusted based on the calculated average, the process 5900 ends.

In some embodiments, the process 5900 is repeatedly performed until the calculated average of pixel values is equal to the particular defined value (or falls within the defined range of values). Some embodiments constantly perform the process 5900 during a video conference while other embodiments perform the process 5900 at defined intervals (e.g., 5 seconds, 10 seconds, 30 seconds, etc.) during the video conference. Furthermore, during the video conference, the process 5900 of some embodiments dynamically re-defines the particular pixel value before performing the process 5900.

Figure 60:
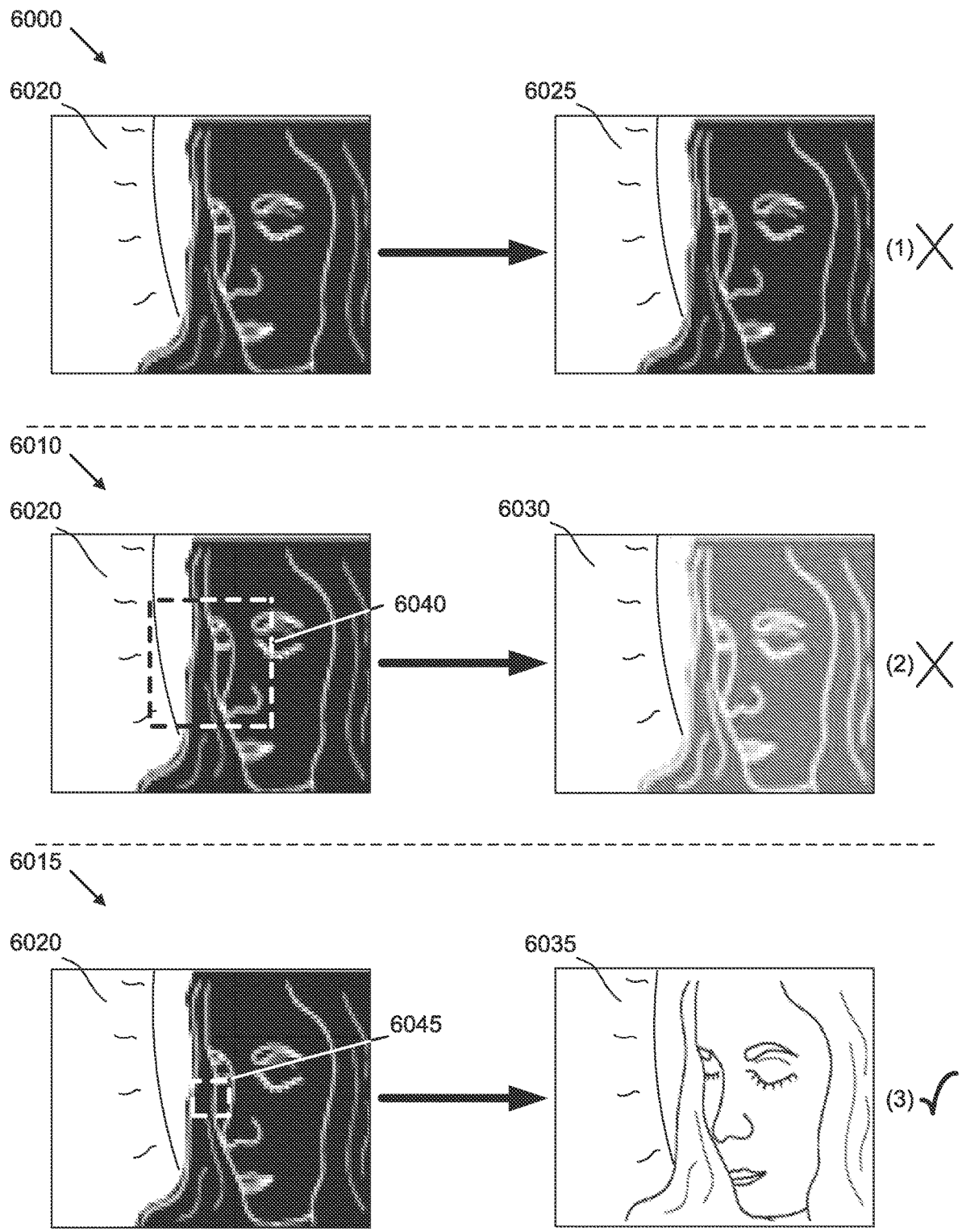
FIG. 60 conceptually illustrates exposure adjustment operations of some embodiments.

FIG. 60 conceptually illustrates examples of exposure adjustment operations of some embodiments. Each of the examples 6000, 6010, and 6015 shows an image 6020 captured by a camera of the dual camera mobile device on the left side. Specifically, the image 6020 shows a dark person in front of a sun. The dark person indicates that the exposure level of the image is not high enough to expose the person's face or body. The right side of each example 6000, 6010, and 6015 shows an image 6025, 6030, and 6035, respectively, captured after the image 6020. In some embodiments, the image 6020 and the images on the right side are images of a video captured by the camera of the dual camera mobile device. In other embodiments, the image 6020 and the image on the right side are still images captured by the camera of the dual camera mobile device at different instances in time.

The first example 6000 illustrates an operation with no exposure adjustment. As such, the image 6025 appears the same as the image 6020. Since no exposure adjustment was performed, the person in the image 6025 remains dark like the person in the image 6020.

In the second example 6010, an exposure adjustment operation is performed on the image 6020. In some embodiments, the exposure adjustment operation is performed by the process 5900 using the defined region 6040. Based on the exposure adjustment operation, the exposure level of the camera is adjusted and the camera captures the image 6030 using the adjusted exposure level. As shown in FIG. 60, the person in the image 6030 is not as dark as the in the image 6025. However, the person's face and body in the image 6030 is still not clear.

The third example 6015 shows an exposure adjustment operation performed on the image 6020. Similar to the second example 6010, the exposure adjustment operation of the example 6015 of some embodiments is performed by the process 5900 using the defined region 6045. Based on the exposure adjustment operation, the exposure level of the camera is adjusted and the camera captures the image 6035 using the adjusted exposure level. As seen in FIG. 60, the person in the image 6035 is perfectly exposed since the person's face and body is visible.

In some embodiments, the selection of the defined region may be made by the user of the dual camera mobile device. The device itself may also automatically adjust its defined region for the exposure adjustment operation through the feedback loop for exposure adjustment mentioned above in the CIPU 400. The statistics engine 465 in FIG. 4 may collect data to determine whether the exposure level is appropriate for the images captured and adjust the camera sensors (e.g., though a direct connection to the sensor module 415) accordingly.

D. Focus Adjustment

Figure 61:
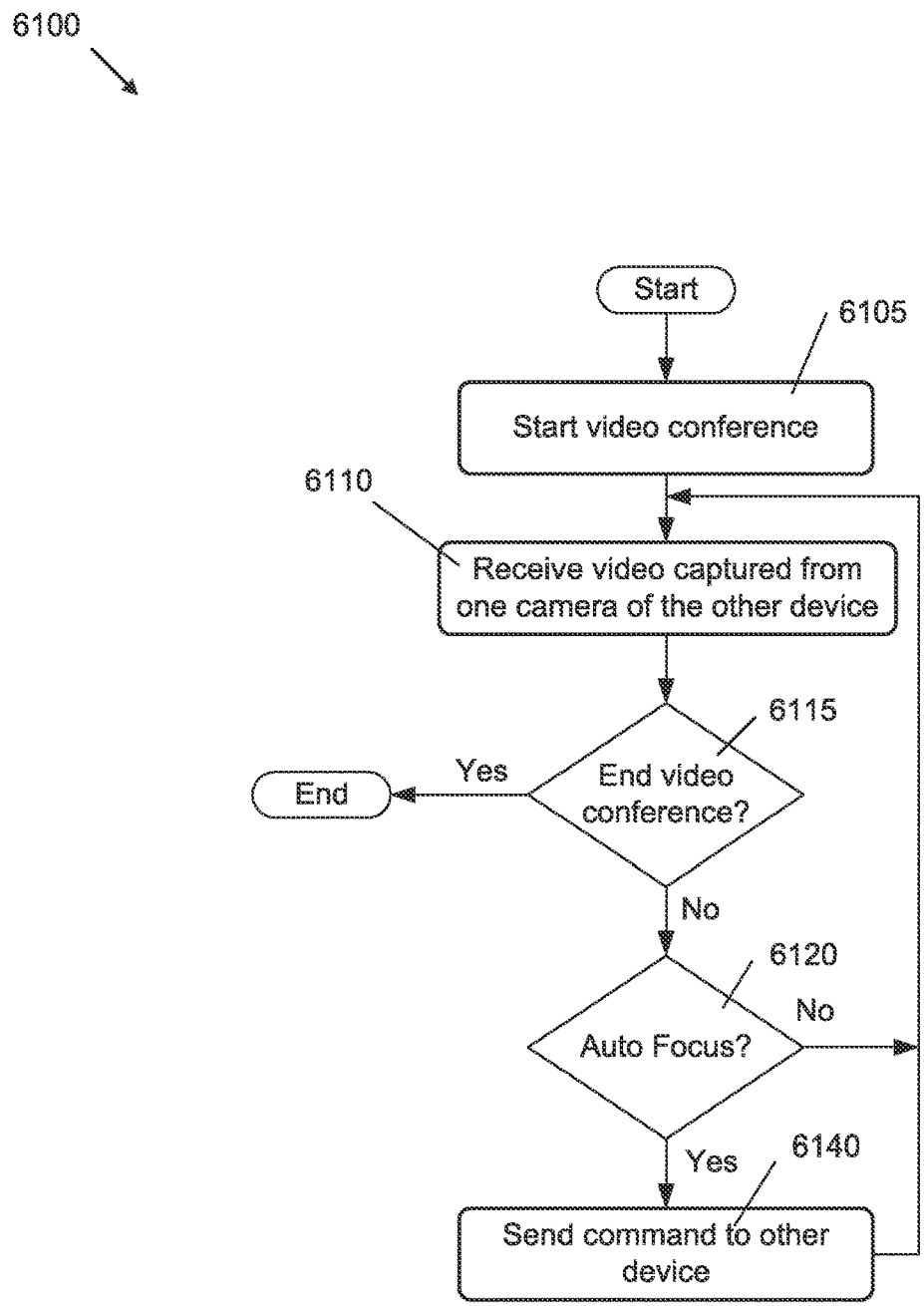
FIG. 61 conceptually illustrates a process of some embodiments for performing a focus adjustment operation.

FIG. 61 illustrates a process 6100 for adjusting the focus of a dual camera mobile device during a video conference. In the following discussion, the device through which a user directs a remote device to adjust its camera focus is referred to as the local device. The process 6100 of FIG. 61 is in some embodiments performed by the video conference manager 1604 of the local device. Also, this process will be described below by reference to FIGS. 62 and 63, which provide two exemplary manners for the user of the local device to request a focus adjustment operation to be performed by the remote device.

As shown in FIG. 61, the process 6100 begins by starting (at 6105) a video conference between the local and remote devices. The process 6100 then receives (at 6110) a video from the remote device for display on the display screen of the local device. Next, at 6115, the process 6100 determines whether a request to end the video conference has been received. As described above, a video conference can end in some embodiments at the request of a user of the local or remote device. When the process 6100 receives a request to end the video conference, the process 6100 ends.

Figure 62:
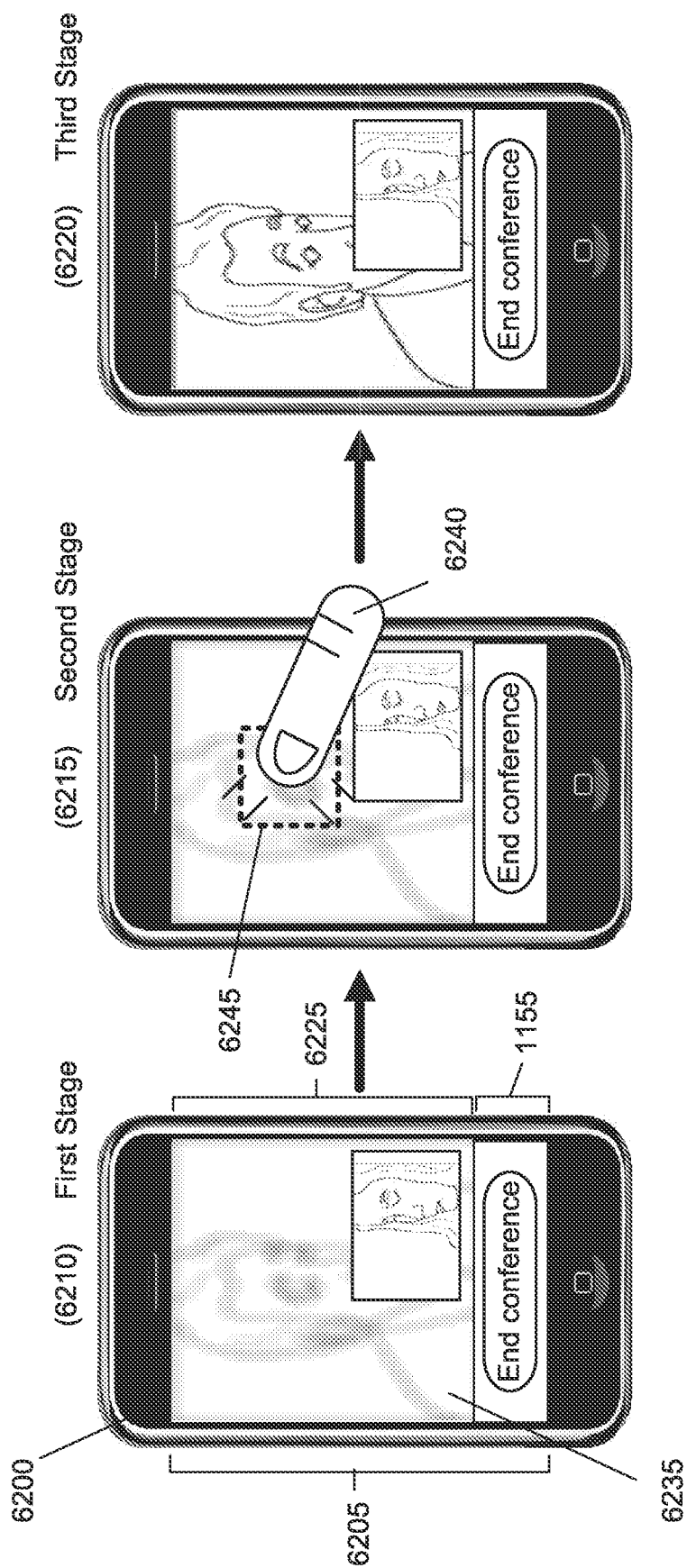
FIG. 62 illustrates a user interface of some embodiments for a focus adjustment operation.
Figure 63:
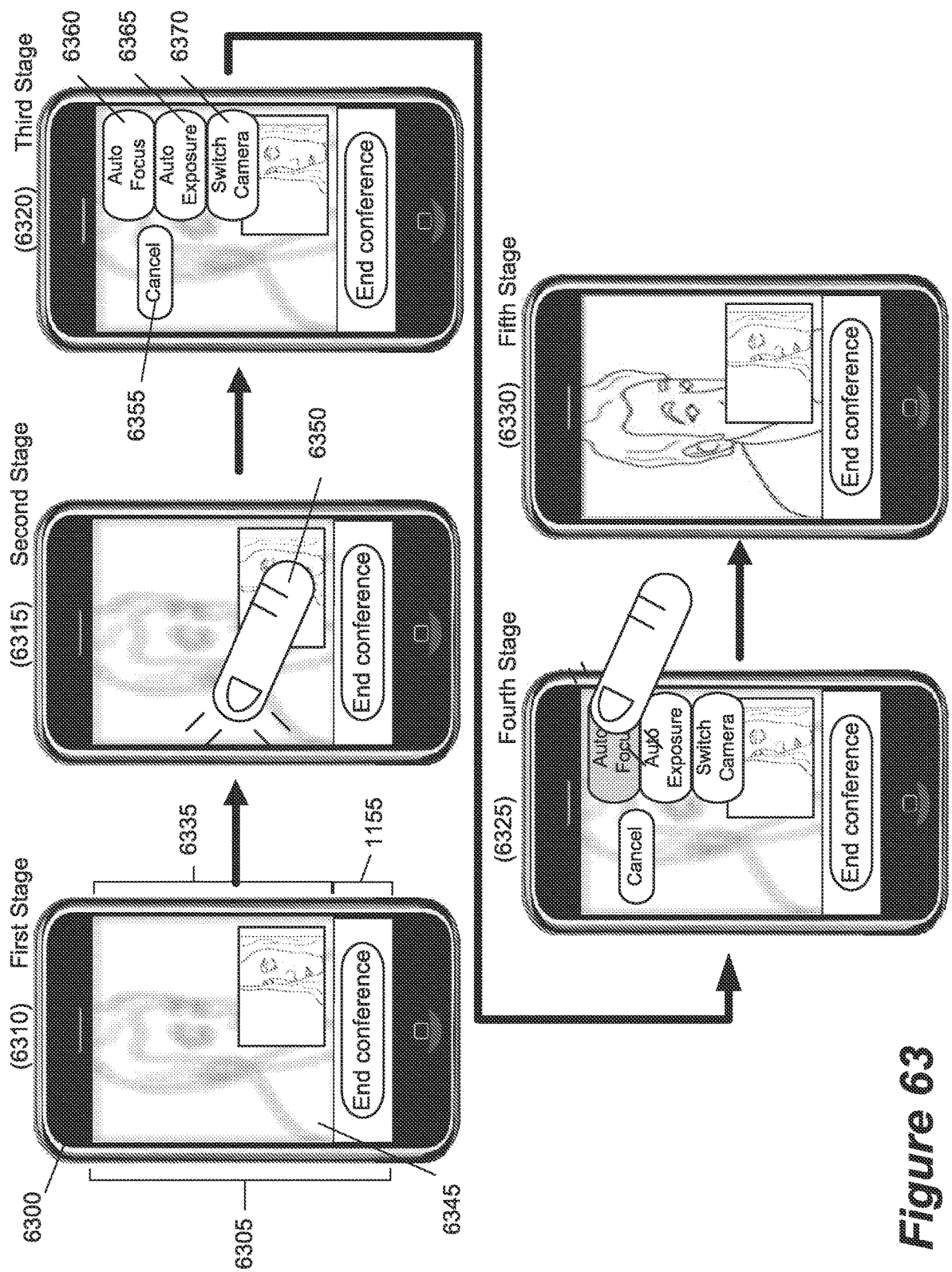
FIG. 63 illustrates another user interface of some embodiments for a focus adjustment operation.
Figure 64:
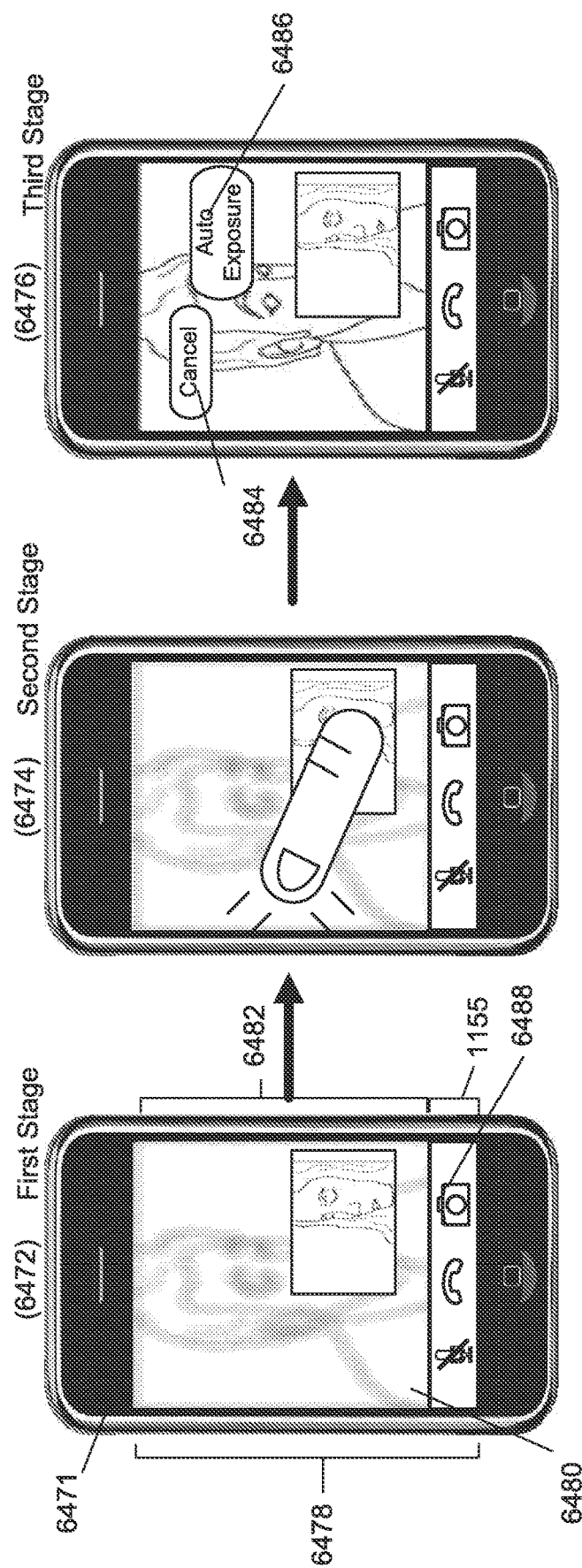
FIG. 64 illustrates another user interface of some embodiments for a focus adjustment operation.

Otherwise, the process determines (at 6120) whether it has received a request for adjusting the focus of the remote camera of the remote device. When the process 6100 determines that it has not received a request for adjusting the focus of the remote camera of the remote device, the process 6100 returns to operation 6110 to receive additional video from the remote device. FIGS. 62, 63, and 64 illustrate three different ways that different embodiments provide to a user to make such a request. In FIGS. 62, 63, and 64, the first stages 6210, 6310, and 6472 all show a PIP display 6225, 6335, and 6482 of the local device 6200, 6300, and 6471 that displays two videos, one captured by the local device, and the other captured by the remote device. The display areas 1155 and 1155 in FIGS. 62 and 63 show an end conference button. However, in FIG. 64, the layout of the display area 1155 is the same as the layout of the display area 1155 of FIG. 12, described above. Moreover, the switch camera button 6488 shown in the display area 1155 can be selected to invoke a local switch camera operation in some embodiments or a remote switch camera operation in other embodiments. As shown in the first stages 6210, 6310, and 6472, the video of the remote device that is displayed in the background display 6235, 6345, and 6480 is blurry.

The second stage 6215 of FIG. 62 illustrates an approach whereby the user of the local device requests a focus adjustment from the remote device by simply selecting the remote device's video (e.g., through a single tap 6240 on the remote device's video). Under this approach, the UI 6205 automatically associates the user's selection of a region of interest defined by a box 6245 with the user's desire to direct the remote device to perform an operation (such as focus) on the region of interest and therefore directs the video conference manager 1604 of the local device 6200 to contact the remote device to perform an adjustment operation (such as an focus adjustment operation). The defined region of interest is used by the remote device in the calculation of the focus adjustment.

The second stage 6315 of FIG. 63 similarly shows the local user's selection of the remote video (e.g., through the user's tapping of the remote device's video). However, unlike the example illustrated in FIG. 62, this selection in FIG. 63 directs the UI 6305 to display a menu of selectable UI items 6355, 6360, 6365 and 6370 (which can be implemented as selectable buttons), as shown in the third stage 6320. These selectable UI items include an Auto Focus item 6360, an Auto Exposure item 6365, a Switch Camera item 6370 and a Cancel item 6355. In some embodiments, the Switch Camera selectable UI item 6370 is used to request a local switch camera operation while in other embodiments the Switch Camera selectable UI item 6370 is used to request a remote switch camera operation. The fourth stage 6325 then illustrates the local user selecting the auto-focus item 6360.

The second stage 6474 of FIG. 64 again similarly shows the local user's selection of the remote video (e.g., through the user's tapping of the remote device's video). However, unlike the example illustrated in FIG. 63, this selection in FIG. 64 directs the UI 6478 to request a focus adjustment operation (i.e., in second stage 6474). After the focus adjustment operation is completed, the UI 6478 displays a menu of selectable UI items 6484 and 6486 (i.e., in third stage 6476), which can be implemented as selectable buttons. These selectable UI items include an Auto Exposure item 6486 and a Cancel item 6484.

When the process determines (at 6120) that the local user directed the local device to request a focus adjustment operation, the process 6100 sends (at 6140) a command to the remote device through the video conference control channel to adjust the focus of the camera whose video the remote device is currently capturing and transmitting. After 6140, the process transitions back to 6110, which was described above.

In some embodiments, the user of the remote device has to provide permission before the remote device performs this operation, while in other embodiments the remote device performs this operation automatically upon receiving the request for the local device. Also, in some embodiments, the focus adjustment operation adjusts the focus settings of the remote device's camera that is being used during the video conference. In some of such embodiments, some of the video conference functionalities are implemented by the video conference module 1602 as discussed above. In these embodiments, the video conference manager 1604 instructs the CIPU 1650 to adjust the sensor of the remote device camera being used.

The last stages 6220, 6330, and 6476 of FIGS. 62, 63, and 64 show the remote device's video properly focused. Although FIGS. 62, 63, and 64 provide examples of receiving a focus adjustment request to correct the focus of a remote device, some embodiments allow the local device's user to request that the local device adjust the focus of a camera of the local device. Such a request can be made similar to the approaches shown in FIGS. 62, 63, and 64 to requesting a remote device to adjust its camera's focus.

FIGS. 62, 63, and 64 illustrate three example user interfaces that allow a user to perform a focus adjustment operation. In some embodiments, the focus adjustment operation causes changes to the operation of the camera of the dual camera mobile device that is capturing the video displayed in the UIs such as changing the focus of the camera.

As discussed above in FIGS. 56 and 62, the defined region of interest was used by the remote mobile device in the computation for exposure adjustment and focus adjustment of the videos, respectively. However, in some other embodiments, the user's selection of a region of interest may be used to direct the remote device to perform one or more operations. For example, in some embodiments, both exposure adjustment and focus adjustment may be performed based on the defined region of interest, thereby directing the remote device to perform both operations.

E. Frame Rate Control

During a video conference, some embodiments may wish to adjust or maintain the rate at which images of a video captured by a camera of the dual camera mobile device are transmitted (i.e., frame rate) to the other device in the video conference. For example, assuming a fixed bandwidth, some of such embodiments reduce the frame rate of the video to increase the picture quality of the images of the video while other of such embodiments increase the frame rate of the video to smooth out the video (i.e., reduce jitter).

Different embodiments provide different techniques for controlling the frame rate of images of a video during the video conference. One example previously described above adjusts the VBI of the sensor module 415 for a camera in order to control the rate at which images captured by the camera are processed. As another example, some embodiments of the management layer 935 of the video conference module 925 shown in FIG. 9 control the frame rate by dropping images. Similarly, some embodiments of the image processing layer 930 control the frame rate by dropping images. Some embodiments provide yet other techniques for controlling frame rates such as dropping frames in the universal transmission buffer 3120.

V. Dual Camera

A. Combined Views

1. Picture-In-Picture: Display of Two Remote Cameras

Some embodiments allow a dual camera mobile device to display videos captured from the mobile device and videos captured from another dual camera mobile device during a video conference in any of several display arrangements.

Figure 65:
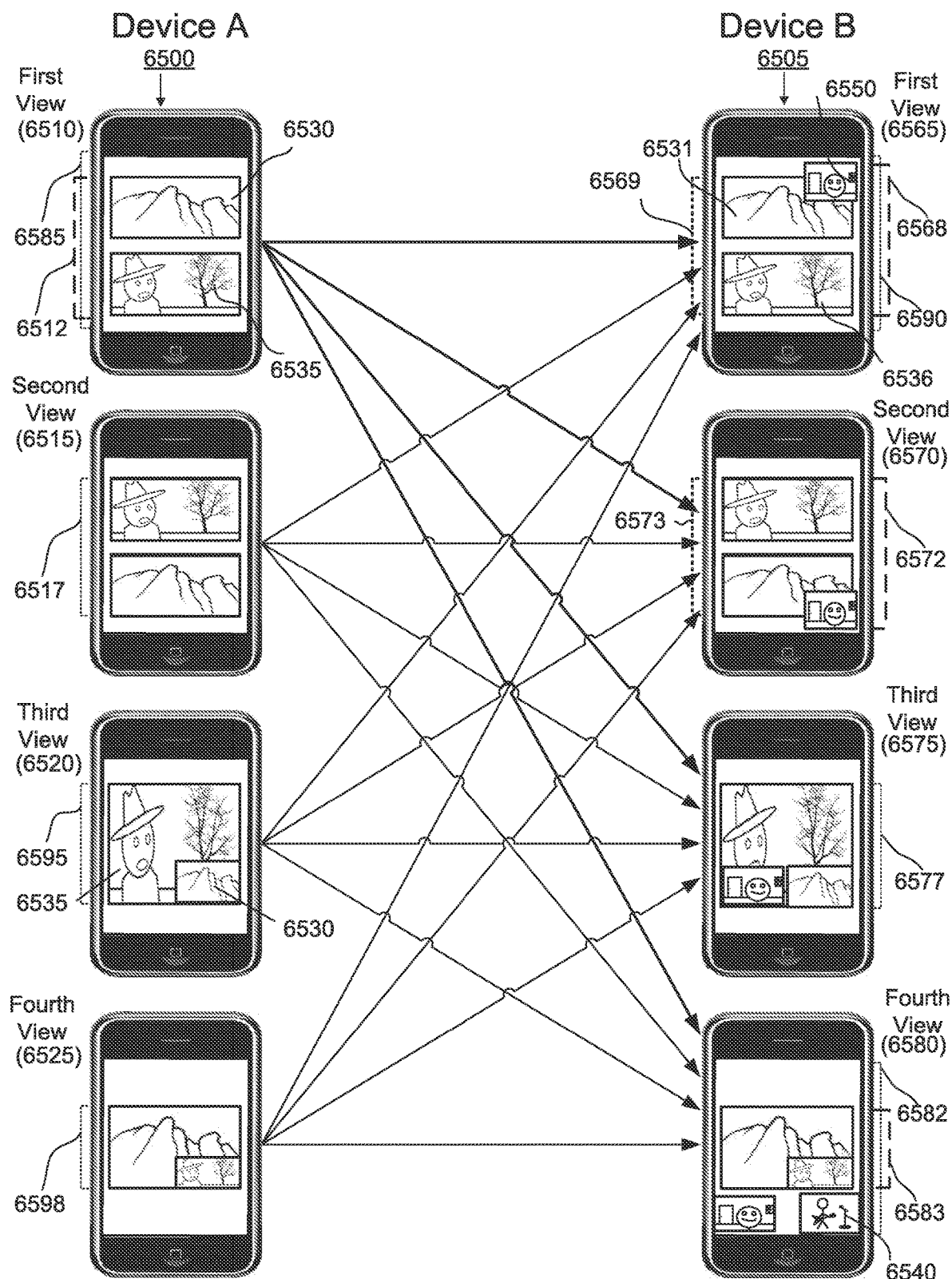
FIG. 65 illustrates different display arrangements of some embodiments for videos captured from one or more dual camera mobile devices.

FIG. 65 illustrates examples of different display arrangements for videos captured from one or more dual camera mobile devices. In FIG. 65, a user of a dual camera mobile device 6500 (Device A) and a second user of a second dual camera mobile device 6505 (Device B) are having a video conference with each other.

FIG. 65 shows four examples of display arrangements for Device A on the left. The four display arrangements for Device A are the First View 6510, the Second View 6515, the Third View 6520, and the Fourth View 6525. In addition, FIG. 65 also shows four examples of display arrangements for Device B on the right. The four display arrangements for Device B are the First View 6565, the Second View 6570, the Third View 6575, and the Fourth View 6580. In this example, Device A only displays the two videos captured from the cameras of Device A while Device B displays the two videos captured from the cameras of Device A as well as one or both of the videos captured from the cameras of Device B.

In the first view 6510, a UI 6585 of Device A provides a composite display 6512. The composite display 6512 includes two display areas: a display area 6530 for displaying video captured from Device A's back camera and a display area 6535 for displaying video captured from Device A's front camera. In this example, The display area 6530 is located in the upper half of the composite display 6512 while the display area 6535 is located in the lower half of the composite display 6512. The two display areas are of equal size in the first view 6510. The upper display area 6530 is displaying a video of a mountain, which is assumed to be a mountain that is being captured by Device A's back camera. The display area 6535 is displaying a tree and a man with a hat, which are assumed to be a tree and a man that are being captured by Device A's front camera.

The UI 6585 in the second view 6515 provides a composite display 6517 that includes the same two display areas from the first view 6510, except that the display area 6535 (displaying video captured from Device A's front camera) is now located in the upper half of the composite display 6517 and the display area 6530 (displaying video captured from Device A's back camera) is located in the lower half of the composite display 6517.

In the third view 6520, the UI 6585 provides a PIP display 6595. The PIP display 6595 includes two display areas: the display area 6535 displaying video captured from Device A's front camera as a background display area and the display area 6530 displaying video captured from Device A's back camera as a foreground inset display area. In this view, the background display area 6535 takes up a majority of the PIP display 6595 while the inset display area 6530 is smaller and overlaps a portion of the background display area 6535.

The UI 6585 in the fourth view 6525 also presents a PIP display 6598 that includes the display areas 6530 and 6535 as shown in the third view 6520. Unlike the PIP display 6595, the PIP display 6598 includes the display area 6530 (captured from Device A's back camera) as the background main display and the display area 6535 (captured from Device A's front camera) as the foreground inset display. In addition, the PIP display 6598 is presented in landscape view (i.e., the width of the PIP display 6598 is longer than the height).

The above examples illustrate four possible composite views for the Device A's UI—two in which the two display areas 6530 and 6535 for displaying the two cameras of the first device are tiered vertically and two PIP views. Other views are also possible for Device A's UI. For example, the two display areas could be tiered horizontally or diagonally, or different PIP views could be used.

The various views illustrated for Device B show that different views for the UI of device B are possible. These views include video captured from both cameras of Device A as well as one or more cameras of Device B. In the first view 6565 of Device B, a UI 6590 of Device B provides a PIP display 6568. The PIP display 6568 includes a composite display area 6569 that is identical to the composite display 6512 displayed on Device A, as well as an inset display area 6550 that displays video captured by one of Device B's cameras (e.g., the front camera). The composite display area 6569 includes a display area 6531 for displaying video captured from Device A's back camera and a display area 6536 for displaying video captured from Device B's front camera. The composite display 6569 displaying video from Device A takes up the majority of the PIP display 6568 while the inset display area 6550 is smaller and overlaps the composite display 6569. The display area 6550 is displaying a video of a smiley face, which is assumed to be a smiley face whose video is being captured by Device B's front camera.

The UI 6590 of Device B in the second view 6570 provides a PIP display 6572. The PIP display 6572 includes the display area 6550 (displaying video captured from Device B's front camera) and a composite display 6573 with the display areas 6531 and 6536 displaying video captured from the cameras of Device A. The composite display 6573 is identical to the composite display 6517 in the second view 6515 for Device A and takes up a majority of the PIP display 6572. Like in the PIP display 6568 in the first view 6565, the display area 6550 is smaller and overlaps the composite display 6573. Specifically, in both views the display area overlaps a portion of the display area 6531 that displays video captured from Device A's back camera.

In the third view 6575, the UI 6590 provides a PIP display 6577 that is similar to the PIP display 6595 in the third view 6520 for Device A. The PIP display 6577 also includes the additional display area 6550 as a second inset display area that overlaps the background display area 6536. The two inset display areas 6531 and 6550 are tiled horizontally at the bottom of the background primary display area 6536.

The UI 6590 in the fourth view 6580 provides a composite display 6582. The composite display 6582 includes three displays: a PIP display 6583, the display area 6550, and a display area 6540 (e.g., for displaying video captured by Device B's back camera). The PIP display 6583 is identical to the PIP display 6598 in the fourth view 6525 for Device A and takes up a majority of the composite display area 6582. The displays 6540 and 6550 are smaller and tiled horizontally below the PIP display area 6583.

While FIG. 65 illustrates four possible views for Device B, many other views are possible. The background composite display of video from Device A could be tiled horizontally rather than vertically, the inset could overlap the front camera display area of Device A rather than the back camera display area, the larger display areas could be displaying the Device B camera(s) rather than those of Device A, the insets could be located differently, etc.

Each set of arrows 6560 stemming from each view of Device A demonstrates that there is no requirement of a correlation between the display shown on Device A and the display shown on Device B. For instance, even if Device A is displaying its video in the arrangement of view 6510 (e.g., according to a selection of that arrangement by the user of Device A), Device B could be displaying video in any of the four illustrated arrangements or in any of a number of other arrangements not shown in FIG. 65 (e.g., according to a selection of that arrangement by the user of Device B). Put another way, the display arrangement for Device A is independent of the display arrangement of Device B. Some embodiments do not transmit display areas from one device to another but rather just transmit the video (e.g., in encoded form), which is displayed in its corresponding display area by the device.

2. Specialized PIPs

Figure 66:
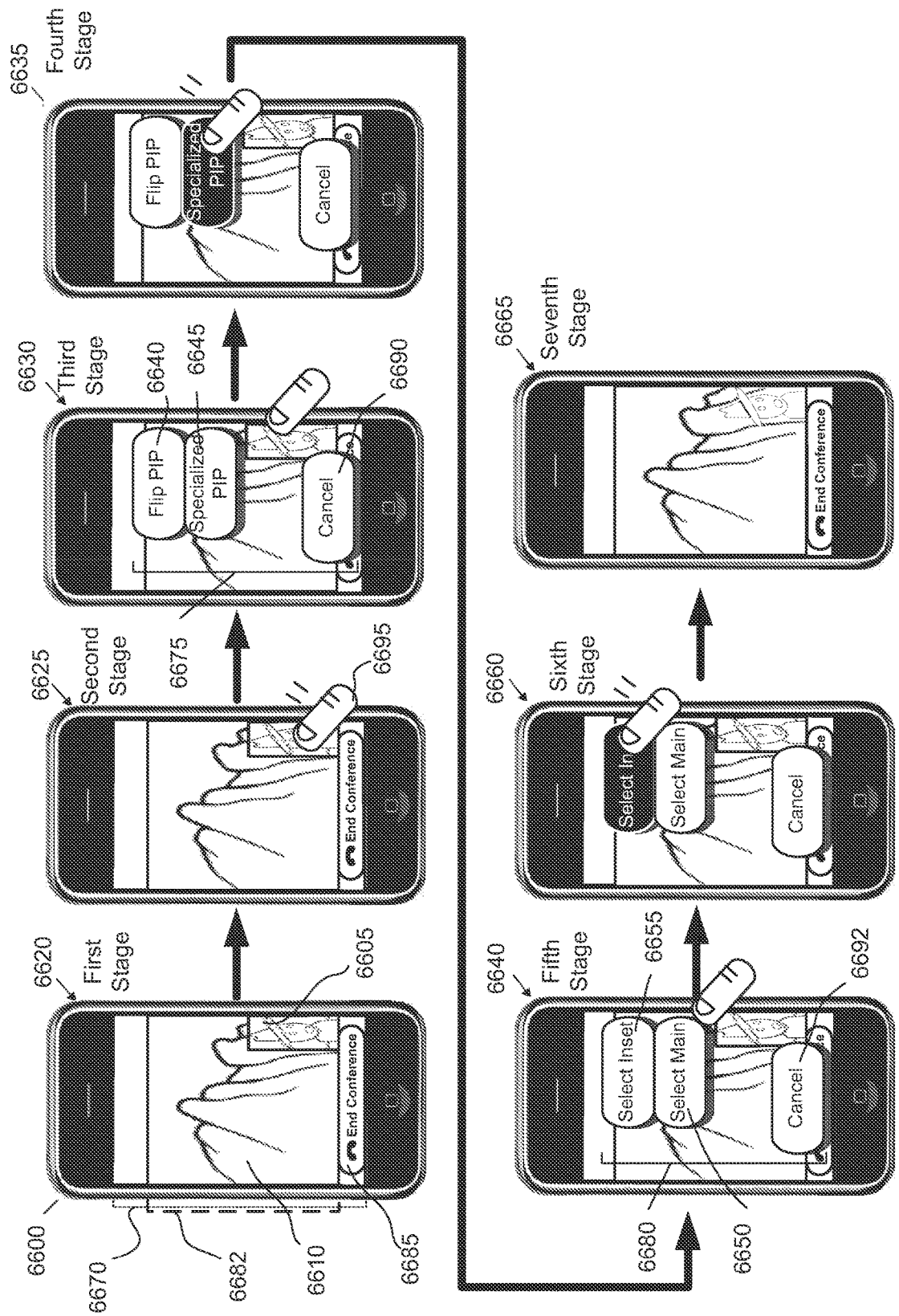
FIG. 66 illustrates a user interface of some embodiments for superimposing a foreground of an inset video onto a background video in a PIP display.

Some embodiments allow a user of a dual camera mobile device to superimpose a foreground of a video onto another video in a PIP display during a video conference. In some embodiments, the foreground of a video blends into the other video in such a way that they appear as a display of a single video captured by a single camera. FIG. 66 illustrates an example of such superimposing of a foreground of an inset video onto a background video in a PIP display.

FIG. 66 illustrates this video superimposition operation in terms of seven operational stages 6620, 6625, 6630, 6635, 6640, 6660, and 6665 of a UI 6670. The first stage 6620 illustrates the UI 6670 of a dual camera mobile device 6600 with a PIP display 6682 during a video conference with a remote device. As shown in the first stage 6620, the PIP display 6682 includes two video displays: a background main display 6610 and a foreground inset display 6605. The background main display 6610 takes up a majority of the UI 6670, while the foreground inset display 6605 is smaller and overlaps the background main display 6610.

In this example, the background display area 6610 is displaying a video of a mountain, which is assumed to be a mountain that is being captured by one of the remote device's cameras. The foreground inset display area 6605 is displaying a video of a person with a hat, which in this example is assumed to be a person whose video is being captured by one of the local device's cameras. Below the PIP display 6682 is a selectable UI item 6685 labeled "End Conference" (e.g. a button 6685) that allows the user to end the video conference with a selection of the item (e.g., by single- or double-tapping the button).

The second stage 6625 illustrates the invocation of a selectable menu 6675. In some embodiments, the menu of selectable UI items 6675 may be invoked by selecting (e.g., by touching) the PIP display area 6682. Instead of, or in conjunction with, such an invocation operation, some embodiments also allow the user to invoke the menu of selectable UI items 6675 through other operations, such as through different touchscreen operations or using one or more other physical inputs of the device.

The third stage 6630 displays the UI 6670 with the invoked set of selectable UI items for selecting the video superimposition operation. In this example, a pop-up menu 6675 with several selectable UI items is displayed over the PIP display 6682. The menu of selectable UI items 6675 includes a "Flip PIP" selectable UI item 6640 (e.g. button 6640), a "Specialized PIP" selectable UI item 6645 (e.g. button 6645), and a "Cancel" selectable UI item 6690 (e.g. button 6690). In this example, selecting the "Flip PIP" button 6640 would cause the UI 6670 to swap the background display 6610 with the inset display 6605 (as will be discussed in detail in the next section), selecting the "Specialized PIP" button 6645 would cause the UI 6670 to begin the operation of video superimposition, and selecting the "Cancel" button 6690 would remove the pop-up menu 6675 from the PIP display 6682. Other embodiments include different or more items in the PIP pop-up menu 6675.

The fourth stage 6635 illustrates the UI 6670 after the user has selected the "Specialized PIP" button 6645 (e.g., by tapping on the button 6645 with his finger 6695). This selection is indicated by the highlighting of the button 6645 on the UI display 6670. Some embodiments use different indication displays (e.g., highlighting the border of the selected item or the text in the selected item).

The fifth stage 6640 shows the UI 6670 after the video superimposition operation has begun. In this stage, the UI 6670 allows the user to choose from which video he wants to extract as a foreground and which video he wants to use as a background in the superimposed video. The UI 6670 provides the options through a pop-up menu 6680 with several selectable UI items displayed over the PIP display 6682. The pop-up menu 6680 of selectable UI items includes a "Select Inset" selectable UI item 6655 (e.g. button 6655), a "Select Main" selectable UI item 6650 (e.g. button 6650), and a "Cancel" selectable UI item 6692 (e.g. button 6692).

Selection of the "Select Inset" button 6655 would cause the UI 6670 to superimpose the foreground of the inset video 6605 from the local device's camera (i.e., the man with a hat) onto the background main video 6610 from the remote device's camera. On the other hand, selection of the "Select Main" button 6650 would cause the UI 6670 superimpose the foreground of the background main video 6610 from the remote device's camera (i.e., the mountain) onto the inset video 6605 from the local device's camera. In some embodiments, this causes a switch of the two video feeds such that the video currently in the inset display area 6605 will occupy most of the UI 6670 and the video currently in the primary display area 6610 will be superimposed on the now-primary video. Selection of the "Cancel" button 6692 would abort the video superimposition operation and remove the pop-up menu 6680 from the PIP display area 6682.

The sixth stage 6660 illustrates the UI 6670 after the user has selected the "Select Inset" button 6655 (e.g., by tapping on the button 6655 with his finger 6695). This selection is indicated by the highlighting of the button 6655 on the UI display 6670. Some embodiments use different indication displays (e.g., highlighting the border of the selected item or the text in the selected item).

The seventh stage 6665 illustrates the UI 6670 after the video superimposition operation is complete. As shown in the UI 6670, the foreground of the inset display area 6605 (i.e., the man with a hat) is extracted from the display area 6605. The window frame and the background (i.e., everything else other than the foreground) of the inset display 6605 are also removed from the screen. Finally, the foreground (i.e., the man with a hat) is blended into the background video 6610 in such a way that it appears as a single video. Various different techniques may be used to remove the background of the inset video. Some embodiments identify pixels that are not moving relative to other pixels, look for patterns or colors that are constant, use a baseline image compared to the image that includes the foreground and subtract out the difference, or use a different technique.

While the example of FIG. 66 illustrates the foreground of the inset display area 6605 staying in the same place in the UI 6670 when superimposed onto the background display area 6610, this is only one example of how the superimposition can work. Some embodiments move the foreground video to a particular location in the UI 6670 (e.g., the center, one of the corners, etc.). Similar to the features shown in Sections IV.A.1 and IV.A.3, some embodiments allow the user of the local device to drag the superimposed foreground video around in the UI or change the size of the superimposed foreground video.

Different techniques may be used to determine which portion(s) of video images is the "foreground" for the video superimposition operation described above. One such method of some embodiments determines which portion(s), if any, of the video images is dynamic. The dynamic portion is considered the "foreground" because the background of video images is generally static (i.e., no motion). In such embodiments, video images are analyzed over a particular period of time. If the difference among a particular pixel's values over the particular period is not greater than a defined threshold value (e.g., 5%, 10%, 15%), the particular pixel is considered a static pixel. After each pixel in the video images is analyzed, the dynamic pixels (i.e., not static) of the video images are considered the "foreground" of the video images.

Figure 67:
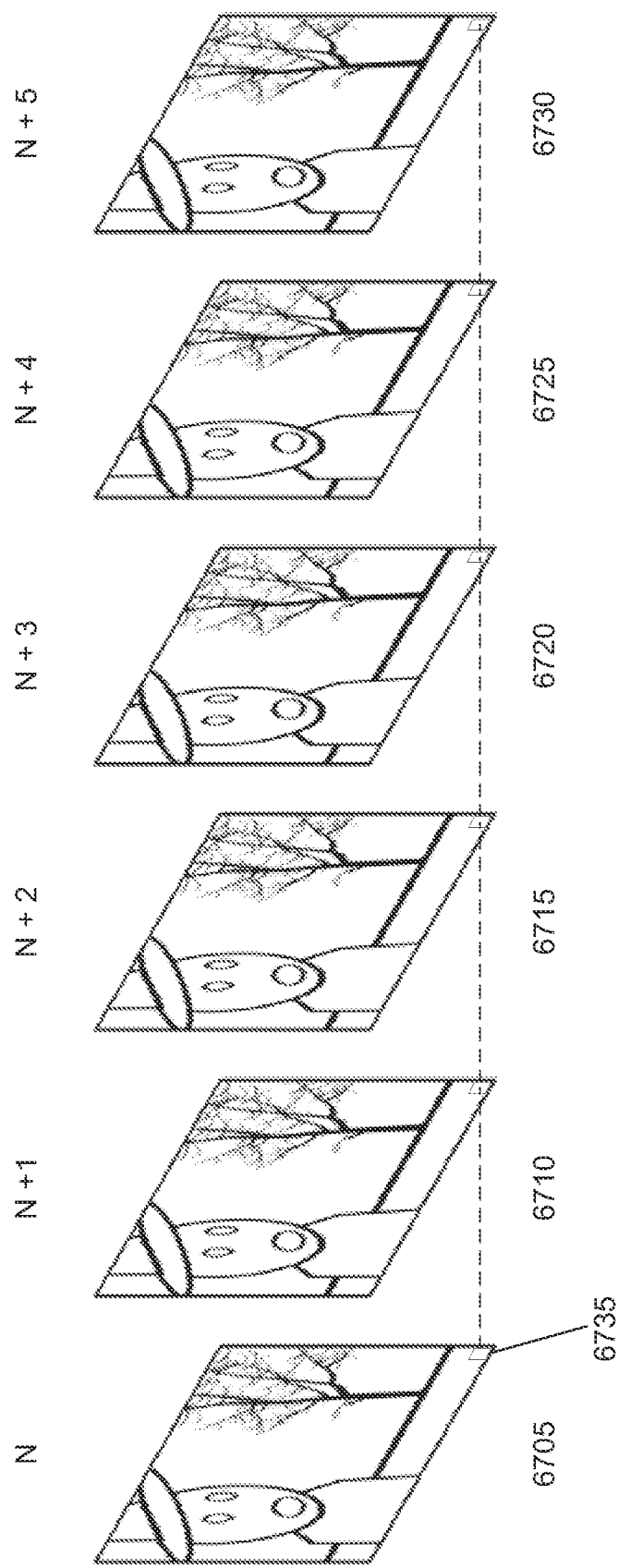
FIG. 67 illustrates a technique of some embodiments for determining a foreground of video images.

FIG. 67 illustrates an example of such technique for determining the foreground of video images that can be performed by the video conference manager 1604 or the image processing manager 1608, for example. Specifically, FIG. 67 illustrates a sequence of six images 6705-6730 of a video that shows a person with a hat and a tree. In this example, it is assumed that the person is not standing entirely still and may be talking. As described above, each pixel in the video images is analyzed to determine whether the pixel is dynamic or static. For instance, the difference among pixel 6735's value in images 6705-6730 is determined whether it is greater than a defined threshold. Here, since the pixel 6735 represents part of the ground rather than the person, the pixel 6735 is considered static. After all of the pixels in the images 6705-6730 are analyzed, it is determined that the person in the images is dynamic and the remaining portion of the images is static. As such, the person is the "foreground" that will be extracted by the operation described by reference to FIG. 66, above.

3. Swap Videos in a Picture-In-Picture Display

Figure 68:
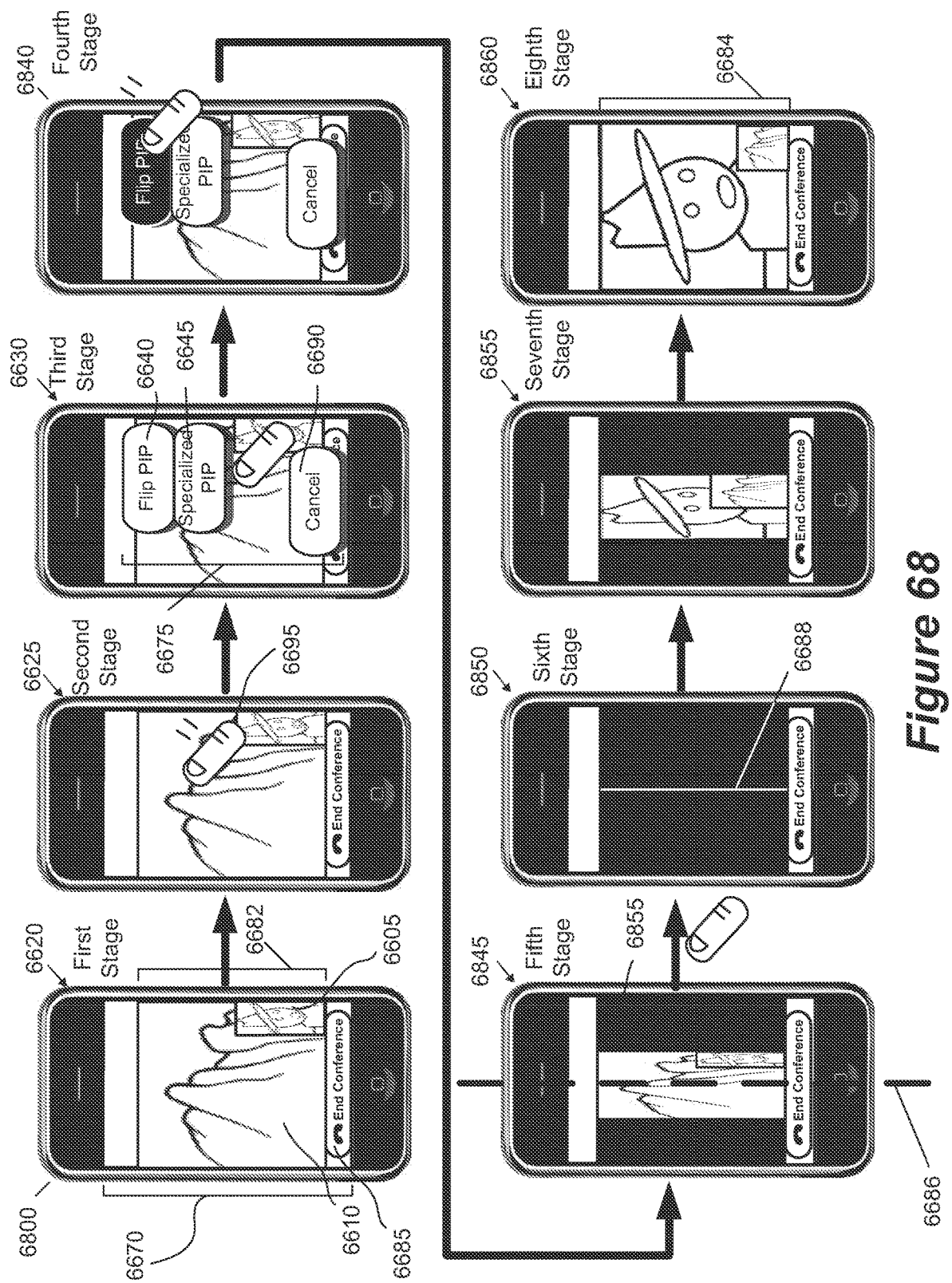
FIG. 68 illustrates a user interface of some embodiments for swapping an inset display with a background display in a PIP display during a video conference.

Some embodiments allow the user of a dual camera mobile device to swap the two display areas in a PIP display (i.e., the inset display area becomes the background display area, and the background display area becomes the inset display area in the PIP display) during a video conference. FIG. 68 illustrates an example of swapping an inset display area 6605 with a background display area 6610 in a PIP display 6682 during a video conference.

FIG. 68 illustrates the swap PIP operation in terms of eight operational stages of a UI 6670 of the device 6800 in FIG. 66. The first three stages in FIG. 68 are identical to the first three stages in FIG. 66. In these stages, the user has brought up the menu 6675 within the UI 6670 through a selection using the touchscreen of the local device.

The fourth stage 6840 in FIG. 68 illustrates the UI 6670 after the user has selected the "Flip PIP" button 6640 (e.g., by tapping on the button 6640 with his finger 6695). This selection is indicated by the highlighting of the button 6640 on the UI display 6670. Some embodiments use different indication displays (e.g., highlighting the border of the selected item or the text in the selected item).

The fifth stage 6845 illustrates the UI 6670 after the swap PIP operation has started. Some embodiments animate the swapping of the inset and background display 6605 and 6610 through a flipping motion. FIG. 68 illustrates an example of one such animation. In this example, the animation can be described through the flipping of a viewing pane of which the PIP display 6682 (before the swap operation is performed) is on one side and the new PIP display 6684 (after the swap operation is performed) is on the other side. The viewing pane rotates 180 degrees around a vertical axis 6686 located in the center of the PIP display 6682. At this fifth stage 6845, the viewing pane begins to rotate about the vertical axis 6686.

In the sixth stage 6850, the viewing pane is shown to have rotated approximately 90 degrees. This is indicated by the thin line 6688 (i.e. the edge of the viewing pane) displayed in the center of the screen. The seventh stage 6855 illustrates the rotation of the viewing pane close to completion. A new PIP display 6684 starts to appear from the other side of the viewing pane and expands horizontally to fill the device's screen. The PIP display 6684 includes the two display areas 6605 and 6610 after the swap operation is performed. The display area 6605 presenting the video of a man with a hat (from the local device's camera) is now in the background of the PIP display 6684 and the display 6610 presenting the video of a mountain (from the remote device's camera) in now the foreground of the PIP display 6684 overlapping the display 6605. The eighth stage 6860 shows the completion of the swap displays animation.

One of ordinary skill will recognize that the animation shown in FIG. 68 is only one of many possible animations of the PIP inset/background swap operation. For instance, different embodiments might rotate the viewing panes along a horizontal axis, instantaneously swap the two display areas, expand one display area while shrinking the other, etc. Some embodiments provide one animation that is always used for the swap operations, while other embodiments allow a user to choose from several animations or use different animations (e.g., through random selection). Furthermore, the swap operation can cause changes to the image processing operations of the dual camera mobile device such as causing the video conference manager 1604 to change the scaling and compositing of the videos in response to the user's input.

4. Snap-To-Corner

Some embodiments of the invention allow a user of a dual camera mobile device to modify the composite display by moving around one or more display areas that form the composite display. One example of such movement is described above in Section IV.A.1. Such movement of inset displays is also possible when a PIP display includes more than one inset display area.

Figure 69:
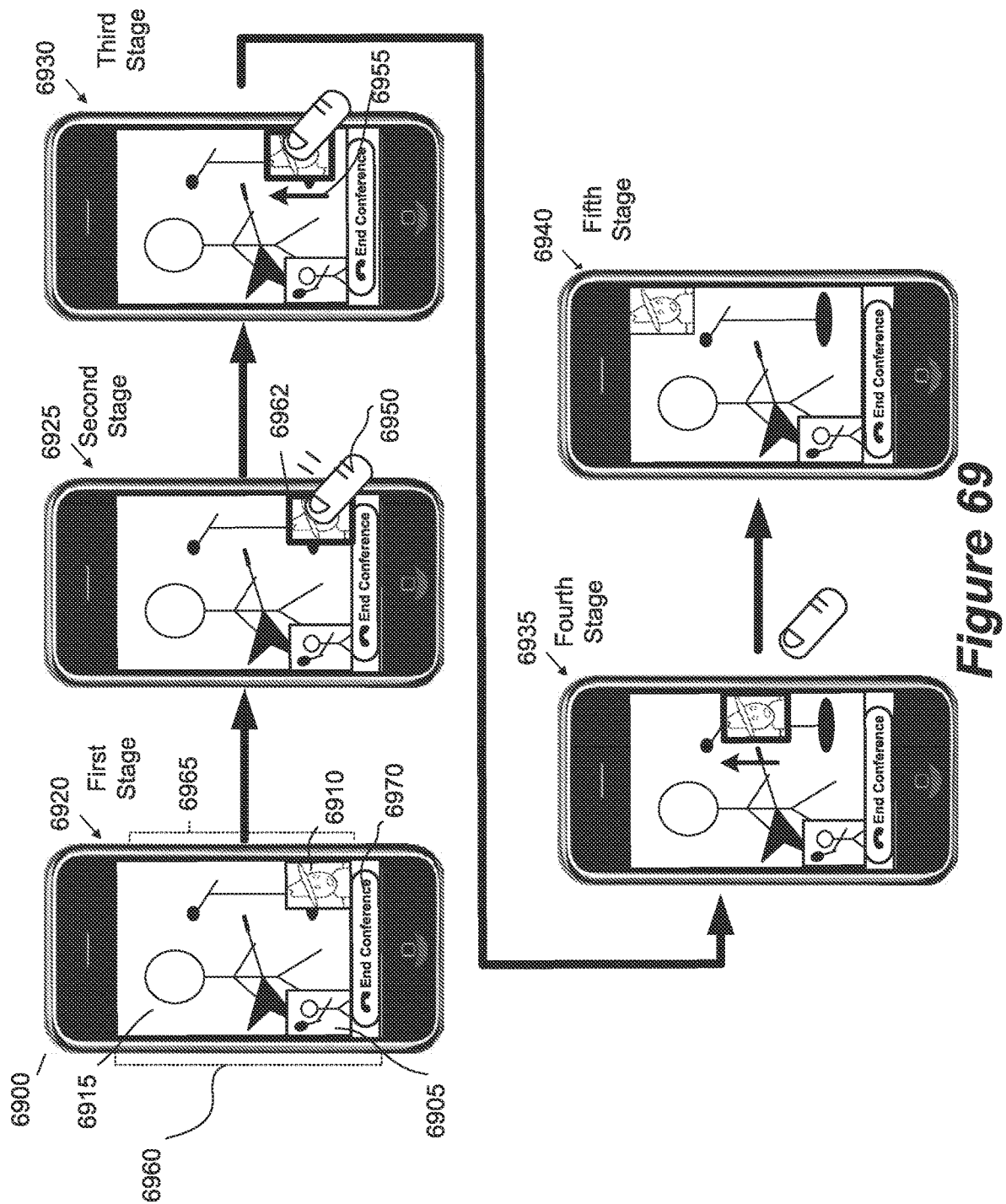
FIG. 69 illustrates a user interface of some embodiments for a snap-to-corner operation.

FIG. 69 illustrates such an example that is performed during a video conference. This example illustrated in FIG. 69 is similar to the example illustrated in FIG. 3, except FIG. 69 illustrates moving around an inset display area 6910 of a PIP display 6965 that includes two inset display areas 6905 and 6910 rather than only one such inset display area.

In FIG. 69, a UI 6960 of a mobile device 6900 presents a PIP display 6965 during a video conference with a remote user of another device. The PIP display 6965 in FIG. 69 includes three video displays: a background main display 6915 and two foreground inset displays 6905 and 6910. In this example, the background main display 6915 presents a video of a person singing and playing a guitar, which is assumed to be video captured by the remote device's back camera. The foreground inset display 6905 presents a video of a person holding a racket, which in this example is assumed to be video captured by the local device's back camera. The other foreground inset display 6910 presents a video of a person with a hat, which in this example is assumed to be a person whose video is being captured by the local device's front camera. Below the PIP display 6965 is a selectable UI item 6970 labeled "End Conference" (e.g., a button 6970) that allows the user to end the video conference by selecting the item.

This PIP display 6965 is only one manner of presenting a composite view of the videos being captured by the remote and local devices. Some embodiments may provide other composite views. For instance, instead of having a larger background display 6915 for the video from the remote device, the larger background display 6915 can be of the video from the local device and the smaller foreground inset displays 6905 and 6910 can be of the videos from the remote device. Also, some embodiments allow the local and remote videos to appear in the UI 6960 with the inset displays 6905 and 6910 on one side and the background display 6915 on another side or all three side-by-side. In other embodiments, the PIP display 6965 may contain a larger background display 6915 and/or a smaller foreground inset display. The manner of the PIP display 6965 or a default display mode may be specified by the user in some embodiments.

FIG. 69 illustrates the movement of one of the two inset display areas in a UI 6960 of a device 6900, by reference to five different operational stages 6920, 6925, 6930, 6935, and 6940. The first stage 6920 illustrates the UI 6960 during a video conference between the local user of the device 6900 and the remote user of the remote device.

The second stage 6925 illustrates the user starting a snap-to-corner operation by selecting an inset display area 6910. In this example, a selection is made by placing a finger 6950 anywhere within the inset display area 6910. As shown, this selection is displayed in terms of a thick border 6962 for the inset display 6910. Different embodiments may indicate such a selection in different ways, such as by highlighting the inset display 6910, by causing the inset display 6910 to vibrate, etc.

The third stage 6930 illustrates the UI 6960 after the user begins to move the inset display area 6910 of the PIP display 6965 from one area in the PIP display 6965 to another area in this PIP display 6965. In this example, the inset display area 6910 has started to move from the lower right corner of the PIP display 6965 to the upper right corner of this display, as indicated by the arrow 6955. The inset display 6910 is moved by the user dragging his finger 6950 towards the upper right corner of the PIP display 6965 after selecting the inset display 6910. Some embodiments provide other techniques for moving the inset display 6910 around in the PIP display 6965.

The fourth stage 6935 illustrates the UI 6960 in a state after the user has removed his finger 6950 from the screen of the device 6900. In this state, the inset display area 6910 is still moving towards the upper right corner of the PIP display 6965 that was identified based on the user's finger movement in the third stage. In other words, after the finger 6950 starts the movement of the inset display 6910 towards the upper right corner of the PIP display 6965, the UI 6960 maintains this movement even after the finger 6950 is removed. To maintain this movement, the UI 6960 of some embodiments require the user's drag operation to be larger than a particular threshold amount (e.g., longer than a particular distance or longer than a particular length of time) before the user removes his finger; otherwise, these embodiments keep the inset display area in its original bottom right corner position after moving this display area slightly or not moving it at all.

However, while some embodiments allow the inset display area to move even after the user stops his drag operation before the inset display area has reached its new location, other embodiments require the user to maintain his drag operation until the inset display area reaches its new location. Some embodiments provide still other techniques for moving the inset display area. For example, some embodiments may require the user to specify where to direct the display area 6910 before the display area 6910 actually starts to move, etc. Some embodiments may also allow display areas to slide and snap-to-corners by simply tilting the mobile device in different angles.

The fifth stage 6940 illustrates the UI 6960 after the inset display area 6910 has reached its new location at the upper right corner of the PIP display area 6965. The removal of the thick border 6962 in the fifth stage indicates that the snap-to-corner operation is completed.

To facilitate the movement illustrated in the above-described third, fourth and fifth stages 6930, 6935, and 6940, the UI 6960 of some embodiments employs snapping rules that allow the inset display area 6910 to quickly snap to a corner of the PIP display 6965 once the user causes the inset display area 6910 to move towards that corner. For instance, when the user drags the inset display area 6910 by more than a threshold amount towards a particular corner, the UI 6960 of some embodiments identifies the direction of motion of the inset display 6910, determines that the motion has exceeded a threshold amount, and then subsequently moves the inset display area 6910 automatically without further user input to the next grid point in the UI 6960 to which the inset display 6910 can be snapped. In some embodiments, the only grid points that are provided for snapping the inset display 6910 are grid points at the four corners of the PIP display 6965. Other embodiments provide other grid points in the UI 6960 (e.g., in the PIP display 6965) to which the inset display 6910 can snap.

Still other embodiments may not employ grid points so that the inset display area 6910 can be positioned at any point in the PIP display. Yet other embodiments provide a feature that allows the user to turn on or off the snap to grid point feature of the UI. Moreover, in addition to the video captured from the devices, different embodiments may allow the user to perform the snap-to-corner operations to various items, such as icons, etc. As noted above, the moving of a display area(s) of a composite display can cause changes to the image processing operations of the dual camera mobile device such as causing the video conference manager 1604 to re-composite the display area in the composite display in response to the user's input.

5. Push and Snap

Figure 70:
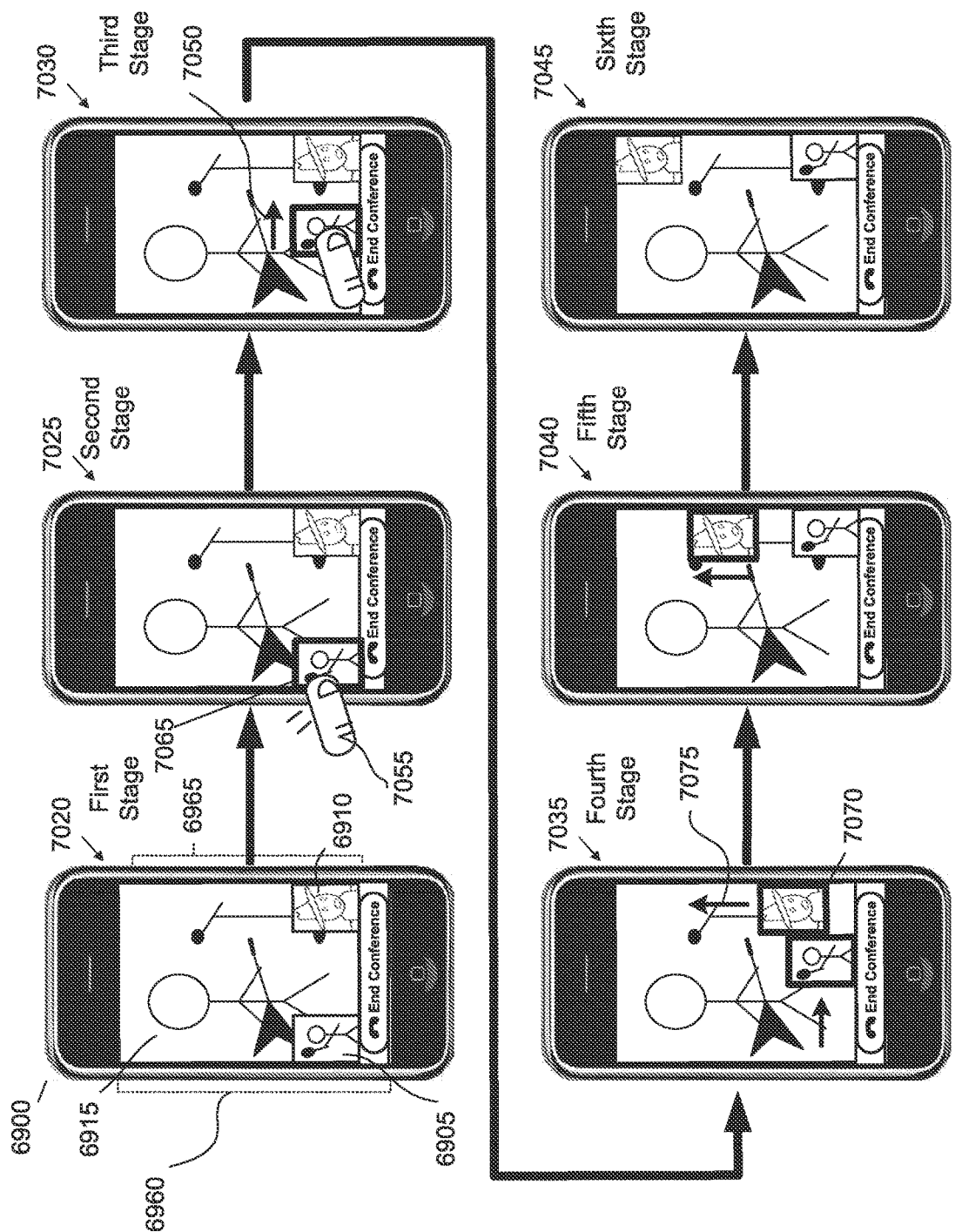
FIG. 70 illustrates a user interface of some embodiments for a snap-to-corner and push operation.

The example in FIG. 69 illustrates a snap-to-corner operation that allows a user of a dual camera mobile device to move one of two inset display areas from one corner of the PIP display to another corner that is not occupied by an inset display. Some embodiments enable a push feature that moves a first inset to a location of a second inset and also pushes the second inset to a new location. FIG. 70 illustrates one such example that is performed during a video conference.

FIG. 70 illustrates the movement of an inset display from one corner of the PIP display to another corner of the PIP display that is occupied by another inset display, by reference to six different stages 7020, 7025, 7030, 7035, 7040 and 7045 of this UI 6960. The first stage 7020 illustrates the UI 6960 during a video conference between a local user of the device and a remote user of a remote device. The UI 6960 in FIG. 70 shows a PIP display 6965 that is the same PIP display shown in the first stage of FIG. 69 after the video conference has started. In this example, the video captured by the local user's device is displayed in the inset display areas 6905 and 6910 and the video captured by the remote user's device is displayed in the background display area 6915.

The second stage 7025 illustrates the user starting the snap-to-corner operation by selecting inset display area 6905. In this example, a selection is made by placing a finger 7055 anywhere within the inset display area 6905. As shown, this selection is displayed in terms of a thick border 7065 for the inset display 6905. Different embodiments may indicate such a selection in different ways, such as by highlighting the display area 6905, by causing the display area 6905 to vibrate, etc.

The third stage 7030 illustrates the UI 6960 after the user begins to move the inset display area 6905 from the lower left corner of the PIP display 6965 to the lower right corner of the PIP display 6965 (by dragging his finger 7055 towards the lower right corner of the PIP display 6965 after selecting the inset display 6905 in the third stage), as indicated by the arrow 7050. Some embodiments provide other techniques for moving the inset display area 6905 around in the PIP display 6965.

The fourth stage 7035 illustrates the UI 6960 after the inset display area 6905 has come in contact with the inset display area 6910. Upon contact, the inset display area 6910 moves towards the next nearest corner. In this example, the inset display area 6910 starts to move in the direction (as indicated by arrow 7075) of the upper right corner of the PIP display 6965. The activation of this push operation is displayed in terms of a thick border 7070 for the inset display 6910. Different embodiments may indicate such an activation in different ways, such as by highlighting the display 6910, etc.

The fifth stage 7040 illustrates the UI n in a state after the inset display area 6905 has snapped to the lower right corner that was previously occupied by the inset display area 6910. In this state, the inset display area is still moving towards the upper right corner of the PIP display 6965. Also, the thick border 7065 is no longer displayed. So long as the user's drag operation from the third stage 7030 is larger than a threshold that causes the inset display area 6905 to snap to the right corner, the inset display area 6910 is removed from its corner and snaps all the way to the next nearest corner.

Some embodiments include a set of rules for determining which way to push the second inset display area 6910. In the case illustrated in FIG. 70, some embodiments attempt to continue the rotation of the inset display areas. That is, because display area 6905 is moved in a counterclockwise direction, the display area 6910 is also moved counterclockwise. Some embodiments provide a hierarchy of possible locations to which the pushed inset display area 6910 can move and select the first unoccupied location on the list. For example, the top right corner might be the first location in such a list when an inset display area in the bottom right is pushed by an inset display area coming from the bottom left. If, however, a third inset display area was already present in the upper right corner, some embodiments would move to the next option on the list (e.g., the upper left corner, the center, or the lower left corner). Other embodiments would push the third inset display area with the second inset display area such that the device would need to determine a new location for the third inset display area.

The sixth stage 7045 illustrates the UI 6960 after the inset display area 6910 has reached its new location at the upper right corner of the PIP display area 6965. The removal of the thick border 7070 in this stage indicates that the snap-to-corner-push operation is completed. Similar to the push-to-corner operation described by reference to FIG. 68, the moving of a display area(s) of a composite display can cause changes to the image processing operations of the dual camera mobile device such as causing the video conference manager 1604 to re-composite the display area in the composite display in response to the user's input.

6. Rotate

Figure 71:
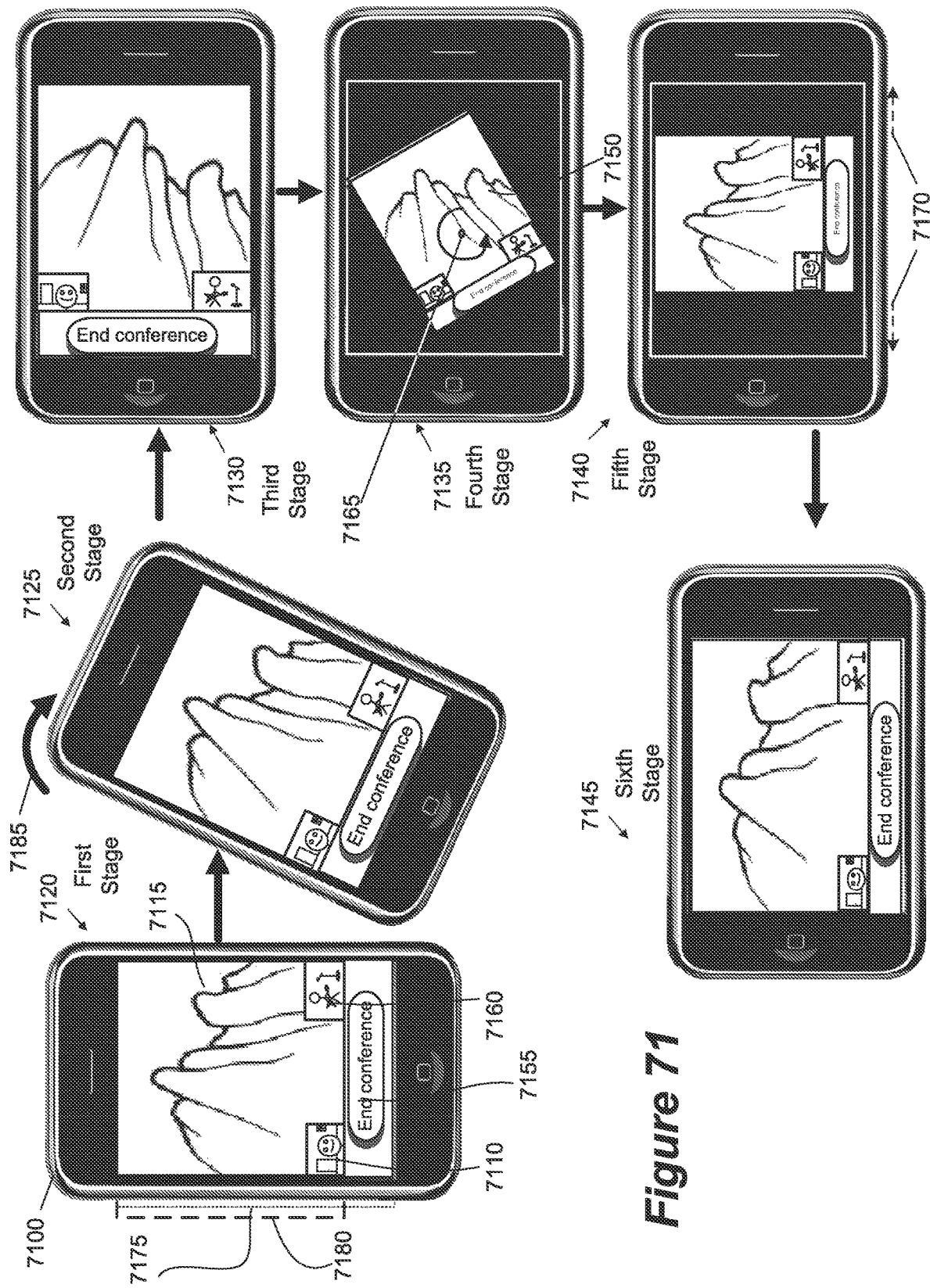
FIG. 71 illustrates a user interface of some embodiments for a PIP display rotation operation.

Some embodiments rotate a PIP display that is presented during a video conference when a user of a mobile device used for the video conference rotates the device during the conference. FIG. 71 illustrates the rotation of a UI display 7175 of a device 7100 when the device is rotated from a vertical position to a horizontal position. The device 7100 is held vertically when the long side of the screen is vertical, whereas the device 7100 is held horizontally when the long side of the screen is horizontal. In the example illustrated in FIG. 71, the UI display 7175 rotates from a portrait view that is optimized for a vertical holding of the device to a landscape view that is optimized for horizontal holding of the device 7100. This rotation functionality allows the user to view the UI 7175 displayed in an upright position when the mobile device 7100 is held either vertically or horizontally. This example illustrated in FIG. 71 is similar to the example illustrated in FIG. 34, except that FIG. 71 illustrates rotating a PIP display that includes two inset display areas rather than only one.

In FIG. 71, the UI 7175 of the mobile device 7100 presents the PIP display 7180 during a video conference with a remote user of another mobile device. The PIP display 7180 in FIG. 71 includes three video displays: a background main display 7115 and two foreground inset displays 7110 and 7160. In this example, the background main display 7115 presents a video of a mountain, which is assumed to be video captured by the remote device's front camera or back camera. The foreground inset display 7110 presents a video of a smiley face in a room, which is assumed to be captured by the local device's front camera or back camera. The other foreground inset display 7160 presents a video of a guitarist singing, which is assumed to be a guitarist whose video is being captured by the other camera of the local device. Below the PIP display 7180 is an End Conference button 7155, which the user may select to end the video conference (e.g., through a single finger tap). This PIP display is only one manner of presenting a composite view of the videos being captured by the remote and local devices. Some embodiments may provide other composite views, such as tiled views or different PIP displays.

FIG. 71 illustrates the rotation of the UI 7175 in terms of six different operational stages 7120, 7125, 7130, 7135, 7140 and 7145. The first stage 7120 illustrates the UI 7175 during a video conference between the local user of the device and the remote user of the remote device.

The second stage 7125 illustrates the UI 7175 after the user begins to tilt the device 7100 sideways. In this example, the device 7100 has started to tilt the device 7100 from being held vertically to being held horizontally, as indicated by the arrow 7185. The appearance of the UI 7175 has not changed. In other situations, the user may want to tilt the device 7100 from being held horizontally to being held vertically instead, and in these situations the UI display 7175 switches from a horizontally optimized view to a vertically optimized view.

The third stage 7130 illustrates the UI 7175 in a state after the device 7100 has been tilted from being held vertically to being held horizontally. In this state, the appearance of the UI display 7175 still has not changed. In some embodiments, the rotation operation is triggered after the device 7100 is tilted past a threshold amount and is kept past this point for a duration of time. In the example illustrated in FIG. 71, it is assumed that the threshold amount and the speed of the rotation do not cause the UI display 7175 to rotate until a short time interval after the device has been placed in the horizontal position. Different embodiments have different threshold amounts and waiting periods for triggering the rotation operation. For example, some embodiments may have such a low threshold to triggering the rotation operation as to make the UI 7175 appear as if it were always displayed in an upright position, notwithstanding the orientation of the device 7100. In other embodiments, the user of the device 7100 may specify when the rotation operation may be triggered (e.g., through a menu preference setting). Also, some embodiments may not delay the rotation after the device is tilted past the threshold amount. Moreover, different embodiments may allow the rotation operation to be triggered in different ways, such as by toggling a switch on the mobile device, by giving voice commands, upon selection through a menu, etc.

The fourth stage 7135 illustrates the UI 7175 after the rotation operation has started. Some embodiments animate the rotation display areas to provide feedback to the user regarding the rotation operation. FIG. 71 illustrates an example of one such animation. Specifically, it shows in its fourth stage 7135 the start of the rotation of the display areas 7110, 7115, and 7160 together. The display areas 7110, 7115, and 7160 rotate around an axis 7165 going through the center of the UI display 7175 (i.e., the z-axis). The display areas 7110, 7115, and 7160 are rotated the same amount but in the opposite direction of the rotation of the device 7100 (e.g., through the tilting of the device 7100). In this example, since the device 7100 has rotated ninety degrees in a clockwise direction (by going from being held vertically to being held horizontally) the rotation operation would cause the display areas 7110, 7115, and 7160 to rotate ninety degrees in a counter clockwise direction. As the display areas 7110, 7115 and 7160 rotate, the display areas 7110, 7115, and 7160 shrink proportionally to fit the UI display 7175 so that the display areas 7110, 7115, and 7160 may still appear entirely within the UI 7175. Some embodiments may provide a message to indicate the state of this device 7100 (e.g., by displaying the words "Rotating").

The fifth stage 7140 illustrates the UI 7175 after the display areas 7110, 7115, and 7160 have rotated ninety degrees counter clockwise from portrait view to landscape view. In this stage, the display areas 7110, 7115, and 7160 have been rotated but have not yet expanded across the full width of the UI 7175. The arrows 7170 indicate that at the end of the fifth stage, the display areas 7110, 7115, and 7160 will start to laterally expand to fit the full width of the UI 7175. Different embodiments may not include this stage since the expansion could be performed simultaneously with the rotation in the fourth stage 7135.

The sixth stage 7145 illustrates the UI 7175 after the display areas 7110, 7115 and 7160 have been expanded to occupy the full display of the UI 7175. As mentioned above, other embodiments may implement this rotation differently. For some embodiments, simply rotating the screen of a device past a threshold amount may trigger the rotation operation, notwithstanding the orientation of the device 7100.

Figure 72:
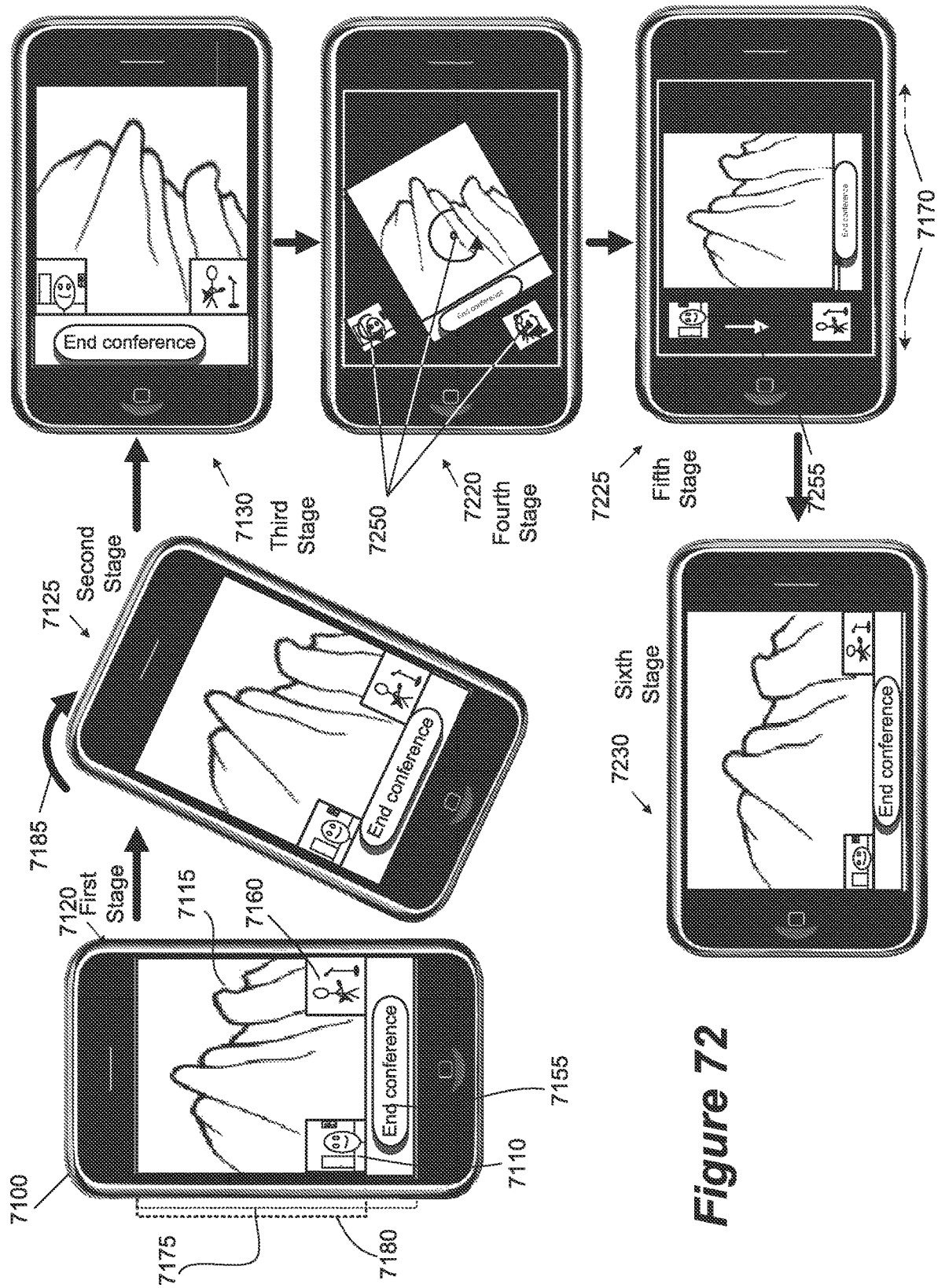
FIG. 72 illustrates another user interface of some embodiments for a PIP display rotation operation.

Also, other embodiments might provide a different animation for indicating the rotation operation. The rotation operation performed in FIG. 71 involves the UI display 7175 rotating about the center of the UI display 7175. Alternatively, the display areas may be individually rotated about the center axis of their individual display areas. One such approach is shown in FIG. 72, which shows an alternative method to animating the rotation of the PIP display area 7180 of the UI 7175. The PIP display illustrated in FIG. 72 is the same PIP display 7180 illustrated in FIG. 71.

FIG. 72 illustrates the rotation of the PIP display 7180 in terms of six different operational stages 7120, 7125, 7130,

7220, 7225, and 7230. The first three stages of operation of the UI 7175 are identical to the first three stages of operation as described in the UI 7175 in FIG. 71. At the third stage for both FIGS. 71 and 72, the device has gone from being held vertically to being held horizontally and the rotation of the UI 7175 has not yet begun.

The fourth stage 7220 illustrates an alternative method to animating the rotation. In this stage, the rotation operation has started. Specifically, the fourth stage 7220 shows the start of the rotation of the display areas 7110, 7115, and 7160. The display areas 7110, 7115, and 7160 each rotate around axes 7250 going through the center of each of the display areas (i.e., the z-axis). The display areas 7110, 7115, and 7160 are rotated the same amount but in the opposite direction of the rotation of the device 7100 (e.g., through the tilting of the device 7100). In this example, since the device 7100 has rotated ninety degrees in a clockwise direction (by going from being held vertically to being held horizontally) the rotation operation would cause the display areas 7115, 7110 and 7160 to rotate ninety degrees in a counter clockwise direction. As the display areas 7115, 7110 and 7160 rotate, they also shrink proportionally to fit the UI display 7175 so that the display areas 7115, 7110 and 7160 may still appear entirely on the UI 7175.

The fifth stage 7225 illustrates the UI 7175 after the display areas 7115, 7110 and 7160 have rotated ninety degrees counter clockwise from portrait view to landscape view. In this stage, the display areas 7115, 7110 and 7160 have been rotated but have not yet expanded across the full width of the UI 7175 or reached their final positions. The final positions of the display areas in the PIP display 7115 are determined by the positions of the display areas in the PIP display as shown in the first stage 7120 (e.g., the inset display 7110 in the lower left corner and the inset display 7160 in the lower right corner of the PIP display 7180).

The arrows 7170 indicate that at the end of the fifth stage, the display areas 7115, 7110 and 7160 will start to laterally expand until main display area 7115 fits the full width of the UI 7175. Moreover, the arrow 7255 indicates that the inset display areas 7110 and 7160 will move to reach their final positions in the PIP display 7180. In other words, the inset display area 7110 will move down towards the lower left corner of the PIP display 7180 while the other inset display area 7160 moves to the lower right corner of the PIP display 7180. Different embodiments may perform this animation differently, e.g. by using the snap and push operation illustrated in FIG. 71. The sixth stage 7230 illustrates the UI 7175 after the display areas 7110, 7115, and 7160 have been expanded to occupy the full display of the UI 7175 and have moved to their final positions.

As mentioned above, other embodiments may implement this rotation differently. For instance, as similarly illustrated in FIGS. 36 and 37, some embodiments provide a rotation operation in which the orientation of the display area that displays the video captured by the local device changes to reflect the orientation of the local device after a rotation operation is performed on the local device, some embodiments provide a rotation operation in which the orientation of the display area that displays video captured by the remote device changes to reflect the orientation of the remote device after a rotation operation is performed on the remote device, some embodiments provide a rotation operation in which the display area 1155 remains in the same position, some embodiments provide a different layout in the display area (e.g., the layout of the display area 1155 of FIG. 12), or a combination thereof.

For some embodiments, simply rotating the screen of a device past a threshold amount may trigger the rotation operation, notwithstanding the orientation of the device 7100. As also mentioned above, the local and remote devices notify each other of rotate operations performed on one of the devices through a control communication channel in order to allow the other device to perform any corresponding modifications to the one device's video. Also, the animation of the rotation operation can cause changes to the operation of the cameras or the image processing operations of the dual camera mobile device such as causing the video conference manager 1604 to re-composite the display area(s) at different angles in the UI 1105 and to scale the images displayed in the display area(s).

7. Select Remote View to View

Figure 73:
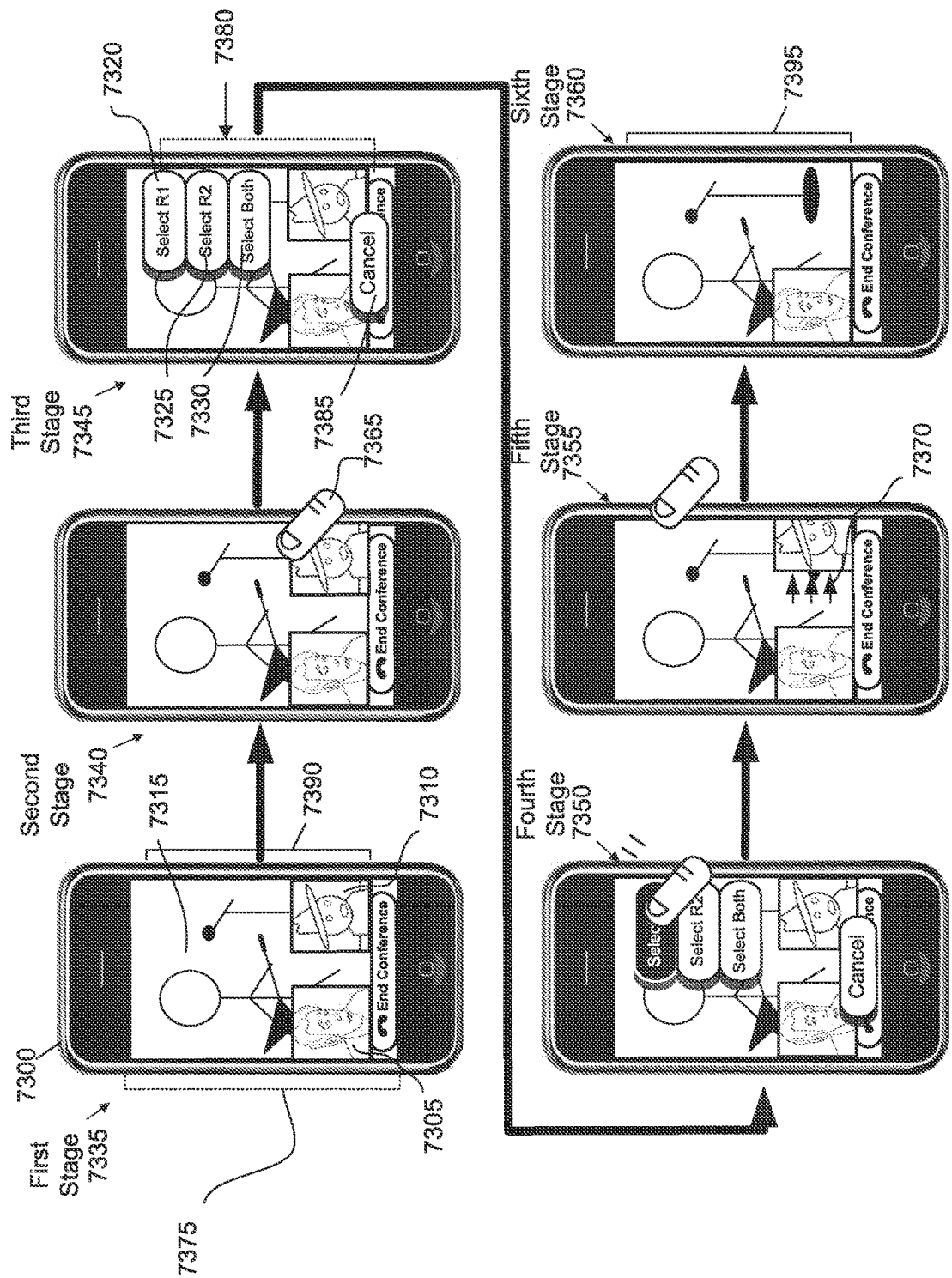
FIG. 73 illustrates another user interface of some embodiments for selecting one video from two remote videos during a video conference.
Figure 74:
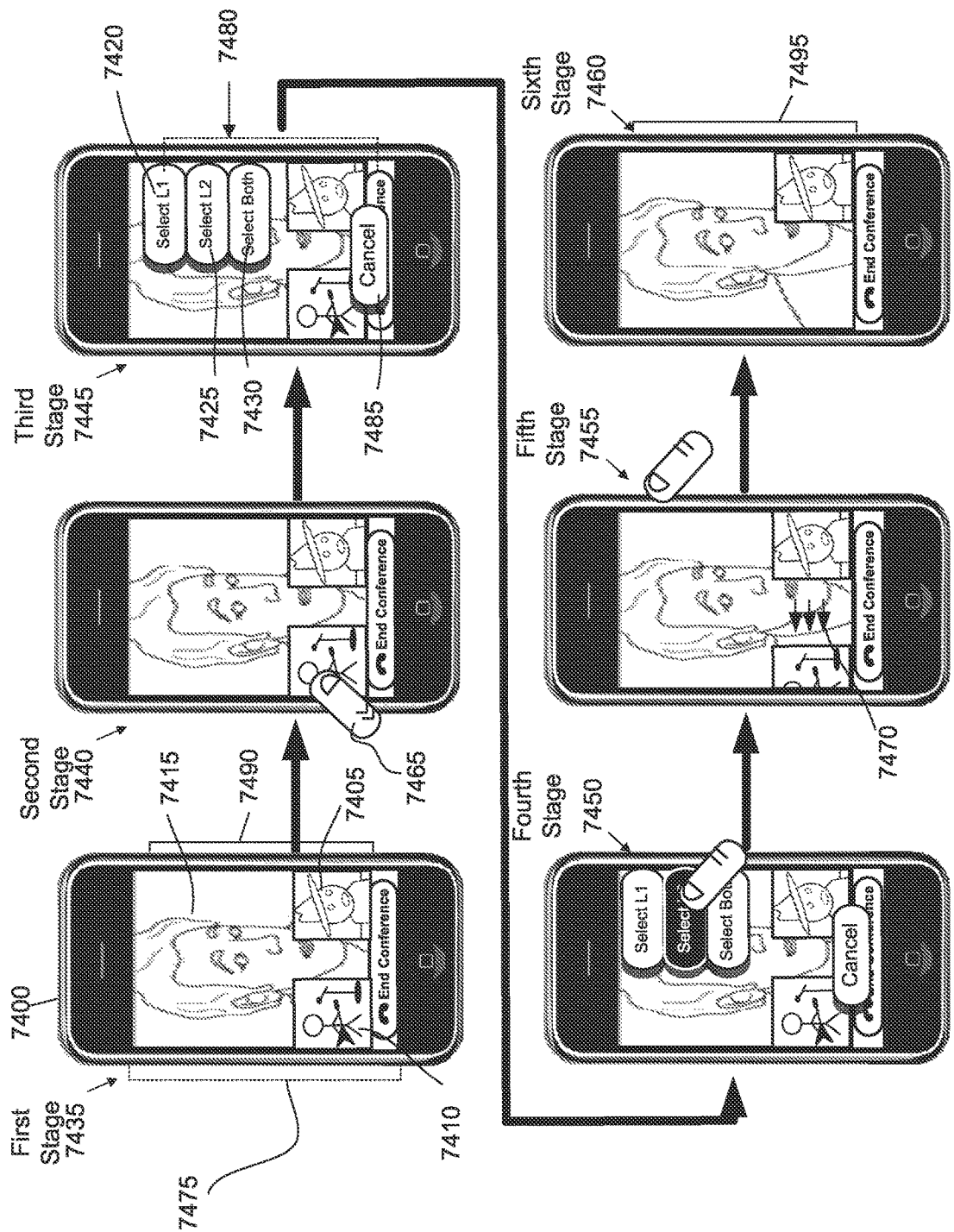
FIG. 74 illustrates a user interface of some embodiments for selecting one video from two local videos during a video conference.

As mentioned above, some embodiments allow a user of a dual camera mobile device to select which camera to use for a video conference before the start of the video conference or at the start of the video conference. Instead of, or in conjunction with this capability, some embodiments allow the user of the device to select between two videos that are being displayed in the video conference and that either are from two video cameras of a remote device or are from two video cameras of the user's local device. FIG. 73 illustrates an in-conference selection of one video from two remote videos, while FIG. 74 illustrates an in-conference selection of one video from two local videos.

FIG. 73 illustrates the selection of the remote video in terms of six operational stages 7335, 7340, 7345, 7350, 7355, and 7360 of a UI 7375 displayed on a local device 7300. The first stage 7335 illustrates the UI 7375 with an initial PIP display 7390 that is being presented during a video conference with a remote user of a mobile device that has two cameras.

As shown in the first stage 7335, the initial PIP display 7390 includes three displays: a background main display 7315 and two foreground inset displays 7305 and 7310. The background display 7315 takes a majority of the PIP display area 7390, while the foreground inset displays 7305 and 7310 overlap portions of the background display 7315 on the UI 7375. In this example, the background display 7315 presents a video of a person in front of a microphone, which is assumed to be video captured by the remote device's back camera. The first foreground inset display 7305 presents a video of a man's face, which in this example is assumed to be video captured by one of the cameras of the local device 7300. The second foreground inset display 7310 presents a video of a person with a hat, which in this example is assumed to be video captured by the remote device's front camera.

The initial PIP display 7390 is only one manner of presenting a composite view of the videos being captured by the cameras of the local device and remote device. Some embodiments may provide other composite views. For instance, the background display may present the video from one of the local device's cameras, and the smaller foreground inset displays may present the videos from the remote device's front and back camera. Also, in some cases, the PIP display only includes one background video display and one foreground video display, both of which come from the remote device. The manner of the PIP display or a default display mode may be specified by the user in some embodiments.

The second stage 7340 illustrates the start of the video selection operation. In this example, this operation is initiated by invoking a set of selectable UI items to be displayed on the PIP display 7390. The set of selectable UI items present options for selecting the remote video for display. In some embodiments, the set of selectable UI items may be invoked by selecting (e.g., by touching) any display area that is playing a remote video on the UI 7375. In other embodiments, the items may be invoked by selecting (e.g., by touching) anywhere on UI 7375. Instead of or in conjunction with such invocation operations, some embodiments also allow the user to invoke the set of selectable UI items through other operations, such as through different touchscreen operations or using one or more other physical inputs of the device.

The third stage 7345 displays the UI 7375 with the invoked set of selectable UI items 7380 for selecting the remote videos. In this example, the set of selectable UI items 7380 in the form of a pop-up menu is displayed in the PIP display area 7390 and it overlaps the PIP display. The set of selectable UI items 7380 (which can be implemented as selectable buttons) includes a "Select R1" selectable UI item 7320 (e.g. button 7320), a "Select R2" selectable UI item 7325 (e.g. button 7325), a "Select Both" selectable UI item 7330 (e.g. button 7330), and a "Cancel" selectable UI item 7385 (e.g. button 7385). In this example, selection of the "Select R1" button 7320 would cause the UI 7375 to display only the video captured by the remote device's back camera (being presented in the background display 7315). Selection of the "Select R2" button 7325 would cause the UI 7375 to display only the video captured by the remote device's front camera (being presented in the foreground inset display 7310). Selection of the "Select Both" button 7330 would cause the UI 7375 to continue displaying both videos captured by the remote device's front and back cameras. Selection of the "Cancel" button 7385 would cancel the operation. In some embodiments, the video captured by the local device is not affected by the selection made on this menu.

The fourth stage 7350 illustrates the UI 7375 after the user has selected the "Select R1" button 7320 (e.g., by tapping on the button 7320 with his finger 7365). This selection is indicated by the highlighting of the button 7320 on the UI 7375. Some embodiments use different indication displays (e.g., highlighting the border of the selected item or the text in the selected item).

The fifth stage 7355 illustrates the animation of the UI 7375 after the user has selected the video from R1 for display. In this example, the UI 7375 removes the unwanted foreground inset display area 7310 by sliding it off the right edge of the PIP display 7390 as indicated by arrows 7370. Other embodiments utilize different animations to remove the unwanted inset display area, such as fading out or dissolving the inset, moving it in a different direction, or simply removing it instantaneously.

The sixth stage 7360 displays the UI 7375 during the video conference after the video selection operation has been completed. The video display area 7310 is no longer displayed on the UI 7375. In this stage, the UI 7375 presents a new PIP display 7395 that includes the video display area 7315 as the background main display and the video display area 7305 as the inset display.

In some embodiments, this video selection operation will also cause the remote device to only display the selected video, though in other embodiments the operation has no effect on the remote device. In some embodiments, this video selection operation will cause the remote device to stop transmitting the unwanted video to the local device. In fact, this video selection operation will cause the camera of the remote device to stop capturing the unwanted video in some embodiments. In some embodiments, these effects on the remote device can be overruled by the user of the remote device.

The above example illustrates the case where the remote view selected is that which is already displayed in the background main display. In some embodiments, when the user selects the remote view that is displayed in one of the inset displays, the selected remote view is displayed in the background main display. Some such embodiments use an animation like that displayed in FIG. 68 in this case. Moreover, the selection of the remote video(s) can cause changes to the image processing operations of the local dual camera mobile device such as causing the video conference manager 1604 to composite only the selected remote video(s) in the composite display in response to the user's input.

8. Select Local View to View

FIG. 74 illustrates the selection of the local video in terms of six operational stages 7435, 7440, 7445, 7450, 7455, and 7460 of a UI 7475 displayed on a local device 7400. The first stage 7435 illustrates the UI 7475 with an initial PIP display 7490 that is being presented during a video conference with a remote user of a mobile device having at least one camera. The PIP display 7490 is similar to the one in the first stage 7335 in FIG. 73, except that unlike FIG. 73, the background display 7415 presents a video of a man that is captured by a remote device's camera, the left foreground inset display 7410 presents a video of a person with a guitar that is captured by the back camera of local mobile device, and the right foreground inset display 7405 presents a video of a man with a hat that is captured by the front camera of local mobile device 7400. Thus, only one remote video is displayed, while two local videos are displayed.

The second stage 7440 illustrates the start of the video selection operation. In this example, this operation is initiated by invoking a set of selectable UI items to be displayed on the PIP display 7490 for selecting the remote video for display. In some embodiments, the set of selectable UI items may be invoked by selecting (e.g., by touching) any display area that is playing a local video on the UI display 7475. In other embodiments, the items may be invoked by selecting (e.g., by touching) anywhere on UI display 7475. Instead of, or in conjunction with such invocation operations, some embodiments also allow the user to invoke the set of selectable UI items through other operations, such as through different touchscreen operations or using one or more other physical inputs of the device.

The third stage 7445 displays the UI 7475 with the invoked set of selectable UI items 7480 for selecting the local videos. In this example, the set of selectable UI items 7480 in the form of a pop-up menu is displayed in the PIP display area 7490 overlapping the PIP display. The set of selectable UI items 7480 includes a "Select L1" selectable UI item 7420 (e.g. button 7420), a "Select L2" selectable UI item 7425 (e.g. button 7425), a "Select Both" selectable UI item 7430 (e.g. button 7430), and a "Cancel" selectable UI item 7485 (e.g. button 7485) for canceling the operation. In this example, selection of the "Select L1" button 7420 would cause the UI 7475 to display only the video captured by the local device's back camera (being presented in the foreground inset display 7410). Selection of the "Select L2" button 7425 would cause the UI 7475 to display only the video captured by the local device's front camera (being presented in the foreground inset display 7405). Selection of the "Select Both" button 7430 would cause the UI 7475 to continue displaying both videos captured by both cameras on the local device, and selecting the "Cancel" button 7485 would cancel the operation. In some embodiments, the video captured by the remote device is not affected by the selection made through this menu.

The fourth stage 7450 illustrates the UI 7475 after the user has selected the "Select L2" button 7425 (e.g., by tapping on the button 7425 with his finger 7465). This selection is indicated by the highlighting of the button 7425 on the UI display 7475. Some embodiments use different indication displays (e.g., highlighting the border of the selected item or the text in the selected item).

The fifth stage 7455 displays the animation of the UI 7475 after the user has selected the video from L2 for display. In this example, the UI 7475 removes the unwanted foreground inset display 7410 by sliding it off the left edge of the PIP display 7490 as indicated by arrows 7470. Other embodiments utilize different animations to remove the unwanted inset display area, such as fading out or dissolving the inset, moving it in a different direction, or simply removing it instantaneously.

The sixth stage displays the UI 7475 during a video conference after the video selection operation has been completed. The video display area 7410 is no longer on the UI 7425. In this stage, the UI 7475 presents a new PIP display 7495 that includes the remote video display 7415 as the background main display and the local video display 7405 as an inset display. In some embodiments, this video selection operation only affects the local display, as both video captures are still transmitted to the remote device. Other embodiments stop capturing from the removed camera.

The above example illustrates the case where the local view selected is that which is already displayed in the background main display. In some embodiments, when the user selects the local view that is displayed in one of the inset displays, the selected local view is displayed in the main background display. Some such embodiments use an animation like that displayed in FIG. 68 in this case. Other embodiments will use an inset remote view when the local view in the background main display is removed.

Similar to the remote view selection operation described above by reference to FIG. 73, the selection of the local video(s) can cause changes to the image processing operations of the local dual camera mobile device such as causing the video conference manager 1604 to do the composite only the selected remote video(s) in the composite display in response to the user's input. The selection of the local video(s) can also cause changes in the operation of a camera(s) of the local device. For example, some embodiments cause the camera of an unselected video to stop transmitting the unwanted video to the remote device while other embodiments cause the camera to stop capturing the unwanted video.

9. Select Local View to Transmit

Figure 75:
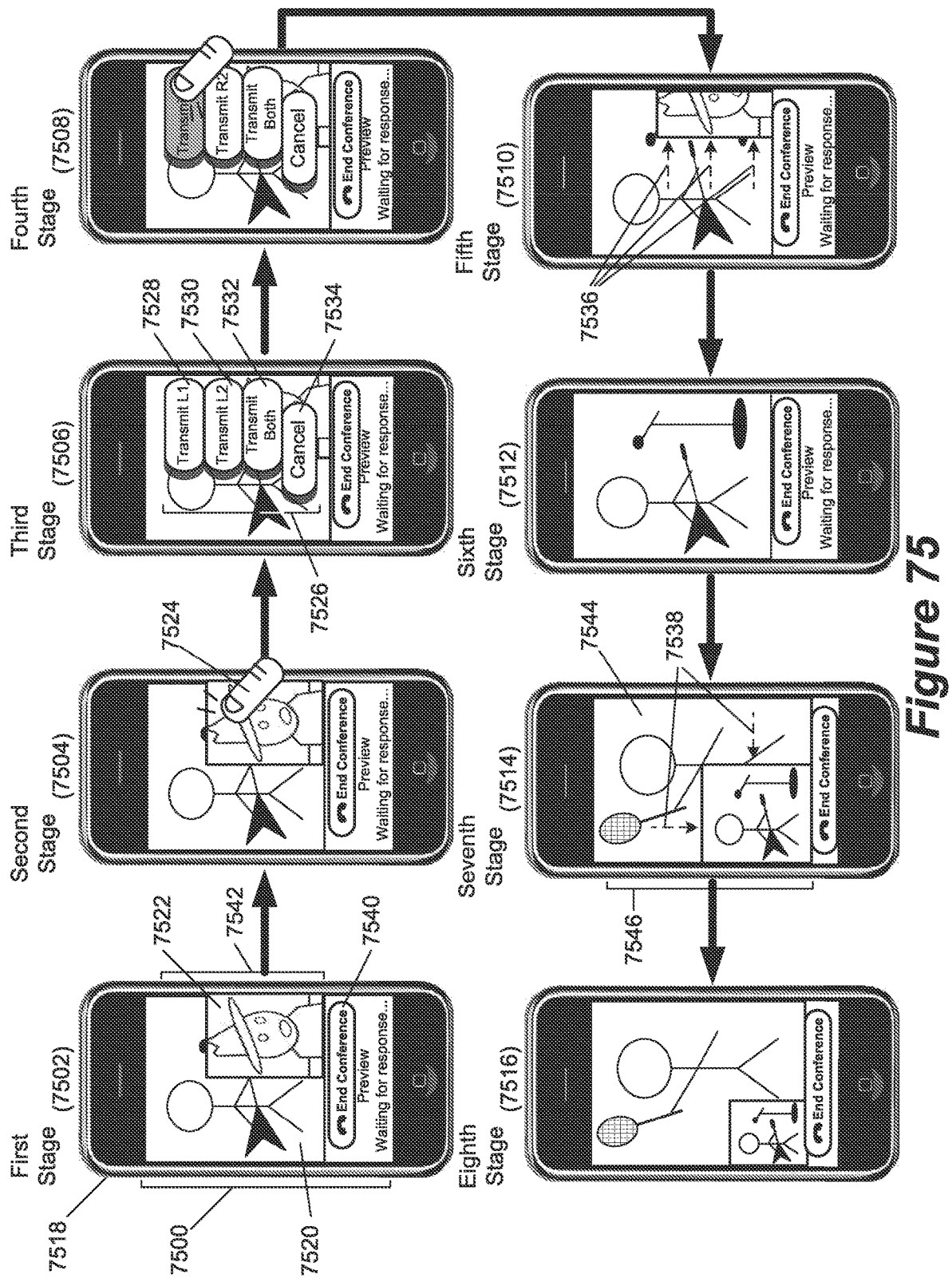
FIG. 75 illustrates a user interface of some embodiments for a pre-conference selection of a video to use for the video conference.

The above sub-sections illustrate in-conference modifications to the video displays. Some embodiments also allow a user of a dual camera mobile device to select which camera to use for a video conference before the start of the video conference. FIG. 75 illustrates a pre-conference selection of one video from two videos captured by the user's dual camera mobile device to use for the video conference.

FIG. 75 illustrates the selection of the local video to use for the video conference in terms of eight operational stages of a UI 7500. The first stage 7502 illustrates the UI 7500 of a dual camera mobile device 7518 with an initial PIP display 7542 that is being presented after a user has requested to start a video conference with a remote user of a mobile device.

As shown in the first stage 7502, the initial PIP display 7542 includes two video displays: a background main display 7520 and a foreground inset display 7522. The background main display 7520 takes up a majority of the display screen of the device, while the foreground inset display 7522 is smaller and overlaps the background main display. In this example, the background display 7520 presents a video of a person holding a guitar, which is assumed to be video being captured by the device's back camera. The foreground inset display 7522 presents a video of a person with a hat, which in this example is assumed to be video being captured by the device's front camera.

This initial PIP display 7542 is only one manner of presenting a composite view of the videos being captured by the cameras of the local device. Some embodiments may provide other composite views. For instance, the background display may present the video from the device's front camera, and the smaller foreground inset display may present the video from the device's back camera. Also, some embodiments allow the two videos to appear in the UI 7500 in two side-by-side display areas (e.g. left and right display windows, or top and bottom display windows) or two diagonally aligned display areas. The manner of the PIP display or a default display mode may be specified by the user in some embodiments. Below the PIP display is a selectable UI item 7540 labeled "End Conference" (e.g. a button 7540) that allows the user to end the video conference by selecting the item.

In the first stage 7502, the user of the mobile device 7518 has requested to have a video conference with a remote user and is waiting for the remote user to respond. This waiting period is illustrated by the "Preview, Waiting for response . . . " notation at the bottom of the display.

The second stage 7504 illustrates the start of the video selection operation. In this example, the operation is initiated by invoking a set of selectable UI items to be displayed on the PIP display 7542. The set of selectable UI items present options for selecting the local video to transmit to the remote device for the video conference. In some embodiments, the set of selectable UI items may be invoked by selecting (e.g., touching) anywhere on the UI display 7500 during the pre-conference time while waiting for the remote user to respond. Instead of, or in conjunction with such invocation operations, some embodiments also allow the user to invoke the set of selectable UI items through other operations, such as through different touchscreen operations or using one or more other physical inputs of the device.

The third stage 7506 illustrates the UI 7500 with the invoked set of selectable UI items 7526 for the user to select the videos. In this example, the set of selectable UI items 7526 in the form of a pop-up menu is displayed in the PIP display area 7542 and it overlaps the PIP display. In this example, the set of selectable UI items includes: a "Transmit L1" item 7528 (e.g. button 7528); a "Transmit L2" item 7530 (e.g. button 7530); a "Transmit Both" item 7532 (e.g. button 7532); and a "Cancel" item 7534 (e.g. button 7534). In this example, selection of the "Transmit L1" button 7528 would cause the UI 7500 to transmit only the video captured by the device's back camera to the remote device during the video conference. Selection of the "Transmit L2" button 7530 would cause the UI 7500 to transmit only the video captured by the device's front camera to the remote device during the video conference. Selection of the "Transmit Both" button 7532 would cause the UI 7500 to transmit both videos captured by the device's front and back camera to the remote user for the video conference, and selecting the "Cancel" button 7534 would cancel the operation.

The fourth stage 7508 illustrates the UI 7500 after the user has selected the "Transmit L1" button 7528 (e.g., by tapping on the button 7528 with his finger 7524). This selection is indicated by the highlighting of the button 7528 on the PIP display area 7542. Some embodiments use different indication displays (e.g., highlighting the border of the selected item or the text in the selected item).

The fifth stage 7510 illustrates the animation of the UI 7500 after the user has selected the video from the device's back camera to transmit to the remote device. In this example, the UI 7500 removes the unwanted foreground inset display 7522 by sliding it off the right edge of the PIP display 7542 as indicated by arrows 7536. In the sixth stage 7512, the inset display 7522 has been completely removed from the PIP display area 7542. Different embodiments use different animations to remove the unwanted display area, such as fading out or dissolving the display area, moving it in a different direction, or simply removing it instantaneously.

The seventh stage 7514 illustrates the animation of the UI 7500 after the remote user has accepted the video conference request. The acceptance of the video conference request is highlighted by the removal of the "Preview, Waiting for response . . . " notation on the display. In this stage, the background display area 7520, which is a video from the device's back camera, gradually decreases in size to the lower left corner of the PIP display area 7542, as indicated by arrows 7538. The background display 7520 shrinks so that the UI 7500 can show behind the display area 7520 a display area 7544 that contains the video from a camera of the remote user. Some embodiments shrink the local camera to a different location, use a tiled composite display of the two displayed videos, or make the remote view the inset display area of a PIP display.

The eighth stage 7516 shows the UI 7500 after the video selection operation has been completed. The UI 7500 presents a new PIP display 7546 that includes an inset display 7520 of the video captured from the local device and a background display 7544 of the video transmitted from the remote device.

B. Bandwidth & Frame Rate

Figure 76:
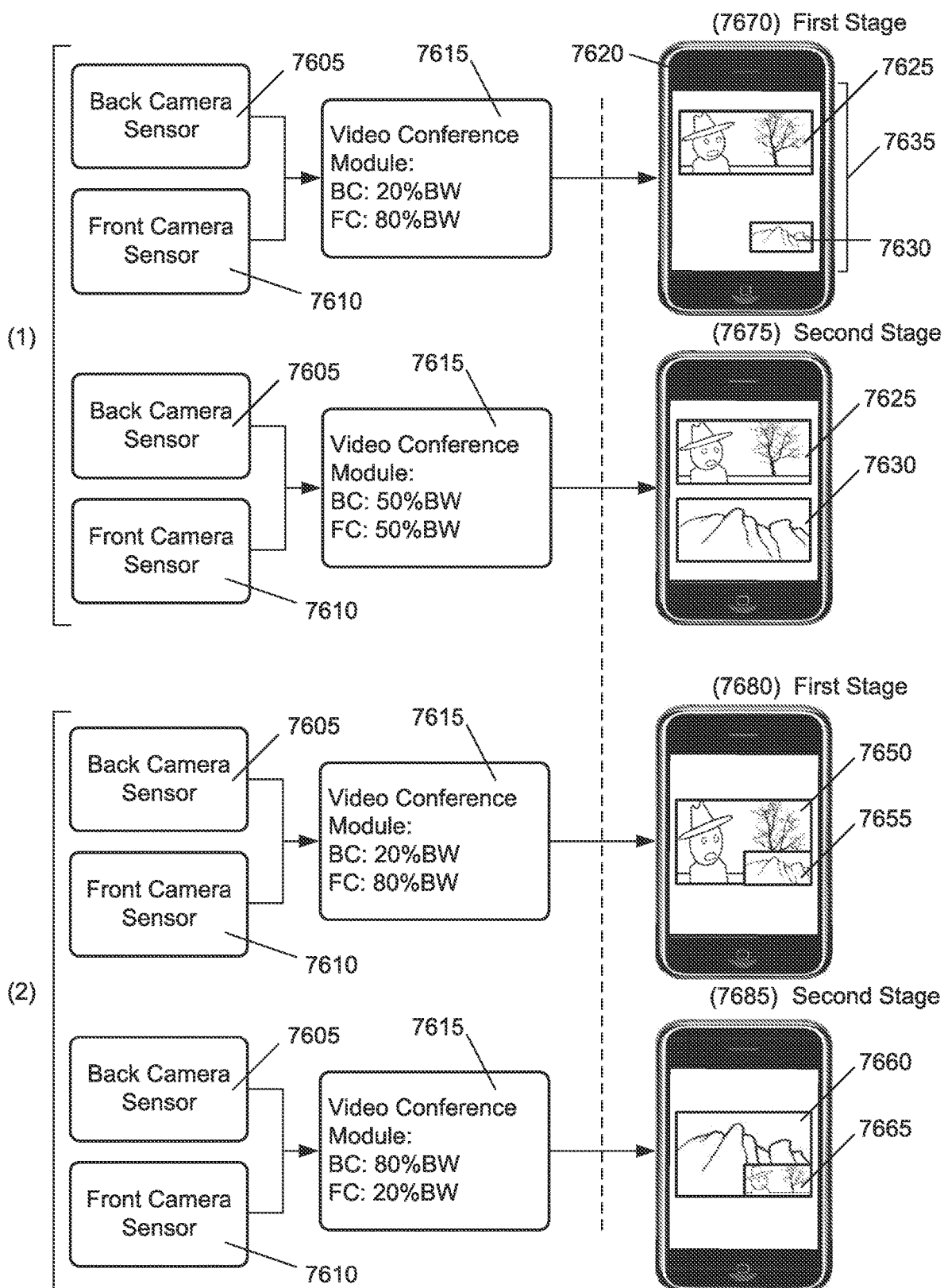
FIG. 76 illustrates examples of bandwidth allocation between two videos captured by a dual camera mobile device of some embodiments.

In some embodiments, adjustments to the size of the display areas of a remote mobile device during a video conference may cause a local mobile device to reallocate the bandwidth allotted to each video captured by the two cameras (i.e., a front camera and a back camera) of the local mobile device. FIG. 76 illustrates two examples of such bandwidth reallocation between the two cameras of the local device.

Each of the examples in FIG. 76 involves a back camera sensor 7605 of a local device, a front camera sensor 7610 of the local device, a video conference module 7615 of the local device, and a UI 7635 of a remote mobile device 7620. The back camera sensor 7605 and the front camera sensor 7610 capture videos from the respective back and front cameras of the local device. The captured videos are sent to the video conference module 7615, which processes them and transmits them to the remote device for display in the UI 7635.

In FIG. 76, the UI 7635 of the remote device presents a composite display. The composite display shows videos that are captured by the local device's front and back camera. The video from the front camera captures a tree and a man with a hat while the video from the back camera captures a mountain landscape. As illustrated in FIG. 76, the two videos may be displayed in the UI 7635 in many different manners based on the arrangement of display areas for displaying the videos and also the size of the display areas. In each example, the video conference module 7615 initially allocates the total output bandwidth between each of the videos according to the relative sizes of the display areas in the remote device. Specifically, the video that is displayed in a larger display area in the UI 7635 is allocated a larger portion of the total bandwidth, and the video that is displayed in a smaller display area in the UI 7635 is allocated a smaller portion of the bandwidth. In some embodiments, when the videos are displayed in the same size display area, the total output bandwidth is allocated equally between the two videos.

The amount of bandwidth allocated to each of the two videos may impact the manner in which each video is processed. For example, a video may require a higher bandwidth than what is allocated to the video. In such case, the video's frame rate is adjusted or the size of the video's images is scaled down in order to accommodate the lower bandwidth. Reducing the frame rate of a video causes the video to appear "choppy" whereas scaling down the size of the video's images reduces the area in which the video is displayed. Therefore, when a video is allocated an amount of bandwidth, some embodiments adjust the video's frame rate, scale down the size of the video's images, or perform a combination of both in order to ensure that the video can be transmitted within the allotted bandwidth. One of ordinary skill in the art will realize that the adjustment of frame rate and average frame size may vary to obtain an optimal overall video quality while still ensure that the video can be transmitted within the allotted bandwidth.

Example (1) of FIG. 76 illustrates one scenario of bandwidth reallocation in two operational stages of UI 7635. The UI 7635 of the remote device 7620 in first stage 7670 presents a composite display that contains two displays—one on the top and the other on the bottom of the UI 7635. In this example, the top display area 7625 shows a video that is being captured by the local device's front camera, and the bottom display area 7630 shows a video that is being captured by the local device's back camera. As illustrated in the first stage 7670, the top display area 7625 is larger than the bottom display area 7630. Thus, the video from the local device's front camera is allocated 80% of the bandwidth, and the video from the local device's back camera is allocated 20% of the bandwidth. In order to ensure that the video from the local device's back camera can be transmitted from the local device to the remote device within the allotted bandwidth, the video's frame rate or scaling size, or both, are adjusted.

The second stage 7675 illustrates the UI 7635 after the user of the remote device has increased the size of the bottom display area such that the sizes of the top display area 7625 and the bottom display area 7630 are approximately the same. As a result, each of the videos is reallocated 50% of the total bandwidth by the video conference module 7615.

Example (2) of FIG. 76 illustrates another scenario for bandwidth reallocation in two operational stages of UI 7635. In the first stage 7680 of Example (2), the UI 7635 presents a PIP display. The PIP display contains two displays: a background main display area 7650 and a foreground inset display area 7655. The background display area 7650 takes up a majority of the PIP display, while the foreground inset display area 7655 is smaller and overlaps the background main display area 7650. In this example, the background display area 7650 presents a video that is being captured by the device's front camera. The inset display area 7655 presents a video that is being captured by the device's back camera. As illustrated in this stage, the background display area 7650 is larger than the inset display area 7655. Thus, the video from the device's front camera is allocated 80% of the bandwidth, and the video from the device's back camera is allocated 20% of the bandwidth. In order to ensure that the video from the local device's back camera can be transmitted from the local device to the remote device within the allotted bandwidth, the video's frame rate or scaling size, or both, are adjusted.

The second stage 7685 illustrates the UI 7635 after the user of the remote device has swapped the displays of the two videos. Specifically, the background display area 7660 now presents a video that is being captured by the device's back camera, and the inset display area 7665 now presents a video that is being captured by the device's front camera. Since the sizes of the display areas for the two videos have changed, the video from the device's back camera is allocated 80% of the bandwidth, and the video from the device's front camera is allocated 20% of the bandwidth. As such, the frame rate or scaling size, or both, of the video from the local device's front camera will be reduced. One of ordinary skill in the art will realize that the bandwidth distributions described in FIG. 76 are only examples and other techniques for allocating bandwidth between two cameras during a video conference are possible.

1. Frame Rate Control

Like the in-conference frame rate control operations described above, some embodiments may wish to separately adjust or maintain the rate at which images of a video captured by each camera of the dual camera mobile device are transmitted to the other device in the video conference. Some of these embodiments provide similar techniques described above. For example, some embodiments control the frame rate of each camera by adjusting the VBI of the sensor module 415 of each camera. Other embodiments provide additional techniques as well such as frame dropping, which can be performed by the sensor module 415 of each camera and/or the universal transmission buffer 3120, for example.

2. Bandwidth Control Through Scaling

As discussed above, during a video conference between a dual camera mobile device and another device, an amount of image data that can be transmitted over one or more network connections in a particular amount of time (i.e., network connection bandwidth) may be limited. To maximize and maintain throughput of the network connection, different embodiments of the dual camera mobile device provide different ways to control the amount of image data transmitted over the network connection in the particular amount of time. In some embodiments, throughput is the average rate of successful message delivery over a communication channel (e.g., a network connection).

When transmitting images captured by both cameras of the dual camera mobile device, one such way resizes images from one or both cameras of the dual camera mobile device to control the amount of image data transmitted over the network connection. Some embodiments scale down the size of the images captured by the dual camera mobile device to reduce the amount of image data transmitted over the network connection while other embodiments scale up the size of the images to increase the amount of image data transmitted over the network connection.

Some embodiments maintain the height-to-width ratio of the images when scaling (i.e., uniform scaling). Other embodiments scale the images such that the height-to-width ratio of the scaled images are different that the original images (i.e., anamorphic scaling).

Furthermore, scaling can be performed at different stages of the image processing process. The scaling of some embodiments can be performed by the camera sensor. In such embodiments, the camera sensor may drop rows or columns of data of an image (i.e., pixel values). In some of such embodiments, the remaining image data is interpolated to smooth the appearance of the image.

The scaling of other embodiments is performed by the scaler module 455 of the CIPU 400. In some embodiments, scaling is performed by the video conference manager 1604, as described above, and in other embodiments, scaler is performed by the encoder. As such, different embodiments of the dual camera mobile device perform scaling differently.

3. Bit Rate Control

Some embodiments provide different mechanism for managing the bit rate at which videos captured by the cameras of a dual camera mobile device are encoded. In some embodiments, the dual camera mobile device includes a rate controller for each camera. Some embodiments provide a fixed bit rate management scheme. Under this scheme, each of the rate controllers is set at a fixed bit rate so that the total bit rate of the videos from both cameras on the mobile device is constant. Other embodiments provide a priority scheme in which one of the two videos from the device's cameras will always get priority over the other when the total bit rate is required to be reduced.

Figure 77:
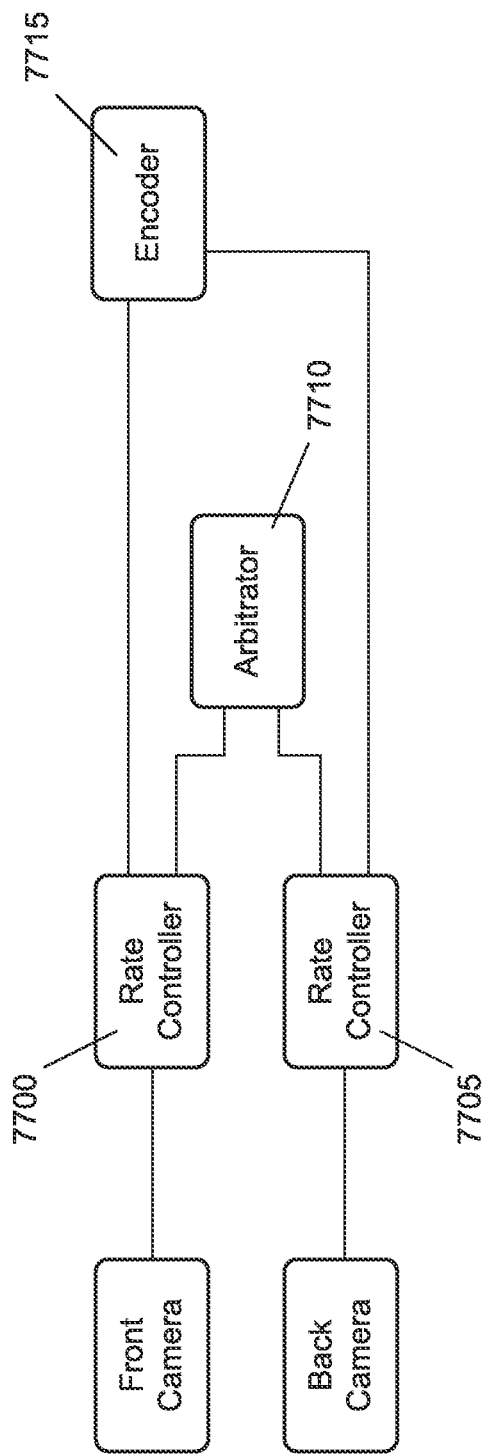
FIG. 77 conceptually illustrates an arbitrator module of some embodiments for managing rate controllers of a dual camera mobile device.

In some embodiments, an arbitrator module manages the two rate controllers of the two cameras. FIG. 77 illustrates an example of such arbitrator module. As shown in FIG. 77, a rate controller 7700 sets the bit rate for the front camera and a rate controller 7705 sets the bit rate of the back camera. The rate controllers send the images from the camera sensors to the encoder 7715. An arbitrator module 7710 is connected to both rate controllers and controls the setting of the bit rate for each rate controller 7700 and 7705 any number of ways based on information such as the available bandwidth, video size for each of the two videos, etc., to ensure that both videos can be transmitted to a remote device under the available bandwidth. In addition, the arbitrator 7710 can be configured to implement the fixed rate scheme or the priority scheme mentioned above.

In some other embodiments, the two rate controllers for the two cameras can communicate with each other. Under this scheme, the rate controllers can exchange information of their respective videos and set the bit rates of the videos accordingly. Several examples of rate controller rate management mechanisms are provided. Many other different mechanisms, however, are possible.

4. Video Processing

Some embodiments of the dual camera mobile device process images captured by both cameras of the dual camera mobile device differently in different situations. For example, when processing a PIP composite image that includes images captured by both cameras of the dual camera mobile device, some embodiments selectively perform the TNR process 2000 on the PIP composite image. Some of these embodiments perform the TNR process 2000 on only the main image in the PIP composite image while other of these embodiments perform the TNR process 2000 on only the inset image in the PIP composite image.

As another example of processing images captured by both cameras of the mobile device, some embodiments scale images captured by both cameras of the dual camera mobile device based on various changes to the video conference such as user adjustments to the display areas (e.g., enlarging inset of a PIP display, defining a region of interest in a displayed video, swapping main/inset of a PIP display, etc.) that display videos, changes to total available bandwidth, etc. Some of these embodiments scale the images in the manners described above. That is, the images can be scaled by the encoder 1655, the video conference manager 1604, the scaler module 455, and the camera sensors (i.e., 405a or 405b) by which the images were captured, for example.

5. Encoding

Figure 78:
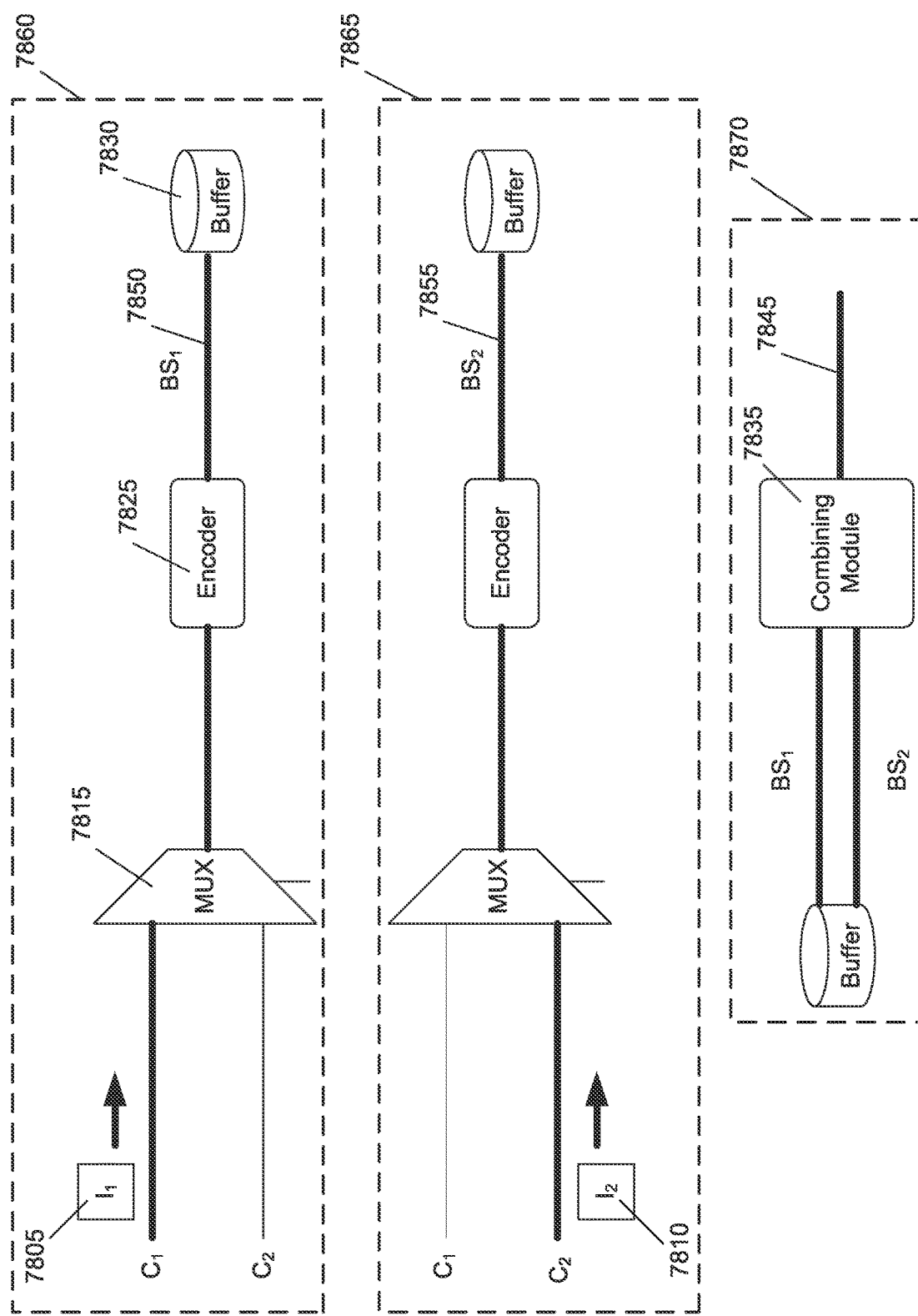
FIG. 78 conceptually illustrates a method of some embodiments for encoding images captured by cameras of a dual camera mobile device.

As mentioned above, some embodiments transmit video from both cameras of a dual camera mobile device. As such, these embodiments may encode the videos captured by both cameras for transmission to a remote device during a video conference. Different embodiments provide different ways to encode the videos for transmission. FIG. 78 illustrates an approach that uses a multiplexer (MUX) 7815, an encoder module 7825, a buffer 7830 and a combining module 7835 to process the videos for transmission.

Based on the select signal, the MUX 7815 takes one input signal and outputs the selected input signal to the encoder 7825. For instance, if the select signal indicates the MUX 7815 to take the input signal from C1, the MUX 7815 selects that input signal and outputs it. The select signal can be provided in many ways such as through instructions from the video conference manager 1604. Through the MUX 7815, the encoder 7825 alternately encodes images received from the MUX 7815 into a bit stream format and stores the encoded images in buffer 7830. The combining module 7835 combines (i.e. multiplexes) one or more bit streams stored in the buffer 7830 and outputs a single bit stream.

The operation of this encoding approach will now be described in terms of three stages 7860, 7865, and 7870. In the first stage 7860, the MUX 7815 is configured to receive and output the images 7805 captured by camera C1 to the encoder 7825 for encoding. The encoder 7825 encodes the received images and generates a bit stream 7850, which is then stored in the buffer 7830. The second stage 7865 is similar to the first stage 7860 except the MUX 7815 is configured to receive and output the images 7810 captured by camera C2 to the encoder 7825 for encoding. Again, the encoder encodes the received images and generates a bit stream 7855, which is stored in the buffer 7830. In the third stage 7870, the combining module 7835 retrieves the bit streams 7850 and 7855 from the buffer 7830 and combines them into one bit stream for transmission to the remote device.

Figure 79:
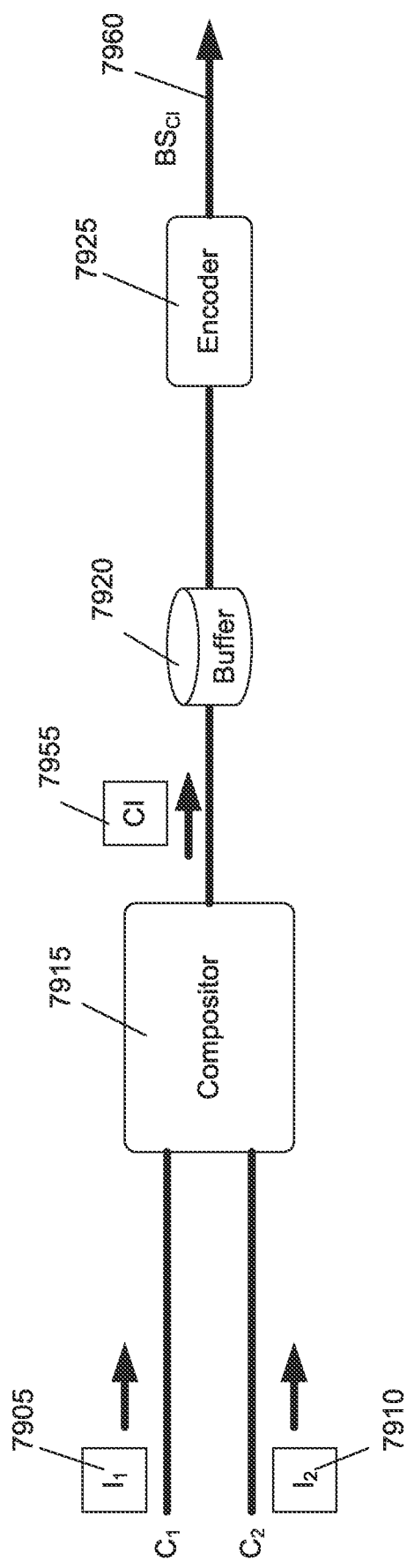
FIG. 79 conceptually illustrates another method of some embodiments for encoding images captured by cameras of a dual camera mobile device.

FIG. 79 illustrates another approach for encoding two videos from a dual camera mobile device for transmission to a remote device during a video conference. In this approach, a video frame (i.e. an image) from a first camera of the mobile device and another video frame from a second camera of the mobile device are composited into one video frame before the composited video frame is encoded into a bit stream to be sent to the remote device. As shown in FIG. 79, this approach includes a compositor 7915, a buffer 7920, and an encoder 7925.

Figure 80:
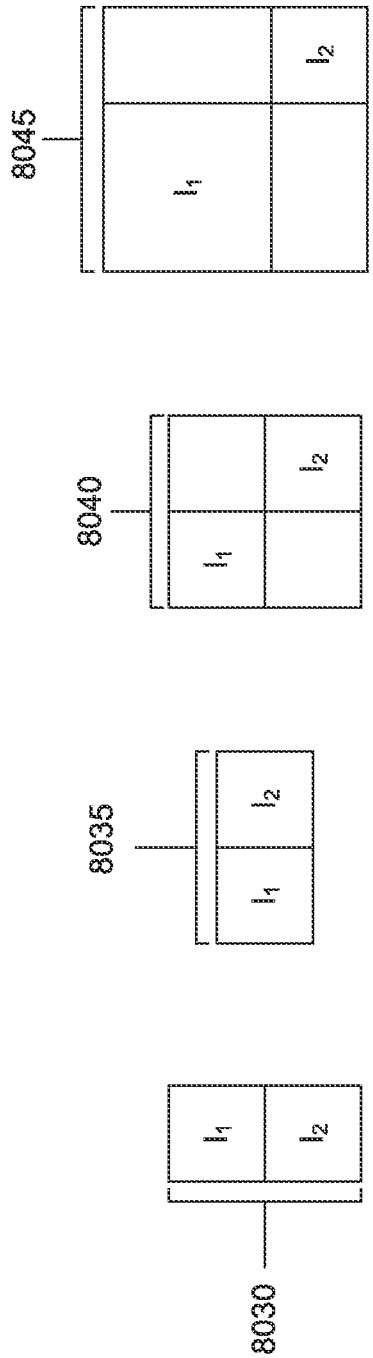
FIG. 80 illustrates example image composites for the method illustrated in FIG. 79.

As shown, the compositor 7915 composites an image 7905 from the first camera and an image 7910 from the second camera to form a composite image 7955. Different embodiments composite the images 7905 and 7910 differently. For instance, the compositor 7915 of some embodiments may composite the images by aligning the two images adjacent to one another as shown in FIG. 80. Composite images 8030 and 8035 illustrate two example composite images using this technique. In the composite image 8030, the image 7905 from the first camera is aligned on top of the image 7910 from the second camera. Whereas, the composite image 8035 shows the image 7905 aligned to the left of the image 7910.

In some other embodiments, the compositor 7915 may composite the two images 7905 and 7910 by superimposing the two images 7905 and 7910 on top of a larger background image. A composite image 8040 of FIG. 80 illustrates an example composite image using this technique. In the composite image 8040, the images 7905 and 7910 are aligned diagonally and superimposed onto the blank image (i.e., the image 7905 is located on the top left corner and the image 7910 is located on the bottom right corner of the background image). In some embodiments, the camera sensors may be different sizes and thus capture images with different pixel resolutions. In such embodiments, the compositor 7915 may composite the images 7905 and 7910 in a similar manner as illustrated by composite image 8045 of FIG. 80. After compositing the two images, the compositor 7915 store the composite images in the buffer 7920. The encoder 7925 retrieves the composite images from the buffer 7920, encodes the composited images into a bit stream, and sends it to the remote device of the video conference.

The operations will now be described by reference to the compositor 7915, the buffer 7920, and the encoder 7925 illustrated in FIG. 79. First, a first camera sends an image 7905 as part of a sequence of images in a video to the compositor 7915. At the same time, a second camera sends another image 7910 as part of a sequence of images in a video to the compositor 7915. The compositor 7915 then composites the images 7905 and 7910 to form a composite image 7955 in ways that were described above. Next, the compositor 7915 sends the composite image 7955 to the buffer 7920. The buffer 7920 then stores the composite images before sending them to the encoder 7925. Finally, the encoder 7925 encodes the composite images into a bit stream and sends it to the remote device of the video conference.

Figure 81:
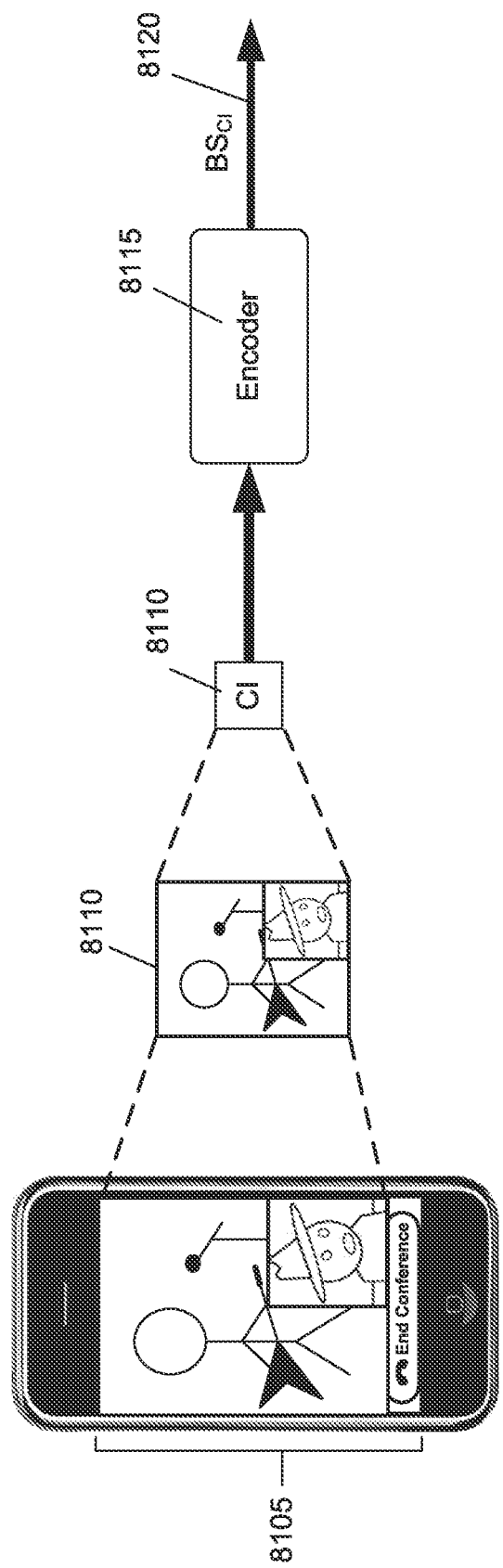
FIG. 81 conceptually illustrates another method of some embodiments for encoding images captured by cameras of a dual camera mobile device.

FIG. 81 illustrates yet another approach for encoding two videos from a dual camera mobile device for transmission to a remote device during a video conference. In this approach, the two videos from the device are displayed in a composite display, a screen shot of the composite display is taken and encoded into a bit stream to send to the remote device. As shown in FIG. 81, this approach includes an encoder 8115. In some embodiments, the encoder 8115 encodes composite images and sends to the remote device.

The operations will now be described by reference to the encoder 8115 illustrated in FIG. 81. First, videos from the two cameras of a dual camera mobile device are displayed on the device's screen in a composite display. The composite display can present the videos in any manner. For example, the composite display in some embodiments can present the two videos in a PIP display such as a PIP display 8105 illustrated in FIG. 81. In other embodiments, the composite display may present the two videos in two side-by-side display areas or two diagonally aligned display areas. Screenshots of the PIP display 8105, such as an image 8110, are taken and sent to the encoder 8115. The encoder then encodes the sequence of screenshots into a bit stream 8120 before sending it to the remote device of the video conference. While several different approaches for encoding two videos are described above, other approaches are still possible.

6. Decoding

Figure 82:
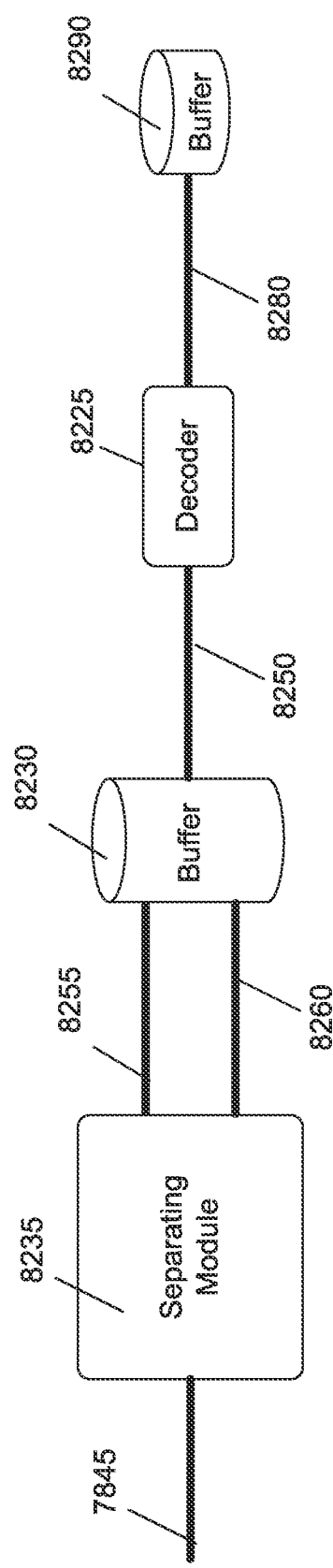
FIG. 82 conceptually illustrates a method of some embodiments for decoding images captured by cameras of a dual camera mobile device.

Some embodiments of the dual camera mobile device may receive bit streams encoded by the approaches described above by reference to FIGS. 78-81. In such embodiments, the dual camera mobile device may receive (e.g., through the video conference control channel) information indicating the approached used to encode the videos. FIG. 82 illustrates one approach of decoding bit streams of two videos received from another device through a communications network for display on the dual camera mobile device during a video conference. Specifically, this approach is used to decode bit streams encoded by the encoding approach described by reference to FIG. 78, above.

As shown in FIG. 82, this approach uses a separating module 8235, buffers 8230 and 8290, and a decoder module 8225. The separating module 8235 breaks (i.e., demultiplexes) the bit streams into one or more bit streams and stores the bit streams in the buffer 8230. The decoder 8225 retrieves encoded bit streams, decodes them to generate videos, and then stores the videos in the buffer 8290.

The operation of this approach will now be described by reference to the separating module 8235, the buffers 8230 and 8290, and the decoder module 8225 illustrated in FIG. 82. First, the dual camera mobile device receives the bit stream 7845 (e.g., at the networking manager 1614) through the communications network from the other device in the video conference. The separating module 8235 breaks the received bit stream into two bit streams 8255 and 8260 since the received bit stream is a multiplexed bit stream of two bit streams. Each encoded bit stream represents the video data captured from one out of the two cameras of the device. Then, the separating module 8235 stores the bit streams 8255 and 8260 in the buffer 8230.

After, the decoder 8225 retrieves a bit stream 8250, which is one of the two bit streams 8255 and 8260, from the buffer 8230, the decoder 8225 decodes the bit stream 8250 to generate video 8280, and stores the video 8280 in the buffer 8290. The decoder 8225 also decodes the other of the bit streams 8255 and 8260 and stores the generated video in the buffer 8290. Now, both videos can be retrieved from the buffer 8290 and stored or displayed on the dual camera mobile device.

Figure 83:
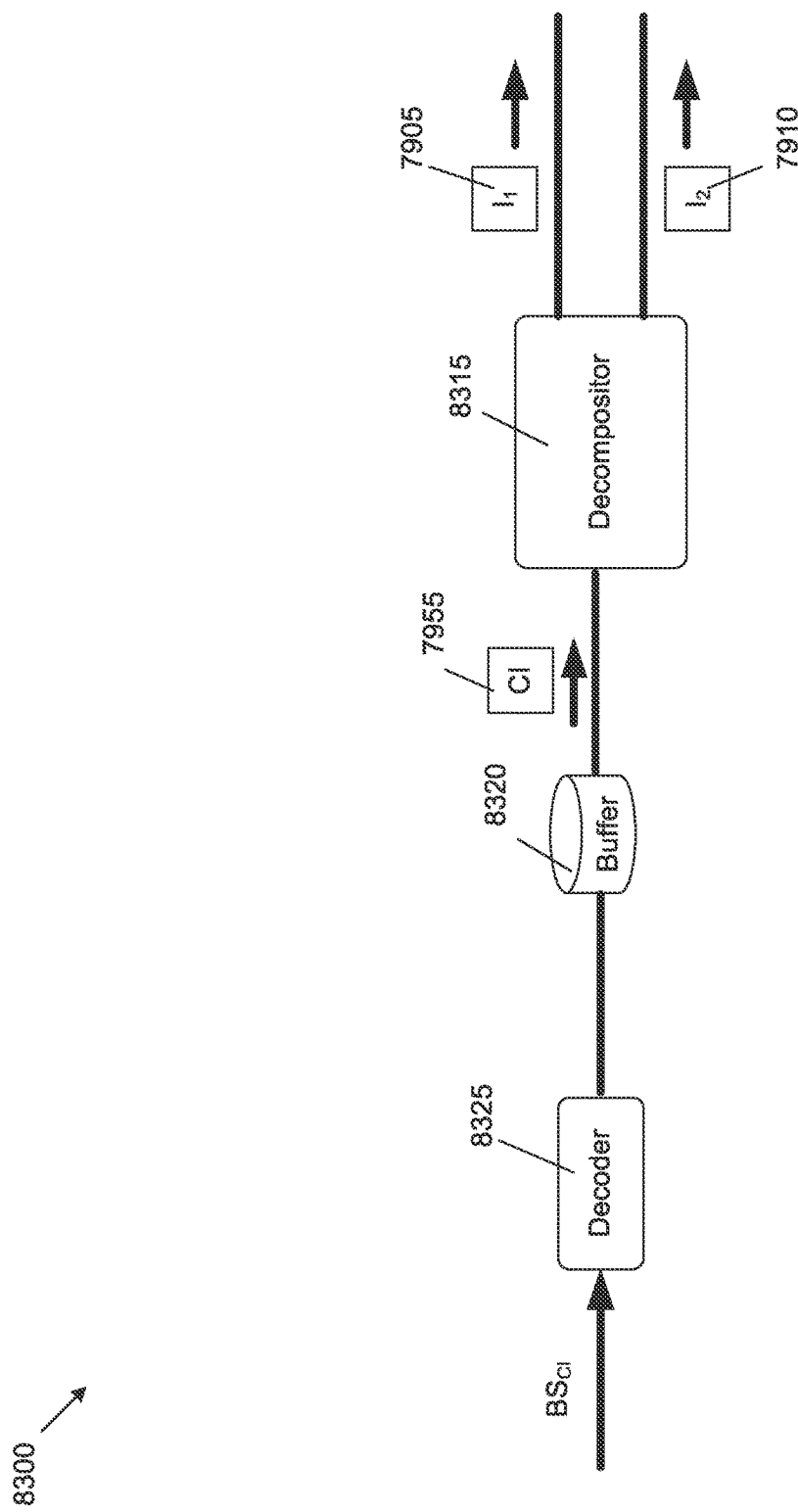
FIG. 83 conceptually illustrates another method of some embodiments for decoding images captured by cameras of a dual camera mobile device.

FIG. 83 illustrates an approach to decoding bit streams that are encoded by the approach described by reference to FIG. 79. As shown in FIG. 83, this approach includes a decoder 8325, a buffer 8320, and a decompositor 8315.

In some embodiments, the decoder 8325 receives a bit stream encoded by the approach illustrated in FIG. 79 and decodes a bit stream into one or more composite images, which are then stored in the buffer 8320. The decompositor 8315 extracts the two images from each composite image. In order to extract the two images from the composite images, the decompositor 8315 also receives information indicating the location of each image within the composite image (e.g., information received through the video conference communication control channel from the device in the video conference that composited and encoded the images).

The operation of this approach will now be described by reference to the decoder 8325, the buffer 8320, and the decompositor 8315 illustrated in FIG. 83. First, the decoder 8325 receives a bit stream of video, such as the one created by the approach described by reference to FIG. 79, from another mobile device of a video conference. The decoder 8325 decodes the bit stream into one or more composite images, which includes the composite image 7955 and stores them to the buffer 8320. The buffer 8320 then stores the composite images before sending them to the decompositor 8315. When the decompositor receives the composite image 7955 from the buffer 8320, it breaks down the composite image 7955 into the two images 7905 and 7910, which are identical to the images 7905 and 7910 in FIG. 79.

When a bit stream is received from a system such as the one described in FIG. 81, a decoder such as the decoder 8325 in FIG. 83 decodes the bit stream into a sequence of screenshots. The sequence of screenshots is displayed on the device's screen as a video without further processing.

VI. Multiple Sources

As described above, videos can be captured by both cameras of the dual camera mobile device and transmitted to another device in a video conference. Rather than transmitting video captured from both cameras of the dual camera mobile device, some embodiments may transmit different media content or any content displayed on the dual camera mobile device along with videos captured from a camera of the dual camera mobile device. In other words, these embodiments can transmit content from a number of sources along with video captured by cameras of the dual camera mobile device.

Figure 84:
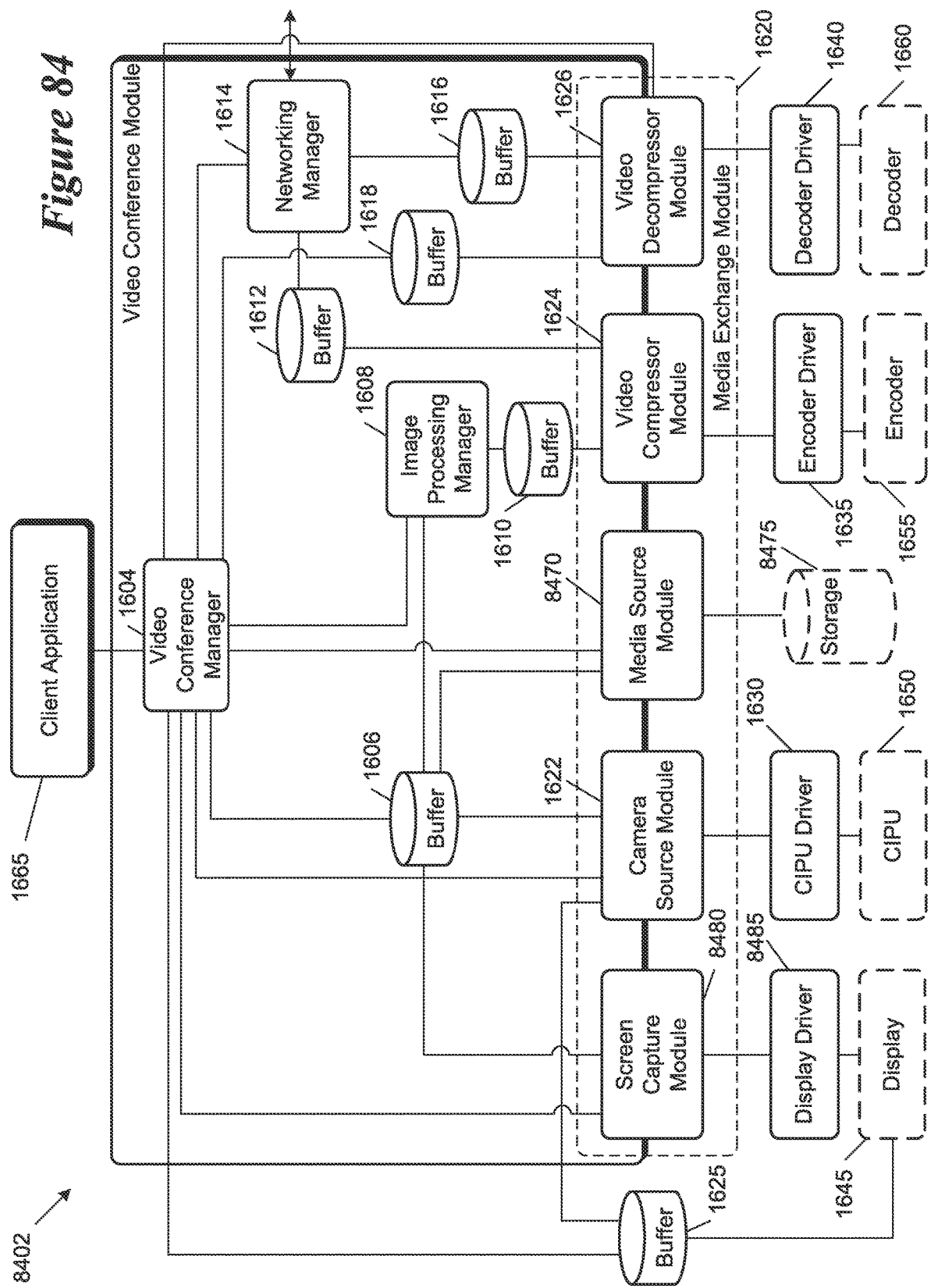
FIG. 84 conceptually illustrates another software architecture for a video conferencing and processing module of a dual camera mobile device of some embodiments.

FIG. 84 conceptually illustrates another software architecture for a video conferencing and processing module of a dual camera mobile device of some embodiments. The video conferencing and processing module of FIG. 84 is the similar to the video conferencing and processing module 1600 of FIG. 16 except the video conferencing and processing module includes a display driver 8485 and a storage 8475, and the media exchange module 1620 includes a media source module 8470 and a screen capture module 8480.

The media source module 8470 of some embodiments routes media content between the video conference module 8402 and the storage 8475. Examples of media content include videos, images, documents, and music. Other embodiments store other types of media content in the storage 8475. The storage 8475 of some embodiments is internal storage (e.g., RAM) while the storage 8475 of other embodiments is external storage (e.g., a compact flash (CF) card, a secure digital (SD) card, etc.).

In some embodiments, the screen capture module 8480 routes images of content displayed on the display of the dual camera mobile device through the display driver 8485. In some embodiments, the display driver 8485 is responsible for capturing content on the display and converting the content into an image. Different embodiments capture different content displayed on the display. For example, some embodiments capture all the content displayed on the display. Other embodiments capture a particular display area of the display (e.g., a display area of a current active window, a display area of a PIP display, etc.).

Some example operations of the video conferencing and processing module will now be described by reference to FIG. 84. To transmit media content along with video captured from a camera of the dual camera mobile device, the video conference module 8402 of some embodiments performs the same operations as the video conference module 1602 described above in FIG. 16 to except instead of retrieving images from the CIPU 1650, the video conference manager 1604 retrieves media content from the storage 8475 through the media source module 8470. To transmit images of content displayed on the display of the dual camera mobile device, some embodiments of the video conference manager 1604 retrieve images of content displayed on the display of the dual camera mobile device through the display driver 8485. Some embodiments perform similar processing to the media content or images of content displayed on the display (e.g., perspective correction, resizing, etc.) as performed on images retrieved from the CIPU 1650 while other embodiments do not perform any processing at all.

The discussion above describes several of examples of transmitting content from various sources along with video captured by a camera of the dual camera mobile device. However, other embodiments can transmit other different types of content. For example, in a video conference involving multiple participants, some embodiments transmit video received from one device on the video conference and video captured by a camera of the dual camera mobile device to another device. As such, any number of different types of content from any number of sources can be transmitted along with video captured by a camera of the dual camera mobile device.

VII. Multi-Participant Video Conference

The above sections that are related to video conferencing describe video conferences with two participants. However, multi-participant video conferencing (i.e., three or more participants) with the mobile devices of some embodiments is also possible. In some embodiments, all the participants in a multi-participant video conference can view and hear one another. Other embodiments provide a multi-participant broadcast video conference in which one participant (e.g., the broadcaster) can view and hear all the other participants and all the other participants can view and hear the broadcaster, but the other participants cannot view or hear each other (unless authorized by the broadcaster, for example).

A. User Interface for Multi-Participant Video Conference

Figure 85:
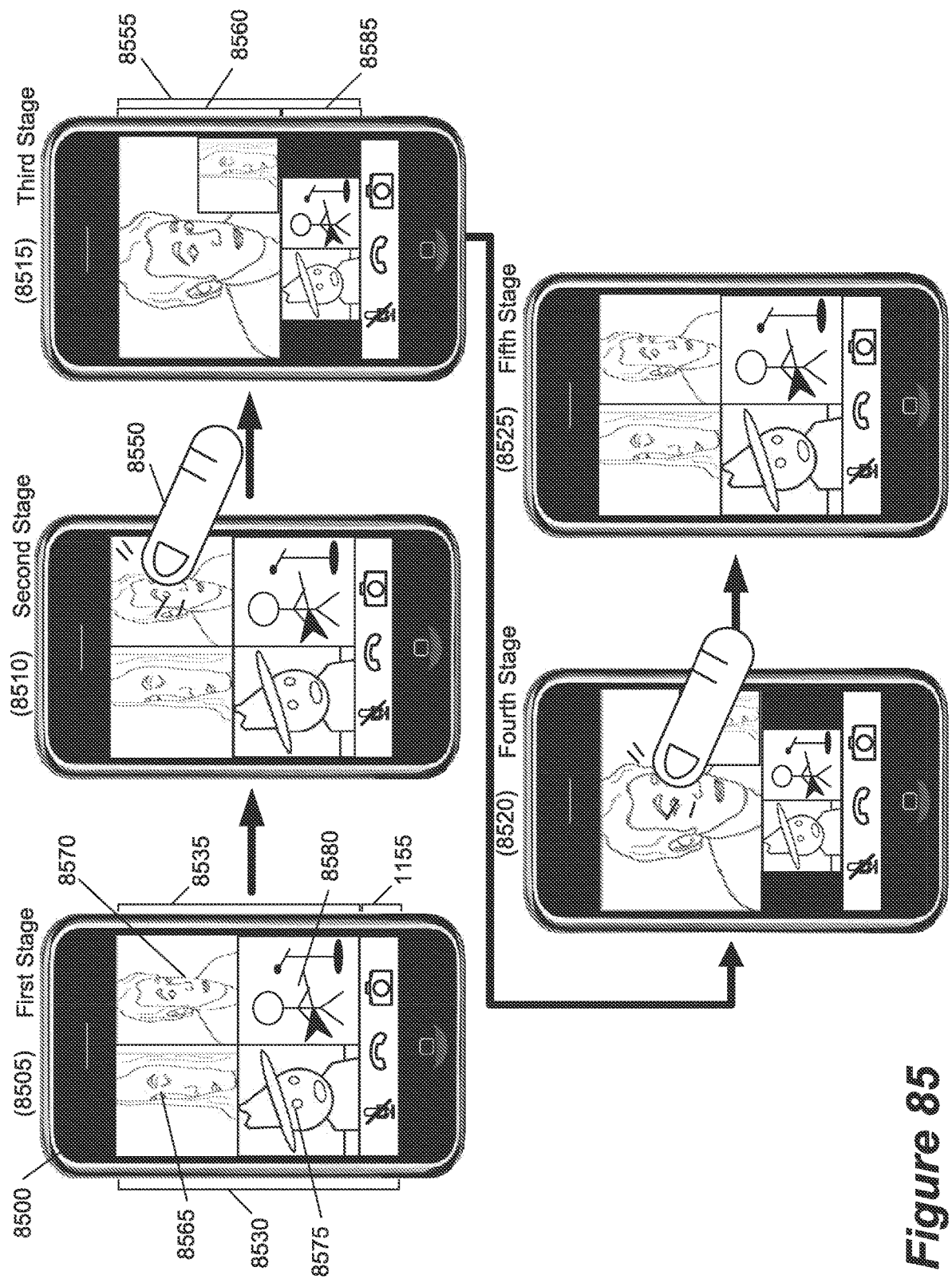
FIG. 85 illustrates a user interface of some embodiments for a multi-participant video conference.

During a multi-participant video conference, some embodiments provide a variety of different UIs for displaying the participants of the video conference and selecting particular participant(s) to view. For example, some embodiments of the mobile device provide a UI that simultaneously displays all the participants of a multi-participant video conference and allows a user of the mobile device to select one of the participants to view (e.g., by enlarging the selected participant's image). FIG. 85 illustrates an example of such UI.

This figure illustrates a sequence of operations for simultaneous displaying of all the participants of the multi-participant video conference and selecting of one of the participants to view in a UI 8530 of a mobile device 8500 by reference to five different stages 8505, 8510, 8515, 8520, and 8525 of the UI 8530. The first stage 8505 illustrates the UI 8530 after a multi-participant video conference among three other users of other devices has been established. As shown, the UI 8530 includes a composite display 8535 and a display area 1155. The composite display 8535 includes four display areas 8565, 8570, 8575, and 8580 that display images captured by cameras of the participants of the multi-participant video conference. In this example, the display area 8565 shows a user of the mobile device 8500 (i.e., the display area 8565 displays images captured by the front camera of the mobile device 8500). The display area 1155 is the same as the display area 1155 previously described above in FIG. 12.

The second stage 8510 shows the user of the mobile device 8500 starting a participant selection operation by selecting one of the display areas of the composite display area 8530. In particular, the second stage 8510 shows the user selecting the display area 8570 (e.g., by tapping a finger 8550 on the display area 8570).

The third stage 8515 of the UI 8530 illustrates a composite display 8555 after the participant selection operation is completed. Some embodiments provide an animation (not shown) to display a transition between the second stage 8510 and the third stage 8515. The composite display 8555 includes a PIP display 8560 that shows the display area of the participant selected in the second stage 8510 (i.e., display area 8570) as the background display area and the display area 8565 of the user as the inset display area of the PIP display 8560. In this example, the PIP display 8560 shows the image of the selected display area 8570 horizontally stretched to fit a landscape orientation. In some embodiments, the image is not stretched and the image of the selected display area maintains its portrait orientation (i.e., the extra space on each side of the background display area is filled with black bars as shown in FIG. 36). Furthermore, the composite display 8555 also includes a composite display 8585 that shows scaled down images of the two unselected display areas 8575 and 8580.

The fourth stage 8520 shows the user of the mobile device 8500 starting a participant de-selection operation by selecting the PIP display 8560 (e.g., by tapping a finger 8550 on the PIP display 8560). The fifth stage 8525 illustrates the composite display 8535 after the completion of the participant de-selection operation.

FIG. 85 shows an example sequence of operations for simultaneously displaying all the participants of a multi-participant video conference, performing a participant selection operation, and performing a participant de-selection operation. Other sequences of operations are possible. For instance, after the third stage 8515, instead of starting the participant de-selection operation, the user can select one of the unselected display areas displayed in the composite display 8585 to swap the newly selected display area in the display area 8585 with the background display area (i.e., the previously selected display area) of the PIP display 8560. As such, the user can swap display areas in the display area 8585 with the background display area of the PIP display 8560 at any time and any number of times during the multi-participant video conference. Also at any time during the multi-participant video conference, the user can perform the participant de-selection operation to return to the composite display 8535. Moreover, different embodiments allow the user to select a particular participant in different ways such as by toggling a switch on the mobile device 8500, by giving voice commands. etc.

Some embodiments provide techniques for automatically selecting participants based on speech detection, for example. In such embodiments, when one of the participants speaks, the display area of that participant is automatically selected as the background display area of the PIP display 8560. When a different participant speaks, the display area of that participant is automatically selected as the background display area of the PIP display 8560. In some embodiments, when none of the participants of the multi-participant video conference is speaking, the display displays the composite display 8535 after a defined amount of silence (e.g., 3 seconds). In some embodiments, when the user of the mobile device 8500 speaks, nothing happens on the UI 8530 of the mobile device 8500.

Figure 86:
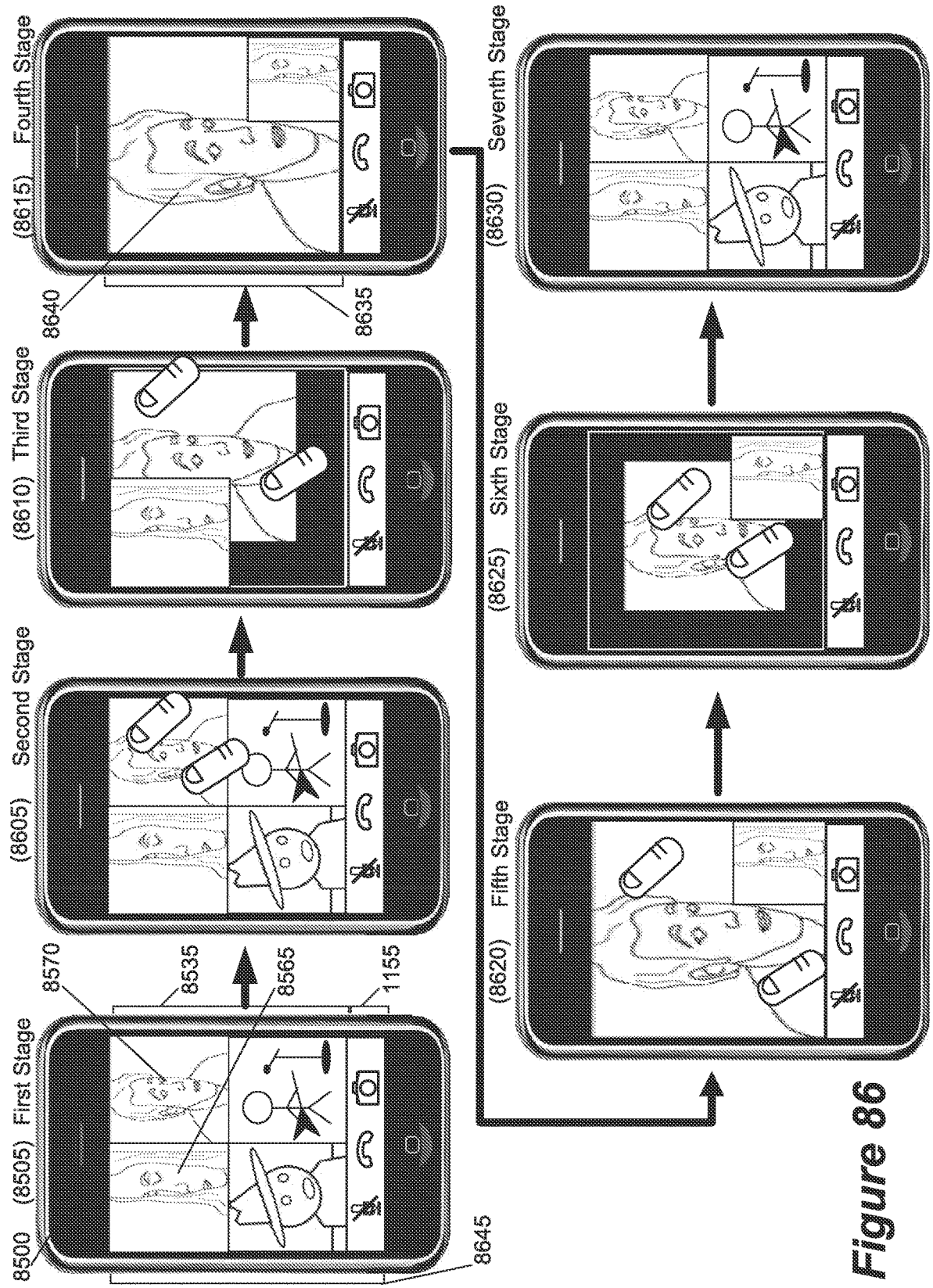
FIG. 86 illustrates another user interface of some embodiments for a multi-participant video conference.

FIG. 86 illustrates another example sequence of operations for simultaneously displaying of all the participants of the multi-participant video conference and selecting one of the participants to view. FIG. 86 illustrates this operation in a UI 8645 of the mobile device 8500 by reference to seven different stages 8505, 8605, 8610, 8615, 8620, 8625 and 8630 of the UI 8645. The first stage 8505 is the same as the first stage 8505 illustrated in FIG. 85 as it shows the UI 8645 after a multi-participant video conference among three other users of other devices has been established.

The second stage 8605 illustrates the user of the mobile device 8500 starting a participant selection operation by selecting the display area 8570 (e.g., by placing two fingers on the display area 8570). The third stage 8610 shows a transitional stage of the participant selection operation. In this stage, the user is dragging the two fingers away from each other while causing the display area 8570 to become larger and fill up the display area of what used to be the composite display 8535. This example shows the display area 8570 being selected, but any of the other display areas 8565, 8575, and 8580 can be selected. In some embodiments, the user of the mobile device 8500 is not allowed to select the display area of the user (i.e., display area 8565 in this example).

The fourth stage 8615 of the UI 8645 shows a PIP display 8635 of the UI 8645 after the participant selection operation is completed. Some embodiments require the user to continue dragging the fingers away from each other until the display area 8570 fills the background display area 8640 of the PIP display 8635 while other embodiments only require the user's drag operation to be larger than a particular threshold amount (e.g., longer than a particular distance or longer than a particular amount of time) before the user removes the fingers. When the user's drag operation meets or exceeds the particular threshold amount, the UI 8645 continues the enlarging of the display area 8570 until it fills the background display area 8640 of the PIP display 8635. Otherwise, the participant selection operation is not complete and the UI 8645 reverts back to the composite display 8535. As shown, the selected display area (i.e., display area 8570) is the background display area 8640 of the PIP display 8635 and the display area 8565 of the user is the inset display area of the PIP display 8635. Some embodiments provide an animation (not shown) to display a transition between the third stage 8610 and the fourth stage 8615.

The fifth stage 8620 illustrates the user of the mobile device 8500 starting a participant de-selection operation by selecting the background display area 8640 of the PIP display 8635 (e.g., by placing two fingers on the background display area 8640). The sixth stage 8625 shows a transitional stage of the participant de-selection operation. The stage illustrates the user dragging the fingers toward each other to shrink the display area of what used to be the background display area 8640 of the PIP display 8635. Similar to the operation described in the third stage 8610, some embodiments require the user's drag operation to be larger than a particular threshold amount (e.g., longer than a particular distance or longer than a particular amount of time) before the user removes the fingers. Else, the participant de-selection operation is not complete and the UI 8645 reverts back to the PIP display 8635. The seventh stage 8630 of the UI 8645 shows the composite display 8535 after the completion of the participant de-selection operation.

Figure 87:
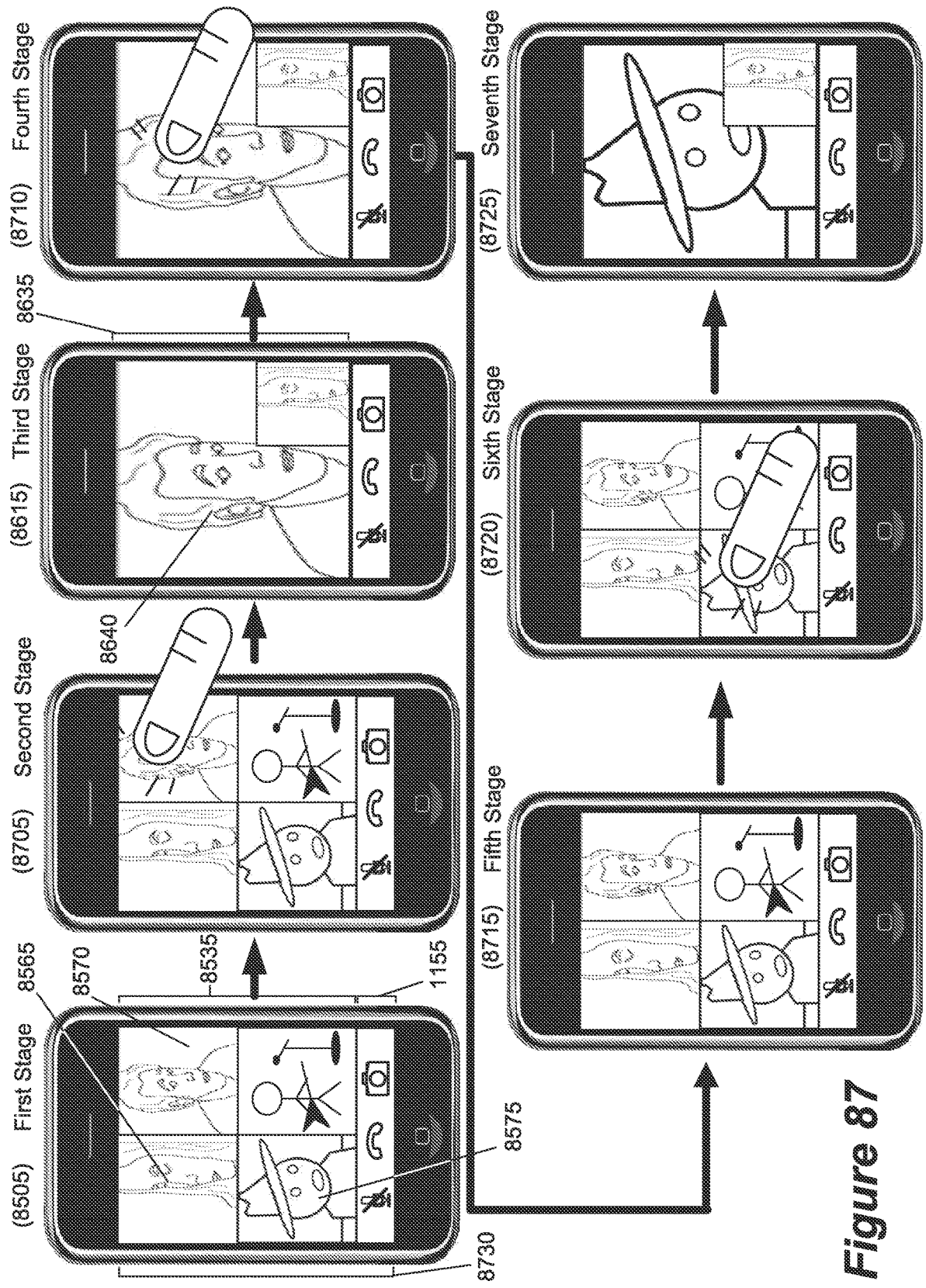
FIG. 87 illustrates another user interface of some embodiments for a multi-participant video conference.

FIG. 86 illustrates another example sequence of operations for simultaneously displaying all the participants of a multi-participant video conference, performing a participant selection operation, and performing a participant de-selection operation. However, some embodiments allow the user of the mobile device 8500 to repeatedly perform a participant selection operation and participant dc-selection operation. FIG. 87 illustrates one such embodiment.

Specifically, FIG. 87 illustrates an example sequence of performing a participant selection operation and participant de-selection operation multiple times in a UI 8730 by reference to seven different stage 8505, 8705, 8615, 8710, 8715, 8720, and 8725 of the UI 8730. The first stage 8505 is the same as the first stage 8505 of FIGS. 85 and 86, mentioned above. The second stage 8705 is similar to the second stage 8605 of FIG. 86 except the user selects the display area 8570 by tapping the display area 8570 once (instead of placing two fingers on the display area 8570).

The third stage 8615 is the same as the fourth stage 8615 of FIG. 86 as it shows the PIP display 8635 after the completion of the participant selection operation. The fourth stage 8710 is similar to the fifth stage 8620 of FIG. 86 except the user selects the background display area 8640 of the PIP display 8645 by tapping the background display area 8640 once (instead of placing two fingers on the background display area 8640).

The fifth stage 8715 is the same as the seventh stage 8630 of FIG. 86 since it shows the composite display 8535 after the participant de-selection operation is completed. The sixth stage 8720 shows similar to the second stage 8510 except the participant selection operation is performed on the display area 8575. Similarly, the seventh stage 8725 is similar to the third stage 8705 as it shows the selected display area (i.e., display area 8575) as the background display area 8640 of the PIP display 8635. Although FIG. 87 only shows a few participant selection and participant de-selection operations, any number of such operations can be performed during the multi-participant video conference.

Moreover, some embodiments provide UIs that can display differently numbers of participants during the video conference. For instance, the UI of some embodiments displays only some of the participants of the multi-participant video conference when the mobile device is held in an upright position (i.e., a portrait orientation) and displays additional participants when the mobile device is held in a sideways position (i.e., a landscape orientation). Other embodiments display all the participants when the mobile device is held in the sideways position. In addition, some embodiments provide an animation to indicate the transition between different positions and/or orientations of the mobile device that are similar to those illustrated in FIGS. 34, 35, 36 and 37. Other different animations are also possible.

As another example of a UI that displays different numbers of participants during the video conference, some embodiments allow the user of the mobile device to select multiple participants to simultaneously view during the video conference. Referring to the first stage 8505 of FIG. 85 for purposes of explanation, some of these embodiments allow the user of the mobile device 8500 to select two or more of the display areas 8565, 8570, 8575, and 8580 (e.g., by tapping the corresponding display areas in the composite display 8535). The selected display areas can then be displayed in various manners such as a composite display, a PIP display, any of the display arrangements illustrated in FIG. 65, among other types of multi-participants displays arrangements. Furthermore, although an example of some embodiments is described, one of ordinary skill will realize that different embodiments can select and display multiple participants of a multi-participant video conference any number of different ways.

B. User Interface for Multi-Participant Broadcast Video Conference

As noted above, a multi-participant broadcast video conference only allows one participant to hear and view all of the other participants while the other participants cannot hear or view each other. To facilitate multi-participant broadcast video conferences, some embodiments provide numerous different UIs for displaying the broadcaster and the other participants of a multi-participant broadcast video conference. For example, some embodiments provide a student-teacher-like UI layout similar to the layout of the third stage 8515 illustrated in FIG. 85. As such, the student-teacher UI layout of some embodiments will now be described by reference to this stage.

In these embodiments, only the broadcaster is displayed in the entire display area of the PIP display 8560 (i.e., an inset display area is not displayed). The other participants of the multi-participant broadcast video conference are displayed below the PIP display 8560 similar to the display areas displayed in composite display 8585. In some embodiments, a defined number of the other participants are displayed in the composite display 8585 when the mobile device is in a portrait mode while additional or all participants can be displayed in the composite display 8585 when the mobile device is in a landscape mode as similarly described above. In addition, other embodiments provide different UIs for displaying the broadcaster and the other participants of a multi-participant broadcast video conference.

C. Controlling Audio for Multi-Participant Video Conference

Further, the mobile device of some embodiments provides different techniques for controlling audio of participants of a multi-participant video conference. For example, some embodiments of the mobile device allow the user of the mobile device to control the audio of each participant in the multi-participant video conference through a single set of volume controls (e.g., a volume slider) displayed on the UI of such embodiments. In other embodiments, the mobile device allows a user of the mobile device to separately control the volume of the audio of each participant in the multi-participant video conference through a set of volume controls such as a volume slider that is displayed in the display area of each participant. Some embodiments only provide a mute button instead of a set of volume controls. As such, in some such embodiments, the user of the mobile device can only mute or un-mute all the participants of the multi-participant video conference while in other such embodiments the user of the mobile device can separately mute or un-mute each participant of the multi-participant video conference. In addition, other techniques for controlling the audio of participants of the multi-participant video conference are possible such as by toggling a switch on the mobile device, by giving voice commands, etc.

VIII. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Some embodiments are implemented as software processes that include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

One or more Application Programming Interfaces (APIs) may be used in some embodiments. For example, some embodiments of the media exchange module 310 (or 910) provide a set of APIs to other software components for accessing various video processing and encoding functionalities described in FIGS. 3 and 9 such as the functionalities of the TNR module 1900 described in FIG. 19.

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 88:
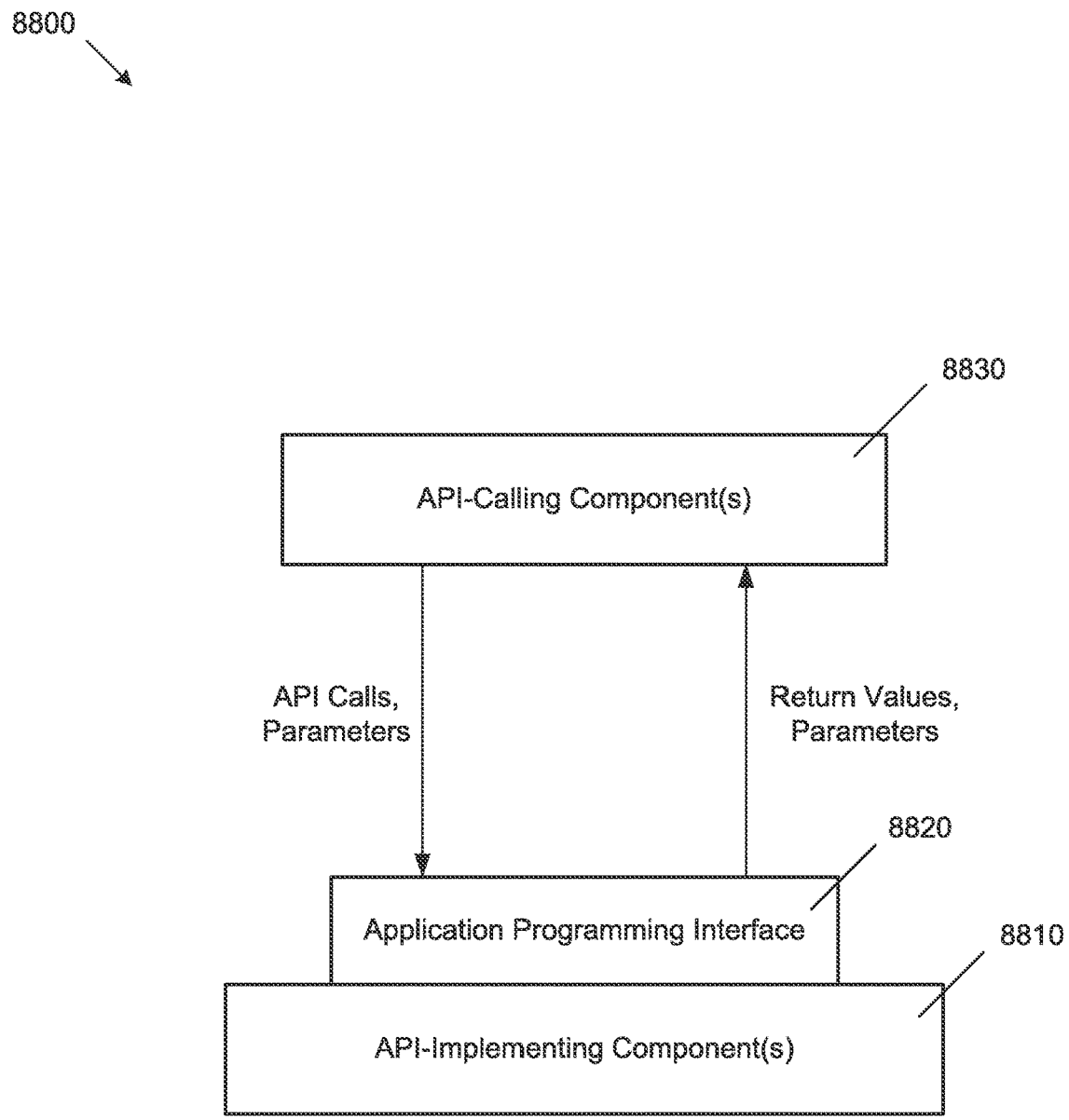
FIG. 88 conceptually illustrates an application programming interface (API) architecture of some embodiments.

FIG. 88 is a block diagram illustrating an exemplary API architecture, which may be used in some embodiments of the invention. As shown in FIG. 88, the API architecture 8800 includes the API-implementing component 8810 (e.g., an operating system, a library, a device driver, an API, an application program, software or other module) that implements the API 8820. The API 8820 specifies one or more functions, methods, classes, objects, protocols, data structures, formats and/or other features of the API-implementing component that may be used by the API-calling component 8830. The API 8820 can specify at least one calling convention that specifies how a function in the API-implementing component 8810 receives parameters from the API-calling component 8830 and how the function returns a result to the API-calling component. The API-calling component 8830 (e.g., an operating system, a library, a device driver, an API, an application program, software or other module), makes API calls through the API 8820 to access and use the features of the API-implementing component 8810 that are specified by the API 8820. The API-implementing component 8810 may return a value through the API 8820 to the API-calling component 8830 in response to an API call.

It will be appreciated that the API-implementing component 8810 may include additional functions, methods, classes, data structures, and/or other features that are not specified through the API 8820 and are not available to the API-calling component 8830. It should be understood that the API-calling component 8830 may be on the same system as the API-implementing component 8810 or may be located remotely and accesses the API-implementing component 8810 using the API 8820 over a network. While FIG. 88 illustrates a single API-calling component 8830 interacting with the API 8820, it should be understood that other API-calling components, which may be written in different languages (or the same language) than the API-calling component 8830, may use the API 8820.

The API-implementing component 8810, the API 8820, and the API-calling component 8830 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 89:
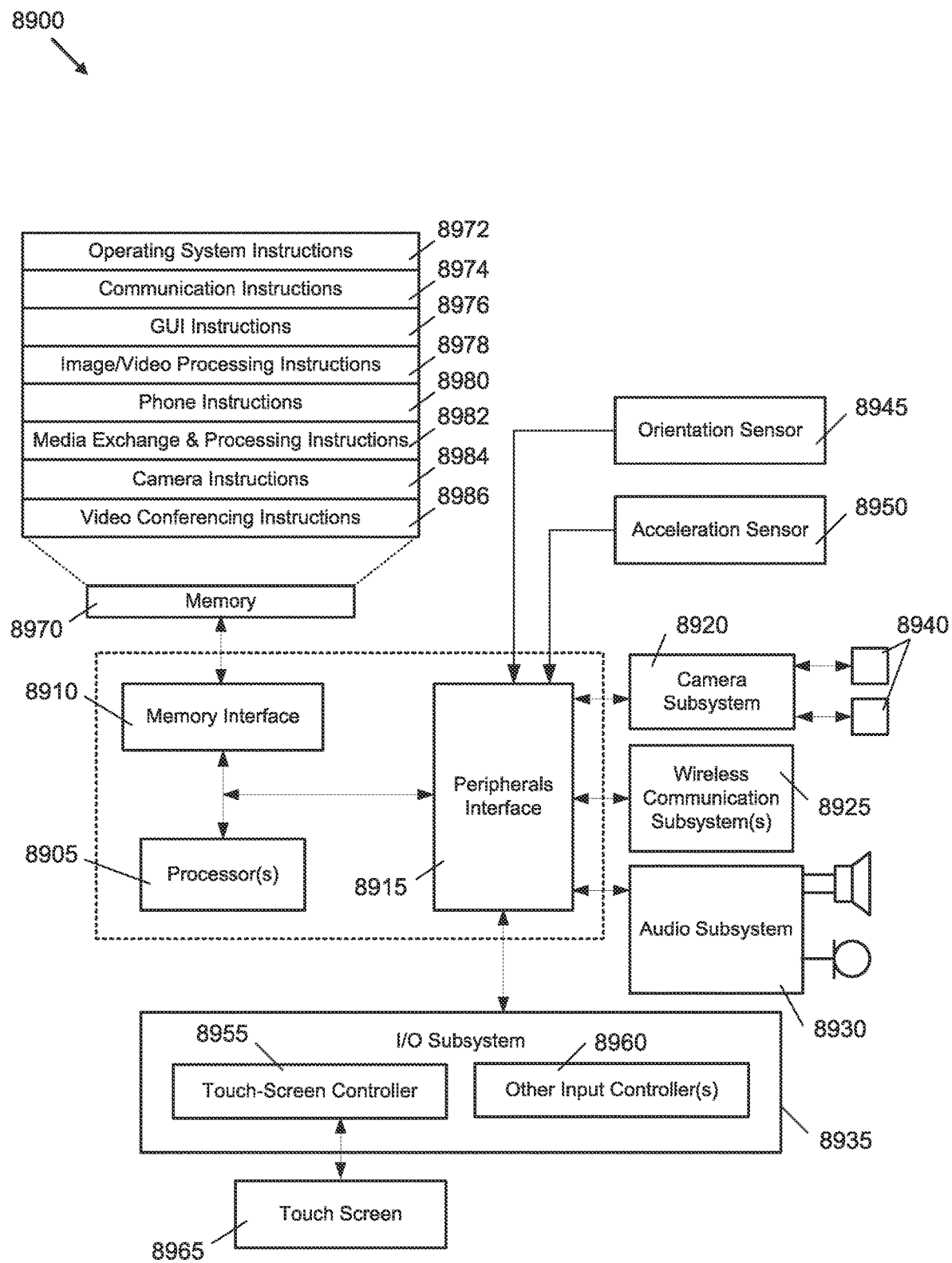
FIG. 89 illustrates an architecture for a dual camera mobile computing device of some embodiments.

FIG. 89 is an example of a dual camera mobile computing device architecture 8900. The implementation of a mobile computing device can include one or more processing units 8905, memory interface 8910 and a peripherals interface 8915. Each of these components that make up the computing device architecture can be separate components or integrated in one or more integrated circuits. These various components can also be coupled together by one or more communication buses or signal lines.

The peripherals interface 8915 can be coupled to various sensors and subsystems, including a camera subsystem 8920, a wireless communication subsystem(s) 8925, audio subsystem 8930, I/O subsystem 8935, etc. The peripherals interface 8915 enables communication between processors and peripherals. Peripherals such as an orientation sensor 8945 or an acceleration sensor 8950 can be coupled to the peripherals interface 8915 to facilitate the orientation and acceleration functions.

The camera subsystem 8920 can be coupled to one or more optical sensors 8940, e.g., a charged coupled device (CCD) optical sensor, a complementary metal-oxide-semiconductor (CMOS) optical sensor. The camera subsystem 8920 coupled with the sensors may facilitate camera functions, such as image and/or video data capturing. Wireless communication subsystems 8925 may serve to facilitate communication functions. Wireless communication subsystems 8925 may include radio frequency receivers and transmitters, and optical receivers and transmitters. They may be implemented to operate over one or more communication networks such as a GSM network, a Wi-Fi network, Bluetooth network, etc. The audio subsystems 8930 is coupled to a speaker and a microphone to facilitate voice-enabled functions, such as voice recognition, digital recording, etc.

I/O subsystem 8935 involves the transfer between input/output peripheral devices, such as a display, a touch screen, etc., and the data bus of the CPU through the Peripherals Interface. I/O subsystem 8935 can include a touch-screen controller 8955 and other input controllers 8960 to facilitate these functions. Touch-screen controller 8955 can be coupled to the touch screen 8965 and detect contact and movement on the screen using any of multiple touch sensitivity technologies. Other input controllers 8960 can be coupled to other input/control devices, such as one or more buttons.

Memory interface 8910 can be coupled to memory 8970, which can include high-speed random access memory and/or non-volatile memory such as flash memory. Memory can store an operating system (OS) 8972. The OS 8972 can include instructions for handling basic system services and for performing hardware dependent tasks.

Memory can also include communication instructions 8974 to facilitate communicating with one or more additional devices; graphical user interface instructions 8976 to facilitate graphic user interface processing; image/video processing instructions 8978 to facilitate image/video-related processing and functions; phone instructions 8980 to facilitate phone-related processes and functions; media exchange and processing instructions 8982 to facilitate media communication and processing-related processes and functions; camera instructions 8984 to facilitate camera-related processes and functions; and video conferencing instructions 8986 to facilitate video conferencing processes and functions. The above identified instructions need not be implemented as separate software programs or modules. Various functions of mobile computing device can be implemented in hardware and/or in software, including in one or more signal processing and/or application specific integrated circuits.

Figure 90:
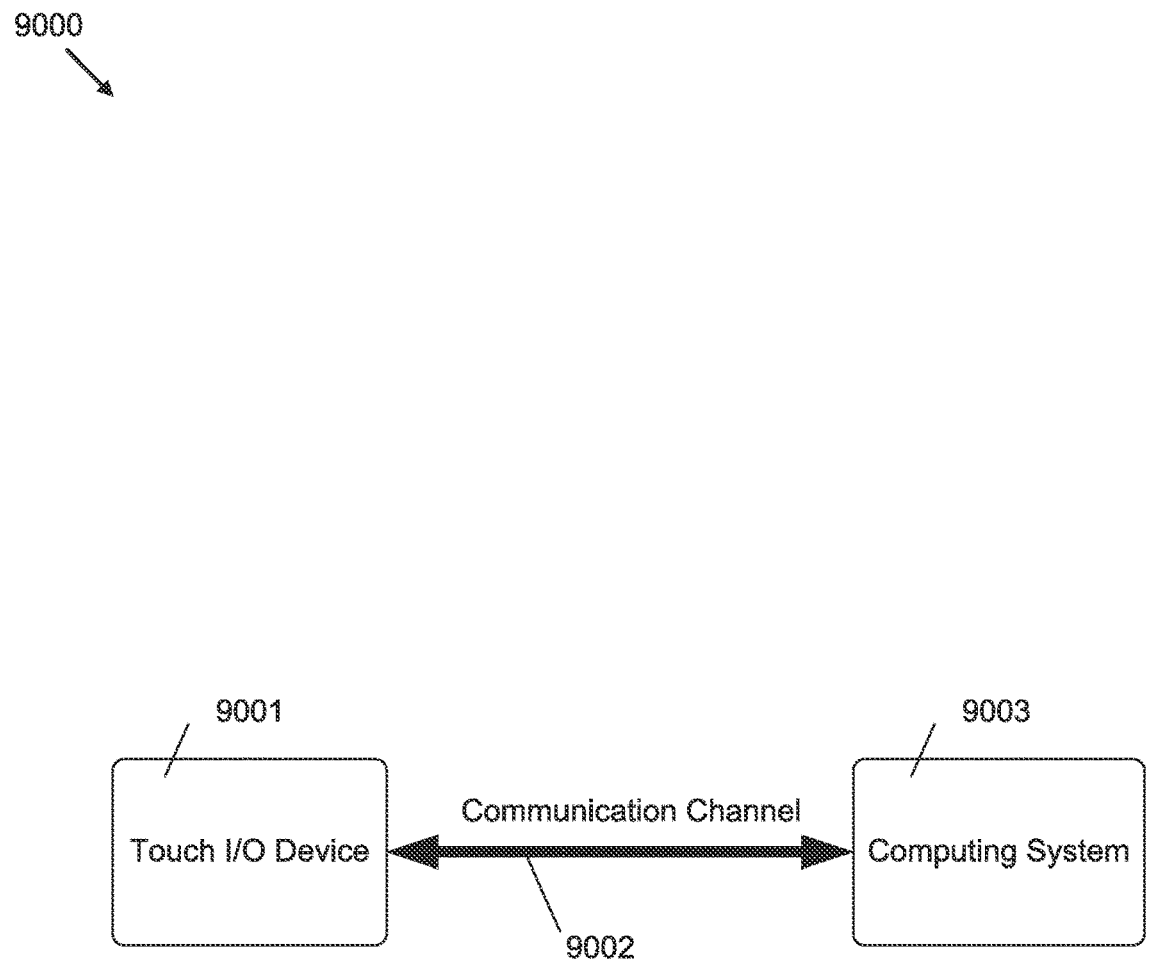
FIG. 90 conceptually illustrates a touch input/output (I/O) device of some embodiments.

The above-described embodiments may include touch I/O device 9001 that can receive touch input for interacting with computing system 9003, as shown in FIG. 90, via wired or wireless communication channel 9002. Touch I/O device 9001 may be used to provide user input to computing system 9003 in lieu of or in combination with other input devices such as a keyboard, mouse, etc. One or more touch I/O devices 9001 may be used for providing user input to computing system 9003. Touch I/O device 9001 may be an integral part of computing system 9003 (e.g., touch screen on a laptop) or may be separate from computing system 9003.

Touch I/O device 9001 may include a touch sensitive panel which is wholly or partially transparent, semitransparent, non-transparent, opaque or any combination thereof. Touch I/O device 9001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 9001 embodied as a touch screen may include a transparent and/or semitransparent touch sensitive panel partially or wholly positioned over at least a portion of a display. According to this embodiment, touch I/O device 9001 functions to display graphical data transmitted from computing system 9003 (and/or another source) and also functions to receive user input. In other embodiments, touch I/O device 9001 may be embodied as an integrated touch screen where touch sensitive components/devices are integral with display components/devices. In still other embodiments a touch screen may be used as a supplemental or additional display screen for displaying supplemental or the same graphical data as a primary display and receiving touch input.

Touch I/O device 9001 may be configured to detect the location of one or more touches or near touches on device 9001 based on capacitive, resistive, optical, acoustic, inductive, mechanical, chemical measurements, or any phenomena that can be measured with respect to the occurrences of the one or more touches or near touches in proximity to device 9001. Software, hardware, firmware or any combination thereof may be used to process the measurements of the detected touches to identify and track one or more gestures. A gesture may correspond to stationary or non-stationary, single or multiple, touches or near touches on touch I/O device 9001. A gesture may be performed by moving one or more fingers or other objects in a particular manner on touch I/O device 9001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 9003 may drive a display with graphical data to display a graphical user interface (GUI). The GUI may be configured to receive touch input via touch I/O device 9001. Embodied as a touch screen, touch I/O device 9001 may display the GUI. Alternatively, the GUI may be displayed on a display separate from touch I/O device 9001.

The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 9001 which may be associated with the graphical elements of the GUI. In other embodiments, the user may perform gestures at one or more locations that are independent of the locations of graphical elements of the GUI. Gestures performed on touch I/O device 9001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 9003 (e.g., affect a state or mode of a GUI, application, or operating system). Gestures may or may not be performed on touch I/O device 9001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 9002 in response to or based on the touch or near touches on touch I/O device 9001. Feedback may be transmitted optically, mechanically, electrically, olfactory, acoustically, or the like or any combination thereof and in a variable or non-variable manner.

These functions described above can be implemented in digital electronic circuitry, in computer software, firmware or hardware. The techniques can be implemented using one or more computer program products. Programmable processors and computers can be included in or packaged as mobile devices. The processes and logic flows may be performed by one or more programmable processors and by one or more programmable logic circuitry. General and special purpose computing devices and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Figure 91:
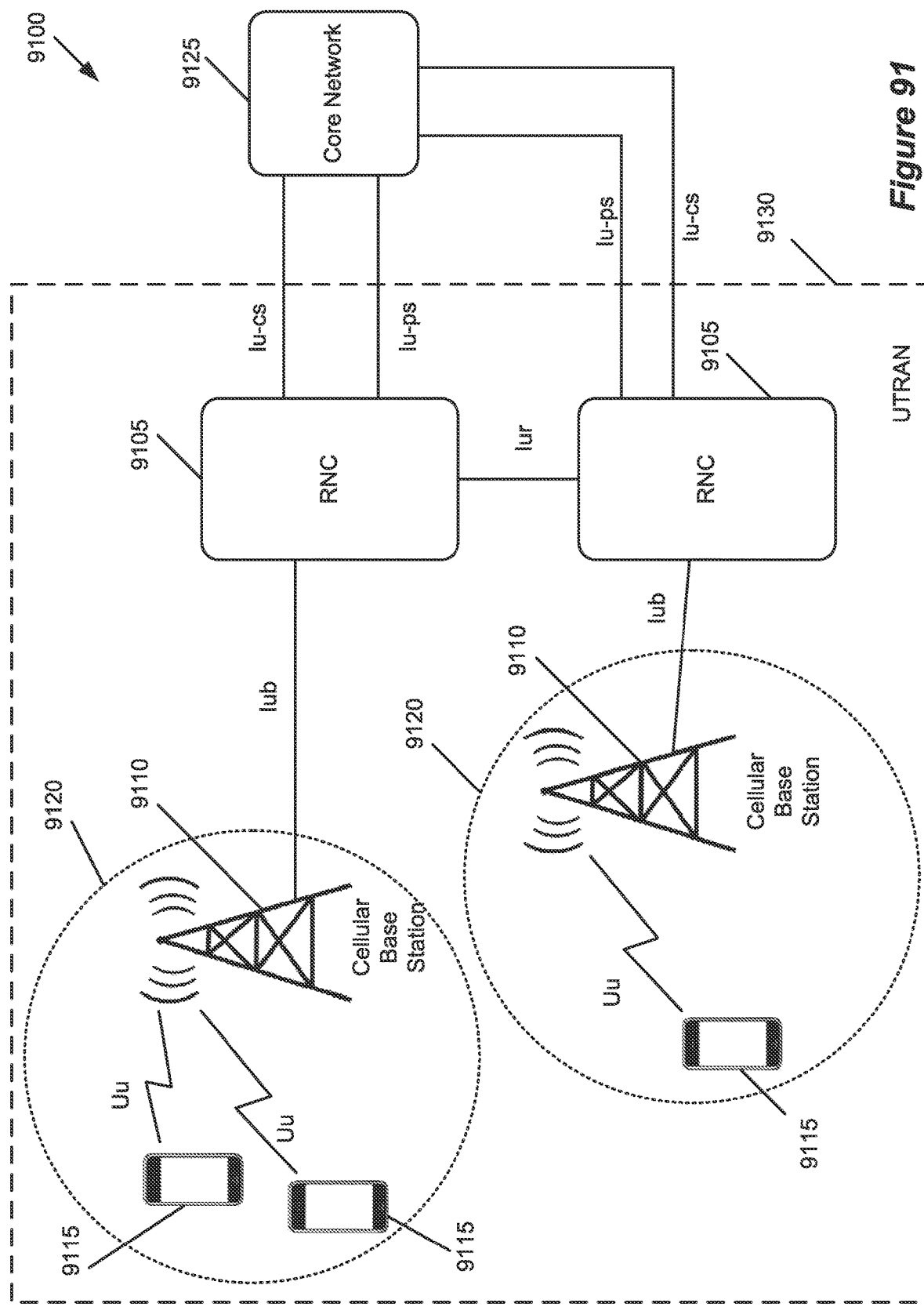
FIG. 91 conceptually illustrates an example communication system of some embodiments.

FIG. 91 conceptually illustrates an example communication system 9100 used for connecting some participants of a video conference according to some embodiments. As shown, the communication system 9100 includes several mobile devices 9115, several cellular base stations (or Node Bs) 9110, several radio network controllers (RNCs) 9105, and a core network 9125. Cellular base stations and RNCs are collectively referred to as a Universal Mobile Telecommunications System (UMTS) Terrestrial Radio Access Network (UTRAN) 9130. Each RNC 9105 is connected to one or more cellular base stations 9110 that, together, are referred to as a radio access network (RAN).

Each cellular base station 9110 covers a service region 9120. As shown, the mobile devices 9115 in each service region are wirelessly connected to the serving cellular base station 9110 of the service region 9120 through a Uu interface. The Uu interface uses a protocol stack that has two planes: a control plane and a user plane. The user plane supports circuit-switched, packet-switched and broadcast data streams. The control plane carries the network's signaling messages.

Each cellular base station is connected to an RNC through an Iub interface. Each RNC 9105 is connected to the core network 9125 by Iu-cs and an Iu-ps interfaces. The Iu-cs interface is used for circuit switched services (e.g., voice) while the Iu-ps interface is used for packet switched services (e.g., data). The Iur interface is used for connecting two RNCs together.

Accordingly, the communication system 9100 supports both circuit-switched services and packet-switched services. For example, circuit-switched services allow a telephone call to be conducted by transmitting the telephone call data (e.g., voice) through circuit-switched equipment of the communication system 9100. Packet-switched services allow a video conference to be conducted by using a transport protocol layer such as UDP or TCP over an internet layer protocol like IP to transmit video conference data through packet-switched equipment of the communication system 9100. In some embodiments, the telephone call to video conference transition (e.g., handoff) previously described in the Video Conference Setup section uses the circuit-switched and packet-switched services supported by a communication system like the communication system 9100.

That is, in such embodiments, the telephone call is conducted through the circuit-switched equipment of the communication system 9100 and the video conference it conducted through the packet-switched equipment of the communication system 9100.

Although the example communication system in FIG. 91 illustrates a third generation (3G) technology UTRAN wireless mobile communication system, it should be noted that second generation (2G) communication systems, other 3G communication systems such as 3GPP2 Evolution-Data Optimized or Evolution-Data only (EV-DO) and 3rd generation partnership project 2 (3GPP2) Code Division Multiple Access 1x (CDMA 1x), fourth generation (4G) communication systems, wireless local area network (WLAN), and Worldwide Interoperability for Microwave Access (WiMAX) communication systems can be used for connecting some of the participants of a conference in some embodiments. Examples of 2G systems include Global System for Mobile communications (GSM), General Packet Radio Service (GPRS), and Enhanced Data Rates for GSM Evolution (EDGE). A 2G communication system architecture is similar to the architecture shown in FIG. 91 except the 2G communication system architecture uses base transceiver stations (BTSs) instead of Node Bs 9110 and base station controllers (BSC) instead of RNC 9105. In a 2G communication system, an A interface between the BSC and the core network is used for circuit switched services and a Gb interface between the BSC and the core network is used for packet switched services.

In some embodiments, the communication system 9100 is operated by a service carrier who initially provisions a mobile device 9115 to allow the mobile device 9115 to use the communication system 9100. Some embodiments provision a mobile device 9115 by configuring and registering a subscriber identity module (SIM) card in the mobile device 9115. In other embodiments, the mobile device 9115 is instead configured and registered using the mobile device 9115's memory. Moreover, additional services can be provisioned (after a customer purchases the mobile device 9115) such as data services like GPRS, multimedia messaging service (MMS), and instant messaging. Once provisioned, the mobile device 9115 is activated and is thereby allowed to use the communication system 9100 by the service carrier.

The communication system 9100 is a private communication network in some embodiments. In such embodiments, the mobile devices 9115 can communicate (e.g., conduct voice calls, exchange data) among each other (e.g., mobile devices 9115 that are provisioned for the communication system 9100). In other embodiments, the communication system 9100 is a public communication network. Thus, the mobile devices 9115 can communicate with other devices outside of the communication system 9100 in addition to the mobile devices 9115 provisioned for the communication system 9100. Some of the other devices outside of the communication system 9100 include phones, computers, and other devices that connect to the communication system 9100 through other networks such as a public switched telephone network or another wireless communication network.

Figure 92:
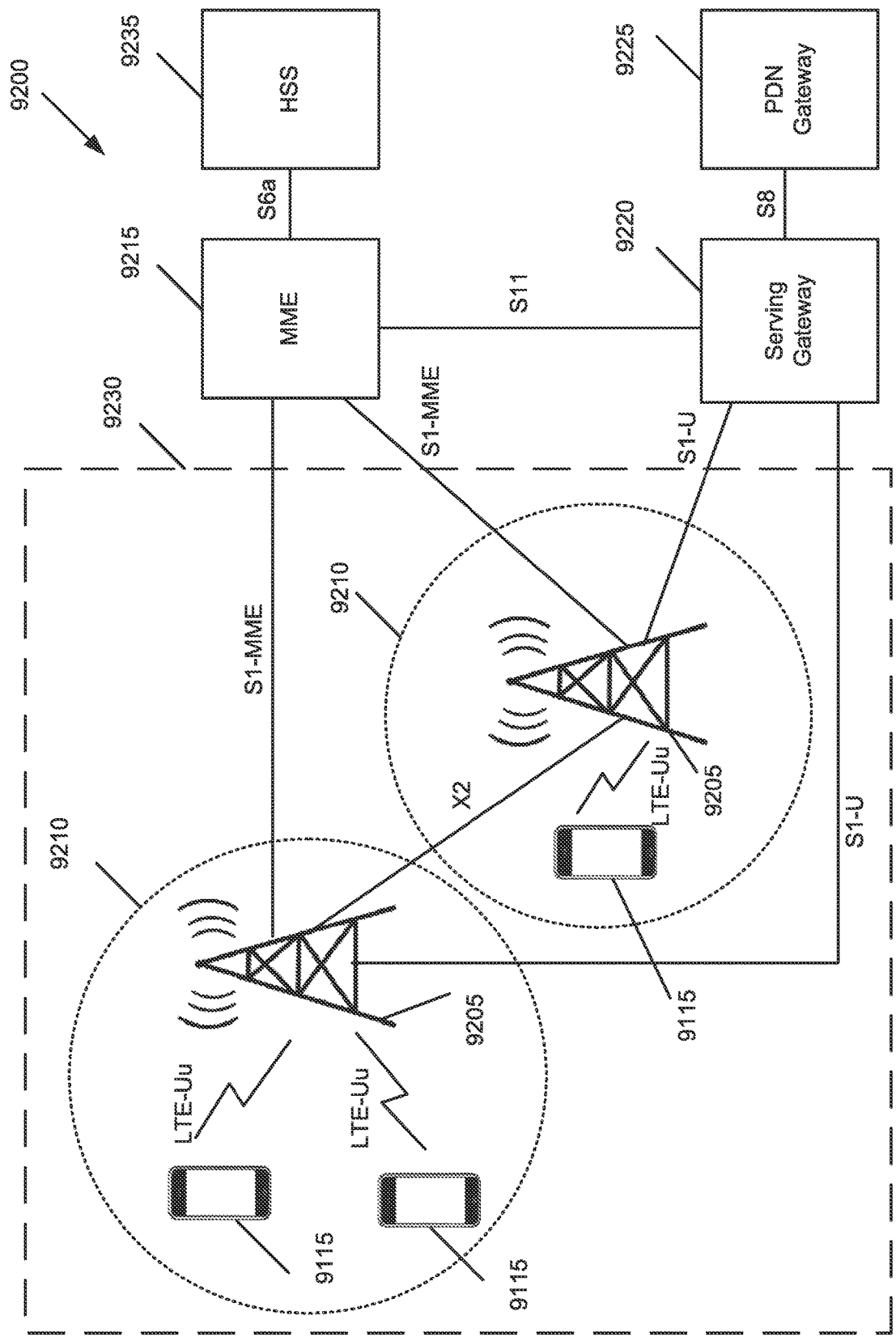
FIG. 92 conceptually illustrates another example communication system of some embodiments.

The Long-Term Evolution (LTE) specification is used to define 4G communication systems. FIG. 92 conceptually illustrates an example of a 4G communication system 9200 that is used for connecting some participants of a video conference in some embodiments. As shown, the communication system 9200 includes several mobile devices 9115, several Evolved Node Bs (eNBs) 9205, a Mobility Management Entity (MME) 9215, a Serving Gateway (S-GW) 9220, a Packet Data Network (PDN) Gateway 9225, and a Home Subscriber Server (HSS) 9235. In some embodiments, the communication system 9200 includes one or more MMEs 9215, one or more S-GWs 9220, one or more PDN Gateways 9225, and one or more HSSs 9235.

The eNBs 9205 provide an air interface for the mobile devices 9115. As shown, each eNB 9205 covers a service region 9210. The mobile devices 9115 in each service region 9210 are wirelessly connected to the eNB 9205 of the service region 9210 through a LTE-Uu interface. FIG. 92 also shows the eNBs 9205 connected to each other through an X2 interface. In addition, the eNBs 9205 are connected to the MME 9215 through an S1-MME interface and to the S-GW 9220 through an S1-U interface. The eNBs 9205 are collectively referred to as an Evolved UTRAN (E-TRAN) 9230.

The eNBs 9205 provide functions such as radio resource management (e.g., radio bearer control, connection mobility control, etc.), routing of user plane data towards the S-GW 9220, signal measurement and measurement reporting, MME selection at the time of mobile device attachment, etc. The MME 9215 functions include idle mode mobile device tracking and paging, activation and deactivation of radio bearers, selection of the S-GW 9220 at the time of mobile device attachment, Non-Access Stratum (NAS) signaling termination, user authentication by interacting with the HSS 9235, etc.

The S-GW 9220 functions includes (1) routing and forwarding user data packets and (2) managing and storing mobile device contexts such as parameters of the IP bearer service and network internal routing information. The PDN Gateway 9225 functions include providing connectivity from the mobile devices to external packet data networks (not shown) by being the point of exit and entry of traffic for the mobile devices. A mobile station may have simultaneous connectivity with more than one PDN Gateway for accessing multiple packet data networks. The PDN Gateway 9225 also acts as the anchor for mobility between 3GPP and non-3GPP technologies such as WiMAX and 3GPP2 (e.g., CDMA 1x and EV-DO).

As shown, MME 9215 is connected to S-GW 9220 through an S11 interface and to the HSS 9235 through an S6a interface. The S-GW 9220 and the PDN Gateway 9220 are connected through an S8 interface. The MME 9215, S-GW 9220, and PDN Gateway 9225 are collectively referred to as an Evolved Packet Core (EPC). The EPC is the main component of a System Architecture Evolution (SAE) architecture, which is the core network architecture of 3GPP LTE wireless communication standard. The EPC is a pure packet system. For example, the EPC does not have a voice media gateway. Services, like voice and SMS, are packet-switched routed and are provided by application functions that make use of the EPC service. So using the telephone call to video conference transition previously described above as an example, both the telephone call and the video conference are conducted through packet-switched equipment of the communication system 9200 in some embodiments. In some such embodiments, the packet-switched channel used for the telephone call is continued to be used for the audio data of the video conference after the telephone call terminates. However, in other such embodiments, a different packet-switched channel is created (e.g., when the video conference is established) and audio data is transmitted through the newly created packet-switched channel instead of the packet-switched channel of the telephone call when the telephone call terminates.

Moreover, the amount of bandwidth provided by these different technologies ranges from 44 kilobits per second (kbps) for GPRS to over 10 megabits per second (Mbps) for LTE. Download rates of 100 Mbps and upload rates of 50 Mbps are predicted in the future for LTE.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, many embodiments were described above by reference to a video conference between two dual camera mobile devices. However, one of ordinary skill in the art will realize that many of these embodiments are used in cases involving a video conference between a dual camera mobile device and another device, such as a single camera mobile device, a computer, a phone with video conference capability, etc. Moreover, many of the embodiments described above can be used in single camera mobile devices and other computing devices with video conference capabilities. Thus, one of ordinary skill in the art would understand that the invention is not limited by the foregoing illustrative details, but rather is to be defined by the appended claims.

The invention claimed is:

1. A first electronic device, comprising:
a touch-sensitive surface and a display;
one or more processors; and
memory storing one or more programs configured to be executed by the one or more processors, the one or more programs including instructions for:
   presenting, on the first electronic device, a composite display having a first video captured by the first electronic device and a second video captured by a second electronic device that is engaged in a video conference with the first electronic device, the composite display comprising an inset display showing the first video and a main display showing the second video, wherein the inset display is smaller than the main display and overlapping at least a portion of the main display;
   during the video conference, receiving, at the first electronic device, a selection of the inset display, wherein the selection of the inset display includes contact at a location on the touch-sensitive surface that is associated with the inset display;
   detecting that the location of the contact on the touch-sensitive surface has moved towards a direction while the contact has been maintained;
   in response to detecting that the location of the contact on the touch-sensitive surface has moved towards a direction while the contact has been maintained, modifying the composite display by moving the inset display in a same direction of movement as the contact;
   detecting that the contact with the touch-sensitive surface has been terminated while the inset display is moving; and
   in response to detecting that the contact with the touch-sensitive surface has been terminated while the inset display is moving, continuing to move the inset display in the same direction of movement, wherein the inset display continues to move until it reaches a respective location within the composite display, the respective location designated for placing one side of the inset display.

2. The first electronic device of claim 1, wherein the respective location is a snap location.

3. The first electronic device of claim 1, wherein the respective location is a corner of the composite display.

4. The first electronic device of claim 1, wherein the respective location is a corner of the composite display.

5. The first electronic device of claim 1, the one or more programs further including instructions for:
during the video conference, receiving, at the first electronic device, a second selection of the inset display while the inset display is at a first position, wherein the second selection of the inset display includes a second contact at a second location on the touch-sensitive surface that is associated with the inset display;
detecting that the second location of the second contact on the touch-sensitive surface has moved towards a second direction while the second contact has been maintained;
in response to detecting that the second location of the second contact on the touch-sensitive surface has moved towards a second direction while the second contact has been maintained, modifying the composite display by moving the inset display in a same direction of movement as the second contact;
detecting that the second contact with the touch-sensitive surface has been terminated while the inset display is moving; and
in response to detecting that the second contact with the touch-sensitive surface has been terminated while the inset display is moving:
   in accordance with a determination that the movement of the second contact from the second location exceeds a threshold amount, continuing to move the inset display in the same direction of movement as the second contact; and
   in accordance with a determination that the movement of the second contact from the second location does not exceed the threshold amount, moving the inset display back to the first position.

6. The first electronic device of claim 1, wherein moving the inset display includes moving the inset display from a first corner of the composite display to a second corner of the composite display.

7. The first electronic device of claim 1, the one or more programs further including instructions for:
detecting a rotation of the touch-sensitive surface of the first electronic device; and
in response to detecting the rotation of the touch-sensitive surface of the first electronic device, rotating the composite display.

8. The first electronic device of claim 1,
wherein the selection of the inset display includes a selection of a part of the inset display and a movement of the part, and
wherein modifying the composite display further comprises changing a size of the inset display based on the selection of the part of the inset display and the movement of the part.

9. The first electronic device of claim 8, wherein the movement of the part comprises a movement of the part toward a center of the inset display, and the modification of the composite display comprises shrinking the size of the inset display.

10. The first electronic device of claim 8, wherein the movement of the part comprises a movement of the part in a direction away from a center of the inset display, and wherein the modification of the composite display comprises enlarging the size of the inset display.

11. The first electronic device of claim 1, wherein modifying the composite display further comprises swapping the inset display and the main display such that the inset display shows the second video and the main display shows the first video.

12. The first electronic device of claim 1, wherein modifying the composite display comprises moving the first video with respect to the composite display.

13. A non-transitory computer-readable storage medium storing one or more programs configured to be executed by one or more processors of a first electronic device that includes a touch-sensitive surface and a display, the one or more programs including instructions for:
    presenting, on the first electronic device, a composite display having a first video captured by the first electronic device and a second video captured by a second electronic device that is engaged in a video conference with the first electronic device, the composite display comprising an inset display showing the first video and a main display showing the second video, wherein the inset display is smaller than the main display and overlapping at least a portion of the main display;
    during the video conference, receiving, at the first electronic device, a selection of the inset display, wherein the selection of the inset display includes contact at a location on the touch-sensitive surface that is associated with the inset display;
    detecting that the location of the contact on the touch-sensitive surface has moved towards a direction while the contact has been maintained;
    in response to detecting that the location of the contact on the touch-sensitive surface has moved towards a direction while the contact has been maintained, modifying the composite display by moving the inset display in a same direction of movement as the contact;
    detecting that the contact with the touch-sensitive surface has been terminated while the inset display is moving; and
    in response to detecting that the contact with the touch-sensitive surface has been terminated while the inset display is moving, continuing to move the inset display in the same direction of movement, wherein the inset display continues to move until it reaches a respective location within the composite display, the respective location designated for placing one side of the inset display.

14. A method, comprising:
at a first electronic device that includes a touch-sensitive surface and a display:
    presenting, on the first electronic device, a composite display having a first video captured by the first electronic device and a second video captured by a second electronic device that is engaged in a video conference with the first electronic device, the composite display comprising an inset display showing the first video and a main display showing the second video, wherein the inset display is smaller than the main display and overlapping at least a portion of the main display;
    during the video conference, receiving, at the first electronic device, a selection of the inset display, wherein the selection of the inset display includes contact at a location on the touch-sensitive surface that is associated with the inset display;
    detecting that the location of the contact on the touch-sensitive surface has moved towards a direction while the contact has been maintained;
    in response to detecting that the location of the contact on the touch-sensitive surface has moved towards a direction while the contact has been maintained, modifying the composite display by moving the inset display in a same direction of movement as the contact;
    detecting that the contact with the touch-sensitive surface has been terminated while the inset display is moving; and
    in response to detecting that the contact with the touch-sensitive surface has been terminated while the inset display is moving, continuing to move the inset display in the same direction of movement, wherein the inset display continues to move until it reaches a respective location within the composite display, the respective location designated for placing one side of the inset display.

15. The non-transitory computer-readable storage medium of claim 13, wherein the respective location is a snap location.

16. The non-transitory computer-readable storage medium of claim 13, wherein the respective location is a corner of the composite display.

17. The non-transitory computer-readable storage medium of claim 13, wherein the respective location is a corner of the composite display.

18. The non-transitory computer-readable storage medium of claim 13, the one or more programs further including instructions for:
    during the video conference, receiving, at the first electronic device, a second selection of the inset display while the inset display is at a first position, wherein the second selection of the inset display includes a second contact at a second location on the touch-sensitive surface that is associated with the inset display;
    detecting that the second location of the second contact on the touch-sensitive surface has moved towards a second direction while the second contact has been maintained;
    in response to detecting that the second location of the second contact on the touch-sensitive surface has moved towards a second direction while the second contact has been maintained, modifying the composite display by moving the inset display in a same direction of movement as the second contact;
    detecting that the second contact with the touch-sensitive surface has been terminated while the inset display is moving; and
    in response to detecting that the second contact with the touch-sensitive surface has been terminated while the inset display is moving:
        in accordance with a determination that the movement of the second contact from the second location exceeds a threshold amount, continuing to move the inset display in the same direction of movement as the second contact; and
        in accordance with a determination that the movement of the second contact from the second location does not exceed the threshold amount, moving the inset display back to the first position.

19. The non-transitory computer-readable storage medium of claim 13, wherein moving the inset display includes moving the inset display from a first corner of the composite display to a second corner of the composite display.

20. The non-transitory computer-readable storage medium of claim 13, the one or more programs further including instructions for:
   detecting a rotation of the touch-sensitive surface of the first electronic device; and
   in response to detecting the rotation of the touch-sensitive surface of the first electronic device, rotating the composite display.

21. The non-transitory computer-readable storage medium of claim 13,
   wherein the selection of the inset display includes a selection of a part of the inset display and a movement of the part, and
   wherein modifying the composite display further comprises changing a size of the inset display based on the selection of the part of the inset display and the movement of the part.

22. The non-transitory computer-readable storage medium of claim 21, wherein the movement of the part comprises a movement of the part toward a center of the inset display, and the modification of the composite display comprises shrinking the size of the inset display.

23. The non-transitory computer-readable storage medium of claim 21, wherein the movement of the part comprises a movement of the part in a direction away from a center of the inset display, and wherein the modification of the composite display comprises enlarging the size of the inset display.

24. The non-transitory computer-readable storage medium of claim 13, wherein modifying the composite display further comprises swapping the inset display and the main display such that the inset display shows the second video and the main display shows the first video.

25. The non-transitory computer-readable storage medium of claim 13, wherein modifying the composite display comprises moving the first video with respect to the composite display.

26. The method of claim 14, wherein the respective location is a snap location.

27. The method of claim 14, wherein the respective location is a corner of the composite display.

28. The method of claim 14, wherein the respective location is a corner of the composite display.

29. The method of claim 14, further comprising:
   during the video conference, receiving, at the first electronic device, a second selection of the inset display while the inset display is at a first position, wherein the second selection of the inset display includes a second contact at a second location on the touch-sensitive surface that is associated with the inset display;
   detecting that the second location of the second contact on the touch-sensitive surface has moved towards a second direction while the second contact has been maintained;
   in response to detecting that the second location of the second contact on the touch-sensitive surface has moved towards a second direction while the second contact has been maintained, modifying the composite display by moving the inset display in a same direction of movement as the second contact;
   detecting that the second contact with the touch-sensitive surface has been terminated while the inset display is moving; and
   in response to detecting that the second contact with the touch-sensitive surface has been terminated while the inset display is moving:
      in accordance with a determination that the movement of the second contact from the second location exceeds a threshold amount, continuing to move the inset display in the same direction of movement as the second contact; and
   in accordance with a determination that the movement of the second contact from the second location does not exceed the threshold amount, moving the inset display back to the first position.

30. The method of claim 14, wherein moving the inset display includes moving the inset display from a first corner of the composite display to a second corner of the composite display.

31. The method of claim 14, further comprising:
   detecting a rotation of the touch-sensitive surface of the first electronic device; and
   in response to detecting the rotation of the touch-sensitive surface of the first electronic device, rotating the composite display.

32. The method of claim 14,
   wherein the selection of the inset display includes a selection of a part of the inset display and a movement of the part, and
   wherein modifying the composite display further comprises changing a size of the inset display based on the selection of the part of the inset display and the movement of the part.

33. The method of claim 32, wherein the movement of the part comprises a movement of the part toward a center of the inset display, and the modification of the composite display comprises shrinking the size of the inset display.

34. The method of claim 32, wherein the movement of the part comprises a movement of the part in a direction away from a center of the inset display, and wherein the modification of the composite display comprises enlarging the size of the inset display.

35. The method of claim 14, wherein modifying the composite display further comprises swapping the inset display and the main display such that the inset display shows the second video and the main display shows the first video.

36. The method of claim 14, wherein modifying the composite display comprises moving the first video with respect to the composite display.

* * * * *